DIGITAL DIFFERENTIAL ANALYZER

Filed May 11, 1956

INVENTOR.
ROBERT E. BIBLE
BY
Theodore H. Lassagne
ATTORNEY

April 11, 1967 R. E. BIBLE 3,313,925

DIGITAL DIFFERENTIAL ANALYZER

Filed May 11, 1956 52 Sheets-Sheet 2

$j_1 = \bar{J}_1 \bar{N} T$ $\bar{j}_1 = (J_1 + N) T$ $j_2 = (J_1 \bar{J}_2 \bar{J}_5 + N) T$ $\bar{j}_2 = J_1 J_2 \bar{N} T$ $j_3 = J_1 J_2 \bar{J}_3 \bar{N} T$ $\bar{j}_3 = (J_1 J_2 J_3 + N) T$ $j_4 = J_1 J_2 J_3 \bar{J}_4 \bar{N} T$ $\bar{j}_4 = (J_1 J_2 J_3 J_4 + N) T$ $j_5 = J_1 J_2 J_3 J_4 \bar{N} T$ $\bar{j}_5 = (J_1 J_5 + N) T$

*INVENTOR.*
ROBERT E. BIBLE

BY Theodore H. Lassagne

ATTORNEY

FIG. 5

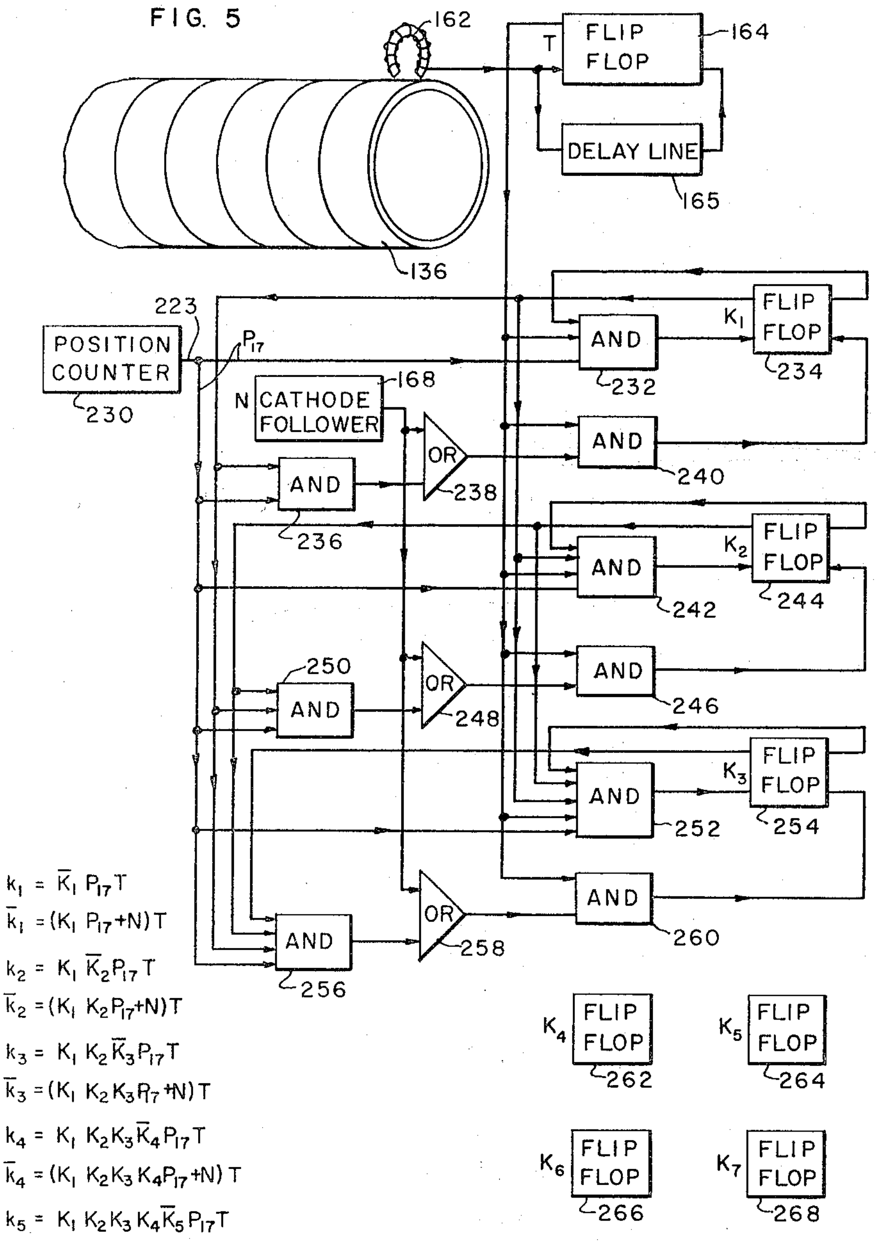

$k_1 = \overline{K}_1 P_{17} T$ $\overline{k}_1 = (K_1 P_{17} + N) T$ $k_2 = K_1 \overline{K}_2 P_{17} T$ $\overline{k}_2 = (K_1 K_2 P_{17} + N) T$ $k_3 = K_1 K_2 \overline{K}_3 P_{17} T$ $\overline{k}_3 = (K_1 K_2 K_3 P_{17} + N) T$ $k_4 = K_1 K_2 K_3 \overline{K}_4 P_{17} T$ $\overline{k}_4 = (K_1 K_2 K_3 K_4 P_{17} + N) T$ $k_5 = K_1 K_2 K_3 K_4 \overline{K}_5 P_{17} T$ $\overline{k}_5 = (K_1 K_2 K_3 K_4 K_5 P_{17} + N) T$ $k_6 = K_1 K_2 K_3 K_4 K_5 \overline{K}_6 P_{17} T$ $\overline{k}_6 = (K_1 K_2 K_3 K_4 K_5 K_6 P_{17} + N) T$ $k_7 = K_1 K_2 K_3 K_4 K_5 K_6 \overline{K}_7 P_{17} T$ $\overline{k}_7 = N T$

INVENTOR.
ROBERT E. BIBLE

BY [signature]

ATTORNEY

April 11, 1967 R. E. BIBLE 3,313,925

DIGITAL DIFFERENTIAL ANALYZER

Filed May 11, 1956 52 Sheets-Sheet 4

INVENTOR.
ROBERT E. BIBLE

BY Theodore H. Lassagne

ATTORNEY

INVENTOR.
ROBERT E. BIBLE

BY

ATTORNEY

DIGITAL DIFFERENTIAL ANALYZER

Filed May 11, 1956 52 Sheets-Sheet 6

FIG. 8

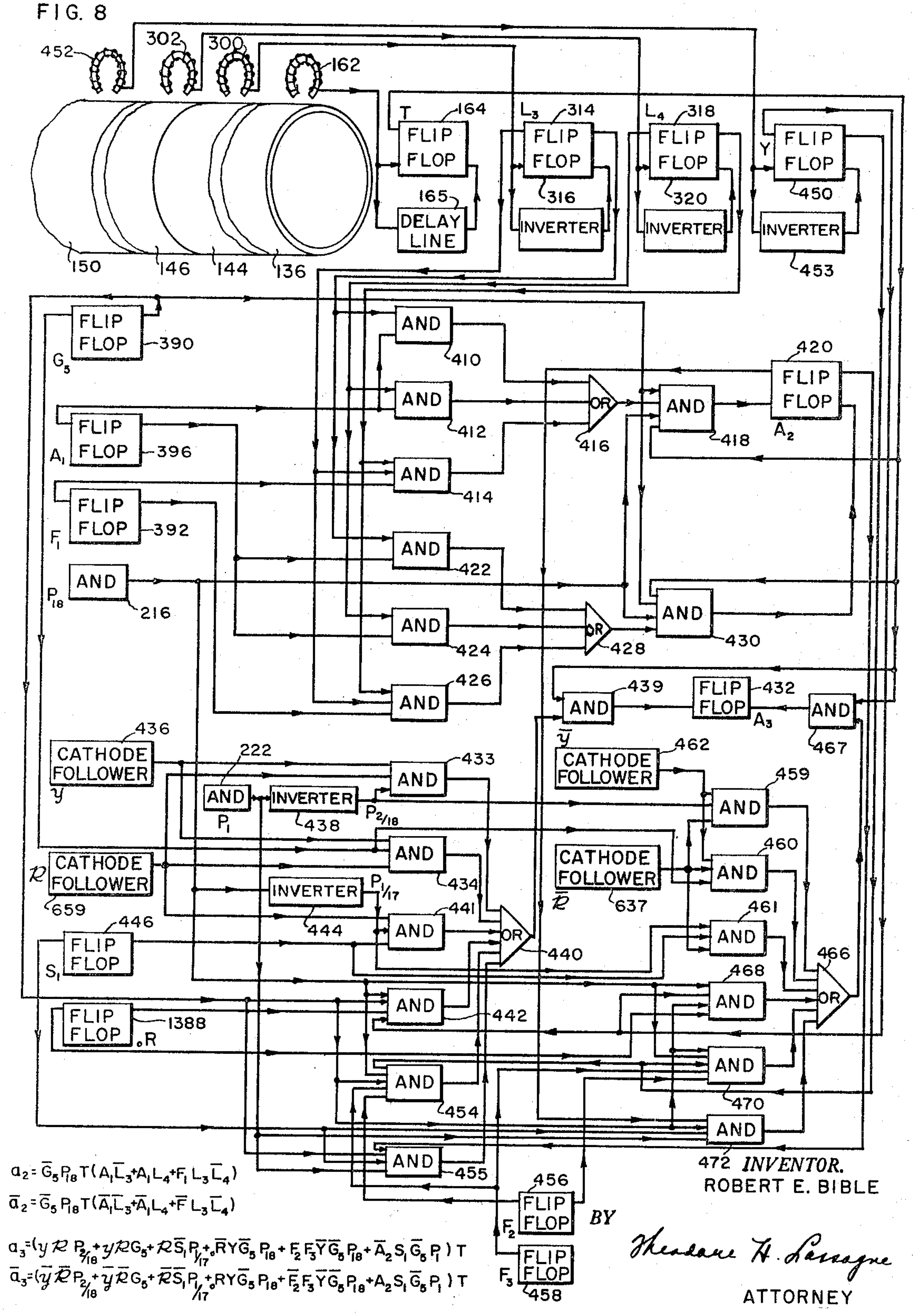

$a_2 = \bar{G}_5 P_{18} T(A_1\bar{L}_3 + A_1 L_4 + F_1 L_3 \bar{L}_4)$ $\bar{a}_2 = \bar{G}_5 P_{18} T(\bar{A}_1\bar{L}_3 + \bar{A}_1 L_4 + \bar{F} L_3 \bar{L}_4)$ $a_3 = (y \mathcal{R} P_{2/18} + y \mathcal{R} G_5 + \mathcal{R} \bar{S}_1 P_{1/17} + {}_oR Y \bar{G}_5 P_{18} + \bar{F}_2 F_3 \bar{Y} \bar{G}_5 P_{18} + \bar{A}_2 S_1 \bar{G}_5 P_1)\,T$ $\bar{a}_3 = (\bar{y} \bar{\mathcal{R}} P_{2/18} + \bar{y} \mathcal{R} G_5 + \bar{\mathcal{R}} \bar{S}_1 P_{1/17} + {}_oR Y \bar{G}_5 P_{18} + \bar{F}_2 F_3 \bar{Y} \bar{G}_5 P_{18} + A_2 S_1 \bar{G}_5 P_1)\,T$

INVENTOR.
ROBERT E. BIBLE

BY Theodore H. Lassagne

ATTORNEY

DIGITAL DIFFERENTIAL ANALYZER

Filed May 11, 1956 52 Sheets-Sheet 7

$b_1=(B_2\bar{G}_5P_{18}+\alpha L_1\bar{L}_2P_{1/17}+\bar{L}_1\bar{L}_2L_3L_4F_1G_5J_3P_{1/17})T$ $\bar{b}_1=(\bar{B}_2\bar{G}_5P_{18}+\bar{\alpha}L_1\bar{L}_2P_{1/17}+\bar{L}_1L_2L_3L_4\bar{F}_1G_5J_3P_{1/17})T$ INVENTOR.
ROBERT E. BIBLE
BY Theodore H. Lassagne
ATTORNEY $b_2 = \bar{G}_5 P_{18} (B_1 \bar{L}_3 + B_1 \bar{L}_4 + F_1 L_3 L_4) T$ $\bar{b}_2 = \bar{G}_5 P_{18} (\bar{B}_1 \bar{L}_3 + \bar{B} \bar{L}_4 + \bar{F}_1 L_3 L_4) T$ $b_3 = Y_p \bar{S}_1 P_{2/17} T$ $\bar{b}_3 = S_1 (\bar{B}_2 Y + B_2 \bar{Y} + \bar{G}_5 P_{17}) T$

INVENTOR.
ROBERT E. BIBLE

BY

ATTORNEY

INVENTOR.
ROBERT E. BIBLE
BY
ATTORNEY

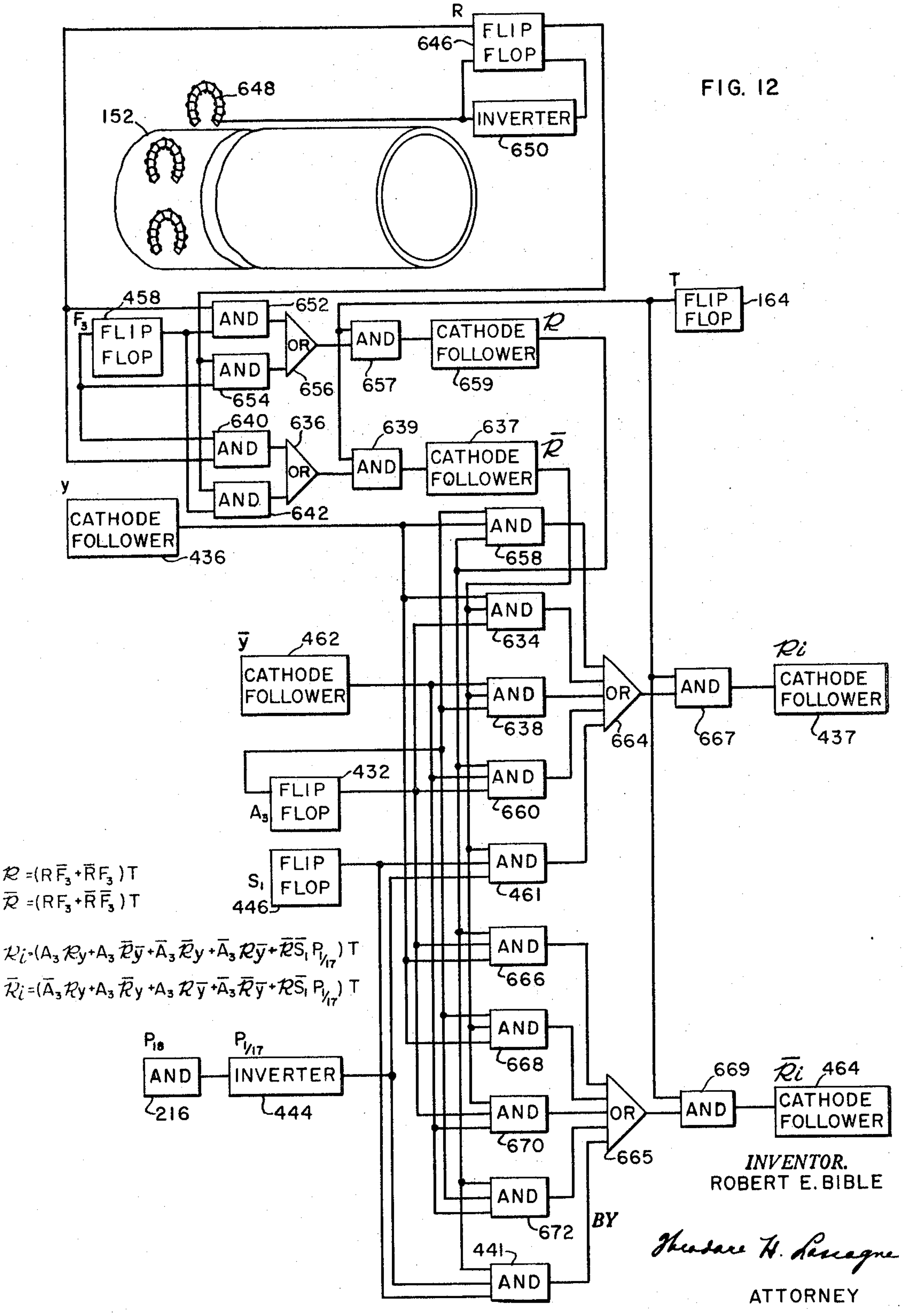

FIG. 12

$\mathcal{R} = (R\bar{F}_3 + \bar{R}F_3)T$ $\bar{\mathcal{R}} = (RF_3 + \bar{R}\bar{F}_3)T$ $\mathcal{R}_i = (A_3\mathcal{R}y + A_3\bar{\mathcal{R}}\bar{y} + \bar{A}_3\mathcal{R}y + \bar{A}_3\mathcal{R}\bar{y} + \bar{\mathcal{R}}\bar{S}_1P_{1/17})T$ $\bar{\mathcal{R}}_i = (\bar{A}_3\mathcal{R}y + A_3\bar{\mathcal{R}}y + A_3\mathcal{R}\bar{y} + \bar{A}_3\bar{\mathcal{R}}\bar{y} + \mathcal{R}\bar{S}_1P_{1/17})T$

INVENTOR.
ROBERT E. BIBLE

BY Theodore H. Lassagne

ATTORNEY

DIGITAL DIFFERENTIAL ANALYZER

Filed May 11, 1956 52 Sheets-Sheet 11

INVENTOR.
ROBERT E. BIBLE

BY Theodore H. Lassagne

ATTORNEY

INVENTOR.
ROBERT E. BIBLE
BY
Theodore H. Lassagne
ATTORNEY

DIGITAL DIFFERENTIAL ANALYZER $S_1=(Y_p\bar{S}_1P_{2/17}+L_1L_2P_{18})T$ $\bar{S}_1=\bar{G}_5P_{17}T$ $S_2=(U_pS_2J_5+L_2U_pP_{18}+G_1P_1)T$ $\bar{S}_2=(\bar{G}_5P_{17}+C_2'P_{17}+G_1P_{17}+U_pS_2G_1C_2'K_2K_1J_4)T$

*INVENTOR.*
ROBERT E. BIBLE

BY

ATTORNEY

DIGITAL DIFFERENTIAL ANALYZER

Filed May 11, 1956 52 Sheets-Sheet 14

$c_1 = \bar{C}_1 Q L_1 L_2 T P_{1/17}$ $\bar{c}_1 = (C_1 Q L_1 L_2 + L_2 P_{18}) T$ $c_1' = (\bar{C}_1' C_1 \alpha Q L_1 L_2 + \bar{C}_1' \bar{C}_1 \bar{\alpha} Q L_1 L_2) T P_{1/17}$ $\bar{c}_1' = (L_2 P_{18} + Q L_1 L_2 C_1' C_1 \alpha + Q L_1 L_2 \bar{\alpha} C_1' \bar{C}_1) T$ $c_1'' = (L_2 P_{18} + C_1' C_1 \alpha Q L_1 L_2) T$ $\bar{c}_1'' = \bar{\alpha} \bar{C}_1' \bar{C}_1 Q L_1 L_2 T P_{1/17}$

*INVENTOR.*
ROBERT E. BIBLE

*BY*

ATTORNEY $$c_2 = (C_1 L_2 P_{18} + \bar{A}_2 \bar{G}_1 P_1 + C_2' G_1 P_{1/2})T$$

$$\bar{c}_2 = (\bar{C}_1 L_2 P_{18} + A_2 \bar{G}_1 P_1 + \bar{C}_2' G_1 P_{1/2})T$$

$$c_3 = (C_2 U S_2 + C_2 U G_1 P_1 + A_2 \bar{S}_2 \bar{G}_1 P_1)T$$

$$\bar{c}_3 = (\bar{C}_2 \bar{U} S_2 + \bar{A}_2 \bar{S}_2 \bar{G}_1 P_1 + L_2 P_{18})T$$

INVENTOR.
ROBERT E. BIBLE

BY Theodore H. Lassagne

ATTORNEY $c_2' = (C_1' L_2 P_{18} + \bar{L}_1 \bar{L}_2 G_5 P_{18} + \bar{C}_2'' G_1 P_1 + E_4 G_1 \bar{P}_2)\,T$ $\bar{c}_2' = [(\bar{C}_1' L_2 P_{18} + L_1 \bar{L}_2 \bar{G}_5 P_{18} + C_2'' G_1 P_1 + \bar{E}_4 G_1 P_2 + \bar{G}_1 P_{17} (\bar{D} + \bar{F}_2 + \mathcal{U} + \bar{\mathcal{R}}_i)(D + F_2 + \bar{\mathcal{U}} + \mathcal{R}_i)]\,T$ INVENTOR.
ROBERT E. BIBLE
BY
Theodore H. Lassagne
ATTORNEY

DIGITAL DIFFERENTIAL ANALYZER

Filed May 11, 1956 52 Sheets-Sheet 17

$$c_2'' = (C_1'' L_2 P_{18} + B_2 \bar{G}_1 P_1 + \varepsilon S_2 G_1 + \varepsilon G_1 P_1 + Y_p G_1 P_1 \bar{G}_5) T$$

$$\bar{c}_2'' = (\bar{C}_1'' L_2 P_{18} + \bar{B}_2 \bar{G}_1 P_1 + \bar{\varepsilon} \bar{Y}_p G_1 P_1 + \bar{\varepsilon} G_5 G_1 P_1) T$$

INVENTOR.
ROBERT E. BIBLE

BY [signature]

ATTORNEY

April 11, 1967 R. E. BIBLE 3,313,925

DIGITAL DIFFERENTIAL ANALYZER

Filed May 11, 1956 52 Sheets-Sheet 18

$f_1=({}_oZ\bar{L}_1\bar{L}_2L_3L_4P_{1/17}+A_1\bar{G}_5L_3\bar{L}_4P_{18}+B_1\bar{G}_5L_3L_4P_{18})\,T$ $\bar{f}_1=({}_o\bar{Z}\bar{L}_1\bar{L}_2L_3L_4P_{1/17}+\bar{A}_1\bar{G}_5L_3\bar{L}_4P_{18}+\bar{B}_1\bar{G}_5L_3L_4P_{18})\,T$

INVENTOR.
ROBERT E. BIBLE

BY [signature]

ATTORNEY $f_2 = (\bar{Z}_4 G_5 P_{12} + D \mathcal{U} \mathcal{R}i\, C_2' \bar{G}_1 G_5 P_{17} + \bar{L}_1 \bar{L}_2 L_3 \bar{L}_4 \bar{J}_4 \bar{J}_5)\, T$ $\bar{f}_2 = [\bar{G}_5 P_{18} + \bar{D} \mathcal{U} \bar{\mathcal{R}}i\, C_2' \bar{G}_1 G_5 P_{17} + (\bar{B}_2 A_2 + B_2 \bar{A}_2)\, Y_p \bar{S}_1 P_{2/17} \bar{G}_5]\, T$ INVENTOR.
ROBERT E. BIBLE
BY [signature]
ATTORNEY

INVENTOR.
ROBERT E. BIBLE

BY Theodore H. Lassagne

ATTORNEY

INVENTOR.
ROBERT E. BIBLE
BY
ATTORNEY $$e_2=(E_3 P_{1/4} K_2+\bar{\varepsilon} S_2 E_4 K_2 P_{5/18})T$$
$$\bar{e}_2=(\bar{E}_3 P_{1/4} K_2+\varepsilon S_2 \bar{E}_4 K_2 P_{5/18})T$$
$$e_3=(E_4 P_{1/4} K_2+\bar{\varepsilon} S_2 E_4 K_2 P_{5/18})T$$
$$\bar{e}_3=(\bar{E}_4 P_{1/4} K_2+\varepsilon S_2 \bar{E}_4 K_2 P_{5/18})T$$
$$e_4=(\varepsilon S_2 K_2 P_{2/17}+U_p K_2 P_1)T$$
$$\bar{e}_4=(\bar{\varepsilon} S_2 K_2 P_{2/17}+\bar{U}_p K_2 P_1)T$$

*INVENTOR.*
ROBERT E. BIBLE
*BY* [signature]
ATTORNEY $g_1 = L_2 P_{18} T$ $\bar{g}_1 = \bar{L}_2 \bar{G}_5 P_{18} T$ $g_2 = \varepsilon \bar{G}_2 N T$ $\bar{g}_2 = (\bar{\beta} G_2 N + \bar{\alpha} G_2 N) T$ $g_5 = (\bar{L}_3 \bar{L}_4 P_{18} + \bar{L}_1 \bar{L}_2 P_{18}) T$ $\bar{g}_5 = S_1 P_1 T$

*INVENTOR.*
ROBERT E. BIBLE

*BY* [signature]

ATTORNEY $\cdot y = T(\alpha y_N S_1 \bar{G}_3 + \alpha A_2 \bar{S}_1 P_{2/17} + \alpha Y \bar{S}_1 P_{18} + \bar{\alpha} Y_P S_1 + \bar{\alpha} V_\mu \bar{S}_1 + Y_P G_3 S_1)$ $\cdot \bar{y} = T(\alpha \bar{y}_N S_1 \bar{G}_3 + \alpha \bar{A}_2 \bar{S}_1 P_{2/17} + \alpha \bar{Y} \bar{S}_1 P_{18} + \bar{\alpha} \bar{Y}_P S_1 + \bar{\alpha} \bar{V}_\mu \bar{S}_1 + \bar{Y}_P G_3 S_1)$ INVENTOR.
ROBERT E. BIBLE
BY
[signature]
ATTORNEY $_{o}r = (\bar{\alpha} G_1 P_{17} + \bar{\alpha} G_5 P_{17} + \bar{\alpha} \bar{G}_1 P_{18} + \alpha R_i G_1 + \alpha R_N \bar{G}_1) T$ $_{o}\bar{r} = (\bar{\alpha} \bar{G}_5 P_1 + \bar{\alpha} \bar{S}_1 P_1 + \alpha \bar{R}_i G_1 + \alpha \bar{R}_N \bar{G}_1) T$

INVENTOR.
ROBERT E. BIBLE

BY Theodore H. Lassagne
ATTORNEY $$_oU = [\alpha(\mathcal{U}_N + \bar{U}\bar{S}_2 G_1 P_1 + C_2''\bar{S}_2 G_1 P_{18}) + \bar{\alpha} U_P] T$$

$$_o\bar{U} = [\alpha(\bar{\mathcal{U}}_N S_2 + U\bar{S}_2 P_1 + \bar{C}_2''\bar{S}_2 P_{18} + \bar{S}_2\bar{G}_1) + \bar{\alpha}\bar{U}_P] T$$

INVENTOR.
ROBERT E. BIBLE

BY Theodore A. Lassagne

ATTORNEY $$_0Z-\alpha T[\bar{G}_1P_{18}(A_1\bar{L}_1+A_1\bar{G}_5+\Delta\mu L_1L_3G_5+\Delta R L_1\bar{L}_3G_5)+Z_2P$$
$$\cdot G_1P_{18}(\bar{D}C_2''+Z_2U\bar{C}_2''\bar{Y}_P+\bar{Z}_2\bar{U}C_2''+\bar{Z}_2\bar{C}_2''Y_P)+P_1(A_3\bar{G}_5+A_3\bar{S}_1+B_1G_5S_1)]$$

INVENTOR.
ROBERT E. BIBLE

BY *Theodore H. Lassagne*
ATTORNEY $$_\circ Z = [\bar{\alpha} + \bar{G}_1 P_{18}(\bar{A}_1 \bar{L}_1 + \bar{A}_1 \bar{G}_5 + \Delta\bar{\mu} L_1 L_3 G_5 + \Delta\bar{R} L_1 \bar{L}_3 G_5) + \bar{Z}_2 P_{2/17} + G_1 P_{18}(D C_2'' + \bar{Z}_2 U \bar{C}_2'' \bar{Y}_p + Z_2 \bar{U} \bar{C}_2'' + Z_2 \bar{C}_2'' Y_p) + P_1(\bar{A}_3 \bar{G}_5 + \bar{A}_3 \bar{S}_1 + \bar{B}_1 G_5 S_1)] T$$

*INVENTOR.*
ROBERT E. BIBLE
BY [signature]
ATTORNEY

| COUNT | ($J_1$) FLIP FLOP 170 | ($J_2$) FLIP FLOP 180 | ($J_3$) FLIP FLOP 190 | ($J_4$) FLIP FLOP 200 | ($J_5$) FLIP FLOP 210 |
|---|---|---|---|---|---|
| 1 | R | R | R | R | R |
| 2 | L | R | R | R | R |
| 3 | R | L | R | R | R |
| 4 | L | L | R | R | R |
| 5 | R | R | L | R | R |
| 6 | L | R | L | R | R |
| 7 | R | L | L | R | R |
| 8 | L | L | L | R | R |
| 9 | R | R | R | L | R |
| 10 | L | R | R | L | R |
| 11 | R | L | R | L | R |
| 12 | L | L | R | L | R |
| 13 | R | R | L | L | R |
| 14 | L | R | L | L | R |
| 15 | R | L | L | L | R |
| 16 | L | L | L | L | R |
| 17 | R | R | R | R | L |
| 18 | L | R | R | R | L |

INVENTOR.
ROBERT E. BIBLE
BY Theodore H. Lassagne
ATTORNEY

| COUNT | ($K_1$) FLIP FLOP 234 | ($K_2$) FLIP FLOP 244 | ($K_3$) FLIP FLOP 254 | ($K_4$) FLIP FLOP 262 | ($K_5$) FLIP FLOP 264 | ($K_6$) FLIP FLOP 266 | ($K_7$) FLIP FLOP 268 |
|---|---|---|---|---|---|---|---|
| 1 | R | R | R | R | R | R | R |
| 2 | L | R | R | R | R | R | R |
| 3 | R | L | R | R | R | R | R |
| 4 | L | L | R | R | R | R | R |
| 5 | R | R | L | R | R | R | R |
| — | — | — | — | — | — | — | — |
| 9 | R | R | R | L | R | R | R |
| 10 | L | R | R | L | R | R | R |
| 11 | R | L | R | L | R | R | R |
| — | — | — | — | — | — | — | — |
| 17 | R | R | R | R | L | R | R |
| 18 | L | R | R | R | L | R | R |
| — | — | — | — | — | — | — | — |
| 33 | R | R | R | R | R | L | R |
| 34 | L | R | R | R | R | L | R |
| 35 | R | L | R | R | R | L | R |
| 36 | L | L | R | R | R | L | R |
| — | — | — | — | — | — | — | — |
| 65 | R | R | R | R | R | R | L |
| — | — | — | — | — | — | — | — |
| 81 | R | R | R | R | L | R | L |
| 82 | L | R | R | R | L | R | L |
| — | — | — | — | — | — | — | — |
| 97 | R | R | R | R | R | L | L |
| — | — | — | — | — | — | — | — |
| 122 | L | R | R | L | L | L | L |
| 123 | R | L | R | L | L | L | L |
| 124 | L | L | R | L | L | L | L |
| 125 | R | R | L | L | L | L | L |

INVENTOR.
ROBERT E. BIBLE
BY [signature]
ATTORNEY

FIG. 35
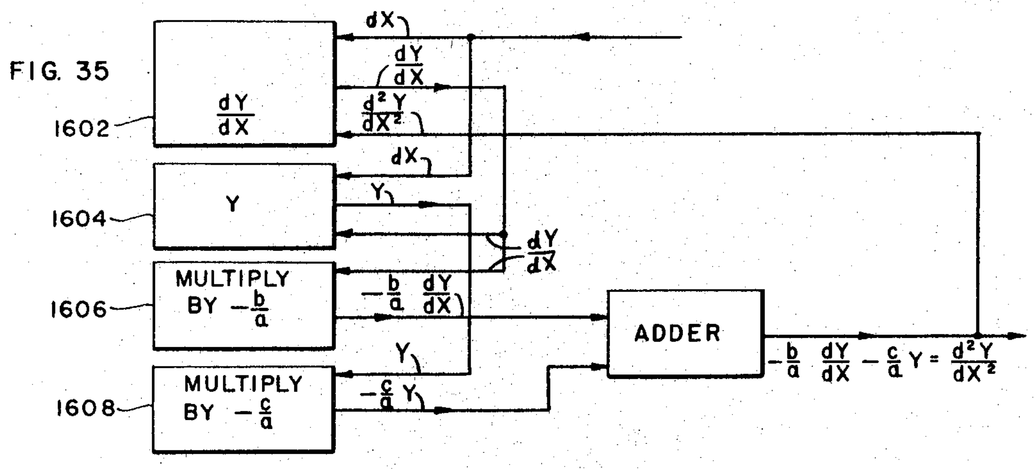
FIG. 36
| Y | R | $(A_3)_n$ | Ri | $(A_3)_{n+1}$ | $a_3$ | $\bar{a}_3$ |
|---|---|---|---|---|---|---|
| 0 | 0 | 0 | 0 | 0 | 0 | 0 |
| 0 | 0 | 1 | 1 | 0 | 0 | 1 |
| 0 | 1 | 0 | 1 | 0 | 0 | 0 |
| 0 | 1 | 1 | 0 | 1 | 0 | 0 |
| 1 | 0 | 0 | 1 | 0 | 0 | 0 |
| 1 | 0 | 1 | 0 | 1 | 0 | 0 |
| 1 | 1 | 0 | 0 | 1 | 1 | 0 |
| 1 | 1 | 1 | 1 | 1 | 0 | 0 |
FIG. 39
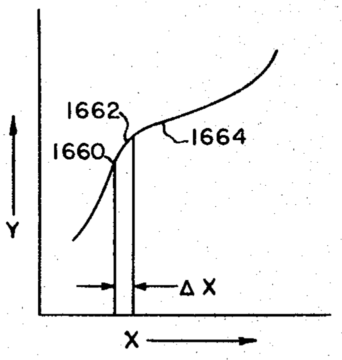
INVENTOR.
ROBERT E. BIBLE
BY
Theodore H. Lassagne
ATTORNEY

FIG. 37

| −dZ VALUES (+1, −1) | $\mathcal{U}$ at $P_{17}$ VALUES (−2, 0) | CARRY D AT $P_{18}$ VALUES (0,+2) | $\mathcal{E}$ d $\mathcal{R}$ |
|---|---|---|---|
| 0 | 0 | 0 | −1 |
| 0 | 0 | 1 | +1 (E) |
| 0 | 1 | 0 | −3 |
| 0 | 1 | 1 | −1 |
| 1 | 0 | 0 | +1 |
| 1 | 0 | 1 | +3 |
| 1 | 1 | 0 | −1 (E) |
| 1 | 1 | 1 | +1 |

FIG. 38

| $\mathcal{U}$ AT $P_{17}$ | $\mathcal{R}i$ AT $P_{17}$ | CARRY D AT $P_{17}$ | CARRY D AT $P_{18}$ |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

*INVENTOR.*
ROBERT E. BIBLE

*BY* [signature]

ATTORNEY

INVENTOR.
ROBERT E. BIBLE
BY
ATTORNEY

*INVENTOR.*
ROBERT E. BIBLE

*BY* Theodore H. Lassagne

ATTORNEY

| $\mathcal{E} dU$ COUNT | $C_1$ | $C_1'$ | $C_1''$ |
|---|---|---|---|
| +3 | 1 | 1 | 1 |
| +2 | 0 | 1 | 1 |
| +1 | 1 | 0 | 1 |
| 0 | 0 | 0 | 1 |
| −1 | 1 | 1 | 0 |
| −2 | 0 | 1 | 0 |
| −3 | 1 | 0 | 0 |

INVENTOR.
ROBERT E. BIBLE
BY Theodore H. Lassagne
ATTORNEY

FIG. 44

| BINARY DIGITAL ERROR, E-POSITION (17 ········ 11 10 9 8 7 6 5 4 3 2) | DECIMAL VALUE | ERROR REGISTER CODING $E_4$ $E_3$ $E_2$ |
|---|---|---|
| 0--------0 1 1 1 1 1 1 1 1 1 | +511 | 0 1 1 |
| 0--------0 1 1 1 1 1 1 1 1 0 | +510 | 0 1 1 |
| ⋮ | ⋮ | ⋮ |
| 0--------0 0 1 1 0 1 0 0 0 0 | +208 | 0 1 1 |
| ⋮ | ⋮ | ⋮ |
| 0--------0 0 0 0 0 0 1 0 1 1 | · | · |
| 0--------0 0 0 0 0 0 1 0 1 1 | +10 | 0 1 1 |
| 0--------0 0 0 0 0 0 1 0 1 1 | +9 | 0 1 1 |
| 0--------0 0 0 0 0 0 1 0 0 0 | +8 | 0 1 1 |
| 0--------0 0 0 0 0 0 0 1 1 1 | +7 | 0 1 1 |
| 0--------0 0 0 0 0 0 0 1 1 1 | +6 | 0 1 1 |
| 0--------0 0 0 0 0 0 0 1 0 1 | +5 | 0 1 1 |
| 0--------0 0 0 0 0 0 0 1 0 0 | +4 | 0 1 1 |
| 0--------0 0 0 0 0 0 0 0 1 1 | +3 | 0 1 1 |
| 0--------0 0 0 0 0 0 0 0 1 0 | +2 | 0 1 1 |
| 0--------0 0 0 0 0 0 0 0 0 1 | +1 | 0 0 1 |
| 0--------0 0 0 0 0 0 0 0 0 0 | 0 | 0 0 0 |
| 1--------1 1 1 1 1 1 1 1 1 1 | -1 | 1 1 1 |
| 1--------1 1 1 1 1 1 1 1 1 0 | -2 | 1 1 0 |
| 1--------1 1 1 1 1 1 1 1 0 1 | -3 | 1 0 1 |
| 1--------1 1 1 1 1 1 1 1 0 0 | -4 | 1 0 0 |
| 1--------1 1 1 1 1 1 1 0 1 1 | -5 | 1 0 0 |
| 1--------1 1 1 1 1 1 1 0 1 1 | -6 | 1 0 0 |
| 1--------1 1 1 1 1 1 1 0 0 1 | -7 | 1 0 0 |
| 1--------1 1 1 1 1 1 1 0 0 1 | -8 | 1 0 0 |
| 1--------1 1 1 1 1 1 0 1 1 1 | -9 | 1 0 0 |
| 1--------1 1 1 1 1 1 0 1 1 0 | -10 | 1 0 0 |
| 1--------1 1 1 1 1 1 0 1 0 1 | -11 | 1 0 0 |
| ⋮ | ⋮ | ⋮ |
| 1--------1 0 1 0 1 0 0 0 0 0 | -352 | 1 0 0 |
| ⋮ | ⋮ | ⋮ |
| 1--------1 0 0 0 0 0 0 0 1 0 | -510 | 1 0 0 |
| 1--------1 0 0 0 0 0 0 0 0 1 | -511 | 1 0 0 |
| 1--------1 0 0 0 0 0 0 0 0 0 | -512 | 1 0 0 |

PROPORTIONAL REGION $P_{17}$ $P_{16}$ $P_{15}$ $P_{14}$ $P_{13}$ $P_{12}$ $P_{11}$ $P_{10}$ $P_9$ $P_8$ $P_7$ $P_6$ $P_5$ $P_4$ $P_3$ $P_2$ $P_1$ $P_0$ ←— TIME

INVENTOR.
ROBERT E. BIBLE

BY Theodore H. Lassagne

ATTORNEY

FIG. 46
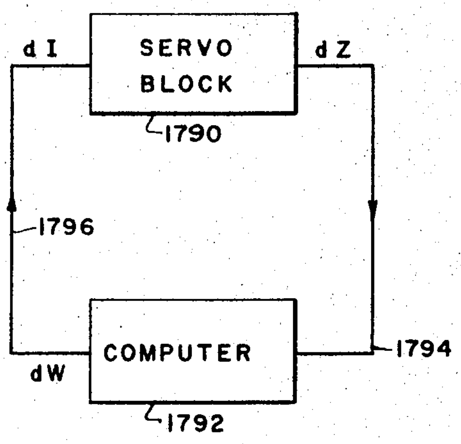
FIG. 47
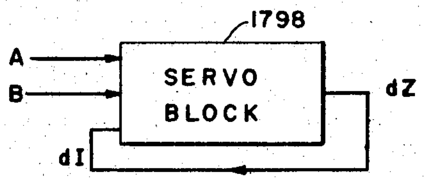
FIG. 48
| NORMAL SERVO OPERATION | | | | ADDITION OF +1 INCREMENT IN "ZERO-RATE" SERVO | | | | ADDITION OF −1 INCREMENT IN "ZERO-RATE" SERVO | | | |
|---|---|---|---|---|---|---|---|---|---|---|---|
| COUNT | $C_1''$ | $C_1'$ | $C_1$ | $C_2''$ | $C_2'$ | $C_2$ | $C_3$ | $C_2''$ | $C_2'$ | $C_2$ | $C_3$ |
| +3 | 1 | 1 | 1 | 0 | 1 | 0 | 1 | 0 | 1 | 0 | 0 |
| +1 | 1 | 0 | 1 | 0 | 0 | 0 | 1 | 0 | 0 | 0 | 0 |
| −1 | 0 | 1 | 1 | 1 | 1 | 0 | 1 | 1 | 1 | 0 | 0 |
| −3 | 0 | 0 | 1 | 1 | 0 | 0 | 1 | 1 | 0 | 0 | 0 |
INVENTOR.
ROBERT E. BIBLE
BY Theodore H. Lassagne
ATTORNEY

DIGITAL DIFFERENTIAL ANALYZER

Filed May 11, 1956 52 Sheets-Sheet 38

INVENTOR.
ROBERT E. BIBLE
BY
Theodore H. Lassagne
ATTORNEY $c_\alpha = P_{21}(SI + \bar{S}\bar{I})T$ $\bar{c}_\alpha = (\bar{S}I + \bar{I}S) P_{1/6} T$ $c_\beta = [P_{21}(\bar{Q}_1+\bar{Q}_2)+A_4Q_1Q_2]T$ $\bar{c}_\beta = [(\bar{S}I + S\bar{I})P_{9/16}(\bar{Q}_1+\bar{Q}_2)+\bar{A}_4Q_1Q_2]T$

INVENTOR.
ROBERT E. BIBLE

BY Theodore H. Lassagne

ATTORNEY

DIGITAL DIFFERENTIAL ANALYZER

Filed May 11, 1956 52 Sheets-Sheet 40

$q_1 = C_\beta P_{21} \bar{Q}_1 T$ $\bar{q}_1 = [Q_1(\bar{Q}_4+\bar{Q}_5)P_{21}+Q_1 Q_4 Q_5 C_\alpha P_{21}]T$ $q_2 = [P_{21} Q_4 \bar{Q}_5 Q_6 (C_\alpha \bar{Q}_3 + C_\beta Q_3)+\bar{Q}_4+Q_5+\bar{Q}_6) C_\alpha P_{21}+Q_4 Q_5 Q_1 \bar{Q}_2 P_{21}]T$ $\bar{q}_2 = [Q_2(\bar{Q}_4+\bar{Q}_5)P_{21}+\bar{Q}_1 Q_2 P_{21}]T$

*INVENTOR.*
ROBERT E. BIBLE

*BY*

Theodore H. Lassagne

ATTORNEY $$q_3 = [(\bar{Q}_4+\bar{Q}_5)\, Q_1 \bar{Q}_2 A_4 P_{20} + Q_4 Q_5 \bar{Q}_1 \bar{Q}_2 C_\beta A_4 P_{20} + Q_4 Q_5 Q_1 Q_2 C_\beta P_{20} T_2]\, T$$

$$\bar{q}_3 = [(\bar{Q}_4+\bar{Q}_5)\, Q_1 \bar{Q}_2 \bar{A}_4 P_{20} + Q_4 Q_5 \bar{Q}_1 \bar{Q}_2 C_\beta \bar{A}_4 P_{20} + Q_4 Q_5 Q_1 Q_2 \bar{C}_\beta P_{20} T_2]\, T$$

$$q_4 = \bar{Q}_1 Q_2 P_{18} L T$$

$$\bar{q}_4 = \bar{Q}_1 Q_2 P_{18} \bar{L} T$$

$$q_5 = \bar{Q}_1 Q_2 P_{19} L T$$

$$\bar{q}_5 = \bar{Q}_1 Q_2 P_{19} \bar{L} T$$

$$q_6 = \bar{Q}_1 Q_2 P_{20} L T$$

$$\bar{q}_6 = \bar{Q}_1 Q_2 P_{20} \bar{L} T$$

*INVENTOR.*
ROBERT E. BIBLE

*BY* [signature]

ATTORNEY

FIG. 54

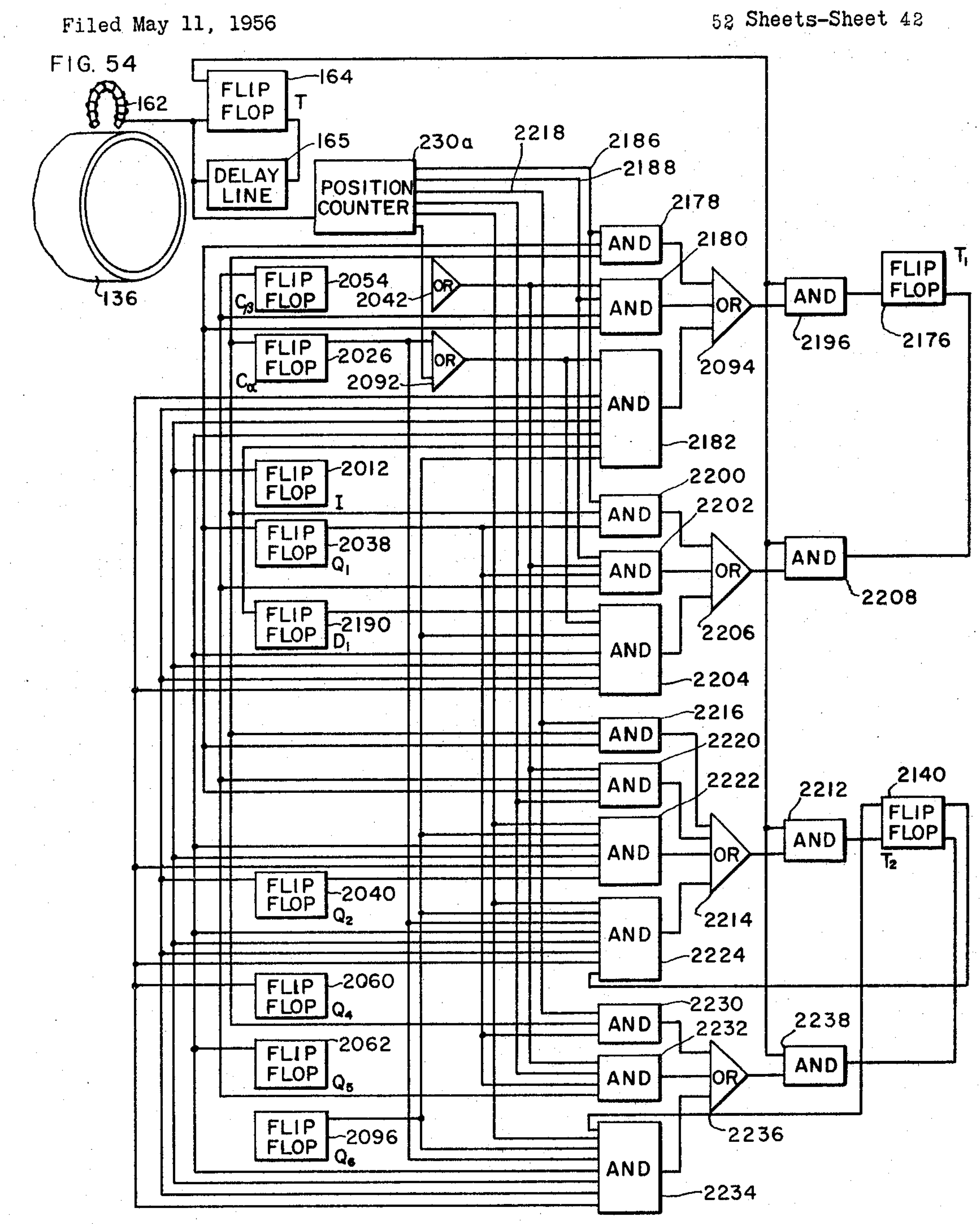

$t_1 = [C\alpha I P_7 + C_\beta I P_{16} (\bar{Q}_1 + \bar{Q}_2) + (P_{1/6} + \bar{C}\alpha) Q_1 Q_2 Q_4 Q_5 \bar{Q}_6 D_1] T$ $\bar{t}_1 = [C\alpha \bar{I} P_7 + C_\beta \bar{I} P_{16} (\bar{Q}_1 + \bar{Q}_2) + (P_{1/6} + \bar{C}\alpha) Q_1 Q_2 Q_4 Q_5 \bar{Q}_6 \bar{D}_1] T$ $t_2 = [C\alpha I P_8 + C_\beta I P_{17} (\bar{Q}_1 + \bar{Q}_2) + Q_1 \bar{Q}_2 Q_4 Q_5 Q_6 P_{21} + Q_1 Q_2 Q_4 Q_5 \bar{Q}_6 \bar{C}\alpha P_{21} \bar{T}_2] T$ $\bar{t}_2 = [C\alpha \bar{I} P_8 + C_\beta \bar{I} P_{17} (\bar{Q}_1 + \bar{Q}_2) + Q_1 Q_2 Q_4 Q_5 \bar{Q}_6 \bar{C}\alpha P_{21} T_2] T$

*INVENTOR.*
ROBERT E. BIBLE

*BY* Theodore A. Lassagne

ATTORNEY

DIGITAL DIFFERENTIAL ANALYZER $L = I_1 \bar{T}_1 \bar{T}_2 + I_2 \bar{T}_2 T_1 + Y T_2 \bar{T}_1 + U T_2 T_1$ $\bar{L} = \bar{I}_1 \bar{T}_1 \bar{T}_2 + \bar{I}_2 \bar{T}_2 T_1 + \bar{Y} T_2 \bar{T}_1 + \bar{U} T_2 T_1$ $i_o = [\bar{Q}_1 Q_2 L + (Q_1 + \bar{Q}_2) I] T$ $\bar{i}_o = [\bar{Q}_1 Q_2 \bar{L} + (Q_1 + \bar{Q}_2) \bar{I}] T$ $d_o = Q_5 Q_4 \bar{Q}_6 Q_1 D_2 T$ $\bar{d}_o = [Q_4 Q_5 \bar{Q}_6 Q_1 \bar{D}_2 + (\bar{Q}_4 + \bar{Q}_1)] T$

INVENTOR.
ROBERT E. BIBLE

BY
[signature]
ATTORNEY $$a_5 = [(\bar{Q}_1+\bar{Q}_2)(\bar{Q}_4+\bar{Q}_5)A_4 + Q_4Q_5Q_1Q_2C_\beta(\bar{T}_2+\bar{P}_{20}+Q_6) + \bar{Q}_4Q_5\bar{Q}_6Q_1\bar{Q}_2L + \bar{Q}_4\bar{Q}_5\bar{Q}_6Q_1\bar{Q}_2A_6]T$$

$$\bar{a}_5 = [(\bar{Q}_1+\bar{Q}_2)(\bar{Q}_4+\bar{Q}_5)\bar{A}_4 + Q_4Q_5Q_1Q_2\bar{C}_\beta + \bar{Q}_4Q_5\bar{Q}_6Q_1\bar{Q}_2\bar{L} + \bar{Q}_4\bar{Q}_5\bar{Q}_6Q_1\bar{Q}_2\bar{A}_6 + Q_4Q_5\bar{Q}_6\bar{Q}_1\bar{Q}_2C_\beta P_{24/21} + Q_4Q_5\bar{Q}_6Q_1\bar{Q}_2 + Q_4Q_5\bar{Q}_6Q_1Q_2T_2P_{20}]T$$

INVENTOR.
ROBERT E. BIBLE
BY
Theodore H. Lassagne
ATTORNEY $$d_2=[Q_1Q_2Q_4Q_5\overline{T}_2D_1+Q_1Q_2Q_4Q_5T_2T_1\overline{D}_1+(\overline{Q}_4Q_5Q_6+Q_4Q_5\overline{Q}_6)Q_1\overline{Q}_2L]T$$

$$\overline{d}_2=[Q_1Q_2Q_4Q_5\overline{T}_2\overline{D}_1P_{1/20}+Q_1Q_2Q_4Q_5T_2\overline{T}_1\overline{D}_1+(\overline{Q}_4Q_5Q_6+Q_4Q_5\overline{Q}_6)Q_1\overline{Q}_2\overline{L}]T$$

*INVENTOR.*
ROBERT E. BIBLE
*BY* Theodore H. Lassagne
ATTORNEY $$C_4=[Q_4Q_5\bar{Q}_6Q_1Q_2A_5D_2+\bar{Q}_4Q_5Q_6Q_1\bar{Q}_2A_2D_2+Q_4Q_5\bar{Q}_6Q_1\bar{Q}_2Q_3D_2+Q_4\bar{Q}_5\bar{Q}_6Q_1\bar{Q}_2A_5]T$$

$$\bar{C}_4=[Q_4Q_5\bar{Q}_6Q_1Q_2\bar{A}_5\bar{D}_2+\bar{Q}_4Q_5Q_6Q_1\bar{Q}_2\bar{A}_2\bar{D}_2+Q_1\bar{Q}_2(\bar{Q}_4+\bar{Q}_5+Q_6)P_{21}+\bar{Q}_1]T$$

*INVENTOR.*
ROBERT E. BIBLE

*BY*
Theodore H. Lassagne
ATTORNEY $$a_o = \{[Q_4 Q_5 \bar{Q}_6 Q_1 Q_3 (\bar{T}_2 + D_2) + \bar{Q}_4 Q_5 Q_6 Q_1 \bar{Q}_2][D_2 \bar{A}_5 \bar{C}_4 + \bar{D}_2 \bar{A}_5 C_4 + \bar{D}_2 A_5 \bar{C}_4 + D_2 A_5 C_4] + Q_4 \bar{Q}_5 \bar{Q}_6 Q_1 \bar{Q}_2 (\bar{A}_5 C_4 + A_5 \bar{C}_4) + Q_4 Q_5 \bar{Q}_6 Q_1 Q_2 T_2 \bar{D}_2 A_2\} T$$

*INVENTOR.*
ROBERT E. BIBLE
*BY*
Theodore H. Lassagne
ATTORNEY

April 11, 1967 R. E. BIBLE 3,313,925

DIGITAL DIFFERENTIAL ANALYZER

Filed May 11, 1956 52 Sheets-Sheet 48

$$\bar{a}_0 = \{[Q_4 Q_5 \bar{Q}_6 Q_1 Q_3 (\bar{T}_2 + D_2) + \bar{Q}_4 Q_5 Q_6 Q_1 \bar{Q}_2][D_2 A_5 \bar{C}_4 + D_2 \bar{A}_5 C_4 + \bar{D}_2 A_5 C_4 + \bar{D}_2 \bar{A}_5 \bar{C}_4] + Q_4 \bar{Q}_5 \bar{Q}_6 Q_1 \bar{Q}_2 (A_5 C_4 + \bar{A}_5 \bar{C}_4) + Q_4 Q_5 \bar{Q}_6 Q_1 Q_2 T_2 \bar{D}_2 \bar{A}_5 + Q_4 Q_5 \bar{Q}_6 Q_1 \bar{Q}_2 \bar{Q}_3\} T$$

*INVENTOR.*
ROBERT E. BIBLE

*BY* [signature]

ATTORNEY

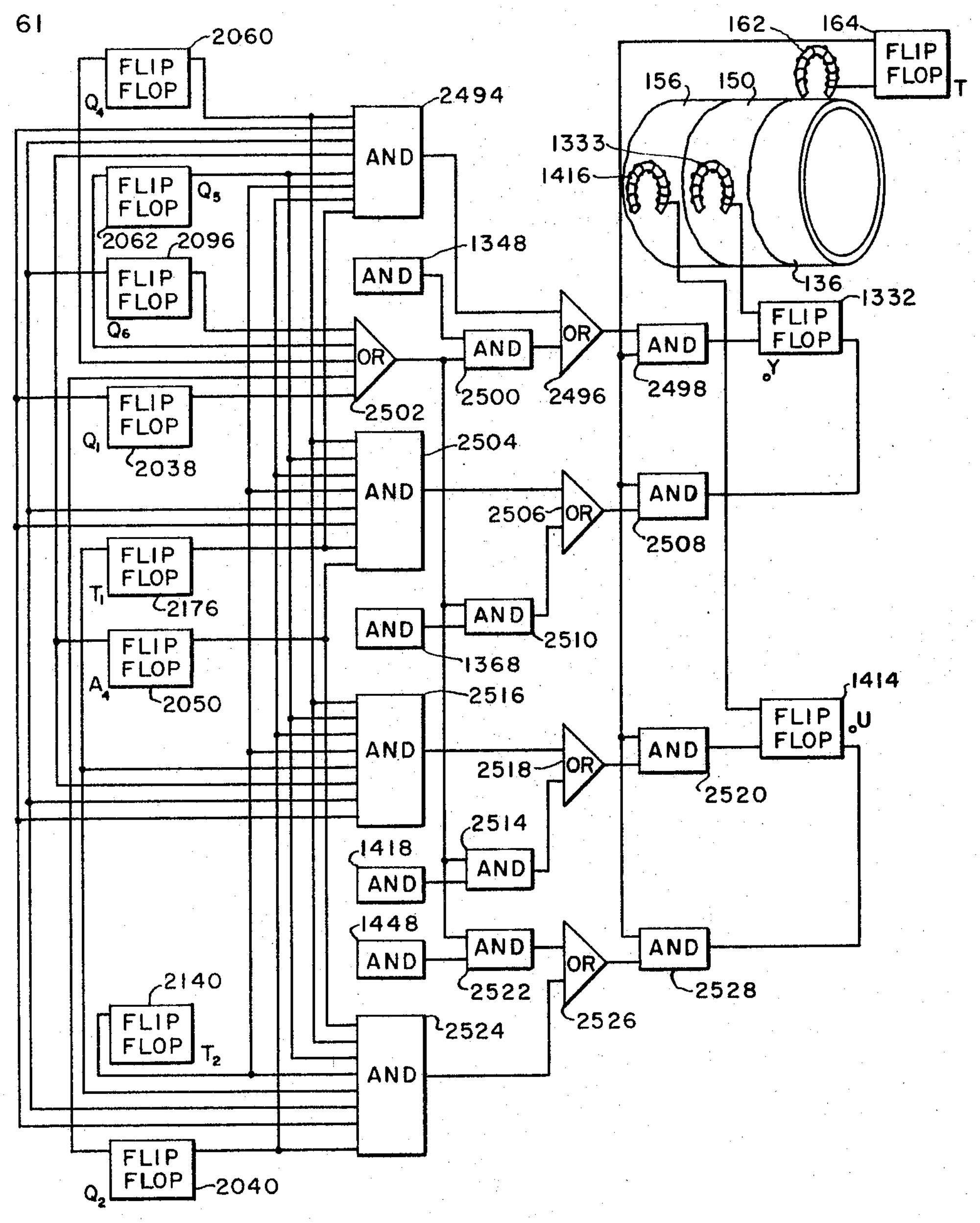
FIG. 61

$y_0 = [\bar{Q}_4\bar{Q}_5Q_6Q_1\bar{Q}_2T_2\bar{T}_1A_4 + (Q_4+Q_5+\bar{Q}_6+\bar{Q}_1+Q_2)$ (INCREMENTAL LOGIC FOR $y_0$ IN FIGURE 26)$]T$ $\bar{y}_0 = [\bar{Q}_4\bar{Q}_5Q_6Q_1\bar{Q}_2T_2\bar{T}_1\bar{A}_4 + (Q_4+Q_5+\bar{Q}_6+\bar{Q}_1+Q_2)$ (INCREMENTAL LOGIC FOR $\bar{y}_0$ IN FIGURE 26)$]T$ $u_0 = [\bar{Q}_4\bar{Q}_5Q_6Q_1\bar{Q}_2T_2T_1A_4 + (Q_4+Q_5+\bar{Q}_6+\bar{Q}_1+Q_2)$ (INCREMENTAL LOGIC FOR $u_0$ IN FIGURE 28)$]T$ $\bar{u}_0 = [\bar{Q}_4\bar{Q}_5Q_6Q_1\bar{Q}_2T_2T_1\bar{A}_4 + (Q_4+Q_5+\bar{Q}_6+\bar{Q}_1+Q_2)$ (INCREMENTAL LOGIC FOR $\bar{u}_0$ IN FIGURE 28)$]T$

*INVENTOR.*
ROBERT E. BIBLE
*BY*
Theodore H. Lassagne
ATTORNEY

| Example | Step | Multiplier digit | Accumulator | Multiplicand | Result |
|---|---|---|---|---|---|
| (+)0.01 | 1 | 0 | 000 | 001 = | 000 |
| (+)0.11x | 2 | 1 | 0000 + | 0001 = | 0001 |
| (+)0.0011 | 3 | 1 | 00010 + | 00001 = | 0.0011 |
| (-)1.01 | 1 | 1 | 0.00 - | 101 = | 0.11 |
| (-)1.11x | 2 | 1 | 0.110 + | 1101 = | 0.011 |
| (+)0.0011 | 3 | 1 | 0.0110 + | 11101 = | 0.0011 |
| (-)1.01 | 1 | 0 | 000 | | 000 |
| (+)0.01x | 2 | 0 | 0000 | | 0000 |
| (-)1.1101 | 3 | 0 | 00000 + | 11101 = | 1.1101 |
| (+)0.11 | 1 | 1 | 0.00 - | 011 = | 1.01 |
| (-)1.11 | 2 | 1 | 1.010 + | 0011 = | 1.101 |
| (-)1.1101 | 3 | 1 | 1.1010 + | 00011 = | 1.1101 |

INVENTOR:
Robert E. Bible

By Theodore H. Lassagne
Attorney

Fig. 64a

| Block | Pulse Time | $D_2$ | D Register | $C_\beta$ | $Q_3$ | $A_5$ | A Register |
|---|---|---|---|---|---|---|---|
| $n$ | $p_1$ | 0 | 00000 | x | x | $b_3$ | 000xx |
| | $p_2$ | 0 | 00000 | x | x | $b_2$ | $b_3$000x |
| | $p_3$ | 0 | 00000 | x | x | $b_1$ | $b_2b_3$000 |
| $n+1$ | $p_1$ | 0 | 00000 | x | x | 0 | $b_1b_2b_3$00 |
| | $p_2$ | 0 | 00000 | x | x | - | 0$b_1b_2b_3$0 |
| | $p_3$ | 0 | 00000 | x | x | - | 00$b_1b_2b_3$ |
| $n+2$ | $p_1$ | 0 | 00000 | x | x | $b_3$ | 000$b_1b_2$ |
| | $p_2$ | 0 | 00000 | x | x | $b_2$ | $b_3$000$b_1$ |
| | $p_3$ | 0 | 00000 | x | $b_1$ | $b_1$ | $b_2b_3$000 |
| $n+2m-1$ | $p_1$ | 0 | 00000 | x | $b_1$ | 0 | $b_1b_2b_3$00 |
| | $p_2$ | 0 | 00000 | x | $b_1$ | 0 | 0$b_1b_2b_3$0 |
| | $p_3$ | 0 | 00000 | x | 0 | 0 | 00$b_1b_2b_3$ |
| $n+2m = \beta$ | $p_1$ | 0 | 00000 | x | 0 | $b_3$ | 000$b_1b_2$ |
| | $p_2$ | 0 | 00000 | x | 0 | $b_2$ | $b_3$000$b_1$ |
| | $p_3$ | 0 | 00000 | x | $b_1$ | 0 | $b_2b_3$000 |
| $\beta+1$ | $p_1$ | $d_3$ | 00000 | 0 | $b_1$ | 0 | 0$b_2b_3$00 |
| | $p_2$ | $d_2$ | $d_3$0000 | 0 | $b_1$ | 0 | $a_3$0$b_2b_3$0 |
| | $p_3$ | $d_1$ | $d_2d_3$000 | 0 | $b_1$ | 0 | $a_2a_3$0$b_2b_3$ |
| $\beta+2$ | $p_1$ | 0 | $d_1d_2d_3$00 | $b_3$ | $b_1$ | 0 | $a_1a_2a_3$0$b_2$ |
| | $p_2$ | 0 | 0$d_1d_2d_3$0 | $b_2$ | $b_1$ | $b_3$ | 0$a_1a_2a_3$0 |
| | $p_3$ | 0 | 00$d_1d_2d_3$ | 0 | $b_2$ | 0 | $b_3$0$a_1a_2a_3$ |

INVENTOR:
Robert E. Bible
By Theodore H. Lassagne
Attorney

April 11, 1967 R. E. BIBLE 3,313,925

DIGITAL DIFFERENTIAL ANALYZER

Filed May 11, 1956 52 Sheets-Sheet 52

Fig. 64b

| Block | Pulse Time | $D_2$ | D Register | $C_\beta$ | $Q_3$ | $A_5$ | A Register |
|---|---|---|---|---|---|---|---|
| $\beta+3$ | $P_1$ | $d_3$ | $000d_1d_2$ | $a_3$ | $b_2$ | 0 | $0b_30a_1a_2$ |
| | $P_2$ | $d_2$ | $d_3000d_1$ | $a_2$ | $b_2$ | $a_3$ | $a_40b_30a_1$ |
| | $P_3$ | $d_1$ | $d_2d_3000$ | $a_1$ | $b_2$ | $a_2$ | $a_3a_40b_30$ |
| $\beta+4$ | $P_1$ | $d_1'$ | $d_1d_2d_300$ | 0 | $b_2$ | $a_1$ | $a_2a_3a_40b_3$ |
| | $P_2$ | 0 | $d_1'd_1d_2d_30$ | $b_3$ | $b_2$ | 0 | $a_1a_2a_3a_40$ |
| | $P_3$ | 0 | $0d_1'd_1d_2d_3$ | 0 | $b_3$ | 0 | $0a_1a_2a_3a_4$ |
| $\beta+5$ | $P_1$ | $d_3$ | $00d_1'd_1d_2$ | $a_4$ | $b_3$ | 0 | $00a_1a_2a_3$ |
| | $P_2$ | $d_2$ | $d_300d_1'd_1$ | $a_3$ | $b_3$ | $a_4$ | $a_500a_1a_2$ |
| | $P_3$ | $d_1$ | $d_2d_300d_1'$ | $a_2$ | $b_3$ | $a_3$ | $a_4a_500a_1$ |
| $\beta+6$ | $P_1$ | $d_1'$ | $d_1d_2d_300$ | $a_1$ | $b_3$ | $a_2$ | $a_3a_4a_500$ |
| | $P_2$ | $d_1''$ | $d_1'd_1d_2d_3$ | 0 | $b_3$ | $a_1$ | $a_2a_3a_4a_50$ |
| | $P_3$ | 0 | $d_1''d_1'd_1d_2d_3$ | 0 | 0 | 0 | $a_1a_2a_3a_4a_5$ |
| $\beta+7$ | $P_1$ | $d_3$ | $0d_1''d_1'd_1d_2$ | $a_5$ | 0 | 0 | $0a_1a_2a_3a_4$ |
| | $P_2$ | $d_2$ | $d_30d_1''d_1'd_1$ | $a_4$ | 0 | $a_5$ | $00a_1a_2a_3$ |
| | $P_3$ | $d_1$ | $d_2d_30d_1''d_1'$ | $a_3$ | 0 | $a_4$ | $a_500a_1a_2$ |
| $\beta+8$ $=\alpha$ | $P_1$ | $d_1'$ | $d_1d_2d_30d_1''$ | $a_2$ | 0 | $a_3$ | $a_4a_500a_1$ |
| | $P_2$ | $d_1''$ | $d_1'd_1d_2d_30$ | $a_1$ | 0 | $a_2$ | $a_3a_4a_500$ |
| | $P_3$ | 0 | $d_1''d_1'd_1d_2d_3$ | 0 | 0 | $a_1$ | $a_2a_3a_4a_50$ |
| $\beta+9$ $=\alpha+1$ | $P_1$ | 0 | $0d_1''d_1'd_1d_2$ | $x$ | 0 | 0 | $a_1a_2a_3a_4a_5$ |
| | $P_2$ | 0 | $00d_1''d_1'd_1$ | $x$ | 0 | $a_5$ | $0a_1a_2a_3a_4$ |
| | $P_3$ | 0 | $000d_1''d_1'$ | $x$ | 0 | $a_4$ | $a_50a_1a_2a_3$ |

INVENTOR:
Robert E. Bible

By Theodore H. Lassagne
Attorney

United States Patent Office 3,313,925

Patented Apr. 11, 1967

3,313,925

DIGITAL DIFFERENTIAL ANALYZER

Robert E. Bible, Burbank, Calif., assignor to General Precision Inc., a corporation of Delaware Filed May 11, 1956, Ser. No. 586,342
7 Claims. (Cl. 235—150.31)

| Topic | Column |
|---|---|
| General Discussion | 1 |
| Flip-Flop Construction and Operation | 4 |
| Construction and Operation of "And" and "Or" Networks | 6 |
| Digital Differential Analyzer: | |
| Construction of the Digital Differential Analyzer | 7 |
| Clock Channel and System of Reading and Recording Signals on the Drum | 34 |
| Position and Block Counters | 35 |
| Schematic Presentation of the Digital Differential Analyzer | 40 |
| The Production of ΔX and ΔY Increments | 43 |
| The Combination of Y and ΔY | 49 |
| The Combination of YΔX and R | 55 |
| Recording of Overflow Information in the Z Channel 138 | 64 |
| Coding For Using Information in Z Channel to Control the Production of ΔX and ΔY Increments | 70 |
| Product Operation | 83 |
| Double-Length Product | 99 |
| Double-Length Special Products | 107 |
| Extrapolation | 118 |
| Servo Operation | 125 |
| Determination of Σ*d*U Increments for a Servo Operation | 126 |
| Storage and Stepping of *d*U Increments for a Servo Operation | 130 |
| Determination of Error Signals $\varepsilon - U_n \pm M$ | 133 |
| Analogue-to-Digital Conversion of Error Signals From Servos | 140 |
| $H_1$, $H_2$ and $H_3$ Servos | 145 |
| Zero-Rate Servos | 151 |
| Short-Length Servos | 156 |
| Sub-Filling | 158 |
| Digital Computer: | |
| Construction | 166 |
| Instructions | 180 |
| Transfer of Information From a Track | 194 |
| Sum of Two Numbers | 197 |
| Complementation | 200 |
| Shifting of Information | 205 |
| Multiplication | 207 |
| Transfer of Information Back Into a Track | 228 |

GENERAL DISCUSSION

This invention relates to digital computers. More particularly, the invention relates to a combination of a digital differential analyzer and a digital computer for performing operations not capable of being performed easily by either analyzer or the computer alone.

In recent years, a whole new field of computation has been made possible. In this field, computations of complex mathematical problems are obtained automatically and in relatively short periods of time in comparison to the laborious processes required to obtain mathematical solutions mentally and manually. The new field of computation has been opened up because of the vast strides which have been made in electronic techniques and circuitry for solving the problems.

Various types of computers have been built in recent years. In general, these computers may be classified into two categories. One type of computer indicates values on an incremental basis such that various numbers are indicated by combinations of signals in a plurality of digital positions. For example, a decimal value such as "57" may be indicated in binary form as 111001, where the least significant digit is at the right. Computers indicating different values by various combinations of signal indications are known as "digital computers." These computers have the advantage of obtaining accurate solutions to problems in a short time.

Other computers operate on whole values rather than breaking numbers down into a plurality of different signal indications. For example, a value such as "57" may be indicated by a single potential of 57 volts. These computers are known as "analogue computers." They have the advantage of being small and compact but they do not solve problems with the accuracies obtained from the digital machines. Analogue machines for solving differential equations are known as differential analyzers.

Relatively recently, the digital computer and differential analyzer were combined to obtain a machine having the advantages of both in obtaining the solution of differential equations. This type of computer is known as a "digital differential analyzer." It solves differential equations on a digital basis and requires relatively little equipment and a relatively short time to obtain accurate solutions.

The digital differential analyzers now in use have a plurality of blocks which are sequentially presented for computation. In each cycle of computation, the output from particular blocks controls the variations which are made in the quantities for other blocks. The particular interrelationship between the quantities in the different blocks is dependent upon the particular problem being solved.

Since the output from certain blocks in each cycle of computation controls the variations in the quantities of other blocks, it is difficult to obtain instantaneous results of certain operations. For example, certain blocks may be interrelated to obtain the product of two numbers. Because of the interrelationship between blocks, the final product is not obtained until the computation has been completed. This is disadvantageous at times since it may be desired to perform certain arithmetical operations such as multiplication and to obtain the results quickly. It is also disadvantageous since a number of blocks are required to perform such arithmetical operations as multiplication.

This invention provides a combination of a digital differential analyzer and a digital computer. The digital differential analyzer is adapted to provide a plurality of blocks which are so interrelated as to solve differential problems on a digital basis. The digital computer is adapted to operate in synchronization with the digital differential analyzer. As a result of such synchronous operation, the digital computer is able to receive particular information from the digital differential analyzer and to perform particular arithmetical operations on the received information.

The particular arithmetical operations performed by the digital computer include addition, complementation, multiplication and shifting of the digital information. The particular arithmetical operations are performed by the digital computer in one cycle of computation. The digital indications representing the results of the arithmetical operations are then inserted into specified blocks in the digital differential analyzer to serve as particular quantities in the analyzer in connection with the solution of the differential equations by the analyzer.

Figure 4:
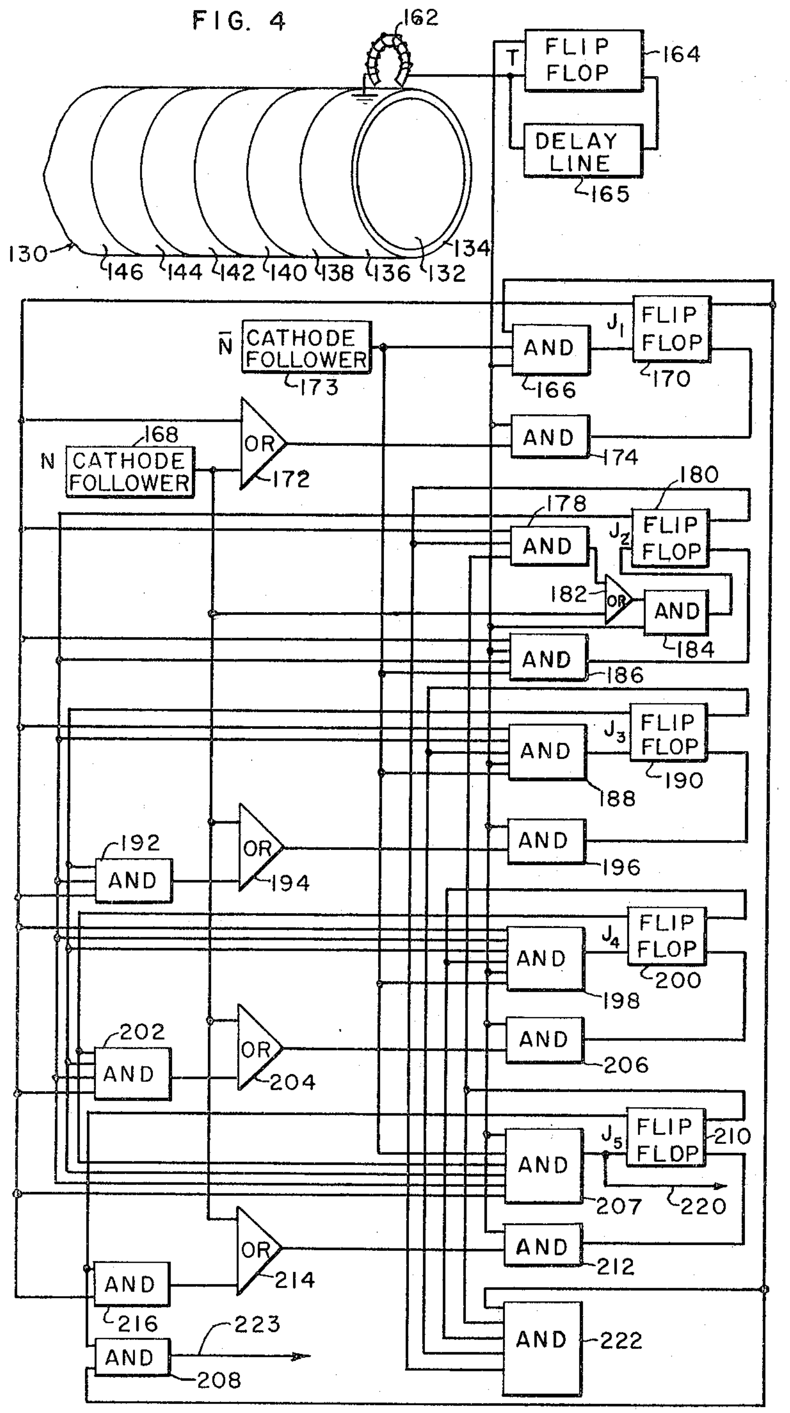
Figure 30:
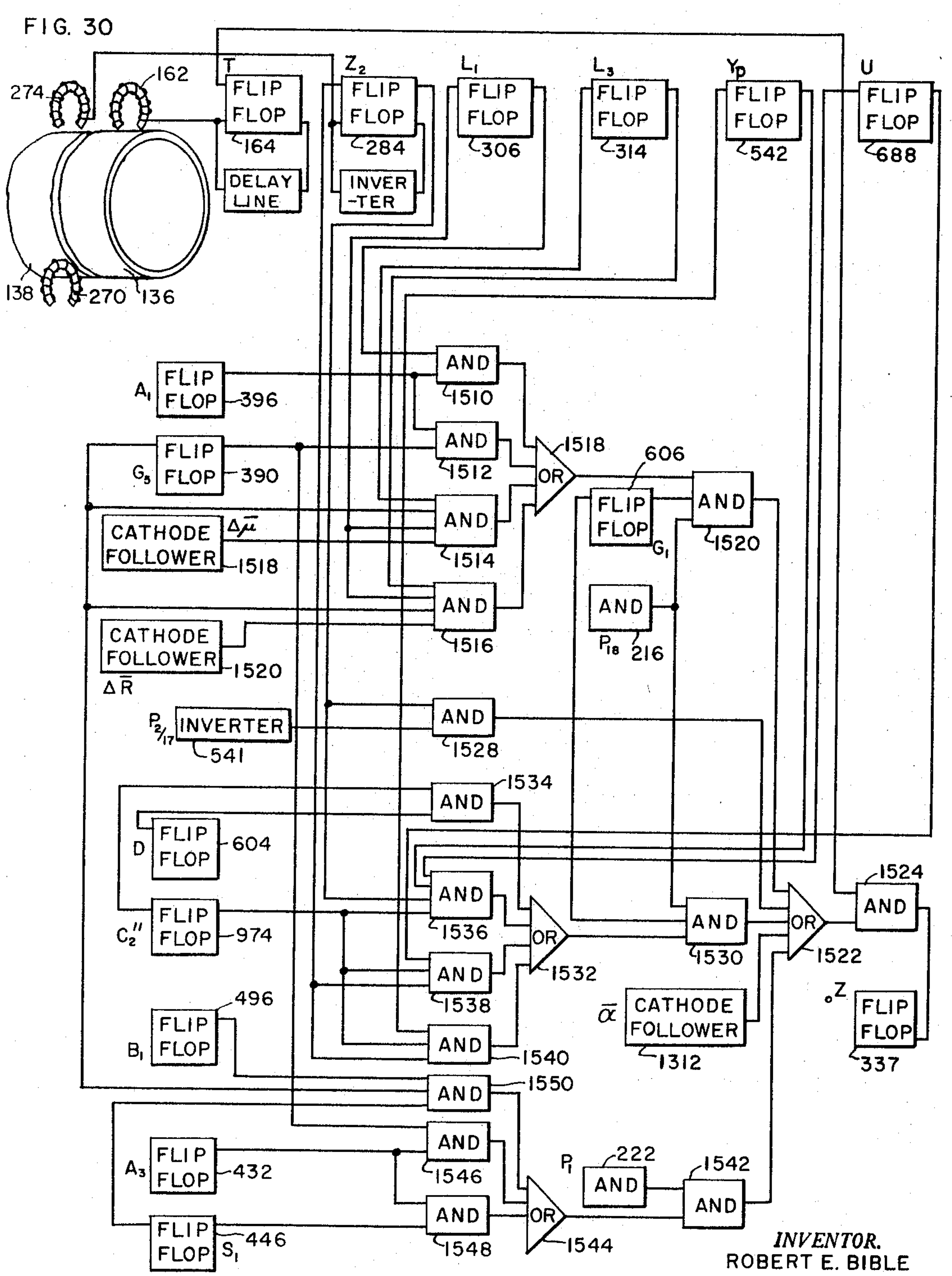
Figures 31, 32:
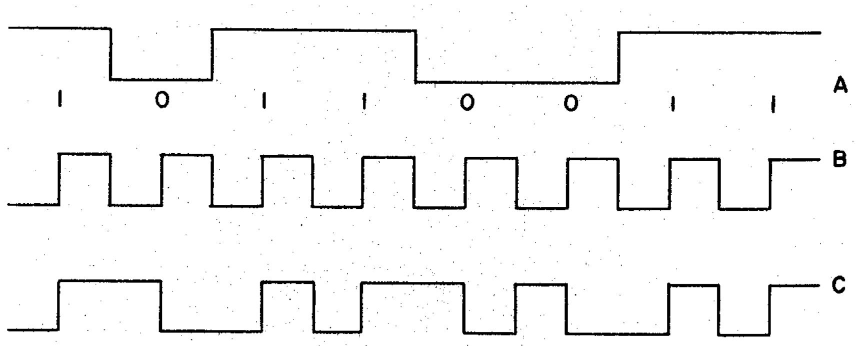
Figures 33, 34:
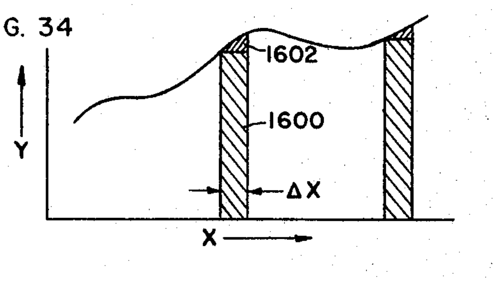

FIGURES 4 to 30, inclusive, are circuit diagrams illustrating in block form various portions of a digital differential analyzer forming a part of this invention;

FIGURE 31 shows a number of curves illustrating the operation of the digital differential analyzer represented in block form in FIGURES 4 to 30, inclusive, when the digital differential analyzer is used with a particular type of reading and recording system;

FIGURE 32 is a table illustrating the operation of the stages shown in FIGURE 4 in counting a plurality of numbers on a cyclic basis;

FIGURE 33 is a table illustrating the operation of the stages shown in FIGURE 5 in counting the number of times that the stages shown in FIGURE 4 complete a count and resume a new count;

FIGURE 34 is a curve somewhat schematically illustrating the operation of the digital differential analyzer in solving a differential equation on a digital basis;

FIGURE 35 is a block diagram somewhat schematically illustrating the inter-relationship between a plurality of blocks when the blocks are programmed to solve a particular problem.

Figure 16:
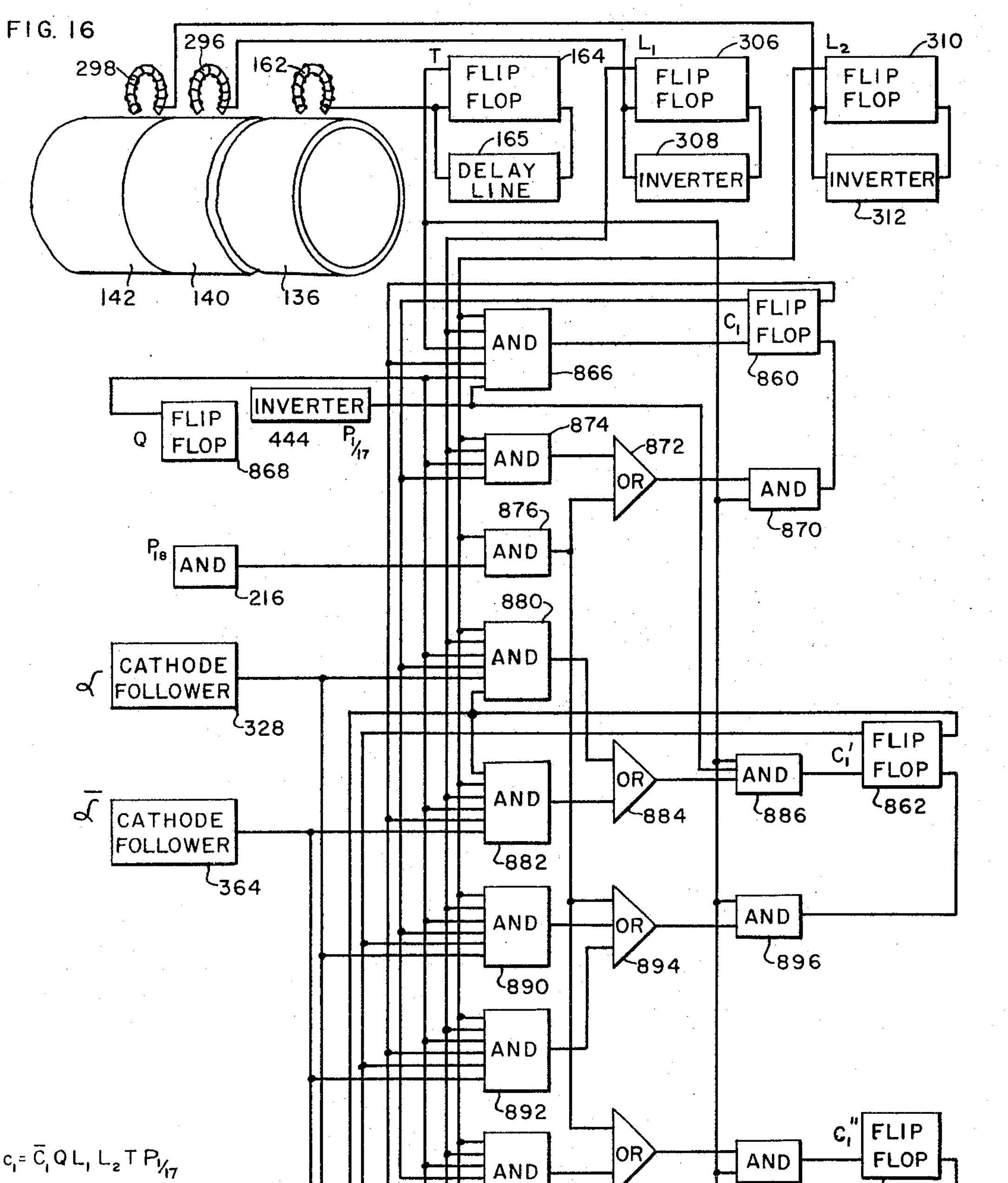
Figure 18:
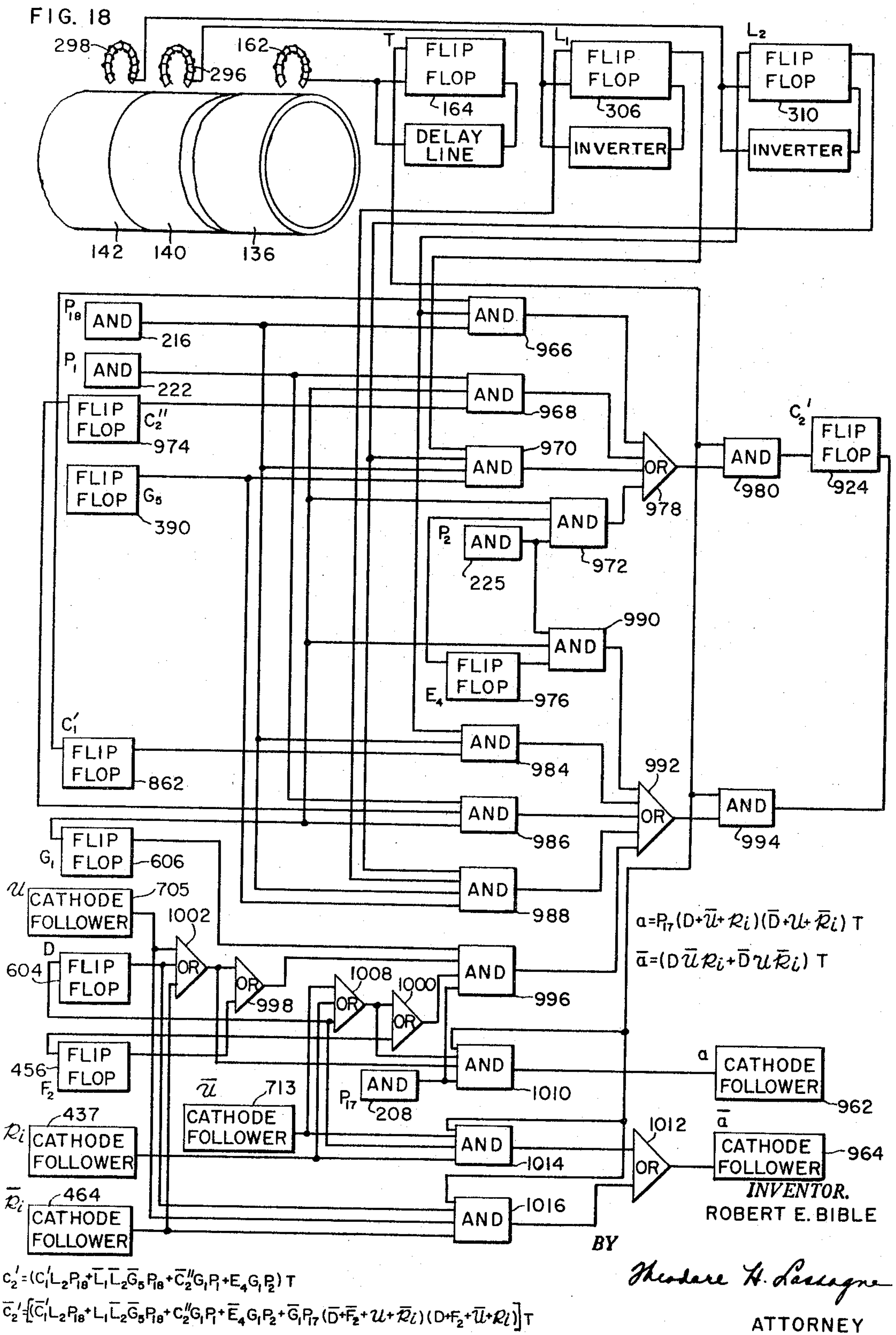
Figure 21:
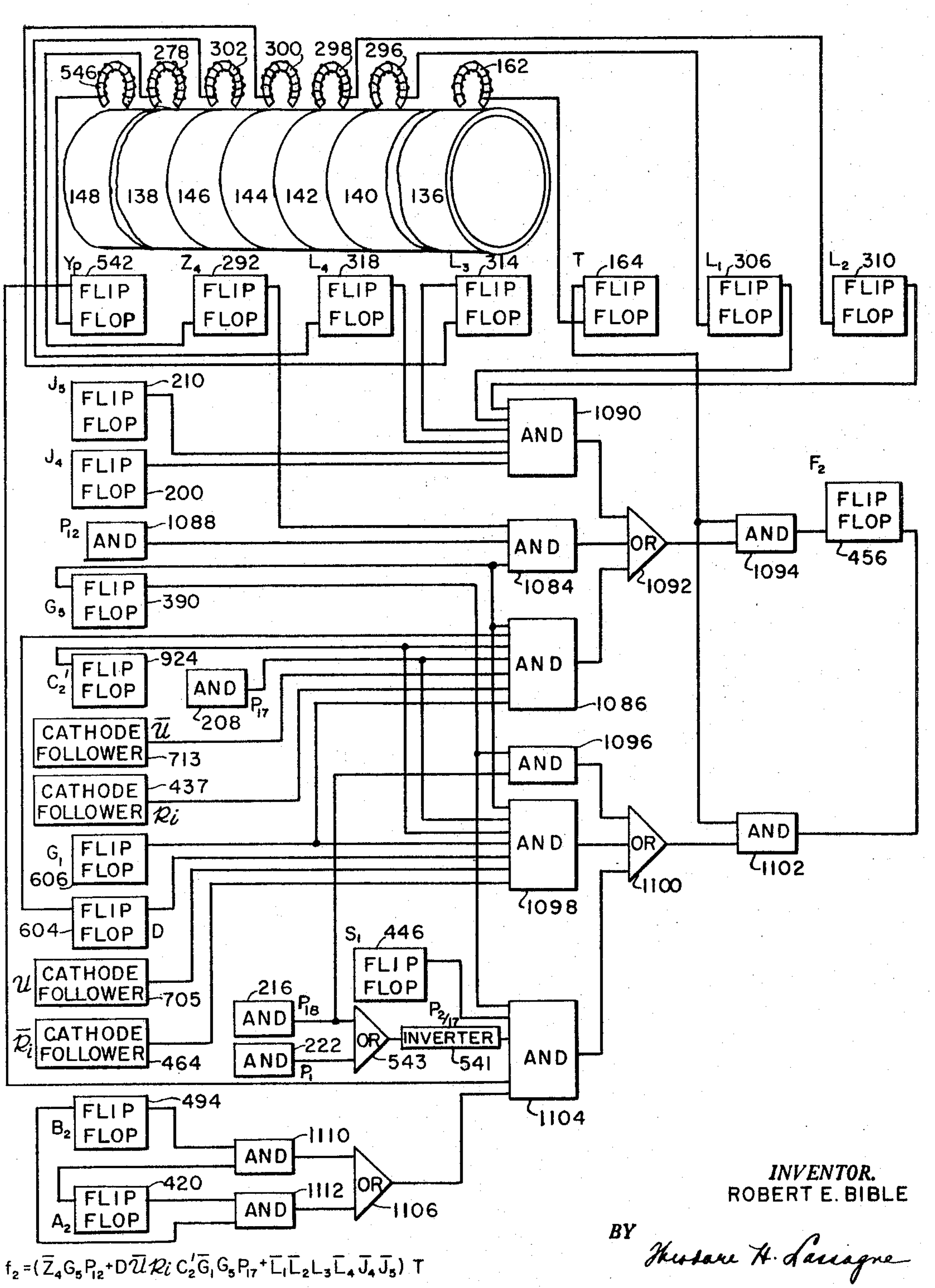
Figure 22:
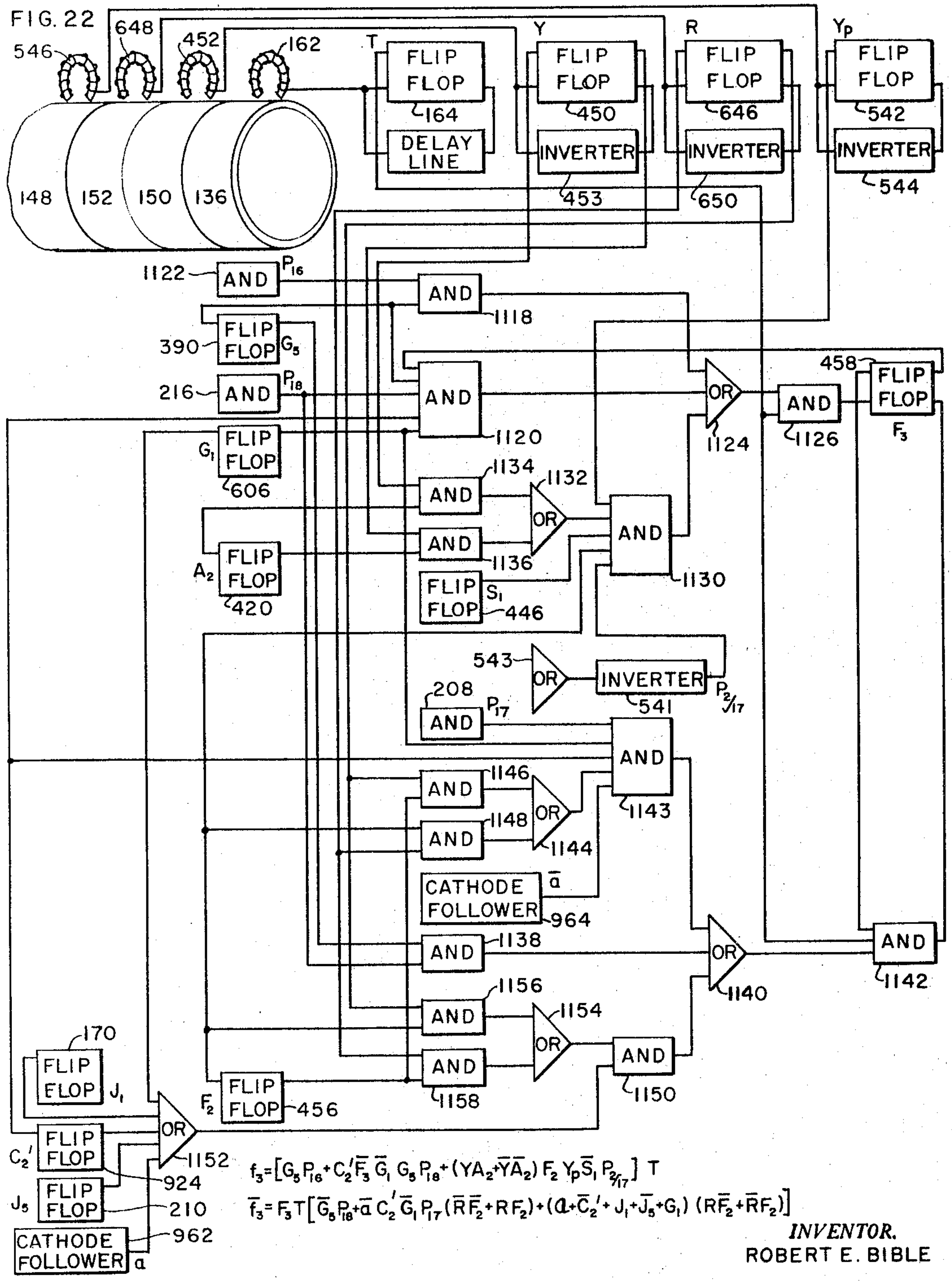
Figure 23:
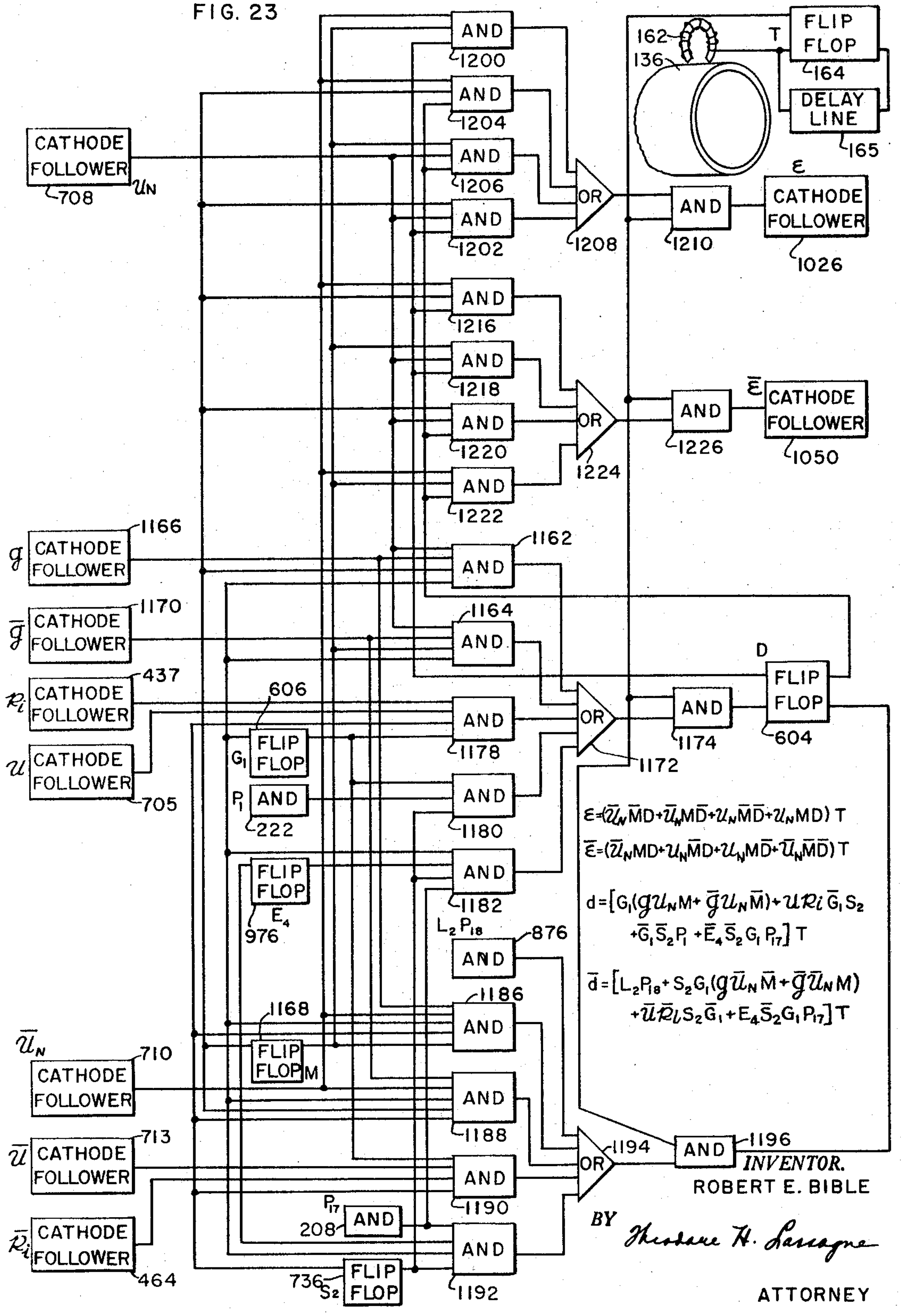
Figure 24:
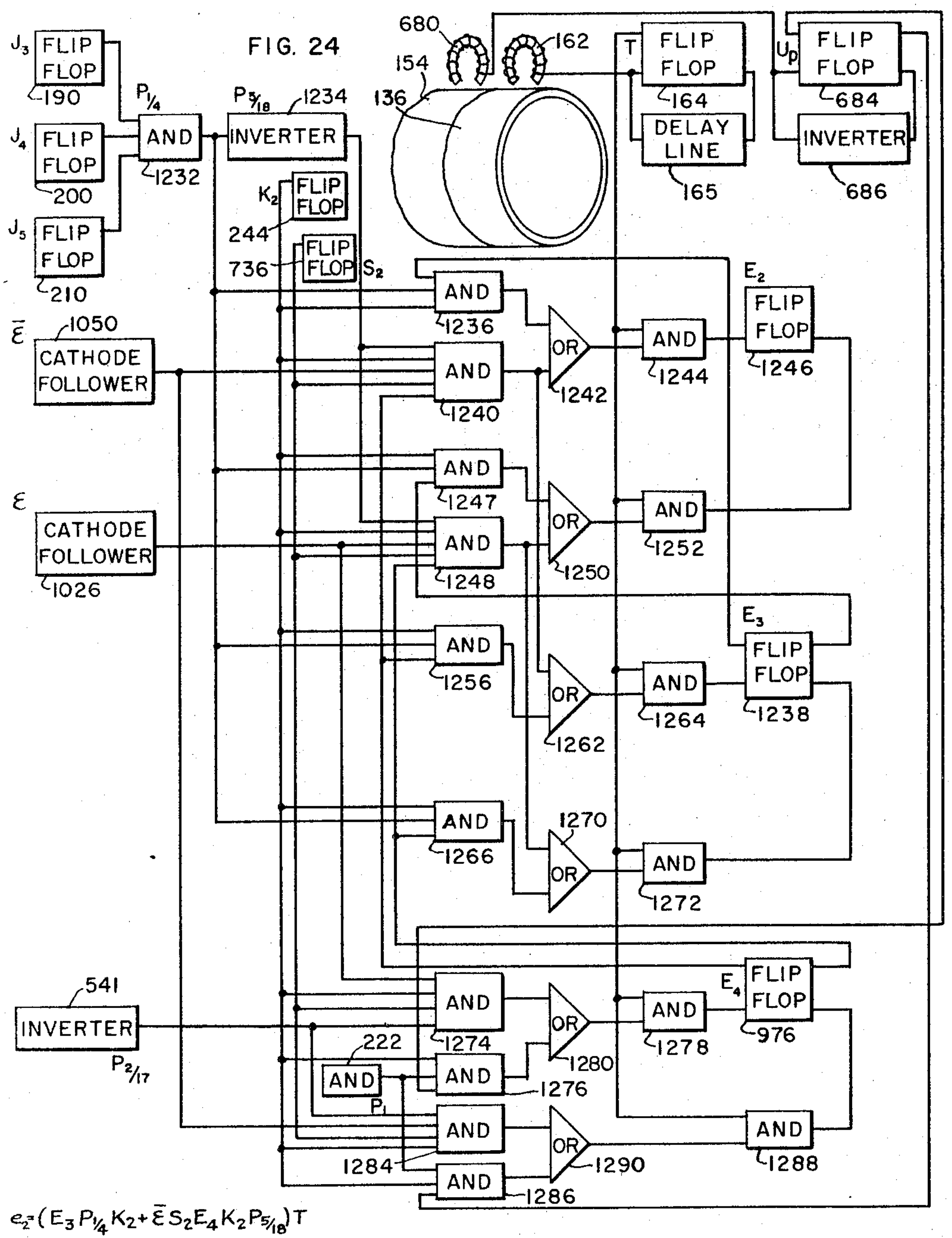
Figure 40:
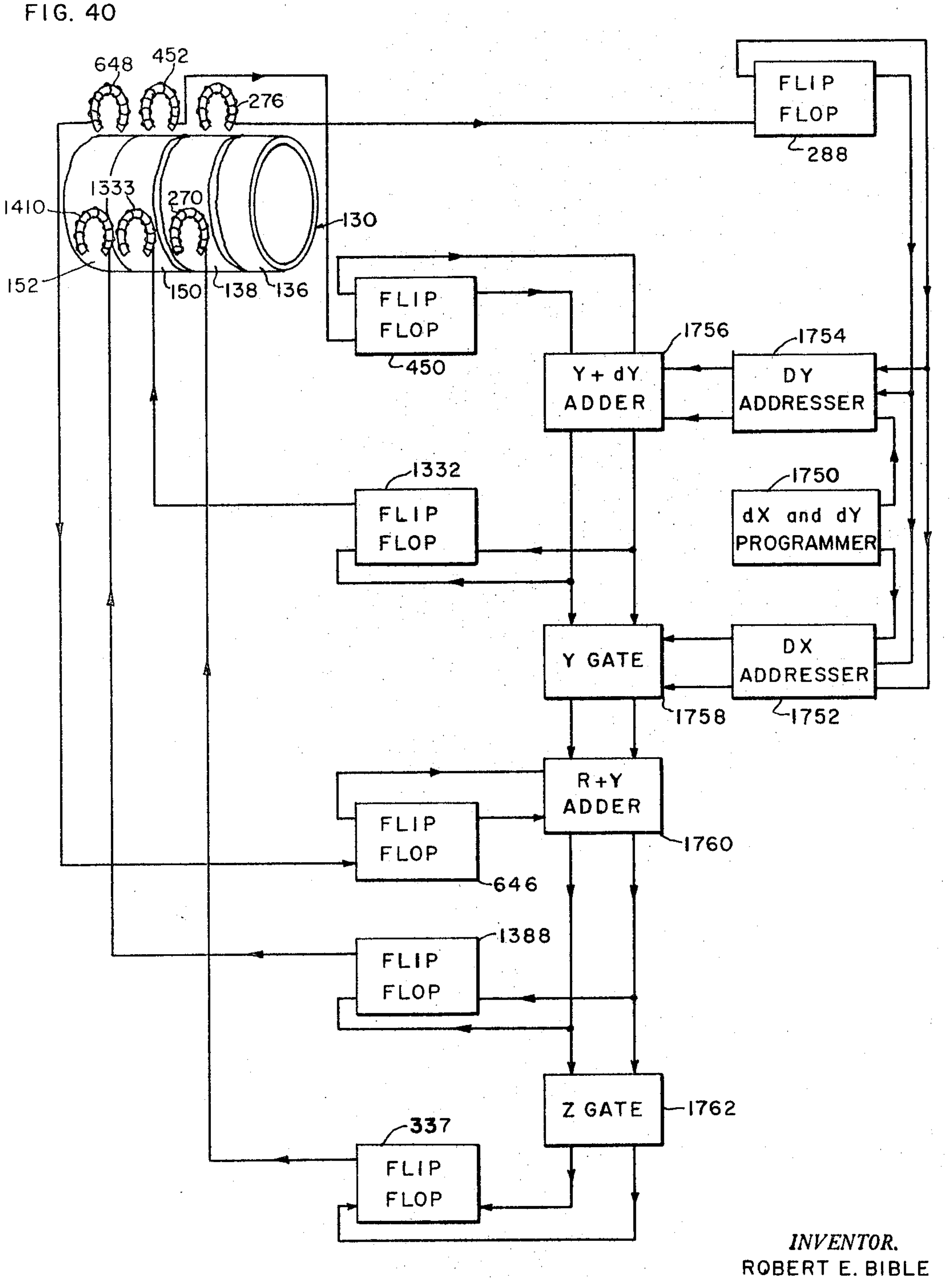
Figure 41:
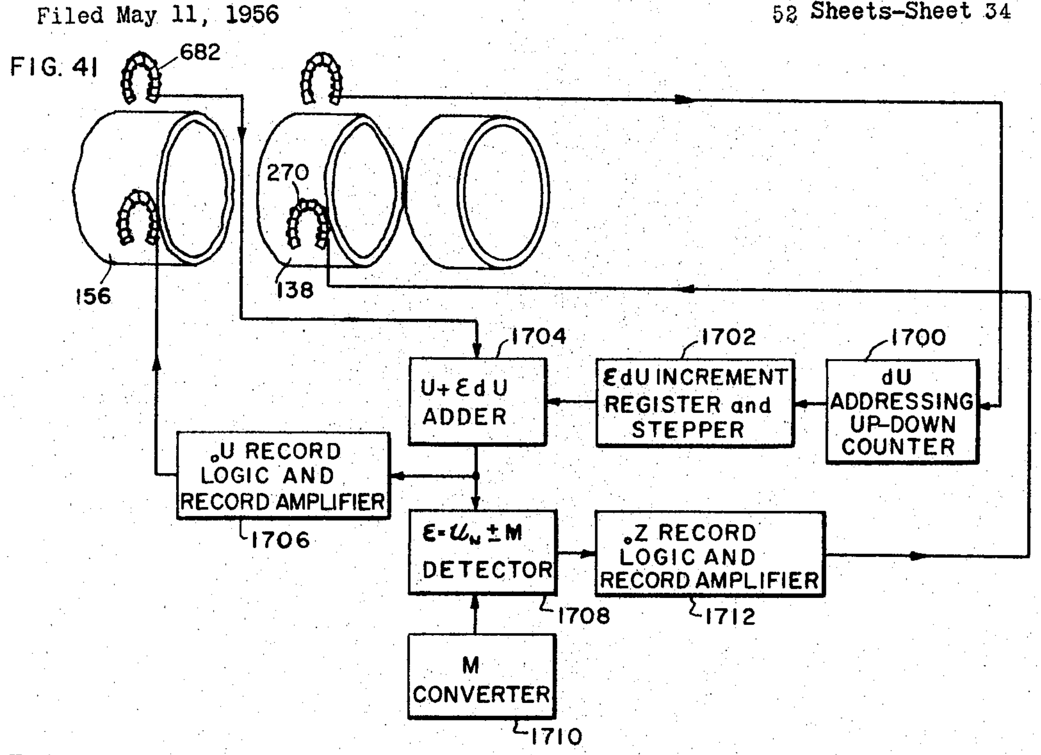
Figure 42:
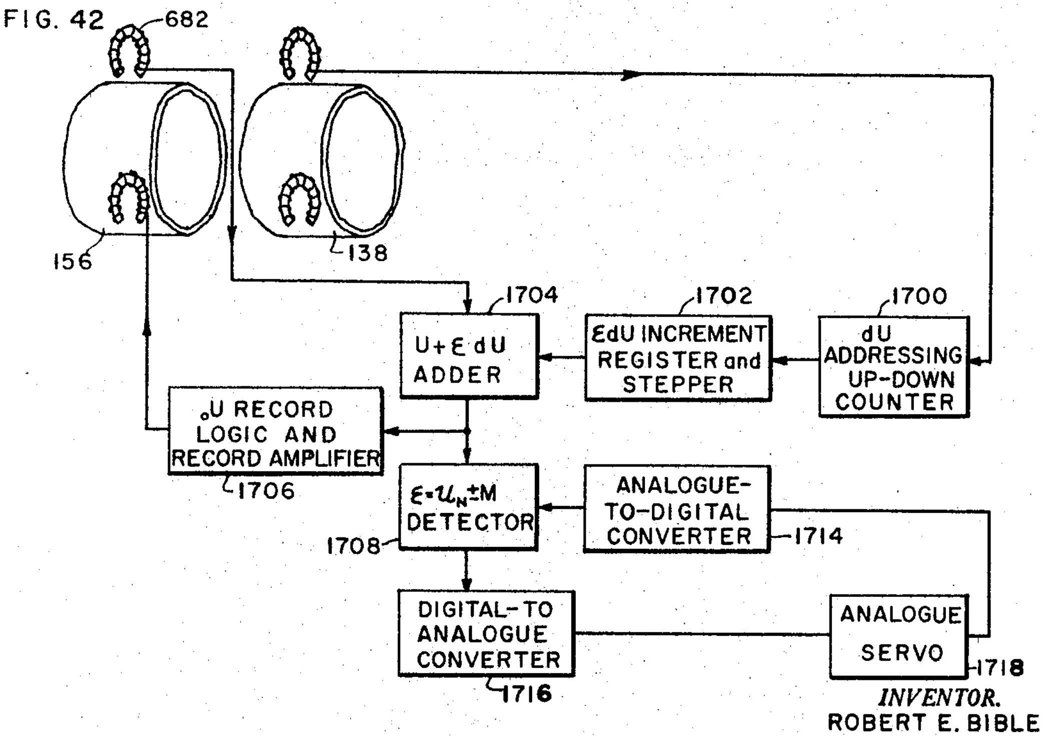
Figures 43, 45:
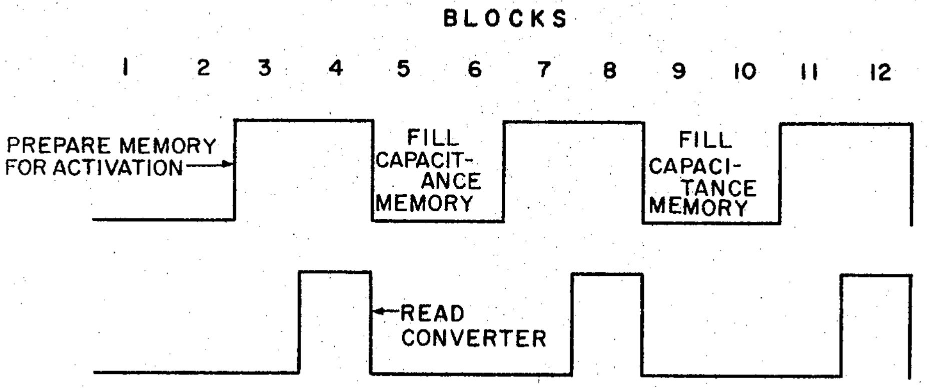
Figures 49, 50:
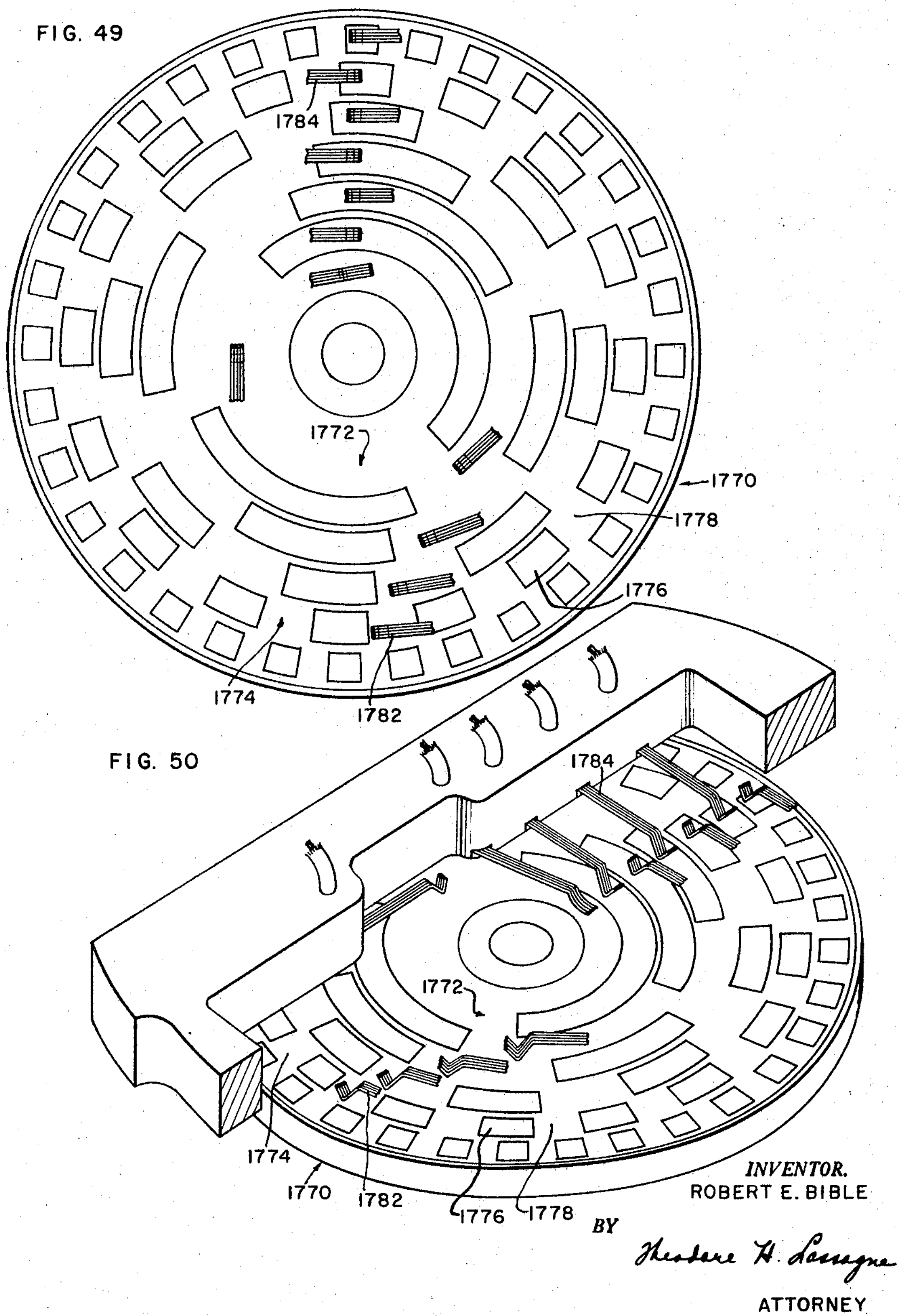
Figures 62, 63:
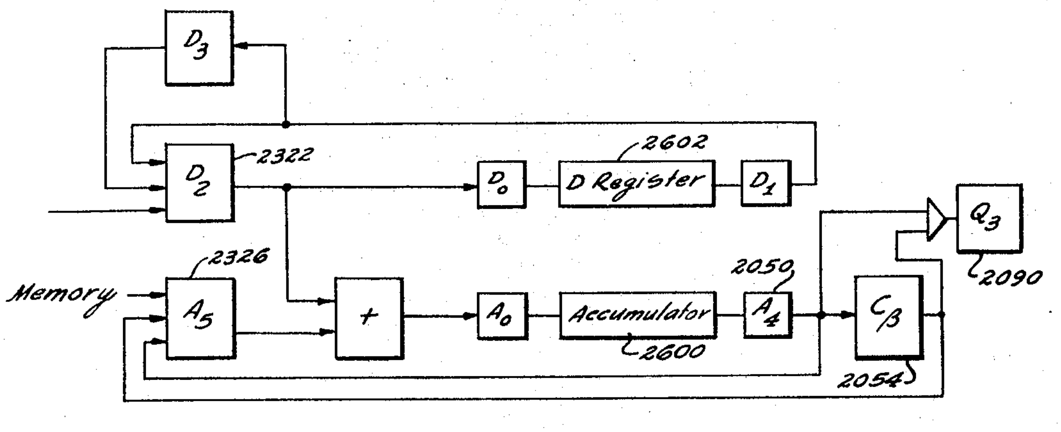

FIGURE 36 is a table providing further information relative to the operation of certain stages shown in FIGURE 8;

FIGURES 37 and 38 are tables providing further information relating to the operation of certain stages shown in FIGURES 18, 21 and 22;

FIGURE 39 is a curve illustrating the principle of extrapolation used by the digital differential analyzer shown in FIGURES 4 to 30, inclusive, to increase the accuracy of computation;

FIGURE 40 is a simplified block diagram illustrating how the various stages in the digital differential analyzer shown in FIGURES 4 to 30, inclusive, are interrelated to perform a "normal" type of integration;

FIGURE 41 is a simplified block diagram illustrating one type of a servo operation used in the digital differential analyzer shown in FIGURES 4 to 30, inclusive;

FIGURE 42 is a simplified block diagram illustrating another type of servo operation used in the digital differential analyzer shown in FIGURES 4 to 30, inclusive;

FIGURE 43 is a table providing further information relating to the operation of certain stages shown in FIGURE 16;

FIGURE 44 is a table schematically illustrating the operation of certain stages shown in FIGURES 23 and 24 for representing an error obtained during a servo operation;

FIGURE 45 shows curves illustrating the time relationship in successive blocks for obtaining a servo operation and for using the results of the servo operation to control the positioning of various output members;

FIGURE 46 is a simplified block diagram illustrating how one type of servo operation is performed;

FIGURE 47 is a simplified block diagram illustrating how another type of servo operation is performed;

FIGURE 48 is a table illustrating the pattern of operation of certain flip-flops in a new type of servo operation designated in the specification as a "zero-rate servo";

FIGURE 49 is a top plan view of apparatus used in the digital differential analyzer to obtain a conversion of analogue signals to a digital form;

FIGURE 50 is a perspective view of the apparatus shown in FIGURE 49 and illustrates the apparatus in further detail;

FIGURES 51 to 61, inclusive, are circuit diagrams illustrating in block form various portions of a digital computer adapted to operate in association with the digital differential analyzer to perform such arithmetical operations as addition, multiplication, complementation and shifting;

FIGURE 62 is a table illustrating the operation of the digital computer shown in FIGURES 51 to 61, inclusive, in performing the operation of multiplication;

FIGURE 63 is a simplified block diagram illustrating the operation of the digital computer in obtaining the product of two numbers; and FIGURE 64 (which comprises FIGURES 64A and 64B) is a table illustrating how various quantities are presented in successive blocks during the operation of multiplication.

FLIP-FLOP CONSTRUCTION AND OPERATION

The apparatus forming a part of the digital differential analyzer constituting this invention includes a plurality of flip-flops. Each flip-flop may be constructed in a manner similar to that shown in FIGURE 1. Each flip-flop and the stages associated with the flip-flop are adapted to receive voltages from a suitable power supply such as a power supply 10. The power supply 10 is adapted to supply a relatively high potential such as +250 volts on a line 12, an intermediate positive potential such as 100 volts on a line 14 and a negative potential such as −150 volts on a line 16.

The line 12 is connected through a resistance 18 to the plate of a vacuum tube 20, the cathode of which is grounded. The grid of the tube 20 is biased in potential through a resistance 22 connected to the line 16. The grid of the tube 20 is also connected to the plate of a diode 24, the cathode of which has a common terminal with a grounded resistance 26 and a capacitance 28. The capacitance 28 is connected to a logical network 30. The logical network 30 may take different forms, as will be described in detail subsequently.

Voltages are also supplied to the grid of the tube 20 through a parallel combination of a resistance 32 and a capacitance 34 connected to the plate of a tube 36. The tube 36 has characteristics and connections similar to the tube 20 and may constitute one half of a double triode, the tube 20 constituting the other half. For example, the plate of the tube 36 has voltage applied to it from the line 12 through a resistance 38 corresponding to the resistance 18, and the cathode of the tube is grounded.

A biasing potential is applied to the grid of the tube 36 from the line 16 through a resistance 40 corresponding to the resistance 22. Voltage is also applied to the grid of the tube 36 from a parallel combination of a resistance 42 and a capacitance 44 connected to the plate of the tube 20. The resistance 42 and the capacitance 44 have values corresponding to the resistance 32 and the capacitance 34, respectively. In addition to its other connections, the grid of the tube 36 is connected to the plate of a diode 46, the cathode of which has a common terminal with a grounded resistance 48 and with a capacitance 50. The capacitance 50 is connected to a logical network 52 corresponding to the network 30.

In addition to being connected to the resistance 18, the plate of the tube 20 is connected to a resistance 54 and a capacitance 56 in parallel. Connections are made from the parallel combination of the resistance 54 and the capacitance 56 to a grounded resistance 58 and to the grid of a tube 60. The plate of the tube 60 has voltage to it from the line 12. The cathode of the tube 60 serves as one of the output terminals for the flip-flop, as will be described in detail subsequently. For this reason, an output line 62 extends from the cathode of the tube. The cathode of the tube 60 is also connected to a grounded resistance 64 and to the cathode of a diode 66. The plate of the diode 66 receives voltage from the line 14.

Similarly, the voltage on the plate of the tube 36 is applied to a resistance 70 and a capacitance 72. The resistance 70 and the capacitance 72 are connected in parallel and are provided with values respectively corresponding to those of the resistance 54 and the capacitance 56. The resistance 70 and the capacitance 72 are connected to a grounded resistance 74 and to the grid of a tube 76. The tube 76 may constitute one half of a double triode and the tube 60 the other half.

Voltage is applied to the plate of the tube 76 from the line 12 and voltage is produced on the cathode of the tube 76 upon the flow of current through a grounded resistance 78 connected to the cathode of the tube and having a value corresponding to that of the resistance 64. An output line 80 extends from the cathode of the tube 76. Connections are made to the cathode of a diode 82 from the cathode of the tube 76 and to the plate of the diode 82 from the line 14. The diode 82 has characteristics corresponding to those of the diode 66.

The tubes 20 and 36 are so interconnected that only one of the tubes can be conductive at any one time. For example, the tube 36 may be conductive and the tube 20 non-conductive at a particular instant. Since the tube 36 is conductive, current flows through a circuit including the power supply 10, the line 12, the resistance 38 and the tube. This current produces a voltage drop across the resistance 38 and causes a relatively low voltage to be produced on the plate of the tube 36. This low voltage is introduced to the grid of the tube 76 through the coupling network formed by the resistance 70 and the capacitance 72. Since the grid of the tube 76 has a relatively low voltage applied to it, the tube is cut off and a potential in the order of 100 volts is produced on the cathode of the tube. A potential in the order of 100 volts is produced because of the flow of current through a circuit including the power supply 10, the line 14, the diode 82 and the resistance 78.

The low voltage on the plate of the tube 36 is also introduced to the grid of the tube 20 through the coupling network formed by the resistance 32 and the capacitance 34. This voltage maintains the tube 20 cut off. Since no current flows through the tube 20, the current flowing through the resistance 18 is limited to that flowing through a circuit including the resistances 18, 42 and 40. This causes a relatively small voltage drop to be produced across the resistance 18 such that the voltage on the plate of the tube 20 is maintained at substantially the potential on the line 12. A resultant high potential is introduced to the grid of the tube 60 through the coupling network formed by the resistance 54 and the capacitance 56. This potential makes the tube 60 conductive. The resultant flow of current through the tube 60 and the resistance 64 causes a relatively high voltage to be produced across the resistance and introduced to the output line 62. This voltage is in the order of 125 volts.

When the tube 36 is conductive and the tube 20 is cut off, the introduction of a negative triggering signal from the logical network 30 to the grid of the tube 20 has no effect. However, a negative pulse of voltage from the logical network 52 is differentiated by the capacitance 50 and the resistance 48 to produce a sharp triggering signal. This triggering signal passes through the diode 46, which is included to prevent the passage of positive signals. The negative triggering signal is then introduced to the grid of the tube 36 to cut off the tube. The interruption of current flow through the tube 36 causes the voltage on the plate of the tube to rise to a relatively high value. This voltage is introduced to the grid of the tube 76 to render the tube conductive for the production of a relatively high voltage across the resistance 78.

The relatively high voltage on the plate of the tube 36 is also introduced to the grid of the tube 20 to render the tube 20 conductive. The resultant flow of current through the resistance 18 and the tube 20 causes a relatively low voltage to be produced on the plate of the tube. This potential is introduced to the grid of the tube 60 to cut off the tube so that a potential approximating 100 volts is produced on the cathode of the tube.

A subsequent pulse of voltage from the logical network 30 is differentiated by the capacitance 28 and the resistance 26 to produce a sharp triggering signal. This signal is introduced to the grid of the tube 20 to cut off the tube and to render the tube 36 conductive. This in turn results in a relatively high potential on the cathode of the tube 60 and a relatively low potential on the cathode of the tube 76. In this way, the operation of the flip-flop shown in FIGURE 1 is dependent at any instant upon the signals introduced to the flip-flop from the logical networks 30 and 52.

In accordance with the introduction of the signals from the logical networks 30 and 52, a high potential approximating 125 volts is produced at any instant on the cathode of one of the tubes 60 and 76 and a low potential approximating 100 volts is produced on the cathode of the other tube. Each of the tubes 60 and 76 serves in a cathode-follower stage for isolating the flip-flop electrically from successive stages and for improving the match in impedances between the flip-flop and the successive stages.

CONSTRUCTION AND OPERATION OF "AND" AND "OR" NETWORKS

Figures 1, 2, 3:
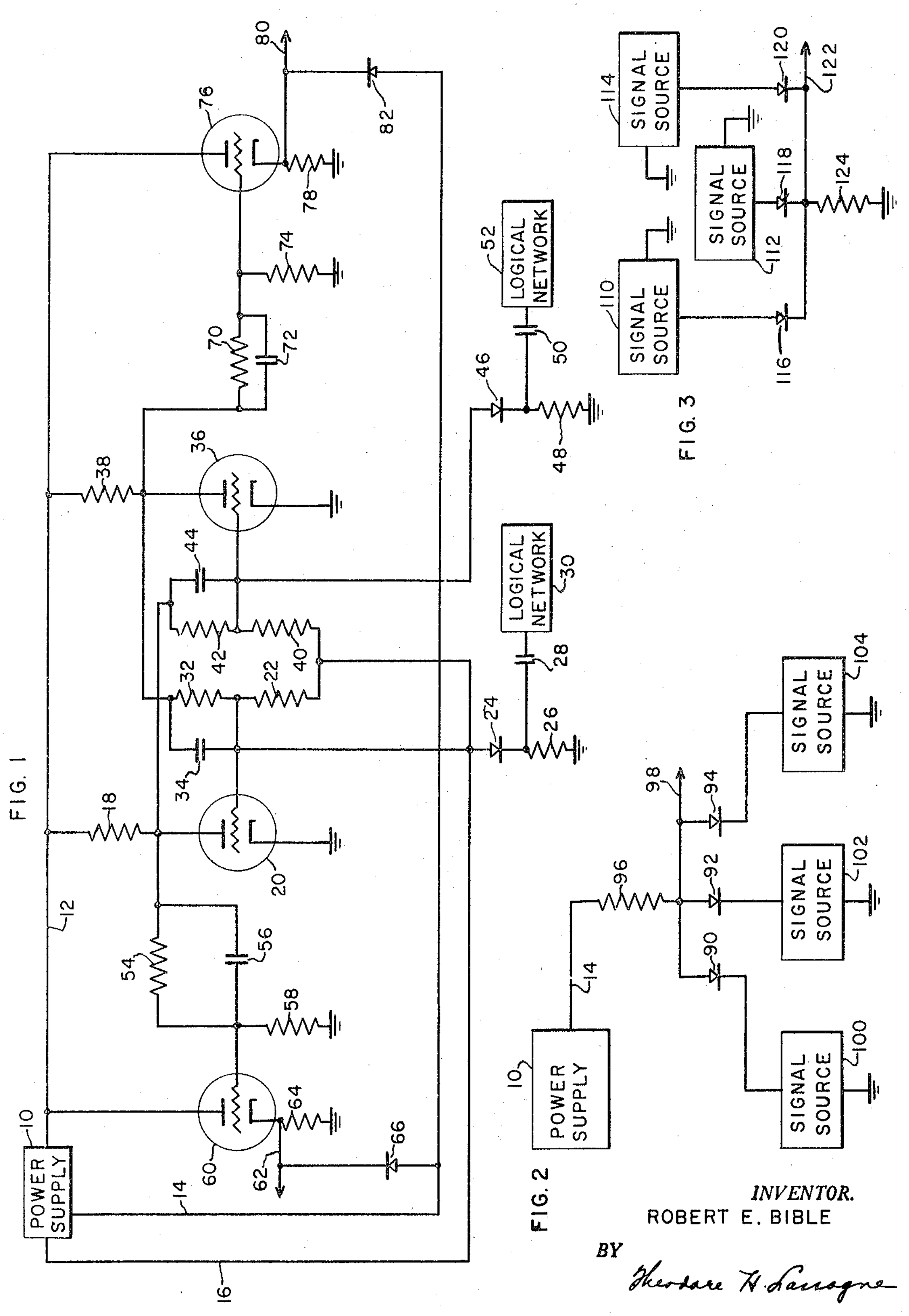
FIGURE 1 is a circuit diagram of a flip-flop used throughout the invention and shown in block form in the various stages forming a part of this invention.
FIGURE 2 is a circuit diagram of a typical "and" network used throughout the invention and shown in block form in a number of the other figures.
FIGURE 3 is a circuit diagram of a typical "or" network used throughout the invention and shown in block form in a number of other figures.

In addition to having a number of flip-flops similar to that shown in FIGURE 1 and described above, the computer constituting this invention also includes a number of "and" network to control the operation of the flip-flops. Each of the "and" networks may be constructed in a manner similar to that shown in FIGURE 2. For example, a typical "and" network may include diodes 90, 92 and 94 the plates of which have voltage applied to them through a resistance 96 from the line 14 and the plates of which produce an output voltage on a line 98. The cathodes of the diodes 90, 92 and 94 are connected to signal sources 100, 102 and 104, which may be flip-flops, other "and" networks, "or" networks or other types of circuits, as will be described in detail hereinafter.

At particular times, relatively high voltages are simultaneously produced by the signal sources 100, 102 and 104. These voltages are respectively introduced to the cathodes of the diodes 90, 92 and 94. Since the voltages on the plates of diodes tend to follow the voltages on the cathodes of the diodes, the voltages on the plates of the diodes 90, 92 and 94 also become relatively high. These high voltages prevent current from flowing through a circuit including the power supply 10, the line 14, the resistance 96 and the diodes such that a relatively high voltage is produced on the output line 98. The high voltage remains on the output line 98 until the voltage from one or more of the sources 100, 102 and 104 becomes low. For example, the voltage from the source 100 may become low. When this occurs, current flows through a circuit including the power supply 10, the line 14, the resistance 96, the diode 90 and the signal source 100 and produces a voltage drop across the resistance. The drop of voltage across the resistance 96 causes a negative pulse of voltage to be produced on the output line 98. This negative drop in voltage is differentiated by such differentiating circuits as the capacitance 28 and the resistance 26 in FIGURE 1 so as to trigger a flip-flop corresponding to that shown in FIGURE 1 into its alternate state of operation.

It should be appreciated that the "and" network shown in FIGURE 1 can be formed from a different number of branches than the three branches shown in FIGURE 1. It should also be appreciated that different types of "and" networks may be used in addition to that shown in FIGURE 2.

"Or" networks also form an important part of the computer constituting this invention. One type of "or" network capable of use is shown in FIGURE 3. Sources 110, 112 and 114 are shown by way of example. These sources may be flip-flops, "and" networks, "or" networks or other types of circuits. Connections are made from the sources 110, 112 and 114 to the plates of diodes 116, 118 and 120. The cathodes of the diodes are connected to an output line 122 and to a grounded resistance 124.

When the sources 110, 112 and 114 simultaneously produce low voltages, no current is able to flow through any of the diodes 116, 118 and 120. This causes a relatively low potential to be produced across the resistance 124 and on the output line 122. A different condition exists when a high voltage is produced in one or more of the sources 110, 112 and 114. For example, the introduction of a relatively high voltage from the source 110 causes current to flow through a circuit including the source, the diode 116 and the resistance 124. This current produces a potential across the resistance 124 such that a relatively high voltage is obtained on the output line 122. This output voltage may then be introduced to flip-flops, "and" networks or other "or" networks as will be described in detail subsequently.

CONSTRUCTION OF THE DIGITAL DIFFERENTIAL ANALYZER

Flip-flops, "and" networks and "or" networks are associated with one another in various patterns to control the operation of the digital differential analyzer. The digital differential analyzer also includes a memory member such as a drum generally indicated at 130 in FIGURE 4 and other figures. The drum may be formed from a cylinder 132 made from a suitable nonmagnetic material such as aluminum. The cylinder 132 may have a suitable diameter such as approximately 7 inches and may have an axial length such as approximately 2⅝ inches. A thin coating 134 of a suitable magnetic material such as a powdered ferrite is deposited on the cylinder 132. The coating 134 may be deposited on the cylinder 132 as by spraying and may be formed of a thickness having a few molecular layers.

The drum 130 may be considered to be divided into a plurality of channels or tracks, each of which gives magnetic information. Each of the tracks is separated by a sufficient distance from the adjacent tracks so that it is magnetically independent of the information carried by the adjacent tracks. For example, 13 tracks are provided in the drum 130. These tracks are designated at 136, 138, 140, 142, 144, 146, 158, 150, 152, 154, 156, 158 and 160. Different tracks are shown in FIGURES 4 to 30, inclusive. Each of the tracks 136 to 160, inclusive (even numbers only) performs an individual function which will be disclosed in detail hereinafter.

Each of the tracks 136 to 160, inclusive (even numbers only), is divided into a plurality of pulse positions. The pulse positions in each track are magnetically independent from one another so that separate information can be stored in each pulse position. For example, the periphery of each track may be divided into 2,250 pulse positions, each of which receives magnetic information in different patterns as the computation proceeds.

The track 136 serves to produce clock signals as the drum 130 rotates. These signals may be produced by cutting notches in the track at successive intervals along the peripheral distance of the track and by providing a permanent magnetization in the notches. By cutting the notches and permanently magnetizing the track 136, alternate signals are induced in a coil 162 (FIGURE 4) as the drum 130 rotates.

The output signals from the coil 162 are introduced to the left input terminal in a flip-flop 164 and to the input terminal of a delay line 165. The output from the delay line 165 is in turn applied to the right input terminal in the flip-flop 164. The signals introduced to the left and right input terminals in the flip-flop 164 respectively correspond to the signals introduced to the capacitances 28 and 50 in the flip-flop shown in FIGURE 1. It should be appreciated that the flip-flop 164 and the delay line 165 are shown only by way of illustration. For example, a blocking oscillator could be used instead of the flip-flop 164 and the delay line 165.

The voltage on the left output terminal in the flip-flop 164 is applied to an input terminal of an "and" network 166. Other input terminals of the "and" network 166 are connected to the output terminal of a cathode follower 173 and to the right output terminal in a flip-flop 170. The signals passing through the "and" network 166 are in turn applied to the left input terminal in the flip-flop 170.

The voltage on the left output terminal in the flip-flop 170 is applied to an input terminal of an "or" network 172, another input terminal of which is connected to the output terminal in a cathode follower 168. The signals from the "or" network 172 in turn pass to an input terminal of an "and" network 174 having another input terminal connected to the left output terminal in the flip-flop 164. The signals passing through the "and" network 174 are in turn applied to the right input terminal in the flip-flop 170.

An "and" network 178 has input terminals connected to the left output terminal in the flip-flop 170 and to the right output terminals in flip-flops 180 and 210. The signals from the "and" network 178 and from the cathode follower 168 pass through an "or" network 182 to an input terminal of an "and" network 184. Another input terminal of the "and" network 184 is connected to the left output terminal of the flip-flop 164. The output signals from the "and" network 184 are introduced to the left input terminal of the flip-flop 180 to trigger the flip-flop. Similarly, signals are introduced to the right input terminal of the flip-flop 180 from an "and" network 186 having input terminals connected to the cathode follower 173 and to the left output terminals of the flip-flops 164, 170 and 180.

Connections are made to the input terminals of an "and" network 188 from the left output terminals in the flip-flops 164, 170 and 180, from the right output terminal in a flip-flop 190 and from the cathode follower 173. The signals from the "and" network 188 are applied to the left input terminal in the flip-flop 190. The signals passing to the right input terminal in the flip-flop 190 are controlled by the operation of an "and" network 192, an "or" network 194 and an "and" network 196.

The "and" network 192 receives signals from the left output terminals in the flip-flops 170, 180 and 190 and in turn passes signals to the "or" network 194, which also receives voltages from the cathode follower 168. The signals from the "or" network 194 also pass to the "and" network 196, the operation of which is also controlled by signals from the left output terminal in the flip-flop 164. The signals from the "and" network 196 in turn pass to the right input terminal in the flip-flop 190.

Signals are applied from an "and" network 198 to the left input terminal in a flip-flop 200. The operation of the "and" network 198 is controlled by the voltages on the left output terminals of the flip-flops 164, 170, 180 and 190, on the right output terminal of the flip-flop 200 and on the output terminal of the cathode follower 173. An "and" network 202, an "or" network 204 and an "and" network 206 control the signals passing to the right input terminal in the flip-flop 200. Connections are made to input terminals of the "and" network 202 from the left input terminals in the flip-flops 170, 180, 190 and 200. The signals from the "and" network 202 and from the cathode follower 168 are applied to the "or" network 204. The signals from the "or" network 204 and from the left output terminal in the flip-flop 164 are in turn applied to the "and" network 206, the output from which passes to the right input terminal in the flip-flop 200.

In like manner, an "and" network 207 is connected to the left input terminal in the flip-flop 210. Signals are applied to the "and" network 207 from the left output terminals in the flip-flops 164, 170, 180, 190 and 200 and from the cathode follower 173. The right input terminal in the flip-flop 210 receives signals from an "and" network 212 having input terminals connected to an "or" network 214 and to the left output terminal in the flip-flop 164. The operation of the "or" network 214 is controlled by signals passing to input terminals of the "or" network from an "and" network 216 and from the cathode follower 168. The "and" network 216 in turn receives signals from the left output terminals in the flip-flops 170 and 210.

The "and" network 207 not only passes signals to the left input terminal of the flip-flop 210 but also to an output line 220 to provide control functions which will be described in detail subsequently. In like manner, signals pass from the "and" network 208 to an output line 223 to provide certain control functions which will be described in detail subsequently. An "and" network 222 is included in FIGURE 4 to provide other control functions. The "and" network 222 is connected to the right output terminals of the flip-flops 170, 180, 190, 200 and 210.

The stages shown in some detail in FIGURE 4 are illustrated schematically as a single block in FIGURE 5. This block is designated as a "position counter" in FIGURE 5 and is indicated at 230. The output line 283 is shown as extending from the position counter 230 and is adapted to receive signals passing through the "and" network 208 as shown in FIGURE 4. The output line 223 is connected to an input terminal in an "and" network 232. Other input terminals of the "and" network 232 receive voltages from the left output terminal in the flip-flop 164 and from the right output terminal in a flip-flop 234. The output from the "and" network 232 is applied to the left input terminal in the left flip-flop 234.

The signals introduced to the right input terminal in the flip-flop 234 are controlled by the operation of an "and" network 236, an "or" network 238 and an "and" network 240. Input terminals of the "and" network 236 are connected to the left output terminal of the flip-flop 234 and through the output line 223 to the position counter 230. The signals from the "and" network 236 and from the left output terminal of the cathode follower 168 also shown in FIGURE 4 pass to the "or" network 238. The signals from the "or" network 238 and from the left output terminal in the flip-flop 164 in turn pass to the input terminals of the "and" network 240. The output terminal of the "and" network 240 is connected to the right input terminal in the flip-flop 234.

An "and" network 242 has signals applied to it from the left output terminals in the flip-flops 164 and 234, from the right output terminal in a flip-flop 244 and through the line 223 from the counter 230. The signals from the "and" network 242 in turn pass to the left input terminal in the flip-flop 244. The right input terminal in the flip-flop 244 receives signals from an "and" network 246 having input terminals connected to the left output terminal in the flip-flop 164 and to an "or" network 248. Signals pass through the "or" network 248 from the cathode follower 168 and from an "and" network 250. The operation of the "and" network 250 is controlled by signals passing from the left output terminals in the flip-flops 234 and 244 and through the line 223 from the counter 230.

Similarly, connections are made to input terminals of an "and" network 252 from the left output terminals in the flip-flops 164, 234 and 244, from the right output terminal in a flip-flop 254 and through the line 223 from the counter 230. The signals from the "and" network 252 are applied to the left input terminal of the flip-flop 254. The signals passing to the right input terminal of the flip-flop 254 are controlled by the operation of an "and" network 256, an "or" network 258 and an "and" network 260. Input terminals of the "and" network 256 are connected to the left output terminals in the flip-flops 234, 244 and 254 and through the line 223 to the counter 230. The output signals from the "and" network 256 and from the cathode follower 168 pass through the "or" network 258 to an input terminal of the "and" network 260. The "and" network 260 also receives at an input terminal the signals from the left output terminal in the flip-flop 164. The signals from the "and" network 260 are applied to the right input terminal of the flip-flop 254.

In like manner, flip-flops 262, 264, 266 and 268 are associated with the flip-flops 234, 244 and 254 to form a counter which will hereinafter be designated as a "block" counter. The particular connections to the flip-flops 262, 264, 266 and 268 are not shown for purposes of simplification since it is believed that a person skilled in the art will understand these connections from the description of operation which will hereinafter be made and from the logical equations which will be set forth to explain this operation. These logical equations are also set forth in FIGURE 5.

Figure 6:
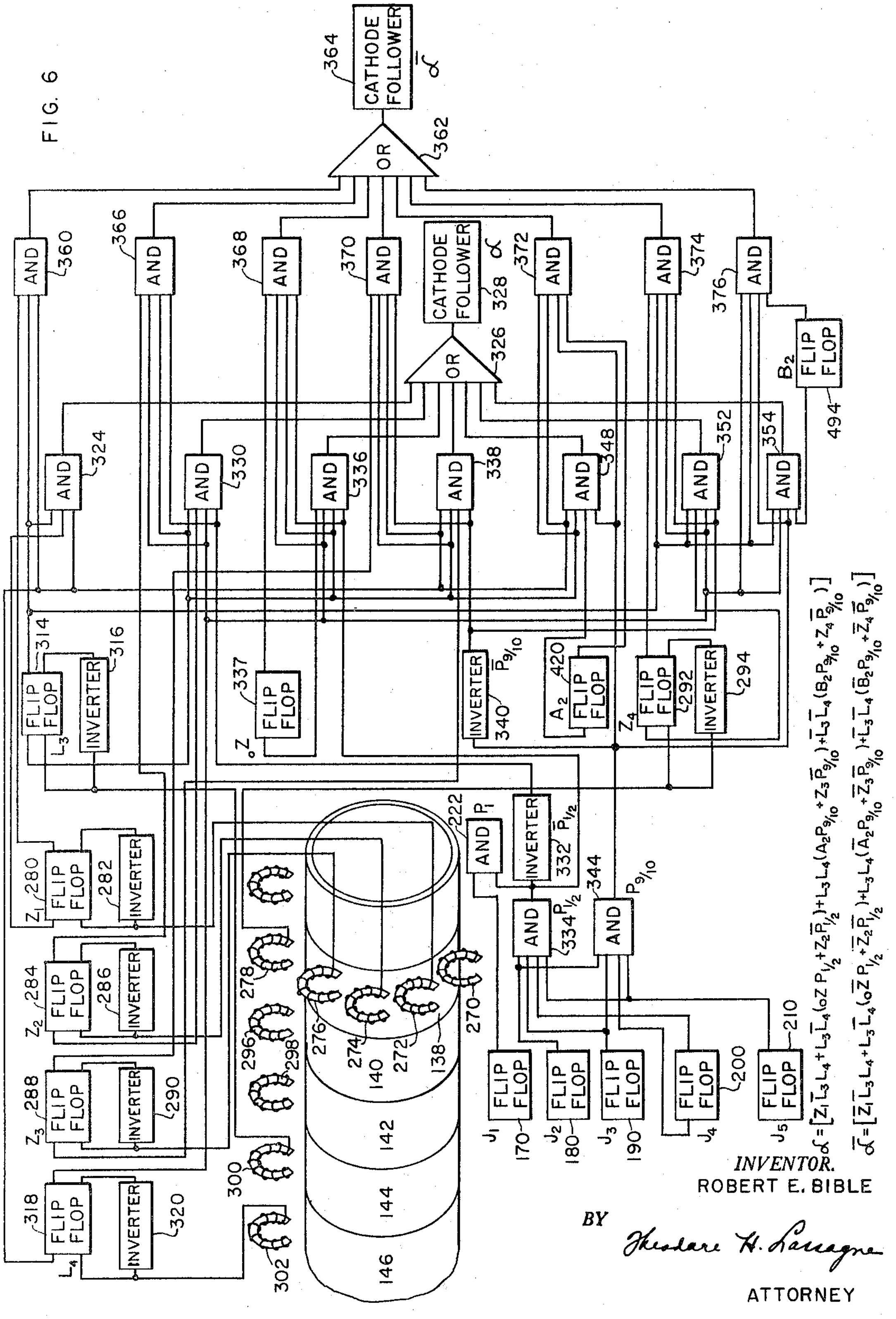

Coils 270, 272, 274, 276 and 278 are shown in FIGURE 6 as being positioned in contiguous relationship to the track 138 for magnetic association with the track. The coil 270 is adapted to receive electrical signals and to induce a pattern of magnetic signals in the track 138 in accordance with the pattern of the electrical signals. The coils 272, 274, 276 and 278 are separated from the coil 270 by particular distances. Each of the coils 272, 274, 276 and 278 has electrical signals induced in it in accordance with the pattern of the magnetic information in the track 138 as the magnetic information moves past the coil.

The signals induced in the coil 272 are introduced to the left input terminal of a flip-flop 280 and to the input terminal of an inverter 282. The output signals from the inverter 282 are applied to the right input terminal in the flip-flop 280. Similarly, the signals induced in the coils 274, 276 and 278 are respectively introduced to a flip-flop 284 and an inverter 286, a flip-flop 288 and an inverter 290, and a flip-flop 292 and an inverter 294. The flip-flops 284 and 288 and 292 are associated with the inverters 286, 290 and 294 in a manner similar to the association between the flip-flop 280 and the inverter 282.

Figure 7:
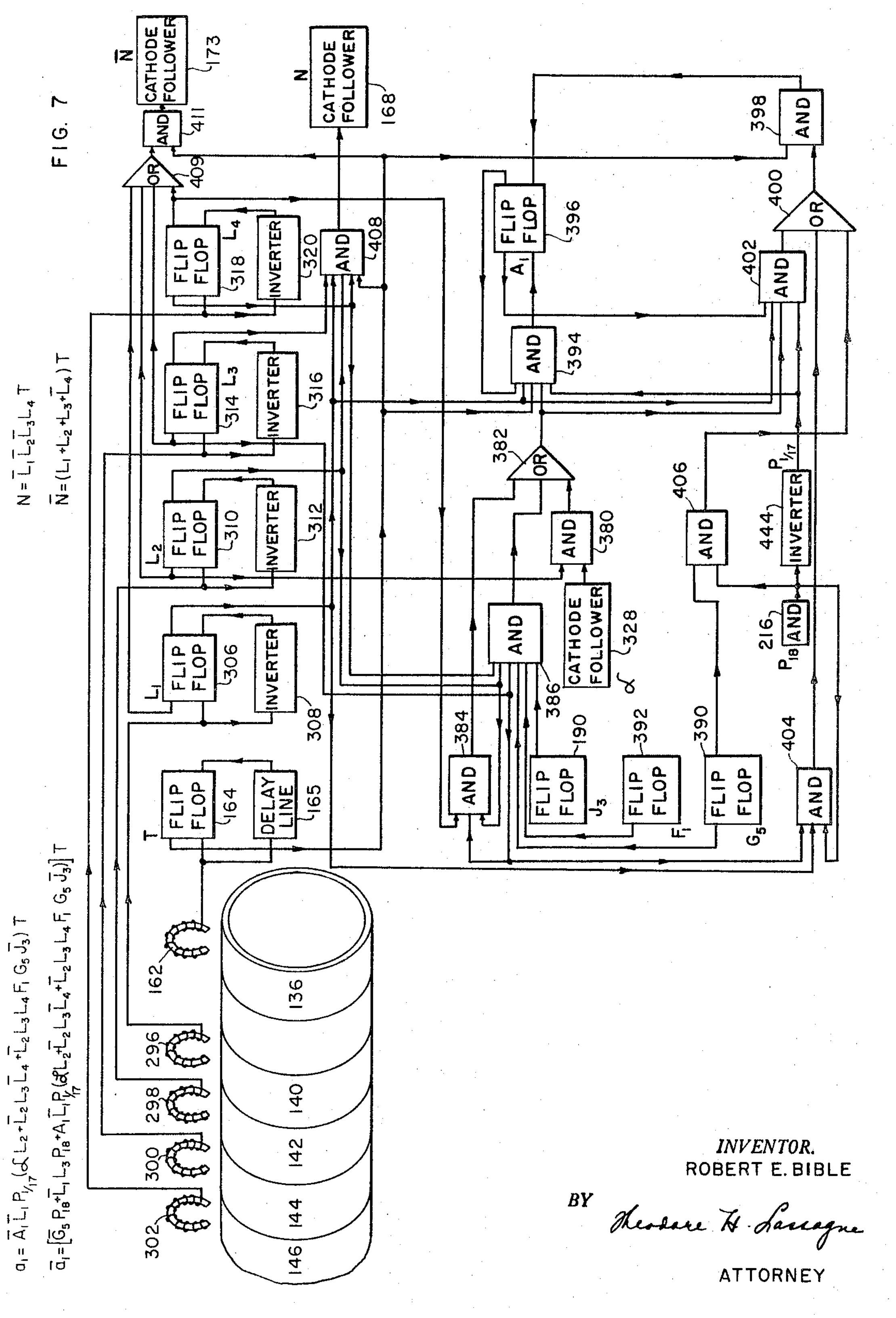

Coils 296, 298, 300 and 302 are shown in FIGURE 7 as being respectively disposed in contiguous relationship to the tracks 140, 142, 144 and 146 for magnetic association with the tracks. As will be described in detail hereinafter, magnetic information is permanently recorded in the tracks 140, 142, 144 and 146 and this information is induced in the coils 296, 298, 300 and 302 as the drum 130 rotates. The electrical signals induced in the coils 296, 298, 300 and 302 are respectively introduced to a flip-flop 306 (FIGURE 7) and an inverter 308, to a flip-flop 310 and an inverter 312, to a flip-flop 314 (FIGURES 6 and 7) and an inverter 316 and to a flip-flop 318 and an inverter 320. Electrical connections are provided between the flip-flop 306 and the inverter 308, the flip-flop 310 and the inverter 312, the flip-flop 314 and the inverter 316, and the flip-flop 318 and the inverter 320 in a manner similar to that described above for the flip-flop 280 and the inverter 282.

The voltages on the left output terminals of the flip-flops 280 and 318 and on the right output terminal of the flip-flop 314 are applied to input terminals of an "and" network 324 in FIGURE 6. Signals from the "and" network 324 pass through an "or" network 326 to a cathode follower stage 328 which is constructed in a conventional manner. Signals also pass to the "or" network 326 from an "and" network 330. Input terminals of the "and" network 330 are connected to the left output terminals in the flip-flops 284 and 314, to the right output terminal in the flip-flop 318 and to the output terminal of an inverter 332. The inverter 332 receives signals from an "and" network 334. Connections are made to input terminals of the "and" network 334 from the right output terminals in the flip-flops 180, 190, 200 and 210 also shown in FIGURE 4.

The signals passing through the "and" network 334 are introduced to an input terminal of an "and" network 336 as well as the input terminal of the inverter 332. Other input terminals of the "and" network 336 are connected to the left output terminal of the flip-flop 314, the right output terminal of the flip-flop 318 and the left output terminal of a flip-flop 337. The signals from the "and" network 336 pass to the "or" network 326.

In addition to receiving the output signals from the "and" networks 324, 330 and 336, the "or" network 326 has signals applied to it from an "and" network 338. Connections are made to input terminals of the "and" network 338 from the left output terminals in the flip-flops 288, 314 and 318 and the output terminal of an inverter 340. The inverter 340 is adapted to invert signals passing to it from an "and" network 344. Connections are made to input terminals of the "and" network 344 from the right output terminals in the flip-flops 180, 190 and 210 and from the left output terminal in the flip-flop 200.

An "and" network 348 also operates to pass signals to the "or" network 326. The "and" network 348 receives signals from the left output terminals in the flip-flops 314 and 318 and in a flip-flop 420 and also receives signals from the output terminal of the "and" network 344. Similarly, signals pass to the "or" network 326 from an "and" network 352. Connections are made to input termina's of the "and" network 352 from the left output terminal of the flip-flop 292, the right output terminals of the flip-flops 314 and 318 and the output terminal of the inverter 340. Signals from an "and" network 354 are also introduced to the "or" network 326. The operation of the "and" network 354 is controlled by signals from the right output terminals of the flip-flops 314 and 318, the left output terminal in a flip-flop 494 and the output terminal of the "and" network 344.

An "and" network 360 has signals applied to it from the right output terminals of the flip-flops 280 and 314 and the left output terminal of the flip-flop 318. The signals from the "and" network 360 in turn pass through an "or" network 362 to a cathode follower 364 corresponding to the cathode follower 328. Signals from an "and" network 366 also pass through the "or" network 362 to the cathode follower 364. Input terminals of the "and" network 366 are connected to the right output terminals of the flip-flops 284 and 318, the left output terminal of the flip-flop 314 and the output terminal of the inverter 332.

The "or" network 362 receives the output signals from "and" networks 368 and 370 as well as from the "and" networks 360 and 366. The input terminals of the "and" network 368 are connected to the left output terminal of the flip-flop 314, the right output terminals of the flip-flops 318 and 337 and the output terminal of the "and" network 334. Connections are made to input terminals of the "and" network 370 from the left output terminals of the flip-flops 314 and 318, the right output terminal of the flip-flop 288 and the output terminal of the inverter 340.

Signals from "and" networks 372, 374 and 376 also pass through the "or" network 362 to the cathode follower 364. The operation of the "and" network 372 is controlled by signals from the left output terminals of the flip-flops 314 and 318, the right output terminal of the flip-flop 420 and the output terminal of the "and" network 344. Signals are introduced to input terminals of the "and" network 374 from the right output terminals of the flip-flops 292, 314 and 318 and from the output terminal of the inverter 340. Connections are made to input terminals of the "and" network 376 from the right output terminals of the flip-flops 314, 318 and 494 and the output terminal of the "and" network 344.

The cathode follower indicated at 328 in FIGURE 6 is also shown in FIGURE 7. The output signals from the cathode follower 328 and from the left output terminal of the flip-flop 310 are applied to an "and" network 380. The signals from the "and" network 380 pass to an "or" network 382, which also receives signals from "and" networks 384 and 386. Input terminals of the "and" network 384 are connected to the left output terminal of the flip-flop 314 and the right output terminals of the flip-flops 310 and 318. The operation of the "and" network 386 is controlled by the voltages on the left output terminals of the flip-flops 314 and 318, the right output terminals of the flip-flops 310 and 190 and the left output terminals of flip-flops 390 and 392.

The signals from the "or" network 382 are introduced to an "and" network 394, which also receives signals from the left output terminal of the flip-flop 164, the right output terminals of the flip-flop 306 and of a flip-flop 396 and the output terminal of an inverter 444. The signals from the "and" network 394 pass to the left input terminal in the flip-flop 396 to trigger the flip-flop. The right input terminal of the flip-flop 396 receives signals from an "and" network 398, the input terminals of which are connected to an "or" network 400 and to the left output terminal in the flip-flop 164. Connections are made to input terminals of the "or" network 400 from "and" networks 402, 404 and 406.

The "and" network 402 has voltages applied to it from the "or" network 382, the inverter 444, the left output terminal of the flip-flop 396 and the right output terminal of the flip-flop 306. In like manner, signals are introduced to the input terminals of the "and" network 404 from the left output terminal in the flip-flop 314, the right output terminal in the flip-flop 306 and the "and" network 216 also shown in FIGURE 4. In addition to being applied to the "and" network 404, the signals from the "and" network 216 also pass to the inverter 444 and to an input terminal of the "and" network 406, another input terminal of which is connected to the right output terminal in the flip-flop 390.

Logical networks are also shown in FIGURE 7 for controlling the operation of the cathode followers 168 and 173. The cathode follower 168 receives signals from an "and" network 408 having input terminals connected to the left output terminals of the flip-flops 318 and 164, and the right output terminals of the flip-flops 306, 310 and 314. Signals pass to the cathode follower 173 from an "and" network 411 having input terminals connected to an "or" network 409 and the left output terminal of the flip-flop 164. Signals are introduced to the "or" network 409 from the left output terminals of the flip-flops 306, 310 and 314 and the right output terminal of the flip-flop 318.

As will be described in detail subsequently, the logical networks shown in FIGURE 7 control the triggering of the flip-flop 396. The flip-flop 396 is also included in FIGURE 8 to help control the operation of certain stages shown in that figure. The signals from the left output terminal in the flip-flop 396 are applied to "and" networks 410 and 412. Second input terminals of the "and" networks 410 and 412 are respectively connected to the right output terminal of the flip-flop 314 and the left output terminal of the flip-flop 318.

Signals from the "and" networks 410 and 412 and from an "and" network 414 pass through an "or" network 416 to an "and" network 418. The operation of the "and" network 414 is controlled by voltages on the left output terminals of the flip-flops 314 and 392 and on the right output terminal of the flip-flop 318. In addition to receiving the signals from the "or" network 416, the "and" network 418 has voltages applied to it from the "and" network 216, the left output terminal of the flip-flop 164 and the right output terminal of the flip-flop 390. The signals from the "and" network 418 pass to the left input terminal of the flip-flop 420 (also shown in FIGURE 6) to trigger the flip-flop.

The signals passing to the right input terminal of the flip-flop 420 are controlled by networks similar to those associated with the left input terminal of the flip-flop. These networks include "and" networks 422, 424 and 426. Voltages are applied to input terminals of the "and" network 422 from the right output terminals of the flip-flops 314 and 396 and to the "and" network 424 from the left output terminal of the flip-flop 318 and the right output terminal of the flip-flop 396. The "and" network 426 has input terminals connected to the left output terminal of the flip-flop 314 and the right output terminals of the flip-flops 318 and 392.

The signals from the "and" networks 422, 424 and 426 pass through an "or" network 428 to an input terminal of an "and" network 430. Connections are made to other input terminals of the "and" network 430 from the "and" network 216, the left output terminal of the flip-flop 164 and the right output terminal of the flip-flop 390. The output terminal of the "and" network 430 is connected to the right input terminal of the flip-flop 420.

The circuitry shown in FIGURE 8 controls the operation of a flip-flop 432 as well as the operation of the flip-flop 420. This circuitry includes "and" networks 433 and 434. The "and" network 433 has input terminals connected to cathode followers 436 and 659 and to an inverter 438, which is adapted to receive the signals from the "and" network 222 also shown in FIGURE 4. Connections are made to input terminals of the "and" network 434 from the cathode followers 436 and 659 and from the left output terminals of the flip-flop 390.

The signals from the "and" networks 433 and 434 pass through an "or" network 440 to an input terminal of an "and" network 439 having another output terminal connected to the left output terminal of the flip-flop 164. The output terminal of the "and" network 439 has a common connection with the left input terminal of the flip-flop 432 from "and" networks 441 and 442. The operation of the "and" network 441 is controlled by the voltages on the output terminals of the cathode follower 659 and an inverter 444 and on the right output terminal of a flip-flop 446. The inverter 444 is adapted to invert the signals from the "and" network 216.

In like manner, the "and" network 442 has voltages applied to it from the "and" network 216, the right output terminals of the flip-flop 390 and of a flip-flop 1388 and the left output terminal of a flip-flop 450. Signals are introduced to the left input terminal of the flip-flop 450 from a coil 452 disposed in contiguous relationship to the track 150 of the drum 130. An inverter 453 also receives the signals induced in the coil 452 and passes output signals to the right input terminal of the flip-flop 450.

In addition to the "and" networks 433, 434, 441 and 442, "and" networks 454 and 455 pass signals through the "or" network 439 to the left input terminal in the flip-flop 432. The operation of the "and" network 454 is controlled by signals from the "and" network 216, the right output terminals of the flip-flops 390 and 450 and the left output terminals of flip-flops 456 and 458. Input terminals of the "and" network 455 are connected to the "and" network 222, the left output terminal of the flip-flop 446 and the right output terminals of the flip-flops 390 and 420.

"And" networks 459, 460 and 461 control in part the signals passing to the right input terminal of the flip-flop 432. Connections are made to input terminals of the "and" networks 459 and 460 from cathode followers 462 and 637. The "and" networks 459 and 460 also have input terminals respectively connected to the inverter 438 and the left output terminal of the flip-flop 390. Signals also pass from the inverter 444 to an input terminal of the "and" network 461, other input terminals of which are connected to the cathode follower 637 and to the right output terminal of the flip-flop 446.

The signals from the "and" network 459, 460 and 461 pass to an input terminal of an "or" network 466. The signals from the "or" network 466 pass through an "and" network 467 having another input terminal connected to the left output terminal of the flip-flop 164. The signals pass through the "and" network 467 to the right input terminal of the flip-flop 432. "And" networks 468, 470 and 472 also furnish signals to the right input terminal of the flip-flop 432 through the "or" network 466 and the "and" network 467. Input terminals of the "and" network 468 are connected to the "and" network 216, the left output terminals of the flip-flops 450 and 1388 and the right output terminal of the flip-flop 390. Connections are made to input terminals of the "and" network 470 from the "and" network 216, the left output terminal of the flip-flop 458 and the right output terminals of the flip-flops 390, 450 and 456. The operation of the "and" network 472 is controlled by voltages from the "and" network 222, the left output terminals of the flip-flops 420 and 446 and the right output terminal of the flip-flop 390.

Figure 9:
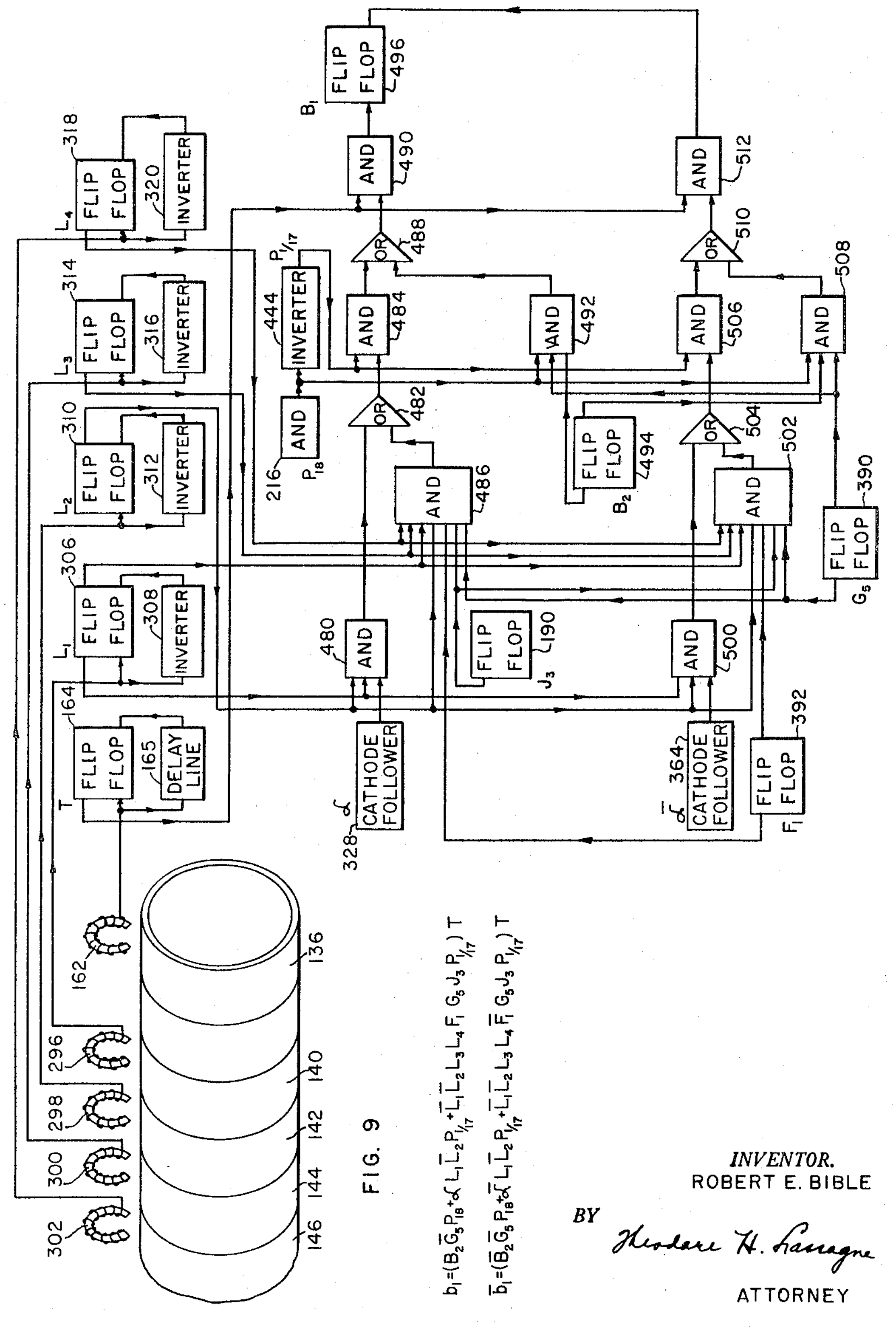

The cathode followers indicated at 328 and 364 in FIGURE 6 are also shown in FIGURE 9. The output from the cathode follower 328 is introduced to an "and" network 480, which also receives signals from the left output terminal of the flip-flop 306 and the right output terminal of the flip-flop 310. The output signals from the "and" network 480 pass through an "or" network 482 to an "and" network 484. Signals from an "and" network 486 also pass through the "or" network 482 to the "and" network 484. The input terminals of the "and" network 486 are connected to the left output terminals of the flip-flops 190, 314, 318, 390 and 392 and to the right output terminals of the flip-flops 306 and 310.

The "and" network 484 has an input terminal connected to the inverter 444 as well as an input terminal connected to the "or" network 482. The output signals from the "and" network 484 pass through an "or" network 488 to an "and" network 490. The "and" network 490 also receives signals through the "or" network 488 from an "and" network 492 having input terminals connected to the "and" network 216, the right output terminal in the flip-flop 390 and the left output terminal in the flip-flop 494 (also shown in FIGURE 6). The output signals from the "and" network 490 are in turn introduced to the left input terminal in a flip-flop 496 to trigger the flip-flop into a particular state of operation.

Just as the "and" network 480 receives signals from the cathode follower 328, an "and" network 500 receives signals from the cathode follower 364. Other input terminals of the "and" network 500 are connected to the left output terminal in the flip-flop 306 and the right output terminal in the flip-flop 310. The signals from the "and" network 500 and from an "and" network 502 pass through an "or" network 504 to an "and" network 506. Connections are made to input terminals of the "and" network 502 from the left output terminals of the flip-flops 190, 314, 318 and 390 and from the right output terminals of the flip-flops 306, 310 and 392.

The operation of the "and" network 506 is controlled by signals from the inverter 444 as well as from the "or" network 504. The output signals from the "and" network 506 and from an "and" network 508 pass to an "or" network 510, the input terminals of the "and" network 508 being connected to the "and" network 216 and the right output terminals of the flip-flops 390 and 494. The signals introduced to the "or" network 510 pass through the "or" network to an "and" network 512, which also has signals applied to it from the left output terminal of the flip-flop 164. The output terminal of the "and" network 512 is connected to the right input terminal of the flip-flop 496.

Figure 10:
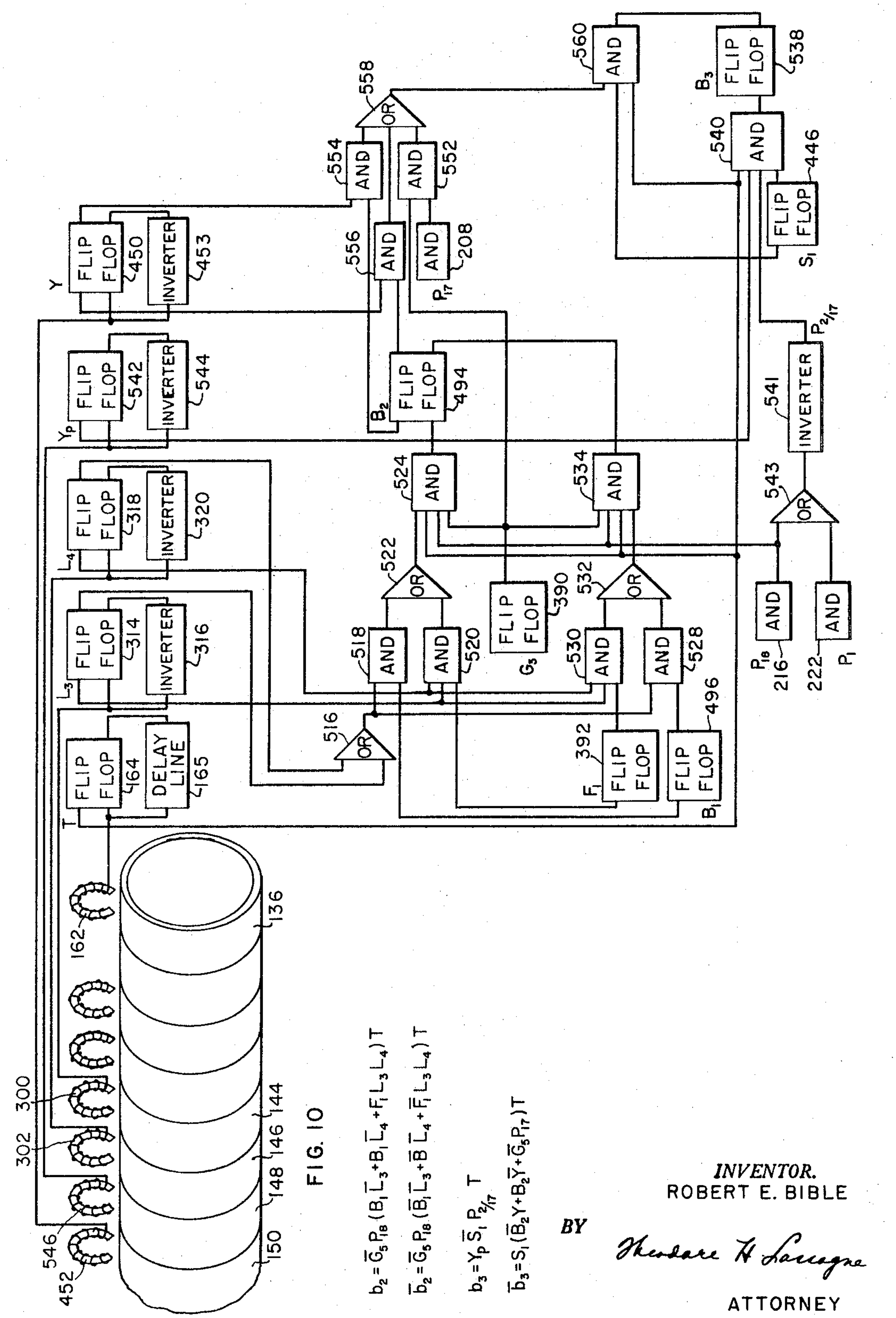

The operation of the flip-flop 494 shown in FIGURE 9 is controlled by certain logical networks illustrated in FIGURE 10. These networks include an "or" network 516 which receives signals from the right output terminals in the flip-flops 314 and 318 and passes these signals to an "and" network 518. The operation of the "and" network 518 is controlled by signals from the left output terminal in the flip-flop 496 as well as the signals from the "or" network 516. The signals from the "and" network 518 and from an "and" network 520 in turn pass through an "or" network 522 to an "and" network 524. Input termianls of the "and" network 520 are connected to the left output terminals of the flip-flops 314, 318 and 392.

In addition to the signals from the "or" network 522, the "and" network 524 receives signals from the "and" network 216, the left output terminal of the flip-flop 164 and the right output terminal of the flip-flop 390. The signals from the "and" network 524 are applied to the left input terminal of the flip-flop 494.

"And" networks 528 and 530 corresponding to the "and" networks 518 and 520 described above are also shown in FIGURE 10. The "and" network 528 receives signals from the "or" network 516 and the right output terminal of the flip-flop 496. The "and" network 530 has voltages applied to it from the left output terminals of the flip-flops 314 and 318 and the right output terminal of the flip-flop 392.

The signals from the "and" networks 528 and 530 pass through an "or" network 532 to an input terminal of an "and" network 534. Other input terminals of the "and" network 534 are connected to the "and" network 216, the left output terminal in the flip-flop 164 and the right output terminal in the flip-flop 390. The output signals from the "and" network 534 are introduced to the right input terminal in the flip-flop 494 to trigger it into a particular state of operation.

Logical networks are also shown in FIGURE 10 for controlling the operation of a flip-flop 538. These logical networks include an "and" network 540 which receives signals from an inverter 541, the inverter in turn receiving input signals through an "or" network 543 from the "and" networks 216 and 222. The "and" network 540 also receives signals from the left output terminal in the flip-flop 164 and the right output terminal in the flip-flop 446. An input terminal of the "and" network 540 is also connected to the left output terminal of a flip-flop 542. The flip-flop 542 and an inverter 544 are adapted to receive signals from a coil 546 disposed in contiguous relationship to the track 148. The flip-flop 542 and the inverter 544 are electrically interrelated in a manner similar to that described above for the flip-flop 280 and the inverter 282 in FIGURE 6.

Connections are made to input terminals of an "and" network 552 from the "and" network 208 also shown in FIGURE 4 and from the right output terminal of the flip-flop 390. An "and" network 554 receives input signals from the left output terminal of the flip-flop 494 and from the right output terminal of the flip-flop 450. Similarly, an "and" network 556 has signals applied to it from the right output terminal of the flip-flop 494 and from the left output terminal of the flip-flop 450. The signals from the "and" networks 552, 554 and 556 pass through an "or" network 558 to an input terminal of an "and" network 560. Other input terminals of the "and" network 560 are connected to the left output terminals of the flip-flops 164 and 446. The output signals from the "and" network 560 are introduced to the right input terminal of the flip-flop 538 to trigger the flip-flop.

Figure 11:
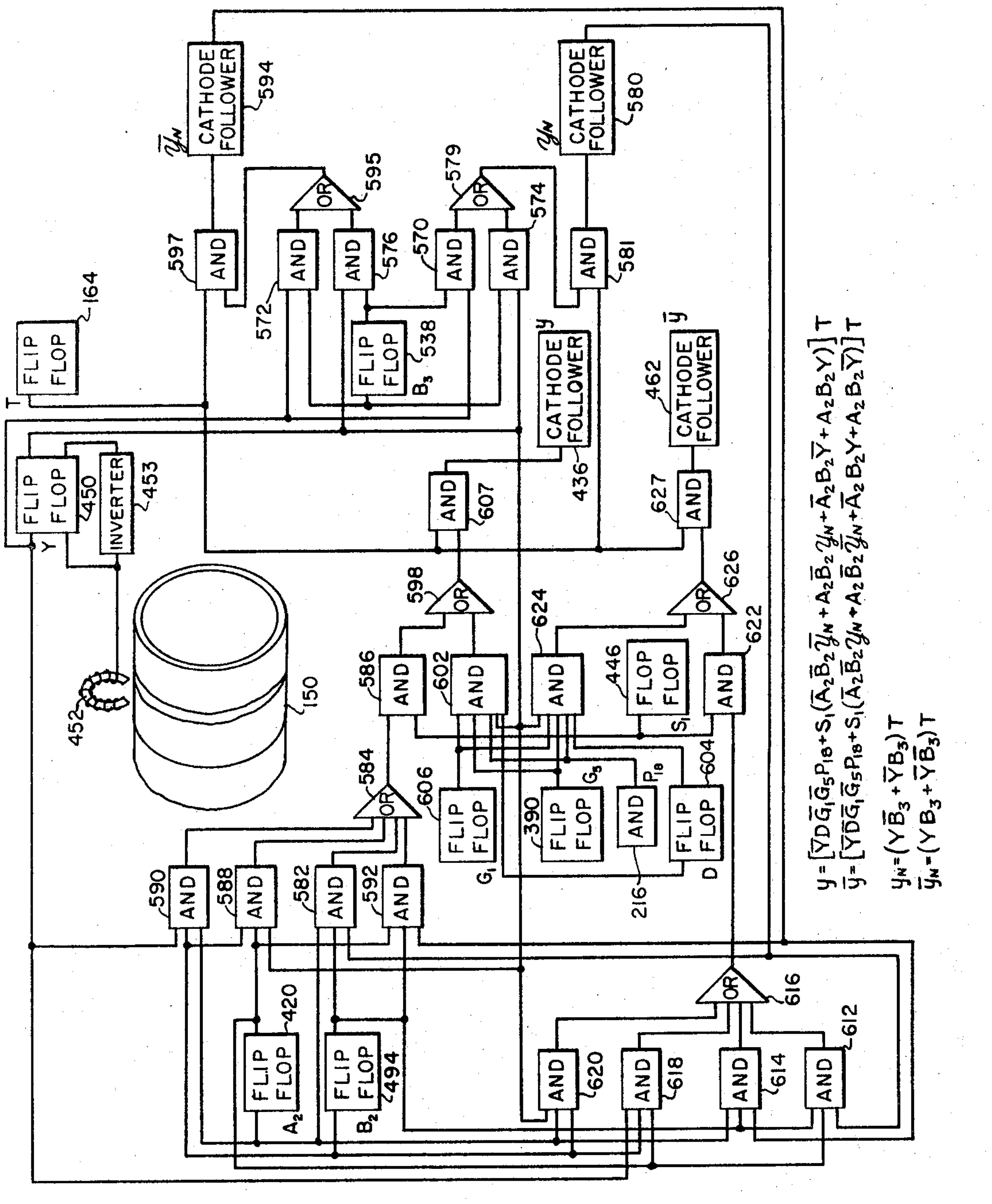

The flip-flop 450 shown in FIGURES 8 and 10 is also shown in FIGURE 11. The signals on the left output terminal of the flip-flop 450 are introduced to input terminals of "and" networks 570 and 572 and the signals on the right input terminal of the flip-flop 450 are introduced to input terminals of "and" networks 574 and 576. The "and" networks 572 and 574 have second input terminals connected to the left output terminal of the flip-flop 538 also shown in FIGURE 10. Similarly, connections are made from the right output terminal of the flip-flop 538 to second input terminals of the "and" networks 570 and 576.

The signals from the "and" networks 570 and 574 pass through an "or" network 579 to an input terminal of an "and" network 581 having another input terminal connected to the left output terminal of the flip-flop 164. The signals from the "and" network 581 in turn pass to an input terminal of a cathode follower 580, the output terminal of which is connected to an input terminal of an "and" network 582. Other input terminals of the "and" network 582 are connected to the left output terminal of the flip-flop 420 also shown in FIGURE 8 and to the right output terminal of the flip-flop 494 also shown in FIGURE 10. The signals from the "and" network 582 in turn pass through an "or" network 584 to an "and" network 586. Signals from "and" networks 588, 590 and 592 also pass through the "or" network 584 to the "and" network 586.

Input terminals of the "and" network 588 are connected to the left output terminal of the flip-flop 494 and to the right output terminals of the flip-flops 420 and 450. The "and" network 590 has input terminals connected to the left output terminals of the flip-flops 420, 450 and 494. Similarly, the "and" network 592 receives signals from the right output terminals of the flip-flops 420 and 494 and from a cathode follower 594. The cathode follower 594 in turn receives signals from an "and" network 597, the operation of which is controlled by signals from an "or" network 595 and the left output terminal of the flip-flop 164. Input terminals of the "or" network 595 are connected to the "and" networks 572 and 576.

In addition to receiving the signals passing through the "or" network 584, the "and" network 586 has signals introduced to it from the left output terminal of the flip-flop 446. The signals from the "and" network 586 are applied to an "or" network 598. Signals are also introduced to the "or" network 598 from an "and" network 602 having input terminals connected to an output terminal of the "and" network 216, the left output terminal of a flip-flop 604 and the right output terminals of the flip-flops 390, 606 and 450. The signals introduced to the "or" network 598 pass through the network to an input terminal of an "and" network 607 having another input terminal connected to the left output terminal of the flip-flop 164. The output signals from the "and" network 607 are in turn introduced to the cathode follower 436 also shown in FIGURE 8.

The output signals from the cathode followers 580 and 594 also respectively pass to input terminals of "and" networks 612 and 614. Other input terminals of the "and" network 612 are connected to the right output terminals of the flip-flops 420 and 494. In like manner, other input terminals of the "and" network 614 are connected to the left output terminal of the flip-flop 420 and the right output terminal of the flip-flop 494. The signals from the "and" networks 612 and 614 pass to an "or" network 616, which also receives signals from "and" networks 618 and 620.

Connections are made to input terminals of the "and" network 618 from the left output terminals of the flip-flops 450 and 494 and from the right output terminal of the flip-flop 420. In like manner, the input terminals of the "and" network 620 have voltages applied to them from the left output terminals of the flip-flops 420 and 494 and the right output terminal of the flip-flop 450.

The signals from the "or" network 616 are introduced to an input terminal of an "and" network 622 having a second input terminal connected to the left output terminal of the flip-flop 446. The signals from the "and" network 622 pass through an "or" network 626 to an input terminal for an "and" network 627 having another input terminal connected to the left output terminal of the flip-flop 164. The output signals from the "and" network 627 are introduced to the cathode follower 462 also shown in FIGURE 8. Signals from an "and" network 624 also pass through the "or" network 626 to the "and" network 627. The "and" network 624 has input terminals connected to the output terminal of the "and" network 216 and to the right output terminals of the flip-flops 390, 450, 604 and 606.

The logical networks shown in FIGURE 11 are included to control the passage of signals to the cathode followers 436 and 462 shown in both FIGURES 8 and 11. The cathode followers 436 and 462 in turn operate in conjunction with other stages to control the operation of the cathode followers 659 and 637, shown in FIGURE 12, these cathode followers having also been previously shown in FIGURE 8. The signals from the cathode follower 436 pass to an "and" network 634, which also receives signals from the right output terminal in the flip-flop 432 and from the cathode follower 637. Signals are introduced to the cathode follower 637 from an "and" network 639 having input terminals connected to an "or" network 636 and the left output terminal of the flip-flop 164.

The "or" network 636 receives signals from "and" networks 640 and 642. Input terminals of the "and" network 640 are connected to the left output terminals of flip-flops 458 and 646. Similarly, the "and" network 642 has input terminals connected to the right output terminals of the flip-flops 458 and 646. The left input terminal of the flip-flop 646 receives signals from a coil 648 disposed in contiguous relationship to the track 152. The coil 648 has electrical signals induced in it in accordance with the pattern of magnetic information in the track 152 as the drum 130 rotates. The signals from the coil 648 pass to the input terminal of an inverter 650 as well as the left input terminal of the flip-flop 646, the output terminal of the inverter 650 being connected to the right input terminal of the flip-flop 646.

"And" networks 652 and 654 perform functions similar to the "and" networks 640 and 642. The operation of the "and" network 652 is controlled by signals from the left output terminal of the flip-flop 646 and the right output terminal of the flip-flop 458. In like manner, the operation of the "and" network 654 is controlled by signals from the right output terminal of the flip-flop 646 and the left output terminal of the flip-flop 458.

The signals from the "and" networks 652 and 654 pass through an "or" network 656 to an input terminal of an "and" network 657 having another input terminal connected to the left output terminal of the flip-flop 164. The signals from the "and" network 657 are introduced to a cathode follower 659, which then passes the signals to an input terminal of an "and" network 658. Other input terminals of the "and" network 658 are connected to the cathode follower 436 and to the left output terminal of the flip-flop 432.

The signals from the "and" network 658 and from the "and" networks 634 and 638 pass through an "or" network 664. The signals then pass to an input terminal of an "and" network 667 having another input terminal connected to the left output terminal of the flip-flop 164 and having its output terminal connected to the cathode follower 437. Signals from "and" networks 660 and 461 also pass through the "or" network 664 to the "and" network 667. Connections are made to input terminals of the "and" network 660 from the cathode follower 659, the cathode follower 462 and the right output terminal of the flip-flop 432. Since the "and" network 461 is also shown in FIGURE 8, the connections to the "and" network have previously been described in detail.

Signals are introduced to the cathode follower 464 from an "and" network 669 having input terminals connected to an "or" network 655 and to the left output terminal of the flip-flop 164. The "or" network 665 in turn receives signals from a plurality of "and" networks 666, 668, 670, 672 and 441. The operation of the "and" network 666 is controlled by signals from the cathode followers 436 and 659 and from the right output terminal of the flip-flop 432. The "and" network 668 has voltages applied to it from the cathode followers 436 and 637 and the left output terminal of the flip-flop 432.

The "and" network 670 receives signals from the cathode followers 462 and 637 and the right output terminal of the flip-flop 432. Input terminals of the "and" network 672 are connected to the cathode followers 462 and 659 and to the left output terminal of the flip-flop 432. Since the "and" network 441 is also shown in FIGURE 8, the connections to the "and" network have previously been described in detail.

Figure 13:
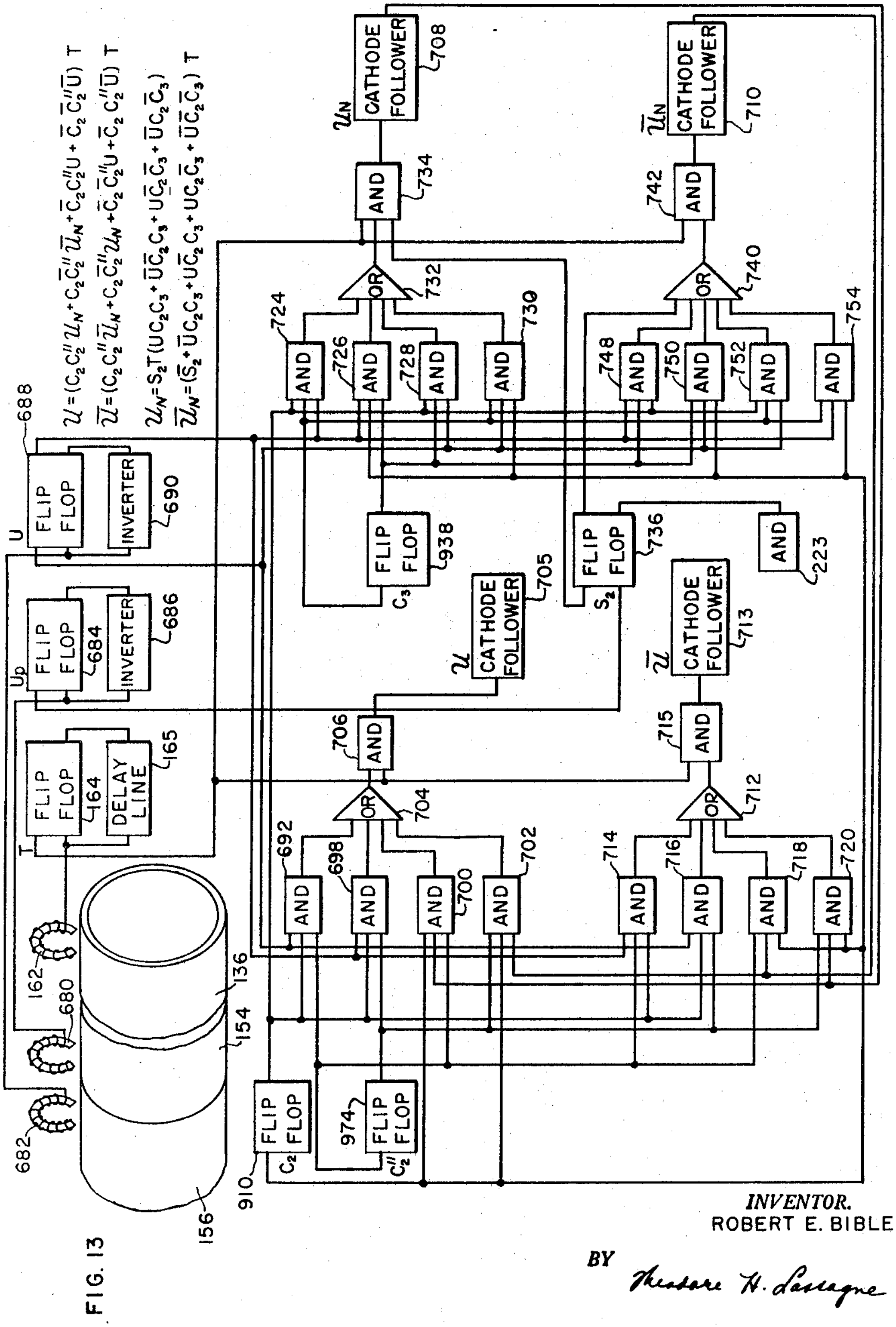

The stages shown in FIGURE 13 utilize the signals electrically induced in coils 680 and 682 in accordance with the pattern of magnetic information in the tracks 154 and 156. Signals are induced in the coils 680 and 682 because of the disposition of the coils in contiguous relationship to the tracks 154 and 156, respectively. Signals from the coil 680 pass to the left input terminal in a flip-flop 684 and to the input terminal in an inverter 686. Similarly,, the left input terminal in a flip-flop 688 and the input terminal in an inverter 690 receive signals from the coil 682. The output terminals of the inverters 686 and 690 are respectively connected to the right input terminals in the flip-flops 684 and 688.

The signals on the left output terminal of the flip-flop 688 pass to an input terminal of an "and" network 692 having other input terminals connected to the right output terminal in a flip-flop 910 and to the left output terminal in a flip-flop 974. Similarly, the signals on the right output terminal of the flip-flop 688 pass to an input terminal of an "and" network 698, other input terminals of which are connected to the right output terminals of the terminal of the flip-flop 974.

The output signals from the "and" networks 692 and 698 and from "and" networks 700 and 702 are introduced through an "or" network 704 to an input terminal of an "and" network 706 having another input terminal connected to the left output terminal of the flip-flop 164 and having its output terminal connected to a cathode follower 705. Signals are applied to the input terminals of the "and" network 700 from a cathode follower 708 and from the left output terminals of the flip-flops 910 and 974. The input terminals of the "and" network 702 are connected to a cathode follower 710, to the left output terminal of the flip-flop 910 and to the right output terminal of th flip-flop 974.

A cathode follower 713 is adapted to receive signals representing the inverse of the information passing to the cathode follower 705. The cathode follower 713 is connected to the output terminal of an "and" network 715, the input terminals of which receive voltages from an "or" network 712 and the left output terminal of the flip-flop 164. The "or" network 712 passes the output signals from "and" networks 714, 716, 718 and 720. The "and" network 714 has voltages applied to it from the right output terminals in the flip-flops 688 and 910 and the left output terminal of the flip-flop 974. Similarly, the "and" network 716 has voltages applied to it from the right output terminals of the flip-flops 910 and 974 and from the left output terminal of the flip-flop 688. Input terminals of the "and" network 718 are connected to the cathode follower 710 and to the left output terminals of the flip-flops 910 and 974. The operation of the "and" network 720 is controlled by signals from the cathode follower 708, the left output terminal of the flip-flop 910 and the right output terminal of the flip-flop 974.

Logical networks are also shown in FIGURE 13 for controlling the operation of the cathode followers 708 and 710. These logical networks include an "and" network 724 having input terminals connected to the right output terminals in the flip-flops 688 and 910 and to the left output terminal in a flip-flop 938. The signals from the "and" network 724 and from "and" networks 726, 728 and 730 pass to an "or" network 732. Signals from the "or" network 732 and from the left output terminals of the flip-flop 164 and a flip-flop 736 are introduced to an "and" network 734. The output from the "and" network 734 is applied to the cathode follower 708.

As disclosed above, the "and" networks 724, 726, 728 and 730 control the operation of the "or" network 732. Input terminals of the "and" network 726 are connected to the right output terminals of the flip-flops 688 and 938 and to the left output terminal of the flip-flop 910. The "and" network 728 has input terminals connected to the right output terminals of the flip-flops 910 and 938 and to the left output terminal of the flip-flop 688. The "and" network 730 is operatively controlled by signals from the left output terminals of the flip-flops 688, 910 and 938.

The operation of the cathode follower 710 is controlled by signals from an "and" network 742, which receives signals from an "or" network 740 and from the left output terminal of the flip-flop 164. The "or" network 740 receives signals from the right output terminal of the flip-flop 736. Signals from "and" networks 748, 750, 752 and 754 also pass to the "or" network 740. Connections are made to input terminals of the "and" network 748 from the right output terminals of the flip-flops 688, 910 and 938. The "and" network 750 has input terminals connected to the left output terminals of the flip-flops 688 and 910 and the right output terminal of the flip-flop 938. The "and" network 752 receives at its input terminals signals from the left output terminals of the flip-flops 688 and 938 and from the right output terminal of the flip-flop 910. Voltages are applied to the "and" network 754 from the left output terminals of the flip-flops 910 and 938 and the right output terminal of the flip-flop 688.

Figure 14:
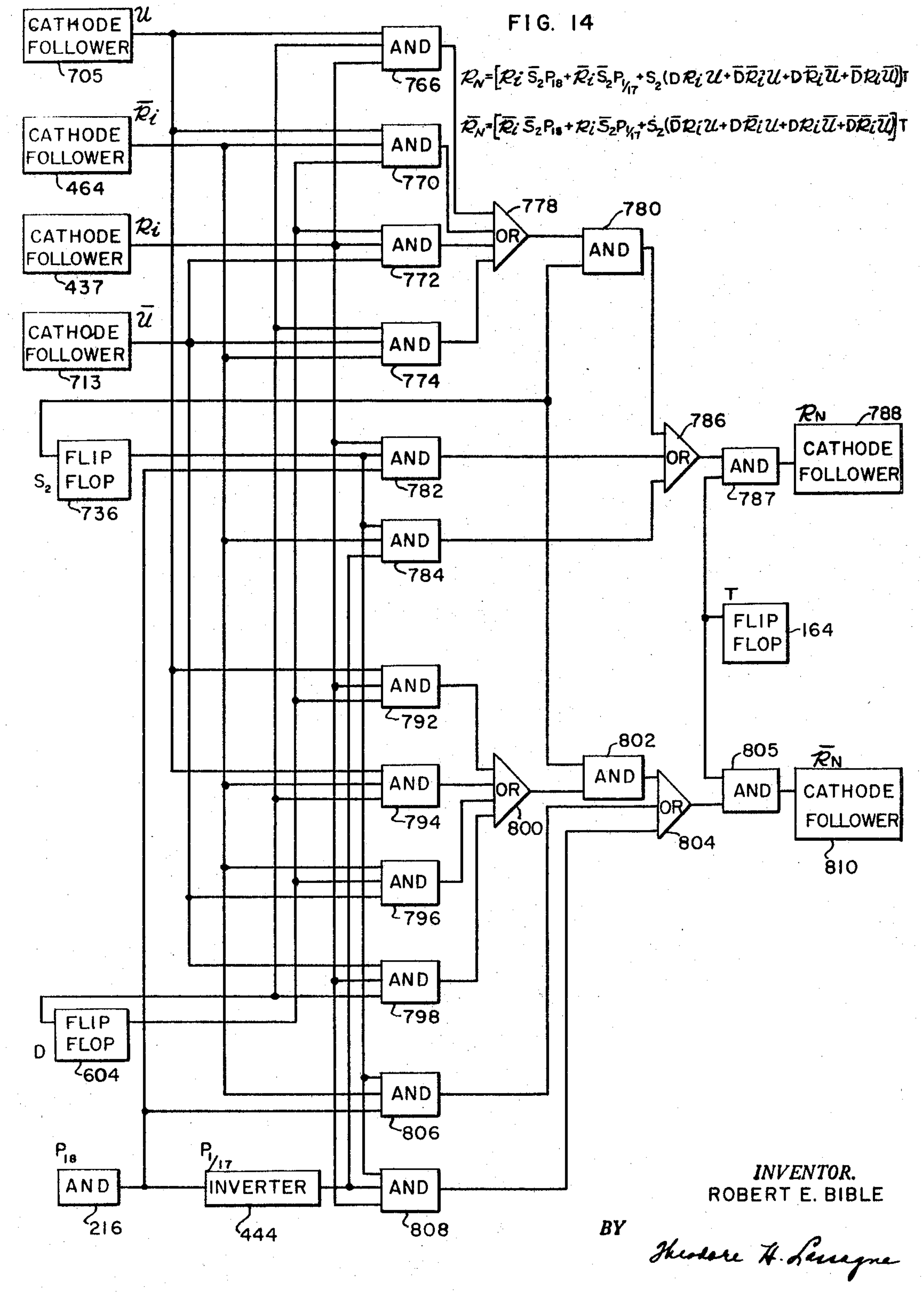

The cathode followers 437 and 464 shown in FIGURE 12 and the cathode followers 705 and 713 shown in FIGURE 13 are included in the circuitry illustrated in FIGURE 14. The output signals from the cathode followers 437 and 705 are introduced to input terminals of an "and" network 766, another input terminal of which is connected to the left output terminal of the flip-flop 604. Similarly, an "and" network 770 has signals applied to it from the cathode followers 464 and 705 and from the right output terminal of the flip-flop 604. An "and" network 772 receives voltages from the cathode followers 437 and 713 and from the right output terminal of the flip-flop 604. An "and" network 774 is operatively controlled by signals from the cathode followers 464 and 713 and from the left output terminal of the flip-flop 604.

The signals from the "and" network 766, 770, 772 and 774 pass through an "or" network 778 to an input terminal of an "and" network 780 having another input terminal connected to the left output terminal of the flip-flop 736. The signals from the "and" network 780 and from "and" networks 782 and 784 in turn pass through an "or" network 786 to an input terminal of an "and" network 787 having another input terminal connected to the left output terminal of the flip-flop 164 and having its output terminal connected to a cathode follower 788. The operation of the "and" network 782 is controlled by the signals from the cathode follower 437, the "and" network 216 and the right output terminal of the flip-flop 736. Signals are applied to the "and" network 784 from the cathode follower 464, the inverter 444 and the right output terminal of the flip-flop 736.

"And" networks 792, 794, 796 and 798 perform functions similar to the "and" networks 766, 770, 772 and 774. The "and" network 792 receives signals from the cathode followers 437 and 705 and from the right output terminal of the flip-flop 604. Voltages are applied to the "and" network 794 from the cathode followers 464 and 705 and from the left output terminal of the flip-flop 604. The "and" network 796 has input terminals connected to the cathode followers 464 and 713 and to the right output terminal of the flip-flop 604. Connections are made to input terminals of the "and" network 798 from the cathode followers 437 and 713 and from the left output terminal of the flip-flop 604.

The signals from the "and" networks 792, 794, 796 and 798 pass through an "or" network 800 to an input terminal of an "and" network 802, another input terminal of which is connected to the left output terminal of the flip-flop 736. The signals from the "and" network 802 and from "and" networks 806 and 808 in turn pass through an "or" network 804 to an input terminal of an "and" network 805 having another input terminal connected to the left output terminal of the flip-flop 164 and having its output terminal connected to a cathode follower 810. Input terminals of the "and" network 806 are connected to the cathode follower 464, the "and" network 216 and the right output terminal of the flip-flop 736. Voltages are applied to input terminals of the "and" network 808 from the cathode follower 437, the inverter 444 and the right output terminal of the cathode follower 736.

Figure 15:
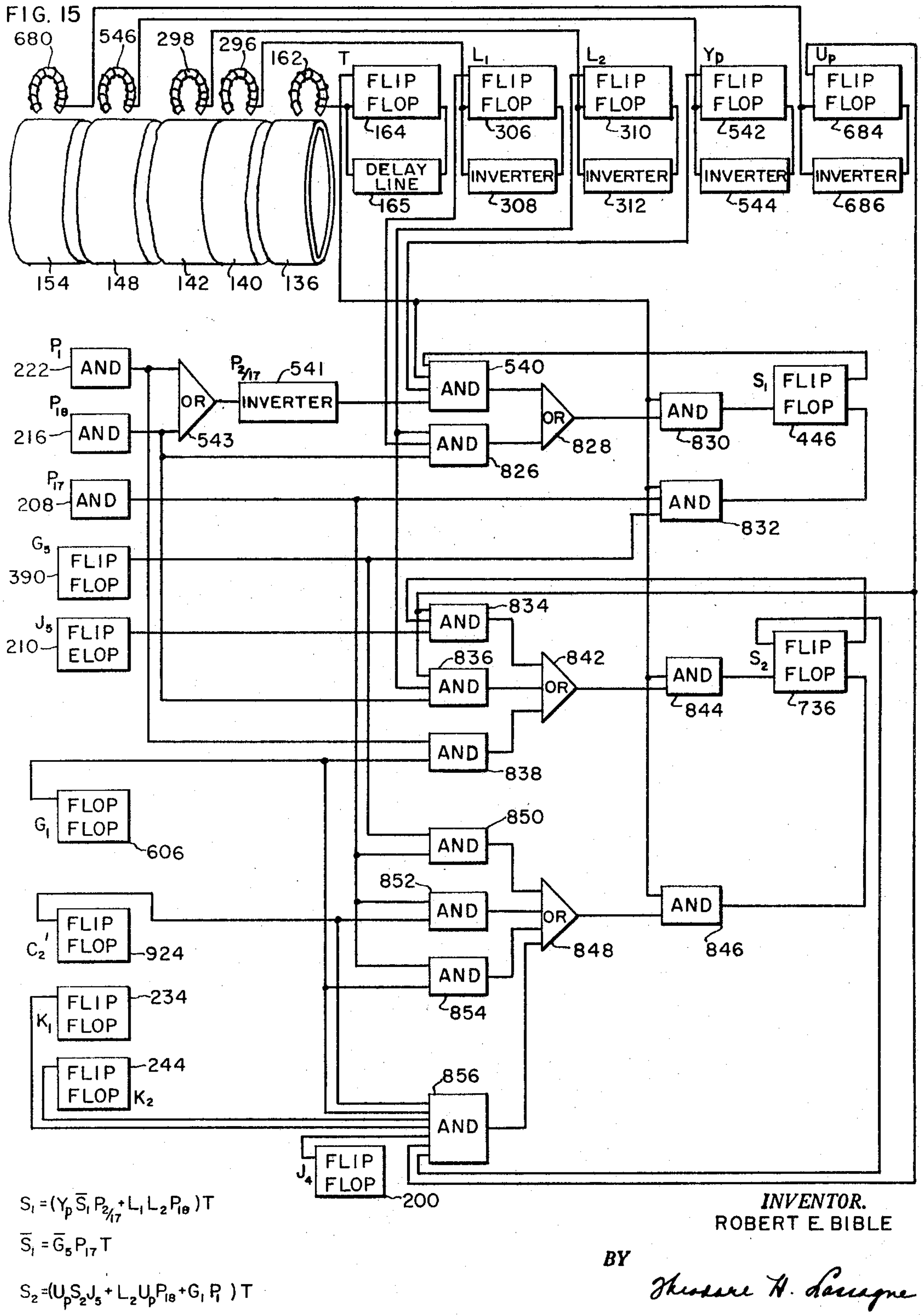

In FIGURE 15, stages are shown for controlling the operation of the flip-flop 446 shown in FIGURE 12 and the flip-flop 736 shown in FIGURES 12 and 13. The stages include the "and" network 540, which receives signals from the inverter 541 and the flip-flops 446 and 542 as described above and shown in FIGURE 10. An "and" network 826 is associated with the "and" network 540. Input terminals of the "and" network 826 are connected to the "and" network 216 and to the left output terminals of the flip-flops 306 and 310. The signals from the "and" networks 540 and 826 pass through an "or" network 828 to an "and" network 830 having a second input terminal connected to the left output terminal of the flip-flop 164. The signals from the "and" network 826 are intum introduced to the left input terminal of the flip-flop 446 to trigger the flip-flop.

The operation of the flip-flop 446 is also controlled by signals which are introduced to the right input terminal of the flip-flop from an "and" network 832. Signals are received by the "and" network 832 from the output terminal of the "and" network 208, the left output terminal of the flip-flop 164 and the right output terminal of the flip-flop 390.

"And" networks 834, 836 and 838 are included in the stages which control the operation of the flip-flop 736. Connections are made to input terminals of the "and" network 834 from the left output terminal of the flip-flop 684 and from the right output terminals of flip-flops 210 and 736. Input terminals of the "and" network 836 are connected to the "and" network 216 and to the left output terminals of the flip-flops 310 and 684. The "and" network 838 receives signals from the "and" network 222 and the left output terminal of the flip-flop 606.

The signals from the "and" networks 834, 836 and 838 pass through an "or" network 842 to an input terminal of an "and" network 844, input terminals of which are connected to the left output terminal of the flip-flop 164. The signals from the "and" network 844 are in turn introduced to the left input terminal of the flip-flop 736 to control the operation of the flip-flop.

Signals are applied to the right input terminal of the flip-flop 736 from an "and" network 846 having input terminals connected to an "or" network 848 and to the left output terminal in the flip-flop 164. The "or" network 848 receives signals from "and" networks 850, 852, 854 and 856. First input terminals of the "and" networks 850, 852 and 854 are connected to the "and" network 208. Second input terminals of the "and" networks 850, 852 and 854 respectively have voltages applied to them from the right output terminal of the flip-flop 390, the left output terminal of a flip-flop 924 and the left output terminal of the flip-flop 606. The operation of the "and" network 856 is controlled by the voltages on the left output terminals of the flip-flops 200, 234, 244, 606, 684, 736 and 924.

In FIGURE 16, stages are shown for controlling the operation of flip-flops 860, 862 and 864. The stages include an "and" network 866 having input terminals connected to the left output terminals of flip-flops 868, 164, 306 and 310, to the right output terminal of the flip-flop 860 and to the output of an inverter 444. The signals from the "and" network 866 are introduced to the left input terminal of the flip-flop 860.

Signals are introduced to the right input terminal of the flip-flop 860 in accordance with the operation of an "and" network 870, input terminals of which are connected to an "or" network 872 and to the left output terminal of the flip-flop 164. The "or" network 872 receives signals from "and" networks 874 and 876. Connections are made to input terminals of the "and" network 874 from the left output terminals of the flip-flops 306, 310, 860 and 868. Input terminals of the "and" network 876 are connected to the "and" network 216 and the left output terminal of the flip-flop 310.

"And" networks 880 and 882 are included for controlling the operation of the flip-flop 862. Signals are applied to input terminals of the "and" network 880 from the cathode follower 328 also shown in FIGURE 6, the left output terminals of the flip-flops 306, 310, 860 and 868 and the right output terminal of the flip-flop 862. The operation of the "and" network 882 is controlled by voltages from the cathode follower 364 also shown in FIGURE 6, the left output terminals of the flip-flops 306, 310 and 868 and the right output terminals of the flip-flops 860 and 862. The signals from the "and" networks 880 and 882 pass through an "or" network 884 to an input terminal of an "and" network 886 having other input terminals connected to the left output terminal of the flip-flop 164 and to the output terminal of inverter 444. The signals from the "and" network 886 are applied to the left input terminal of the flip-flop 862 to trigger the flip-flop.

"And" networks 890 and 892 corresponding to the "and" networks 880 and 882 control in part the signals passing to the right input terminal of the flip-flop 862. The "and" network 890 has signals applied to its input terminals from the cathode follower 328 and the left output terminals of the flip-flops 306, 310, 860, 862 and 868. The "and" network 892 receives voltages at its input terminals from the cathode follower 364, the left output terminals of the flip-flop 306, 310, 862 and 868 and the right output terminal of the flip-flop 860. Signals from the "and" networks 890 and 892 and from the "and" network 876 pass through an "or" network 894 to an input terminal of an "and" network 896. Another input terminal of the "and" network 896 is connected to the left output terminal of the flip-flop 164, and the output terminal of the "and" network is connected to the right input terminal of the flip-flop 862.

Signals pass to the right input terminal in the flip-flop 864 from an "and" network 900. Connections are made to input terminals of the "and' 'network 900 from the cathode follower 364, the left output terminals of the flip-flops 164, 306, 310 and 868 and the right output terminals of the flip-flops 860 and 862. Signals are introduced to the left input terminal of the flip-flop 864 in accordance with the operation of "and" networks 902 and 904 and an "or" network 906. Input terminals of the "and" network 902 have signals applied to them from the cathode follower 328 and the left output terminals of the flip-flops 306, 310, 860, 862 and 868. Signals from the "and" network 902 and the "and" network 876 pass through the "or" network 906 to the "and" network 904, another input terminal of which is connected to the left output terminal of the flip-flop 164. The signals from the "and" network 904 are applied to the left input terminal of the flip-flop 864 to trigger the flip-flop.

Figure 17:
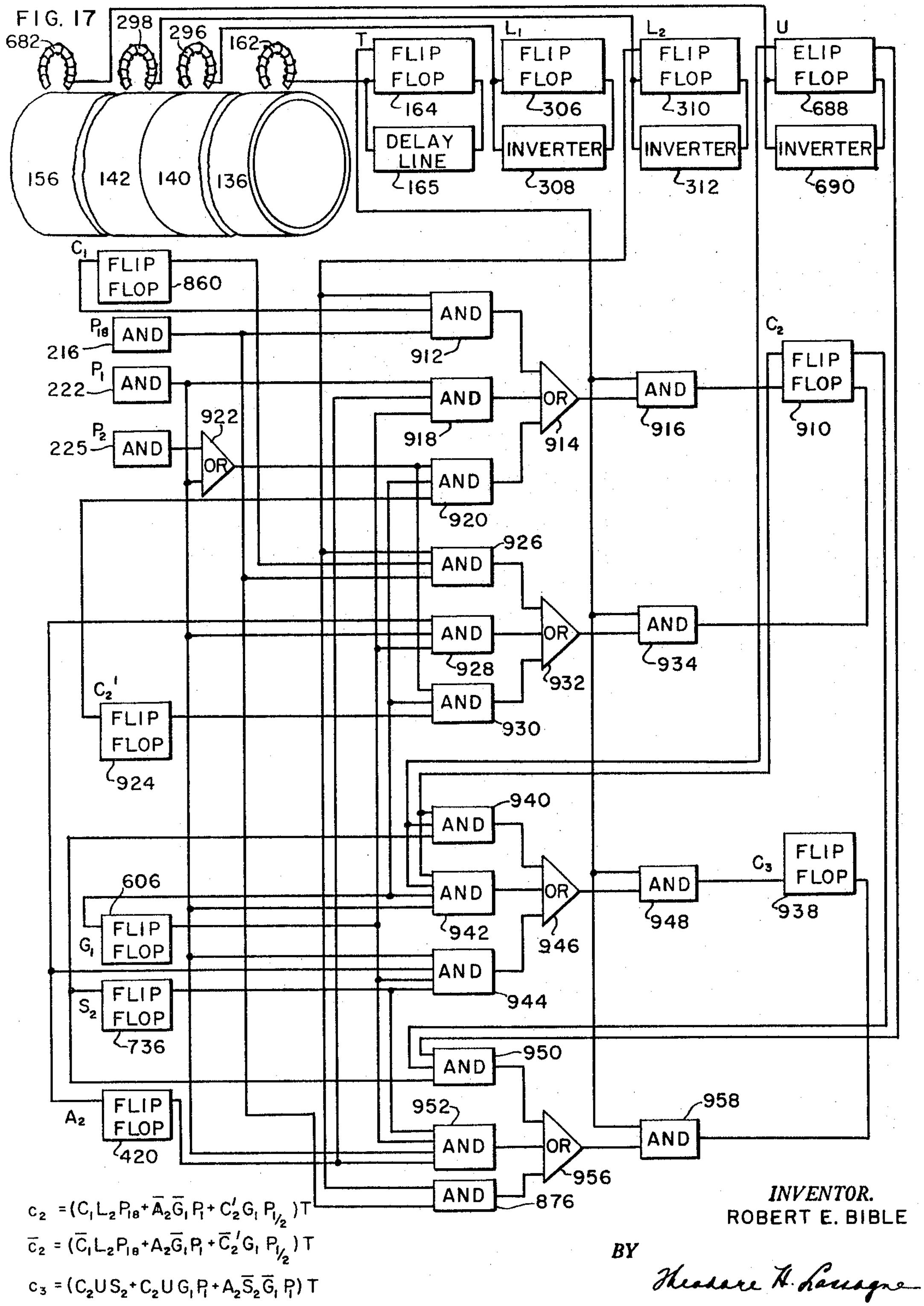

The flip-flop 860 shown in FIGURE 16 is included in FIGURE 17 to control the operation of the flip-flop 910 (previously shown in FIGURE 13). The voltage on the left output terminal of the flip-flop 860 is applied to an input terminal of an "and" network 912, which also receives voltages from the "and" network 216 and the left output terminal of the flip-flop 310. The signals from the "and" network 912 pass through an "or" network 914 to an input terminal of an "and" network 916 having another input terminal connected to the left output terminal of the flip-flop 164. The output terminal from the "and" network 916 is connected to the left input terminal of the flip-flop 910.

Signals from "and" networks 918 and 920 also pass through the "or" network 914 to the "and" network 916. Signals are received at input terminals of the "and" network 918 from the "and" network 222 and from the right output terminals of the flip-flops 420 and 606. The operation of the "and" network 920 is controlled by the voltages from an "or" network 922 and the left output terminals of the flip-flop 606 and the flip-flop 924 (also shown in FIGURE 15). The "or" network 922 receives signals from the "and" network 222 and an "and" network 225. It is believed that a person skilled in the art would be able to construct the "and" network 225 to obtain a signal at position 2 in each block. A person skilled in the art would be able to construct the "and" network 225 in view of the discussion relating to other "and" networks such as network 222 and the chart shown in FIGURE 32.

"And" networks 926, 928 and 930 are included to control the signals passing to the right input terminal of the flip-flop 910. The "and" network 926 has input terminals connected to the "and" network 216, the left output terminal of the flip-flop 310 and the right output terminal of the flip-flop 860. Connections are made to input terminals of the "and" network 928 from the "and" network 222, the left output terminal of the flip-flop 420 and the right output terminal of the flip-flop 606. The "and" network 930 receives voltages at its input terminals from the "or" network 922, the left output terminal of the flip-flop 606 and the right output terminal of the flip-flop 924. The signals from the "and" networks 926, 928 and 930 pass through an "or" network 932 to an input terminal of an "and" network 934 having another input terminal connected to the left output terminal of the flip-flop 164. The signals from the "and" network 934 are applied to the right input terminal of the flip-flop 910.

Logical networks are also shown in FIGURE 17 for controlling the operation of a flip-flop 938. These stages include "and" networks 940, 942 and 944. Signals are applied to the "and" network 940 from the left output terminals of the flip-flops 688, 736 and 910. The "and" network 942 has voltages introduced to it from the "and" network 222 and the left output terminals of the flip-flops 606, 688 and 910. The "and" network 944 receives voltages at its input terminals from the "and" network 222, the left output terminal of the flip-flop 420 and the right output terminals of the flip-flops 606 and 736. The signals from the "and" networks 940, 942 and 944 pass through an "or" network 946 to an input terminal of an "and" network 948, another input terminal of which is connected to the left output terminal of the flip-flop 164. The output signals from the "and" network 948 in turn pass to the left input terminal of the flip-flop 938 to trigger the flip-flop.

"And" networks 950 and 952 respectively correspond to the "and" networks 940 and 942. The "and" network 950 has input terminals connected to the left output terminal of the flip-flop 736 and the right output terminals of the flip-flops 688 and 910. The "and" network 952 has voltages applied to it from the "and" network 222 and the right output terminals of the flip-flops 420, 606 and 736. The signals from the "and" networks 950 and 952 and from the "and" network 876 (also shown in FIGURE 16) pass through an "or" network 956 to an input terminal of an "and" network 958 having another input terminal connected to the left output terminal of the flip-flop 164. The signals from the "and" network 958 are applied to the right input terminal of the flip-flop 938.

FIGURE 18 shows stages for controlling the operation of the flip-flop 924 also shown in FIGURE 17 and the operation of cathode followers 962 and 964. "And" stages 966, 968, 970 and 972 control in part the triggering signals introduced to the flip-flop 924. The "and" network 966 has input terminals connected to the "and"

network 216 and to the left output terminals of the flip-flops 310 and 862. The "and" network 968 has voltages applied to its input terminals from the "and" network 222, the left output terminal of the flip-flop 606 and the right output terminal of the flip-flop 974. The "and" network 970 receives voltages at its input terminals from the "and" network 216 and from the right output terminals of the flip-flops 306, 310 and 390. Voltages are applied to the input terminals of the "and" network 972 from the "and" network 225 (also shown in FIGURE 16) and the left output terminals of the flip-flop 606 and a flip-flop 976.

The signals from the "and" networks 966, 968, 970 and 972 pass through an "or" network 978 to an input terminal of an "and" network 980, another input terminal of which is connected to the left output terminal of the flip-flop 164. The signals passing through the "and" network 980 are in turn applied to the left input terminal of the flip-flop 924 to trigger the flip-flop into the "true" state of operation of the flip-flop.

"And" networks 984, 986, 988 and 990 control in part the signals passing to the right input terminal of the flip-flop 924. Connections are made to input terminals of the "and" network 984 from the "and" network 216, the left output terminal of the flip-flop 310 and the right output terminal of the flip-flop 862. Input terminals of the "and" network 986 are connected to the "and" network 222 and the left output terminals of the flip-flops 606 and 974. The "and" network 988 receives voltages from the "and" network 216, the left output terminal of the flip-flop 306 and the right output terminals of the flip-flops 310 and 390. Voltages are applied to input terminals of the "and" network 990 from the "and" network 225, the left output terminal of the flip-flop 606 and the right output terminal of the flip-flop 976.

The output signals from the "and" networks 984, 986, 988 and 990 pass through an "or" network 992 to an input terminal of an "and" network 994. Another input terminal of the "and" network 994 is connected to the left output terminal of the flip-flop 164, and the output terminal of the "and" network is connected to the right input terminal of the flip-flop 924. Signals from an "and" network 996 also pass through the "or" network 992 to the "and" network 994. Input terminals of the "and" network 996 receive voltages from the "and" network 208, "or" networks 998 and 1000 and the right output terminal of the flip-flop 606.

Voltages are applied to input terminals of the "or" network 998 from an "or" network 1002 and from the right output terminal of the flip-flop 456. The operation of the "or" network 1002 is controlled by the voltages from the cathode followers 464 and 705 and from the right output terminal of the flip-flop 604. Similarly, the "or" network 1000 receives at its input terminals voltages from an "or" network 1008 and from the left output terminal of the flip-flop 456. Signals pass to the "or" network 1008 from the cathode followers 437 and 713 and from the left output terminal of the flip-flop 604. The signals from the "or" networks 1002 and 1008 pass to input terminals of an "and" network 1010, other input terminals of which are connected to the "and" network 208 and to the left output terminal of the flip-flop 164. The output signals from the "and" network 1010 are in turn applied to the cathode follower 962.

The cathode follower 964 receives signals through an "or" network 1012 from "and" networks 1014 and 1016. Input terminals of the "and" network 1014 are connected to the cathode followers 437 and 713 and to the left output terminals of the flip-flops 164 and 604. Connections are made to input terminals of the "and" network 1016 from the cathode followers 464 and 705, the left output terminal of the flip-flop 164 and the right output terminal of the flip-flop 604.

Figure 19:
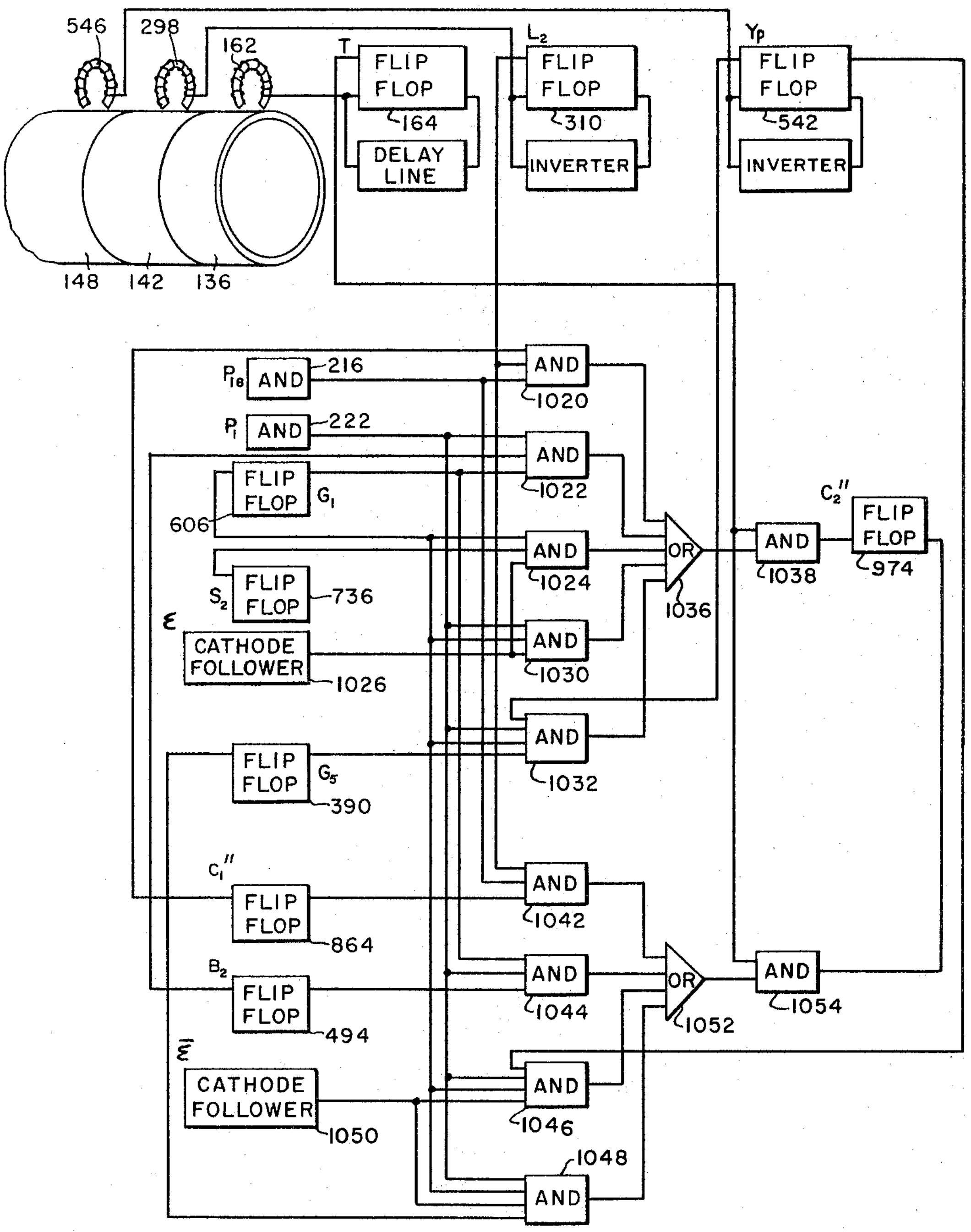

"And" networks 1020, 1022 and 1024 are shown in FIGURE 19. Signals are applied to the "and" network 1020 from the "and" network 216 and from the left output terminals of the flip-flops 310 and 864. The "and" network 1022 has voltages applied to it from the "and" network 222, the left output terminal of the flip-flop 494 and the right output terminal of the flip-flop 606. The "and" network 1024 receives voltages from a cathode follower 1026 and the left output terminals of the flip-flops 606 and 736.

The "and" networks 1020, 1022 and 1024 are associated with "and" networks 1030 and 1032. Connections are made to input terminals of the "and" network 1030 from the "and" network 222, the cathode follower 1026 and the left output terminal of the flip-flop 606. The operation of the "and" network 1032 is controlled by signals from the "and" network 222, the left output terminals of the flip-flops 542 and 606 and the right output terminal of the flip-flop 390.

The signals from the "and" networks 1020, 1022, 1024, 1030 and 1032 are applied through an "or" network 1036 to an input terminal of an "and" network 1038 having another input terminal connected to the left output terminal of the flip-flop 164. The output signals from the "and" network 1038 in turn pass to the left input terminal of the flip-flop 974 to trigger the flip-flop to its "true" state of operation.

"And" networks 1042, 1044, 1046 and 1048 are associated with one another to control the signals passing to the right input terminal of the flip-flop 974. Voltages are applied to the "and" network 1042 from the "and" network 216, the left output terminal of the flip-flop 310 and the right output terminal of the flip-flop 864. The "and" network 1044 receives signals from the "and" network 222 and the right output terminals of the flip-flops 494 and 606.

Signals are introduced to the "and" network 1046 from the "and" network 222, a cathode follower 1050, the left output terminal of the flip-flop 606 and the right output terminal of the flip-flop 542. Input terminals of the "and" network 1048 are connected to the "and" network 222, the cathode follower 1050 and the left output terminals of the flip-flops 390 and 606.

The signals from the "and" networks 1042, 1044, 1046 and 1048 pass through an "or" network 1052 to an input terminal of an "and" network 1054. Another input terminal of the "and" network 1054 is connected to the left output terminal of the flip-flop 164. The output terminal of the "and" network 1054 is connected to the right input terminal of the flip-flop 974.

Figure 20:
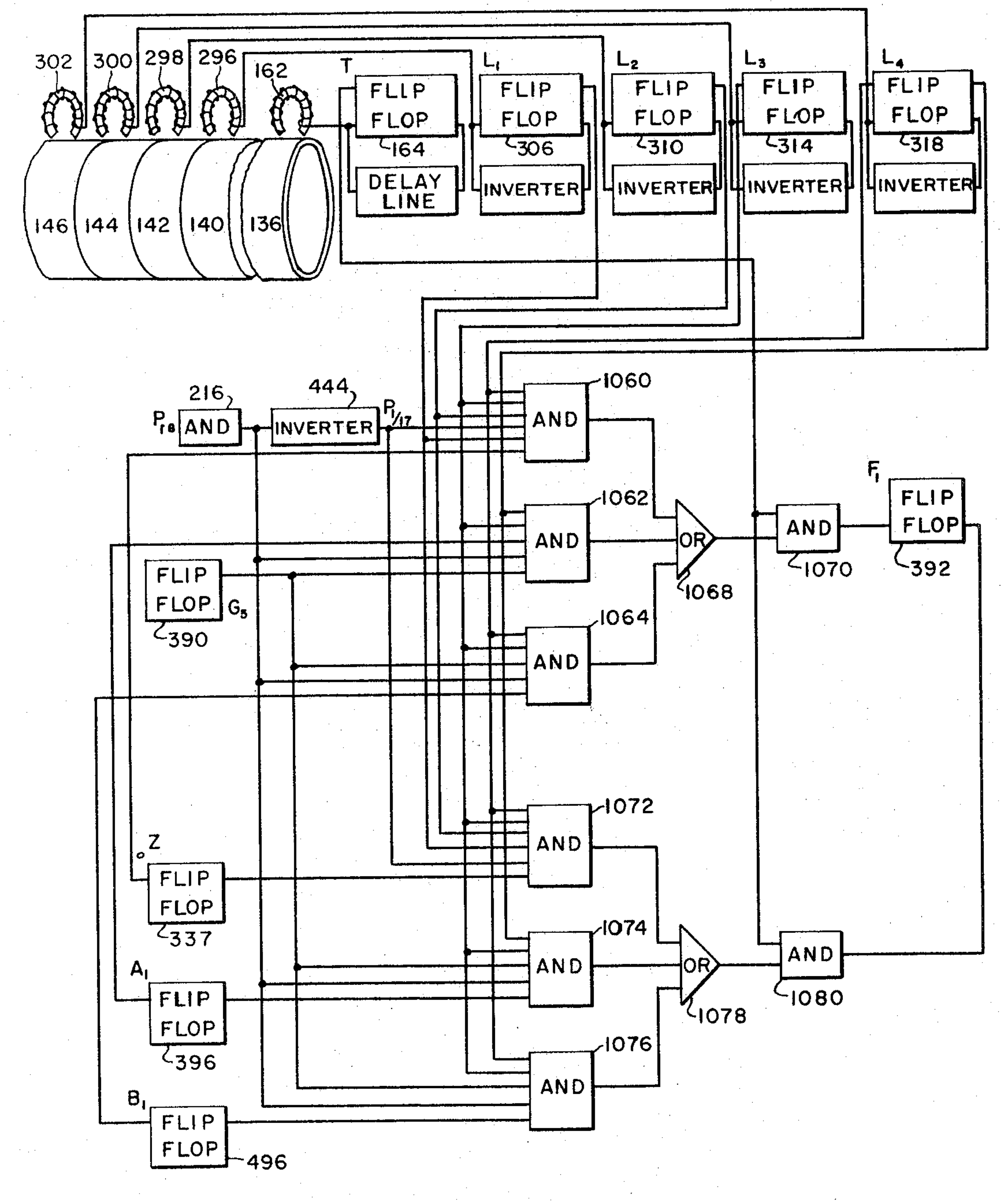

Stages are shown in FIGURE 20 for passing triggering signals to the input terminals of the flip-flop 392 also shown in FIGURE 9. The stages include "and" networks 1060, 1062 and 1064. The operation of the "and" network 1060 is controlled by signals from the inverter 444, the right output terminals in the flip-flops 306 and 310 and the left output terminals in the flip-flops 314 and 318, and in the flip-flop 337. The "and" network 1062 receives voltages from the "and" network 216, the left output terminals of the flip-flops 314 and 396 and the right output terminals of the flip-flops 318 and 390. The "and" network 1064 has signals applied to it from the "and" network 216, the left output terminals of the flip-flops 314, 318 and 496, and the right output terminal of the flip-flop 390.

The signals from the "and" networks 1060, 1062 and 1064 are introduced through an "or" network 1068 to an input terminal of an "and" network 1070, another input terminal of which is connected to the left output terminal of the flip-flop 164. The signals from the "and" network 1070 are in turn applied to the left input terminal of the flip-flop 392 to trigger the flip-flop.

"And" networks 1072, 1074 and 1076 perform functions similar to the "and" networks 1060, 1062 and 1064. The "and" network 1072 has input terminals connected to the inverter 444, the left output terminals of the flip-flops 314 and 318 and the right output terminals of the flip-flops 306, 310 and 337. Voltages are applied to input terminals of the "and" network 1074 from the "and" network 216, the left output terminal of the flip-flop 314 and the right output terminals of the flip-flops 318, 390 and 396. Input terminals of the "and" network 1076 are connected to the "and" network 216, the left output terminals of the flip-flops 314 and 318 and the right output terminals of the flip-flops 390 and 496.

The signals from the "and" networks 1072, 1074 and 1076 pass through an "or" network 1078 to an input terminal of an "and" network 1080 having another input terminal connected to the left output terminal of the flip-flop 164. The signals from the "and" network 1080 are applied to the right input terminal of the flip-flop 392 to trigger the flip-flop.

The stages shown in FIGURE 21 control the operation of the flip-flop 456 also shown in FIGURE 8. These stages include "and" networks 1084, 1086 and 1090. The "and" network 1084 receives voltages at its input terminals from an "and" network 1088, the left output terminal of the flip-flop 390 and the right output terminal of the flip-flop 292. It is believed that a person skilled in the art would be able from the specification and the drawings to construct the "and" network 1088 to produce a signal at position 12 for each block.

Voltages are applied to the input terminals of the "and" network 1086 from the "and" network 208, the cathode followers 437 and 713, the left output terminals of the flip-flops 390, 604 and 924 and the right output terminal of the flip-flop 606. Connections are made to input terminals of the "and" network 1090 from the left output terminal of the flip-flop 314 and the right output terminals of the flip-flops 200, 210, 306, 310 and 318.

The signals from the "and" networks 1084, 1086 and 1090 pass through an "or" network 1092 to an input terminal of an "and" network 1094. Another input terminal of the "and" network 1094 is connected to the left output terminal of the flip-flop 164. The output terminal from the "and" network 1094 is connected to the left input terminal of the flip-flop 456.

The signals passing to the right input terminal of the flip-flop 456 are controlled in part by the operation of "and" networks 1096 and 1098. Signals pass to the "and" network 1096 from the "and" network 216 and the right output terminal of the flip-flop 390. The "and" network 1098 has voltages applied to it from the "and" network 208, the cathode followers 464 and 705, the left output terminals of the flip-flops 390 and 924 and the right output terminals of the flip-flops 604 and 606.

The signals from the "and" networks 1096 and 1098 pass through an "or" network 1100 to an input terminal of an "and" network 1102, another input terminal of which is connected to the left output terminal of the flip-flop 164. The signals from the "and" network 1102 are in turn introduced to the right input terminal of the flip-flop 456 to trigger the flip-flop into its "false" state of operation.

Signals from an "and" network 1104 are also introduced to the "or" network 1100. Input terminals of the "and" network 1104 are connected to the left output terminal of the flip-flop 542 and the right output terminals of the flip-flop 446 and 390. Other input terminals of the "and" network 1104 are connected to an "or" network 1106 and to the inverter 541 (also shown in FIGURE 10). The "or" network 1106 receives the output signals from "and" networks 1110 and 1112. The operation of the "and" network 1110 is controlled by the voltages on the left output terminal of the flip-flop 420 and the right output terminal of the flip-flop 494. Similarly, the "and" network 1112 operates in accordance with the voltages on the left output terminal of the flip-flop 494 and the right output terminal of the flip-flop 420.

Just as the operation of the flip-flop 456 is controlled by the stages shown in FIGURE 21, the operation of the flip-flop 458 (previously shown in FIGURE 8) in controlled by the stages represented in block form in FIGURE 22. These stages include a pair of "and" networks 1118 and 1120. The "and" network 1118 receives signals from an "and" network 1122 and the left output terminal of the flip-flop 390. It is believed that a person skilled in the art would be able to construct the "and" network 1122 from the specification and drawings so as to produce a signal at position 16 for each block.

Voltages are applied to the "and" network 1120 from the "and" network 216, the left output terminals of the flip-flops 390 and 924 and the right output terminals of the flip-flops 458 and 606. The signals from the "and" networks 1118 and 1120 pass through an "or" network 1124 to an input terminal of an "and" network 1126 having another input terminal connected to the left output terminal of the flip-flop 164. The signals from the "and" network 1126 are applied to the left input terminal of the flip-flop 458.

Signals from an "and" network 1130 also pass through the "or" network 1124 to the "and" network 1126. The "and" network 1130 has input terminals connected to an "or" network 1132, the inverter 541 also shown in FIGURES 10 and 21, the left output terminals of the flip-flops 456 and 542 and the right output terminal of the flip-flop 446. Voltages are applied to the "or" network 1132 from "and" networks 1134 and 1136. Input terminals of the "and" network 1134 are connected to the left output terminals of the flip-flops 420 and 450. Similarly, input terminals of the "and" network 1136 are connected to the right output terminals of the flip-flops 420 and 450.

An "and" network 1138 controls in part the signals passing to the right input terminal of the flip-flop 458. The "and" network 1138 receives at its input terminals signals from the "and" network 216 and the right output terminal of the flip-flop 390. The signals from the "and" network 1138 pass through an "or" network 1140 to an input terminal of an "and" network 1142. The output signals from the "and" network 1142 are introduced to the right input terminal of the flip-flop 458.

Signals from an "and" network 1143 also pass through the "or" network 1140 to the "and" network 1142. The "and" network 1143 receives voltages at its input terminals from the "and" network 208, the cathode follower 964, the left output terminal of the flip-flop 924 and the right output terminal of the flip-flop 606. Signals are also introduced to the "and" network 1143 from an "or" network 1144 having input terminals connected to "and" networks 1146 and 1148. Connections are made to input terminals of the "and" network 1146 from the right output terminals of the flip-flops 456 and 646. The "and" network 1148 has input terminals connected to the left output terminals of the flip-flops 456 and 646.

Signals from an "and" network 1150 as well as from the "and" networks 1138 and 1143 pass through the "or" network 1140. One input terminal of the "and" network 1150 is connected to an "or" network 1152. The "or" network 1152 receives voltages at its input terminals from the cathode follower 962, the left output terminals of the flip-flops 170 and 606 and the right output terminals of the flip-flops 210 and 924.

Another input terminal of the "and" network 1150 is connected to an "or" network 1154, the operation of which is controlled by "and" networks 1156 and 1158. The "and" network 1156 has input terminals connected to the left output terminal of the flip-flop 456 and the right output terminal of the flip-flop 646. Similarly, input terminals of the "and" network 1158 are connected to the left output terminal of the flip-flop 646 and the right output terminal of the flip-flop 456.

In FIGURE 23, stages are shown for controlling the triggering signals passing to the flip-flop 604 also shown in FIGURE 14. Two of these stages are "and" networks 1162 and 1164. Input terminals of the "and" network 1162 are connected to the cathode follower 708 and a cathode follower 1166 and to the left output terminals of the flip-flop 606 and a flip-flop 1168. The "and" network 1164 receives at its input terminals the voltages from the cathode follower 708 and a cathode follower 1170, the left output terminal of the flip-flop 606 and the right output terminal of the flip-flop 1168. The signals from the "and" networks 1162 and 1164 pass through an "or" network 1172 to an input terminal of an "and" network 1174, another input terminal of the "and" network 1174 being connected to the left output terminal of the flip-flop 164. The signals from the "and" network 1174 are introduced to the left input terminal of the flip-flop 604.

The "or" network 1172 also receives the output signals from "and" networks 1178, 1180 and 1182. The "and" network 1178 has input terminals connected to the cathode followers 437 and 705, the left output terminal of the flip-flop 736 and the right output terminal of the flip-flop 606. Connections are made to input terminals of the "and" network 1180 from the "and" network 222 and the right output terminals of the flip-flops 606 and 736. Voltages are applied to the "and" network 1182 from the "and" network 208, the left output terminal of the flip-flop 606 and the right output terminals of the flip-flops 736 and 976.

The "and" network 876 (previously shown in FIGURE 16) and "and" networks 1186 and 1188 are associated with one another to pass signals to the right input terminal of the flip-flop 604 under particular sets of circumstances. The "and" network 1186 passes a signal upon the simultaneous occurrence of high voltages from the cathode followers 710 and 1166, from the left output terminals of the flip-flops 606 and 736 and the right output terminal of the flip-flop 1168. Similarly, the "and" network 1188 passes a signal when high voltages simultaneously are introduced to it from the cathode followers 710 and 1170 and the left output terminals of the flip-flops 606, 736 and 1168.

"And" networks 1190 and 1192 are associated with the "and" networks 876, 1186 and 1188. Input terminals of the "and" network 1190 are connected to the cathode followers 464 and 713, the left output terminal of the flip-flop 736 and the right output terminal of the flip-flop 606. Connections are made to input terminals of the "and" network 1192 from the "and" network 208, the left output terminals of the flip-flops 606 and 976 and the right output terminal of the flip-flop 736.

The signals from the "and" networks 1190 and 1192 and from the "and" networks 876, 1186 and 1188 pass through an "or" network 1194 to an input terminal of an "and" network 1196. Another input terminal of the "and" network 1196 is connected to the left output terminal of the flip-flop 164. The output terminal of the "and" network 1196 is connected to the right input terminal of the flip-flop 604.

The signals on the left output terminal of the flip-flop 604 are introduced to input terminals of "and" networks 1200 and 1202. Connections are made to other input terminals of the "and" network 1200 from the cathode follower 710 and the right output terminal of the flip-flop 1168. Similarly, other input terminals of the "and" network 1202 receive signals from the cathode follower 708 and the left output terminal of the flip-flop 1168.

"And" networks 1204 and 1206 are associated with the "and" networks 1200 and 1202. The "and" network 1204 receives at its input terminals signals from the cathode follower 710, the left output terminal of the flip-flop 1168 and the right output terminal of the flip-flop 604. Similarly, the "and" network 1206 has voltages applied to it from the cathode follower 708 and the right output terminals of the flip-flops 604 and 1168.

The signals from the "and" networks 1200, 1202, 1204 and 1206 are introduced to an "or" network 1208. The "or" network 1208 in turn passes these signals to an input terminal of an "and" network 1210, another input terminal of the "and" network being connected to the left output terminal of the flip-flop 164. The cathode follower 1026 previously shown in FIGURE 19 receives the output signals from the "and" network 1210.

"And" networks 1216, 1218, 1220 and 1222 correspond to the "and" networks 1200, 1202, 1204 and 1206. The "and" network 1216 has input terminals connected to the cathode follower 710 and the left output terminals of the flip-flops 604 and 1168. Similarly, input terminals of the "and" network 1218 are connected to the cathode follower 708, the left output terminal of the flip-flop 604 and the right output terminal of the flip-flop 1168.

Voltages are applied to the "and" network 1220 from the cathode follower 708, the left output terminal of the flip-flop 1168 and the right output terminal of the flip-flop 604. The "and" network 1222 passes a signal upon the simultaneous occurrence of the proper voltages from the cathode follower 710 and the right output terminals of the flip-flops 604 and 1168.

The signals from the "and" networks 1216, 1218, 1220 and 1222 pass through an "or" network 1224 to an input terminal of an "and" network 1226, another input terminal of which is connected to the left output terminal of the flip-flop 164. The signals from the "and" network 1226 are applied to the cathode follower 1050 also shown in FIGURE 19.

An "and" network 1232 and an inverter 1234 are shown in FIGURE 24. The "and" network 1232 receives voltages from the right output terminals of the flip-flops 190, 200 and 210 and introduces its output signals to the inverter 1234. The output signals from the "and" network 1232 are also introduced to an input terminal of an "and" network 1236 having other input terminals connected to the left output terminals of the flip-flop 244 and a flip-flop 1238.

Similarly, the output from the inverter 1234 passes to an input terminal of an "and" network 1240, other input terminals of the "and" network 1240 being connected to the cathode follower 1050 and the left output terminals of the flip-flops 244, 736 and 976. The signals from the "and" networks 1236 and 1240 pass through an "or" network 1242 to an input terminal of an "and" network 1244 having another input terminal connected to the left output terminal of the flip-flop 164. The output signals from the "and" network 1244 are introduced to the left input terminal of a flip-flop 1246 to trigger the flip-flop.

"And" networks 1247 and 1248 correspond to the "and" networks 1236 and 1240. The "and" network 1247 has input terminals connected to the "and" network 1232, the left output terminal of the flip-flop 244 and the right output terminal of the flip-flop 1238. The "and" network 1248 receives voltages at its input terminals from the inverter 1234, the cathode follower 1026, the left output terminals of the flip-flops 244 and 736 and the right output terminal of the flip-flop 976. The output signals from the "and" networks 1247 and 1248 are introduced through an "or" network 1250 to an input terminal of an "and" network 1252. Another input terminal of the "and" network 1252 is connected to the left output terminal of the flip-flop 164. The signals from the "and" network 1252 pass to the right input terminal of flip-flop 1246 to trigger the flip-flop.

The "and" network 1240 is associated with an "and" network 1256 to control the operation of the flip-flop 1238. Connections are made to input terminals of the "and" network 1256 from the "and" network 1232 and the left output terminals of the flip-flops 244 and 976. An "or" network 1262 receives the output signals from the "and" networks 1240 and 1256 and passes these signals to an input terminal of an "and" network 1264 having another input terminal connected to the left output terminal of the flip-flop 164. The output from the "and" network 1264 is introduced to the left input terminal of the flip-flop 1238.

An "and" network 1266 performs functions similar to the "and" network 1256. The "and" network 1266 becomes operative upon the simultaneous introduction of high voltages from the "and" network 1232, the left output terminal of the flip-flop 244 and the right output terminal of the flip-flop 976. The signals from the "and" network 1266 and the "and" network 1248 are applied through an "or" network 1270 to an input terminal of an "and" network 1272, another input terminal of which is connected to the left output terminal of the flip-flop 164. The output signals from the "and" network 1272 in turn pass to the right input terminal of the flip-flop 1238 to trigger the flip-flop.

The operation of "and" networks 1274 and 1276 determines when signals pass from an "and" network 1278 to the left input terminal of the flip-flop 976. Input terminals of the "and" network 1274 are connected to the inverter 541 (also shown in FIGURE 10), the cathode follower 1026 and the left output terminals of the flip-flops 244 and 736. The "and" network 1276 becomes activated upon the simultaneous introduction of signals from the "and" network 222 and the left output terminals of the flip-flops 244 and 684. Signals from the "and" networks 1274 and 1276 pass through an "or" network 1280 to an input terminal of the "and" network 1278. Another input terminal of the "and" network 1278 is connected to the left output terminal of the flip-flop 164.

"And" networks 1284 and 1286 operate to control the signals passing from an "and" network 1288 to the right input terminal of the flip-flop 976. The "and" network 1284 receives at its input terminals signals from the inverter 541, the cathode follower 1050 and the left output terminals of the flip-flops 244 and 736. Voltages are applied to input terminals of the "and" network 1286 from the "and" network 222, the left output terminal of the flip-flop 244 and the right output terminal of the flip-flop 684. The output signals from the "and" networks 1284 and 1286 pass through an "or" network 1290 to an input terminal of the "and" network 1288, another input terminal of which is connected to the left output terminal of the flip-flop 164.

Figure 25:
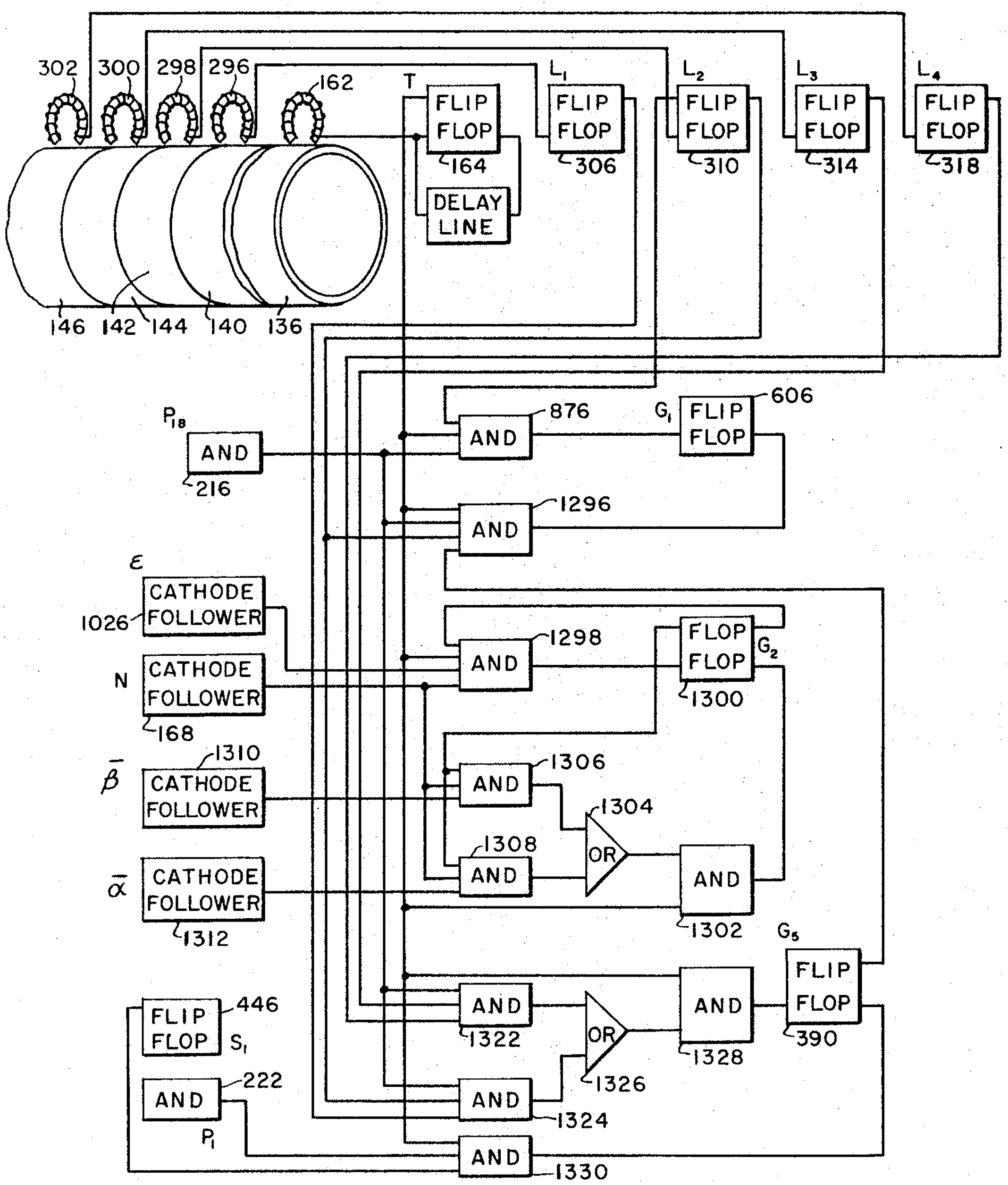

The "and" network 876 and an "and" network 1296 are shown in FIGURE 25 for controlling the operation of the flip-flop 606. The connections to the "and" network 876 have been previously described. Connections are made to input terminals of the "and" network 1296 and the "and" network 216, the left output terminal of the flip-flop 164 and the right output terminals of the flip-flops 310 and 390. The signals from the "and" networks 876 and 1296 respectively pass to the left and right input terminals of the flip-flop 606.

Signals from an "and" network 1298 are introduced to the left input terminal of a flip-flop 1300 to trigger the flip-flop. The "and" network 1298 passes a signal when relatively high voltages are simultaneously introduced to it from the cathode followers 168 and 1026, the left output terminal of the flip-flop 164 and the right output terminal of the flip-flop 1300. Signals pass to the right input terminal of the flip-flop 1300 from an "and" network 1302, input terminals of which are connected to an "or" network 1304 and to the left output terminal of the flip-flop 164. The "or" network 1304 in turn receives signals from "and" networks 1306 and 1308. The "and" network 1306 becomes activated upon the simultaneous introduction of signals from the cathode follower 168 and a cathode follower 1310 and from the left output terminal of the flip-flop 1300. The operation of the "and" network 1308 is controlled by signals from the cathode follower 168 and a cathode follower 1312 and from the left output terminal of the flip-flop 1300.

"And" networks 1322 and 1324 are associated with each other. Voltages are applied to input terminals of the "and" network 1322 from the "and" network 216 and the right output terminals of the flip-flops 314 and 318. The "and" network 1324 receives at its input terminals signals from the "and" network 216 and the right output terminals of the flip-flops 306 and 310. The signals from the "and" networks 1322 and 1324 are introduced through an "or" network 1326 to an input terminal of an "and" network 1328, another input terminal of which is connected to the left output terminal of the flip-flop 164. The signals from the "and" network 1328 pass to the left input terminal of the flip-flop 390 to trigger the flip-flop. The right input terminal of the flip-flop 390 has triggering signals applied to it from an "and" network 1330. Input terminals of the "and" network 1330 are connected to the "and" network 222 and the left output terminals of the flip-flops 164 and 446.

The left output terminal of a flip-flop 1332 is connected to a coil 1333 disposed in contiguous relationship to the channel 150 to record signals in the channel. The operation of the flip-flop 1332 is controlled by the stages shown in FIGURE 26. These stages include "and" networks 1334, 1336 and 1338. Voltages are applied to the "and" network 1334 from the cathode follower 580 and a cathode follower 1340, the left output terminal of the flip-flop 446 and the right output terminal of a flip-flop 1342. The "and" network 1336 receives voltages at its input terminals from the cathode follower 1340, the inverter 541, the left output terminal of the flip-flop 420 and the right output terminal of the flip-flop 446. The "and" network 1338 becomes operative when relatively high voltages are simultaneously introduced to it from the "and" network 216, the cathode follower 1340, the left output terminal of the flip-flop 450 and the right output terminal of the flip-flop 446. The signals from the "and" networks 1334, 1336 and 1338 pass through an "or" network 1346 to an input terminal of an "and" network 1348, another input terminal of which is connected to the left output terminal of the flip-flop 164. The output signals from the "and" network 1348 are introduced to the left input terminal of the flip-flop 1332.

"And" networks 1352, 1354 and 1356 are associated with the "and" networks 1334, 1336 and 1338 in passing signals through the "or" network 1346 to the "and" network 1348. The "and" network 1352 has input terminals connected to the cathode follower 1312 and the left output terminals of the flip-flops 446 and 542. The operation of the "and" network 1354 is controlled by signals from the cathode follower 1312, and the left output terminal of a flip-flop 1358 and the right output terminal of the flip-flop 446. Connections are made to input terminals of the "and" network 1356 from the left output terminals of the flip-flops 446, 542 and 1342.

"And" networks 1360, 1362 and 1364 perform functions similar to the "and" networks 1334, 1336 and 1338. The "and" network 1360 has voltages applied to it from the cathode followers 594 and 1340, the left output terminal of the flip-flop 446 and the right output terminal of the flip-flop 1342. The "and" network 1362 receives at its input terminals signals from the inverter 541, the cathode follower 1340 and the right output terminals of the flip-flops 420 and 446. The "and" network 1364 becomes operative upon the simultaneous introduction of high voltages from the "and" network 216, the cathode follower 1340 and the right output terminals of the flip-flops 446 and 450. The signals from the "and" networks 1360, 1362 and 1364 pass through an "or" network 1366 to an input terminal of an "and" network 1368 having another input terminal connected to the left output terminal of the flip-flop 164. The output from the "and" network 1368 is applied to the right input terminal of the flip-flop 1332 to trigger the flip-flop.

"And" networks 1370, 1372 and 1374 also pass signals through the "or" network 1366 to the "and" network 1368. The "and" network 1370 has input terminals connected to the cathode follower 1312, the left output terminal of the flip-flop 446 and the right output terminal of the flip-flop 542. Voltages are applied to input terminals of the "and" network 1372 from the cathode follower 1312 and from the right output terminals of the flip-flops 446 and 1358. The "and" network 1374 is operatively controlled by signals from the left output terminals of the flip-flops 446 and 1342 and the right output terminal of the flip-flop 542.

Figure 27:
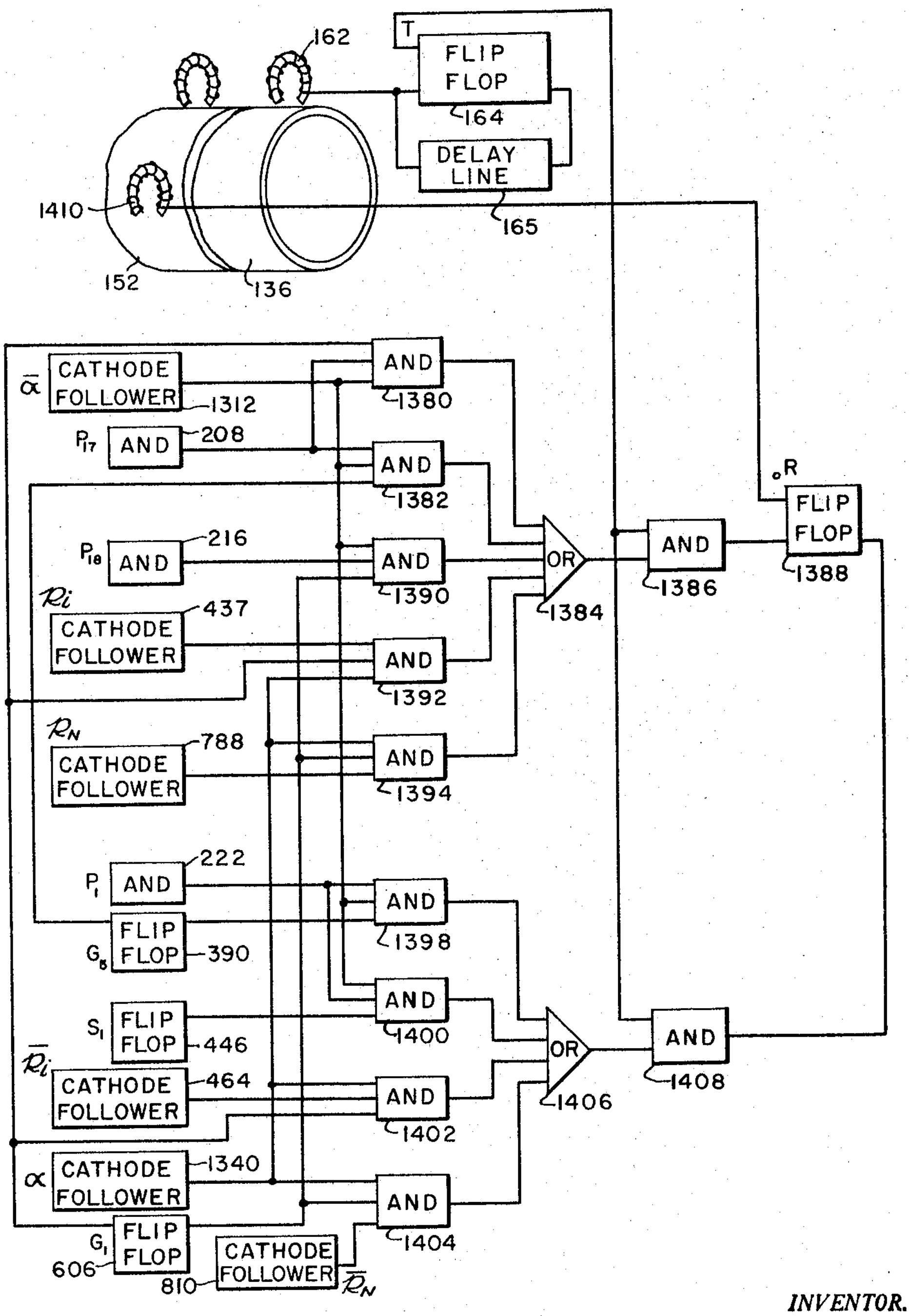

"And" networks 1380 and 1382 are shown in FIGURE 27. The "and" network 1380 becomes activated upon the simultaneous introduction of high voltages from the "and" network 208, the cathode follower 1312 and the left output terminal of the flip-flop 606. The "and" network 1382 passes a signal when it simultaneously receives high voltages from the "and" network 208, the cathode follower 1312 and the left output terminal of the flip-flop 390. The signals from the "and" networks 1380 and 1382 are introduced through an "or" network 1384 to an input terminal of an "and" network 1386, another input terminal of which is connected to the left output terminal of the flip-flop 164. The output signals from the "and" network 1386 are in turn applied to the left input terminal of the flip-flop 1388 to trigger the flip-flop. The flip-flop 1388 has been previously shown in FIGURE 8.

"And" networks 1390, 1392 and 1394 are associated with the "and" networks 1380 and 1382 in applying signals to the "or" network 1384. The "and" network 1390 receives signals from the "and" network 216, the cathode follower 1312 and the right output terminal of the flip-flop 606. The "and" network 1392 has input terminals connected to the cathode followers 437 and 1340 and the left output terminal of the flip-flop 606. Connections are made to input terminals of the "and" network 1394 from the cathode followers 788 and 1340 and the right output terminal of the flip-flop 606.

"And" networks 1398, 1400, 1402 and 1404 control the triggering signals passing to the right input terminal of the flip-flop 1388. The "and" network 1398 has voltages applied to it from the "and" network 222, the cathode follower 1312 and the right output terminal of the flip-flop 390. The "and" network 1400 receives at its input terminals signals from the "and" network 222, the cathode follower 1312 and the right output terminal of the flip-flop 446. Input terminals of the "and" network 1402 are connected to the cathode followers 464 and 1340 and the left output terminal of the flip-flop 606. The "and" network 1404 becomes activated upon the simultaneous introduction of high voltages from the cathode followers 810 and 1340 and the right output terminal of the flip-flop 606.

The output signals from the "and" networks 1398, 1400, 1402 and 1404 pass through an "or" network 1406 to an input terminal of an "and" network 1408 having another input terminal connected to the left output terminal of the flip-flop 164. The signals from the "and" network 1408 are in turn applied to the right input terminal of the flip-flop 1388. The signals from the left output terminal of the flip-flop 1388 are introduced to a coil 1410 disposed in contiguous relationship to the track 152 on the drum 130.

As will be described in detail hereinafter, the flip-flops 1332 and 1388 in FIGURES 26 and 27 respectively operate to record information in the tracks 150 and 152. Similarly, signals pass from the left output terminal of a flip-flop 1414 (FIGURE 28) to a coil 1416 disposed in contiguous relationship to the track 156 to record information in the track. The voltages on the left output terminal of the flip-flop 1414 are controlled in part by signals passing to the left input terminal of the flip-flop from an "and" network 1418. Input terminals of the "and" network 1418 are connected to an "or" network 1420 and to the left output terminal of the flip-flop 164.

The "or" network 1420 receives signals from an "and" network 1422 having input terminals connected to the cathode follower 1312 and to the left output terminal of the flip-flop 684. The "or" network 1420 also has signals applied to it from an "and" network 1424, input terminals of which are connected to the cathode follower 1340 and an "or" network 1426. Signals pass through the "or" network 1426 from the cathode follower 708 and "and" networks 1430 and 1432. Connections are made to input terminals of the "and" network 1430 from the "and" network 222, the left output terminal of the flip-flop 606 and the right output terminals of the flip-flops 688 and 736. The "and" network 1432 becomes activated when high voltages are simultaneously introduced to its input terminals from the "and" network 216, the left output terminals of the flip-flops 606 and 974 and the right output terminal of the flip-flop 736.

"And" networks 1434, 1436, 1438 and 1440 are associated with one another. The "and" network 1434 receives signals from the cathode follower 710 and the left output terminal of the flip-flop 736. The "and" network 1436 has voltages applied to it from the "and" network 222, the left output terminal of the flip-flop 688 and the right output terminal of the flip-flop 736. Connections are made to input terminals of the flip-flop 1438 from the "and" network 216 and the right output terminals of the flip-flops 736 and 974. The "and" network 1440 becomes activated upon the simultaneous occurrence of high voltages on the right output terminals of the flip-flops 606 and 736.

The signals from the "and" networks 1434, 1436, 1438 and 1440 pass through an "or" network 1442 to an input terminal of an "and" network 1444, another input terminal of which is connected to the cathode follower 1340. The output from the "and" network 1444 is in turn applied through an "or" network 1446 to an input terminal of an "and" network 1448 having another input terminal connected to the left output terminal of the flip-flop 164. Signals from an "and" network 1450 also pass through the "or" network 1446 to the "and" network 1448, input terminals of the "and" network 1450 being connected to the cathode follower 1312 and to the right output terminal of the flip-flop 684. The output signals from the "and" network 1448 pass to the right input terminal of the flip-flop 1414.

Figure 29:
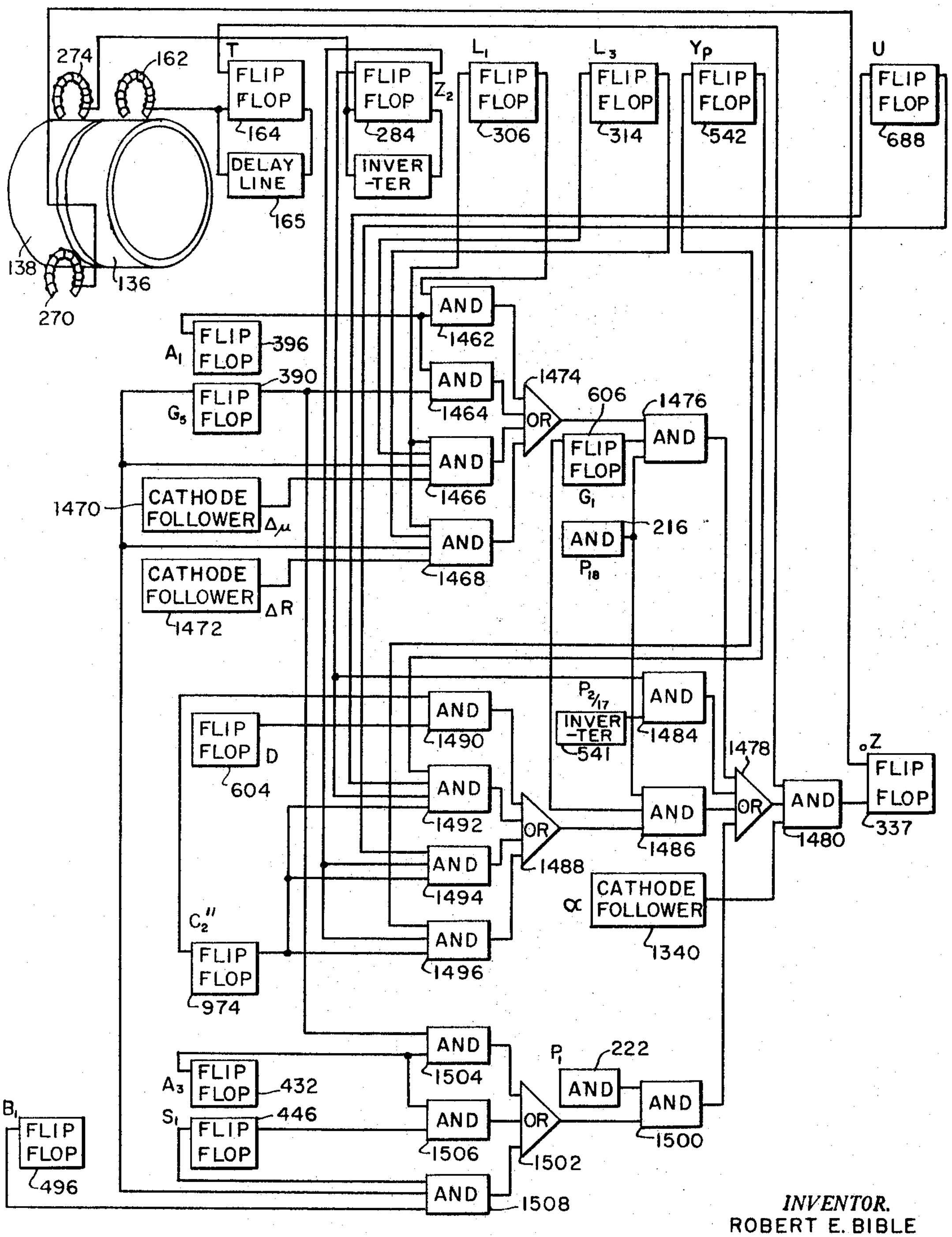

FIGURES 29 and 30 show stages for controlling the operation of the flip-flop 337, the output signals from which are introduced to the coil 270 to produce a pattern of signals in the channel 138. The stages include "and" networks 1462, 1464, 1466 and 1468. The "and" network 1462 has signals applied to it from the left output terminal of the flip-flop 396 and the right output terminal of the flip-flop 306. Signals are introduced to the "and" network 1464 from the left output terminal of the flip-flop 396 and the right output terminal of the flip-flop 390. Input terminals of the "and" network 1466 are connected to a cathode follower 1470 and to the left output terminals of the flip-flops 306, 314 and 390. The "and" network 1468 becomes activated upon the simultaneous introduction of high voltages from a cathode follower 1472, the left output terminals of the flip-flops 306 and 390 and the right output terminal of the flip-flop 314.

The signals from the "and" networks 1462, 1464, 1466 and 1468 pass through an "or" network 1474 to an input terminal of an "and" network 1476 having other input terminals connected to the "and" network 216 and the right output terminal of the flip-flop 606. The output signals from the "and" network 1476 are applied through an "or" network 1478 to an input terminal of an "and" network 1480. Other input terminals of the "and" network 1480 are connected to the cathode follower 1340 and to the left output terminal of the flip-flop 164. The output signals from the "and" network 1480 pass to the left input terminal of the flip-flop 337 to trigger the flip-flops.

Signals are also introduced to the "or" network 1478 from "and" networks 1484 and 1486. Connections are made to input terminals of the "and" network 1484 from the inverter 541 and the left output terminal of the flip-flop 284 adapted to receive information through the coil 274 from the channel 138. The "and" network 1486 has voltages applied to it from the "and" network 216, and "or" network 1488 and the left output terminal of the flip-flop 606. The "or" network 1488 in turn receives signals passing through "and" networks 1490, 1492, 1494 and 1496.

The "and" network 1490 has input terminals connected to the left output terminal of the flip flop 974 and the right output terminal of the flip-flop 604. The "and" network 1492 receives at its input terminals signals from the left output terminal of the flip-flops 284 and 688 and the right output terminals of the flip-flops 542 and 974. The "and" network 1494 passes a signal when relatively high voltages are simultaneously introduced to it from the right output terminals of the flip-flops 284, 688 and 974. Input terminals of the "and" network 1496 are connected to the left output terminal of the flip-flop 542 and to the right output terminals of the flip-flops 284 and 974.

In addition to receiving the output signals from the "and" networks 1476, 1484 and 1486, the "or" network 1478 also has voltages applied to it from an "and" network 1500. Input terminals of the "and" network 1500 are connected to the "and" network 222 and to an "or" network 1502 which is adapted to receive signals from "and" networks 1504, 1506 and 1508. Connections are made to input terminals of the "and" network 1504 from the left output terminal of the flip-flop 432 and the right output terminal of the flip-flop 390. The "and" network 1506 is adapted to become activated upon the simultaneous introduction of high voltages from the left output terminal of the flip-flop 432 and the right output terminal of the flip-flop 446. The "and" network 1508 passes a signal when relatively high voltages are simultaneously introduced to it from the left output terminals of the flip-flops 390, 446 and 496.

Just as the stages shown in FIGURE 29 control the passage of triggering signals to the left input terminal in the flip-flop 337, the stages shown in FIGURE 30 control the passage of triggering signals to the right input terminal of the flip-flop. These stages include "and" networks 1510, 1512, 1514 and 1516. Voltages are applied to input terminals of the "and" network 1510 from the right output terminals of the flip-flops 306 and 396. Similarly, the "and" network 1512 has voltages introduced to it from the right output terminals of the flip-flops 390 and 396. The "and" network 1514 receives at its input terminals signals from a cathode follower 1518 and the left output terminals of the flip-flops 306, 314 and 390. Input terminals of the "and" network 1516 are connected to a cathode follower 1520, the left output terminals of the flip-flops 306 and 390 and the right output terminal of the flip-flop 314.

The signals from the "and" networks 1510, 1512, 1514 and 1516 pass through an "or" network 1518 to an input terminal of an "and" network 1520, other input terminals of which are connected to the "and" network 216 and the right output terminal of the flip-flop 606. The output signals from the "and" network 1520 are introduced through an "or" network 1522 to an input terminal of an "and" network 1524 having another input terminal connected to the left output terminal of the flip-flop 164. The right input terminal of the flip-flop 337 receives the output signals from the "and" network 1424.

Signals are also applied to the "or" network 1522 from the cathode follower 1312 and from "and" networks 1528 and 1530. Input terminals of the "and" network 1528 are connected to the inverter 541 and to the right output terminal of the flip-flop 284. The "and" network 1530 is adapted to receive voltages from the "and" network 216, an "or" network 1532 and the left output terminal of the flip-flop 606. Connections are made to the "or" network 1532 from "and" networks 1534, 1536, 1538 and 1540.

The "and" network 1534 is adapted to become activated upon the simultaneous introduction of high voltages from the left output terminals of the flip-flops 604 and 974. Input terminals of the "and" network 1536 are connected to the left output terminal of the flip-flop 688 and the right output terminals of the flip-flops 284, 542 and 974. Input terminals of the "and" network 1538 have common connections with the left output terminal of the flip-flop 284 and the right output terminals of the flip-flops 688 and 974. The "and" network 1540 has voltages applied to its input terminals from the left output terminal of the flip-flops 284 and 542 and the right output terminal of the flip-flop 974.

Signals pass to the "or" network 1522 from an "and" network 1542 as well as from the cathode follower 1312 and the "and" networks 1520, 1528 and 1530. The operation of the "and" network 1542 is controlled by signals from the "and" network 222 and from an "or" network 1544. The "or" network 1544 in turn receives the output signals from "and" networks 1546, 1548 and 1550. Connections are made to input terminals of the "and" network 1546 from the right output terminals of the flip-flops 390 and 432. Similarly, the "and" network 1548 has input terminals connected to the right output terminals of the flip-flops 432 and 446. The "and" network 1450 is adapted to become activated upon the simultaneous introduction of high voltages from the left output terminals of the flip-flops 390 and 446 and the right output terminal of the flip-flop 496.

CLOCK CHANNEL AND SYSTEM OF READING AND RECORDING SIGNALS ON THE DRUM

As previously described, a permanent pattern of signals is recorded in the track 136 on the drum 130. This permanent recordation may be made by cutting notches at spaced intervals on the periphery of the track. By cutting such notches, alternating signals are induced in the coil 162 as the notches move past the coil. Each alternating signal is introduced to the left input terminal in the flip-flop 164. The negative portion of each alternating signal is instrumental in triggering the flip-flop. When the flip-flop is triggered by a signal introduced to the left input terminal of the flip-flop, a relatively high voltage is produced on the left output terminal of the flip-flop 164, and a relatively low voltage is produced on the right output terminal of the flip-flop. These voltages are produced in a manner similar to that described above in connection with the flip-flop shown in FIGURE 1.

The alternating signals induced in the coil 162 are also introduced to the delay line 165. The delay line 165 operates to delay the alternating signals by a particular amount of time such as a period equivalent to one half cycle of alternating voltage. Because of this delay, the negative portion of each alternating signal is introduced to the right input terminal of the flip-flop 164 approximately one half of an alternating cycle after it is introduced to the left input terminal of the flip-flop. The negative triggering signal triggers the flip-flop 164 such that a relatively high voltage is produced on the right output terminal of the flip-flop and a relatively low voltage is produced on the left output terminal of the flip-flop. In this way, the flip-flop 164 is triggered into its two alternate states of operation during the occurrence of each alternating signal.

The digital differential analyzer constituting this invention is adapted to be used with different types of systems for reading and recording magnetic information on the drum 130. For example, the reading and recording may be accomplished by the systems commonly known as the "return-to-zero" system and the NRZ systems. However, the digital differential analyzer is especially adapted to be used with the Ferranti system of reading and recording.

The Ferranti system of reading and recording may be seen from a particular example such as that shown in FIGURE 31. The operation of a flip-flop is seen in FIGURE 31A; the clock signals produced by the flip-flop 164 are shown in FIGURE 31B; and the pattern of magnetic information recorded in an information channel is illustrated in FIGURE 31C. As may be seen, the waveform of the information recorded in a channel of the drum 130 is dependent upon the pattern of "1's" and "0's" recorded in the channel as a result of the operation of an associated flip-flop. For example, when an indication of "1" is to be recorded in the channel, the waveform rises from an amplitude of zero to a positive amplitude at a particular time in a clock cycle. Similarly, the waveform falls from a positive amplitude to an amplitude of zero at a particular time in a clock cycle when an indication of "0" is to be recorded in the channel of the drum 130. The particular time at which the waveform rises or falls is at the midpoint of each clock cycle.

In the Ferranti system, when an indication of "1" is to be followed by an indication of "0" or vice versa, the waveform continues at the same amplitude from the midpoint in one clock cycle to the midpoint in the next clock cycle. When an indication of "1" continues in two successive cycles, the waveform falls at the end of the first clock cycle so as to be ready to rise in the midpoint of the next cycle. Similarly, for two successive indications of "0," the waveform is at a value of zero at the midpoint of the first clock cycle, rises to a positive amplitude at the end of the first cycle and falls again to an amplitude of zero at the midpoint of the second clock cycle.

The rise and fall of the magnetic signal pattern in a channel may be expressed logically by the following equations:

$$\text{Up}=X_x\overline{G}_4+\overline{X}_xG_4 \quad (1)$$

$$\text{Down}=X_xG_4+\overline{X}_x\overline{G}_4 \quad (2)$$

where

Up=a change in the magnetic information recorded in a channel from a zero level to a positive level;

Down=a change in the magnetic information recorded in a channel from a positive level to a zero level;

$X_x$=a relatively high voltage on the left output terminal of the flip-flop whose pattern of operation is to be recorded in the channel;

$\overline{X}_x$=a relatively high voltage on the right output terminal of the flip-flop whose pattern of operation is to be recorded in the channel;

$G_4$=a relatively high voltage on the left output terminal of the flip-flop 164; and $\overline{G}_4$=a relatively high voltage on the right output terminal of the flip-flop 164.

POSITION AND BLOCK COUNTERS

The voltage on the left output terminal of the flip-flop 164 is introduced to the various stages controlling the operation of the flip-flops 170, 180, 190, 200 and 210 shown in FIGURE 4. These flip-flops operate as a counter to count the number of clock signals introduced to the flip-flop 164. In their initial state of operation, the flip-flops 170, 180, 190, 200 and 210 have a pattern of operation in which relatively high voltages are simultaneously produced on the right output terminals of all of the flip-flops. This corresponds to a decimal count of "1," as may be seen in the table shown in FIGURE 32. In the table shown in FIGURE 32, the letter "L" indicates a relatively high voltage on the left output terminal of a flip-flop and the letter "R" indicates a relatively high voltage on the right output terminal of a flip-flop.

When the voltage on the left output terminal of the flip-flop 164 becomes high for the first time, the "and" network 166 becomes activated. The "and" network becomes activated because of the simultaneous introduction of high voltages from the cathode follower 173, the left output terminal of the flip-flop 164 and the right output terminal of the flip-flop 170. A triggering signal then passes through the "and" network 166 at the instant that the voltage on the left output terminal of the flip-flop 164 becomes relatively low. This signal triggers the flip-flop 170 so that a relatively high voltage is produced on the left output terminal of the flip-flop and a relatively low voltage is produced on the right output terminal of the flip-flop. As indicated in FIGURE 32, the flip-flops 170, 180, 190, 200 and 210 now have a pattern of operation corresponding to a decimal count of "2."

The relatively high voltage produced on the left output terminal of the flip-flop 170 in FIGURE 4 passes through the "or" network 172 to the "and" network 174 because of the operation of the "or" network 172 in passing high voltages. At the next clock signal, a relatively high voltage is also introduced to the "and" network 174 from the left output terminal of the flip-flop 164. This causes the "and" network 174 to become activated and a triggering signal to pass through the network upon the production of a relatively low voltage on the left output terminal of the flip-flop 164. The signal passing through the "and" network 174 triggers the flip-flop 170 and causes a relatively high voltage to be produced on the right output terminal of the flip-flop and a relatively low voltage to be produced on the left output terminal of the flip-flop.

During the time that a high voltage is produced on the left output terminal of the flip-flop 170, the "and" network 178 becomes activated. The "and" network 178 becomes activated because relatively high voltages are simultaneously introduced to it from the left output terminal of the flip-flop 170 and the right output terminals of the flip-flops 180 and 210. This high voltage then passes through the "or" network 182 to the "and" network 184. Because of this high voltage, a triggering signal passes through the "and" network 184 when the voltage on the left output terminal of the flip-flop 164 changes from a high to a low value.

The signal from the "and" network 184 triggers the flip-flop 180 into its alternate state of operation such that a relatively high voltage is produced on the left output terminal of the flip-flop and a relatively low voltage is produced on the right output terminal of the flip-flop. The simultaneous production of relatively high voltages on the left output terminal of the flip-flop 180 and on the right output terminals of the flip-flops 170, 190, 200 and 210 corresponds to a decimal count of "3" as indicated in FIGURE 32.

The "and" network 166 again becomes activated upon the occurrence of the next clock signal. This causes the flip-flop 170 to be triggered into its alternate state of operation for the production of a relatively high voltage on the left output terminal of the flip-flop and a relatively low voltage on the right output terminal of the flip-flop. As indicated in FIGURE 32, the simultaneous production of relatively high voltages on the left output terminals of the flip-flops 170, 180 and on the right output terminals of the flip-flops 190, 200 and 210 corresponds to a decimal value of "4."

The next clock signal causes the "and" network 174 to become activated in a manner similar to that described above. The resultant signal passing through the "and" network 174 triggers the flip-flop 170 to produce a change in the voltage on the left output terminal of the flip-flop from a high value to a low value. This change in voltage from a high value to a low value causes a signal to pass through the "and" network 186 to trigger the flip-flop 180 into its alternate state of operation. A triggering signal passes through the network 186 since the network was previously activated by the simultaneous introduction of high voltages from the cathode follower 173 and the left output terminals of the flip-flops 164, 170 and 180.

When the flip-flop 180 is triggered, the voltage on its left output terminal changes from a high value to a low value. This causes a signal to pass through the "and" network 188, which was previously activated by the simultaneous introduction of signals from the cathode follower 173, the left output terminals of the flip-flops 164, 170 and 180 and the right output terminal of the flip-flop 190. The signal passing through the "and" network 188 triggers the flip-flop 190 to produce a relatively high voltage on the left output terminal of the flip-flop. In this way, relatively high voltages are simultaneously produced on the left output terminal of the flip-flop 190 and on the right output terminals of the flip-flops 170, 180, 200 and 210. As may be seen from the chart shown in FIGURE 32, such a simultaneous occurrence of high voltages represents a decimal count of "5."

In like manner, each clock signal induced in the coil 162 triggers certain of the flip-flops 170, 180, 190, 200 and 210 into a pattern of operation which is different from the pattern of operation of the flip-flops at the occurrence of previous clock signals. Since the flip-flops 170, 180, 190, 200 and 210 are triggered into different patterns of operation for each clock signal, the flip-flops provide a count of the number of clock signals induced in the coil 162. The pattern of operation of the flip-flops 170, 180, 190, 200 and 210 for each decimal count is indicated in the chart shown in FIGURE 32.

As will be seen in the chart shown in FIGURE 32, relatively high voltages are produced on the left output terminals of the flip-flops 170 and 210 at a decimal count of "18." Because of this simultaneous production of high voltages, a signal passes from the "and" network 216 through the "or" network 214 to the "and" network 212. This signal prepares the "and" network 212 for activation upon the occurrence of the next clock signal. When the next clock signal is introduced to the "and" network 212, a signal passes through the "and" network and triggers the flip-flop 210 to produce a relatively high voltage on the right output terminal of the flip-flop. The clock signal also passes through the "and" network 174 and triggers the flip-flop 170 for the production of a relatively high voltage on the right output terminal of the flip-flop. In this way, the voltages on the right output terminals of the flip-flops 170, 180, 190, 200 and 210 become simultaneously high. As will be seen in the chart, shown in FIGURE 32, this pattern of voltages corresponds to a decimal value of "1." Since a decimal value of "1" is produced in the flip-flops, the flip-flops start to count again from a decimal value of "1" to a decimal value of "18" upon the introduction of successive clock signals to the flip-flop 164.

Since each decimal integer is represented by a different pattern of operation of the flip-flops 170, 180, 190, 200 and 210, "and" networks can be connected to the flip-flops to pass signals only for a particular count. For example, the "and" network 222 passes a signal only for a value of "1" because of its connections to the right output terminals of the flip-flops 170, 180, 190, 200 and 210. Similarly, the "and" network 225 (FIGURE 17) may be connected to the left output terminal of the flip-flop 170 and the right output terminals of the flip-flops 180, 190, 200 and 210 to pass an output signal only for a decimal count of "2." The "and" network 208 passes an output signal when relatively high voltages are simultaneously produced on the left output terminals of the flip-flops 170 and 210 to indicate a decimal count of "18."

Because of the operation of the stages shown in FIGURE 4 to count repetitively from "1" to "18," the pulse positions in the different tracks on the drum 130 can be considered as defining the length of each of a plurality of blocks or integrators where each integrator includes an independent quantity, a dependent quantity and an output quantity resulting from the cumulative combination of the dependent quantity and the variations in the independent quantity. Each of the blocks has a length of 18 pulse positions. These blocks are counted by the stages shown in FIGURE 5. The count is represented at any instant by the pattern of operation of the flip-flops 234, 244, 254, 262, 264, 266 and 268. As will be seen in the table shown in FIGURE 33, the flip-flops have a different pattern of operation for each block. In this way, when 2250 pulse positions are provided on each track in the drum 130, the pulse positions become divided into 125 blocks each having a length of 18 pulse positions.

The cathode followers 168 and 173 are provided to insure that the flip-flops shown in FIGURES 4 and 5 are returned to a pattern representing a value of "1" at the end of each count. A signal passes through the "and" network 408 and the cathode follower 168 in FIGURE 7 when relatively high voltages are simultaneously produced on the left output terminal of the flip-flop 318 and the right output terminals of the flip-flops 306, 310 and 314. Such a pattern of operation is simultaneously produced in the flip-flops 306, 310, 314 and 318 only once in each cycle of operation. This results from a coding in the tracks 140, 142, 144 and 146 at a particular position in each track. The coding is retained in successive cycles of operation since the information on the tracks 140, 142, 144 and 146 is permanently recorded in the tracks for the solution of a problem. This will be described in detail hereinafter.

The operation of the flip-flops 170, 180, 190, 200 and 210 in FIGURE 4 can be represented by the following equations:

$$j_1=\bar{J}_1\bar{N}T \qquad (3)$$
$$\bar{j}_1=(J_1+N)T \qquad (3a)$$
$$j_2=(J_1\bar{J}_2\bar{J}_5+N)T \qquad (4)$$
$$\bar{j}_2=J_1J_2\bar{N}T \qquad (4a)$$
$$j_3=J_1J_2\bar{J}_3\bar{N}T \qquad (5)$$
$$\bar{j}_3=(J_1J_2J_3+N)T \qquad (6)$$
$$j_4=J_1J_2J_3\bar{J}_4\bar{N}T \qquad (7)$$
$$\bar{j}_4=(J_1J_2J_3J_4+N)T \qquad (8)$$
$$j_5=J_1J_2J_3J_4\bar{N}T \qquad (9)$$
$$\bar{j}_5=(J_1J_5+N)T \qquad (10)$$

In the above equations:

$J_1$=a relatively high voltage on the left output terminal of the flip-flop 170;

$\bar{J}_1$=a relatively high voltage on the right output terminal of the flip-flop 170;

$j_1$=a triggering signal introduced to the left input terminal of the flip-flop 170;

$\bar{j}_1$=a triggering signal introduced to the right input terminal of the flip-flop 170;

$J_2$=a relatively high voltage on the left output terminal of the flip-flop 180;

$J_3$=a relatively high voltage on the left output terminal of the flip-flop 190;

$J_4$=a relatively high voltage on the left output terminal of the flip-flop 200;

$J_5$=a relatively high voltage on the left output terminal of the flip-flop 210;

$N$=a high voltage from the cathode follower 168;

$\bar{N}$=a high voltage from the cathode follower 173; and $T$=a relatively high voltage on the left output terminal of the flip-flop 164;

The symbols $J_2$, $j_2$ and $\bar{j}_2$ represent voltages and signals for the flip-flop 180 corresponding to the symbols $\bar{J}_1$, $j_1$ and $\bar{J}_1$, respectively, for the flip-flop 170. Similarly, corresponding symbols are provided in the above equations for the flip-flops 190, 200 and 210.

It will be seen from the above equations that the flip-flops 170, 190, 200 and 210 are triggered by the "origin" pulse passing through the cathode follower 168 to produce relatively high voltages on the right output terminals of the flip-flops. However, the "origin" pulse passing through the cathode follower 168 triggers the flip-flop 180 to produce a relatively high voltage on the left output terminal of the flip-flop. A relatively high voltage is produced on the left output terminal of the flip-flop 180 so that information in the last block—in other words, Block 125—can be recorded in the proper flip-flops before the next cycle of counting is commenced.

It will also be seen from the above equations and from FIGURE 4 that the voltage on the right output terminal of the flip-flop 210 is introduced to the "and" network 178 to control the operation of this network. If such a signal were not introduced to the network 178, the flip-flop 180 would be triggered upon a return from a count of "18" to a count of "1." This triggering would produce a relatively high voltage on the left output of the flip-flop 180 and would prevent a count of "1" from being properly obtained after a count of "18." The introduction of the voltage from the right output terminal of the flip-flop 210 to the "and" network 178 prevents a signal from passing through the "and" network at position 18 since a relatively low voltage exists on the right output terminal of the flip-flop at this position.

The operation of the flip-flops 234, 244, 254, 262, 264, 266 and 268 in FIGURE 5 occurs in accordance with the following logical equations:

$$k_1=\overline{K}_1P_{17}T \quad (11)$$
$$\overline{k}_1=(K_1P_{17}+N)T \quad (12)$$
$$k_2=K_1\overline{K}_2P_{17}T \quad (13)$$
$$\overline{k}_2=(K_1K_2P_{17}+N)T \quad (14)$$
$$k_3=K_1K_2\overline{K}_3P_{17}T \quad (15)$$
$$\overline{k}_3=(K_1K_2K_3P_{17}+N)T \quad (16)$$
$$k_4=K_1K_2K_3\overline{K}_4P_{17}T \quad (17)$$
$$\overline{k}_4=(K_1K_2K_3K_4P_{17}+N)T \quad (18)$$
$$k_5=K_1K_2K_3K_4\overline{K}_5P_{17}T \quad (19)$$
$$\overline{k}_5=(K_1K_2K_3K_4K_5P_{17}+N)T \quad (20)$$
$$k_6=K_1K_2K_3K_4K_5\overline{K}_6P_{17}T \quad (21)$$
$$\overline{k}_6=(K_1K_2K_3K_4K_5K_6P_{17}+N)T \quad (22)$$
$$k_7=K_1K_2K_3K_4K_5K_6\overline{K}_7P_{17}T \quad (23)$$
$$\overline{k}_7=NT \quad (24)$$

In the above equations:

$K_1$=a relatively high voltage on the left output terminal of the flip-flop 234;
$K_2$=a relatively high voltage on the left output terminal of the flip-flop 244;
$K_3$=a relatively high voltage on the left output terminal of the flip-flop 254;
$K_4$=a relatively high voltage on the left output terminal of the flip-flop 262;
$K_5$=a relatively high voltage on the left output terminal of the flip-flop 264;
$K_6$=a relatively high voltage on the left output terminal of the flip-flop 266;
$K_7$=a relatively high voltage on the left output terminal of the flip-flop 268;
$P_{17}$=a signal passing through the line 223 to represent position 17 for each block; and N and $\overline{\text{N}}$ have been previously defined. Only one of the symbols for each flip-flop has been included to identify the flip-flop. The other symbols for each flip-flop represent functions similar to those given for the flip-flop 170 in FIGURE 4.

As described above, a signal is produced in the cathode follower 168 once in each cycle of computation. This signal is produced in the cathode follower 168 because of a particular and permanent coding provided in the channels 140, 142, 144 and 146. This coding is represented by simultaneous indications of "0" in the channels 140, 142 and 144 and of "1" in the channel 146. Upon such a simultaneous occurrence of signals, relatively high voltages are simultaneously produced on the right output terminals of the flip-flops 306, 310 and 314 and on the left output terminal of the flip-flop 318. This causes a signal designated as the "origin" pulse to pass through the "and" network 408 to the cathode follower 168 in FIGURE 7 for the purpose of synchronizing the operation of the computer once in each cycle of computation.

In this way, the cathode follower 168 operates in accordance with the logical expression $$n=\overline{L}_1\overline{L}_2\overline{L}_3L_4T \quad (25)$$

where $n$=the passage of a signal to the cathode follower 168;
$\overline{L}_1$=a relatively high voltage on the right output terminal of the flip-flop 306;
$\overline{L}_2$=a relatively high voltage on the right output terminal of the flip-flop 310;
$\overline{L}_3$=a relatively high voltage on the right output terminal of the flip-flop 314; and
$L_4$=a relatively high voltage on the left output terminal of the flip-flop 318.

The cathode follower 173 produces a signal in every clock cycle in which a signal is not produced by the cathode follower 168. Thus, the cathode follower 173 produces a signal when any one or more of the terms $L_1$, $L_2$ and $L_3$ is true or $L_4$ is false. When one or more of the terms $L_1$, $L_2$ and $L_3$ is true or $L_4$ is false, a signal passes through the "or" network 409 to the "and" network 411. Because of its connection to the left output terminal of the flip-flop 164, the "and" network 411 synchronizes the signals from the "or" network 409 at an optimum time in the clock cycles. The "and" network 411 then introduces the signals to the cathode follower 173. The operation of the cathode follower 173 can thus be expressed as $$\overline{n}=T(L_1+L_2+L_3+\overline{L}_4) \quad (26)$$

where all of the terms have previously been defined.

SCHEMATIC PRESENTATION OF DIGITAL DIFFERENTIAL ANALYSIS

The blocks formed by the circuitry shown in FIGURES 4 and 5 are used in various combinations to solve differential problems. Each block includes information relating to a dependent quantity Y and to variations in an independent quantity X. These variations will hereafter be designated as "ΔX" or sometimes as "JX." The block obtains the combination of Y and ΔY upon the occurence of ΔX increments to produce variations YΔX in a quantity which may be designated as "R." This quantity may be considered as the output quantity from the block or may be considered as the cumulative value of the differential combination of Y and ΔX.

A typical relationship between an independent quantity $x$ and a dependent quantity $y$ is shown in FIGURE 34. In this figure, the value $x$ is represented along the abscissa of the curve and the value $y$ is represented along the ordinate. The relationship between $x$ and $y$ can be represent by $y=f(x)$ where $f(x)$ represents a function of $x$. The area under the curve represents the values $$\int_{X}^{X_1} y\,dx$$

where the "∫" sign represents the integral of $ydx$ between values of "$x_0$" and "$x_1$" for the independent quantity. It is well known in the field of mathematics that the value $$\int_{X_0}^{X_1} y\,dx$$

may be approximated by obtaining the cumulative value $$\sum_{X_0}^{X_1} y\Delta x$$

The value $$\sum_{X_0}^{X_1} y\Delta x$$

represents an accumulation of $y\Delta x$ increments between the values $x_0$ and $x_1$ for the independent quantity $x$.

By reducing the value of the $\Delta x$ increments, the cumulative value of the $y\Delta x$ increments represented by $$\sum_{x_0}^{x_1} y\Delta x$$

can be made to approach the value $$\int_{x_0}^{x_1} ydx$$

with as small an error as may be desired.

As may be seen in the curve shown in FIGURE 34, each increment $y\Delta x$ represents an area under the curve $y=f(x)$ for the particular $\Delta x$ increment. For example, an area indicated in cross-hatching at 1600 is illustrated in FIGURE 34 for a particular $\Delta x$ increment. It will be seen that the area 1600 approximates the area under the curve, especially if the $\Delta x$ increment is relatively small.

As the solution of the differential problem proceeds $\Delta x$ increments in the independent quantity $x$ for each block are obtained. The $\Delta x$ increments are obtained so that progressive values of the independent quantity $x$ are produced to trace curves corresponding to the typical curve shown in FIGURE 34. At the same time, increments in the dependent quantity $y$ are obtained so that the proper value of $y$ will result for successive positions along the curve. The digital variations in the dependent quantity $y$ for a block will hereafter be designated as "$\Delta y$" or sometimes "$dy$."

The $\Delta x$ increments for each block are obtained from the differential combinations for other blocks in a pattern dependent upon the problem being solved. For example, a relatively simple differential problem is solved by an inter-relationship of blocks similar to that shown in FIGURE 35. This inter-relationship is provided to obtain the solution for the differential equation $$\frac{d^2y}{dx^2}+b\frac{dy}{dx}+cy=0$$

In the inter-relationship shown in FIGURE 35, the different blocks are represented by rectangles such as the rectangles 1602, 1604, 1606 and 1608. The $\Delta x$ increments for each block are shown as being introduced to the block at a position on the upper right side of the block. Similarly, the $\Delta y$ increments for each block are shown as being introduced to the block at a position at the lower right side of the rectangle representing the block. The $y\Delta x$ increments for each block are shown as leaving the block at an intermediate position on the right side of the rectangle representing the block.

In the relationship of blocks shown in FIGURE 35, the block 1606 obtains its $\Delta x$ increments from the output of the block 1602. Similarly, the value of the independent quantity $x$ for the block 1608 varies in accordance with the introduction of the output quantity from the block 1604 to the block 1608 in representation of $\Delta x$ increments for the block 1608. In this way, the $\Delta x$ increments for each block are obtained from the output quantity of a different block in an inter-relationship dependent upon the differential problem to be solved. As will be described in detail subsequently, $\Delta x$ increments for a block may also be sometimes obtained from an external source. For example, the block 1602 in FIGURE 35 obtains $\Delta x$ increments from an external source.

The $\Delta y$ increments for each block are often obtained from the output quantity for a different block dependent upon the problem to be solved. The $\Delta y$ increments for a block are sometimes obtained from the output quantity of the same block in the solution of certain problems.

As will be disclosed in detail hereinafter, this is especially true when the block is operating as a servo. As an example of the introduction of the output quantity of one block as the $\Delta y$ increments of a second block, the output quantity from the block 1602 is introduced to the block 1604 to obtain $\Delta y$ increments for the block 1604.

FIGURE 40 illustrates in simplified block form the stages required to solve differential problems on a digital basis. The stages include the coils 270 and 276 associated with the channel 138, the coils 452 and 1333 associated with the channel 150 and the coils 648 and 1410 associated with the channel 152. The flip-flops 288, 450 and 646 are included to produce signals in accordance with the signals respectively induced in the coils 276, 452 and 648 by the magnetic information in the channels. The flip-flops 337, 1332 and 1388 are also included to introduce signals to the coils 270, 1333 and 1410, respectively, for the recordation of magnetic information in the channels 138, 150 and 152.

As the drum 130 rotates, the counters shown in FIGURES 4 and 5 count the number of clock signals in the clock channel 136 shown in the figures and divide the channel into a plurality of blocks. Each block contains numerical information in the channel 150 relating to the dependent quantity $y$ and numerical information in the channel 152 relating to the cumulative value of the $Y\Delta X$ increments. As will be described in detail hereinafter, the channel 152 provides only a limited capacity for each block so that overflows occur in the value of $\Sigma YdX$ for each block. These overflows are recorded in the channel 138 and are circulated in the channel as the drum 130 rotates.

As has been described previously in connection with the circuit diagram shown in FIGURE 35 for the solution of a particular problem, each block receives $\Delta X$ and $\Delta Y$ increments from the outputs of various blocks in the digital differential analyzer. Since the output of each block can be considered as the overflow signal information recorded in the channel 138, this signal information is used to determine the $\Delta X$ and $\Delta Y$ increments for the various other blocks.

During the presentation of a block for computation, the $\Delta X$ and $\Delta Y$ increments for the blocks are determined in accordance with the output from certain blocks selected in accordance with the problem to be solved. The output signal information for a block is selected by programming permanently provided for the block. As will be described in detail subsequently, this programming is represented by coded patterns of signal indications in the channels 140, 142, 144 and 146. One pattern controls the selection of an output signal indication to control the occurrence and polarity for each $\Delta X$ increment in the block undergoing computation. A different pattern controls the selection of an output signal indication to control the occurrence and polarity for each $\Delta Y$ increment in the block undergoing computation.

A number of stages are required to decode the programmed information in the channels 140, 142, 144 and 146 and to produce signal indications representing the $\Delta X$ and $\Delta Y$ increments for the block undergoing computation. For purposes of simplicity, these stages are shown in FIGURE 40 as a single block 1750 which is programmed to control the occurrence of the $\Delta X$ and $\Delta Y$ increments for each block. The output from the programmer 1750 is introduced to addressers 1752 and 1754 for respectively producing signal indications representing the $\Delta X$ and $\Delta Y$ increments for each block as the block undergoes computation. Since the overflow signal indications in the channel 138 are also introduced to the addressers 1752 and 1754, the programmer 1750 controls which of the overflow signal indications are selected as the $\Delta X$ and $\Delta Y$ increments for each block. For purposes of simplicity, the overflow indications are shown in FIGURE 40 as being made available only through the coil 276 and the flip-flop 288 to the addressers 1754 and 1752. Actually, the coils 272, 274 and 278 shown in FIGURE 6 and the flip-flops associated with the coils are also used to increase the flexibility in the intercoupling between various blocks.

The signal indications from the addresser 1754 representing the $\Delta Y$ increment for each block are introduced to an adder 1756. The adder 1756 is shown as a single block in FIGURE 40 but is actually formed from a number of different stages, as will be described in detail subsequently. The adder 1756 combines the signal indications representing the ΔY increment and the signal indications from the channel 150 representing Y. As a result of this combination, the adder 1756 produces signal indications representing $Y_N=Y+\Delta Y$. These signal indications are introduced to the flip-flop 1332, which in turn introduces the signals to the coil 1333 for recordation in the channel 150. In this way, new information relating to the value of the dependent quantity Y for each block is obtained in each cycle of computation and is used for combination with ΔY in the next cycle of computation.

The output information from the adder 1756 for each block is also introduced to a Y gate 1758, which is opened by signals from the addresser 1752, representing a ΔX increment for the block. When the ΔX increment is positive, the signals representing Y pass through the gate 158 without change. Upon the occurrence of a negative ΔX increment for a block, the indications representing Y are changed to invert the polarity of Y. In this way, the gate 1758 passes signals representing Y or —Y for each block. This is equivalent to +YΔX or —YΔX if each ΔX increment can be considered to have a unitary value.

The signal indications representing Y or —Y pass from the gate 1758 to the adder 1760. The adder 1760 combines these signals with the signal indications representing ΣYΔX—or, in other words, the cumulative value of the YΔX increments. The signals representing ΣYΔX (or R) are read by the head 648 from the channel 152 and are introduced to the flip-flop 646, which in turn introduces the signals to the adder 1760. In this way, signal indications representing a new cumulative value of the YΔX increments for each block are produced by the adder 1760. These signals indications are introduced to the flip-flop 1388 and are in turn applied by the flip-flop to the coil 1410 for recordation in the channel 152. By this technique, the signal indications for each block are presented in the next cycle of computation to the adder 1760 for combination with the signal indications representing the next YΔX increment for the block. In this way, new indications representing ΣYΔX are obtained for each block in each cycle of computation.

Since the capacity of the signal indications in the channel 152 for each block is somewhat limited, the signal indications often overflow when YΔX increments are added in successive cycles of computation. The overflow signal indication for each block passes through stages shown schematically in FIGURE 40 as a Z gate 1762. The gate 1762 passes these signals only at position 18 for each block. After passing through the gate 1762, the signals are introduced to the flip-flop 337 for recordation by the coil 270 in the channel 138.

Because of the operation of the gate circuit 1762 in passing signals only at position 18 for each block, the signal indications presented in the channel 138 at other positions for each block are able to be recirculated. These signals represent positive or negative overflows for other blocks. By providing such a recirculation of overflow information, the outputs of various blocks are made available to each block as it undergoes computation so that the ΔX and ΔY increments for the block can be determined. As described briefly above, the programmer 1750 and the addressers 1752 and 1754 provide such a determination.

THE PRODUCTION OF ΔX AND ΔY INCREMENTS

The inter-relationship between the different integrators in the solution of a differential problem is obtained by coded patterns in the various tracks of the drum 130. For example, coded patterns controlling the production of ΔX and ΔY increments for each block are provided in the tracks 140, 142, 144 and 146 on the drum 130. Since the coded patterns controlling the production of ΔX and ΔY increments for each integrator are fixed during the solution of a particular pattern, the coded patterns in the tracks 140, 142, 144 and 146 are permanently recorded in the tracks during the solution of the problem. The tracks 140, 142, 144 and 146 will be designated hereinafter as "$L_1$," "$L_2$," "$L_3$" and "$L_4$" in the logical equations which will hereinafter be set forth.

A ΔX increment for an integrator is obtained only when a particular code simultaneously appears in corresponding pulse positions of the tracks 140 and 142. This coded pattern is represented by the configuration "0" and "1" for the tracks 140 and 142, respectively. Because of this configuration, a signal of high amplitude is induced in the coil 298 (FIGURE 7) at the same time that a signal of low amplitude is induced in the coil 296. This causes a relatively high voltage to be simultaneously produced on the left output terminal of the flip-flop 310 and the right output terminal of the flip-flop 306. When high voltages are simultaneously produced on the right output terminal of the flip-flop 306 and the left output terminal of the flip-flop 310, the flip-flop 396 (FIGURE 7) is prepared for triggering. The flip-flop 396 is triggered when a relatively high voltage is obtained at the same time from the cathode follower 328. The operation of the cathode follower 328 and of a complementary cathode follower 364 will be described in detail subsequently.

The "and" network 380 (FIGURE 7) receives the high voltages from the cathode follower 328 and the left output terminal of the flip-flop 310. When these voltages are simultaneously high, the "and" network 380 passes a signal through the "or" network 382 to the "and" networks 394 and 402. The "and" network 394 passes a signal only when a relatively high voltage is produced on the right output terminal of the flip-flop 306 to represent part of the required coding for a ΔX increment, as described above. Since the "and" network 394 also receives signals from the inverter 444, it can pass signals only when the voltage from the inverter is high. The inverter 444 provides a high voltage only for pulse positions 1 to 17, inclusive, of each block. The inverter 444 operates in this manner because it inverts the high voltage provided by the "and" network 216 at pulse position 18 of each block.

The "and" network 394 is also connected to the right output terminal of the flip-flop 396. In this way, the "and" network 394 passes a signal only when a relatively high voltage is introduced to it from the right output terminal of the flip-flop 396. In addition to the connections described above, the "and" network 394 has an input terminal connected to the left output terminal of the flip-flop 164. Since the flip-flop 164 supplies clock signals to the "and" network 394, the "and" network passes signals only at an optimum time in each clock cycle.

The signals passing through the "and" network 394 are introduced to the left input terminal of the flip-flop 396 to trigger the flip-flop. When the flip-flop 396 becomes triggered, a relatively high voltage is produced on the left output terminal of the flip-flop and a relatively low voltage is produced on the right output terminal of the flip-flop. The operation of the "and" network 380, the "or" network 382 and the "and" network 394 in introducing triggering signals to the left input terminal of the flip-flop 396 can be expressed as $$a_1=\overline{A}_1\overline{L}_1P_{1/17}L_2T \qquad (27)$$

where $a_1$=a triggering signal introduced to the left input terminal of the flip-flop 396;

$\overline{A}_1$=a relatively high voltage on the right output terminal of the flip-flop 396;

$\overline{L}_1$= a relatively high voltage on the right output terminal of the flip-flop 306;

$L_2$=a relatively high voltage on the left output terminal of the flip-flop 310;

$P_{1/17}$=a relatively high voltage from the inverter 444 to indicate pulse positions 1 to 17, inclusive, for each integrator; and $L$=a relatively high voltage from the cathode follower 328.

At the end of certain blocks, a signal passes through the "and" network 406. A signal passes through the "and" network 406 at the end of a block only when a relatively high voltage is introduced to the "and" network from the right output terminal of the flip-flop 390. As will be described in detail hereinafter, a signal is produced on the right output terminal of the flip-flop 390 only when an operation is being completed. For example, two blocks may be effectively combined at times to perform a single operation with an increased accuracy in the operation resulting from the increased number of pulse positions. A relatively high voltage would be produced on the right output terminal of the flip-flop 390 only for the second half of this double length operation. A relatively high voltage is also produced on the right output terminal of the flip-flop 390 when the block undergoing computation is used as a single length operation.

The "and" network 406 is able to pass a signal only at pulse position 18 for certain blocks because of its connection to the "and" network 216. The signals from the "and" network 406 pass through the "or" network 400 to the "and" network 398. The "and" network 398 also receives the clock signals from the flip-flop 164. Because of the introduction of the clock signals, the signals passing through the "and" network 398 are synchronized at an optimum time in each cycle of alternating voltage. The signals from the "and" network 398 are introduced to the right input terminal of the flip-flop 396 to trigger the flip-flop for the production of a relatively high voltage on the right output terminal of the flip-flop and a relatively low voltage on the left output terminal of the flip-flop.

The operation of the "and" network 406, the "or" network 400 and the "and" network 398 in passing triggering signals to the right input terminal of the flip-flop 396 can be expressed as $$\overline{a}_1=\overline{G}_5P_{18}T \qquad (28)$$

where $\overline{a}_1$=the introduction of a triggering signal to the right input terminal of the flip-flop 396;

$\overline{G}_5$=a relatively high voltage on the right output terminal of the flip-flop 390; and $P_{18}$ and T have previously been defined.

The signals passing to the flip-flop 396 from the "and" network 398 trigger the flip-flop at the end of each operation performed in one or more blocks to prepare the flip-flop for proper operation during the next block.

As described above, a relatively high voltage is produced on the right output terminal of the flip-flop 396 at the end of each operation performed in one or more blocks. When a negative ΔX increment occurs in the next block performing a new operation, the flip-flop 396 continues to provide a relatively high voltage on its right output terminal. A high voltage is maintained on the right output terminal of the flip-flop 396 because a relatively low voltage is produced in the cathode follower 328 in a manner which will be described in detail subsequently. This low voltage prevents a signal from passing through the "and" network 380 to prepare the "and" network 394 for operation. This prevents a triggering signal from passing through the "and" network 394 to the left input terminal of the flip-flop 396 to trigger the flip-flop to its "true" state of operation.

At the end of a block, the state of operation of the flip-flop 396 (FIGURES 7 and 8) is transferred to the flip-flop 420 (FIGURE 8). The transfer is obtained only at the end of single-length blocks or at the completion of the second half of double-length blocks. The transfer is obtained only for these blocks because of the connection from the right output terminal of the flip-flop 390 to the "and" network 418. The transfer can occur only at pulse position 18 for these blocks because of the introduction of the output signals from the "and" network 216 to the "and" network 418.

The "and" network 418 also has a third input terminal connected to the "or" network 416, which in turn receives signals from the "and" networks 410 and 412. One input terminal in each of the networks 410 and 412 is connected to the left output terminal of the flip-flop 396 to indicate that a transfer of information from the flip-flop 396 is being obtained. Second input terminals of the "and" networks 410 and 412 are respectively connected to the right output terminal of the flip-flop 314 and the left output terminal of the flip-flop 318. This causes the "and" networks 410 and 412 to pass signals indicating $A_1\overline{L}_3+A_1L_4$ where $\overline{L}_3$ and $L_4$ respectively represent coding information in the channels 144 and 196. As is well known, $A_1\overline{L}_3+A_1L_4=(\overline{L}_3+L_4)A_1$. By Boolean algebra, it can be shown that $\overline{L}_3+L_4=(L_3\overline{L}_4)'$. In this way, the "and" networks 410 and 412 pass a signal at all times that the code $L_3\overline{L}_4$ is not true. The purpose of the code $L_3\overline{L}_4$ will be described in detail hereinafter.

As will be seen from the above description, the following logical expression can be set forth for the operation of the stages 410, 412, 416 and 418.

$$a_2=\overline{G}_5P_{18}T(A_1\overline{L}_3+A_1L_4) \qquad (29)$$

where $a_2$=the introduction of a triggering signal to the left input terminal of the flip-flop 420;

$\overline{L}_3$=a relatively high voltage on the right output terminal of the flip-flop 314;

$L_4$=a relatively high voltage on the left output terminal of the flip-flop 318; and the other terms have previously been defined.

The "and" networks 422 and 424 operate in a manner similar to the "and" networks 410 and 412, respectively, but pass signals of high amplitude on the right output terminal of the flip-flop 396. These signals pass through the "or" network 428 to the "and" network 430 for synchronization at optimum times in the clock cycles. The signals are then introduced to the right input terminal of the flip-flop 420. The signals trigger the flip-flop 420 so as to produce a relatively high voltage on the right output terminal of the flip-flop. The flip-flop 420 is triggered by the passage of signals through the stages 422, 424, 428 and 430 in accordance with the logical equation $$\overline{a}_2=\overline{G}_5P_{18}T(\overline{A}_1\overline{L}_3+\overline{A}_1L_4) \qquad (29a)$$

where $\overline{a}_2$=the introduction of a triggering signal to the right input terminal of the flip-flop 420; and the other terms have previously been defined.

The operation described above for the flip-flops 396 and 420 and developed logically in Equations 27, 28, 29 and 29*a* is similar to that of the addresser 1752 in FIGURE 40. Similarly, the flip-flops 496 and 494 operate in a manner similar to the addresser 1754 shown in FIGURE 40 and discussed briefly above. The operation of the flip-flops 496 and 494 will be discussed in detail in the subsequent paragraphs.

In like manner, the occurrence of ΔY increments is controlled by a particular code in the channels 140 and 142. This particular code is represented by the simultaneous occurrence of a relatively high voltage in the channel 140 and a relatively low voltage in the channel 142. These voltages in turn cause relatively high voltages to be simultaneously produced on the left output terminal of the flip-flop 306 and the right output terminal of the flip-flop 310 in a manner similar to that described above.

The voltages on the left output terminal of the flip-flop 306 and on the right output terminal of the flip-flop 310 are introduced to the "and" network 480 in FIGURE 9. Since the "and" network 480 also receives voltages from the cathode follower 328, it is able to pass a signal only for positive ΔY increments. The signals from the "and" network 480 pass through the "or" network 482 to the "and" network 484. The "and" network 484 is able to open only in pulse positions 1 to 17 inclusive, for each block because of its connection to the inverter 444.

The signals from the "and" network 484 are in turn introduced through the "or" network 488 to the "and" network 490. The "and" network 490 operates to synchronize these signals at an optimum time in the clock signals because of its connection to the left output terminal of the flip-flop 164. The signals from the "and" network 490 in turn trigger the flip-flop 496 to produce a relatively high voltage on the left output terminal of the flip-flop and a relatively low voltage on the right output terminal of the flip-flop. The production of a relatively high voltage on the left output terminal of the flip-flop 496 indicates a positive Δ*y* increment for a block. The operation of the stages 480, 482, 484, 488 and 490 in passing triggering signals to the flip-flop 496 can be expressed logically as follows:

$$b_1=L_1\overline{L}_2P_{1/17}LT \qquad (30)$$

where $b_1$=a triggering signal introduced to the left input terminal in the flip-flop 496; and the other terms have previously been defined.

In like manner, signals are introduced to the right input terminal of the flip-flop 496 to represent negative ΔY increments. These signals pass through the "and" network 500, the "or" network 504, the "and" network 506, the "or" network 510 and the "and" network 512. With one exception, the stages 500, 504, 506, 510 and 512 operate in a manner similar to that described above for the stages 480, 482, 484, 488 and 490. By this exception, signals from the cathode follower 364 are introduced to the "and" network 500 rather than signals from the cathode follower 328. As will be described in detail hereinafter, the signals from the cathode follower 364 represent negative increments.

The signals passing to the right input terminal in the flip-flop 496 trigger the flip-flop to produce a relatively high voltage on the right output terminal of the flip-flop and a relatively low voltage on the left output terminal of the flip-flop. The triggering signals passing through the stages 500, 504, 506, 510, and 512 can be logically represented as $$b_1=L_1\overline{L}_2P_{1/17}\overline{L}T \qquad (31)$$

where $\overline{b}_1$=a triggering signal passing to the right input terminal of the flip-flop 496;

$\overline{L}$=a signal from the cathode follower 364 to represent a negative increment; and the other terms have previously been defined.

Just as the information in the flip-flop 396 (FIGURES 7 and 8) is transferred to the flip-flop 420 (FIGURE 8) at the end of a block, the information in the flip-flop 496 (FIGURES 9 and 10) is transferred to the flip-flop 494 (FIGURE 10). Relatively high voltages on the left output terminal of the flip-flop 496 are transferred at the end of a block to the flip-flop 494 to produce a relatively high voltage on the left output terminal of the flip-flop 494. The transfer is obtained through the operation of stages including the flip-flop 496, the "or" network 516, the "and" network 518, the "or" network 522, the "and" network 524 and the flip-flop 494. The operation of these stages can be logically exprcssed as $$b_2=\overline{G}_5P_{18}B_1T_1(\overline{L}_3+\overline{L}_4) \qquad (32)$$

where $b_2$=a triggering signal introduced to the left input terminal of the flip-flop 494; and the other terms have previously been defined.

The term $\overline{L}_3+\overline{L}_4=(L_3L_4)'$, where $(L_3L_4)'$ is the negation of $L_3L_4$, and indicates that $L_3L_4$ represents a special coding at $P_{18}$ to transfer information to the flip-flop 494 from stages other than the flip-flop 496.

The relatively high voltages on the right output terminal of the flip-flop 496 are transferred at the end of each operation to the flip-flop 494 to produce a relatively high voltage on the right output terminal of the flip-flop 494. This transfer is obtained through stages including the flip-flop 496, the "or" network 516, the "and" network 528, the "or" network 532, the "and" network 534 and the flip-flop 494. The operation of these stages can be expressed by the following logical equation:

$$b_2=\overline{G}_5P_{18}\overline{B}_1T(\overline{L}_3+\overline{L}_4) \qquad (33)$$

where $\overline{b}_2$=the introduction of a triggering signal to the right input terminal of the flip-flop 494; and the other terms have previously been defined.

At certain times, the ΔY information obtained for one block may be desired for use as the ΔY increment of subsequent blocks. This is obtained by transferring the ΔY information in the flip-flop 494 back to the flip-flop 496. Such a transfer is produced by the operation of the gate circuits 492 and 508 in FIGURE 9. The gate circuit 492 passes a signal when the voltage on the left output terminal of the flip-flop 494 is high. The gate circuit 492 passes a signal only at pulse position 18 for a block because of its connection to the "and" network 216. Signals pass through the gate circuit 492 only for those blocks in which an operation is being completed. This results from the connection of the right output terminal of the flip-flop 390 to an input terminal of the "and" network 492.

Signals from the "and" network 492 pass through the "or" network 488 to the "and" network 490. The "and" network 490 operates to synchronize these signals so that they pass through the "and" network at an optimum time in the clock cycles. This results from the introduction to the "and" network 490 of relatively high voltages on the left output terminal of the flip-flop 164. The signals from the "and" network 490 trigger the flip-flop 496 to produce a relatively high voltage on the left output terminal of the flip-flop. The passage of signals through the "and" network 492, the "or" network 488 and the "and" network 490 can be expressed logically as:

$$b_1=B_2\overline{G}_5P_{18}T \qquad (34)$$

where all of the terms have previously been defined.

In like manner, the "and" network 508, the "or" network 510 and the "and" network 512 operate to transfer relatively high voltages on the right output terminal of the flip-flop 494 to the right output terminal of the flip-flop 496. The "and" network 508, the "or" network 510 and the "and" network 512 pass signals in accordance with the logical expression:

$$\overline{b}_1=\overline{B}_2\overline{G}_5P_{18}T \qquad (35)$$

where all of the terms have previously been defined.

In this way, ΔY increments are obtained for one block and are stored in the flip-flop 496 for the remainder of the block. At the end of the block, the increments are transferred to the flip-flop 494 so that the flip-flop 496 can receive information relating to the ΔY increments for the next block. At the end of this next block, the information relating to the ΔY increments in the flip-flop 494 are sometimes transferred back to the flip-flop 496 to serve as the ΔY information for a third block which follows the second block.

The information obtained by the flip-flop 496 and transferred to the flip-flop 494 represents ΔY increments. The ΔY increments obtained for each block are added to the value of the dependent quantity Y to obtain a new value of Y for the block. This new value of Y is obtained every time that the block is presented for computation. The value of Y for each block is stored in the channel 150 and is made available when the block is presented for computation.

THE COMBINATION OF Y AND ΔY

In FIGURE 40, the block 1756 is shown as performing the function of adding the value of Y with the ΔY increments for each block upon the presentation of the block for computation. As described previously, the block 1756 is only a schematic representation and is actually equivalent to a number of stages. The operation of these stages will now be described in detail.

The value of Y for each block is not necessarily stored all of the eighteen positions in the channel 150 for the block. When the block is being used for normal integration, the value of Y is actually stored in a number of positions less than eighteen. The beginning of the Y information for each block is represented by a relatively high signal permanently recorded in the channel 148. This signal triggers the flip-flop 542 in FIGURE 15 to produce a relatively high voltage on the left output terminal of the flip-flop. The signal will hereafter be designated as the "start" pulse.

The relatively high voltage on the left output terminal of the flip-flop 542 is introduced to the "and" network 540. Signals from the inverter 541 are also introduced to the "and" network 540. Since the inverter 541 has signals introduced to it through the "or" network 543 from the "and" networks 222 and 216, the inverter passes a signal to the "and" network 540 between positions 2 to 17, inclusive, for each block. In this way, the "and" network 540 passes the coding pulse in the channel 152 when the pulse occurs in pulse positions 2 to 17, inclusive, for a block. The "and" network 540 passes a signal when a relatively high voltage is produced on the right output terminal of the flip-flop 446.

The signals from the "and" network 540 pass through the "or" network 828 to the "and" network 830. The "and" network 830 performs a synchronizing operation in a manner similar to that described above to pass the signal at an optimum time in a clock cycle. The signal passing through the "and" network 830 triggers the flip-flop 446 to produce a relatively high voltage on the left output terminal of the flip-flop. This production of a relatively high voltage on the left output terminal of the flip-flop 446 can be logically expressed as $$s_1 = Y_p \overline{S}_1 P_{2/17} T \qquad (36)$$

$s_1$=the introduction of a triggering signal to the left input terminal of the flip-flop 446;

$Y_p$=a relatively high voltage on the left output terminal of the flip-flop 542 to represent the "start" pulse;

$\overline{S}_1$=a relatively high voltage on the right output terminal of the flip-flop 446; and $P_{2/17}$=a signal from the inverter 541 to indicate pulse positions 2/17 inclusive for a block.

As previously described, certain operations carry over from one block to a successive block so that the two blocks essentially serve as one elongated block. Coding must be provided to indicate at the end of the first block that the operation will continue in the second block. This coding is permanently provided by relatively high signals in the channels 140 and 142 at pulse position 18 for the first block. Upon the occurrence of such a coding at pulse position 18 for the first block, relatively high voltages are simultaneously introduced to the "and" network 826 (FIGURE 15) from the "and" network 216 and the left output terminals of the flip-flops 306 and 310. This causes a signal to pass through the "and" network 826, the "or" network 828 and the "and" network 830 to trigger the flip-flop 446 for the production of a relatively high voltage on the left output terminal of the flip-flop. The operation of the stages 826, 828 and 830 in passing triggering signals to the flip-flop 446 can be logically expressed as:

$$s_1 = L_1 L_2 P_{18} T \qquad (37)$$

where all of the terms have previously been defined.

The addition of the ΔY increment to the value of Y for a block does not start until a relatively high voltage has been produced on the left output terminal of the flip-flop 446 in a manner similar to that described above. Only one ΔY increment is added to the value of Y for a block every time that the block is presented for computation. The addition is obtained by the operation of the flip-flop 538 in FIGURE 10 and the cathode followers 580 and 594 in FIGURE 11.

The flip-flop 538 in FIGURE 10 indicates a carry from one pulse position to the next when each ΔY increment is added to the value of Y for a block. A carry is obtained when the sum of the indications in one position represents a binary value of "2" or more. For example, a carry is obtained when an indication of "1" in the value of Y for a certain position such as position 11 for a block coincides with a positive ΔY increment at this position. The addition of an indication of "1" for Y in a particular position and an indication of "1" for the ΔY increment in the position produces a value of "2." This can be represented by an indication of "0" for the position and a carry of "1" to the next position. The carry is then added to the indications of Y and ΔY at the next position. Similarly, additions of indications of "1" for Y, ΔY and the carry flip-flop 538 for a position produce a resultant value of "3." This is equivalent in binary form to an indication of "1" for the position and a carry of "1" to the next position.

The carry flip-flop 538 is triggered in each block to produce a relatively high voltage on its left output terminal at the "start" position. This triggering is effectuated by the passage of a triggering signal to the left input terminal of the flip-flop 538 from the "and" network 540 in FIGURE 10. The operation of the "and" network 540 has been previously described in detail and has been logically expressed in Equation 36. As described above, the "and" network 540 passes a signal to indicate that the information in the remaining positions in the channel 150 for the block undergoing computation represents the value of Y.

Signal indications representing ΔY are combined in each position with the indications representing Y. A positive ΔY increment representing a value of +1 is represented by an indication of "1" in the position of least significance and indications of "0" in the subsequent positions. A negative ΔY increment representing a value of "−1" is represented by an indication of "1" in the position of least significance as well as indications of "1" in all of the following positions. As may be seen, the triggering of the flip-flop 538 to an indication of "1" in the position of least significance is consistent for both positive and negative ΔY increments. For this reason, a relatively high voltage is produced on the left output terminal of the flip-flop 538 at the first information position for Y. This voltage is produced by the passage of the "start" pulse through the "and" network 540 to the flip-flop. The high voltage on the left output terminal of the flip-flop 538 represents a binary indication of "1" for ΔY in the last significant position. The carry flip-flop 538 is triggered to a "true" state in accordance with the logical equation $$b_3 = Y_p \overline{S}_1 P_{2/17} T \qquad (38)$$

where all of the terms have previously been defined.

Since only one $\Delta Y$ increment is being added each time to a value of Y, two representative examples will be given. One represents the addition of a $+\Delta Y$ increment to a value of Y and the other represents the addition of a $-\Delta Y$ increment to Y. As the first example, a positive $\Delta Y$ increment may be added to binary indications of 101110011 (representing a decimal value of "371"), where the least significant binary digit is at the right. This addition is represented below as $$\begin{array}{r} 101110011 \\ 000000001 \\ \hline 101110100 \end{array}$$

As will be seen, the addition of a $+\Delta Y$ increment causes the indications representing Y for each position to be inverted until after the first 0 in a position for Y is obtained. In the above example, the indications representing Y are inverted until the fourth position. Thereafter the value of Y in each position remains the same as before the addition of the positive $\Delta y$ increment. The above rules may be seen to apply for other examples.

It will be seen from the above that the carry flip-flop 538 should indicate a carry for the addition of a positive $\Delta Y$ increment until after the first indication of "0" in a position for Y is obtained. At that time, no further carries from one position to the next should be provided by the flip-flop 538 so that the value of Y in subsequent positions can be copied without change. The operation of the flip-flop 538 in indicating a carry until after the first indication of "0" in a pulse position for Y is controlled by the "and" network 554 in FIGURE 10. This network receives a signal from the left output terminal of the flip-flop 494 to indicate that a positive $\Delta Y$ increment has occurred. The "and" network 554 also receives a voltage from the right output terminal of the flip-flop 450 to represent indications of "0" in the different positions for Y.

Upon the simultaneous introduction of high voltages to the "and" network 554 from the flip-flops 450 and 494, a signal passes through the "and" network 554 and the "or" network 558. This signal is synchronized in a clock cycle by the operation of the "and" network 560 and is introduced to the right input terminal of the flip-flop 538 to trigger the flip-flop. When the flip-flop 538 is triggered, a relatively high voltage is produced on the right output terminal of the flip-flop to indicate that no further carries from one position to the next will be produced. The operation of the stages 554, 558 and 560 in introducing triggering signals to the flip-flop 538 can be logically expressed as $$\overline{b}_3 = S_1 B_2 \overline{Y} T \qquad (39)$$

where $\overline{b}_3$=the introduction of a triggering signal to the right input terminal of the flip-flop 538;

$\overline{Y}$=a relatively high voltage on the right output terminal of the flip-flop 450; and the other terms have previously been defined.

As will be seen from the above example representing the addition of a $+\Delta Y$ increment, the indications of Y are inverted as long as a carry is being obtained from one position to the next. For example, an indication of "1" in a position for Y becomes inverted to a value of "0" in the position, and an indication of "0" in a position for Y becomes inverted to an indication of "1" in the position. This is obtained in part from the operation of the "and" network 574 and the "or" network 579 in FIGURE 11 and in part from the operation of the "and" network 572 and the "or" network 595.

The "and" network 574 passes a signal representing an indication of "0" in a position for Y when a carry is being indicated by the flip-flop 538. This signal passes through the "or" network 579 to the "and" network 581.

The "and" network 581 synchronizes the signal at an optimum time in the clock cycle and introduces the signal to the cathode follower 580. The cathode follower then produces a signal representing an indication of "1" for the position. An operation of the "and" network 574, the "or" network 579 and the "and" network 581 in converting indications of "0" to indications of "1" can be expressed as $$y_N = \overline{Y} B_3 T \qquad (40)$$

where $y_N$=the introduction of a signal to the cathode follower 580 to represent an indication of "1" in the new value of Y for a position; and the other terms have previously been defined.

In like manner, the "and" network 572 passes a signal when relatively high voltages are simultaneously produced on the left output terminals of the flip-flops 450 and 538. The "and" network passes a signal to represent that an indication of "1" for a position is being inverted to an indication of "0" because of the introduction of a carry from the flip-flop 538. Each signal from the "and" network 572 passes through the "or" network 595 to the "and" network 597, which synchronizes the signal at an optimum time in the clock cycle. The signal then passes through the cathode follower 594 to represent an indication of "0" for a position. The operation of the "and" network 572, the "or" network 595 and the "and" network 597 in inverting indications of "1" to indications of "0" can be logically expressed as $$\overline{Y}_N = Y B_3 T \qquad (41)$$

where $\overline{Y}_N$=the introduction of a signal to the cathode follower 594 to represent an indication of "0" in the new value of Y for a position;

$Y$=a relatively high voltage on the left output terminal of the flip-flop 450 to represent an indication "1" in the previous value of Y for the position, and the other terms have previously been defined.

It has been described above that the carry flip-flop 538 is turned off when inversion is no longer required. For the addition of a positive $\Delta Y$ increment, this occurs when the first indication of "0" in a position for Y has been presented. Thereafter, the indications of "Y" for each position in the block controlling computation are recirculated without change. The recirculation occurs because of the operation of the "and" networks 570 and 576 in FIGURE 11. The "and" network 570 receives indications of "1" in the positions for Y and introduces these signals through the "or" network 579 to the "and" network 581. The signals are synchronized at optimum times in the clock cycles and are introduced to the cathode follower 580. The "and" network 570, the "or" network 579 and the "and" network 581 pass signals in accordance with the logical expression:

$$Y_N = Y \overline{B}_3 T \qquad (42) \text{ and } (43)$$

where $\overline{B}_3$=a relatively high voltage on the right output terminal of the flip-flop 538; and the other terms have previously been defined.

Similarly, the "and" network 576 receives indications of "0" in the positions for Y and passes these indications through the "or" network 595 to the "and" network 597. The "and" network synchronizes these signals and introduces them to the cathode follower 594. The logical equation controlling the passage of signals through the "and" network 576, the "or" network 595 and the "and" network 597 is $$\overline{Y}_N = \overline{Y} \overline{B}_3 T \qquad (44)$$

where all of the terms have previously been defined.

Just as a positive ΔY increment is represented by an indication of "1" in the position of least significance and an indication of "0" in every succeeding position, a negative ΔY increment is represented by a indication "1" in each position. This indication of "1" in each position is added to the indication of Y in the position. As a particular example, a negative ΔY increment may be added to a value of Y as follows, the least significant digit being at the right:

$$\begin{array}{r} 101011000 \\ 111111111 \\ \hline 101010111 \end{array}$$

As will be seen from the above example, the indication of Y in each position is inverted until the first indication of "1" in a position for Y. Thereafter, the indication of Y in each position is copied without change to obtain the new value of Y.

It will be seen from the above example that no carry is actually obtained in certain of the first positions where the value of Y is being inverted. This may be seen from the first three positions in the above example. In order to obtain the inversion in the value of Y, however, the carry flip-flop 538 is initially triggered into its true state by the operation of the "and" network 540 in FIGURE 10. The operation of the "and" network 540 has been described above and expressed logically in Equation 38. The carry flip-flop then remains in its true state until the inversion in the value of Y is no longer required. During the time that the carry flip-flop remains in its true state, indications of "0" for Y pass through the "and" network 574 to the cathode follower 580, which provides indications of "1." This inversion is obtained in accordance with logical Equation 40. Similarly, the "and" network 576 passes indications of "1" to the cathode follower 594 for inversion to indications of "0." This is in accordance with logical Equation 41.

When inversion is no longer required, the flip-flop 538 is triggered into its false state by the operation of the "and" network 556 in FIGURE 10. The "and" network 556 receives the voltages on the left output terminal of the flip-flop 450 and the right output terminal of the flip-flop 494. The simultaneous occurrence of such high voltages represents the first indication of "1" in a position for Y when the ΔY increment is negative. The signal from the "and" network 556 passes through the "or" network 558 to the "and" network 560. The "and" network 560 passes this signal only when indications representing the value of Y are being presented in the channel 150 since the "and" network 560 is connected to the left output terminal of the flip-flop 446. The signals from the "and" network 560 trigger the flip-flop 538 to produce a relatively high voltage on the right output terminal of the flip-flop. The operation of the "and" network 556, the "or" network 558 and the "and" network 560 in passing triggering signals to the flip-flop 538 may be logically expressed as $$\overline{b}_3 = S_1\overline{B}_2YT \qquad (45)$$

where all of the terms have previously been defined.

Since the carry flip-flop 538 remains in its true state until the inversion in the indications of Y is no longer required, the cathode followers 580 (FIGURE 11) and 594 operate for negative ΔY increments in a manner similar to that described above for positive Δ$y$ increments. During the time that inversion is being obtained for negative Δ$y$ increments, the "and" network 574 inverts indications of "0" to indications of "1" for introduction to the cathode follower 580. Similarly, the "and" network 572 inverts indications of "1" to indications of "0" for introduction to the cathode follower 594. When inversion is no longer required for negative Δ$y$ increments, indications of "1" pass through the "and" network 570 to the cathode follower 580. Similarly, indications of "0" pass through the "and" network 576 to the cathode follower 594. The operation of the "and" networks 574, 572, 570 and 576 has been logically expressed in Equations 40, 41, 43 and 44.

In order to make certain that the carry flip-flop 538 in FIGURE 10 is prepared at the end of each operation for proper functioning at the beginning of the next operation, the "and" network 552 is included to control the operation of the flip-flop. The "and" network 552 receives voltages from the right output terminal of the flip-flop 390. As previously described, a relatively high voltage on the right output terminal of the flip-flop 390 indicates a single block or the second half of a double block when the two blocks perform a single operation. The "and" network 552 is also connected to the "and" network 208, which produces a relatively high voltage at position "17" for each block.

The signals from the "and" network 552 pass through the "or" network 558 to the "and" network 560. The "and" network 560 in turn passes the signals when a relatively high voltage is produced on the left output terminal of the flip-flop 446 to show that the signals in the channel 150 represent indications of Y. The signals from the "and" network 560 trigger the flip-flop 538 to produce a relatively high voltage on the right output terminal of the flip-flop. The operation of the "and" network 552, the "or" network 558 and the "and" network 560 can be logically expressed as:

$$\overline{b}_3 = \overline{G}_5P_{17}S_1T \qquad (46)$$

where all of the terms have previously been defined.

The signals produced in the cathode followers 580 and 594 in FIGURE 11 represent the new value of Y for each block. These signals are recorded in the channel 150 so that they can be used in the next cycle of computation. The signals in the cathode follower 580 are recorded as indications of "1" in accordance with the operation of the "and" network 1334 in FIGURE 26. The "and" network 1334 receives the signals from the cathode follower 580 and from the left output terminal of the flip-flop 446. Signals are introduced to the "and" network 1334 from the flip-flop 446 so that the new value of Y will be recorded in the channel 150 for a block only during the positions after the "start" pulse. Signals are also introduced to the "and" network 1334 from the cathode follower 1340 to indicate that computation is proceeding.

The signals from the "and" network 1334 pass through the "or" network 1346 to the "and" network 1348. The "and" network 1348 synchronizes these signals at an optimum time in the clock cycles because of the introduction of a voltage from the left output terminal of the flip-flop 164. The signals then pass through the "and" network 1348 to the flip-flop 1332. These signals trigger the flip-flop 1332 and produce a relatively high voltage on the left output terminal of the flip-flop. The signals on the left output terminal of the flip-flop 1332 are introduced to the coil 1333 so that the coil may record the information in the channel 150.

The operation of the stages 1334, 1346 and 1348 in passing signals to the flip-flop 1332 can be logically expressed as:

$$_0Y = \alpha Y_n S_1 \overline{G}_3 T \qquad (47)$$

where $_0Y$=the introduction of a triggering signal to the left input terminal of the flip-flop 1332;

$Y_n$=a relatively high voltage from the cathode follower 580;

$S_1$=a relatively high voltage on the left output terminal of the flip-flop 466; and $\overline{G}_3$=a relatively high voltage on the right output terminal of the flip-flop 1342.

Figure 26:
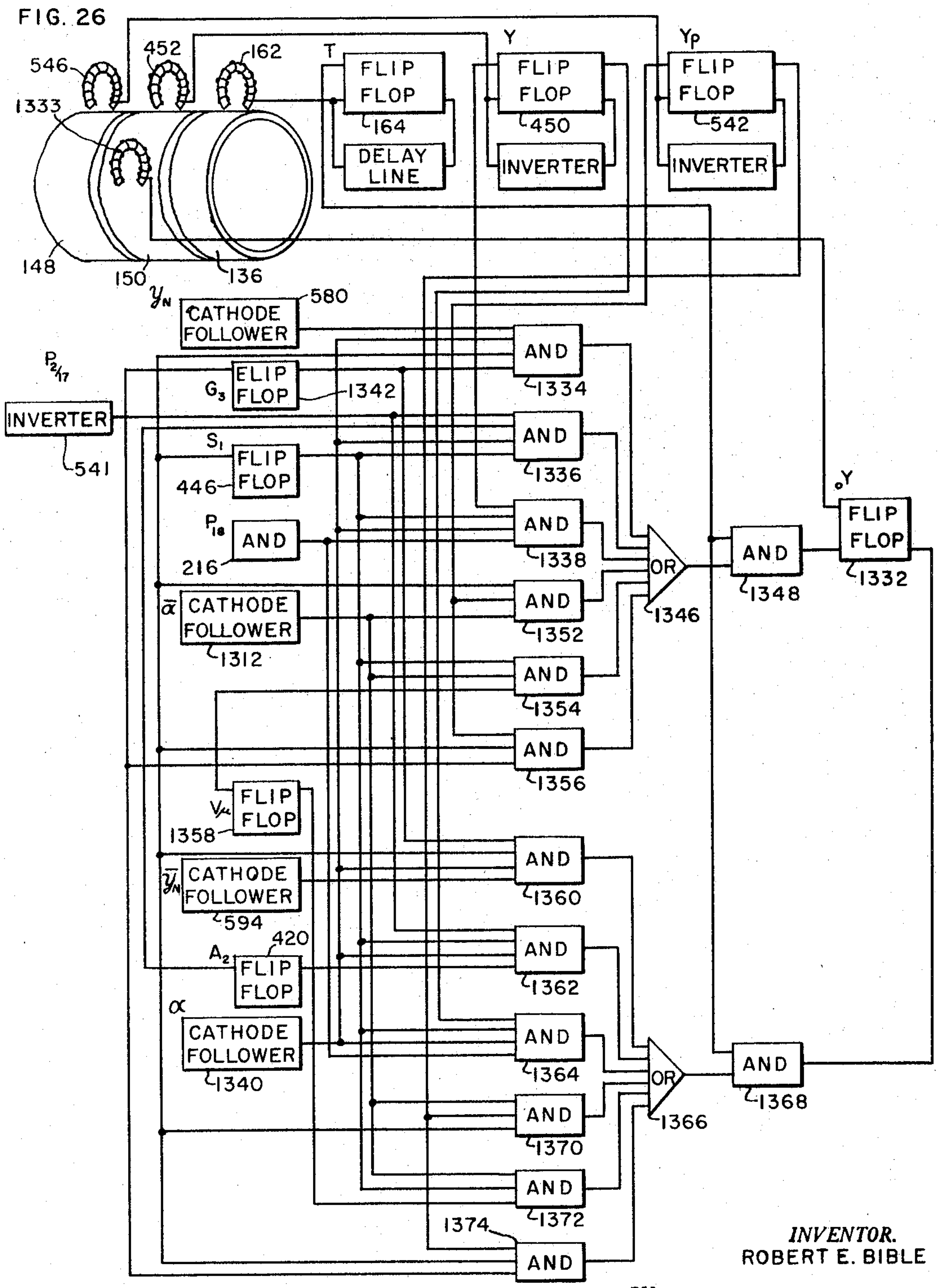

Just as the signals from the cathode follower 580 pass through the "and" network 1334 in FIGURE 26, the signals from the cathode follower 594 pass through the "and" network 1360. The signals passing through the "and" network 1360 are in turn introduced through the "or" network 1366 to the "and" network 1368, which synchronizes the signals at an optimum time in the clock cycles. The signals from the "and" network 1368 then pass to the flip-flop 1332 to trigger the flip-flop. When the flip-flop 1332 is triggered, a relatively high voltage is produced on the right output terminal of the flip-flop and a relatively low voltage is produced on the left output terminal of the flip-flop.

The signals of low amplitude on the left output terminal of the flip-flop 1332 pass to the coil 1333 for recordation in the channel 150. These signals represent indications of "0" in the positions of "Y" for a block. The logical equation representing the operation of the "and" network 1360, the "or" network 1366 and the "and" network 1368 is $$ {}_0\overline{Y} = {}_a\overline{Y}_n S_1 \overline{G}_3 T \qquad (48) $$

where ${}_0\overline{Y}$=the introduction of a triggering signal to the right input terminal of the flip-flop 1332;

$\overline{Y}_n$=a signal from the cathode follower 594; and the other terms have previously been described.

THE COMBINATION OF YΔX AND R

As previously described, the area under a curve $y=f(x)$ can be obtained by producing ΔX increments and combining these increments with the value of Y to obtain successive YΔX increments. These successive YΔX increments are then combined to obtain the area under the curve represented by $y=f(x)$. Since the value of Y for each block is retained in the appropriate positions in the channel 150 for the block, these indications are utilized in conjunction with the ΔX indications in the flip-flop 420 to obtain the YΔX increments. A typical YΔX increment is illustrated at 1600 in FIGURE 34.

The YΔX increment obtained for each block in a cycle of computation is combined with the cumulative value of the previous YΔX increments for the block undergoing computation. The combination is schematically represented as being obtained by the adder 1760 in FIGURE 40, but actually the combination is obtained by the operation of a plurality of stages. The operation of these stages will be described in the subsequent paragraphs.

It will be seen that each YΔX increment in FIGURE 34 approximates the area under the curve $y=f(x)$ for the ΔX increment, but does not actually equal this area. The approximation can be made relatively accurate by decreasing the value of each ΔX increment. The approximation can be further enhanced in accuracy by providing a truncation correction for each YΔX increment. This truncation correction is obtained by approximating the value of Y at an intermediate position in each ΔX increment. The intermediate value of Y is approximated by determining the value of Y at the beginning and at the end of each ΔX increment and by producing a value half way between those at the beginning and end of the ΔX increment. In this way, a correction represented by a cross-hatched area 1602 in FIGURE 34 is combined with each YΔX increment to produce an area closely approximating the area under the curve $y=f(x)$.

Since each block has only one ΔX increment every time that block is presented for computation, the true correction in the value of Y for the block is represented by ½ΔY. When both the ΔX increment and the ΔY increment are positive, the YΔX increment can be represented by $$ \left[\left(Y+\frac{2^{-n}}{2}\right)(\Delta X)\right] $$

where there are $n$ positions in the channel 150 to represent the value of Y in digital form. The corrective value represented by $$ \frac{2^{-n}}{2} $$

will be discussed at a subsequent time. The value of YΔX for each position is obtained by the logical equation:

$$ y=S_1A_2B_2Y \qquad (49) $$

where $y$=an indication of "1" in a particular position for a YΔX increment;

$A_2$=a relatively high voltage on the left output terminal of the flip-flop 420 to indicate a positive ΔY increment;

$B_2$=a relatively high voltage on the left output terminal of the flip-flop 494 to indicate a positive ΔY increment, $Y$=a relatively high voltage for the dependent quantity Y in the particular position in the channel 150; and $S_1$=a relatively high voltage on the left output terminal of the flip-flop 446.

The "and" network 590, the "or" network 584 and the "and" network 586 in FIGURE 11 operate in accordance with the logical equation given above to pass signals through the "or" network 584 to the "and" network 586. Since the "and" network 586 is connected to the left output terminal of the flip-flop 446, it passes signals only in the positions representing indications of Y in the channel 150. The signals from the "and" network 586 pass through the "or" network 598 to the "and" network 607. The "and" network 607 synchronizes the signals at optimum times in the clock cycles and introduces the signals to the cathode follower 436 for passage through the cathode follower.

Similarly, the "and" network 620 passes the signals in the channel 150 when the ΔX and ΔY increments are both positive for the block undergoing computation and the indications of Y are "0." The "and" network 620 operates at these times since it receives the voltages from the left output terminals of the flip-flops 420 and 494. The signals from the "and" network 620 pass through the "or" network 616 to the "and" network 622. The "and" network 622 passes signals only at positions after the "start" pulse for each block. The signals then pass through the "or" network 626 to the "and" network 627. The "and" network 627 synchronizes the signals at an optimum time in the clock cycles and passes the signals through the "or" network 626 to the cathode follower 462. The stages 620, 616, 622 and 626 operate in accordance with the logical equation $$ \overline{y}=S_1A_2B_2\overline{Y} \qquad (50) $$

$\overline{y}$=a signal passing to the cathode follower 462 to represent an indication of "0" for a pulse position, and the other terms have previously been defined.

Sometimes the ΔX increment may be positive for a block and the ΔY increment for the block may be negative. At such times, the value of Y should be corrected by the process of truncation so that the corrected value of Y is less than the value of Y from the channel 150. This correction is obtained by subtracting ½ΔY from the value of Y in the channel 150. This is equivalent to adding ½ΔY to the new value of Y which is recorded in the channel 150 during the particular cycle of computation. The reason for this is that the new value of Y is less by one integer than the old value of Y because of the subtraction of ΔY increment from the old value of Y. In other words $$Y-\frac{1}{2}^{2-n}=Y_n+\frac{1}{2}^{2-n}$$

The value of $y$ for a positive ΔX increment and a negative ΔY increment can be represented by $$y=S_1A_2\overline{B}_2Y_n \qquad (51)$$

This logical equation represents in part the operation of the "and" network 582 since the "and" network receives input signals from the cathode follower 580, the left output terminal of the flip-flop 420 and the right output terminal of the flip-flop 494. The signals from the "and" network 582 pass through the "or" network 584, the "and" network 586, the "or" network 598 and the "and" network 607 to the cathode follower 436.

In like manner, the "and" network 614 passes indications of "0" in the channel 150 for a block when the ΔX increment is positive and the ΔY increment is negative. The signals from the "and" network 614 pass through the "or" network 616, the "and" network 622, the "or" network 626 and the "and" network 627 to the cathode follower 462. The logical equation controlling the operation of the stages 614, 616, 622 and 626 if $$\overline{y}=S_1\overline{Y}_nA_2\overline{B}_2 \qquad (51a)$$

where all of the terms have previously been defined.

At certain times, the ΔX increment for a block may be negative and the ΔY increment may be positive. At such times, the corrected YΔX increment may be represented by $$\left(Y+\frac{2^{-n}}{2}\right)(-\Delta X)=\overline{Y+\frac{2^{-n}}{2}}(\Delta X)$$

In order to complement the value of Y, the indication for Y in each position is inverted and an indication of "1" is added in the least significant position. Because of this $$\left(\overline{Y+\frac{2^{-n}}{2}}\right)=\left(\overline{Y}-\frac{2^{-n}}{2}\right)+2^{-n}=\overline{Y}+\frac{2^{-n}}{2}$$

Since the correction of $$\frac{2^{-n}}{2}$$

will be described in detail later, $$y=\overline{A}_2B_2\overline{Y}S_1 \qquad (52)$$

when the ΔX increment for a block is negative and the ΔY increment for the block is positive. This logical equation controls the operation of the "and" network 588 since the "and" network receives the voltages on the right output terminals of the flip-flops 420 and 450 and on the left output terminal of the flip-flop 494. The signals from the "and" network 588 in FIGURE 11 pass through the "or" network 584, the "and" network 586, the "or" network 598 and the "and" network 607 to the cathode follower 436.

The "and" network 618 passes signals for a block when the ΔX increment for the block is negative and the ΔY increment for the block is positive. The "and" network 618 passes signals at this time because of its connections to the right input terminal of the flip-flop 420 and the left input terminal of the flip-flop 494. The "and" network 618 also receives the indications of "1" on the left output terminal of the flip-flop 450 and passes the signals through the "or" network 616, the "and" network 622, the "or" network 626 and the "and" network 627 to the cathode follower 462. The operation of the stages 618, 616, 622 and 626 can be logically expressed as $$\overline{y}=S_1\overline{A}_2B_2Y \qquad (52a)$$

where all of the terms have previously been defined.

It may sometimes happen that the ΔX increment and the ΔY increment for a block are both negative. When this occurs, the corrected YΔX increment for the block is equal to $$\left(Y-\frac{2^{-n}}{2}\right)(-\Delta X)=\left(\overline{Y-\frac{2^{-n}}{2}}\right)(\Delta X)$$

Since the complementary value of Y is $$\overline{Y}+\frac{2}{2},$$

as described above, $$\overline{(Y-2^{-n})}-(\overline{Y}+2^{-n})+\frac{2^{-n}}{2}-\overline{Y}+\frac{3}{2}2^{-n}$$

But $Y_n+Y-2^{-n}$, since ΔY is being subtracted from Y. Complementing $$\overline{Y}+2^{-n}=\overline{(Y-2^{-n})}+2^{-n}$$

On a simplified basis, this can be represented as $$\overline{Y}_n=\overline{Y}+2^{-n}$$

Substituting, $$\overline{(Y-2^{-n})}=\overline{Y}+\frac{3}{2}2^{-n}=Y_n+\frac{2^{-n}}{2}$$

The compensation provided by $$\frac{2^{-n}}{2}$$

will be described in detail hereinafter. On the basis of the above, $$y=S_1\overline{A}_2\overline{B}_2\overline{Y}_n \qquad (53)$$

when the ΔX and ΔY increments are negative.

The "and" network 592 in FIGURE 11 operates in accordance with this logical expression and causes signals to pass through the "or" network 584, the "and" network 586, the "or" network 598 and the "and" network 607 to the cathode follower 436.

In like manner, the "and" network 612 becomes operative when the ΔX increment and ΔY increment for a block are both negative. The "and" network 612 becomes operative at this time because of its connection to the right output terminals of the flip-flops 420 and 494. At such times, the "and" network 612 receives the signals representing $Y_n$ from the cathode follower 580 and passes the signals through the "or" network 616, the "and" network 622, the "or" network 626 and the "and" network 627 to the cathode follower 462. The logical equation controlling the operation of the stages 612, 616, 622, 626 and 627 is $$\overline{y}=S_1\overline{A}_2\overline{B}_2Y_n \qquad (53a)$$

The YΔX increments obtained for each block are combined to form a differential combination which may be designated as "R." Thus $R=\Sigma Y\Delta X$. Since the symbol "$y$" represents the YΔX increment obtained for a block upon the presentation of the block for computation, $y$ is added to R for each block in each cycle of computation to obtain a new value of R.

The value of R for each block is stored in the appropriate positions in the channel 152 for the block. The indications representing the value of R for the block are stored in the channel 152 in the positions after the start pulse. When a block is being used for normal integration, the indications representing the differential combination "R" pass through the "and" networks 652 and 642 in FIGURE 12 without any change. The indications of "1" pass through the "and" network 652 since the carry flip-flop 458 is in its "off" condition as represented by a high voltage on the right output terminal of the flip-flop. The functions of the carry flip-flop 458 will be described in detail subsequently.

The signals from the "and" network 652 pass through the "or" network 656 to the "and" network 657. The "and" network 657 synchronizes these signals at optimum times in the clock cycles and introduces the signals to the cathode follower 659. The operation of the "and" network 652, the "or" network 656 and the "and" network 657 in passing indications of "1" in the positions for R can be logically expressed as:

$$\boldsymbol{R}=R\overline{F}_3T \qquad (54)$$

$\boldsymbol{R}$=a signal introduced to the cathode follower 659;

$R$=a relatively high voltage on the left output terminal of the flip-flop 646 to represent an indication of "1" in the channel 152 for a position; and $\overline{F}_3$=a relatively high voltage on the right output terminal of the flip-flop 458.

In like manner, the indication of "0" for R in the channel 152 causes relatively high voltages to be produced on the right output terminal of the flip-flop 646. These voltages pass through the "and" network 642 because of the relatively high voltage on the right output terminal of the flip-flop 458. The signals from the "and" network 642 pass through the "or" network 636 to the "and" network 639, which synchronizes the signals at optimum times in the clock cycles. The signals then pass to the cathode follower 637. The logical equation expressing the operation of the stages 642, 636, 639 and 637 is $$\overline{\boldsymbol{R}}=\overline{RF}_3T \qquad (55)$$

where $\overline{\boldsymbol{R}}$=the introduction of a signal to the flip-flop 464;

$\overline{R}$=a relatively high voltage on the right output terminal of the flip-flop 646; and the other terms have previously been defined.

It has previously been described that the value of $y$ for a block is adjusted in each cycle of computation by a value substantially equal to ½ΔY. By utilizing indications of Y, $\overline{Y}$, $Y_n$ and $\overline{Y}_n$ at particular times as described above to obtain the YΔX increments, the truncation correction in the value of Y can be adjusted always to a value of +½ΔY for a block, even though the ΔY increment for the block is negative. For purposes of convenience, this value of +½ΔY is added to the value of R in each cycle of computation.

Since the truncation correction in the value of Y is represented by +½ΔY, the correction must be made at a position of less digital importance than the position of least significance indicating the value of R. Because of the binary code, this correction must be made at the position of the "start" pulse, which is the position just before the position of least significance in the value of R. The correction is provided by the operation of the "and" networks 461 and 441 in FIGURE 12.

As previously described, the flip-flop 446 is triggered by the start pulse in the channel 148. Since the flip-flop is triggered by the start pulse, a relatively high voltage is not produced on the left output terminal of the flip-flop until the end of the start position. For this reason, the flip-flop 446 has a relatively high voltage on its right output terminal at the position of the start pulse. This high voltage is introduced to the "and" networks 461 and 441 in FIGURE 12 to prepare the "and" networks for operation.

The "and" networks 461 and 441 can become operative only in positions 1 to 17, inclusive, for each block because of their connection to the inverter 444. The "and" network 461 also receives signals from the cathode follower 637 which provides indications of "0" in the positions in the channel 152 for R. The "and" network 461 passes these signals through the "or" network 664 to the "and" network 667. The "and" network 667 synchronizes the signals at optimum times in the clock cycles and introduces these signals to the cathode follower 437. Since the cathode follower 437 provides indications of "1," the indications passing through the "and" network 461 to the cathode follower 437 become inverted. By inverting an indication of "0" at the start position to an indication of "1," a value of ½ΔY is added to the value of "R." The "and" network 461, the "or" network 664, the "and" network 667 and the cathode follower 437 operate in accordance with the logical equation:

$$\boldsymbol{R}_i=\overline{\boldsymbol{R}S}_1P_{1/17}T \qquad (56)$$

where $\overline{R}_i$=the introduction of a signal to the cathode follower 437;

$\overline{\boldsymbol{R}}$=a signal from the cathode follower 637;

$\overline{S}_1$=a relatively high voltage on the right output terminal of the flip-flop 446; and $P_{1/17}$=a signal from the inverter 444.

The "and" network 441 receives indications of "1" as represented by signals from the cathode follower 659. At positions before the start pulse and including the start pulse, the "and" network 441 introduces the signals from the cathode follower 659 through the "or" network 665 to the "and" network 669. The "and" network 669 synchronizes these signals at optimum times in the clock cycles and introduces the signals to the cathode follower 464. Since the cathode follower 464 provides indications of "0," the indications of "1" from the cathode follower 659 become inverted. Such inversion is proper when an indication of "1" representing ½ΔY at the start position is added to an indication of "1" for "R" at this position. The addition of two indications of "1" at the start position produces a value of "2," which is equivalent in binary form to an indication of "0" for the position and a carry of "1" to the next position. The operation of the stages 441, 665, 669 and 464 in inverting the indications of "1" to indications of "0" at the start position can be logically expressed as:

$$\overline{\boldsymbol{R}}_i=\boldsymbol{R}\overline{S}_1P_{1/17}T \qquad (57)$$

where $\overline{R}_i$=the introduction of a signal to the cathode follower 464;

$\boldsymbol{R}$=an output signal from the cathode follower 659; and the other terms have previously been defined.

In the previous paragraph, it has been shown that a carry is obtained from the start position to the next position when a truncation correction of +½ΔY is added to an indication of "1" for "R" in the start position. This carry is obtained by the operation of the flip-flop 432 in FIGURE 8. The carry is obtained by the passage of a signal through the "and" network 441, the operation of which has previously been described in detail. The signal from the "and" network 441 passes through the "or" network 440 to the "and" network 439. The "and" network 439 synchronizes these signals at optimum times in the clock cycles and introduces the signals to the flip-flop 432. These signals trigger the flip-flop 432 to produce a relatively high voltage on the left output terminal of the flip-flop. The triggering of the flip-flop 432 by the passage of signals through the stages 441, 440 and 439 can be logically expressed as:

$$a_3=\boldsymbol{R}\overline{S}_1P_{1/17}T \qquad (58)$$

where $a_3$=the introduction of triggering signal to the left input terminal of the flip-flop 432; and the other terms have previously been defined.

The term $P_{2/17}$ could replace $P_{1/17}$ to eliminate the possibility of an undesirable signal at $P_1$ time.

When the indication of R at the start position is "0," the addition of a truncation correction represented by an indication of "1" causes the indication of R to change to "1" without any carry to the next position. Since no carry is obtained, a relatively high voltage is produced on the right output terminal of the flip-flop 432. This voltage is produced by the passage of a signal through the "and" network 461, the operation of the "and" network having been previously described in detail. The signals from the "and" network 461 pass through the "or" network 466 to the "and" network 467. The signals introduced to the "and" network 467 are synchronized in the clock cycles and introduced to the flip-flop 432. These signals trigger the flip-flop 432 to produce a relatively high voltage on the right output terminal of the flip-flop. The passage of signals through the "and" network 461, the "or" network 466 and the "and" network 467 can be logically expressed as:

$$\overline{a}_3=\overline{RS}_1P_{1/17}T \qquad (59)$$

where $\overline{a}_3$=the introduction of a triggering signal to the right input terminal of the flip-flop 432; and the other terms have previously been defined.

The term $P_{2/17}$ could replace $P_{1/17}$ to eliminate the possibility of the undesirable signal at $P_1$ time.

It has been previously described that each YΔX increment for a block is combined with the value of R for the block to obtain a new value of R every time that the block is presented for computation. This combination is obtained by adding the indications of $y$ representing the YΔX increment to the indications of $R$. The new indications of $R$ for each position are designated as $R_1$ and are obtained for each position by combining the indications of $yR$ and the carry resulting from the addition from the previous position. This carry is indicated in the flip-flop 432 and is designated as $A_3$.

It will be seen from the previous paragraph that an indication of "1" in the value of $R_1$ for a position may be obtained from various combinations. In one combination, an indication of "1" for $R_1$ in a position is obtained when the indications of $y$ and $A_3$ are "0" and the indication of $R$ is "1." The "and" network 660 in FIGURE 12 passes a signal for such a condition. Similarly, an indication of "1" is obtained in a position for R when the indications of $A_3$ and R are "0" for the position and the indication of $y$ is "1." For such a condition, the "and" network 634 passes a signal.

A signal passes through the "and" network 638 to represent an indication of "1" for $R_1$ in a position upon the simultaneous occurrence of indications of "0" for $y$ and $R$ and an indication of "1" for $A_3$. Indications of "1" for $y$, $R$, and $A_3$ are introduced to the "and" network 658. Since the addition of three indications of "1" is equivalent in binary form to a resultant indication of "1" and a carry of "1" to the next position, the "and" network 658 passes a signal representing an indication of "1" for the position undergoing computation.

The signals from the "and" networks 634, 638, 658 and 660 pass through the "or" network 664 to the "and" network 667. These signals are synchronized at optimum times in the clock cycles by the operation of the "and" network 667. The signals are then introduced to the cathode follower 437. The stages 634, 638, 658, 660, 664, 667 and 437 operate in accordance with the logical equation:

$$R_1=T(\overline{yA_3}\,\overline{R}+y\overline{A}_3\overline{R}+yA_3\overline{R}+yA_3R) \qquad (60)$$

where $R_1$=the introduction of a signal to the cathode follower 437;

$A_3$=a relatively high voltage on the left output terminal of the flip-flop 432;

$\overline{A}_3$=a relatively high voltage on the right output terminal of the flip-flop 432; and the other terms have previously been defined.

Just as the cathode follower 437 receives signals representing indications of "1" for $R_1$ in the different positions, the cathode follower 464 receives signals representing indications of "0." For example, the "and" network 670 passes signals to the cathode follower 464 when indications of "0" are simultaneously introduced to the "and" network from the cathode followers 462 and 637 and from the right output terminal of the flip-flop 432. Such a simultaneous introduction of signals represent indications of "0" for $y$, $R$, and $A_3$. The "and" network 670 passes a signal since the addition of three indications of "0" gives an output indication of "0."

A signal passes through the "and" network 666 upon the simultaneous introduction of signals from the cathode followers 436 and 659 and from the right output terminal of the flip-flop 432. Such a simultaneous introduction of signals represents indications of "1" for $y$ and $R$ and indications of "0" for $A_3$. The addition of these indications gives a resultant indication of "2," which is equivalent to an indication of "0" for the position undergoing computation and a carry of "1" to the next position. In like manner, the "and" network 668 passes a signal when indications of "1" representing $y$ and $A_3$ are introduced to the network at the same time as indications of "0" representing $R$. Similarly, the "and" network 672 becomes activated in the pulse positions where indications of "1" for $R$ and $A_3$ and indications of "0" for $y$ are simultaneously introduced to the network.

The signals from the "and" networks 666, 668, 670 and 672 are introduced through the "or" network 665 to the "and" network 669. The "and" network 669 synchronizes the signals at optimum times in the clock cycles and introduces the signals to the cathode follower 464. The operation of the stages 666, 668, 670, 672, 665, 669 and 464 can be expressed by the following logical equation:

$$\overline{R}_1=T(\overline{yA_3R}+yA_3\overline{R}+\overline{y}A_3R+y\overline{A}_3R) \qquad (60a)$$

where $R_1$=the introduction of a signal to the cathode follower 464; and the other terms have previously been defined.

The indications of $R_1$ representing the new value of the differential combination R for each block are recorded in the channel 152 for subsequent use. The indications of "1" for $R_1$ pass through the "and" network 1392 in FIGURE 27. The indications for $R_1$ pass only during periods of actual computation because of the introduction of a signal to the "and" network 1392 from the cathode follower 1340. The operation of the cathode follower 1340 will be described in detail subsequently. The indications of "1" for $R_1$ pass through the "and" network 1392 only for "normal" integrators. The term "normal integration" will become more apparent subsequently when other types of integration are discussed. However, "normal" integrators can be considered as integrators which perform the relatively simple and straightforward function of combining $y\Delta x$ increments without any of the additional functions which will be described in detail subsequently. Signals pass through the "and" network 1392 only for blocks performing "normal" integration since the voltage on the left output terminal of the flip-flop 606 is introduced to the network.

The signals from the "and" network 1392 pass through the "or" network 1384 to the "and" network 1386. The "and" network 1386 synchronizes the signals at optimum times in the clock cycles and introduces the signals to the flip-flop 1388. These signals trigger the flip-flop 1388 to produce a relatively high voltage on the left output terminal of the flip-flop. This voltage is introduced to the coil 1410 which records the voltage as indications of "1" in the channel 152. The stages 1392, 1384, 1386 and 1388 operate to produce recordation of information in the channel 152 in accordance with the logical equation:

$${}_0r=\alpha R_1G_1T \qquad (61)$$

where ${}_0r$=the introduction of a triggering signal to the left input terminal of the flip-flop 1388;

$\alpha$=a signal from the cathode follower 1340;

$G_1$=a relatively high voltage on the left output terminal of the flip-flop 606; and the other terms have previously been defined.

Just as the indications of "1" for $R_1$ pass through the "and" network 1392 in FIGURE 27, the indications of "0" representing $\overline{R}_1$ pass through the "and" network 1402. The signals are then introduced through the "or" network 1406 to the "and" network 1408. The signals are synchronized by the "and" network 1408 and are introduced to the right input terminal of the flip-flop 1388 to trigger the flip-flop. Such a triggering of the flip-flop 1388 causes a relatively high voltage to be produced on the right output terminal of the flip-flop and a relatively low voltage to be produced on the left output terminal of the flip-flop. The low voltage on the left output terminal of the flip-flop 1388 is introduced to the coil 1410 so that the coil will record an indication of "0" in the channel 152. The operation of the "and" network 1402, the "or" network 1406, the "and" network 1408 and the flip-flop 1388 in recording indications of "0" in the channel 152 can be logically expressed as:

$$_0\overline{r}=\alpha\overline{R}_1G_1T \qquad (62)$$

where $_0\overline{r}$=the introduction of a triggering signal to the right input terminal of the flip-flop 1388; and the other terms have previously been defined.

It has been previously disclosed that the flip-flop 432 in FIGURE 8 indicates the carry from one position to the next when the indications representing a YΔX increment are arithmetically combined with the indications representing $R$. The operation of the carry flip-flop 432 may be seen from the table shown in FIGURE 36. Several vertical columns are included in this table. The first three columns provide indications representing the possible different combinations for $y$, $R$ and the carry $A_3$ for a particular position. These indications are combined to obtain a new indication for the position, as indicated by the fourth column represented by $R_1$. A carry is also obtained by the addition of the indications in the first three columns. The carry obtained for the next position is indicated in the fifth column in the table shown in FIGURE 36. This carry is utilized in the addition of the indications of $y$ and $R$ in the next position.

It will thus be seen from the above description and from the table shown in FIGURE 36 that column 3 in the table represents the carry for one pulse position and column 5 represents the carry for the next pulse position. A comparison of the two columns indicates that the carry in the third column remains the same as the carry in the first column except for two situations.

Since the carry remains the same from one position to the next in most of the situations, there is no need to change the operation of the flip-flop in these situations. It is only necessary to change the operation of the flip-flop 432 in the situations where the carry changes from an indication of "0" in one position to an indication of "1" in the next position or from an indication of "1" in the first position to an indication of "0" in the next.

The carry changes from a "0" in a first position to a "1" in the second position only for one set of conditions. This set of conditions is represented by $yR\overline{A}_3$ and is indicated in the seventh vertical column in FIGURE 36 by an indication of "1" for $a_3$. The term "$\overline{A}_3$" is not needed in the above expression since the expression $yR$ would insure that the flip-flop 432 would become triggered into its "true" condition representing $A_3$ if the flip-flop is not already in its "true" condition. Thus, $$a_3=YRP_{2/18}T \qquad (63)$$

The term "$P_{2/18}$" is included so that the operation of each block will be distinct from the operation of the next block. The reason is that some of the operations for each block are concluded at position 1 of the next block. This will become more apparent from the subsequent discussion.

The "and" network 433 in FIGURE 8 operates substantially in accordance with the logic expressed in Equation 63. The "and" network 433 receives signals representing $y$ and $R$ from the cathode followers 436 and 659. The "and" network 433 also receives signals from the inverter 438, which inverts the signals from the "and" network 222 to represent positions 2 to 18, inclusive, for each block. The signals from the "and" network 433 pass through the "or" network 440 to the "and" network 439 for synchronization at optimum times in the clock cycles. The signals then pass to the left input terminal of the flip-flop 432. These signals trigger the flip-flop 432 for the production of a relatively high voltage on the left output terminal of the flip-flop.

The $A_3$ flip-flop is triggered from an "on" state of operation to an "off" state of operation for only one set of conditions. This set of conditions is illustrated in the second vertical column of FIGURE 36 by an indication of "1" and could be represented by the logical equation:

$$\overline{a_3}=\overline{y}\overline{R}A_3T$$

The term $A_3$ is not necessary in the above equation for the same reasons that the term $\overline{A}_3$ is not necessary in Equation 63. The "and" network 459 in FIGURE 8 operates in accordance with the logic expressed in Equation 64 by receiving at its input terminals signals from the cathode followers 462 and 637. The "and" network 459 also receives the signals from the inverter 438, which provides indications of positions 2 to 18, inclusive, for each block in a manner similar to that described above. The signals from the "and" network 459 pass through the "or" network 466 to the "and" network 467 for synchronization at optimum times in the clock cycles. The signals then pass to the right input terminal of the flip-flop 432 to trigger the flip-flop to its "false" state of operation. When the flip-flop 432 is triggered by the signals from the "and" network 467, a relatively high voltage is produced on the right output terminal of the flip-flop 432 to indicate a lack of carry. The passage of signals from the "and" network 459 through the "or" network 466 to the "and" network 467 can be expressed by the following logical equation:

$$\overline{a_3}=\overline{y}\overline{R}P_{2/18}T \qquad (64)$$

RECORDING OF OVERFLOW INFORMATION IN THE Z CHANNEL 138

As the indications of $y$ are added to the indications of $R$ in the channel 152, the indications of $R_1$ change. When both $y$ and $R$ are positive, the indications of $R_1$ increase. However, the value of $R_1$ which can be recorded in digital form in the channel 152 for each block is limited, since there are at most only eighteen positions available for $R_1$ in the block. For this reason, the indications of $R_1$ sometimes overflow when positive values of $y$ are added to $R$. As described briefly above and as shown schematically in FIGURE 40, the overflow indications are passed by the Z gate 1762 in FIGURE 40 and are recorded in the channel 138 for subsequent use.

Overflows in the indications of $R_1$ for an addition of positive values of $y$ and $R$ may be seen from a representative example. In the following example, a positive value of $R$ is indicated on the top line and a positive value of $y$ is indicated on the second line. As will be seen, a positive value of $y$ is represented by an indication of "1" at position 17 for a block. The results of adding $y$ and $R$ are indicated in the third line. The example is as follows:

| | $P_{18}$ | $P_{17}$ | $P_{13}$ |
|---|---|---|---|
| $R$ | 0 | 1 | 0111 |
| $y$ | | 1 | 1100 |
| $R_i$ | 1 | 1 | 0011 |

As will be seen, the value obtained by the addition of the above values of $y$ and $R$ is represented by a carry of "1" at position 18. This carry of "1" at position 18 represents a positive overflow in the indications of $R_i$ which are recorded in the channel 152.

The occurrence of an overflow in the value of $R_i$ at position 18 for a block may be further seen from the following discussion. Because of its limited number of positions, the value of $R_i$ recorded in the channel 152 for a block may be considered to have a certain capacity. For example, this capacity might be represented by a decimal value of "+800." The overflow occurs when the value of $R$ exceeds "+800." For example, the value of $R$ might change in one cycle of computation from a decimal value of "794" to a decimal value of "804." When the overflow occurs, the new value of $R$ would be "+4" since this is the difference between "804" and the capacity of "800." When $y$ is subsequently added to $R$ in subsequent cycles of computation, the indications of $R$ would increase from "+4" until they again exceeded the capacity of "+800." At that time, another overflow would occur. In this way, the indications of $R$ would fluctuate between a value of "0" and the capacity of "+800" and overflows would occur every time that the value of R exceeded "+800."

When an overflow in the indications of $R_i$ occurs in the channel 152 for a block, it is represented by a carry at position 18. This may be seen from the above example. The carry causes the flip-flop 432 in FIGURE 8 to be triggered into its true state at position 18 of the block in accordance with the logic expressed above in Equation 63. Since the flip-flop 432 is triggered to its "true" state at position 18 of the block, the "and" networks 1506 and 1500 in FIGURE 29 become activated for the passage of a signal. The "and" network 1506 becomes activated since it is connected to the left output terminal of the flip-flop 432. The "and" network 1506 also has the voltage on the right output terminal of the flip-flop 446 introduced to it. A relatively high voltage on the right output terminal of the flip-flop 446 at position 18 for a block indicates that the information relating to the dependent quantity Y has been completed in the channel 150 for the block.

The signals from the "and" network 1506 pass through the "or" network 1502 to the "and" network 1500. Since the "and" network 1500 is connected to the "and" network 222, only overflow indications from a block can pass through the "and" network 1500 at position "1" of the next block. These signals then pass through the "or" network 1478 to the "and" network 1480 for synchronization at optimum times in the clock cycles. The signals then pass to the left input terminal of the flip-flop 337. The signals pass to the flip-flop 337 at position 1 of the next block since the signals can pass through the stages 1506, 1502, 1500, 1478 and 1480 only upon the occurrence of the clock signal following the triggering of the flip-flop 432 into its true state.

The signals from the "and" network 1480 trigger the flip-flop 337 for the production of a relatively high voltage on the left output terminal of the flip-flop. When a relatively high voltage is produced on the left output terminal of the flip-flop 337, it is introduced to the coil 270, which is disposed in contiguous relationship to the channel 138. The introduction of this high voltage to the coil 270 causes an indication of "1" to be recorded in the channel 138 as an overflow indication in the value of $R_i$ for the previous block.

Signals pass through the stages 1506, 1502, 1500, 1478 and 1480 to the flip-flop 337 in accordance with the logical equation:

$$_0z=\alpha P_1A_3\overline{S}_1T \qquad (65)$$

where $_0z$=the introduction of a triggering signal to the left input terminal of the flip-flop 337;

$P_1$=a signal from the "and" network 222;

$A_3$=a relatively high voltage on the left output terminal of the flip-flop 432; and $\overline{S}_1$=a relatively high voltage on the right output terminal of the flip-flop 446.

Since positive values of $y$ for blocks undergoing "normal" integration are represented by an indication of "1" at position 17, negative values of $y$ for blocks undergoing "normal" integration are represented by an indication of "0" at position 17. For negative numbers having high absolute magnitudes, indications of "0" are provided in the most significant pulse positions. For example, indications of "1" might be initially provided in such positions as positions 16, 15 and 14 for a block having 18 positions when a negative value of low absolute magnitude is being obtained. As the absolute value of a negative number increases, indications of "1" in the positions of most importance would change to indications of "0." This would cause the indications in positions 14, 15 and 16 to become "0" as the absolute magnitude of the negative value increased. In this way, the value of $y$ might be represented by indications of "0" for every pulse position when the absolute value of $y$ became quite large in the negative direction.

A typical example of an addition of $R$ and a negative value of $y$ is given below. The value of $R$ is indicated in binary form in the top line and the negative value of $y$ is indicated in binary form in the second line. The resultant addition is indicated in the third line. This example is as follows:

| | $P_{18}$ | $P_{17}$ | | | | $P_{13}$ |
|---|---|---|---|---|---|---|
| $R$ | 0 | 1 | 0 | 1 | 0 | 1 |
| $y$ | | 0 | 0 | 1 | 1 | 1 |
| $R_i$ | 0 | 1 | 1 | 1 | 0 | 0 |

As will be seen, the carry at position 18 of the block undergoing computation is "0." This represents a negative overflow. This may be seen from the above description, which indicates that there is a tendency for negative numbers of increasing absolute magnitude to be represented by indications of "0" in the positions of most importance.

Negative overflows in the value of $R$ for a block pass through the "and" network 1548 in FIGURE 30. The "and" network 1548 also receives signals from the right output terminal of the flip-flop 446 for the same reasons as described above in connection with the logic discussed in Equation 65. The signals from the "and" network 1548 pass through the "or" network 1544 to the "and" network 1542. Since the "and" network 1542 is connected to the "and" network 222, it passes negative overflow signals only at position 1 for each block. The signals from the "and" network 1542 are then introduced through the "or" network 1522 to the "and" network 1524 for synchronization at optimum times in the clock cycles. The signals from the "and" network 1524 trigger the flip-flop 337 for the production of a relatively high voltage on the right output terminal of the flip-flop and a relatively low voltage on the left output terminal of the flip-flop. The low voltage on the left output terminal of the flip-flop in turn causes an indication of "0" to be recorded in the channel 138 at position 1 of the block following the negative overflow.

The stages 1548, 1544, 1542, 1522 and 1524 operate in accordance with the logical equation $$_0\overline{z}=P_1\overline{A}_3\overline{S}_1T \qquad (66)$$

where $_{0}\bar{z}$=the introduction of a triggering signal to the right input terminal of the flip-flop 337; and the other terms have previously been defined.

When the valve of $y$ for a block is "0," the output indications representing $R$ for the block should not change. In other words, a positive output in one cycle of computation should be offset by a negative output in the next cycle of computation so that the resultant output for the two cycles of computation will be "0." This may be seen by the addition of $R=0$ and $y=0$ for successive cycles of computation. A value of $R=0$ is represented by an indication of "0" in every pulse position. A value of $y=0$ is represented by an indication of "0" in every pulse position except for an indication of "1" in position 17, which is the sign position for $y$. In a first cycle of computation, the addition of $R=0$ and $y=0$ is as follows:

```
P18
0 00000   R
  10000   y
---------
0 10000   R1
↲
```

Since there is no carry at position 18 of the block undergoing computation, a negative overflow is produced.

In the next cycle of computation, the value of $R$ obtained in the previous cycle is added to $y=0$. This addition is as follows:

```
P18 P17
0   1 0000
0   1 0000
----------
1   0 0000
↲
```

In this addition, a carry is obtained at position 18 of the block undergoing computation to indicate a positive overflow. This positive overflow offsets the negative overflow obtained in the previous cycle of computation. As will be seen, indications representing $R$ at the end of the second addition are the same as the indications representing $R$ before the first addition. These indications are represented by "0" in every position. In subsequent cycles of computation, alternate overflows of "0" and "1" are obtained so that the resultant output from the block is "0."

For positive values of $y$, the number of positive overflows should exceed the number of negative overflows. The excess of positive overflows over negative overflows is dependent upon the particular value of being added in successive blocks. For example, when decimal values of $y=+9$ are added to an initial value of $R=0$, the following results are obtained:

```
        P18
R=0     0 00000
y=+9      11001
        -------
R1      0 11001
        ↲

R=+9    0 11001
y=+9      11001
        -------
        1 10010
        ↲

        0 10010
          11001
        -------
        1 01011
        ↲

        0 01011
          11001
        -------
        1 00100
        ↲

        0 00100
          11001
        -------
        0 11101
        ↲

        0 11101
          11001
        -------
        1 10110
        ↲
```

As will be seen, in the first six cycles of computation four positive overflows and two negative overflows are obtained. An excess of positive overflows over negative overflows would be also obtained in subsequent cycles of computation.

It will be seen from the above examples that the indications at position 18 represent carries from position 17 to position 18. It will be further seen that the number of positive carries exceed the number of negative carries when indications representing a positive value of $y$ are added to $R$.

When the indications of $y$ represent negative values, the number of negative overflows should exceed the number of positive overflows. The excess of negative overflows over positive overflows for a block is dependent upon the particular values being added in successive cycles of computation for the block. For example, when negative values of $y=-7$ are added to an initial value of $R=0$, the following results are obtained:

```
0000000
 011001
-------
0011001
↲

0011001
 011001
-------
0110010
↲

0110010
 011001
-------
1001011
↲

0001011
 011001
-------
0100100
↲

0100100
 011001
-------
0111101
↲

0111101
 011001
-------
1010110
```

As will be seen from the above examples, the number of negative overflows exceed the number of positive overflows. The number of negative overflows will continue to exceed the number of positive overflows in subsequent cycles of computation.

The information relating to the overflow for a block is recorded in the channel 138 in accordance with the logic expressed in Equations 65 and 66. The information is produced at position 18 for each block and is recorded in the channel 138 at position 1 of the following block. In addition to the overflow information for each block, servo information is recorded in the channel 138 for each block. This information is recorded in the channel 138 at position 18 for the block so that it appears in the channel 138 one position before the overflow information for the block. The production and recordation of servo information for each block will be described in detail subsequently.

Since two bits of information are recorded for each block and there are 125 blocks in the analyzer, 250 bits of information are recorded in the channel 138 during each cycle of computation. The information for each block is recorded by the coil 270. After being recorded, the information moves along the channel 138 as the drum rotates. At a subsequent time, the information appears at a position contiguous to the coil 1274 in FIGURES 6 and 29. As previously described, the coil 274 is separated from the coil 270 by a distance corresponding to approximately 14 blocks. Since each block has a peripheral length of 18 positions, the number of positions in 14 blocks would be 18 times 14=252. For this reason, the coil 1512 is actually separated from the coil 1510 by $14n-2$ positions, where $n$=the number of positions in each block and specifically 18 positions.

When the information recorded by the coil 270 and relating to indications of "1" reaches the coil 274, it passes through the "and" network 1484 in FIGURE 29. The information relating to indications of "1" passes through the "and" network 1484 because of the connection of the "and" network to the left output terminal of the flip-flop 284, which receives the information from the coil 274. This information passes through the "and" network 1484 only in positions 2 to 17, inclusive, for each block because of the connection of the "and" network 1484 to the inverter 541. The "and" network 1484 opens only at positions 2 to 17, inclusive, since new information is being recorded by the coil 270 for each block at position 18 for the block and position 1 for the following block.

The signals passing through the "and" network 1484 are introduced through the "or" network 1478 to the "and" network 1480 for synchronization at optimum times in the clock cycles. The signals are then introduced to the left input terminal of the flip-flop 337 to trigger the flip-flop. Triggering of the flip-flop 337 causes a relatively high voltage to be produced on the left output terminal of the flip-flop. This voltage is introduced to the coil 270 so that an indication of "1" is recorded by the coil in the channel 138.

The logical equation controlling the operation of the "and" network 1484, the "or" network 1478 and the "and" network 1480 is $$_0z=\alpha Z_2P_{2/17}T \qquad (67)$$

where $_0z$=a triggering signal introduced to the left input terminal of the flip-flop 337;

$Z_2$=a relatively high voltage on the left output terminal of the flip-flop 284 as controlled by the signals from the coil 274; and $P_{2/17}$=a signal from the inverter 541.

Just as the "and" network 1484 passes signals representing indications of "1" in the channel 138, the "and" network 1528 in FIGURE 30 passes signals representing indications of "0" in the channel 138. The "and" network 1528 passes these signals because of its connection to the right output terminal of the flip-flop 284, which receives the signals from the coil 274. Since the "and" network 1528 is connected to the inverter 541, it passes the indication of "0" in the channel 138 only for positions 2 to 17, inclusive, for each block.

The signals passing through the "and" network 1528 are introduced through the "or" network 1522 to the "and" network 1524 for synchronization at optimum times in the clock cycles. The signals then pass to the right input terminal of the flip-flop 337 to trigger the flip-flop for the production of a relatively high voltage of the right output terminal of the flip-flop. This causes a low voltage to be produced on the left output terminal of the flip-flop 337 and an indication of "0" to be recorded by the coil 270 in the channel 138.

The operation of the "and" network 1528, the "or" network 1522 and the "and" network 1524 in recirculating the information in the channel 138 can be expressed by the following logical equation:

$$_0\bar{z}=\bar{Z}_2P_{2/17}T \qquad (68)$$

where $_0\bar{z}$=a triggering signal introduced to the right input terminal of the flip-flop 337;

$\bar{Z}_2$=a relatively high voltage on the right output terminal of the flip-flop 284; and the other terms have previously been defined.

Since the information recorded in the channel 138 is recirculated only during positions 2 to 17, inclusive, for each block, new information can be recorded in the channel 138 for the block at position 18 of the block and at position 1 of the following block. Because of the recordation of new information at positions 1 and 18 for each block, the information for each block is recirculated in the channel 138 only until the block is again presented for computation. Upon the presentation of the block for computation, new information is recorded for the block in the position 18. In this way, the channel 138 retains signal indications for each block representing information obtained during the last cycle of computation. This is necessary for reasons which will presently be described.

It will be seen from the above discussion that the information recorded in the channel 138 for each block represents the output from the block. Since the blocks have an interrelationship dependent upon the problem to be solved, the information recorded in the channel 138 for certain blocks is made available as input information to other blocks. In certain instances, the output information for first blocks in the channel 138 is made available to second blocks to control the production of the $\Delta Y$ increments for the second blocks and the polarity of the $\Delta Y$ increments. In other instances, the output information for first blocks in the channel 138 is presented to third blocks to control the production of $\Delta X$ increments for the blocks and the polarity of the $\Delta x$ increments.

The output indications in the channel 138 are made available to the various blocks as input information in accordance with the operation of the stages shown in FIGURE 6. These stages control the presentation of the output information to the various "read" coils disposed in contiguous relationship to the channel 138. These coils include the coils 272, 274, 276 and 278 in FIGURE 6. As previously described the coil 274 is separated from the "record" coil 270 by a distance equivalent to $14n-2$ pulse positions, where $n$=the number of positions in a block. The coil 272 is disposed between the coils 270 and 274 and is separated from the coil 270 by $8n+6$ pulse positions. The coils 276 and 278 are respectively separated from the coil 270 by this information register then serving as an accumulator.

Four "read" coils are associated with the channel 138 to increase the flexibility in the operation of the digital differential analyzer. Since there are only 18 positions in a block and 125 blocks in the analyzer, the output from approximately only 18/125 other blocks would be made available to each block during the presentation of the block for computation. In this way, each block would be able to obtain the outputs from only approximately 14% of the other blocks. This would present complications in the inter-connections between blocks, especially when all of the blocks have to be used to solve a complex mathematical problem. By using four "read" heads instead of one, the flexibility in the operation of the digital differential analyzer is considerably increased. For example, by using the four read coils 272, 274, 276 and 278 at the strategic positions in the channel 138 described above, the outputs from almost 50% of the blocks are made available to each block during the 18 positions that the block is presented for computation.

CODING FOR USING INFORMATION IN Z CHANNEL TO CONTROL THE PRODUCTION OF ΔX AND ΔY INCREMENTS

Particular codes are provided in the channels 140, 142, 144 and 146 to control which one of the coils 272, 274, 276 and 278 is to be selected for reading. For example, the information introduced to the coil 272 is read when an indication of "0" is produced in the channel 144 at the same time that an indication of "1" is produced in the channel 146. Such a simultaneous occurrence of indications causes relatively high voltages to be simultaneously produced on the right output terminal of the flip-flop 314 and on the left output terminal of the flip-flop 318.

The relatively high voltages on the right output terminal of the flip-flop 314 and on the left output terminal of the flip-flop are introduced to the "and" network 324 in FIGURE 6. The "and" network 324 then opens for the passage of signals from the left output terminal of the flip-flop 280. Relatively high voltages are produced on the left output terminal of the flip-flop 280 when indications of "1" are induced in the coil 272.

The signals from the "and" network 324 pass through the "or" network 326 to the cathode follower 328. The signals passing through the stages 324, 326, and 328 may be represented as $$L=\overline{L}_3L_4Z_1 \qquad (69)$$

where $L$=a signal passing to the cathode follower 328;

$Z_1$=a relatively high voltage on the left output terminal of the flip-flop 280; and the other terms have previously been defined.

The particular coding controlling the opening of the "and" network 324 also controls the opening of the "and" network 360. When the particular coding in the channels 144 and 146 occurs, signals of high amplitude on the right output terminal of the flip-flop 280 pass through the "and" network 360 to the "or" network 362. These signals are produced by indications of "0" induced in the coil 272.

The signals from the "and" network 360 pass through the "or" network 362 to the cathode follower 364. The stages 360, 362 and 364 operate in accordance with the logical equation:

$$\overline{L}=\overline{L}_3L_4\overline{Z}_1 \qquad (70)$$

where $\overline{L}$=a signal passing to the cathode follower 364;

$\overline{Z}_1$=a relatively high voltage on the right output terminal of the flip-flop 280; and the other terms have previously been defined.

Just as a particular code in the channels 144 and 146 controls the passage of the signals induced in the coil 272, a second code in the channels 144 and 146 controls the passage of signals induced in the coil 274. This second coding is represented by simultaneous indications of "1" and "0" in the channels 144 and 146, respectively. When such a coding occurs, relatively high voltages are simultaneously produced on the left output terminal of the flip-flop 314 and on the right output terminal of the flip-flop 318.

The relatively high voltages produced on the left output terminal of the flip-flop 314 and on the right output terminal of the flip-flop 318 are introduced to the "and" network 330 in FIGURE 6. The "and" network 330 also receives the voltages on the left output terminal of the flip-flop 284, the operation of which is controlled by the signal indications induced in the coil 274. Signals are also applied to the "and" network 330 from the inverter 332. The inverter 332 passes signals in positions 3 to 18, inclusive, for each block because of its connection to the "and" network 334. This results from the fact that the "and" network 334 is activated only in positions 1 and 2 of each block because of its connections to the right output terminals of the position-counting flip-flops 180, 190, 200 and 210.

The signals from the "and" network 330 pass through the "or" network 326 to the cathode follower 328. The operation of the "and" network 330, the "or" network 326 and the cathode follower 328 can be logically expressed as:

$$L=L_3\overline{L}_4Z_2\overline{P}_{1/2} \qquad (71)$$

where $L$=a signal from the cathode follower 328;

$Z_2$=a relatively high voltage on the left output terminal of the flip-flop 284;

$\overline{P}_{1/2}$=a signal from the inverter 332 to represent positions other than positions 1 and 2 for each block; and the other terms have previously been defined.

As previously described, new information is introduced to the flip-flop 337 at position 18 of each block and at position 1 of the following block so that the information can be recorded in the channel 138. Since the latest information for each block undergoing computation is being introduced to the flip-flop 337, it would be desirable to use this information rather than the information from the coil 272. It is for this reason that the "and" network 330 becomes activated only during positions 3 to 18 inclusive for each block for a coding of $L_3\overline{L}_4$ in the channels 144 and 146 as described above.

At positions 1 and 2 for each block, the "and" network 336 becomes prepared for activation. The "and" network 336 becomes prepared for activation only in these positions since it has an input terminal connected to the "and" network 334. The "and" network 336 passes signals only for a coding in the channels 144 and 146 similar to the coding which activates the "and" network 330. This coding is represented by the simultaneous occurrence of relatively high voltages on the left output terminal of the flip-flop 314 and on the right output terminal of the flip-flop 318. The "and" network 336 passes a signal only when a relatively high voltage is produced on the left output terminal of the flip-flop 337. This flip-flop receives the information to be recorded in the channel 138.

The signals from the "and" network 336 are introduced through the "or" network 326 to the cathodes follower 328. The operation of the "and" network 336, the "or" network 326 and the cathode follower 328 can be logically expressed as:

$$L=L_3\overline{L}_4\ {}_0ZP_{1/2} \qquad (72)$$

where ${}_0Z$=a relatively high voltage on the left output terminal of the flip-flop 337;

$P_{1/2}$=a signal from the "and" network 334; and the other terms have previously been defined.

Just as the indications of "1" induced in the coil 274 pass through the "and" network 330 during positions 3 to 18, inclusive, for each block, the indications of "0" induced in the coil 274 pass through the "and" network 366. The signals from the "and" network 366 are introduced through the "or" network 362 to the cathode follower 364. The "and" network 366, the "or" network 362 and the cathode follower 364 operate in accordance with the logical equation:

$$\overline{L}=\overline{L}_3L_4\overline{Z}_2\overline{P}_{1/2} \qquad (73)$$

where $\overline{L}$=a signal passing to the cathode follower 364;

$\overline{Z}_2$=a relatively high voltage on the right output terminal of the flip-flop 284; and the other terms have previously been defined.

The "and" network 368 operates in a manner similar to that described above for the "and" network 336. The "and" network 368 is able to become opened only in positions 1 and 2 for each block because of its connection to the "and" network 334. The "and" network becomes opened only for a coding in the channels 144 and 146 represented by $L_3$ and $\overline{L}_4$ because of its particular connections to the flip-flops 314 and 318. When the "and" network 368 becomes prepared for opening, it passes the signals of high amplitude on the right output terminal of the flip-flop 337. These signals represent indications of "0" presently being recorded in the channel 138. The signals from the "and" network 368 pass through the "or" network 362 to the cathode follower 364. These signals pass to the cathode follower 364 in accordance with the logical equation $$\overline{L}=L_3\overline{L}_4{}_0\overline{Z}P_{1/2} \quad (74)$$

where all of the terms have previously been defined.

In order to increase the flexibility in the operation of the digital differential analyzer, the signals induced in the coil 276 are made available to various blocks as they are presented for computation. The signals induced in the coil 276 are made available only when a particular code of signals exists in the channels 144 and 146. This code is represented by simultaneous indications of "1" in the channels 144 and 146. When indications of "1" simultaneously occur in the channels 144 and 146, relatively high voltages are simultaneously produced on the left output terminals of the flip-flops 314 and 318.

The signals produced on the left output terminals of the flip-flops 314 and 318 are introduced to the "and" network 338 to prepare the network for activation. The "and" network 338 also receives the signals on the left output terminal of the flip-flop 288 to represent indications of "1" induced in the coil 276. The "and" network 338 is able to become activated in the positions for each block other than positions 9 and 10 for the block. This results from the introduction to the "and" network 338 of the signals from the inverter 340. The inverter 340 passes signals in the positions for each block other than positions 9 and 10, since it is connected to the "and" network 344. The "and" network 344 becomes activated at positions 9 and 10 for each block because of its particular connections to the flip-flops 180, 190, 200 and 210.

When the "and" network 338 becomes activated, it passes signals through the "or" network 326 to the cathode follower 328. The "and" network 338 passes signals to the cathode follower 328 in accordance with the logical equation:

$$L=L_3L_4Z_3\overline{P}_{9/10} \quad (75)$$

where $Z_3$=a relatively high voltage on the left output terminal of the flip-flop 288;

$\overline{P}_{9/10}$=a signal from the inverter 340, and the other terms have previously been defined.

Because of the particular positioning of the coil 276 relative to the coil 270, the coil 276 receives at positions 9 and 10 information which is somewhat old. This information is old because the digital differential analyzer has undergone a complete cycle of computation and new information for the same block as the old block has been or is being recorded in the channel 138. If this information in the channel 138 were allowed to be used, it might produce inaccuracies because of its relatively old status. For this reason, the information induced in the coil 276 at positions 9 and 10 is not allowed to pass through the "and" network 338. This results from the operation of the inverter 340.

In order to increase the flexibility in the coupling between various blocks in the digital differential analyzer, some information should be utilized at positions 9 and 10 for the coding represented by $L_3L_4$. For this reason the information in the flip-flop 420 is made available for use at positions 9 and 10 for a coding represented by the simultaneous occurrence of relatively high voltages on the left output terminals of the flip-flops 314 and 318. The information in the flip-flop 420 is made available for use since the operation of the flip-flop is controlled by particular signals in the channel 138. In this way, the channel 138 sends the information through the flip-flop 420 to the cathode followers 328 and 364 so as to make the information available for blocks which might otherwise not receive the information.

The information on the left output terminal of the flip-flop 420 is introduced to the "and" network 348. The "and" network 348 passes this information only at positions 9 and 10 for a block because of its connection to the "and" network 344. The "and" network 348 passes the information from the "and" network 420 only for the particular coding represented by the simultaneous occurrence of relatively high voltages on the left output terminals of the flip-flops 314 and 318. The signals from the "and" network 348 pass through the "or" network 326 to the cathode follower 328. The "and" network 348, the "or" network 326 and the cathode follower 328 operate in accordance with the logical equation:

$$L=L_3L_4A_2P_{9/10} \quad (76)$$

where all of the terms have previously been defined.

In like manner, the relatively high voltages on the right output terminal of the flip-flop 420 are introduced to the "and" network 372. The "and" network 372 becomes prepared for activation only at the times that the "and" network 348 becomes prepared for activation. This results from the connection of the "and" network 372 to the "and" network 344 and the flip-flops 314 and 318. The signals from the "and" network 372 pass through the "or" network 362 to the cathode follower 364. The signals are produced in accordance with the logical equation:

$$\overline{L}=L_3L_4A_2P_{9/10} \quad (77)$$

where all of the terms have previously been defined.

The flexibility in the possible coupling between the different blocks is further enhanced by the inclusion of the coil 278. This coil produces signals in accordance with the magnetic pattern produced in the channel 138 and triggers the flip-flop 292 into a corresponding pattern of operation. The signals of high amplitude produced on the left output terminal of the flip-flop 292 are introduced to the "and" network 352. The "and" network 352 is able to pass these signals only when a particular coding is provided in the channels 144 and 146. This coding is represented by the simultaneous occurrence of indications of "0" in the channels 144 and 146. This coding pattern causes relatively high voltages to be produced simultaneously on the right output terminals of the flip-flops 314 and 318 for introduction to the "and" network 352.

The "and" network 352 is able to pass the signals from the flip-flop 292 in all of the positions for each block other than positions 9 and 10. This results from the fact that the "and" network 352 is connected to the inverter 340. The "and" network 352 is closed to the passage of signals at positions 9 and 10 for the same reason as the "and" networks 338 and 370. The signals from the "and" network 352 pass through the "or" network 326 to the cathode follower 328. These signals pass to the cathode follower 328 in accordance with the logical equation:

$$L=\overline{L}_3\overline{L}_4Z_4\overline{P}_{9/10} \quad (78)$$

where $Z_4$=a relatively high voltage on the left output terminal of the flip-flop 292; and the other terms have previously been defined.

The "and" network 374 becomes prepared for opening at the same time as the "and" network 352. This results from the connections to the "and" network 374 from the inverter 340 and the right output terminals of the flip-flops 314 and 318. However, the "and" network 374 passes the signals of high amplitude on the right output terminal of the flip-flop 292. The signals from the "and" network 374 pass through the "or" network 362 to the cathode follower 364 in accordance with the logical equation:

$$\overline{L}=\overline{L}_3\overline{L}_4\overline{Z}_4\overline{P}_{9/10} \quad (79)$$

where $\overline{Z}_4$=a relatively high voltage on the right output terminal of the flip-flop 292; and the other terms have previously been defined.

Since the signals induced in the coil 278 cannot pass to the cathode followers 326 and 364 at positions 9 and 10 for each block, other signals should be made available to the cathode followers at these times to enhance the flexibility in the operation of the digital differential analyzer. These signals are made available from the flip-flop 494. The flip-flop 494 is triggered into a pattern of operation in each block in accordance with information obtained from the channel 138. By presenting the information in the flip-flop 494 to the cathode followers 328 and 364, the corresponding information in the channel 138 is made available to certain blocks which might not otherwise receive the information.

The signals of high amplitude on the left output terminal of the flip-flop 494 are introduced to the "and" network 354. These signals pass through the "and" network 354 only when a coding represented by indications of "0" are simultaneously produced in the channels 144 and 146. The signals pass through the "and" network 354 only at positions 9 and 10 for a block because of the connection of the "and" network 354 to the "and" network 344. The signals from the "and" network 354 pass through the "or" network 326 to the cathode follower 328. The "and" network 354, the "or" network 326 and the cathode follower 328 operate in accordance with the logical equation:

$$L=\bar{L}_3\bar{L}_4B_2P_{9/10} \qquad (80)$$

where all of the terms have previously been defined.

The "and" network 376 becomes prepared for activation at the same time as the "and" network 354. This results from the connection of the "and" network 376 to the "and" network 344 and to the right output terminals of the flip-flops 314 and 318. However, the "and" network 376 passes the signals of relatively high amplitude on the right output terminal of the flip-flop 494. The signals from the "and" network 376 pass through the "or" network 362 to the cathode follower 364 in accordance with the logical equation:

$$\bar{L}=\bar{L}_3\bar{L}_4\bar{B}_2P_{9/10} \qquad (81)$$

where all of the terms have previously been defined.

The flexibility in the intercoupling between various blocks is further increased by the operation of certain other stages in addition to those described above. These include the stages shown in FIGURE 20. The operation of the stages shown in FIGURE 20 is controlled by certain patterns of coding provided in the channels 140, 142, 144 and 146. For example, one pattern of coding is represented by simultaneous indications of "0" in the channels 140 and 142 and of "1" in the channels 144 and 146. Such a simultaneous occurrence of coding signals causes relatively high voltages to be produced at the same time on the right output terminals of the flip-flops 306 and 310 and on the left output terminals of the flip-flops 314 and 318.

The "and" network 1060 becomes prepared for activation when relatively high voltages are simultaneously produced on the right output terminals of the flip-flops 306 and 310 and on the left output terminals of the flip-flops 314 and 318. The "and" network 1060 becomes prepared for activation only during positions 1 to 17, inclusive for each block, since the "and" network is connected to the inverter 444. When prepared for activation, the "and" network 1060 passes the signals of high amplitude on the left output terminal of the flip-flop 337. As previously described, these signals represent indications of "1" which are about to be recorded by the coil 270 in the channel 138.

The signals passing through the "and" network 1060 are introduced through the "or" network 1068 to the "and" network 1070. The "and" network 1070 synchronizes these signals at optimum times in the clock cycles and introduces the signals to the left input terminal in the flip-flop 392. These signals trigger the flip-flop 392 and cause a relatively high voltage to be produced on the left output terminal of the flip-flop. Signals pass through the stages 1060, 1068 and 1070 to the flip-flop 392 in accordance with the logical equation:

$$f_1={}_0Z\bar{L}_1\bar{L}_2L_3L_4P_{1/17}T \qquad (82)$$

where $f_1$=a triggering signal introduced to the left input terminal of the flip-flop 392; and the other terms have previously been defined.

The "and" network 1072 becomes prepared for activation at the same time as the "and" network 1060. This results from the connections of the "and" network 1072 to the inverter 444, the right output terminals of the flip-flops 306 and 310 and the left output terminals of the flip-flops 314 and 318. When prepared for activation, the "and" network 1072 passes the signals of high amplitude on the right output terminal of the flip-flop 337. These signals represent indications of "0" which are about to be recorded in the channel 138. The signals from the "and" network 1072 pass through the "or" network 1078 to the "and" network 1080 for synchronization at optimum times in the clock cycles. The signals then pass to the right input terminal in the flip-flop 392. These signals trigger the flip-flop for the production of a relatively high voltage on the right output terminal of the flip-flop. The signals passing through the stages 1072, 1078 and 1080 can be logically expressed as:

$$\bar{f}_1={}_0\bar{Z}\bar{L}_1\bar{L}_2L_3L_4P_{1/17}T \qquad (83)$$

where $\bar{f}_1$=a triggering signal introduced to the right input terminal of the flip-flop 392; and the other terms have previously been defined.

It has been previously described that the ΔX increment for each block is determined by certain indications in the channel 138. These indications control the operation of the flip-flop 396 in FIGURE 7 in representing the polarity of the ΔX increment for the block. A positive ΔX increment for a block is indicated by a relatively high voltage on the left output terminal of the flip-flop 396 and a negative ΔX increment is indicated by a relatively high voltage on the right output terminal of the flip-flop. Since the operation of the flip-flop 396 is controlled by the indications in the channel 138, the flexibility in the inter-relationship between the different blocks is further increased by making the output indications in the flip-flop 396 available to the flip-flop 392 in FIGURE 20 for certain patterns of coding.

The coding representing the passage of information from the flip-flop 396 to the flip-flop 392 is represented by the simultaneous occurrence of an indication of "1" in the channel 144 and an indication of "0" in the channel 146. These simultaneous indications cause relatively high voltages to be produced at the same time on the left output terminal of the flip-flop 314 and on the right output terminal of the flip-flop 318. The voltages from the flip-flops 314 and 318 are introduced to the "and" network 1062 to prepare the "and" network for activation.

The "and" network 1062 becomes prepared for activation only at position 18 for a block since the "and" network is connected to the "and" network 216. The "and" network is able to pass a signal only for a single-block operation or for the second half of a double-block operation. This results from the connection between the input terminal of the "and" network 1062 and the right output terminal of the flip-flop 390. When the "and" network 1062 becomes prepared for operation, it passes the signals of high amplitude on the left output terminal of the flip-flop 396.

The signals passing through the "and" network 1062 are introduced through the "or" network 1068 to the "and" network 1070. These signals are synchronized at optimum times in the clock cycles by the "and" network

1070 and are introduced to the left input terminal in the flip-flop 392. The signals trigger the flip-flop 392 for the production of a relatively high voltage on the left output terminal of the flip-flop. Signals pass through the stages 1062, 1068 and 1070 to the flip-flop 392 in accordance with the logical equation:

$$f_1 = A_1\overline{G}_5L_3\overline{L}_4P_{18}T \qquad (84)$$

where all of the terms have previously been defined.

The "and" network 1074 becomes prepared for activation at the same time as the "and" network 1062. However, the "and" network 1074 passes the signals of high amplitude on the right output terminal of the flip-flop 396. These signals pass through the "or" network 1078 and the "and" network 1080 to the right input terminal of the flip-flop 392. The signals trigger the flip-flop so that a relatively high voltage is produced on the right output terminal of the flip-flop. The stages 1074, 1078 and 1080 pass signals to the flip-flop 392 in accordance with the logical equation:

$$\overline{f}_1 = \overline{A}_1\overline{G}_5L_3\overline{L}_4P_{18}T \qquad (85)$$

where all of the terms have previously been defined.

Just as the flip-flop 396 in FIGURE 7 provides indications of the ΔX increment for each block, the flip-flop 496 in FIGURE 9 provides indications of the ΔY increment for the block. As previously described, the operation of the flip-flop 496 is controlled by the output indications in the channel 138. In this way, additional information in the channel 138 can be made available by presenting the information in the flip-flop 496 to the flip-flop 392 in FIGURE 20 for particular patterns of coding in the channels 144 and 146. This particular pattern of coding is represented by the simultaneous occurrence of indications of "1" in the channels 144 and 146.

When indications of "1" appear at the same time in the channels 144 and 146, relatively high voltages are simultaneously produced on the left output terminals of the flip-flops 314 and 318. These high voltages are introduced to the "and" network 1064 in FIGURE 20 to prepare the "and" network for activation. The "and" network 1064 can become activated only at position 18 for each block because of its connection to the "and" network 216. The "and" network 1064 can become activated only for a single-block operation or in the second half of a double-block operation since it is connected to the right output terminal of the flip-flop 390.

Upon becoming prepared for activation, the "and" network 1064 passes the signals of high amplitude on the left output terminal of the flip-flop 496. The signals from the "and" network 1064 pass through the "or" network 1068 and the "and" network 1070 to the left input terminal of the flip-flop 392. These signals trigger the flip-flop 392 and produce a relatively high voltage on the left output terminal of the flip-flop. The passage of signals through the stages 1064, 1068 and 1070 to the flip-flop 392 takes place in accordance with the logical equation:

$$f_1 = B_1\overline{G}_5L_3L_4P_{18}T \qquad (86)$$

where all of the terms have previously been defined.

The "and" network 1076 becomes prepared for activation at the same time as the "and" network 1064. Upon becoming prepared for activation, the "and" network 1076 passes the signals of high amplitude on the right output terminal of the flip-flop 496. These signals pass through the "or" network 1078 and the "and" network 1080 to the right input terminal of the flip-flop 392. The signals trigger the flip-flop 392 for the production of a relatively high voltage on the right output terminal of the flip-flop. The stages 1076, 1078 and 1080 pass signals to the flip-flop 392 in accordance with the logical equation:

$$\overline{f}_1 = \overline{B}_1\overline{G}_5L_3L_4P_{18}T \qquad (87)$$

where all of the terms have previously been defined.

Since the flip-flop 392 provides information relating to output signals in the channel 138, the information from the flip-flop is made available to the flip-flops 396 and 496 to control the production of ΔX and ΔY increments. The information from the flip-flop 392 is made available to the flip-flops 396 and 496 upon the occurrence of particular coding patterns in the channels 140, 142, 144 and 146. The information in the flip-flop 392 is made available to the flip-flop 396 in FIGURE 7 when indications of "0" occur in the channels 140 and 142 at the same time that indications of "1" occur in the channels 144 and 146. This simultaneous occurrence of indications causes relatively high voltages to be produced at the same time on the right output terminals of the flip-flops 306 and 310 and on the left output terminals of the flip-flops 314 and 318.

The signals from the flip-flops 310, 314 and 318 are introduced to the "and" network 386 in FIGURE 7. The "and" network 386 also receives signals from the right output terminal of the flip-flop 190. Since the voltage on the right output terminal of the flip-flop 190 is high only during positions 1 to 4, inclusive; 8 to 12, inclusive; and 16 to 18, inclusive, the "and" network 386 can become activated only in these positions for each block. When the "and" network 386 becomes prepared for activation, it passes the signals of high amplitude on the left output terminal of the flip-flop 392.

The "and" network 386 is also connected to the left output terminal of the flip-flop 390. This causes the "and" network 386 to become activated only in the first half of a double-block operation. The "and" network 386 becomes activated only in the first half of a double-block operation since the flip-flop 396 does not have to be used to determine the ΔX increment for the second half of the double-block operation. In this way, the flip-flop 396 is free to receive information from the flip-flop 392 during the first half of the double-block operation and can present the information to the flip-flop 420 during the second half of the double-block operation. By such a procedure, the information in the flip-flop 392 can be made available through the flip-flops 396 and 420 to blocks which might not otherwise be able to receive the information. This is desirable since the information in the flip-flop 392 represents certain output indications in the channel 138.

The signals from the "and" network 386 in FIGURE 7 pass through the "or" network 382 to the "and" network 394. As previously described, the "and" network 394 passes the signals from the "or" network 382 only in positions 1 to 17, inclusive, for each integrator. Furthermore, the "and" network 394 passes the signals only when a relatively high voltage is produced on the right output terminal of the flip-flop 396. The operation of the "and" network 394 is also controlled by the voltage on the right output terminal of the flip-flop 306, which represents part of the particular coding described above.

The signals passing through the "and" network 394 pass to the left input terminal of the flip-flop 396. These signals trigger the flip-flop 396 for the production of a relatively high voltage on the left output terminal of the flip-flop. Signals pass to the flip-flop 396 from the stages 386, 382 and 394 in accordance with the logical equation:

$$a_1 = \overline{A}_1\overline{L}_1\overline{L}_2L_3L_4P_{1/17}F_1G_5\overline{J}_3T \qquad (88)$$

where $a_1$=a triggering signal introduced to the left input terminal of the flip-flop 396;

$F_1$=a relatively high voltage on the left output terminal of the flip-flop 392; and all the other terms have previously been defined.

The signals from the "and" network 386 also pass through the "or" network 382 to the "and" network 402. The "and" network 402 is able to pass these signals only when a relatively high voltage is provided on the left output terminal of the flip-flop 396. The "and" network 402 passes the signals from the "and" network 386 only in positions 1 to 17, inclusive, for each block because of its connection to the inverter 444. The signals from the "and" network 402 pass through the "or" network 400 to the "and" network 398 which synchronizes these signals at optimum times in the clock cycles. The signals then pass to the right input terminal of the flip-flop 396. These signals trigger the flip-flop 396 such that a relatively high voltage is produced on the right output terminal of the flip-flop. Signals pass to the flip-flop 396 through the stages 386, 382, 402, 400 and 398 in accordance with the logical equation:

$$\overline{a}_1 = A_1\overline{L}_1\overline{L}_2L_3L_4P_{1/17}F_1G_5\overline{I}_3T \qquad (89)$$

where all of the terms have previously been defined.

It will be seen from Equations 88 and 89 that the signals of high amplitude on the left output terminal of the flip-flop 392 trigger the flip-flop 396 from one state of operation to the other. For example, the signals from the left output terminal of the flip-flop 392 trigger the flip-flop 396 for the production of a relatively high voltage on the right output terminal of the flip-flop 396 when a relatively high voltage previously existed on the left output terminal of the flip-flop 396. The reason for this will be described in detail subsequently.

Ordinarily, signals pass to the flip-flop 420 from the flip-flop 396 at position 18 for a block. However, for a coding of "$L_3\overline{L}_4$," the signals from the flip-flop 396 pass to the flip-flop 392 at position 18 for a block. Since the signals from the flip-flop 396 pass to the flip-flop 392 instead of the flip-flop 420 for a coding of "$L_3\overline{L}_4$," the flip-flop 420 is free to receive information from another source for such a coding. For this reason, the signals from the flip-flop 392 are introduced to the flip-flop 420 for a coding of $L_3\overline{L}_4$ to increase the flexibility in the interrelationship between the different blocks.

The signals of high amplitude on the left output terminal of the flip-flop 392 pass through the "and" network 414 in FIGURE 8 to the flip-flop 420. The "and" network 414 passes the signals from the flip-flop 392 only for a coding represented by $L_3\overline{L}_4$ because of the introduction to the "and" network of signals from the left output terminal in the flip-flop 314 and the right output terminal in the flip-flop 318. The signals from the "and" network 414 pass through the "or" network 416 to the "and" network 418. The "and" network 418 passes these signals only at position 18 for a block because of its connection to the "and" network 216. The "and" network 418 passes the signals only for a single block operation or the second half of a double-block operation since the "and" network is connected to the right output terminal of the flip-flop 390. The passage of signals through the "and" network 418 only at position 18 of a single-block operation or the second half of a double-block operation corresponds to the time at which signals pass from the flip-flop 396 to the flip-flop 392.

The signals from the "and" network 418 pass to the left input terminal in the flip-flop 420 and trigger the flip-flop for the production of a relatively high voltage on the left output terminal of the flip-flop. In this way, indications representing ΔX increments for a block are obtained from the flip-flop 392. The passage of signals from the flip-flop 392 through the stages 414, 416 and 418 to the flip-flop 420 can be logically represented as:

$$a_2 = \overline{G}_5P_{18}F_1L_3\overline{L}_4T \qquad (90)$$

where all of the terms have previously been defined.

Just as the "and" network 414 receives the signals of high amplitude on the left output terminal of the flip-flop 392, the "and" network 426 receives the signals of high amplitude on the right output terminal of the flip-flop. The "and" network 426 passes the indications on the right output terminal of the flip-flop 392 only for a particular coding represented by $L_3\overline{L}_4$ because of its connections to the flip-flops 314 and 318. The signals from the "and" network 426 pass through the "or" network 428 to the "and" network 430. The "and" network operates in a manner similar to that described above for the "and" network 418 to pass signals only at position 18 of a single-block operation or the second half of a double-block operation. The signals passing through the "and" network 430 are introduced to the right input terminal of the flip-flop 420. These signals trigger the flip-flop 420 for the production of a relatively high voltage on the right output terminal of the flip-flop. Signals pass through the stages 426, 428, and 430 in accordance with the logical equation:

$$\overline{a}_2 = \overline{G}_5P_{18}\overline{F}_1L_3\overline{L}_4T \qquad (90a)$$

where all of the terms have previously been defined.

Ordinarily, the flip-flop 494 receives the signals produced in the flip-flop 496. For a coding represented by $L_3L_4$, the signals from the flip-flop 496 pass to the flip-flop 392 in a manner similar to that described above. For this reason, the flip-flop 494 is available to receive indications from sources other than the flip-flop 496. Because of this, signals are introduced to the flip-flop 494 from the flip-flop 392 when a coding represented by $L_3L_4$ occurs. In this way, ΔY increments are obtained for a block from a source other than directly from the channel 138 so as to increase the flexibility in the operation of the digital differential analyzer.

The signals of high amplitude on the left output terminal of the flip-flop 392 pass through the "and" network 520 in FIGURE 10 to trigger the flip-flop 494. The signals from the flip-flop 392 pass through the "and" network 520 only for a coding of $L_3L_4$ as represented by relatively high voltages on the left output terminals of the flip-flops 314 and 318. The signals from the "and" network 520 pass through the "or" network 522 to the "and" network 524. The "and" network 524 becomes opened for the passage of signals only at position 18 for single-block operations or the second half of double-block operations. The signals from the "and" network 524 then pass to the flip-flop 494 to trigger the flip-flop for the production of a relatively high voltage on the left output terminal of the flip-flop. Signals pass from the flip-flop 392 through the stages 520, 522 and 524 in accordance with the logical equation:

$$b_2 = \overline{G}_5P_{18}F_1L_3L_4T \qquad (91)$$

where all of the terms have previously been defined.

The "and" network 530 operates in a manner somewhat similar to the "and" network 520 in passing signals for a coding represented by $L_3L_4$. However, the "and" network 530 passes the signals of high amplitude on the right output terminal of the flip-flop 392. The signals from the "and" network 530 are introduced through the "or" network 532 to the "and" network 534. For the same reasons as described above, the "and" network 534 opens for the passage of signals only at position 18 for a single-block operation or the second half of a double-block operation. The signals from the "and" network 534 are then introduced to the right input terminal of the flip-flop 494. These signals trigger the flip-flop to produce a relatively high voltage on the right output terminal of the flip-flop. The triggering signals pass through the stages 530, 532 and 534 to the flip-flop 494 in accordance with the logical equation:

$$\overline{b}_2 = \overline{G}_5P_{18}\overline{F}_1L_3L_4T \qquad (92)$$

where all of the terms have previously been defined.

Sometimes it may be desired to obtain a negative quantity in a block. For example, it may be desired to obtain a function $y = -\int f(x)dx$ in a block. In order to obtain such negative values, the successive YΔX increments for the block are inverted in polarity. This is obtained by inverting the polarity of each ΔX increment.

The inversion of the polarity of each ΔX increment is represented by a particular coding in the channels 140, 142, 144 and 146. This coding is represented by the simultaneous occurrence of indications of "0" in the channels 140, 142 and 146 and an indication of "1" in the channel 144. When such a simultaneous coding occurs in the channels 140, 142, 144 and 146, relatively high voltages are simultaneously produced on the right output terminals of the flip-flops 306, 310 and 318 and on the left output terminal of the flip-flop 314.

The signals on the right output terminals of the flip-flops 310 and 318 and on the left output terminal of the flip-flop 314 are introduced to the "and" network 384 in FIGURE 7. This causes a signal to pass from the "and" network 384 through the "or" network 382 to the "and" network 394. The signals then pass through the "and" network 394 upon the simultaneous occurrence of certain signals. The signals from the "and" network 384 pass through the "and" network 394 only upon the occurrence of a relatively high voltage on the right output terminal of the flip-flop 306. As described in the previous paragraph, this represents part of the coding to invert the polarity of a ΔX increment. The signals are able to pass through the "and" network 394 only in positions 1 to 17, inclusive, for each block because of the connection of the "and" network to the inverter 444. The signals are able to pass through the "and" network 394 only when a relatively high voltage is produced on the right output terminal of the flip-flop 396.

The signals from the "and" network 394 pass to the left input terminal of the flip-flop 396. These signals trigger the flip-flop 396 for the production of a relatively high voltage on the left output terminal of the flip-flop. In this way, the signals passing through the stages 386, 382 and 394 operate on the flip-flop 396 to invert a relatively high voltage on the right output terminal of the flip-flop into a relatively high voltage on the left output terminal of the flip-flop. These signals pass to the flip-flop 396 in accordance with the logical equation:

$$a_1=\bar{A}_1P_{1/17}\bar{L}_1\bar{L}_2L_3\bar{L}_4T \quad (93)$$

where all of the terms have previously been defined.

In like manner, an indication of a positive ΔX increment for a block is inverted to a negative ΔX increment when a coding of $\bar{L}_1\bar{L}_2L_3\bar{L}_4$ occurs in corresponding positions of the channels 140, 142, 144 and 146. This inversion is represented by a change from a relatively high voltage on the left output terminal of the flip-flop 396 to a relatively high voltage on the right output terminal of the flip-flop. The inversion is obtained by the passage of signals through the "and" network 384, the "or" network 382, the "and" network 402, the "or" network 400 and the "and" network 398. Signals pass through these stages in accordance with the logical equation:

$$\bar{a}_1=A_1P_{1/17}\bar{L}_1\bar{L}_2L_3\bar{L}_4T \quad (94)$$

where all of the terms have previously been defined.

In order to prepare the flip-flop 396 for proper functioning at the beginning of each operation represented by one or more blocks, the flip-flop must be triggered to its "off" condition at the end of the preceding operation. This is accomplished by the passage of a signal through the "and" network 406 in FIGURE 7. The "and" network passes a signal only at position 18 of a single-block operation or the second half of a double-block operation. This results from the connections made to the "and" network 406 from the "and" network 216 and the right output terminal of the flip-flop 390.

The signals from the "and" network 406 pass through the "or" network 400 to the "and" network 398 for synchronization at optimum times in the clock cycles. The signals then pass to the flip-flop 396 and trigger the flip-flop 396 so as to produce a relatively high voltage on the right output terminal of the flip-flop. The flip-flop 396 receives signals passing through the stages 406, 400 and 398 in accordance with the logical equation previously described $$\bar{a}_1=\bar{G}_5P_{18}T$$

where all of the terms have previously been defined.

As described previously, the flip-flop 396 sometimes receives information in the first half of a double-block operation. Because of this, it should be prepared for proper operation in the second half of the double-block operation. This is accomplished by the passage of a signal through the "and" network 404 in FIGURE 7. The "and" network 404 passes such a signal only for a particular coding represented by the simultaneous occurrence of indications of "0" in the channel 140 and "1" in the channel 144. This coding causes relatively high voltages to be simultaneously produced on the right output terminal of the flip-flop 306 and on the left output terminal of the flip-flop 314. These signals are introduced to the "and" network 404 so that the "and" network will pass a signal at position 18 for the block undergoing computation. The "and" network passes signals only at position 18 because of its connection to the "and" network 216.

The signals from the "and" network 404 pass through the "or" network 400 and the "and" network 398 to the right input terminal of the flip-flop 396. The signals trigger the flip-flop 396 and produce a relatively high voltage on the right output terminal of the flip-flop. The signals pass through the stages 404, 400 and 398 to the flip-flop 396 in accordance with the logical equation:

$$\bar{a}_1=\bar{L}_1L_3P_{18}T \quad (96)$$

where all of the terms have previously been defined.

It has been described above that the information in the flip-flop 392 is transferred to the flip-flop 396 for a coding represented by $\bar{L}_1\bar{L}_2L_3L_4$. This transfer occurs in the first half of a double block operation in one of positions 1 to 4 inclusive; 8 to 12, inclusive, or 16 to 18, inclusive. This is in accordance with the logic expressed above in equation 88. In addition to the above transfer, it may be sometimes desired to transfer the information in the flip-flop 392 to the flip-flop 496 in FIGURE 9 in the first half of a double-block operation. This transfer is effectuated for the same coding which controls the transfer from the flip-flop 392 to the flip-flop 396. The coding is represented by the simultaneous configuration of $\bar{L}_1\bar{L}_2L_3L_4$. However, the transfer can be obtained only in positions 5 to 8, inclusive, and 12 to 16, inclusive. These are the only positions in which a transfer cannot be obtained from the flip-flop 392 to the flip-flop 396. Positions 5 to 8, inclusive, and 12 to 16, inclusive, in each block can be distinguished from the other positions on the block by a relatively high voltage on the left output terminal of the flip-flop 190.

The transfer from the flip-flop 392 to the flip-flop 496 is obtained in part by the passage of a signal through the "and" network 486 in FIGURE 9. This signal passes through the "or" network 482, the "and" network 484, the "or" network 488 and the "and" network 490 to the flip-flop 496. The signal triggers the flip-flop for the production of a relatively high voltage on the left output terminal of the flip-flop. The flip-flop 496 receives signals passing through the stages 486, 482, 484, 488 and 490 in accordance with the logical equation $$b_1=\bar{L}_1\bar{L}_2L_3L_4F_1G_5J_3P_{1/17}T \quad (97)$$

where all of the terms have previously been defined.

The "and" network 502 becomes prepared for activation at the same time as the "and" network 486. Upon becoming prepared for activation, the "and" network 502 passes the signals of high amplitude on the right output terminal of the flip-flop 392. These signals pass through the "or" network 504, the "and" network 506, the "or" network 510 and the "and" network 512 to the right input terminal of the flip-flop 496. The signals trigger the flip-flop 496 and cause a relatively high voltage to be produced on the right output terminal of the flip-flop. The flip-flop 496 receives the signals passing through the stages 502, 504, 506, 510 and 512 in accordance with the logical equation:

$$\bar{b}_1=\bar{L}_1\bar{L}_2L_3L_4\bar{F}_1G_5J_3P_{1/17}T \quad (98)$$

where all the terms have previously been defined.

PRODUCT OPERATION

Sometimes the product of two numbers is desired. For example, the product of a quantity "X" and a quantity "Y" may be desired such that $Z=XY$. In order to obtain the product $Z=XY$ on a differential basis, the product can be represented by the equation $$XY=\int YdX+\int XdY$$

This conversion is well known in the field of differential analysis. Heretofore, several blocks have been required to obtain the product $Z=XY$. Heretofore, one block has been required to obtain the value represented by $\int XdY$ and a second block has been required to obtain $\int YdX$. At least a third block has been required to obtain the sum of the values obtained by the first two blocks and to produce an output indication.

Since at least three blocks have been required until now to obtain the product $Z=XY$, certain disadvantages have accrued in the solution of a complex equation involving a number of products. Because of the fact that at least three blocks have been required to obtain each product, a large number of blocks have been rendered unavailable for other uses. This has been especially disadvantageous when a large number of blocks have been required to solve a problem. Furthermore, since at least three blocks have been required to obtain each product, the speed of computation has been decreased. This has aggravated a condition already considered worrisome in that the speed of computation is of concern to engineers at present.

This invention provides a digital differential analyzer in which a product $Z=XY$ is obtained in one block. The product is obtained in one block by including only one additional channel and a relatively small amount of additional logic. The product is obtained in one block on a simple and straightforward basis.

Each product operation is controlled by certain coding in the channel 142. This coding is represented by an indication of "0" in the channel 142 at position 18 for a block to indicate that a product operation is to take place in the next block. When an indication of "0" occurs in the channel 142 at position 18 for a block, a signal passes through the "and" network 1296 in FIGURE 25. This results from the connection of the "and" network 1296 to the "and" network 216 and to the right output terminal of the flip-flop 310.

A signal passes through the "and" network 1296 only at position 18 of a single-block operation or the second half of a double-block operation. This results from a connection between the "and" network 1296 and the right output terminal of the flip-flop 390. The connection from the flip-flop 390 is provided to make certain that stages controlling a product operation for a block can be triggered only at the end of the previous operation.

The signals passing through the "and" network 1296 are introduced to the right input terminal of the flip-flop 606. These signals trigger the flip-flop and cause a relatively high voltage to be produced on the right output terminal of the flip-flop. This voltage indicates a product operation for the next block. A relatively high voltage is produced on the right output terminal of the flip-flop 606 in accordance with the logical equation:

$$\bar{g}_1=\bar{L}_2\bar{G}_5P_{18}T \quad (99)$$

where $\bar{g}_1$=the introduction of a triggering signal to the right input terminal of the flip-flop 606; and the other terms have previously been defined.

The relatively high voltage on the right output terminal of the flip-flop 606 continues until the end of the product operation. This is represented by an indication of "1" in the channel 142 at position 18 of the block representing the end of the product operation, which may be either one or two blocks long as will be described in detail subsequently.

Upon the occurrence of a coding pulse representing the end of a product operation, relatively high voltages are simultaneously obtained from the "and" network 216 and the left output terminal of the flip-flop 310. This causes a signal to pass through the "and" network 876 in FIGURE 25. The signal triggers the flip-flop 606 and causes a relatively high voltage to be produced on the left output terminal of the flip-flop. This voltage is produced in accordance with the logical equation:

$$g_1=L_2P_{18}T \quad (100)$$

where $g_1$=the introduction of a triggering signal to the left input terminal of the flip-flop 606; and the other terms have previously been defined.

As has been previously described, the value of Y for a block is accumulated in the appropriate positions in the channel 150 for the block. Each ΔX increment for the block is determined upon the presentation of the block for computation and is represented by the operation of the flip-flops 396 and 420, as previously described. Each ΔY increment for the block is also determined upon the presentation of the block for computation and is represented by the operation of the flip-flop 496 and 494. Since these quantities have already been obtained in the operation of "normal" integrators, only the cumulative value of the ΔX increments has to be obtained in order to have all of the quantities in the product equation $Z=\int YdX+\int XdY$ available for computation. The cumulative value of the ΔX increments for a block is obtained by the operation of the channel 156 and will be described in detail subsequently.

Certain stages are included for a product operation to perform functions similar to those described above for normal operation. Since the value of $\int YdX$ is required just as in "normal" integration, the flip-flops 420 and 494 are included to obtain the values of the $\Delta x$ and ΔY increments every time that a block is presented for computation. The flip-flop 910 in FIGURE 17 is also included to perform functions in obtaining the value of $\int XdY$ similar to those performed by the flip-flop 494 in obtaining $\int YdX$. In like manner, the flip-flop 974 performs functions in obtaining $\int XdY$ corresponding to those performed by the flip-flop 420 in obtaining $\int YdX$.

As will be seen from the above description, a ΔX increment in obtaining $\int XdY$ is equivalent to a ΔY increment in obtaining $\int YdX$. In obtaining $\int XdY$, each ΔX increment is added to the value of X to obtain a new value of X. The ΔX increment is obtained by the flip-flop 910 in accordance with the operation of certain stages shown in FIGURE 17. One of these stages in FIGURE 17 includes the "and" network 918, which rereceives the indications representing ΔX for each block from the right output terminal of the flip-flop 420.

Signals from the flip-flop 420 pass through the "and" network 918 only at position 1 for a block because of the connection of the "and" network 918 to the "and" network 222. The signals from the flip-flop 420 pass through the "and" network 918 only at position 1 for a block so that the block will be prepared in the subsequent positions for the proper utilization of the ΔX increment in obtaining $\int XdY$ for the block.

The signals from the flip-flop 420 pass through the "and" network 918 only when a relatively high voltage is produced on the right output terminal of the flip-flop 606. As will be explained in detail subsequently, a relatively high voltage on the right output terminal of the flip-flop 606 indicates that a product operation is being performed for the block undergoing computation.

The signals from the "and" network 918 pass through the "or" network 914 to the "and" network 916. The "and" network 916 synchronizes the signals at optimum times in the clock cycles because of its connection to the left output terminal of the flip-flop 164. The "and" network 916 then introduces the signals to the left input terminal of the flip-flop 910. The signals trigger the flip-flop 910 for the production of a relatively high voltage on the left output terminal of the flip-flop. Signals pass through the stages 918, 914 and 916 to the flip-flop 910 in accordance with the logical equation:

$$c_2=\overline{A}_2\overline{G}_1P_1T \qquad (101)$$

where $c_2$=the introduction of a triggering signal to the left input terminal of the flip-flop 910;

$\overline{A}_2$=a relatively high voltage on the right output terminal of the flip-flop 420;

$\overline{G}_1$=a relatively high voltage on the right output terminal of the flip-flop 606; and the other terms have previously been defined.

Just as the signals of high amplitude on the right output terminal of the flip-flop 420 pass to the "and" network 918, the signals of high amplitude on the left output terminals of the flip-flop pass to the "and" network 928. These signals pass through the "and" network 928 only at position 1 for a block for the same reasons as described above. The signals are able to pass through the "and" network 928 only for a product operation, as represented by a relatively high voltage on the right output terminal of the flip-flop 606.

The signals from the "and" network 928 pass through the "or" network 932 to the "and" network 934. These signals are synchronized by the "and" network 934 at optimum times in the clock cycles and are introduced to the right input terminal of the flip-flop 910. The signals trigger the flip-flop for the production of a relatively high voltage on the right output terminal of the flip-flop. The signals pass through the stages 928, 932 and 934 to the flip-flop 910 in accordance with the logical equation:

$$\overline{c}_2=A_2\overline{G}_1P_1T \qquad (102)$$

where $\overline{c}_2$=a signal introduced to the right input terminal of the flip-flop 910; and the other terms have previously been defined.

On the basis of the above discussion, it will be seen that a ΔY increment in obtaining ∫X*d*Y is equivalent to a ΔX increment in obtaining ∫Y*d*X. In obtaining ∫X*d*Y, each ΔY increment controls the polarity of an XΔY increment. The ΔY increment for use in determining XΔY is obtained by the flip-flop 974 in accordance with the operation of certain stages shown in FIGURE 19.

The signals representing positive ΔY increments pass from the left output terminal of the flip-flop 494 through the "and" network 1022 in FIGURE 19. The signals pass through the "and" network 1022 only at position 1 for a block so that the flip-flop 974 can operate in the remaining positions to control the production of the YΔX increment for the block. The signals pass through the "and" network 1022 only when a product is being obtained as represented by a relatively high voltage on the right output terminal of the flip-flop 606.

The signals from the "and" network 1022 are introduced through the "or" network 1036 to the "and" network 1038 for synchronization at optimum times in the clock cycles. The signals then pass to the left input terminal of the flip-flop 974 and trigger the flip-flop so as to produce a relatively high voltage on the left output terminal of the flip-flop. The stages 1022, 1036 and 1038 pass signals to the flip-flop 974 in accordance with the logical equation:

$$c_2''=B_2\overline{G}_1P_1T \qquad (103)$$

where $c_2''$=a triggering signal introduced to the left input terminal of the flip-flop 974;

$B_2$=a relatively high voltage on the left output terminal of the flip-flop 494; and the other terms have previously been defined.

The signals of high amplitude on the right output terminal of the flip-flop 494 pass through the "and" network 1044. The signals pass only at position 1 for blocks undergoing a product operation. This results from the connection of the "and" network 1044 to the "and" network 222 and to the right output terminal of the flip-flop 606. The signals from the "and" network 1044 pass through the "or" network 1052 to the "and" network 1054. These signals are synchronized by the "and" network 1054 at optimum times in the clock cycles and are introduced to the right input terminal of the flip-flop 974. The signals trigger the flip-flop 974 and produce a relatively high voltage on the right output terminal of the flip-flop. The flip-flop 974 receives signals passing through the stages 1044, 1052 and 1054 in accordance with the logical equation:

$$\overline{c}_2''=\overline{B}_2\overline{G}_1P_1T \qquad (104)$$

where $\overline{c}_2''$=a triggering signal system introduced to the right input terminal of the flip-flop 974; and the other terms have previously been defined.

The increments of ΔX are combined to obtain the value of X. This value is represented for a block by the indications in the channel 156 for the block. Every time that a block is presented for computation, the indications in the channel 156 are combined with the indications representing the ΔX increment obtained for the block in that cycle of computation. The results obtained represent the new value of X for the block. These new results are obtained by combining in each position the indications representing X and ΔX for the position and the carry obtained by the addition in the previous position. The carry is represented by the operation of the flip-flop 938 shown in FIGURE 17.

As previously described, a positive ΔY increment is represented by an indication of "1" in the position of least significance and indications of "0" in the successive positions. A positive increment is represented in this manner when a ΔY increment is added to the value of Y to obtain a new value of Y for a block. This has been described in detail previously. Similarly, corresponding indications represent a positive ΔX increment when the ΔX increment is added to the value of X to obtain a new value of X.

Since an indication of "1" occurs only in the position of least significance for a positive ΔX increment, this indication of "1" may be represented by a relatively high voltage on the left output terminal of the carry flip-flop 938 in the position of least significance when the ΔX increment is added to X. In this way, the flip-flop 910 representing the ΔX increment may be triggered into an indication of "0" for each position in the block, as represented by a relatively high voltage on the right output terminal of the flip-flop. It is for this reason that a relatively high voltage on the left output terminal of the flip-flop 420 produces a relatively high voltage on the right output terminal of the flip-flop 910. This has been previously represented by the logic expressed in Equation 102.

When a positive ΔX increment occurs, the carry flip-flop 938 must be triggered to its "true" state for the reasons discussed in the previous paragraph. The flip-flop 938 becomes triggered to its "true" state by the passage of a signal through the "and" network 944 in FIGURE 17 from the left output terminal of the flip-flop 420. A signal passes through the "and" network 944 from the flip-flop 420 only at position 1 for a block because of the connection from the "and" network 222 to the "and" network 944. The signal from the flip-flop 420 is able to pass through the "and" network 944 only when a product is being obtained since the "and" network 944 is connected to the right output terminal of the flip-flop 606. The signal is able to pass only when a relatively high voltage is simultaneously produced on the right output terminal of the flip-flop 736. As will be described in detail subsequently, the flip-flop 736 operates in a manner similar to the flip-flop 446 to indicate the occurrence of a "start" pulse. However, this "start" pulse occurs in the channel 154 and indicates the beginning of the signals representing the value of X in the channel 156 for the block undergoing computation.

The signals from the "and" network 944 pass through the "or" network 946 to the "and" network 948 for synchronization at optimum times in the clock cycles. The signals then pass to the left input terminal of the flip-flop 938 and trigger the flip-flop to produce a relatively high voltage on the left output terminal of the flip-flop. The operation of the stages 944, 946 and 948 in passing triggering signals to the flip-flop 938 can be logically expressed as:

$$c_3=A_2\overline{S}_2\overline{G}_1P_1T \qquad (105)$$

where $c_3$=a triggering signal introduced to the left input terminal of the flip-flop 938;

$\overline{S}_2$=a relatively high voltage on the right output terminal of the flip-flop 736; and the other terms have previously been defined.

It has previously been described that a negative ΔY increment is represented by an indication of "1" in each position for a block including the first position when the ΔY increment is combined with the value of Y to obtain a new value of Y. A negative ΔX increment is represented in a similar manner when the ΔX increment is combined with the value of X to obtain a new value of X. Because of this, the relatively high voltage on the right output terminal of the flip-flop 420 representing a negative ΔX increment produces a relatively high voltage on the left output terminal of the flip-flop 910 in accordance with the logic expressed in Equation 101.

When the flip-flop 910 is triggered to its "true" condition for a block, it remains in this condition for the remaining positions of the block to provide an indication of "1" for each position. Since the flip-flop 910 indicates "1" for every position including the position of least significance, the flip-flop 938 can be triggered to its "off" condition in the position of least significance. The flip-flop 938 is triggered to its "off" condition by signals passing through the "and" network 952 in FIGURE 17 from the right output terminal of the flip-flop 420. Signals pass through the "and" network 952 only at position 1 for blocks undergoing a product operation and only before the occurrence of the "start" pulse in the channel 154. This results from the connections to the "and" network 952 from the "and" network 222 and the right output terminals of the flip-flops 606 and 736.

The signals from the "and" network 952 are introduced through the "or" network 956 to the "and" network 958. These signals are synchronized by the "and" network 958 at optimum times in the clock cycles and are then introduced to the right input terminal of the flip-flop 938. The signals trigger the flip-flop to produce a relatively high voltage on the right output terminal of the flip-flop 938. Signals pass through the stages 952, 956 and 958 to the flip-flop 938 in accordance with the logical equation:

$$\overline{c}_3=\overline{A}_2\overline{S}_2\overline{G}_1P_1T \qquad (106)$$

where $\overline{c}_3$=a triggering signal introduced to the right input terminal of the flip-flop 938; and the other terms have previously been defined.

As described above, the indications of X in the channel 156 for a block are combined with the indications representing ΔX to obtain new indications representing X. Such a combination is obtained by the operation of certain stages shown in FIGURE 13. These stages include the stages 724, 726, 728 and 730. The stages 724, 726, 728 and 730 pass signals for particular combinations representing X and ΔX for a position and the carry resulting from the addition in the previous position. In this way, the "and" networks 724, 726, 728 and 730 pass signals for particular combinations of signals from the flip-flops 688, 910 and 938.

The signals from the "and" networks 724, 726, 728 and 730 pass through the "or" network 732 to the "and" network 734. The signals are able to pass through the "and" network 734 only after the occurrence of the "start" pulse in the channel 154 since this start pulse indicates that information relating to X follows in the channel 156. Such an indication is provided by a relatively high voltage on the left output terminal of the flip-flop 736. After the occurrence of the "start" pulse, the signals from the "or" network 732 pass through the "and" network 734 at optimum times in the clock cycles because of the connection between the "and" network 734 and the left output terminal of the flip-flop 164.

The signals from the "and" network 734 pass to the cathode follower 708 to indicate the new value of X for the block undergoing computation. The signals passing to the cathode follower 708 through the stages 724, 726, 728, 730, 732 and 734 can be logically expressed as, $$U_n=S_2T(UC_2C_3+\overline{U}\overline{C}_2C_3+\overline{U}C_2\overline{C}_3+U\overline{C}_2\overline{C}_3) \qquad (107)$$

where $U_n$=a signal introduced to the cathode follower 708;

$S_2$=a relatively high voltage on the left output terminal of the flip-flop 736;

$U$=a relatively high voltage on the left output terminal of the flip-flop 688;

$C_2$=a relatively high voltage on the left output terminal of the flip-flop 910;

$C_3$=a relatively high voltage on the left output terminal of the flip-flop 938; and the other terms have previously been defined;

As will be seen, the cathode follower 708 receives a signal only when the combinations of U, $C_2$ and $C_3$ represent decimal values or "3" of "1" for a position. A decimal value of "3" is equivalent in binary form to a value of "1" and a carry of "1" to the next position. It will be further seen that the various terms such as $UC_2C_3$, $\overline{U}\overline{C}_2C_3$, $\overline{U}C_2\overline{C}_3$ and $U\overline{C}_2\overline{C}_3$ are equivalent from the standpoint of binary adition to the various terms included in logical Equation 60.

In logical Equation 107, a new value of X for a block is obtained by adding the indications of X, ΔX and the carry in all possible combinations. This procedure is relatively long in comparison to that obtained for adding the indications of Y and ΔY to obtain a new value of Y for each block every time that the block is presented for computation. The new value of Y has been previously designated as $Y_N$ and is obtained by the logic expressed in Equations 40 to 43, inclusive. Shortcuts are not used in obtaining the addition of X and ΔX for a block since more than one increment may occur in the value of X upon the presentation of the block for computation. This will be discussed in detail subsequently when the operation of a block as a servo will be presented.

The "and" networks 748, 750, 752 and 754 pass sigsignals for various combinations of X, ΔX and a carry representing a binary indication of "0" for a position. The signals from the "and" networks 748, 750, 752 and 754 pass through the "or" network 740 to the "and" network 742 for synchronization at optimum times in the clock cycles. The signals then pass to the cathode follower 710 to represent an indication of "0" at a particular position in the new value of X for a block. The cathode follower 710 receives signals from the stages 748, 750, 752, 754, 740 and 742 in accordance with the logical equation:

$$\overline{U}_n=(\overline{S}_2+\overline{U}C_2C_3+U\overline{C}_2C_3+UC_2\overline{C}_3+\overline{U}\overline{C}_2\overline{C}_3)T \quad (108)$$

where $\overline{U}_n$=a signal introduced to the cathode follower 710; and the other terms have previously been defined.

As will be seen in FIGURE 13, the voltage on the right output terminal of the flip-flop 736 is introduced through the "or" network 740 to the "and" network 742. This causes indications of "0" to be introduced to the cathode follower 710 in all positions before and including the "start" pulse in the channel 154. This is equivalent to the inclusion of $\overline{S}_2$ as an "or" term in logical Equation 108. Since $\overline{S}_2$ is included as an "or" term in the logical equation, the other terms can be effective only after the occurrence of the "start" pulse in the channel 154. For this reason, the other terms in Equation 108 do not have to be modified by an indication of $S_2$ as an "and" term in a manner similar to the *inclusion of* $S_2$ as an "and" term in Equation 107. These other terms provide indications of either "2" or "0" for a position. Since "2" is equivalent in binary form to an indication of "0" and a carry of "1" to the following position, all of the terms in Equation 108 formed from combinations of U, $C_2$ and $C_2$ will be indications of "0" for a position.

It has been described above that the new indications of X for a block are obtained after the occurrence of the "start" pulse in the channel 154. This is a pulse permanently recorded in the channel and having an amplitude representing an indication of "1." The pulse is permanently recorded in the channel 154 in a position between positions 1 and 16, inclusive, for a block. For a product operation, a "start" pulse occurs in the channel 154 at the same time that a "start" pulse occurs in the channel 148. In this way, computations relating to increments of XΔY and YΔX are simultaneously initiated.

When a positive pulse occurs in the channel 154 in positions 1 to 16, inclusive, for a block, relatively high voltages are simultaneously produced on the left output terminal of the flip-flop 684 and the right output terminal of the flip-flop 210 in FIGURE 15. Such a simultaneous occurrence of voltages causes a signal to pass through the "and" network 834 and the "or" network 842 to the "and" network 844.

The "and" network 844 synchronizes the signals from the "or" network 842 at optimum times in the clock cycles and introduces them to the flip-flop 736 to trigger the flip-flop. This causes a relatively high voltage to be produced on the left output terminal of the flip-flop. A relatively high voltage is produced on the left output terminal of the flip-flop 736 by the passage of signals through the stages 834, 842 and 844 in accordance with the logical equation:

$$s_2=U_p\overline{J}_5\overline{S}_2T \quad (109)$$

where $s_2$=a triggering signal introduced to the left input terminal of the flip-flop 736;

$U_p$=a relatively high voltage on the left output terminal of the flip-flop 684; and the other terms have previously been defined.

When a relatively high voltage is produced on the left output terminal of the flip-flop 736 to indicate the occurrence of a start pulse, it continues until the end of the operation controlled by the start pulse. This may occur at the end of a single-block operation or at the end of the second half of a double-block operation. This is represented by a relatively high voltage on the right output terminal of the flip-flop 390.

When a relatively high voltage occurs on the right output terminal of the flip-flop 390, a signal passes through the "and" network 850 at position 17 for the block undergoing computation. The signal passes through the "or" network 848 to the "and" network 846. The "and" network 846 synchronizes the signal at an optimum time in the clock cycle and introduces it to the right input terminal of the flip-flop 736. The signal triggers the flip-flop 736 to the false state of operation of the flip-flop and causes a relatively high voltage to be produced on the right output terminal of the flip-flop. Signals pass through the stages 850, 848 and 846 to the flip-flop 736 in accordance with the logical equation:

$$\bar{s}_2=\overline{G}_5P_{17}T \quad (110)$$

where $\bar{s}_2$=a triggering signal introduced to the right input terminal of the flip-flop 736; and the other terms have previously been defined.

The information relating to the new value of X for a block is recorded in the channel 156 for subsequent utilization. As previously described, this information is obtained by the cathode followers 708 and 710 in FIGURE 13. The information is recorded by the operation of certain stages shown in FIGURE 28. These stages include the "or" network 1426, which passes the signals from the cathode follower 708 to the "and" network 1424. The "and" network 1424 in turn passes the signals from the "or" network 1426 only during the time that the digital differential analyzer is actually computating to solve a mathematical problem. This is represented by a signal from the cathode follower 1340.

The signals from the "and" network 1424 pass through the "or" network 1420 to the "and" network 1418 for synchronization at optimum times in the clock cycles. The signals then pass to the left input terminal of the flip-flop 1414 and trigger the flip-flop so as to produce signals of high amplitude on the left output terminal of the flip-flop. These signals are introduced to the coil 1416 for the recordation in the channel 156 of magnetic signals representing indications of "1." Signals pass to the flip-flop 1414 through the stages 1426, 1424, 1420 and 1418 in accordance with the logical equation:

$${}_0u=\alpha U_nT \quad (111)$$

where ${}_0u$=a triggering signal introduced to the left input terminal of the flip-flop 1414;

$U_n$=a signal from the cathode follower 708 to represent an indication of "1" for a position; and $\alpha$=a signal from the cathode follower 1340 to indicate that the digital differential analyzer is actually operating to solve a problem.

Just as the indications of "1" from the cathode follower 708 pass to the left input terminal in the flip-flop 1414, the indications of "0" representing the new value of X pass to the right input terminal of the flip-flop. These signals pass from the cathode follower 710 through the "and" network 1434. The "and" network 1434 becomes open for the passage of signals from the cathode follower 710 only after the occurrence of the "start" pulse in the channel 154, as represented by a relatively high voltage on the left output terminal of the flip-flop 736.

The signals from the "and" network 1434 are introduced through the "or" network 1442 to the "and" network 1444, which passes the signals only during the time that the digital differential analyzer is actually operating to solve a mathematical problem. The signals then pass through the "or" network 1446 to the "and" network 1448. The "and" network 1448 synchronizes the signals at optimum times in the clock cycles and introduces the signals to the right input terminal of the flip-flop 1414. These signals trigger the flip-flop 1414 such that signals of high amplitude are produced on the right output terminal of the flip-flop and signals of low amplitude are produced on the left output terminal of the flip-flop.

The signals of low amplitude on the left output terminal of the flip-flop 1414 are introduced to the coil 1416 to obtain a recordation of an indication of "0" in the channel 156 for the different positions. The flip-flop 1414 receives the signals passing through the stages 1434, 1442, 1444, 1446 and 1448 in accordance with the logical equation:

$$_0\bar{u}=\alpha\bar{U}_nS_2T \quad (112)$$

where $_0\bar{u}$=a triggering signal introduced to the right input terminal of the flip-flop 1414;

$\bar{U}_n$=a signal from the cathode follower 710 to represent an indication of "0" for a position; and the other terms have previously been defined.

In order to insure the proper utilization of information in the channel 156, indications of "0" are recorded in the channel 156 for a block for all of the positions before and including the "start" pulse in the channel 154. These indications of "0" are recorded by the passage of signals through the "and" network 1440 in FIGURE 28. The "and" network 1440 passes signals only in these positions because of its connection to the right output terminal of the flip-flop 736. The "and" network 1440 passes signals only when a product operation is being performed as represented by a relatively high voltage on the right output terminal of the flip-flop 606.

The signals from the "and" network 1440 are introduced through the "or" network 1442 to the "and" network 1444. The "and" network 1444 passes the signals only when the digital differential analyzer is actually computing since it is connected to the cathode follower 1340. The signals from the "and" network 1444 then pass through the "or" network 1446 and the "and" network 1448 to the right input terminal of the flip-flop 1414. These signals trigger the flip-flop 1414 such that signals of high amplitude are produced on the right output terminal of the flip-flop and signals of low amplitude are produced on the left output of the flip-flop. The signals of low amplitude on the left output terminal of the flip-flop 1414 cause the coil 1416 to record magnetic signals representing indications of "0" in the channel 156. Triggering signals are introduced to the flip-flop 1414 through the stages 1440, 1442, 1444, 1446 and 1448 in accordance with the logical equation:

$$_0\bar{u}=\alpha\bar{S}_2\bar{G}_1T \quad (113)$$

where all of the terms have previously been defined.

As one of the steps in obtaining the product $Z=XY$, the differential combination represented by the XΔY increment must be obtained. This differential combination is obtained in a manner similar to that for obtaining the differential combination represented by the YΔX increments. The manner of obtaining the YΔX increments has been discussed fully above in connection with the operation of "normal" integration. The stages for obtaining the YΔX increments are shown in FIGURE 11 and are represented logically by Equations 49, 50, 51, 51*a*, 52, 52*a*, 53 and 53*a* given above.

Certain of the stages shown in FIGURE 13 operate to obtain the differential combination represented by the XΔY increments. These stages operate in a manner similar to corresponding stages shown in FIGURE 11 and discussed fully above. The stages shown in FIGURE 13 include the "and" networks 692, 698, 700 and 702. These networks operate to pass signals for various combinations of indications representing ΔY and the old and new values of X for a position and the carry resulting from the addition of the indications in the previous position. The signals passing through the "and" networks 692, 698, 700 and 702 are introduced through the "or" network 704 to the "and" network 706 for synchronization at optimum times in the clock cycles. The signals then pass to the cathode follower 705.

The signals passing through the stages 692, 698, 700, 702, 704 and 706 to the cathode follower 705 can be logically expressed as $$U=(C_2C_2''U_n+C_2\bar{C}_2''\bar{U}_n+\bar{C}_2C_2''U+\bar{C}_2\bar{C}_2''\bar{U})T \quad (114)$$

where $U$=a signal introduced to the cathode follower 705 to represent an indication of "1" in a position for the XΔY increment for a block;

$C_2$=a relatively high voltage on the left output terminal of the flip-flop 910 to represent a positive ΔX increment;

$C_2''$=a relatively high voltage on the left output terminal of the flip-flop 974 to represent a positive ΔY increment;

$U_n$=a signal from the cathode follower 708 to represent an indication of "1" in the new value of X for a position;

$\bar{U}_n$=a signal from the cathode follower 710 to represent an indication of "0" in the new value of X for a position; and $U$=a relatively high voltage on the left output terminal of the flip-flop 688 to represent an indication of "1" in the old value of X for a position.

The various terms such as $C_2C_2''U_n$, $C_2C_2''\bar{U}_n$, $\bar{C}_2C_2''U$ and $\bar{C}_2\bar{C}_2''\bar{U}$ are respectively equivalent to the terms expressed in Equations 51, 53, 49 and 50. The old and new values of X are used in the different terms for the same reasons as described above in obtaining the increments represented by $y$=YΔX. These values are used so that a positive truncation correction of ½ of an increment can be made regardless of the polarities of the increments in the independent and dependent quantities.

As will be seen, the term $C_2''$ in Equation 114 represents the same function as the term $A_2$ in Equations 51, 53, 49 and 50. Similarly, the term $C_2$ represents a function in Equation 114 similar to the term $B_2$ in Equations 51, 53, 49 and 50. However, the polarity of the term $C_2$ is inverted in Equation 114 in comparison to that of the term $B_2$ in Equations 51, 53, 49 and 50. The reason for this has been described above in connection with the discussion relating to the logic in Equations 101 and 102. It results from the particular manner in which positive ΔX increments and negative ΔX increments are represented when these increments are combined with X.

The "and" networks 714, 716, 718 and 720 operate in a manner similar to the "and" networks 692, 698, 700 and 702 so as to pass signals for various combinations of voltages from the flip-flops 688, 910 and 974 and the cathode followers 708 and 710. The signals passing through the "and" networks 714, 716, 718 and 720 provide indications of "0" in the various positions for a block to represent binary values of the differential combination YΔX for the positions. The signals from the "and" networks 714, 716, 718 and 720 pass through the "or" network 712 and the "and" network 715 to the cathode follower 713. The cathode follower 713 receives the signals passing through the stages 714, 716, 718, 720, 712 and 715 in accordance with the logical equation:

$$\bar{U}=C_2C_2''\bar{U}_n+C_2\bar{C}_2''U_n+\bar{C}_2\bar{C}_2''U+\bar{C}_2C_2''\bar{U} \quad (115)$$

where $U$=a signal passing to the cathode follower 713; and the other terms have previously been defined.

In order to obtain the value of $Z=XY$, the increments of YΔX and XΔY are combined. The increments of $Y\Delta X$ are combined to obtain a value of R as described above. The cumulative value of the various $Y\Delta X$ increments is represented in Equations 60 and 60*a* and is designated as $R_1$. In order to obtain the value $Z=XY$, each increment of $X\Delta Y$ (or $U$) is combined with the value of $R_1$ to obtain a $R_n$ value. The value $R_n$ represents the value of $Z=XY$ for a block.

The stages shown in FIGURE 14 operate to combine the value of $R_1$ and each increment of $X\Delta Y$ (or $U$) for a block to obtain the product $Z=XY$. The stages operate to obtain the product designated as $R_n$ by combining the indications of $R_1$ and $U$ for each position and the carry of the addition from the previous position. This carry is indicated in the flip-flop 604 in FIGURE 14. A positive carry is represented by a relatively high voltage on the left output terminal of the flip-flop 604 and a negative carry is represented by a relatively high voltage on the right output terminal of the flip-flop.

The "and" networks 766, 770, 772 and 774 in FIGURE 14 operate to pass signals representing an indication of "1" for a position for various combinations of $R_1$, $U$ and the carry from the flip-flop 604. These combinations correspond to an addition similar to that described above for obtaining $R_1$ and $\bar{R}_1$ as represented by Equations 60 and 60*a*. The signals from the "and" networks 766, 770, 772 and 774 pass through the "or" network 778 to the "and" network 780. Since the "and" network 780 is connected to the left output terminal of the flip-flop 736, the "and" network passes the signals from the "or" network 778 only in the positions after the occurrence of the "start" pulse in the channel 154. The signals passing through the "and" network 780 are introduced through the "or" network 786 to the "and" network 787 for synchronization at optimum times in the clock cycles. The signals then pass to the cathode follower 788 to represent indications of "1" in the product $Z=XY$ for a block. Signals are introduced to the cathode follower through the stages 766, 770, 772, 774, 778, 780, 786 and 787 in accordance with the logical equation:

$$R_n=S_2T(DR_1U+\bar{D}\bar{R}_1U+D\bar{R}_1\bar{U}+\bar{D}R_1\bar{U}) \quad (116)$$

where $R_n$=a signal introduced to the cathode follower 788 to represent an indication of "1" for a position in a block performing a product operation;
$D$=a relatively high voltage on the left output terminal of the flip-flop 604;
$R_1$=a signal from the cathode follower 437;
$\bar{R}_1$=a signal from the cathode follower 646;
$U$=a signal from the cathode follower 705; and
$\bar{U}$=a signal from the cathode follower 713.

Just as the "and" networks 766, 770, 772 and 774 operate to pass signals representing indications of "1" for the different positions, the "and" networks 792, 794, 796 and 798 operate to pass signals representing indications of "0." These signals pass through the "or" network 800 to the "and" network 802, which passes the signals only for the positions after the "start" pulse in the channel 154. The signals then pass through the "or" network 804 to the "and" network 805. The signals are synchronized by the "and" network at optimum times in the clock cycles and are introduced to the cathode follower 810. Signals pass through the stages 792, 794, 796, 798, 800, 802, 804 and 805 to the cathode follower 810 in accordance with the logical equation:

$$\bar{R}_n=S_2T(\bar{D}R_1U+D\bar{R}_1U+DR_1\bar{U}+\bar{D}\bar{R}_1\bar{U}) \quad (117)$$

where $\bar{R}_n$=a signal introduced to the cathode follower 810; and the other terms have previously been defined.

As described above, each increment of $X\Delta Y$ (or $U$) for a block is obtained by using the value of X either at the beginning or at the end of the $\Delta Y$ increment. Actually, the accuracy in the value of each $X\Delta Y$ increment (or $U$) could be enhanced by using a value intermediate to the values of X at the beginning and end of each $\Delta Y$ increment. Such an intermediate value is obtained by the technique of truncation correction described above in connection with the $Y\Delta X$ increments. The technique of truncation correction is accomplished by using for each $X\Delta Y$ increment a value of X halfway between the values at the beginning and end of the $\Delta Y$ increment. This truncation correction is represented by a value of $\frac{1}{2}\Delta X$.

In order to provide a correction of $\frac{1}{2}\Delta X$, an indication of "1" is added to the value of $R_n$ at the position of the "start" pulse in the channel 154. For example, when the value of $R_1$ at the start pulse is represented by an indication of "0," the indication is converted to an indication of "1." This conversion is accomplished by the passage of a signal through the "and" network 784 in FIGURE 14. A signal passes through the "and" network 784 when a signal is produced by the cathode follower 464 to represent an indication of "0" corresponding to a value of $\bar{R}_1$ for a position. The signal from the cathode follower 464 is able to pass through the "and" network 784 only in positions 1 to 17, inclusive, for each block because of the connection of the "and" network to the inverter 444. The signal passes through the "and" network 784 only at positions before and including the start pulse in the channel 154. This results from the connection between the "and" network 784 and the right output terminal of the flip-flop 736.

The signals from the "and" network 784 pass through the "or" network 786 and the "and" network 787 to the cathode follower 788 to represent an indication of "1." The passage of signals through the stages 784, 786 and 787 to the cathode follower 788 is controlled by the logical equation:

$$R_n=\bar{R}_1\bar{S}_2P_{1/17}T \quad (118)$$

where all of the terms have previously been defined.

In this way, an indication of "0" representing $\bar{R}_1$ is converted into an indication of "1" representing $R_n$ at the position of the "start" pulse to obtain a truncation correction.

The "and" network 808 becomes prepared for activation at the same time as the "and" network 784. However, the "and" network 808 passes signals from the cathode follower 437 representing indications of "1" for a position. The signals from the "and" network 808 pass through the "or" network 804 and the "and" network 805 to the cathode follower 810. These signals pass through the stages 808, 804 and 805 to the cathode follower 810 in accordance with the logical equation:

$$\bar{R}_n=R_1\bar{S}_2P_{1/17}T \quad (119)$$

where all of the terms have previously been defined.

In this way, a truncation correction is obtained at the position of the start pulse change an indication of "1" represent $R_1$ into an indication of "0" representing $\bar{R}_n$.

The operation of the carry flip-flop 604 at each position is controlled by the indications representing $R_1$ and $X\Delta Y$ (or $U$) for the previous position. The stages for controlling the operation of the carry flip-flop 604 are shown in FIGURE 23. These stages include the "and" network 1178 in FIGURE 23. The "and" network 1178 passes a signal only upon the simultaneous occurrence of indications of "1" for $R_1$ and $U$ for a position as represented by signals from the cathode followers 437 and 705. The "and" network 1178 passes a signal only when a product operation is being performed in a block, as represented by a relatively high voltage on the right output terminal of the flip-flop 606. The "and" network 1178 passes a signal only in the positions after the start pulse in the channel 154 because of the connection between the "and" network and the left output terminal of the flip-flop 736.

The signals from the "and" network 1178 pass through the "or" network 1172 to the "and" network 1174 for synchronization at optimum times in the clock cycles. The signals then pass to the left input terminal in the flip-flop 604. The signals trigger the flip-flop 604 so as to produce a relatively high voltage on the left output terminal of the flip-flop. The flip-flop 604 has triggering signals introduced to it through the stages 1178, 1172 and 1174 in accordance with the logical equation:

$$d = UR_1\overline{G}_1S_2T \qquad (120)$$

where $d$=a triggering signal introduced to the left input terminal of the flip-flop 604; and the other terms have previously been defined.

As will be seen, the above equation controlling the operation of the carry flip-flop 604 corresponds to the logic expressed in Equation 63, which controls the triggering of the carry flip-flop 432 into its true state to indicate a carry. In Equation 120, the expression $UR_1$ corresponds to the expression $yR$ in Equation 63.

It has been discussed above and indicated in the table shown in FIGURE 36 that the carry flip-flop 432 is triggered to its false state only upon the simultaneous occurrence of false states of the two quantities being added. This is logically expressed in Equation 64. In like manner, the carry flip-flop 604 is triggered to its false state only when indications of "0" for a position simultaneously occur for the quantities $R_1$ and $U$. This triggering action is initiated by the simultaneous introduction of signals to the "and" network 1190 in FIGURE 23 from the cathode followers 464 and 713. The "and" network 1190 then passes a signal when relatively high voltages are introduced to it at the same time from the left output terminal of the flip-flop 736 and the right output terminal of the flip-flop 606.

The signals from the "and" network 1190 are introduced through the "or" network 1194 to the "and" network 1196 and are synchronized by the "and" network 1196 at optimum times in the clock cycles. The signals then pass to the right input terminal of the flip-flop 604. These signals trigger the flip-flop for the production of a relatively high voltage on the right output terminal of the flip-flop to represent a lack of carry from one position to the next. Signals pass through the stages 1190, 1194 and 1196 to the flip-flop 604 in accordance with the logical equation:

$$\overline{d} = \overline{UR_1}S_2\overline{G}_1T \qquad (121)$$

where $\overline{d}$=the introduction of a triggering signal to the right input terminal of the flip-flop 604; and the other terms have previously been defined.

The question of a carry at the position of truncation correction should probably be discussed now. If the value of R at the start position is initially "0," a truncation correction in adding each YΔX increment to R will cause the value of $R_1$ to become "1" at the start position. At the same time, a carry indication is obtained by the flip-flop 432 as discussed above and expressed in Equation 59. When XΔY increment (or $U$) is added to $R_1$, a further truncation correction is produced. This truncation correction causes an indication of "1" at the start position for $R_1$ to change to an indication of "0" at the start position for $R_n$. As will be described subsequently, $R_n$ is recorded into the channel 152 to serve as the value of R in the next cycle of computation. In this way, the value of R at the start position remains "0" in each cycle of computation for a product operation. Similarly, a carry is obtained from the "start" position to the next position in each cycle of computation for a product operation.

Since a carry is obtained from the "start" position to the next position in each cycle of computation for a product operation, the carry flip-flop 604 can be triggered to its "true" state before the "start" pulse. This occurs by the passage of a signal through the "and" network 1180 in FIGURE 23. The "and" network 1180 passes a signal only at position 1 of a product operation because of its connection to the "and" network 222 and the right output terminal of the flip-flop 606. The "and" network 1180 passes a signal only before the occurrence of the "start" pulse in the channel 154, as represented by a relatively high voltage on the right output terminal of the flip-flop 736. As will become more apparent subsequently, this causes a signal to pass through the "and" network 1180 during the first half of a double-block operation but prevents a signal from passing through the "and" network during the second half of a double-block operation.

The signals from the "and" network 1180 pass through the "or" network 1172 to the "and" network 1174 for synchronization at optimum times in the clock cycles. The signals then pass to the left input terminal of the flip-flop 604 and trigger the flip-flop such that a relatively high voltage is produced on the left output terminal of the flip-flop. The flip-flop 604 is triggered by signals passing through the stages 1180, 1172 and 1174 in accordance with the logical equation:

$$d = \overline{G}_1\overline{S}_2P_1T \qquad (122)$$

where all of the terms have previously been defined.

In order to insure that the carry flip-flop 604 is ready for proper functioning at the beginning of each product operation, a signal passes through the "and" network 876 in FIGURE 23. As previously described, the "and" network 876 passes a signal at position 18 of a block when an indication of "1" appears in the channel 142 for the block. This indication represents a code to control the end of a product operation. The signal passing through the "and" network 876 is introduced through the "or" network 1194 in FIGURE 23 to the "and" network 1196. The "and" network synchronizes the signals at optimum times in the clock cycles and introduces the signals to the right input terminal of the flip-flop 604. These signals trigger the flip-flop 604 and cause a relatively high voltage to be produced on the right output terminal of the flip-flop. A relatively high voltage is produced on the right output terminal of the flip-flop 604 by the passage of signals through the stages 876, 1194 and 1196 in accordance with the logical equation:

$$\overline{d} = L_2P_{18}T \qquad (122a)$$

where all of the terms have previously been defined.

In order to perform a product operation in a single block, certain functions must be combined at position 18 of the block. This results from the fact that additions are being performed in each position. For example, several additions are required to obtain new values of Y and X and increments of YΔX and XΔY. Furthermore, other additions are required to combine the YΔX increment and the XΔY increment with the value of R to obtain a new value of R as represented by $R_n$.

The various functions are combined at position 18 so that the value of $R_1$ will represent the value of $R_n$ at this position. As has been previously described, no indication is provided at position 18 for $y$ representing the YΔX increment. In like manner, no indication is provided for $U$ representing the XΔY increment at position 18. In this way, if the carry represented by the operation of the carry flip-flop 604 is inserted into $y$ at position 18, the addition of $R$ and $y$ at position 18 will cause $R_1$ at position 18 to represent $R_n$.

The discussion in the previous paragraph may be seen from a specific example:

```
       Position 18
       |              Position of Start Pulse
       ↓             ↙
       1 1.1 0 0 0 0 -    A3
       1 0.1 1 0 0 0 0    R
   ┌──→  1.0 1 1 0 0 1    y
   │   ─────────────────
 ┌─┼───0 0.0 0 1 0 0 1    R1
 │ │     1.1 1 0 0 1 1    U
 │ └───0 0.0 0 0 1 1 .    D
 │     ─────────────────
 └────→0 1.1 1 1 1 0 0    RN
```

As will be seen from the above example, the value of the carry represented by the D flip-flop 604 is transferred into $y$ at position 18 so that a single addition will cause $R_1$ to indicate $R_n$.

The transfer of the carry indications in the flip-flop 604 at position 18 is obtained by the operation of certain stages shown in FIGURE 11. These stages include the "and" network 602, which passes the signals of high amplitude on the left output terminal of the flip-flop 604. The "and" network 602 passes the signals from the flip-flop 604 only at position 18 for a block because of the connection between the "and" network 602 and the "and" network 216.

Since the "and" network 602 is connected to the right output terminal of the flip-flop 606, the "and" network is able to pass the information from the flip-flop 604 only for a product operation. Furthermore, the "and" network 602 is able to pass the signal only for a single-block operation or the second half of a double-block operation. This results from the connection between the "and" network 602 and the right output terminal of the flip-flop 390. The purpose of this will become more apparent subsequently. A signal is able to pass through the "and" network 602 only upon the occurrence of a proper coding as represented by an indication of "0" in the channel 150. Upon the occurrence of such an indication, a relatively high voltage is introduced from the right output terminal of the flip-flop 450 to the "and" network 602 to prepare the "and" network for activation.

Signals from the "and" network 602 pass through the "or" network 598 to the "and" network 607. These signals are synchronized at optimum times in the clock cycles and are introduced to the cathode follower 436. As previously described, the cathode follower 436 produces signals representing indications of "1" for $y$ in the different positions for a block. The cathode follower 436 receives the signals passing through the stages 602, 598 and 607 in accordance with the logical equation:

$$y=\bar{Y}D\bar{G}_1\bar{G}_5P_{18}T \qquad (123)$$

where all of the terms have previously been defined.

The "and" network 624 in FIGURE 11 becomes prepared for activation at the same time as the "and" network 602. However, the "and" network 624 passes the signals of high amplitude on the right output terminal of the flip-flop 604. These signals pass through the "or" network 626 and the "and" network 627 to the cathode follower 462, which provides signals representing indications of "0" corresponding to a value of $\bar{y}$ in the different positions. Signals pass through the stages 624, 626 and 627 to the cathode follower 462 in accordance with the logical equation:

$$\bar{y}=\overline{YDG}_1\bar{G}_5P_{18}T \qquad (124)$$

where all of the terms have previously been defined.

It has been described above that the indications designated as $R_n$ and $\bar{R}_n$ represent the new value of R for a block undergoing a product operation. These signals are recorded in the channel 152 to serve as the value of R for the block in the next cycle of computation. The signals are recorded by the operation of certain stages shown in FIGURE 27. These stages include the "and" network 1394 (FIGURE 27), which passes the indications of "1" from the cathode follower 788. The "and" network 1394 passes the signals from the cathode follower 788 only during the time that the digital differential analyzer is actually computing. This results from the connection between the "and" network 1394 and the cathode follower 1340. Furthermore, the "and" network 1394 passes the signals from the cathode follower 788 only during a product operation, as represented by a relatively high voltage on the right output terminal of the flip-flop 606.

The signals from the "and" network 1394 pass through the "or" network 1384 to the "and" network 1386. These signals are synchronized by the "and" network 1386 at optimum times in the clock cycles and are introduced to the left input terminal of the flip-flop 1388. The signals trigger the flip-flop 1388 for the production of signals of high amplitude on the left output terminal of the flip-flop. The signals of high amplitude on the left output terminal of the flip-flop 1388 are applied to the coil 1410 to obtain a recordation of an indication of "1" in the channel 152 for a particular position. Relatively high voltages are produced on the left output terminal of the flip-flop 1388 by the passage of signals through the stages 1394, 1384 and 1386 in accordance with the logical equation:

$$_0r=\alpha R_n\bar{G}_1T \qquad (125)$$

where $_0r$=the introduction of a triggering signal to the left input terminal of the flip-flop 1388;

$R_n$=a signal from the cathode follower 788; and the other terms have previously been defined.

The "and" network 1404 becomes prepared for activation at the same time as the "and" network 1394. Because of its connection to the cathode follower 810, the "and" network 1404 passes indications of "0" for the different positions. These signals pass through the "or" network 1406 and the "and" network 1408 to the right input terminal of the flip-flop 1388. The signals trigger the flip-flop such that signals of high amplitude are produced on the right output terminal of the flip-flop and signals of low amplitude are produced on the left output terminal of the flip-flop. The signals of low amplitude on the left output terminal of the flip-flop 1388 are in turn introduced to the coil 1410 to obtain a recordation of indications of "0" in the channel 152. The triggering of the flip-flop 1388 by the passage of signals through the stages 1404, 1406 and 1408 can be logically expressed as:

$$_0\bar{r}=\alpha\bar{R}_n\bar{G}_1T \qquad (126)$$

where $_0\bar{r}$=the introduction of a triggering signal to the right input terminal of the flip-flop 1388;

$\bar{R}_n$=a signal from the cathode follower 810 to represent an indication of "0," and the other terms have previously been defined.

It will be seen from the logic expressed in Equations 125 and 126 that the values of $R_n$ and $\bar{R}_n$ are recorded in the channel 152 during a product operation. This occurs even at position 18 since the logic expressed in Equations 125 and 126 is not limited by any particular position in a block, including position 18. However, as previously described, the indications of $R_1$ and $\bar{R}_1$ represent the new value of R at position 18 of a single-block operation or the second half of a double-block operation. For this reason, the indications of $R_1$ and $\bar{R}_1$ are respectively transferred to $R_n$ and $\bar{R}_n$ at position 18 so that the values of $R_n$ and $\bar{R}_n$ at this position can be recorded.

The transferral of $R_1$ and $\overline{R}_1$ to $R_n$ and $\overline{R}_n$ at position 18 for a block is effectuated by the operation of certain stages shown in FIGURE 14. These stages include the "and" network 782, which passes the signal indications representing $R_1$ from the cathode follower 437. The "and" network 782 passes the signals from the cathode follower 437 only at position 18 for a block since it is connected to the "and" network 216. The "and" network 782 passes the signals only at the end of a single-block operation or the second half of a double-block operation since it is connected to the right output terminal of the flip-flop 736. As previously described, a relatively high voltage cannot be produced on the right output terminal of the flip-flop 736 at position 18 of the first half of a double-block operation.

The signals from the "and" network 782 pass through the "or" network 786 to the "and" network 787 for synchronization at optimum times in the clock cycles. The signals then pass to the cathode follower 788, which provides indications of "1" for $R_n$ at the different positions. Signals pass to the cathode follower 788 through the stages 782, 786 and 787 in accordance with the logical equation:

$$R_n=R_1\overline{S}_2P_{18}T \qquad (127)$$

where all of the terms have previously been defined.

The "and" network 806 in FIGURE 14 becomes prepared for activation at the same time as the "and" network 782. However, the "and" network 806 passes signals representing $\overline{R}_1$ from the cathode follower 464. The signals from the "and" network 806 pass through the "or" network 804 to the "and" network 805 for synchronization at optimum times in the clock cycles. The signals then pass to the cathode follower 810 to represent indications of "0" for $R_n$. The cathode follower 810 receives signals passing through the stages 806, 804 and 805 in accordance with the logical equation:

$$\overline{R}_n=\overline{R}_1\overline{S}_2P_{18}T \qquad (128)$$

where all of the terms have previously been defined.

DOUBLE-LENGTH PRODUCT

In multiplying two quantities, the number of significant digits in the product is often greater than the number of significant digits in either the multiplicand or the multiplier. Sometimes the positions of least significance in the product are not of special importance so that the number of positions representing the product can correspond to the number of positions representing the multiplicand or the multiplier. In such a situation, the multiplicand, the multiplier and the product can all be adequately indicated in one block.

Sometimes the product obtained by multiplying two numbers may be significant in all positions. In such a situation, undesirable errors might occur if the number of positions representing the product were shortened to the number of positions in one block. For this reason, two blocks are sometimes used to obtain a product. The product operation begins at some time in the first block and continues without interruption through the rest of the first block and through all of the second block.

Operation on a single-block or double-block basis is controlled by the flip-flop 390 and certain stages associated with the flip-flop in FIGURE 25. These stages include the "and" networks 1322 and 1324 in FIGURE 25. The "and" network 1322 passes a signal when a particular combination of coded signals simultaneously appears in the channels 144 and 146 at position 18 for a block. This simultaneous combination of signals is represented by indications of "0" in the channels 144 and 146. The indications of "0" in the channels 144 and 146 cause relatively high voltages to be produced on the right output terminals of the flip-flops 314 and 318 at the same time that a signal is produced by the "and" network 216 to indicate position 18 for a block.

The signals from the "and" network 1322 pass through the "or" network 1326 to the "and" network 1328 for synchronization at optimum times in the clock cycles. The signals then pass to the left input terminal of the flip-flop 390. These signals trigger the flip-flop for the production of a relatively high voltage on the left output terminal of the flip-flop. Triggering signals pass to the flip-flop 390 through the stages 1322, 1326 and 1328 in accordance with the logical equation:

$$g_5=\overline{L}_3\overline{L}_4P_{18}T \qquad (129)$$

where $g_5$=the introduction of a triggering signal to the left input terminal of the flip-flop 390; and the other terms have previously been defined.

The flip-flop 390 can also be triggered by a simultaneous indication of "0" in the channels 140 and 142 at position 18 for a block. The simultaneous indications of "0" in the channels 140 and 142 cause relatively high voltages to be introduced at the same time to the "and" network 1324 from the right output terminals of the flip-flop 306 and 310. This causes a signal to pass from the "and" network 1324 through the "or" network 1326 and the "and" network 1328 to the left input terminal of the flip-flop 390. The signals trigger the flip-flop 390 for the production of a relatively high voltage on the left output terminal of the flip-flop. Signals pass through the stages 1324, 1326 and 1328 to the left input terminal of the flip-flop 390 in accordance with the logical equation:

$$g_5=\overline{L}_1\overline{L}_2P_{18}T \qquad (130)$$

where all of the terms have previously been defined.

The codings of $\overline{L}_3\overline{L}_4$ or $\overline{L}_1\overline{L}_2$ at position 18 for a block occur only when the next operation is to involve a double block. In this way a relatively high voltage is obtained on the left output terminal of the flip-flop 390 during the first half of a double-block operation. The relatively high voltage on the left output terminal of the flip-flop 390 continues until position 1 of the second half of the double-block operation. At this time, a signal passes through the "and" network 1330 in FIGURE 25. A signal passes through the "and" network 1330 at position 1 of the second half of the double-block operation because of the connection between the "and" networks 1330 and 222. The signal can pass only in the second half of the double block operation because of the introduction of a relatively high voltage from the left output terminal of the flip-flop 446 to the "and" network 1330. This voltage represents the "start" pulse in the channel 148. A start pulse can occur in the channel 148 only at position 1 of the second half of a double-block operation and not at position 1 of the first half of a double-block operation since the information representing Y in the channel 150 starts only after position 1 of the first block.

The signals passing through the "and" network 1330 are introduced to the right input terminal of the flip-flop 390. These signals trigger the flip-flop such that a relatively high voltage is produced on the right output terminal of the flip-flop. The relatively high voltage on the right output terminal of the flip-flop 390 continues until another double-block operation is to be initiated. In this way, the relatively high voltage on the right output terminal of the flip-flop 390 indicates either a single-block operation or the second half of a double-block operation. Relatively high voltages are produced on the right output terminal of the flip-flop 390 in accordance with the logical equation:

$$\overline{g}_5=S_1P_1T \qquad (131)$$

where $\overline{g}_5$=the introduction of a triggering signal to the right input terminal of the flip-flop 390; and the other terms have previously been defined.

It has previously been described that certain special operations are performed at position 18 of a block undergoing a product operation. These operations are performed in order to make certain that the product operation is completed during the block. The operations are represented logically by Equations 123 and 124. As will be seen, the term $\overline{G}_5$ is included in each of Equations 123 and 124. For this reason, these operations cannot be performed at position 18 in the first half of a double-block operation. At position 18 of the first half of a double-block operation, the digital differential analyzer operates on a normal basis of combining $R_1$ and $X\Delta Y$ (or $U$) at this position to obtain $R_n$. Only at position 18 of the second half of the double-block operation does the logic represented by Equations 123 and 124 become effective to control the signal indications obtained at this position.

The "start" pulse in the channel 154 for a double-block operation occurs in the first block at a position before position 18. This pulse causes a relatively high voltage to be produced on the left output terminal of the flip-flop 736 in accordance with the logic expressed in Equation 109 discussed above. The relatively high voltage on the left output terminal of the flip-flop 736 continues during the remaining positions of the first block and through most of the positions in the second block. For this reason, a value of $R_n$ or $\overline{R}_n$ is obtained at position 18 of the first block in accordance with the logic expressed in Equations 116 and 117. This value is recorded in the channel 152 in accordance with the logic expressed above in Equations 125 and 126. It is only at position 18 of the second block in the double-block operation that the value of $R_1$ becomes effective. This value of $R_1$ is transferred to $R_n$ in accordance with the logic expressed in Equations 127 and 128 so as to be recorded in the channel 152.

In double-length products, a feedback operation is generally included as a step in obtaining the product. This feedback operation is in the nature of a servo function to maintain the information within particular limits. The feedback occurs in each cycle of computation from the error information obtained in the previous cycle of computation. The feedback is from the channel 138 to the channel 152 and occurs during the first half of the double-block operation. The feedback from the channel 138 to the channel 152 is positive when a negative overflow has occurred from the channel 152 to the channel 138 in the second half of the double-block operation. Similarly, the feedback from the channel 138 to the channel 152 is negative when a positive overflow has occurred from the channel 152 to the channel 138 in the previous cycle of computation. This is in accordance with well established servo principles.

The feedback information introduced to the channel 152 is obtained from overflow signals previously recorded in the channel 138. This overflow information is fed back through certain stages included in FIGURE 21, one of the stages being the "and" network 1084. This network passes the signals of high amplitude on the right output terminal of the flip-flop 292 to represent an overflow of "0" in the channel 138. The "and" network 1084 passes the information from the flip-flop 292 only in the first half of a double-block operation because of its connection to the left output terminal of the flip-flop 390. The "and" network 1084 passes the signals from the flip-flop 292 only at position 12 of the particular blocks controlled by the flip-flop 390. The choice of position 12 is arbitrary since the passage of the signal through the "and" network 1084 can occur at any time before position 17. This will become more apparent from the subsequent discussion.

The signals from the "and" network 1084 pass through the "or" network 1092 in FIGURE 21 to the "and" network 1094. The "and" network 1094 synchronizes the signals at optimum times in the clock cycles and introduces the signals to the left input terminal of the flip-flop 456. These signals trigger the flip-flop 456 for the production of a relatively high voltage on the left output terminal of the flip-flop. The flip-flop 456 receives the signals passing through the stages 1084, 1092 and 1094 in accordance with the logical equation:

$$f_2=\overline{Z}_4G_5P_{12}T \qquad (132)$$

where $f_2$=the introduction of a triggering signal to the left input terminal of the flip-flop 456;

$P_{12}$=a signal from the "and" network 1088; and the other terms have previously been defined.

The flip-flop 456 is triggered to its "off" condition at the end of a single-block operation or at the end of the second block in a double-block operation. This results from the introduction of signals from the "and" network 216 to the "and" network 1096 to prepare the "and" network 1096 for activation at position 18 for a block. The "and" network 1096 is able to pass signals only for single-block operations or for the second half of double-block operations because of the connection between the "and" network and the right output terminal of the flip-flop 390.

The signals passing through the "and" network 1096 are applied through the "or" network 1100 to the "and" network 1102. These signals are synchronized by the "and" network 1102 at optimum times in the clock cycles and are introduced to the right input terminal of the flip-flop 456. The signals trigger the flip-flop 456 to produce a relatively high voltage on the right output terminal of the flip-flop. A high voltage is produced on the right output terminal of the flip-flop 456 by the passage of signals through the stages 1096, 1100 and 1102 in accordance with the logical equation:

$$\overline{f}_2=\overline{G}_5P_{18}T \qquad (132a)$$

where $\overline{f}_2$=the introduction of a triggering signal to the right input terminal of the flip-flop 456; and the other terms have previously been defined.

Since the flip-flop 456 is triggered to its "off" condition at the end of each operation, as expressed by the logic in Equation 132*a*, it is not necessary to trigger the flip-flop upon the occurrence of an indication of "1" in the channel 138. For this reason, logic such as $$\overline{f}_2=Z_4\overline{G}_5P_{12}T$$

does not have to be included to trigger the flip-flop to its off condition in the first half of a special product operation. The logic such as $\overline{f}_2=\overline{Z}_4\overline{G}_5P_{12}T$ would correspond to that expressed in Equation 132. Because of this, the flip-flop 456 represents by the voltages on its output terminals the feedback information from the channel 138 to the channel 152 at a position before position 17 in the first half of a double-block operation.

Since the operation of the flip-flop 456 in the first half of a double-length product represents overflow information in the channel 138, this information can be considered as providing an increment in the differential combination R. The increment in the differential combination is added to the value of R to obtain a new value of R for the special product. Since only one increment from the channel 138 is being added to R for the special product operation in each cycle of computation, the addition of R and ΔR can be performed in a manner similar to that discussed above for the addition of Y and ΔY. The logic controlling the addition of Y and ΔY has been discussed above under "normal" integration and has been expressed logically in Equations 40, 41, 43 and 44. As has been described in detail previously, the term $B_3$ and $\overline{B}_3$ in Equations 40, 41, 43 and 44 represents a carry or lack of carry resulting from the addition of ΔY and Y.

Since the addition of R and ΔR is performed in a manner similar to the addition of Y and ΔY, a carry flip-flop must be included. The carry or lack of carry for the addition of R and ΔR is represented by the operation of the flip-flop 458 and certain associated stages shown in FIGURE 22. These stages include the "and" network 1118 in FIGURE 22. The "and" network 1118 passes a signal in the first half of a double-block operation because of its connection to the left output terminal of the flip-flop 390. The "and" network passes a signal only at position 16 for the block since it receives the signals from the "and" network 1122. The choice of position 16 is arbitrary since any position before position 17 for the block could have been chosen.

The signals from the "and" network 1118 pass through the "or" network 1124 to the "and" network 1126 for synchronization at optimum times in the clock cycles. The signals then pass to the left input terminal of the flip-flop 458. These signals trigger the flip-flop so as to produce a relatively high voltage on the left output terminal of the flip-flop. Relatively high voltages are produced on the left output terminal of the flip-flop 458 by the passage of signals through the stages 1118, 1124 and 1126 in accordance with the logical equation:

$$f_3 = G_5 P_{16} T \qquad (133)$$

where $f_3$=the introduction of a triggering signal to the left input terminal of the flip-flop 458; and the other terms have previously been defined.

The combination of R and ΔR is controlled by certain stages shown in FIGURE 12. These stages include the "and" networks 652 and 654, the "or" network 656 and the "and" network 657, all of which operate to pass signals to the cathode follower 659. The signals introduced to the cathode follower 659 represent indications of "1" for the different positions in the value of $\boldsymbol{R}$. The stages 652, 654, 656 and 657 operate in accordance with the logical equation:

$$\boldsymbol{R} = R\overline{F}_3 + \overline{R}F_3 \qquad (134)$$

where $\boldsymbol{R}$=a signal introduced to the cathode follower 659;
$F_3$=a relatively high voltage on the left output terminal of the flip-flop 458;
$\overline{F}_3$=a relatively high voltage on the right output terminal of the flip-flop 458; and the other terms have previously been defined.

As will be seen, the logic expressed in Equation 134 for $\boldsymbol{R}$ is similar to that expressed in Equations 40 and 43 for $\boldsymbol{y}$.

The "and" networks 640 and 642, the "or" network 636 and the "and" network 639 operate to pass signals to the cathode follower 637. These signals represent indications of "0" for the different positions in the value of $\boldsymbol{R}$ for a block. Signals pass to the cathode follower 637 through the stages 640, 642, 636 and 639 in accordance with the logical equation:

$$\overline{\boldsymbol{R}} = RF_3 + \overline{RF_3} \qquad (134a)$$

where $\overline{\boldsymbol{R}}$=the introduction of a signal to the cathode follower 637; and the other terms have previously been defined.

It will be seen that the logic expressed in Equation 134*a* is similar to that expressed in Equations 41 and 44.

When the flip-flop 458 becomes triggered to its true state at position 16, it remains in this state until the occurrence of particular patterns of information in the flip-flop 456 and the channel 138. These patterns of information are controlled by the operation of certain stages shown in FIGURE 22. These stages include the "and" networks 1156 and 1158 in FIGURE 22. The "and" network 1156 passes signals upon the simultaneous occurrence of relatively high voltages on the left output terminal of the flip-flop 456 and the right output terminal of the flip-flop 646, the latter flip-flop being triggered in accordance with the information in the channel 138. Similarly, the "and" network 1158 passes a signal when relatively high voltages are simultaneously produced on the right output terminal of the flip-flop 456 and the left output terminal of the flip-flop 646.

The signals from the "and" networks 1156 and 1158 pass through the "or" network 1154 to the "and" network 1150. The signals pass through the "and" network 1150 only upon the simultaneous introduction of a relatively high voltage from the "or" network 1152. The "or" network 1152 in turn passes a signal only when any one of several propositions is true. For example, a signal passes through the "or" network 1152 when a product operation is not being performed, as represented by a relatively high voltage on the left output terminal of the flip-flop 606. Similarly, a signal passes through the "or" network 1152 when a "special" product is not being performed, as represented by a relatively high voltage on the right output terminal of the flip-flop 924. A definition of "special" products will be made subsequently.

In like manner, signals pass through the "or" network 1152 at positions other than position 17 for a block because of the connection of the "or" network 1152 to the left output terminal of the flip-flop 170 and the right output terminal of the flip-flop 210. A signal also passes through the "or" network 1152 from the cathode follower 962 to indicate that particular conditions during a "special" product operation are not occurring. The reasons for the passage of the various signals through the "or" network 1152 will be discussed in detail hereinafter.

The signals from the "and" network 1150 pass through the "or" network 1140 to the "and" network 1142. The "and" network 1142 passes the signals only when a relatively high voltage has been produced on the left output terminal of the flip-flop 458 to indicate that a carry in the addition of R and ΔR is still being obtained. The signals passing through the "and" network 1142 are introduced to the right input terminal of the flip-flop 458 to trigger the flip-flop. When the flip-flop 458 is triggered, a relatively high voltage is produced on the right output terminal of the flip-flop. The signals passing to the flip-flop 458 under the control of the stages 1156, 1158, 1154, 1152, 1150, 1140 and 1142 can be logically expressed as:

$$\overline{f}_3 = F_3(A + \overline{C}_2' + J_1 + \overline{J}_5 + G_1)(R\overline{F}_2 + \overline{R}F_2)T \qquad (135)$$

where $A$=a signal from the cathode follower 962;
$\overline{C}_2'$=a relatively high voltage on the right output terminal of the flip-flop 924; and the other terms have previously been defined.

It will be seen from the above equation that the terms $R\overline{F}_2 + \overline{R}F_2$ are at least partly instrumental in turning off the carry flip-flop 458. These terms are similar to corresponding logic expressed in Equations 42 and 45 and controlling the triggering of the flip-flop 538 to its off condition.

In a double-block product, certain problems are involved in the operation of the flip-flop 432 (FIGURE 8), which indicates the carry resulting from the addition of $\boldsymbol{y}$ and $\boldsymbol{R}$ in the different positions. This results from the fact that the carry flip-flop 432 is normally operative only in positions 2 to 18, inclusive, of a block, as expressed logically in Equations 63 and 64 and discussed fully above. This would prevent the carry flip-flop 432 from operating at position 1 in the second half of a double-block operation. However, operation at this position is necessary since addition of $\boldsymbol{y}$ and $\boldsymbol{R}$ is occurring at position 1 in the second block of a double-length operation.

Operation of the carry flip-flop 432 at position 1 in the second block of a double-length product is obtained by the inclusion of certain stages shown in FIGURE 8. These stages include the "and" network 434. The "and" network 434 becomes prepared for activation at position 1 in the second half of a double-block operation since it is connected to the left output terminal of the flip-flop 390. As discussed fully above and expressed logically in Equation 131, the flip-flop 390 has a relatively high voltage on its left output terminal at this position since it is triggered to its false state at the end of the position.

When activated, the "and" network 434 passes a signal upon the simultaneous occurrence of signals from the cathode followers 436 and 659 respectively representing $y$ and $R$. The "and" network 434 passes a signal upon the simultaneous occurrence of $y$ and $R$ for the same reasons as discussed above and expressed logically in Equation 63. The signal from the "and" network 434 passes through the "or" network 440 to the "and" network 439 for synchronization at optimum times in the clock cycles. The signals then pass to the left input terminal of the flip-flop 432. The signals trigger the flip-flop 432 so as to produce a relatively high voltage on the left output terminal of the flip-flop. This high voltage is produced by the passage of signals through the stages 434, 440, and 439 in accordance with the logical equation:

$$a_3=yRG_5T \qquad (136)$$

where all of the terms have previously been defined.

The "and" network 460 becomes activated at the same time as the "and" network 434. However, the "and" network 460 passes signals upon the simultaneous occurrence of signals of high amplitude from the cathode followers 462 and 637. This is in accordance with the logic expressed above in Equation 64. The signals from the "and" network 460 pass through the "or" network 466 to the "and" network 467, which synchronizes the signals at optimum times in the clock cycles. The signals are then introduced to the flip-flop 432 to trigger the flip-flop for the production of a relatively high voltage on the right output terminal of the flip-flop. The flip-flop 432 is triggered by the passage of signals through the stages 460, 466 and 467 in accordance with the logical equation:

$$\overline{a_3}=yRG_5T \qquad (136a)$$

where all of the terms have previously been defined.

As described above, in double-product operations signals representing error increments are introduced to the first one of the two blocks at position 12 for the block. This is in accordance with the logic expressed in Equations 132 and 132*a*. In order to introduce such error signals, the error at the end of the two blocks must be recorded in the Z channel 138. This error is recorded by the operation of certain stages shown in FIGURE 8.

The stages for recording the error signals in the second half of a double-block operation include the "and" network 442 in FIGURE 8. The "and" network 442 passes a signal only upon the simultaneous introduction of high voltages from the right output terminal of the flip-flop 390 and the left output terminal of the flip-flop 450. This simultaneous combination of signals provides a coding to indicate the second half of a double-block operation.

When the "and" network 442 becomes prepared for activation, it passes a signal only at position 18 for a block because of its connection to the "and" network 216. Furthermore, signals are able to pass through the "and" network 442 only upon the simultaneous occurrence of a relatively high voltage on the right output terminal of the flip-flop 1388, which records information relating to $R$ in the channel 152 in accordance with the logic expressed above in Equations 61 and 62. A relatively high voltage on the right output terminal of the flip-flop 1388 at position 18 in the second half of a double-block operation indicates a positive value of $R$ for the operation.

The signals from the "and" network 442 pass through the "or" network 440 to the "and" network 439 for synchronization at optimum times in the clock cycles. The signals then pass to the left input terminal of the flip-flop 432 and trigger the flip-flop so as to produce a relatively high voltage on the left output terminal of the flip-flop. This causes a signal of high amplitude to be recorded in the channel 138 at position "1" of the following block, in accordance with the logic expressed in Equation 65. The flip-flop 432 becomes triggered by the passage of signals through the stages 442, 440 and 439 in accordance with the logical equation:

$$a_3={}_0\overline{R}Y\overline{G}_5P_{18}T \qquad (137)$$

where all of the terms have previously been defined.

The "and" network 468 also comes prepared for activation at position 18 in the second half of a double-block operation. This results from the fact that the "and" network 468 is connected to the "and" network 216, the right output terminal of the flip-flop 390 and the left output terminal of the flip-flop 450. When the "and" network 468 becomes prepared for activation, it passes the signals of high amplitude on the left output terminal of the flip-flop 1388. Such signals indicate a negative value for R in the double-block operation.

The signals from the "and" network 468 pass through the "or" network 466 to the "and" network 467. The "and" network 467 synchronizes the signals at optimum times in the clock cycles and introduces the signals to the right input terminal of the flip-flop 432. This causes the flip-flop 432 to be triggered into its false state of operation as represented by a relatively high voltage on the right output terminal of the flip-flop. The operation of the flip-flop 432 in its false state causes an indication of "0" to be recorded in the channel 138 at position 1 of the following block in accordance with the logic expressed in Equation 66. The flip-flop 432 receives the signals passing through the stages 468, 466 and 467 in accordance with the logical equation:

$$\overline{a}_3={}_0RY\overline{G}_5P_{18}T \qquad (138)$$

where all of the terms have previously been defined.

Since the proposition "Y$\overline{G}_5$" indicates the second half of a double-block operation, the Y channel 150 must be permanently coded with an indication of "1" at the proper positions. This is obtained by the operation of certain stages including the "and" network 1338 in FIGURE 26. The "and" network 1338 becomes prepared for activation only during the periods of actual computation, as represented by signals of high amplitude from the cathode follower 1340. The "and" network 1338 becomes further prepared for activation only at position 18 of a single-block operation or the second half of a double-block operation. This results from the connections made to the "and" network 1338 from the "and" network 216 and the right output terminal of the flip-flop 446. At such times, the "and" network 1338 passes the signals of high amplitude on the left output terminal of the flip-flop 450. Signals of high amplitude are produced on the left output terminal of the flip-flop 450 when indications of "1" are recorded in the channel 150. As a practical matter, the signals are initially coded into the channel 150 only at position 18 in the second half of a double-block operation and not at position 18 of a single-block operation.

The signals from the "and" network 1338 are introduced through the "or" network 1346 to the "and" network 1348 and are synchronized by the "and" network 1348 at optimum times in the clock cycles. The signals then pass to the left input terminal of the flip-flop 1332 and trigger the flip-flop into its true state, as represented by a relatively high voltage on the left output terminal of the flip-flop. This causes an indication of "1" to be recorded by the coil 1333 in the channel 150. Signals pass to the left input terminal of the flip-flop 1332 through the stages 1338, 1346 and 1348 in accordance with the logical equation:

$${}_0y=\alpha Y\overline{S}_1P_{18}T \qquad (139)$$

where all of the terms have previously been defined.

In this way, the coded indications of "1" in the channel 150 are recirculated in every cycle of computation.

The "and" network 1364 becomes prepared for activation at the same time as the "and" network 1338 and passes the signals of high amplitude on the right output terminal of the flip-flop 450. These signals pass through the "or" network 1366 and the "and" network 1368 to the right input terminal of the flip-flop 1332. The signals trigger the flip-flop 1332 into its false state such that an indication of "0" is recorded by the coil 1333 in the channel 150. Signals are introduced to the right input terminal of the flip-flop 1332 through the stages 1364, 1366 and 1368 in accordance with the logical equation:

$$_0\bar{y}=\alpha\overline{Y}\overline{S}_1P_{18}T \qquad (140)$$

where all of the terms have previously been defined.

DOUBLE-LENGTH SPECIAL PRODUCTS

In certain product operations involving two blocks, it may be desired to use the information in the channel 156 for some other purpose during the second block while the product operation is being performed. For example, it may be desired to use the information in the channel 156 during the second of the two blocks for a servo operation while the product operation is being performed during the presentation of the block for computation. Because of this, certain logic has been included to control the operation of these "special" products.

"Special" product operations are represented by a relatively high voltage on the left output terminal of the flip-flop 924. Such a voltage is produced by the operation of certain stages including the "and" network 970 shown in FIGURE 18. The "and" network 970 passes a signal only upon the occurrence of a particular coding represented by indications of "0" in the channels 140 and 142. This causes signals of high amplitude to be simultaneously introduced to the "and" network 970 from the right output terminals of the flip-flops 306 and 310. The "and" network 970 passes signals representing such a coding only at position 18 of a single-block operation or at position 18 of the second block in a double-block operation. This results from the introduction to the "and" network 970 of signals from the "and" network 216 and from the right output terminal of the flip-flop 390.

The signals from the "and" network 970 pass through the "or" network 978 to the "and" network 980 for synchronization at optimum times in the clock cycles. The signals then pass to the left input terminal of the flip-flop 924 and trigger the flip-flop so as to produce a relatively high voltage on the left output terminal of the flip-flop. Such a relatively high voltage is produced by the passage of signals through the stages 970, 978 and 980 in accordance with the logical equation:

$$c_2'=\overline{L}_1\overline{L}_2\overline{G}_5P_{18}T \qquad (141)$$

where $c_2'$=the introduction of a triggering signal to the left input terminal of the flip-flop 924; and the other terms have previously been defined.

The flip-flop 924 operates to distinguish "special" products from normal products of either a single length or double length. Because of this, normal product operations of a single length or double length are represented by a relatively high voltage on the right output terminal of the flip-flop 924. This voltage is produced for a particular coding in the channels 140 and 142, as represented by simultaneous indications of "1" in the channel 140 and "0" in the channel 142. These indications cause relatively high voltages to be simultaneously produced on the left output terminal of the flip-flop 306 and on the right output terminal of the flip-flop 310.

Signals pass through the "and" network 988 in FIGURE 18 when relatively high voltages are simultaneously produced on the left output terminal of the flip-flop 306 and the right output terminal of the flip-flop 310. Signals are able to pass through the "and" network 988 only upon the completion of a previous operation, as represented by signals from the "and" network 216 and the right output terminal of the flip-flop 390.

The signals from the "and" network 988 are introduced through the "or" network 992 to the "and" network 994. The signals are synchronized by the "and" network 994 at optimum times in the clock cycles and are then introduced to the right input terminal of the flip-flop 924 to trigger the flip-flop. This causes a relatively high voltage to be produced on the right output terminal of the flip-flop 924. The logical equation controlling the passage of signals to the flip-flop 924 through the stages 988, 992 and 994 can be expressed as:

$$\bar{c}_2'=L_1\overline{L}_2\overline{G}_5P_{18}T \qquad (141a)$$

where $\bar{c}_2'$=the introduction of a triggering signal to the right input terminal of the flip-flop 924; and the other terms have previously been defined.

Because of the fact that the channel 156 is available only during the first half of a "special" product, indications representing the XΔY increment (or *U*) for the special product must be dummied into the second half of the double-block operation. For example, it might be considered that all of the positions in the second half of a special-product double-block operation would have indications of "0" for a positive XΔY increment. Similarly, it might be considered that all of the positions in the second half of a special-product double-block operation would have indications of "1" when the XΔY increment is negative.

Since all of the indications in the second half of a double-block operation are all "0" or all "1," the combination of the XΔY increment with $R_1$ would proceed in a manner similar to the combination of a ΔY increment with Y or a ΔR increment with R. This will become more apparent subsequently. The main difficulty would occur at position 18 of the first half of the double-block operation. Furthermore, indications in the channel 156 are available only during the first block. For these reasons, it would be desirable to make a determination before the end of the first block as to the output at position 18 of the first block. In order to obtain such a determination, the effect of the various indications at position 18 would have to be anticipated. This anticipation occurs at the end of position 17 so that the computation can actually be made at position 18.

In FIGURE 37, a table is shown for anticipating at position 17 the effects of various indications at position 18. These indications represent the various increments which can be made in the value of $R_1$ at position 18 to obtain a value of $R_n$. One of the quantities is the overflow indication in the channel 138, which controls the operation of the flip-flop 456 in accordance with the logic expressed in Equation 132 and in the discussion following Equation 132. An indication of "0" in the channel 138 represents a negative overflow equivalent on a binary basis to a value of −1. An indication of "1" represents a positive overflow in the channel 138 equivalent on a binary basis to a value of +1.

In the second column of the chart shown in FIGURE 37, possible values for the XΔY increment (designated as "*U*") at position 18 are shown. An indication of "0" in a position would actually represent a binary value of "0" at the position. An indication of "1" would represent a value of −1 in the position. Since a representation of the XΔY increment at position 18 is being made at position 17, the indications in the second column of the table shown in FIGURE 37 should be weighted. Because of the fact that the indications in position 18 are twice as important on a binary scale as the indications in position 17, an indication of "1" at position 17 should have a value of −2 if it is to represent the value at position 18. An indication of "0" at position 17 still has a value of "0" even though it represents position 18 since multiplying a value of "0" by any number still gives "0" as the product.

The third column in the table shown in FIGURE 37 represents the possible carry from position 17 to position 18. An indication of "0" represents a lack of carry equivalent to a value of "0." An indication of "1" in the third column represents a carry. Since the carry is from one position to the position of next highest significance, it has a value of +2 at the position of next highest significance.

As will be seen in the table shown in FIGURE 37, all possible combinations in the indications representing the overflow pulse (Z), the XΔY increment (U) and the carry (D) resulting from the addition of $R_1$ and U are included. The fourth column indicates the cumulative value in the increment of R at position 18. This is represented in the table shown in FIGURE 37 by the designation Σ*d*R. The value of Σ*d*R is indicated in decimal form in column 4 of FIGURE 37. It represents the decimal quantity which must be added to $R_1$ at position 18 to obtain $R_n$. Each value of Σ*d*R in the fourth column of the table shown in FIGURE 37 is obtained by adding the decimal values of the quantities in the first three columns of the table.

As will be seen from the table shown in FIGURE 37, in almost all instances the sign of Σ*dR* shown in the fourth column is similar to that representing the sign of the decimal value represented by the *d*Z pulse shown in column 1. There are two exceptions designated by "E" after the value in the fourth column of the table. In the first of these exceptions, the sign of Σ*dR* is positive but the sign of *d*Z is negative. In the second exception, the sign of Σ*dR* is negative and the sign of *d*Z is positive. There are also two other special situations which are included in the fourth column of the table shown in FIGURE 37.

These are represented by decimal values of −3 or +3 for Σ*dR*.

A second table is shown in FIGURE 38. This table indicates different possible combinations of $R_1$, XΔY(U) and the carry D at position 17. A carry is indicated in the third column to represent the carry at position 17 from position 16. This carry is added to the value of $R_1$ in the second column and of XΔY (designated as "*U*") in the first column. The values of $R_1$ and U are those which occur at position 17 of the block undergoing computation. The binary carry or lack of carry resulting from the addition of the quantities in the first three columns is indicated in the fourth column. The indications in the fourth column represent the carry or lack of carry from position 17 to position 18.

The channel 156 is not used in the second block of a special product operation. For this reason, indications of "1" are dummied into every position of the second block as well as the last position of the first block or, as an alternative, indications of "0" are dummied into each position. This causes the indication of XΔY (designated as "U") at position 17 to be the same as the indication of XΔY at position 18. Because of this, the indication in the second column of the table shown in FIGURE 37 is the same at any instant as the indication in the first column of the table shown in FIGURE 38. The third column of the table shown in FIGURE 37 is the same as the fourth column of the table shown in FIGURE 38 since they both represent the carry from position 17 to position 18.

The first exception in the table shown in FIGURE 37 is represented by an indication of "0" for U at position 17 and an indication of "1" for the carry D from position 17 to position 18. The only possibility for this occurrence in the table shown in FIGURE 38 is that represented in the fourth horizontal row. In the fourth horizontal row, the carry in the fourth column can be expressed as:

$$P_{18}D=UR_1DP_{17}$$

Furthermore, the first exception in the table shown in FIGURE 37 can be expressed as $\overline{F_2}\overline{U}P_{18}D$, where $F_2$ indicates a negative polarity for the *d*Z increment. The expression $\overline{F_2}\overline{U}P_{18}D$ is obtained from the representation of the quantities in the second horizontal row of the table shown in FIGURE 37. Substituting the value for $P_{18}D$ obtained from the table shown in FIGURE 38 in the expression $\overline{F_2}\overline{U}P_{18}D$, the expression $F_2UR_1DP_{17}$ is obtained. Since a positive increment in Σ*dR* results from this exception as expressed in the fourth vertical column of the table shown in FIGURE 37, the flip-flop 456 representing Σ*dR* should be triggered to its true state.

The flip-flop 456 is triggered to its true state for the exception discussed in the previous paragraph in accordance with the operation of certain stages shown in FIGURE 21. These stages include the "and" network 1086 in FIGURE 21. The "and" network 1086 passes a signal only upon the simultaneous occurrence of signals representing $D\overline{UR_1}P_{17}$. This results from the connection between the "and" network 1086 and the cathode followers 437 and 713, the "and" network 208 and the left output terminal of the flip-flop 604. Signals are able to pass through the "and" network 1086 only upon the occurrence of the first half of a double-block operation as represented by a relatively high voltage on the left output terminal of the flip-flop 390. Signals are able to pass through the "and" network 1086 only during a special product operation because of the introduction to the "and" network of signals from the right output terminal of the flip-flop 606 and the left output terminal of the flip-flop 924.

The signals from the "and" network 1086 pass through the "or" network 1092 to the "and" network 1094. These signals are synchronized at optimum times in the clock cycles by the "and" network 1095 and are introduced to the left input terminal of the flip-flop 456. The signals trigger the flip-flop 456 so as to produce a relatively high voltage on the left output terminal of the flip-flop. The flip-flop 456 is triggered to its true condition by the passage of signals through the stages 1086, 1092 and 1094 in accordance with the logical equation:

$$f_2=D\overline{U}R_1C_2'\overline{G}_1G_5P_{17}T \qquad (142)$$

where all of the terms have previously been defined.

The second exception designated as ("E") in the fourth column of the table shown in FIGURE 37 is illustrated in the seventh horizontal row of the table. This exception can be represented from the table shown in FIGURE 37 as $F_2U\overline{D}P_{18}$. As will be seen in the table shown in FIGURE 38, only one possible combination will produce a simultaneous occurrence of $U\overline{D}P_{18}$. This occurs in the fifth horizontal row of the table shown in FIGURE 38. As will be seen, the fifth horizontal row of the table shown in FIGURE 38 can be represented as $$\overline{D}P_{18}=U\overline{R}_1\overline{D}P_{17}$$

Substituting the expression obtained from the table shown in FIGURE 38 in the expression obtained from the table shown in FIGURE 37, the latter expression can be represented as $$F_2U\overline{R}_1\overline{D}P_{17}$$

Since the resultant increment in *R* for such a simultaneous occurrence has a negative polarity as indicated in the seventh horizontal row of the table shown in FIGURE 37, the flip-flop 456 should be triggered to its false condition to represent a negative increment.

The flip-flop 456 is triggered to its false condition for the exception discussed in the previous paragraph by the passage of signals through the "and" network 1098, the "or" network 1100 and the "and" network 1102 shown in FIGURE 21. The "and" network 1098 passes signals only upon the simultaneous occurrence of $U\overline{R}_1\overline{D}P_{17}$. Such a simultaneous occurrence is indicated by signals of high amplitude from the "and" network 208, the cathode followers 464 and 705 and the right output terminal of the flip-flop 604. The "and" network 1098 passes the signals only in the first block of a special-product, double-block operation. This is represented by the simultaneous occurrence of relatively high voltages on the left output terminals of the flip-flops 390 and 924 and the right output terminal of the flip-flop 606.

The signals from the "and" network 1098 are introduced through the "or" network 1100 to the "and" network 1102 for synchronization at optimum times in the clock cycles. The signals then pass to the right input terminal of the flip-flop 456. The signals trigger the flip-flop 456 and cause a relatively high voltage to be produced on the right output terminal of the flip-flop. Signals pass to the right input terminal in the flip-flop 456 through the stages 1098, 1100, 1102 in accordance with the logical equation:

$$\bar{f}_2=\bar{D}U\bar{R}_1\dot{C}_2'\bar{G}_1G_5P_{17}T \qquad (143)$$

where all of the terms have previously been defined.

In the previous paragraphs, two exceptions have been developed from the tables shown in FIGURES 37 and 38. These exceptions occur when the $\Sigma dR$ increment does not have the same polarity as the $dZ$ increment represented by overflows in the channel 138. The exceptions have been represented on a logical basis as $$D\bar{U}R_1+\bar{D}U\bar{R}_1$$

For reasons which will become more apparent subsequently, it is desirable to control the operation of cathode followers in accordance with the occurrence or lack of occurrence of these exceptions. The cathode followers 962 and 964 have been included in the digital differential analyzer for this purpose. Their operation is controlled by certain stages shown in FIGURE 18.

The "and" networks 1014 and 1016 shown in FIGURE 18 control in part the operation of the cathode follower 964. The "and" network 1014 receives signals from the cathode followers 437 and 713 and from the left output terminal of the flip-flop 604 so as to pass a signal upon the occurrence of one of the exceptions discussed in the previous paragraph. The "and" network 1016 passes signals upon the occurrence of the other exception because of its connection to the cathode followers 464 and 705 and the right output terminal of the flip-flop 604. The signals from the "and" networks 1014 and 1016 pass through the "or" network 1012 to the cathode follower 964. In this way, the stages 1014, 1016, and 1012 pass signals to the cathode follower 964 in accordance with the logical equation:

$$\bar{A}=(D\bar{U}R_1+\bar{D}U\bar{R}_1)T \qquad (144)$$

where $\bar{A}$=the introduction of a signal to the cathode follower 964; and, the other terms have previously been defined.

Just as the cathode follower 964 produces signals representing the occurrence of the two exceptions discussed above, the cathode follower 962 produces signals representing any occurrence other than the two exceptions. The cathode follower 962 produces such signals by the operation, at least in part, of the "or" networks 1002 and 1008 in FIGURE 18. The "or" network 1002 passes a signal when relatively high voltages are introduced from either of the cathode followers 464 or 705 or from the right output terminal of the flip-flop 604. Similarly, a signal passes through the "or" network 1008 upon the occurrence of a signal of high amplitude in either of the cathode followers 437 or 713 or one the left output terminal of the flip-flop 604.

The signals from the "or" networks 1002 and 1008 are introduced to the "and" network 1010 in FIGURE 18. The "and" network 1010 passes the signals only at position 17 for a block because of the connection between the "and" network 1010 and the "and" network 208. The "and" network 1010 passes the signals from the "or" networks 1002 and 1008 only at position 17 for a block, since this is the only time at which the two exceptions discussed above and represented logically in Equation 144 can occur. The signals passing through the "and" network 1010 are in turn introduced to the cathode follower 962. Signals are introduced to the cathode follower 962 through the stages 1002, 1008 and 1010 in accordance with the logical equation:

$$A=P_{17}T(D+\bar{U}+R_1)(\bar{D}+U+\bar{R}_1) \qquad (145)$$

where $A$=a signal introduced to the cathode follower 962; and the other terms have previously been defined. As will be seen, the term $(D+\bar{U}+R_1)$ in Equation 145 is true at any time when $\bar{D}U\bar{R}_1$ is not true. This is in accordance with well established principles of Boolean algebra. Similarly, the term $(\bar{D}+U+\bar{R})$ is true at any time when the exception represented by $D\bar{U}R_1$ is not true.

It has been discussed above that two exceptions occur at position 17 for a special product operation. These exceptions occur where the sign of $\Sigma dR$ cannot be represented by the sign of the $dZ$ increment. Two special situations also exist. These are illustrated in the table shown in FIGURE 37. The special situations occur when $\Sigma dR$ has decimal values of either +3 or −3. The special situations occur because of the difficulty in adding decimal values of ±3 in a single position such as position 18. Actually, values of ±3 would have to be added on a binary basis in two positions, such as positions 18 and 19, where position 18 would indicate a binary value of 1 and position 19 would indicate a value of 2. Position 19 would actually be position 1 of the following block.

As will be seen in the table shown in FIGURE 37, a value of $\Sigma dR$=−3 is obtained when $U$ as shown in vertical column 2 has a binary indication of "1" and the carry from position 17 to position 18 as shown in column 3 has a binary indication of "0." These indications correspond to the second exception shown in FIGURE 37 and designated by an "(E)" in the fourth vertical column of the figure. For this reason, the special situation where $\Sigma dR$=−3 can be represented logically as $\bar{D}U\bar{R}_1P_{17}$. This logic was developed above for the second exception shown in the table constituting FIGURE 37.

In like manner, a second special situation is included in the table shown in FIGURE 37. This special situation is represented by the sixth horizontal row in the table and is designated as "special" since the value of $$\Sigma dR=+3$$

For this special situation, the binary indication of $U$ at position 17 is "0" and the carry indication from position 17 to position 18 is "1." As will be seen, these indications correspond to the indications of $U$ and the carry D for the first exception designated as "(E)" in the fourth column of the table shown in FIGURE 37. Since the second special situation corresponds to the first exception in the values of $U$ and the carry D, the second special situation can be logically expressed as:

$$\bar{U}R_1DP_{17}$$

This logical representation was developed above for the first exception included in the table shown in FIGURE 37.

In order to add decimal values of +3 or −3 before the end of the first block in a special product operation, certain controls over the operation of the carry flip-flop 457 must be exercised. These controls can be seen by adding the combinations of $\Sigma dR$=+3 with all of the possible values of R. The logic controlling the operation of the carry flip-flop 458 will be developed from these examples. It will subsequently be shown how the same logic controls the addition of $\Sigma dR$=−3 to all of the possible values of R.

A decimal value of $\Sigma dR=+3$ can be represented by indications of "1" at the two positions of least significance and indications of "0" in all of the following positions. Since the indications representing $\Sigma d$R are initially added at position 17, the two positions of least significance can be considered as positions 17 and 18. The following examples illustrate the addition of a binary quantity representing $\Sigma dR=+3$ to all of the possible binary quantities representing different values of R:

```
            Position 17
                 ↙
R     0 0 0 0
ΣdR   0 0 1 1
      -------
      0 0 1 1
←-----
      0 0 0 1
      0 0 1 1
      -------
      0 1 0 0

      0 0 1 0
      0 0 1 1
      -------
      0 1 0 1

      0 0 1 1
      0 0 1 1
      -------
      0 1 1 0

      0 1 0 0
      0 0 1 1
      -------
      0 1 1 1

      0 1 0 1
      0 0 1 1
      -------
      1 0 0 0

      0 1 1 0
      0 0 1 1
      -------
      1 0 0 1

      0 1 1 1
      0 0 1 1
      -------
      1 0 1 0
```

Certain basic rules of complementation can be developed from the above examples. For example, it will be seen that the indications representing $R$ at position 17 are complemented for every possible value of $R$. Thus, an indication of "1" for $R$ at position 17 is complemented to an indication of "0" and an indication of "0" for $R$ at position 17 is complemented to an indication of "1." In each of the examples where $R$ has an indication of "0" at position 17, the complementation in the indication of R continues at position 18. The complementation continues at such instances whether R has an indication of "1" or an indication of "0" at position 18. However, when R has an indication of "1" at position 17, no complementation occurs at position 18. No complementation occurs in such instances whether R has an indication of "1" or an indication of "0" at position 18.

In the instances where complementation occurs at position 18, complementation continues into position 19 (or in other words, position 1 of the following block) if the indication of R at position 18 is "1." The complementation continues in subsequent positions until after the first indication of "0" has been presented for R in one of the subsequent positions. If complementation has been provided at position 18 but the indication of R at position 18 is "0," complementation is not provided at position 19 (position 1 of the next block) or in any of the subsequent positions.

It has been described above that the indication of R at position 18 is not complemented if R has an indication of "1" at position 17. In any case where complementation is not provided at position 18 it is resumed at position 19 (position 1 of the next block). This may be seen from the above examples. The complementation then continues until after the first indication of "0" for R is presented in one of the subsequent positions.

The logic controlling the operation of the flip-flop 458 can be developed in accordance with the above discussion. For example, the carry flip-flop 458 in FIGURE 22 is initially triggered to its true condition at position 16 in accordance with the logic expressed in Equation 133. Complementation then occurs in position 17 whether the indication of R at this position is "1" or "0." Complementation continues in position 18 when R has an indication of "0" at position 17. The complementation continues until after the first indication of "0" has been presented in one of the positions for R after position 18. This subsequent triggering of the flip-flop 458 to its off condition is controlled by the operation of certain stages shown in FIGURE 22 and including the "or" network 1152.

The "or" network 1152 in FIGURE 22 can pass a signal for any position except position 17. This results from the introduction to the "or" network 1152 of the signals on the left output terminal of the flip-flop 170 and the right output terminal of the flip-flop 210. The "or" network passes such a signal at any position other than position 17 for any type of operation including a special-product operation. The "or" network 1152 is able to pass a signal even for position 17 when the operation is not a product operation, as represented by a relatively high voltage on the left output terminal of the flip-flop 606. Even if the operation should be a product operation, the "or" network is able to pass a signal at any position including position 17 provided that the operation is not a special product. This results from the connection between the "or" network 1152 and the right output terminal of the flip-flop 924. Furthermore, even with a special-product operation, the "or" network 1152 is able to pass a signal at any position including position 17 provided that a signal is introduced from the cathode follower 962 to indicate that none of the special situations at position 17 is occurring. In this way, the "or" network 1152 passes a signal at any time other than when a special situation occurs at position 17 of a special product operation.

The signals from the "or" network 1152 are introduced to the "and" network 1150 to control the times at which signals pass through the "and" network 1150 from the "or" network 1154. The "or" network 1154 in turn serves as an electrical conduit for signals from the "and" networks 1156 and 1158. The "and" network 1156 becomes prepared for activation when a relatively high voltage is produced on the left output terminal of the flip-flop 456 to indicate a positive polarity for the increments in R. When this voltage occurs, a signal is able to pass through the "and" network 1156 only upon the occurrence of an indication of "0" for R as represented by a relatively high voltage on the right output terminal of the flip-flop 646.

The signals passing through the "and" network 1150 are introduced through the "or" network 1140 to the "and" network 1142. The "and" network 1142 passes the signals only when a relatively high voltage is introduced from the left output terminal of the flip-flop 458 as previously described. When this occurs, signals pass through the "and" network 1142 to the right input terminal of the flip-flop 458 to trigger the flip-flop for the production of a relatively high voltage on the right output terminal of the flip-flop. The flip-flop 458 receives the signals passing to it under the control of the stages 1150, 1152, 1154, 1156, 1140 and 1142 in accordance with the logical equation:

$$f_3=(A+\bar{C}_2'+J_1+\bar{J}_5+G_1)\bar{R}F_2T \qquad (146)$$

where all of the terms have previously been defined.

It may be seen that this equation is included in Equation 135 previously described. In this way, the flip-flop 458 is returned to its false state at any position except position 17 and at position 17 when neither of the special situations represented by Equation 144 exists.

As described above, no complementation occurs at position 18 for a special situation when R has an indication of "1" at position 17 of a special product and the cumulative value of $\Sigma dR=+3$. Complementation is prevented at position 18 by triggering the flip-flop 458 to its false state at the end of position 17. This is accomplished by certain stages including the "and" network 1148 shown in FIGURE 22. The "and" network 1148 passes a signal only upon the simultaneous occurrence of indications of "1" for R and $d$R. These occurrences are respectively represented by relatively high voltages on the left output terminals of the flip-flops 646 and 456. As previously described and expressed logically in Equation 142, a relatively high voltage is produced on the left output terminal of the flip-flop 456 at position 17 to indicate the special situation in which $\Sigma dR$ has a decimal value of $+3$.

The signals passing through the "and" network 1148 are introduced through the "or" network 1144 to the "and" network 1143. The "and" network 1143 passes these signals only at position 17 of a special product, as represented by signals of high amplitude from the "and" network 208, the left output terminal of the flip-flop 924 and the right output terminal of the flip-flop 606. The signals are able to pass through the "and" network 1143 only upon the occurrence of a special situation since the "and" network is connected to the cathode follower 964. These special situations are expressed logically in Equation 144.

The signals from the "and" network 1143 pass through the "or" network 1140 to the "and" network 1142. The "and" network 1142 in turn passes the signals only upon the occurrence of a relatively high voltage on the left output terminal of the flip-flop 458. The signals passing through the "and" network 1142 are applied to the right input terminal of the flip-flop 458. These signals trigger the flip-flop for the production of a relatively high voltage on the right output terminal of the flip-flop. The flip-flop 458 produces relatively high voltages on its right output terminal by the passage of triggering signals through the stages 1148, 1144, 1143, 1140 and 1142 in accordance with the logical equation:

$$f_3=F_3\bar{\alpha}C_2'\bar{G}_1P_{17}RF_2T \qquad (147)$$

where all of the terms have previously been defined.

The carry flip-flop 458 is triggered back to its true state at position 18 if it was previously triggered off at position 17. This may be seen from the examples given above and from the above discussion. The carry flip-flop is triggered back on at position 18 by the passage of a signal through the "and" network 1120 in FIGURE 22. The "and" network 1120 can pass a signal only at position 18 because of its connection to the "and" network 216. The "and" network 1120 can pass a signal at position 18 only in the first block of a special-product operation. This results from the fact that the "and" network 1120 is connected to the left output terminals of the flip-flops 390 and 924 and the right output terminal of the flip-flop 606. The "and" network 1120 can further pass a signal only upon a previous triggering of the flip-flop 458 to its off condition. A signal is able to pass through the "and" network 1120 only at this time because of the connection between the "and" network and the right output terminal of the flip-flop 458.

The signals from the "and" network 1120 are introduced through the "or" network 1124 to the "and" network 1126 for synchronization at optimum times in the clock cycles. The signals then pass to the left input terminal of the flip flop 458. The signals trigger the flip-flop 458 so as to produce a relatively high voltage on the left output terminal of the flip-flop. The flip-flop 458 is triggered by the signals passing through the stages 1120, 1124 and 1126 in accordance with the logical equation:

$$f_3=C_2'\bar{F}_3\bar{G}_1G_5P_{18}T \qquad (148)$$

where all of the terms have previously been defined.

If the carry flip-flop 458 is triggered to its false state at the end of position 17 in accordance with the logic expressed in Equation 147, it remains in its true state at position 18. For this reason, the logic expressed in Equation 146 would have no effect. If the logic expressed in Equation 146 has no effect, the carry flip-flop 458 is again triggered to its off condition after the first indication of "0" for R after position 18. The flip-flop 458 is triggered to its off condition at this time in accordance with the logic expressed in Equation 146 and discussed fully above.

The above discussion has related to the special situation occurring from the combination of R and $\Sigma dR=+3$. Another special situation arises when the indications of R are combined with the indications of $\Sigma dR=-3$. The indications of $\Sigma dR=-3$ are obtained by inverting the binary indications of $\Sigma dR=+3$ and adding an indication of "1" to the least significant digit. This is in accordance with well established principles of logical algebra. By this system, binary indications of 1101 are obtained to represent $\Sigma dR=-3$, where the least significant digit is at the right.

The various possible combinations on a binary basis of R and $\Sigma dR=-3$ are as follows:

| | |
|---|---|
| 0000 | R |
| 1101 | $\Sigma d$R |
| 1101 | |
| 0001 | R |
| 1101 | $\Sigma d$R |
| 1110 | |
| 0010 | R |
| 1101 | $\Sigma d$R |
| 1111 | |
| 0011 | R |
| 1101 | $\Sigma d$R |
| 0000 | |
| 0100 | R |
| 1101 | $\Sigma d$R |
| 0001 | |
| 0101 | R |
| 1101 | $\Sigma d$R |
| 0010 | |
| 0110 | R |
| 1101 | $\Sigma d$R |
| 0011 | |
| 0111 | R |
| 1101 | $\Sigma d$R |
| 0100 | |

As will be seen from the above examples, the indications of $R$ at position 17 are inverted whether the indications are "0" or "1" at this position. The indications of R are further complemented at position 18 if R has an indication of "1" at position 17. The complementation continues until after the first indication of "1" has been presented for R in a position after position 17.

When the indication of R is "0" at position 17, no complementation is provided for R at position 18. No complementation is provided for R at position 18 whether the indication of R is "1" or "0" at this position. However, complementation is started again at position 19 (position 1 of the following block) when it is stopped at position 18. The complementation continues in the subsequent positions until after the first indication of "1" has been presented in one of the subsequent positions after position 18.

As previously disclosed, the flip-flop 458 is triggered to its true state at position 16 in accordance with the logic expressed in Equation 133. Since the flip-flop 458 is triggered to its true state at this position, it remains in its true state at position 17. Because of this, complementation of R occurs at position 17 when $\Sigma dR=-3$, since complementation is able to occur only when the flip-flop 458 is operating in its true state. The complementation occurs at position 17 whether R has an indication of "1" or an indication of "0" at this position. If an indication of "1" has been presented for R at position 17, complementation continues in the subsequent positions until after the first indication of "1" has been presented for R in one of the subsequent positions.

The "and" network 1158 passes a signal upon indications of "1" or R when the polarity of $\Sigma dR$ is negative. This results from the fact that the "and" network 1158 is connected to the left output terminal of the flip-flop 646 and the right output terminal of the flip-flop 456. The signals from the "and" network 1158 pass through the "or" network 1154 to the "and" network 1150. The "and" network 1150 is able to pass these signals at any time except when a special situation occurs at position 17 for a special product operation. The "and" network 1150 becomes prepared for operation at such times because of the operation of the "or" network 1152 as discussed fully above.

The signals from the "and" network 1150 pass through the "or" network 1140 and the "and" network 1142 and trigger the flip-flop 458 to its false state of operation. When the flip-flop 458 becomes triggered to its false state of operation, the indications of R become the indications of $\mathcal{R}$ without change. This is in accordance with the logic expressed in Equations 134 and 134*a* and discussed fully above. The flip-flop 458 becomes triggered to its false state by the passage of signals through the stages 1152, 1158, 1154, 1150, 1140 and 1142 in accordance with the logical equation as previously expressed in Equation 135.

$$\bar{f}_3=F_3(A+\bar{C}_2'+J_1+\bar{J}_5+G_1)R\bar{F}_2T \qquad (149)$$

where all of the terms have previously been defined.

At position 18, complementation does not occur if the indication for R at position 17 is "0" and if $\Sigma dR=-3$. Since the flip-flop 456 reflects by its operation the polarity of $\Sigma dR$ except under the two situations designated as "(E)" in the table shown in FIGURE 37, the flip-flop has a relatively high voltage on its right output terminal when $\Sigma dR=-3$. For this reason, complementation does not occur at position 18 when the proposition $\overline{RF_2}$ is true at position 17.

Because of its connections to the flip-flops 646 and 456, the "and" network 1146 in FIGURE 22 passes a signal when the proposition $\overline{RF_2}$ is true. This signal passes through the "or" network 1144 to the "and" network 1143. The "and" network 1143 passes the signal only at position 17 of a special product and only when a special situation as represented by a signal from the cathode follower 964 occurs at this time. Upon passing through the "and" network 1143, the signal passes through the "or" network 1140 and the "and" network 1142 provided that a relatively high voltage is produced on the left output terminal of the flip-flop 458 at this time. The signal then triggers the flip-flop 458 for the production of a relatively high voltage on the right output terminal of the flip-flop. This voltage is produced under the control of the stages 1146, 1144, 1143, 1140 and 1142 in accordance with the logical equation:

$$\bar{f}_3=F_3\tilde{\alpha}C_2'\bar{G}_1P_{17}\overline{R}F_2T \qquad (150)$$

where all of the terms have previously been defined.

When the flip-flop 458 is triggered off at position 17 for the addition of R and $\Sigma dR=-3$ in a special product, it is triggered back to its true state at position 18. This is in accordance with the above discussion. The flip-flop 458 is triggered on again in accordance with the logic expressed above in Equation 148. As expressed in this logic, the flip-flop 458 is triggered to its true state at position 18 of the first block in a special product. The flip-flop 458 is triggered to its true state in accordance with the passage of signals through the stages 1120, 1124, and 1126.

After position 18, the operation of the flip-flop 458 is controlled in a normal manner. Because of this, the flip-flop 458 is triggered to its false state at the position after the first indication of "1" for R appearing in one of the subsequent positions provided that the value of $d$R is negative as represented by a relatively high voltage on the right output terminal of the flip-flop 456. This is in accordance with the logic expressed in Equation 149 and discussed above. As discussed above, this logic corresponds to logic expressed in Equations 42 and 45 and discussed in detail.

It will be appreciated from the above discussion that all of the important operations in a special product are concentrated in the first of the two blocks used in the operation. The operation in the second block is somewhat routine. Furthermore, the special operations are completed at position 17 of the first block except where $\Sigma dR=\pm 3$. Because of this, the flip-flop 924 can be triggered to its false state at position 17, except where $\Sigma dR=\pm 3$. As previously described, the flip-flop 924 is coded to represent a special product operation in its true state.

Certain stages shown in FIGURE 18 control the triggering of the flip-flop 924 to its false state at position 17 of a special product. Four of these stages are the "or" networks 1002 and 998 and the "or" networks 1008 and 1000. Signals pass through the "or" networks 1002 and 998 when $\Sigma dR$ is not $+3$ and signals pass through the "or" networks 1008 and 1000 when $\Sigma dR$ is not $-3$. These signals are introduced to the "and" network 996, which passes a signal only when signals are introduced to it from both of the "or" networks 998 and 1000. The signals from the "or" networks 998 and 1000 are able to pass through the "and" network 996 only at position 17 of a product operation, as represented by signals from the "and" network 208 and the right output terminal of the flip-flop 606.

The signals from the "and" network 996 pass through the "or" network 992 to the "and" network 994. These signals are synchronized by the "and" network 994 at optimum times in the clock cycles and are introduced to the right input terminal of the flip-flop 924. The signals trigger the flip-flop 924 for the production of a relatively high voltage on the right output terminal of the flip-flop. This voltage indicates a routine operation in the subsequent positions of the special product. A relatively high voltage is produced on the right output terminal of the flip-flop 924 by the passage of signals through the stages 1002, 998, 1008, 1000, 996, 992 and 994 in accordance with the logical equation:

$$c_2'=\bar{G}_1P_{17}T(\bar{D}+F_2+U+\bar{\mathcal{R}}_1)(D+F_2+\bar{U}+\mathcal{R}_1) \qquad (151)$$

where all of the terms have previously been defined.

Since the channel 156 is not being used in the second half of a special product operation, the "start" flip-flop 736 associated with the channel does not have to remain on during this time. For this reason, the flip-flop 736 is triggered off at position 17 of a special product. This is accomplished by the passage of a signal through the "and" network 852 in FIGURE 15. The "and" network 852 passes a signal at position 17 of a special product because of its connections to the "and" network 208 and the left output terminal of the flip-flop 924.

The signals from the "and" network 852 pass through the "or" network 848 to the "and" network 846 for synchronization at optimum times in the clock cycles. The signals then pass to the right input terminal of the flip-flop 736 and trigger the flip-flop so as to produce a relatively high voltage on the right output terminal of the flip-flop. The flip-flop 736 receives the signals passing through the stages 852, 848 and 846 in accordance with the logical equation:

$$\bar{s}_2=C_2'P_{17}T \qquad (152)$$

where all of the terms have previously been defined.

EXTRAPOLATION

It has previously been described that each block receives $\Delta y$ increments in accordance with the output from another block. Sometimes a first block receives the output from a second block following the first block. For example, the $\Delta y$ increments for block 47 may be determined by the output from block 15. Since block 47 follows block 15 in the same cycle of computation, block 47 receives relatively fresh information from block 15. For example, the value of the dependent quantity Y at any instant for block 47 is relatively accurate, especially when the value of Y is compensated in each cycle of computation by a truncation correction of $\frac{1}{2}\Delta Y$.

At other times, the ΔY increments for a block are controlled by the output indications from a second block which follows the first block in a cycle of computation. For example, the ΔY increments for block 18 may be controlled by the output indications from block 37. In such a situation, each ΔY increment for block 18 is determined by the output from block 37 obtained in a previous cycle of computation. Because of this delay of one cycle for each ΔY increment, the value of the dependent quantity Y at any instant is not always as fresh as might be desired. Actually, the dependent quantity Y may be considered to be in error by an amount equivalent to the value of the ΔY increment in the last cycle of computation. In order to increase the accuracy in the indications representing the dependent quantity Y, a technique known as extrapolation is used.

The technique of extrapolation may be seen from the example shown in FIGURE 39 and the following discussion. In the example shown in FIGURE 39, the value of the dependent quantity Y at any instant for a particular block is represented at 1660. When the block is presented for computation, positive ΔX and ΔY increments may be obtained. With ordinary truncation correction, the value of Y used in the cycle of computation for combination with ΔX may be represented by a position 1662. The value of Y represented by the position 1662 is obtained by adding $Y+\frac{1}{2}\Delta Y$ by the technique of truncation correction described above. But, when extrapolation is to be provided, the value of Y used for combination with ΔX may be represented by a position 1664. This value is obtained by adding $(Y+\frac{1}{2}\Delta Y)+\Delta Y$. As will be seen, the value represented by the position 1664 is different from the value represented by the position 1662, this difference being equivalent to the value of a ΔY increment. The ΔY increment is added to compensate for the fact that the value of Y is always behind its true value by one increment since its increments are being obtained from outputs in a previous cycle of computation.

Even when extrapolation in the value of Y is used for a block, it is only used under special circumstances. For example, it is used only when two successive ΔX increments have the same polarity. If the first ΔX increment has one polarity and the next ΔX increment has an opposite polarity, extrapolation is not used for a block even when the block receives its ΔY information from a block in a previous cycle of computation. When two successive ΔX increments have opposite polarities, the portion of the curve $y=f(x)$ traced in one cycle of computation is retraced in a reverse direction in the next cycle of computation.

The following discussion may indicate the reason for not using extrapolation when two successive ΔX increments have opposite polarities. If the first ΔX increment is positive and the ΔY increment is also positive, the differential combination may be expressed as:

$$[Y+\tfrac{1}{2}\Delta Y+(\Delta Y)](\Delta X)$$

If each ΔX and XΔ increment is considered to have a unitary value, the differential combination may be amplified to $$Y+\frac{3}{2}$$

In the next cycle of computation, ΔX is negative. ΔY is also negative since the curve $y=f(x)$ is being retraced and ΔY was positive in the previous cycle of computation. This causes the differential combination to be $$\left[\left(Y+\frac{1}{2}\Delta Y+\Delta Y\right)\right](\Delta X)=\left[\left(Y-\frac{1}{2}\right)+(-1)\right](-1)=-Y+\frac{3}{2}$$

It will be seen from this discussion that the unitary value representing (ΔY) is added in both cycles of computation when ΔX has opposite polarities in the cycles. This leads to error.

The error may be further seen by a specific example of binary indications. For example, the value of $R=0$ may be added to the value of $Y=0$ and the technique of extrapolation may be used

| | | Start position |
|---|---|---|
| R | 100000 | 0 |
| Y | 00000 | 0 |
| $\frac{3\Delta Y}{2}$ | 1 | 1 |
| $R_i$ | 100001 | 1 |

The value of Y at the end of the cycle is +1 on a decimal basis because of the addition of the ΔY increment to $Y=0$.

Since ΔX is negative in the next cycle of computation, $Y\Delta X=(Y)(-\Delta X)=-Y\Delta X$. When ΔX has a unitary value, this can be simplified to −Y. Since $Y=1$, a value of −1 is obtained when ΔX is negative. A binary value of $Y=-1$ is represented by an indication of "1" in each position. This value is added to the value of R obtained from the previous cycle of computation and the extrapolation of 3/2 is included as discussed in the previous paragraph.

| | | Start position |
|---|---|---|
| R | 100001 | 1 |
| Y | 11111 | 0 |
| $\frac{3\Delta Y}{2}$ | 1 | 1 |
| $R_i$ | 000010 | 0 |

As will be seen, R at the end of the second cycle of computation has a value different from R at the beginning of the first cycle of computation because of the different indications in the second position after the start pulse. Actually, these indications should be the same since the same area under $y=f(x)$ has been traversed in a forward and reverse direction.

From the above discussion, it will be seen that extrapolation is provided for a block only when the block receives old ΔY information from a previous cycle of computation and only in the cycle of computation when two ΔX increments have the same polarity. Extrapolation is further provided only in "normal" integration. As previously described, in "normal" integration the value of R becomes the value of $R$ without change. Because of this, the logic expressed in Equations 134 and 134*a* and discussed fully above is not completely utilized. The logic is not completely utilized since it provides in part for the addition of an increment. Since the logic in Equations 134 and 134*a* is not completely utilized, this provides a convenient way to include the additional ΔY increment required to obtain extrapolation. The polarity of the ΔY increment for a particular block in a cycle of computation is recorded in the flip-flop 456. In like manner, the polarity of the ΔX increment for the block is recorded in the flip-flop 458. The polarity of this increment is compared with the polarity of the ΔX increment in the previous cycle of computation to determine whether extrapolation will be provided. The polarity of the ΔX increment for the previous cycle of computation is recorded in the channel 150 in a manner which will be described in detail subsequently.

Since only certain blocks require extrapolation, a particular code is included to indicate these blocks. This code is provided in the channels 140, 142, 144 and 146 in one of the first eight positions for the block. The code is represented by indications of "0" in the channels 140, 142 and 146 at the same time as an indication of "1" in the channel 144. This causes relatively high voltages to be simultaneously produced on the right output terminals of the flip-flops 306, 310 and 318 and on the left output terminal of the flip-flop 314. These indications are introduced to the "and" network 1090 in FIGURE 21. The "and" network 1090 passes the signals only when they occur in positions 1 to 8, inclusive, for a block since the "and" network is connected to the right output terminals of the flip-flops 200 and 210.

The signals from the "and" network 1090 pass through the "or" network 1092 to the "and" network 1094 for synchronization at optimum times in the clock cycles. The signals are then introduced to the left input terminal of the flip-flop 436. The signals trigger the flip-flop 456 so as to produce a relatively high voltage on the left output terminal of the flip-flop. Signals pass to the flip-flop 456 through the stages 1090, 1092 and 1094 in accordance with the logical equation:

$$f_2=\overline{L}_1\overline{L}_2L_3\overline{L}_4\overline{J}_4\overline{J}_5T \qquad (153)$$

where all of the terms have previously been defined.

The logic $\overline{L}_1\overline{L}_2L_3\overline{L}_4$ not only controls the triggering of the flip-flop 456 but also the triggering of the flip-flop 396. The logic for controlling the triggering of the flip-flop 396 is expressed above in Equation 94. Since it may be desired to trigger only the flip-flop 456, the flip-flop 396 may provide an incorrect indication of a ΔX increment for a block. This is corrected by subsequently triggering the flip-flop 396 in accordance with the logic expressed above in Equations 93 and 94. This logic represents the sign reversal pulse for the ΔX increment. By triggering the flip-flop 396 twice, the flip-flop is returned to its correct operation. In this way, the flip-flop 396 is made available to receive correct ΔX information for the block.

To obtain extrapolation, the polarity of the ΔX increment for a block is stored in the channel 150 in each cycle of computation for comparison with the polarity of the ΔX increment in the next cycle of computation. This is obtained by the operation of certain stages shown in FIGURE 26. These stages include the "and" network 1336 in FIGURE 26. The "and" network 1336 can become activated only during periods of actual computation since it is connected to the cathode follower 1340. The "and" network 1336 can become activated only in positions 2 to 17, inclusive, for a block when these positions occur before the start pulse. This results from the connections to the "and" network 1336 from the inverter 541 and the right output terminal of the flip-flop 446. The "and" network 1336 can become activated in these positions to record a pulse in the channel 150 since no information exists in the channel before these positions.

When activated, the "and" network 1336 passes the signals of high amplitude on the left output terminal of the flip-flop 420. These signals indicate a positive ΔX increment for a block. The signals passing through the "and" network 1336 are introduced through the "or" network 1346 to the "and" network 1348. The "and" network 1348 synchronizes the signals at optimum times in the clock cycles and passes them to the left input terminal of the flip-flop 1332. These signals trigger the flip-flop 1332 so as to produce a relatively high voltage on the left output terminal of the flip-flop. Since the relatively high voltage on the left output terminal of the flip-flop 1332 is introduced to the coil 1333, it causes the coil to record a magnetic indication of "1" in the channel 150. A relatively high voltage is produced on the left output terminal of the flip-flop 1332 by the passage of signals through the stages 1336, 1346 and 1348 in accordance with the logical equation:

$$_0y=\alpha A_2\overline{S}_1P_{2/17}T \qquad (154)$$

where all of the terms have previously been defined.

The "and" network 1362 becomes prepared for activation at the same time as the "and" network 1336. However, the "and" network 1362 passes the signals of high amplitude on the right output terminal of the flip-flop 420. These signals indicate negative ΔX increments for a block. The signals pass through the "or" network 1366 to the "and" network 1368, which synchronizes the signals at optimum times in the clock cycles. The signals then pass to the right input terminal of the flip-flop 1332. These signals trigger the flip-flop for the production of a relatively high voltage on the right output terminal of the flip-flop and a relatively low voltage on the left output terminal of the flip-flop. The low voltage on the left output terminal of the flip-flop 1332 causes the coil 1333 to record an indication of "0" in the channel 150. Signals pass through the stages 1362, 1366 and 1368 to trigger the flip-flop 1332 in accordance with the logical equation:

$$_0\overline{y}=\alpha\overline{A}_2\overline{S}_1P_{2/17}T \qquad (155)$$

where all of the terms have previously been defined.

As previously described, the (ΔY)(ΔX) increment representing extrapolation for a block is combined with the indications of R to obtain indications representing *R*. Indications representing *R* are obtained in accordance with the logic expressed in Equations 134 and 134*a* and described fully above. As part of this logic, the carry flip-flop 458 must be first triggered true when an increment is to be combined with the increment of R. When extrapolation is to be provided, the carry flip-flop 458 is triggered to its true state in accordance with the operation of certain stages shown in FIGURE 22, such as the "and" networks 1134 and 1136. The "and" network 1134 passes a signal when the ΔX increments in two successive cycles of computation have positive polarities, as represented by simultaneous signals of high amplitude on the left output terminals of the flip-flops 420 and 450. In like manner, the "and" network 1136 passes a signal when the ΔX increments have negative polarities for two successive cycles of computation. This is represented by the simultaneous occurrence of relatively high voltages on the right output terminals of the flip-flops 420 and 450. As previously described, the operation of the flip-flop 420 is controlled by the indications in the channel 150.

The signals from the "and" networks 1134 and 1136 pass through the "or" network 1132 to the "and" network 1130. The "and" network 1130 passes the signals only when extrapolation is to be provided for a block. This is represented by a relatively high voltage on the left output terminal of the flip-flop 456, as described above and expressed logically in Equation 153. Furthermore, the "and" network 1130 passes the signals only in the position immediately before the occurrence of the "start" pulse in the channel 148, and only when such position occurs in positions 2 to 17, inclusive, for the block undergoing computation. This is represented by the simultaneous occurrence of signals of high amplitude from the inverter 541, the left output terminal of the flip-flop 542 and the right output terminal of the flip-flop 446.

The signals from the "and" network 1130 pass through the "or" network 1124 to the "and" network 1126. The "and" network 1126 synchronizes the signals at optimum times in the clock cycles and introduces the signals to the left input terminal of the flip-flop 458. These signals trigger the flip-flop 458 for the production of a relatively high voltage on the left output terminal of the flip-flop to indicate a carry. The flip-flop 458 is triggered by the signals passing through the stages 1134, 1136, 1132, 1130, 1124 and 1126 in accordance with the logical equation:

$$f_3=(YA_2+\overline{YA_2})F_2Y_p\overline{S}_1P_{2/17}I \quad (156)$$

where all of the terms have previously been defined.

The flip-flop 456 in FIGURE 21 is initially triggered to its true state to provide a code for indication of an extrapolation operation as expressed logically in Equation 153. Upon the occurrence of the "start" pulse in the channel 148, the flip-flop 456 is set to indicate the polarity of the (ΔY)(ΔX) increment for the block undergoing computation. This increment represents the extrapolation correction. Since the flip-flop 456 has previously been triggered to its true state before the start pulse, it can remain in this state at the start pulse when the (ΔX)(ΔY) increment is positive. For this reason, stages are included in FIGURE 21 to trigger the flip-flop 456 only when the (ΔX)(ΔY) increment is negative. These stages include the "and" networks 1110 and 1112 in FIGURE 21. The "and" network 1110 passes a signal only when the ΔX increment is positive and the ΔY increment is negative for a block. In like manner, the "and" network 1112 passes a signal only when the ΔX increment is negative and the ΔY increment is positive for the block. The "and" network 1110 and 1112 operate in this manner because of their connections to the flip-flops 420 and 494.

The signals from the "and" networks 1110 and 1112 pass through the "or" network 1106 to the "and" network 1104. The "and" network 1104 passes the signals only in the position immediately before the occurrence of the "start" pulse in the channel 148 and only when this position occurs in positions 2 to 17, inclusive, for the block undergoing computation. This is represented by the simultaneous occurrence of high voltages from the inverter 541, the left output terminal of the flip-flop 542 and the right output terminals of the flip-flops 446 and 390.

The signals from the "and" network 1104 are introduced through the "or" network 1100 to the "and" network 1102 for synchronization at optimum times in the clock cycles. The signals then pass to the right input terminal of the flip-flop 456. These signals trigger the flip-flop 456 and cause a relatively high voltage to be produced on the right output terminal of the flip-flop in representation of a negative (ΔX)(ΔY) increment. Signals are introduced to the flip-flop 456 through the stages 1110, 1112, 1106, 1104, 1100 and 1102 in accordance with the logical equation:

$$\overline{f}_2=(A_2\overline{B}_2+B_2\overline{A}_2)\overline{G}_5Y_p\overline{S}_1P_{2/17}T \quad (157)$$

where all of the terms have previously been defined.

When the carry flip-flop 458 is triggered on at the start pulse in accordance with the logic expressed in Equation 156, the indications of R in the successive positions are contemplated. For a positive (ΔX)(ΔY) increment, the indications of R are complemented until after the first indication of "0" has been presented for R in a position after the "start" pulse. For a negative (ΔX)(ΔY) increment, the indications of R are complemented until after the first indication of "1" has been presented for R in a position after the "start" pulse. The complementation of the indications of R occurs in accordance with the logic set forth in Equations 134 and 134*a*.

Two special situations are presented. One situation occurs when R is represented by indications of "1" in every position after the "start" pulse in the channel 148. For a positive (ΔX)(ΔY) increment, this would cause the carry flip-flop 458 to remain on in every position. This may be seen from the following example:

```
 1111111    R
 0000001    (ΔX)(ΔY)=+1
10000000    R
↲
```

As will be seen, *R* will be represented by an indication of "0" in every position. Under such a condition, the addition of *R* and *y* to give $R_1$ will not give a carry in the last position even when *y* has a maximum value represented by an indication of "1" in every position. This may be seen from the following example:

```
0000000   R
 111111   Y
0111111   R1
↲
```

It will be further seen that no overflow is obtained at position 18 from the addition of *R* and *y*. But an overflow should be obtained since *R* and *y* both have maximum values.

On the basis of the discussion in the previous paragraph, certain stages are included in FIGURE 8 to trigger the flip-flop 432 in its true state for the representation of a positive overflow. These stages include the "and" network 454 in FIGURE 8. The "and" network 454 is able to pass a signal on when the (ΔX)(ΔY) increment for the block is positive. This results from the connection of the "and" network 454 to the left output terminal of the flip-flop 456. The "and" network 454 is further able to pass a signal only when the carry flip-flop 458 is in its true state at position 18 for a block, the latter being represented by a signal of high amplitude from the "and" network 216. For a positive (ΔX)(ΔY) increment, this can occur only when R is represented by an indication of "1" in every position. The "and" network 454 is also able to pass a signal only at the end of a single-block operation. A relatively high voltage on the right output terminal of the flip-flop 390 indicates the end of an operation. Furthermore, a relatively high voltage on the right output terminal of the flip-flop 450 provides a code to indicate that the operation is only for a single block.

The signals from the "and" network 454 pass through the "or" network 440 to the "and" network 439. The "and" network 439 synchronizes the signals at optimum times in the clock cycles and introduces the signals to the left input terminal of the flip-flop 432. The signals trigger the flip-flop 432 so as to produce a relatively high voltage on the left output terminal of the flip-flop. The relatively high voltage on the left output terminal of the flip-flop 432 is recorded in the channel 138 in accordance with the logic expressed in Equation 65 so as to represent a positive overflow from the block undergoing computation. A relatively high voltage is produced on the left output terminal of the flip-flop 432 by the passage of signals through the stages 454, 440 and 439 in accordance with the logical equation:

$$a_3=F_2F_3\overline{YG}_5P_{18}T \quad (158)$$

where all of the terms have previously been defined.

Another special situation arises when R is represented on a binary basis by an indication of "0" in every position and the polartiy of the (ΔX)(ΔY) increment is negative. Since the indications of R are complemented in every position under such a condition, the carry flip-flop 458 is never triggered to its false state during the block undergoing computation. The addition of R and (ΔX)(ΔY) is as follows:

```
0000000   R
1111111   (ΔX)(ΔY)
1111111   R
```

If *y* has a decimal value other than "0," an overflow will be produced at position 18 when *R* and *y* are added. This may be seen from the following example:

```
0111111   R
 000100   y
1000011   R1
↲
```

But, since *R*=0 for a binary indication of "0" in every position, an overflow should not be obtained even when *y* has a maximum value represented by an indication of "1" in every position.

In order to prevent an overflow under the conditions discussed in the previous paragraph, the "and" network 470 is included in FIGURE 8. The "and" network 470 passes a signal only for a negative $(\Delta X)(\Delta Y)$ increment for the block undergoing computation, as represented by a relatively high voltage on the right output terminal of the flip-flop 456. The "and" network 470 is also able to pass a signal only when the carry flip-flop 458 is still on at position 18 for a block. This is represented only by the simultaneous occurrence of relatively high voltages from the "and" network 216 and the left output terminal of the flip-flop 458. The "and" network 470 is further able to pass a signal only at the end of a single-block operation. This occurs when the flip-flops 390 and 450 have relatively high voltages on their right output terminals.

The signals from the "and" network 470 pass through the "or" network 466 to the "and" network 467 for synchronization at optimum times in the clock cycles. The signals then pass to the right input terminal of the flip-flop 432. The signals trigger the flip-flop 432 so as to produce a relatively high voltage on the right output terminal of the flip-flop and a relatively low voltage on the left output terminal of the flip-flop. This low voltage is recorded in the channel 138 as an indication of "0" in accordance with the logic expressed in Equation 66 so as to represent a negative overflow for the block undergoing computation. The flip-flop 432 is triggered by the signals passing through the stages 470, 466 and 467 in accordance with the logical equation:

$$\overline{a}_3=\overline{F}_2F_3\overline{YG}_5P_{18}T \qquad (159)$$

where all of the terms have previously been defined.

SERVO OPERATION

Certain blocks in the digital differential analyzer may be desired to perform servo operations. In these servo operations, the output from the block would be compared with the output from external members. Any differences between the outputs from the blocks and the external members cause error signals to be generated. For certain operations, the error signals would be introduced to the blocks to vary the output from the blocks so that the output from the blocks would become equal to the output from the external members. For other operations, the error signals would be introduced to the external members to make the outputs from the external members approach the outputs from the blocks.

In FIGURE 41, a simplified block diagram is shown of one typical form of servo operation. The block diagram shown in FIGURE 41 includes the Z channel 138 and the U channel 156. A $\Sigma dU$ counter 1700 is coupled to the Z channel 138 to receive increments from the Z channel and to count such increments. A register 1702 is connected to the counter 1700 to step the indications from the counter into an adder 1704. The adder 1704 is also adapted to receive indications relating to U from the channel 156. The adder 1704 is adapted to add the indications of U from the channel 156 and the indications of $\Sigma dU$ from the register 1702 so as to obtain new indications of U for the block every time that the block is presented for computation. The output indications from the channel 1704 are introduced to amplifiers 1706 for recordation in the channel 156. In this way, the new indications of U are re-circulated for presentation to the adder 1704 in the next cycle of computation.

The output indications from the adder 1704 are also introduced to an error detector 1708. This detector also receives digital signals from an external source such as an analog-to-digital converter 1710. Various forms of analog-to-digital converters will be described in detail subsequently in connection with a specific control problem. The detector 1708 compares the signals from the adder 1704 and the converter 1710 and produces error signals digitally representing any differences between the signals introduced to it. The polarity of the error signals from the detector 1708 is represented by a signal in one of the last positions for the block. This polarity signal is introduced to amplifiers 1712 for recordation of the signal in the channel 138. In this way, the signal can be subsequently presented to the counter 1700 in the next cycle of computation to serve as a $\Sigma dU$ increment for the block. By introducing the error signal to the counter 1700 in the next cycle of computation, any error in the signals representing U can be minimized.

The block system shown in FIGURE 41 is adapted to receive signals from an external source such as the source 1710 and to produce variations in the signals in the digital differential analyzer, in accordance with the signals from the external source. The block diagram shown in FIGURE 42 operates on a somewhat converse basis. It utilizes the signals from the digital differential analyzer as represented by the signals from the adder 1704 to control the operation of an external source. The system operates to compare this information with the information from an analogue-to-digital converter 1714 and to produce error signals in accordance with any signals from such comparison. These error signals are produced in the detector 1708 and are introduced from the detector 1708 to a converter 1716. The converter 1716 changes the digital signals from the detector 1708 into a corresponding analog representation such as a single voltage. This voltage is introduced to a servo 1718 which controls the rotation of an output shaft (not specifically shown). This output shaft may drive various output members such as members in an airplane, as will be described in detail hereinafter.

DETERMINATION OF $\Sigma dU$ INCREMENTS FOR A SERVO OPERATION

In accordance with the above discussion and the block diagram in FIGURE 41, the $dU$ increments must be first detected and added. This is indicated in block form at 1700 in FIGURE 41 and will now be described in detail. As a preliminary matter, it should be appreciated that blocks undergoing servo operations may receive more than one $dU$ increment in each cycle of computation. For example, a servo block may receive an increment representing the error registered by the detector 1708 in the previous cycle of computation. The servo block may also receive inputs from other blocks to affect the operation of the block. Each servo block is able to receive a maximum of three $dU$ increments in each cycle of computation.

The $dU$ increments for a servo block are registered by the operation of the stages shown in FIGURE 16. The $dU$ increments are able to occur only for a particular coding in the channels 140 and 142. This coding is represented by the simultaneous occurrence of indications of "1" in the channels 140 and 142. Upon the occurrence of such a coding, relatively high voltages are simultaneously produced on the lift output terminals of the flip-flops 306 and 310.

The relatively high voltages on the left output terminals of the flip-flops 306 and 310 are introduced to the "and" network 866 in FIGURE 16. The "and" network 866 passes these signals when a relatively high voltage is introduced to it from the left output terminal of the flip-flop 868, the operation of which will be described in detail subsequently. The "and" network 866 is further able to pass a signal only when a relatively high voltage is introduced to it from the right output terminal of the flip-flop 860. The signals passing through the "and" network 866 are introduced to the left input terminal of the flip-flop 860 to trigger the flip-flop. Upon being triggered, the flip-flop 860 has a relatively high voltage produced on its left output terminal. The flip-flop 860 is triggered by signals passing through the "and" network 866 in accordance with the logical equation:

$$c_1 = \overline{C}_1 Q L_1 L_2 P_{1/17} T \qquad (160)$$

where $c_1$=a triggering signal introduced to the left input terminal of the flip-flop 860;

$\overline{C}_1$=a relatively high voltage on the right output terminal of the flip-flop 860;

$Q$=a voltage of high amplitude on the left output terminal of the flip-flop 868; and the other terms have previously been defined.

When a relatively high voltage is produced on the left output terminal of the flip-flop 860, it prepares the "and" network 874 for operation. Signals then pass through the "and" network 874 upon the simultaneous introduction of signals of high amplitude from the left output terminal of the flip-flop 868 and the left output terminals of the flip-flops 306 and 310. The signals passing through the "and" network 874 are introduced through the "or" network 872 to the "and" network 870 for synchronization at optimum times in the clock cycles. The signals then pass to the right input terminal of the flip-flop 860 and trigger the flip-flop for the production of a relatively high voltage on the right output terminal of the flip-flop. Voltages of high amplitude are produced on the right output terminal of the flip-flop 860 by the passage of signals through the stages 874, 872 and 870 in accordance with the logical equation:

$$\overline{c}_1 = C_1 Q L_1 L_2 T \qquad (161)$$

where $\overline{c}_1$=the introduction of a triggering signal to the right input terminal of the flip-flop 860;

$C_1$=a relatively high voltage on the left output terminal of the flip-flop 860; and the other terms have previously been defined.

The relatively high voltage on the right output terminal of the flip-flop 860 is introduced to the "and" network 866 so that the "and" network will pass a signal upon the occurrence of the next coding pulse for the block. In this way, the flip-flop 860 becomes alternately triggered to one state of operation and then to the other upon the occurrence of successive coding pulses in a block. Since the position of least significance in a counting operation is represented by alternate indications of "0" and "1," the flip-flop 860 provides an indication as to whether the number of pulses introduced to a block is odd or even.

Each servo block receives $d$U increments from other blocks or its own output from the previous cycle of computation. These outputs are represented by indications in the channel 138. The indications in the channel 138 are made available to a servo block in the same way that they are made available to block performing "normal" integration. Because of this, the logic expressed in equations 69 to 81, inclusive, applies. This logic was fully explained previously and has been designated as $L$ and $\overline{L}$.

The flip-flops 862 and 864 operate in conjunction with the flip-flop 860 to indicate the $\Sigma d$U increments for a servo block. The count of the $\Sigma d$U indications for each servo block is represented by the state of operation of the flip-flops 860 and 862. The polarity of $\Sigma d$U increments is represented by the operation of the flip-flop 864. This may be seen from the table shown in FIGURE 43. In this table, various values of $\Sigma d$U between 0 and +3 and between 0 and −3 are included. As will be seen, the flip-flops 860 and 862 operate in a normal manner to indicate the $\Sigma d$U count. The flip-flop 864 indicates a positive value for the $\Sigma d$U increments by a true state of operation and a negative value for the $\Sigma d$U increments by a false state of operation.

As will be seen from the table shown in FIGURE 43, the flip-flop 862 is triggered to its true state upon the occurrence of a positive $\Sigma d$U increment only when the value of $d$U changes from +1 to +2. This occurs when the flip-flop 860 has a true state of operation and the flip-flop 862 has a false state of operation. Upon the simultaneous occurrence of relatively high voltages on the left output terminal of the flip-flop 860 and the right output terminal of the flip-flop 862, the "and" network 880 in FIGURE 16 is able to pass a signal. The "and" network 880 passes the signal only for the particular coding represented by relatively high voltages on the left output terminals of the flip-flops 306 and 310. The "and" network 880 is further able to pass a signal only for a positive $d$U increment as represented by a signal from the cathode follower 328.

The signals from the "and" network 880 pass through the "or" network 884 to the "and" network 886. The "and" network 886 synchronizes the signals at optimum times in the clock cycles and introduces the signals to the left input terminal of the flip-flop 862. These signals trigger the flip-flop 862 so as to produce a relatively high voltage on the left output terminal of the flip-flop. Signals pass through the stages 880, 884 and 886 in accordance with the logical equation:

$$c_1' = C_1 \overline{C}_1' L Q L_1 L_2 P_{1/17} T \qquad (162)$$

where $c_1'$=the introduction of a triggering signal to the left input terminal of the flip-flop 862;

$\overline{C}_1'$=a relatively high voltage on the right output terminal of the flip-flop 862; and the other terms have previously been defined.

The flip-flop 862 is able to change from a false state of operation to a true state of operation upon the occurrence of a negative dU increment only for a value of $\Sigma d$U=0. This may be seen from the table shown in FIGURE 43. Since a value of $\Sigma d$U=0 is represented by the simultaneous occurrence of relatively high voltages on the right output terminals of the flip-flops 860 and 862, the flip-flop 862 can be triggered to its true state only at these times for a negative dU increment. The "and" network 882 in FIGURE 16 passes a signal upon the occurrence of relatively high voltages on the right output terminals of the flip-flops 860 and 862. The "and" network 882 passes a signal only when a negative $d$U increment occurs as represented by a signal from the cathode follower 364. The "and" network 882 is able to pass a signal only at such times that relatively high voltages are introduced to it from the left output terminals of the flip-flops 306, 310 and 868. The signals from the "and" network 882 pass through the stages 884 and 886 and trigger the flip-flop 862 to its true state of operation. The flip-flop 862 receives the signals passing through the stages 882, 884 and 886 in accordance with the logical equation:

$$\overline{c}_1' = C_1 \overline{C}_1' \overline{L} Q \overline{L}_1 L_2 P_{1/17} T \qquad (163)$$

where all of the terms have previously been defined.

The flip-flop 862 changes from a true state of operation to a false state of operation when a negative $d$U increment occurs for a value of $\Sigma dU$=+2. This may be seen from the table shown in FIGURE 43. Relatively high voltages are simultaneously produced on the right output terminal of the flip-flop 860 and the left output terminal of the flip-flop 862 for a value of $\Sigma dU$=+2. The simultaneous occurrence of these high voltages causes a signal to pass through the "and" network 892. The "and" network 892 passes the signals only upon the occurrence of a negative $d$U increment, as represented by a signal of high amplitude from the cathode follower 364. The "and" network 892 further passes the signal only upon the occurrence of the $L_1L_2$ coding represented by relatively high voltages on the left output terminals of the flip-flops 306 and 310.

The signals from the "and" network 892 pass through the "or" network 894 to the "and" network 896 for synchronization at optimum times in the clock cycles. The signals then pass to the right input terminal of the flip-flop 862. The signals trigger the flip-flop 862 so as to produce a relatively high voltage on the right output terminal of the flip-flop. The flip-flop 862 is triggered by the passage of signals through the "and" networks 892, 894 and 896 in accordance with the logical equation:

$$\overline{c}_1' = \overline{C}_1 C_1' \overline{L} Q L_1 L_2 T \qquad (164)$$

where $\overline{c}_1'$=the introduction of a triggering signal to the right input terminal of the flip-flop 862; and the other terms have previously been defined.

The flip-flop 862 is also triggered to its false state when $\Sigma dU$ has a negative value of −1 and a positive $dU$ increment occurs, as may be seen from the table shown in FIGURE 43. The "and" network 890 passes a signal at this time. The "and" network 890 passes a signal because of the introduction to it of relatively high voltages from the left output terminals of the flip-flops 860 and 862. The "and" network 890 is able to pass a signal only for a positive $dU$ increment since it is connected to the cathode follower 328. The "and" network 890 is further able to pass a signal only upon the occurrence of the particular coding designated as $L_1L_2$. The signals from the "and" network 890 pass through the stages 894 and 896 and trigger the flip-flop 862 to its false state. Signals pass through the stages 890, 894 and 896 to the flip-flop 862 in accordance with the logical equation:

$$\overline{c}_1' = C_1 C_1' L Q L_1 L_2 T \qquad (165)$$

where all of the terms have previously been defined.

As will be seen from the table shown in FIGURE 43, the flip-flop 864 can be triggered to its true state only upon the change of $\Sigma dU$ from a decimal value of −1 to a vlue of 0. This occurs when relatively high voltages are simultaneously produced on the left output terminals of the flip-flops 860 and 862. These voltages cause a signal to pass through the "and" network 902 in FIGURE 16 when a relatively high voltage representing a positive $dU$ increment is produced by the cathode follower 328. Signals are further able to pass through the "and" network 902 only upon the occurrence of the $L_1L_2$ coding represented by relatively high voltages on the left output terminals of the flip-flops 360 and 310.

The signals passing through the "and" network 902 are introduced through the "or" network 906 to the "and" network 904. The signals pass through the "and" network 904 at optimum times in the clock cycles and trigger the flip-flop 864 to its true state. The logic controlling the passage of signals to the flip-flop 864 through the stages 902, 906 and 905 can be expressed as $$c_1'' = C_1 C_1' L Q L_1 L_2 T \qquad (166)$$

where $c_1''$=the introduction of a triggering signal to the flip-flop 864; and the other terms have previously been defined.

The flip-flop 864 can be triggered to its false state only when $\Sigma dU$ increments are changing from a value of "0" to a value of "−1". Because of this, the flip-flop 864 can be triggered to its false state only upon the simultaneous occurrence of relatively high voltages on the right output terminals of the flip-flops 860 and 862. These voltages cause the "and" network 900 to become prepared for activation. The "and" network 900 then passes a signal when a negative $dU$ increment occurs, as represented by a signal of high amplitude from the cathode follower 364. The "and" network 900 is further able to pass a signal only when a coding of $L_1L_2$ occurs. The signals from the "and" network 900 trigger the flip-flop 864 to its false state of operation. Signals trigger the flip-flop 864 to its false state of operation in accordance with the logical equation:

$$\overline{c}_1'' = \overline{C}_1 \overline{C}_1' \overline{L} Q L_1 L_2 P_{1/17} T \qquad (167)$$

where $\overline{c}_1''$=the introduction of a triggering signal to the right input terminal of the flip-flop 864; and the other terms have previously been defined.

At the end of each servo block, it is desirable to trigger the flip-flops 860, 862 and 864 so that the flip-flops will represent a value of "0." This is desirable so that the flip-flops will be prepared for proper operation in a subsequent block. The flip-flops 860, 862 and 864 are triggered to their proper operation at the end of a servo block when a coding indication of "1" occurs in the channel 142 at position 18. This causes the "and" network 876 to simultaneously receive signals of high amplitude from the "and" network 216 and the left output terminal of the flip-flop 310.

The flip-flop 860 is triggered to its false state by the passage of signals through the stages 876, 872 and 870 in accordance with the logical equation:

$$\overline{c}_1 = L_2 P_{18} T \qquad (168)$$

Similarly, signals pass through the stages 876, 894 and 896 and trigger the flip-flop 862 to its false state. The flip-flop 862 is triggered by the passage of signals through these stages in accordance with the logical equation:

$$\overline{c}_1' = L_2 P_{18} T \qquad (169)$$

The flip-flop 864 is triggered to its true state by the passage of signals through the "and" network 876. This is in accordance with a value of "0" shown in the table of FIGURE 43. The flip-flop 864 is triggered to its true state by the passage of signals through the stages 876, 906 and 904 in accordance with the logical equation:

$$\overline{c}''_1 = L_2 P_{18} T \qquad (170)$$

The carry flip-flop 938 in FIGURE 18 is also triggered off by the passage of signals through the stages 876, 956 and 958 in accordance with the logical equation:

$$c_3 = L_2 P_{18} T \qquad (170a)$$

where all of the terms have previously been defined.

Since the information in the flip-flops 860, 862 and 864 are triggered to a "0" pattern at the end of each servo operation, the $\Sigma dU$ information would become lost unless it were transferred at the same time to other stages. For this reason, the information in the flip-flop 860, 862 and 864 is transferred to the flip-flops 910, 924 and 974 at the end of a servo operation. The transfer is obtained upon the occurrence of a coding pulse representing an indication of "1" in the channel 142 at position 18 for a block. This causes signals of high amplitude to be obtained simultaneously from the "end" network 216 and the left output terminal of the flip-flop 310.

STORAGE AND STEPPING OF $dU$ INCREMENTS FOR A SERVO OPERATION

The stages for respectively transferring the information the flip-flops 860, 862 and 864 to the flip-flops 910, 924 and 974 are shown in FIGURES 17, 18 and 19. These stages includes the "and" network 912 in FIGURE 17. The "and" network 912 passes signals of high amplitude on the left output terminal of the flip-flop 860 upon the occurrence of a relatively high voltage on the left output terminal of the flip-flop 310 at position 18 for a block.

The signals from the "and" network 912 pass through the "or" network 914 to the "and" network 916 for synchronization at optimum times in the clock cycle. The signals then pass to the left input terminal of the flip-flop 910. These signals trigger the flip-flop 910 to produce a relatively high voltage on the left output terminal of the flip-flop. The flip-flop 910 becomes triggered by signals passing through the stages 912, 914 and 916 in accordance with the logical equation:

$$c_2=C_1L_2P_{18}T \qquad (171)$$

where $c_2$=the introduction of a triggering signal to the left input terminal of the flip-flop 910; and the other terms have previously been defined.

The "and" network 926 becomes prepared for activation at the same time as the "and" network 912. However, the "and" network 926 passes the signals of high amplitude on the right output terminal of the flip-flop 860. These signals pass through the "or" network 932 to the "and" network 934. The signals are synchronized by the "and" network 934 at optimum times in the clock cycles and are introduced to the right input terminal of the flip-flop 910. These signals trigger the flip-flop for the production of a relatively high voltage on the right output terminal of the flip-flop. Signals pass to the flip-flop 910 through the stages 926, 932 and 934 in accordance with the logical equation:

$$\bar{c}_2=\bar{C}_1L_2P_{18}T \qquad (172)$$

where $\bar{c}_2$=the introduction of a triggering signal to the right input terminal of the flip-flop 910; and the other terms have previously been defined.

In like manner, signals of high amplitude on the left output terminal of the flip-flop 862 pass through the "and" network 966 (FIGURE 18), the "or" network 978 and the "and" network 980 and trigger the flip-flop 924 to produce a relatively high voltage on the left output terminal of the flip-flop 924. These signals are produced by the passage of signals through the stages 966, 978 and 980 in accordance with the logical equation:

$$c_2'=C_1'L_2P_{18}T \qquad (173)$$

where $c'_2$=the introduction of a triggering signal to the left input terminal of the flip-flop 924; and the other terms have previously been defined.

Signals of high amplitude also pass from the right output terminal of the flip-flop 862 through the "and" network 984, the "or" network 992 and the "and" network 994 to the right input terminal of the flip-flop 924. These signals trigger the flip-flop 924 and cause a relatively high voltage to be produced on the right output terminal of the flip-flop.

Relatively high voltages are produced on the right output terminals of the flip-flop 924 by the passage of signals through the stages 984, 992 and 994 in accordance the logical equation:

$$\bar{c}'_2=C_1'L_2P_{18}T \qquad (174)$$

where $\bar{c}_2'$=the introduction of a triggering signal to the right input terminal of the flip-flop 924; and the other terms have previously been defined.

Stages are included in FIGURE 19 for transferring information from the flip-flop 864 to the flip-flop 974. The stages providing such a transfer include the "and" network 1020, the "or" network 1036 and the "and" network 1038 in FIGURE 19. These stages operate to provide a transfer of signals of high amplitude from the left output terminal of the flip-flop 864 to the left input terminal of the flip-flop 974. The signals trigger the flip-flop 974 such that a relatively high voltage is produced on the left output terminal of the flip-flop. The flip-flop 974 receives the signals passing through the stages 1020, 1036 and 1038 in accordance with the logical equation:

$$c_2''=C_1''L_2P_{18}T \qquad (175)$$

where $c_2''$=the introduction of a triggering signal to the left input terminal of the flip-flop 974; and the other terms have previously been defined.

The "and" network 1042, the "or" network 1052 and the "and" network 1054 provide a transfer of signals from the right output terminal of the flip-flop 864 to the right input terminal of the flip-flop 974. As a result of this transfer, the flip-flop 974 becomes triggered for the production of relatively high voltage on the right output terminal of the flip-flop. The flip-flop 974 becomes triggered by the passage of signals through the stages 1042, 1052 and 1054 in accordance with the logical equation:

$$\bar{c}_2''=\bar{C}_1''L_2P_{18}T \qquad (176)$$

where $\bar{c}_1''$=the introduction of a triggering signal to right input terminal of the flip-flop 974; and the other terms have previously been defined.

As described above, the signal information in the flip-flops 860, 862 864 is transferred to the flip-flops 910, 924 and 974 at position 18 for a block. This causes the information to be made available by the flip-flops 910, 924 and 974 at the initial positions of the subsequent block. By the stepping operation, the information in the flip-flop 910 relating to the $\Sigma dU$ increments is made available at position 1 for combination with the signal indications representing U at this position. Similarly, the information in the flip-flop 924 relating to the $\Sigma dU$ increments is made available at position 2 for combination with the signal indications representing U at this position. The signal indications in the flip-flop 974 are made available at position 3 and every subsequent position for combination with the signal indications representing U at these positions. The reason for this will be described in detail subsequently.

Since the information in the flip-flop 910 is being released at position 1 for a block, it is available to receive the information from the flip-flop 924. This transfer is obtained by the operation of certain stages shown in FIGURE 17, including the "and" network 920. The "and" network 920 is able to open only at positions 1 and 2 for a block because of its connection to the "or" network 922. The "and" network 920 is further able to open only during a servo operation as represented by a relatively high voltage on the left output terminal of the flip-flop 606. At such times, the "and" network 920 passes the signals of high amplitude on the left output terminal of the flip-flop 924.

The signals from the "and" network 924 pass through the "or" network 914 and the "and" network 916 to the left input terminal of the flip-flop 910. These signals trigger the flip-flop 910 and cause a relatively high voltage to be produced on the left output terminal of the flip-flop. The flip-flop 910 receives the signals passing through the stages 920, 914 and 916 in accordance with the logical equation:

$$c_2=C_2'G_1P_{1/2}T \qquad (177)$$

where all the terms have previously been defined.

The "and" network 930 becomes prepared for activation at the same time as the "and" network 920. However, the "and" network 930 passes the signals of high amplitude on the right output terminal of the flip-flop 924. These signals pass through the "or" network 932 and the "and" network 934 to the flip-flop 910 and trigger the flip-flop to produce a relatively high voltage on the right output terminal of the flip-flop. Signals pass to the flip-flop 910 through the stages 930, 932 and 934 in accordance with the logical equation:

$$\bar{c}_2=\bar{C}_2'G_1P_{1/2}T \qquad (178)$$

where all of the terms have previously been defined.

Just as the signals from the flip-flop 924 are stepped into the flip-flop 910 in the first two positions of a servo block, the signals from the flip-flop 974 are stepped into the flip-flop 924. This stepping function is obtained by the operation of certain stages including the "and" network 986 in FIGURE 18. The stepping operation can occur only at position 1 for a servo operation because of the connections to the "and" network 986 from the "and" network 222 and the left output terminal of the flip-flop 606. When the "and" network 986 becomes prepared for activation, it passes the signals of high amplitude on the left output terminal of the flip-flop 974.

The signals from the "and" network 986 pass through the "or" network 992 and the "and" network 994 to the right input terminal of the flip-flop 924. These signals trigger the flip-flop 924 so as to produce a relative high voltage on the right output terminal of the flip-flop. The flip-flop 924 becomes triggered to its false state of operation by the passage of signals through the stages 986, 992 and 994 in accordance with the logical equation:

$$\bar{c}_2'=C_2''G_1P_1T \qquad (179)$$

where all the terms have previously been defined.

As will be seen, the polarity of the indications in the flip-flop 974 are inverted by the flip-flop 924 in the stepping operation. This inversion is provided so that the indications representing $\Sigma d$U will have the proper form for combination with the signals representing U. For example, while $\Sigma d$U was being obtained, a positive value for $\Sigma d$U was represented by a true state of operation of the flip-flop 864 and a negative value of $\Sigma d$U was represented by a false state of operation of the flip-flop. As previously described, however, a positive polarity for increments is represented by an indication of "0" and a negative polarity is represented by indications of "1" when the increments are being combined with another value. This has been disclosed fully above in connection with the combination of Y and ΔY. It is for this reason that the polarity in the operation of the flip-flop 974 is inverted when the state of operation of the flip-flop is stepped into the flip-flop 924.

The signals of high amplitude on the right output terminal of the flip-flop 974 are also inverted during the stepping operation to produce signals of high amplitude on the left output terminal of the flip-flop 924. This inversion is obtained by the operation of stages including the "and" network 968, the "or" network 978 and the "and" network 980 in FIGURE 18. The signals from the left output terminal of the flip-flop 974 pass through the stages 968, 978 and 980 and trigger the flip-flop 924 for the production of a relatively high voltage on the left output terminal of the flip-flop. These signals trigger the flip-flop 924 in accordance with the logical equation:

$$c_2'=\bar{U}_2''G_1P_1T \qquad (180)$$

where all of the terms have previously been defined.

It will be seen from the above discussion that the information orginially in the flip-flop 910 at position 1 for a servo block passes out of the flip-flop at this position. At position 1, the information in the flip-flop 924 passes to the flip-flop 910 and subsequently passes out of the flip-flop 910 at position 2 for the servo block. Similarly, the information in the flip-flop 974 passes in inverted form to the flip-flop 924 at position 1 and to the flip-flop 910 at position 2. This information then passes out of the flip-flop 910 at position 3 for the servo block. Since the flip-flop 910 remains in the same state of operation for all positions after position 3, the information originally in the flip-flop 974 controls the signals passing out of the flip-flop 910 for all positions including and after position 3 for the servo block.

DETERMINATION OF ERROR SIGNALS $\epsilon=U_n\pm M$

The information passing out of the flip-flop 910 in each position is combined with the information from the channel 156 for the same positions. The addition at each position is also controlled in part by the operation of the flip-flop 938 (FIGURE 17) which represents the carry in the addition from the previous position. The new signals obtained for each position represent $U_n$, which is the new value of U for the servo block undergoing computation. The combination of the signals in the flip-flops 910, 938 and 688 has been described in detail previously and has been logically expressed in Equations 107 and 108. The stages for obtaining this addition in accordance with the logic expressed in Equations 107 and 108 are shown in FIGURE 13.

As shown in FIGURE 41 and as described above, the signals representing $U_n$ are combined with the signals from an external source designated at 1710 in the figure. The signals from the external source are produced in accordance with the movements of external members such as the rotations of external shafts. The rotation of each external shaft represents an analogue quantity. This analogue quantity is converted into digital signals by the operation of certain components including a disk 1770 shown in FIGURES 49 and 50. The disk has a plurality of tracks such as tracks 1772 and 1774, each composed of a plurality of conductive and non-conductive portions disposed in alternate relationship with respect to one another. The conductive and non-conductive portions of each track have the same angular length and a length twice as great as the length of the portions in the previous track. The conductive and non-conductive portions of the track 1774 are respectively indicated at 1776 and 1778 in FIGURES 49 and 50.

Brushes such as brushes 1782 and 1784 are associated with each track as shown in FIGURE 49. The brushes associated with each track are separated from each other by a distance related to the angular lengths of the conductive and non-conductive portions in the track. These brushes provide signals in accordance with the angular movement of the disk. In this way, a plurality of signals are produced by selected brushes in the different tracks to represent in digital form the analogue quantity corresponding to the angular rotation of the disk. The construction and operation of a converter similar to that described above and shown in FIGURES 49 and 50 are fully disclosed in co-pending application Ser. No. 489,010, filed Feb. 18, 1955, by Carl A. Miller.

In copending application Ser. No. 467,154, filed Nov. 5, 1955, by Leo P. Retzinger, Jr., a system is disclosed for sequentially producing a plurality of signals digitally representing an analogue quantity. The system constituting this invention includes a converter of a type corresponding somewhat to that disclosed in copending application Ser. No. 489,010. It also includes circuitry for operating in combination with the converter to produce signals in accordance with the disposition of the brushes relative to their associated tracks in the converter. Since the construction and operation of the system for sequentially producing a plurality of signals has been fully disclosed in co-pending application Ser. No. 467,154, it should not be necessary to provide a full disclosure in this application.

As desired substantially in the co-pending application, the logical equations controlling the sequential production of the signals digitally representing the analogue quantity can be expressed as:

$$\begin{aligned}m=T\{&J_1J_2J_3J_4+K_1[\bar{J}_3\bar{J}_4\bar{M}(M_0J_1\bar{J}_2J_5+M_1{}^*\bar{J}_1\bar{J}_2\bar{J}_5\\&+M_2{}^*J_1\bar{J}_2\bar{J}_5+M_3{}^*\bar{J}_1J_2+M_4{}^*J_1J_2)+J_3\bar{J}_4\bar{M}(M_5{}^*\bar{J}_1\bar{J}_2\\&+M_6{}^*J_1\bar{J}_2+M_7{}^*\bar{J}_1J_2+M_8{}^*J_1J_2)+\bar{J}_3J_4\bar{M}(M_9{}^*\bar{J}_1\bar{J}_2\\&+M_{10}{}^*J_1\bar{J}_2+M_{11}{}^*\bar{J}_1J_2+M_{12}{}^*J_1J_2)\\&+J_3J_4\bar{M}(M_{13}{}^*\bar{J}_1\bar{J}_2+M_{14}{}^*J_1\bar{J}_2+M_{15}{}^*\bar{J}_1J_2]\}\end{aligned} \qquad (181)$$

$$\begin{aligned}m'=\{&\bar{M}+\bar{J}_3\bar{J}_4(M_0J_1\bar{J}_2J_5+M_1\bar{J}_1\bar{J}_2\bar{J}_5+M_2J_1\bar{J}_2\bar{J}_5\\&+M_3\bar{J}_1J_2+M_4J_1J_2)+J_3\bar{J}_4(M_5\bar{J}_1\bar{J}_2+M_6J_1\bar{J}_2\\&+M_7\bar{J}_1J_2+M_8J_1J_2)+\bar{J}_3J_4(M_9\bar{J}_1\bar{J}_2+M_{10}J_1\bar{J}_2\\&+M_{11}\bar{J}_1J_2+M_{12}J_1J_2)+J_3J_4(M_{13}\bar{J}_1\bar{J}_2+M_{14}J_1\bar{J}_2\\&+M_{15}\bar{J}_1J_2+J_1J_2)\}\end{aligned} \qquad (182)$$

$$\overline{m}=(\overline{m}')T \quad (183)$$

In the above equations:

$m$=the introduction of a triggering signal to the left input terminal of a flip-flop designated as M;

m=the introduction of a triggering signal to the right input terminal of the M flip-flop;

$M$=a relatively high voltage on the left output terminal of the M flip-flop;

$\overline{M}$=a relatively high voltage on the right output terminal of the M flip-flop;

$M_0$=a signal of high amplitude from a brush associated with a first track of conductive and non-conductive portions of the converter disk 175 in FIGURE 41;

$M_1$=a signal of high amplitude from one of the brushes associated with a second track of conductive and non-conductive portions in the converter disk;

$M_1{}^*$=a signal of high amplitude from the other brush associated with the second track of conductive and non-conductive portions in the converter disk;

$M_{N-1}$ and $M_{N-1}{}^*$=signals of high amplitude from the brushes associated with the $n$th track of conductive and non-conductive portions in the converter disk; and the other terms have previously been defined.

It will be seen from the above equations that the pairs of brushes are sequentially activated upon the occurrence of successive clock signals. Only one of the brushes in each pair of brushes is actually selected when the brushes become activated. The particular brush selected in each pair is dependent upon whether the M flip-flop is operating in its true or false state when the pair of brushes becomes activated. The particular brush selected in each pair and the disposition of the selected brush relative to the conductive and non-conductive portions in the associated track in turn control the operation of the M flip-flop in the next pulse position.

The operation of the M flip-flop continues in the manner described in the previous paragraph through all of the positions until position 15. At position 15, the M flip-flop is automatically triggered to its true state to indicate a positive number for M. The M flip-flop is triggered to its true state at position 15 because of the inclusion of the first term $J_1\ J_2\ J_3\ J_4$ in the logic expressed in Equation 181.

The signals digitally representing the operation of an external source are obtained only for selected blocks for reasons which will be described in detail subsequently. These selected blocks are spaced so that they can occur at most only once in every group of four successive blocks. for other blocks performing servo operations, the value of M is 0. This is represented by an indication of "0" in every pulse position for the block, except for an indication of "1" at position 17.

In FIGURE 41, the block 1708 is included to combine the signals from the external source 1710 and the signals of $U_N$ representing the new value of U. The resultant signals produced by the block 1708 represent any differences from a value of "0" in the combination of the signals representing $U_N$ and the signals representing M from the external source. The difference signals are designated as $\epsilon$. Since $\epsilon$ is obtained from the combination of $U_N$ and N, $\epsilon=U_N\pm M$.

The combination of $\epsilon=U_N+M$ will be discussed first. This combination is similar to that previously described for $U_N=U+\Sigma dU$. The combination of $U+\Sigma dU$ has been described fully above and expressed logically in Equations 107 and 108. Since the combination of $\epsilon=U_N+M$ is similar to the combination of $U_N=U+\Sigma dU$, the difference signals $\epsilon$ can be logically expressed as:

$$\epsilon=\overline{U}_N\overline{M}D+\overline{U}_NM\overline{D}+U_N\overline{M}\overline{D}+U_NMD \quad (184)$$

In the above equation, "D" represents a carry obtained by addition in one position and transferred to the next position for combination with the values of $U_N$ and M.

Certain stages shown in FIGURE 23 are included to obtain the error signals representing $\epsilon=U_N+M$. These stages include the "and" networks 1200, 1204, 1206 and 1202, which respectively provide signals representing $\overline{U}_N\overline{M}D$, $\overline{U}_NM\overline{D}$, $U_N\overline{M}\overline{D}$, and $U_NMD$. The signals from the "and" networks 1200, 1204, 1206 and 1202 pass through the "or" network 1208 to the "and" network 1210 for synchronization at optimum times in the clock cycles. The signals then pass to the cathode follower 1026, which provides output signals representing $\epsilon$.

Just as signals representing $\epsilon$ are obtained for different positions in the addition of $U_N$ and M, signals representing $\overline{\epsilon}$ are obtained in other positions. These signals are obtained by the operation of the "and" networks 1216, 1218, 1220 and 1222. The signals from the "and" networks 1216, 1218, 1220 and 1222 pass through the "or" network 1224 to the "and" network 1226 for synchronization at optimum times in the clock cycles. The signals then pass to the cathode follower 1050 which provides output signals representing $\overline{\epsilon}$. The cathode follower provides these output signals in accordance with the logical equation:

$$\overline{\epsilon}=\overline{U}_NMD+U_N\overline{M}D+U_NM\overline{D}+\overline{U}_N\overline{M}\overline{D} \quad (185)$$

where all of the terms have previously been defined.

In obtaining $\epsilon=U_N+M$, a carry is provided from one position to the next in the addition of $U_N$ and M. This carry is represented by the symbol "D." The stages for obtaining carry indications from one position to the next are shown in FIGURE 23. These stages include the "and" network 1162. The "and" network 1162 passes a signal only for a block performing a servo operation as represented by a relatively high voltage on the left output terminal of the flip-flop 606. The "and" network 1162 further passes signals only when $\epsilon=U_N+M$ is being obtained. This results from the connection to the "and" network 1162 from the cathode follower 1166, the operation of which will be described in detail subsequently. When the "and" network 1162 becomes prepared for activation, it passes signals only upon the simultaneous occurrence of indications of "1" for $U_N$ and M. These indications are represented by signals from the cathode follower 708 and the left output terminal of the flip-flop 1168.

The signals from the "and" network 1162 pass through the "or" network 1172 to the "and" network 1174 for synchronization at optimum times in the clock cycles. The signals then pass to the left input terminal of the flip-flop 604. These signals trigger the flip-flop 604 so as to produce a relatively high voltage on the left output terminal of the flip-flop. The flip-flop 604 becomes triggered by the passage of signals through the stages 1162, 1172 and 1174 in accordance with the logical equation:

$$d=G_1GU_NMT \quad (186)$$

where $G$=a signal from the cathode follower 1166; and the other terms have previously been defined.

As will be seen from the above equation, the term $U_N$M controlling the operation of the flip-flop 604 is equivalent to the term $yR$ in logical Equation 63 discussed fully above.

As discussed fully above in connection with logical Equation 64, a carry flip-flop becomes triggered to its false state only when the two quantities being added have simultaneous indications of "0." For this reason, signals pass through the "and" network 1186 only when signals of high amplitude are simultaneously introduced to the network from the cathode follower 710 and the right output terminal of the flip-flop 1168. These signals are able to pass through the "and" network 1186 only upon the occurrence of signals from the cathode follower 1166 and the left output terminal of the flip-flop 606.

The signals are further able to pass through the "and"

network 1186 only upon the occurence of a relatively high voltage on the left output terminal of the flip-flop 736. A connection is made to the "and" network 1186 from the left output terminal of the flip-flop 736 so that signals will pass through the "and" network only after the occurrence of the start pulse in the channel 154. This connection is necessary since the signals representing $\overline{U}_N$ are obtained in the positions even before the start pulse, as may be seen from the logic expressed in Equation 108.

The signals from the "and" network 1186 are introduced through the "or" network 1194 to the "and" network 1196. These signals are synchronized by the "and" network 1196 at optimum times in the clock cycles and are introduced to the right input terminal of the flip-flop 604. The signals trigger the flip-flop 604 for the prodction of a relatively high voltage on the right output terminal of the flip-flop. Signals pass through the stages 1186, 1194 and 1196 in accordance with the logical equation:

$$\overline{d}=S_2G_1G\overline{U}_N\overline{M}T \qquad (187)$$

where all of the terms have previously been defined.

Error signals representing $\epsilon=U_N-M$ are sometimes obtained. In order to minimize the number of stages in the digital differential analyzer, it would be desirable to use the same stages for obtaining $\epsilon=U_N-M$ as for obtaining $\epsilon=U_N+M$. As will be explained in the following paragraph, this has been accomplished by using different logic for controlling the operation of the carry flip-flop 604 when an operation to obtain $\epsilon=U_N-M$ is being performed.

As a first step in explaining this logic, it should be appreciated that M is made negative since it is being subtracted from $U_N$. This is generally accomplished by inverting the indications of M in each position and adding an indication of "1" in the position of least significance. This indication of "1" in the position of least significance can be added by making the carry flip-flop 604 true at the position of least significance. Since the indication of M are being inverted, the logic expressed in Equations 186 and 187 may be modified so that $$d=U_N\overline{M} \qquad (188)$$

$$\overline{d}=\overline{U}_NM \qquad (189)$$

The first step discussed in the previous paragraph can now be modified in a second step. This is accomplished by inverting the indications on both sides of Equations 188 and 189. This would produce the following equation for $\epsilon=U_N-M$:

$$\overline{d}=\overline{U}_NM \qquad (190)$$

$$d=U_N\overline{M} \qquad (191)$$

As will be seen, Equation 190 is the same as Equation 189 and Equation 191 is the same as Equation 189. Since the indications of the carry flip-flop 604 are being inverted in every position, they should also be inverted in the position of least significance. This would cause the carry flip-flop 604 to provide an indication of "0" at the position of least significance.

The discussion in the previous paragraphs may be seen from a particular example. For example, $U_N$ may have a value of 010110110, and M may have a value of 010101010, where the least significant digit it at the right in each instance. By using the logic expressed in Equations 188 and 189, the following results are obtained:

| | |
|---|---|
| 111101111 | D |
| 010110110 | $U_N$ |
| 101010101 | $\overline{M}$ |
| 000001100 | $\epsilon_1$ |

By using the logic expressed in Equations 190 and 191, the results are as follows:

| | |
|---|---|
| 111101000 | D |
| 010110110 | $U_N$ |
| 010101010 | M |
| 111110100 | $\epsilon_2$ |

As will be seen, the results obtained for $\epsilon_2$ are different from those obtained for $\epsilon_1$. The results obtained for $\epsilon_1$ represent the true difference of $\epsilon=U_N-M$. On this basis, it might appear that the results obtained for $\epsilon_2$ are wrong. But if the results of $\epsilon_1$ are negated by inverting the indications in each position and adding a "1" to the position of least significance, $\epsilon_2$ is obtained. This may be seen from the following:

```
111110011
        1
---------
111110100
```

As will be seen from the logic expressed in Equations 190 and 191, the carry flip-flop 604 becomes triggered to its true state for a condition represented by $U_N\overline{M}$ and becomes triggered to a false state for a condition represented by $\overline{U}_NM$. The "and" network 1164 in FIGURE 23 passes signals upon the occurrence of $U_N\overline{M}$ as represented by signals from the cathode follower 708 and the right output terminal of the flip-flop 1168. The "and" network 1164 passes these signals only for a servo operation as represented by a relatively high voltage on the left output terminal of the flip-flop 606. The "and" network further passes the signals only when the difference represented by $\epsilon=U_N-M$ is being obtained. Such error signals are obtained only when signals of high amplitude are produced by the cathode follower 1170 and introduced to the "and" network 1164. The operation of the cathode follower 1170 can be controlled so as to produce signals of high amplitude only upon occurrence of certain blocks.

The signals from the "and" network 1164 pass through the "or" network 1172 and the "and" network 1174 to the left input terminal of the flip-flop 604. The signals trigger the flip-flop 604 so as to produce a relatively high voltage on the left output terminal of the flip-flop. Voltages of high amplitude are produced on the left output terminal of the flip-flop 604 by the passage of signals through the stages 1164, 1172 and 1174 in accordance with the logical equation:

$$d=G_1\overline{G}U_N\overline{M}T \qquad (192)$$

where all of the terms have previously been defined.

The "and" network 1188 becomes prepared for activation at the same time as the "and" network 1164 because of its connection to the cathode follower 1170 and the left output terminal of the flip-flop 606. The "and" network 1188 then passes signals only after the occurrence of the start pulse in the channel 154, since it is connected to the left output terminal of the flip-flop 736. The reason for connecting the flip-flop 736 to the "and" network 1188 has been fully described in connection with the logic expressed in Equation 187. When the "and" network 1188 becomes prepared for activation, it passes signals representing $\overline{U}_N$M from the cathode follower 710 and the left output terminal of the flip-flop 1168.

The signals from the "and" network 1188 pass through the "or" network 1194 and the "and" network 1196 to the right input terminal of the flip-flop 604. The signals trigger the flip-flop so as to produce a relatively high voltage on the right output terminal of the flip-flop. The flip-flop 604 becomes triggered by the passage of signals through the stages 1188, 1194 and 1196 in accordance with the logical equation:

$$\overline{d}=S_2G_1\overline{G}\overline{U}_NMT \qquad (193)$$

where all of the terms have previously been defined.

It will be seen from the above discussion that an error is obtained from the combination of $U_N$ and M if there is an indication of "1" for $\epsilon$ in any position before position 17 for a servo block. The flip-flop 974 in FIGURE 19 is used to indicate the existence of an error for a servo block. The flip-flop 974 is available even at position "1," since the information recorded in the flip-flop to represent the polarity of $\Sigma dU$ is stepped out of the flip-flop at position 1. This has been described above in connection with the discussion relating to logical Equations 177, 178, 179 and 180.

Certain stages including the "and" network 1024 in FIGURE 19 are included to trigger the flip-flop 974 when an error in the combination of $U_N$ and M occurs. The "and" network 1024 passes signals only for a servo operation because of its connection to the left output terminal of the flip-flop 606. Because of its connection to the left output terminal of the flip-flop 736, the "and" network 1024 becomes further prepared for activation to pass signals only after the occurrence of the start pulse in the channel 154. When the "and" network 1024 becomes prepared for activation, it passes signals representing $\epsilon$ from the cathode follower 1026.

The signals from the "and" network 1024 are introduced through the "or" network 1036 to the "and" network 1038 and are synchronized by the "and" network 1038 at optimum times in the clock cycles. The signals are then applied to the left input terminal of the flip-flop 974 to trigger the flip-flop for the production of a relatively high voltage on the left output terminal of the flip-flop. This high voltage is produced by the passage of signals through the stages 1024, 1036 and 1038 in accordance with the logical equation:

$$c_2'' = \epsilon S_2 G_1 T \qquad (194)$$

where all of the terms have previously been defined.

When the flip-flop 974 becomes triggered to its true state in accordance with the logic expressed in Equation 194 to indicate an error signal, the flip-flop remains in this state of operation until the end of the servo block. In this way, the flip-flop 974 controls the recordation of error signals in the channel 138 for the block undergoing computation. The polarity of the error signal is represented by the state of operation of the carry flip-flop 604 at position 18. The action of the carry flip-flop 604 in indicating the polarity of the error signal is similar to that of the carry flip-flop 432 in indicating the overflow in a normal integrator. The overflow indications provided by the carry flip-flop 432 have been fully described above and expressed logically in Equations 63 and 64.

Since servo operations are being performed, the polarity of the error signals must be inverted to obtain the proper correction. For example, when a negative error is obtained by combining $U_N$ and M, positive additions must be made to overcome this negative error. These positive additions are made by inverting the polarity of the negative error signals at the time that the error signals are being recorded in the channel 138. In this way, positive increments are presented to the servo block in the next cycle of computation to overcome the negative error signal. In like manner, negative increments are presented to the servo block in the next cycle of computation to overcome positive error signals.

The error signals are inverted and recorded in the channel 138 by the operation of certain stages shown in FIGURES 29 and 30. These stages include the "and" network 1490 in FIGURE 29. The "and" network 1490 passes signals only upon the occurrence of a negative error signal as represented by signals of high amplitude on the left output terminal of the flip-flop 974 and the right output terminal of the flip-flop 604. The signals from the "and" network 1490 pass through the "or" network 1488 to the "and" network 1486. The signals are able to pass through the "and" network 1486 only at position 18 for blocks undergoing servo operation. This result is obtained because of the connections to the "and" network 1486 from the "and" network 216 and the left output terminal of the flip-flop 606.

The signals passing through the "and" network 1486 are introduced through the "or" network 1478 to the "and" network 1480. These signals are passed by the "and" network 1480 only during periods of actual computation, as represented by signals of high amplitude from the cathode follower 1340. The signals then pass to the left input terminal of the flip-flop 337 so as to trigger the flip-flop for the production of a relatively high voltage on the left output terminal of the flip-flop. The flip-flop 337 receives the signals passing through the stages 1490, 1488, 1486, 1478 and 1480 in accordance with the logical equation:

$$_0z = \alpha G_1 P_{18} \overline{D} C_2'' T \qquad (195)$$

where all of the terms have previously been defined.

The signals of high amplitude on the left output terminal of the flip-flop 337 are introduced to the coil 270 to produce a recordation of an andication of "1" in the channel 138.

Error signals of positive polarity pass through the "and" network 1534 in FIGURE 30. This occurs because of the connections to the "and" network 1534 from the left output terminals of the flip-flops 604 and 974. The signals then pass through the "or" network 1532 to the "and" network 1530. The "and" network 1530 becomes open for the passage of these signals only at position 18 for a servo operation. The signals passing through the "and" network 1530 are then applied through the "or" network 1522 to the "and" network 1524, which passes the signals whether or not computation is actually proceeding. The "and" network 1524 passes the signals even during periods of idling, since it is desirable to record indications of "0" in the channel 138 at all times except when indications of "1" have to be recorded. The signals from the "and" network 1524 trigger the flip-flop 337 into a false state of operation, so that an indication of "0" is recorded by the coil 270 in the channel 138. Indications of "0" are recorded by the coil 270 in the channel 138 by the passage of signals through the stages 1534, 1532, 1530, 1522 and 1524 in accordance with the logical equation:

$$\overline{_0z} = G_1 P_{18} D C_2'' T \qquad (196)$$

where all of the terms have previously been defined.

ANALOGUE-TO-DIGITAL CONVERSION OF ERROR SIGNALS FOR SERVOS

As previously described in connection with the block diagram shown in FIGURE 42, the error signals obtained by the block 1708 are sometimes introduced to the external source such as the converter 1714 to vary the operation of the external source. In such cases, it is necessary to convert the signals digitally representing the error into a corresponding analogue signal. The analogue signal then drives the external source such as a control shaft in a direction to reduce the magnitude of the error signal.

The stages shown in FIGURE 24 operate to convert the error signals from a digital form to an analogue form. These stages include the "and" network 1274. The "and" network 1274 becomes prepared for activation only when a relatively high voltage is produced on the left output terminal of the flip-flop 244. Since the flip-flop 244 is the second counter in the block counters, the "and" network 1274 can become activated in only two out of every four blocks. Actually, the "and" network 1274 passes signals in only one of the two activated blocks since signals representing M are introduced to the digital differential analyzer for a servo operation in only every other block. This may be seen from the logic expressed for the M flip-flop 1168 in Equation 181 and from the inclusion of the "$K_1$" term in this logic. Since the "and"

network 1274 can become activated only in two blocks out of every four and detection of error between $U_N$ and M can occur only in every other block, the "and" network 1274 actually passes information signals only in one block out of every four.

The "and" network 1274 can pass signals only in positions 2 to 17, inclusive, for each block. This results from the connection between the "and" network 1274 and the inverter 541. The "and" network 1274 is further able to open only in the positions after the start pulse in the channel 154, as represented by a relatively high voltage on the left output terminal of the flip-flop 736.

When the "and" network 1274 becomes prepared for activation, it passes the signals from the cathode follower 1026 representing the error $\epsilon$. These signals pass through the "or" network 1280 to the "and" network 1278, which synchronizes the signals at optimum times in the clock cycles. The signals then pass to the left input terminal of the flip-flop 976 and trigger the flip-flop for the production of a relatively high voltage on the left output terminal of the flip-flop. The flip-flop 976 is triggered by the signals passing through the stages 1274, 1280 and 1278 in accordance with the logical equation:

$$e_4=\epsilon S_2K_2P_{2/17}T \qquad (197)$$

where $e_4$=the introduction of a triggering signal to the left input terminal of the flip-flop 976; and the other terms have previously been defined.

The "and" network 1284 becomes prepared for activation at the same time as the "and" network 1274. However, the "and" network 1284 passes the signals from the cathode follower 1050 representing a lack of error for the different positions. This lack of error is designated as $\bar{\epsilon}$. The signals from the "and" network 1284 pass through the "or" network 1290 to the "and" network 1288. These signals are synchronized at optimum times in the clock cycles by the "and" network 1288 and are introduced to the right input terminal of the flip-flop 976. The signals trigger the flip-flop such that a relatively high voltage is produced on the right output terminal of the flip-flop. A relatively high voltage is produced on the right output terminal of the flip-flop 976 by the passage of signals through the stages 1284, 1290 and 1288 in accordance with the logical equation:

$$\bar{e}_4=\bar{\epsilon} S_2K_2P_{2/17}T \qquad (198)$$

where $\bar{e}_4$=the introduction of a triggering signal to the right input terminal of the flip-flop 976; and the other terms have previously been defined.

The information in the flip-flop 976 is stepped into the flip-flop 1238 in successive pulse positions. This results from the operation of certain stages including the "and" network 1256 in FIGURE 24. The "and" network 1256 becomes prepared for activation only in positions 1 to 4, inclusive of the same blocks in which the "and" networks 1274 and 1284 pass signals. The "and" network 1256 passes signals at these times because of its connection to the "and" network 1232 and the left output terminal of the flip-flop 244. The signals from the "and" network 1256 are introduced through the "or" network 1262 to the "and" network 1264 for synchronization at optimum times in the clock cycles. The signals passing through the "and" network 1264 are then introduced to the left input terminal of the flip-flop 1238 to trigger the flip-flop into a true state of operation. The flip-flop 1238 is triggered into a true state of operation by the passage of signals through the stages 1256, 1262 and 1264 in accordance with the logical equation:

$$e_3=E_4P_{1/4}K_2T \qquad (199)$$

where $e_3$=the introduction of a triggering signal to the left input terminal of the flip-flop 1238;

$E_4$=a relatively high voltage on the left output terminal of the flip-flop 976;

$P_{1/4}$=a signal form the "and" network 1232; and the other terms have previously been defined.

The "and" network 1266 becomes prepared for activation at the same time as the "and" network 1256. However, the "and" network 1266 passes the signals of high amplitude on the right output terminal of the flip-flop 976. These signals pass through the "or" network 1270 to the "and" network 1272. The "and" network 1272 synchronizes the signals at optimum times in the clock cycles and introduces the signals to the right input terminal of the flip-flop 1238 so that the flip-flop can be triggered into a false state of operation. Signals pass to the flip-flop 1238 through the stages 1266, 1270 and 1272 in accordance with the logical equation:

where $$\bar{e}_3=\bar{E}_{1/4}K_2T \qquad (200)$$

$\bar{e}_3$=the introduction of a triggering signal to the right input terminal of the flip-flop 1238;

$\bar{E}_4$=a relatively high voltage on the right output terminal of the flip-flop 976; and the other terms have previously been defined.

Just as the information in the flip-flop 976 is stepped into the flip-flop 1238, the information in the flip-flop 1238 is stepped into the flip-flop 1246. The information is stepped from the flip-flop 1238 to the flip-flop 1246 in the same positions as the stepping operation from the flip-flop 976 to the flip-flop 1238. In these positions, the signals of high amplitude on the left output terminal of the flip-flop 1238 pass through the "and" network 1236 and the "or" network 1242 to the "and" network 1244 for synchronization at optimum times in the clock cycles. The signals then pass to the left input terminal of the flip-flop 1246 and trigger the flip-flop so as to produce a relatively high voltage on the left output terminal of the flip-flop. The flip-flop 1246 receives the signals passing through the stages 1236, 1242 and 1244 in accordance with the logical equation:

$$e_2=E_3P_{1/4}K_2T \qquad (201)$$

where $e_2$=the introduction of a triggering signal to the left input terminal of the flip-flop 1246;

$E_3$=a relatively high voltage on the left output terminal of the flip-flop 1238; and the other terms have previously been defined.

The "and" network 1247 becomes prepared for opening at the same time as the "and" network 1236 but passes the signals of high amplitude on the right output terminal of the flip-flop 1238. These signals are introduced through the "or" network 1250 to the "and" network 1252 which synchronizes the signals at optimum times in the clock cycles. The signals are then applied to the right input terminal of the flip-flop 1246 to trigger the flip-flop into its "off" condition, as represented by a relatively high voltage on the right output terminal of the flip-flop. Such a voltage is produced by the passage of signals through the stages 1247, 1250 and 1252 in accordance with the logical equation:

$$\bar{e}_2=\bar{E}_3P_{1/4}K_2T \qquad (202)$$

where $\bar{e}_2$=the introduction of a triggering signal to the right input terminal of the flip-flop 1246;

$\bar{E}_3$=a relatively high voltage on the right output terminal of the flip-flop 1238; and the other terms have previously been defined.

The stepping operation from the flip-flop 976 to the flip-flop 1238 and then to the flip-flop 1246 occurs only in positions 1 to 4, inclusive, for a servo block. After position 4 for a servo block, the flip-flops 976, 1238 and 1246 perform a somewhat different function. This results from the fact that the difference as represented by $\epsilon=U_N \pm M$ is sometimes relatively large. Since only a limited correction can be provided in the operation of an external source such as an output shaft in each cycle of computation, it is not necessary to record the exact magnitude of the error for values beyond a particular magnitude. For this reason, positive errors are limited to a maximum value of +3 even for errors considerably greater than this value. Similarly, negative errors are limited to a maximum value of −4 even for errors having a considerably greater magnitude than this value.

The flip-flops 976, 1238 and 1246 operate after position 4 of a servo block to detect whether the error is outside of the range $+3 \leqq \epsilon \leqq -4$. As one step in this operation, the flip-flop 976 detects any error signals in accordance with the logic expressed in equations 197 and 198. This detecting operation by the flip-flop 976 continues after position 4 since the term $P_{2/17}$ is included as a part of the logic in equations 197 and 198.

The flip-flops 1238 and 1246 compare successive pairs of indications. As may be seen from the table shown in FIGURE 44, positive errors having a magnitude greater than +3 are obtained when indications of "1" and "0" occur in any two successive positions after position 4 for a servo block. When this occurs, relatively high voltages are simultaneously obtained from the cathode follower 1050 and the left output terminal of the flip-flop 976. These signals are introduced to the "and" network 1240 in FIGURE 24.

The "and" network 1240 is able to pass the signals from the cathode follower 1050 and from the left output terminal of the flip-flop 976 only during positions 5 to 18, inclusive, for the block undergoing computation. This results from the fact that the "and" network is connected to the inverter 1234. Since the "and" network 1240 is connected to the left output terminal of the flip-flop 736, the "and" network is able to open for the passage of signals only after the occurrence of the start pulse in the channel 154. Because of this, the "and" network 1240 is able to open only in the positions holding digital information for a block. The "and" network 1240 is further able to open in every alternate pair of blocks as a result of the introduction of a signal from the left output terminal of the flip-flop 244.

The signals from the "and" network 1240 pass through the "or" network 1242 and the "and" network 1244 and trigger the flip-flop 1246 to its true state. The flip-flop 1246 is triggered by these signals in accordance with the logical equation:

$$e_2=\bar{\epsilon}E_4S_2K_2P_{5/18}T \qquad (203)$$

where all of the terms have previously been defined.

Similarly, the signals from the "and" network 1240 pass through the "or" network 1262 and the "and" network 1264 and trigger the flip-flop 1238 to its true state. Signals pass through the stages 1240, 1262 and 1264 in accordance with the logical equation:

$$e_3=\bar{\epsilon}E_4S_2K_2P_{5/18}T \qquad (204)$$

where all of the terms have previously been defined.

As will be seen in the table shown in FIGURE 44, a positive error is represented by an indication of "0" at position 17. This is true whether the magnitude of the error is less than or greater than +3. For this reason, the flip-flop 976 is triggered to its false state at position 17 in accordance with the logic expressed in equation 198. Since the flip-flops 1238 and 1246 are triggered to their true states for positive errors greater than +3, the flip-flops 976, 1238 and 1246 operate in a pattern to indicate a pattern of +3 for positive errors greater than this pattern.

Just as the flip-flops 976, 1238 and 1246 convert positive errors greater than +3 into indications of +3, the flip-flops convert negative errors having magnitudes greater than −4 into indications of −4. As will be seen from the table shown in FIGURE 44, negative errors of magnitudes greater than −4 are represented by indications of "0" and then "1" in a pair of successive positions in which at least one of the positions occurs after position 4 for a servo block. This causes signals of high amplitude to be simultaneously obtained from the cathode follower 1026 and the right output terminal of the flip-flop 976. These signals are introduced to the "and" network 1248, which becomes prepared for activation at the same time as the "and" network 1240.

The signals passing through the "and" network 1248 are passed by the "or" network 1250 and the "and" network 1252 to the flip-flop 1246 to trigger the flip-flop into its false state of operation. The flip-flop 1252 receives the signals passing through the stages 1248, 1250 and 1252 in accordance with the logical equation:

$$\bar{e}_2=\epsilon\bar{E}_4S_2K_2P_{5/18}T \qquad (205)$$

where all of the terms have previously been defined.

Similarly, the flip-flop 1246 becomes triggered to its false state by the passage of signals through the stages 1248, 1270 and 1272 in accordance with the logical equation:

$$\bar{e}_3=\epsilon\bar{E}_4S_2K_2P_{5/18}T \qquad (206)$$

where all of the terms have previously been defined.

As will be seen in the table shown in FIGURE 44, negative errors are represented by an indication of "1" at position 17, regardless of the magnitude of the error. This causes the flip-flop 976 to be triggered to its true state at position 17. Since the flip-flops 1238 and 1246 have already been triggered to their false state for negative errors having a magnitude greater than −4, the flip-flops 976, 1238 and 1246 provide an indication of −4 for negative errors greater than −4.

At position 17 for a servo block, the flip-flops 976, 1238 and 1246 provide a parallel representation of an indication within the range of $+3=\epsilon=-4$. The indication provided by the flip-flops 976, 1238 and 1246 are thereafter converted into an analogue voltage corresponding to the value indicated by the parallel state of operation of the flip-flops. This digital-to-analogue conversion may be provided by circuitry similar to that disclosed in copending application, Ser. No. 467,155, filed Nov. 5, 1954, by Leo P. Retzinger, Jr.

As disclosed in co-pending application Ser. No. 467,155, the operation of flip-flops corresponding to the flip-flops 976, 1238 and 1246 controls the charging of a pair of capacitances in push-pull relationship. In order to insure the full charging of these capacitances, the charging takes place during the presentation for computation of the two blocks after the servo block. These two blocks are represented by a false state of operation of the flip-flop 244, designated previously as the "$K_2$" flip-flop.

FIGURE 45 provides a curve illustrating the sequence of operations for obtaining an analogue error signal. During the two blocks in which the flip-flop 244 is in a true state of operation, the flip-flops 976, 1238 and 1246 become prepared for operation. The flip-flops 976, 1238 and 1246 operate to obtain an error signal in digital form during the second of these two blocks. This results from the inclusion of the $K_1$ term in the logic expressed in Equation 181 for controlling the operation of the M flip-flop 1168. During the following two blocks in which the flip-flop 244 is in a false state of operation, the indications in the flip-flops 976, 1238 and 1246 are converted into a corresponding analogue voltage as by the charging of certain capacitances. This voltage is used to drive an external member such as an output shaft in a direction to minimize the error signal. In this way, a servo operation for controlling the functioning of an output member can be obtained in only one out of every four blocks.

$H_1$, $H_2$ AND $H_3$ SERVOS

Several different types of servos are used in the digital differential analyzer described above and forming a part of this invention. One type of servo will be designated as the $H_1$ servo. A simplified block diagram of the $H_1$ type of servo is shown in FIGURE 46. The servo includes a servo block 1790 such as in the digital differential analyzer constituting this invention. The output from the servo block 1790 is fed into a computer 1792 through a line 1794 to control the operation of this stage. The output from the stage 1794 is in turn introduced to the computer through a line 1796. The computer 1792 may actually be other blocks in the digital differential analyzer than the servo block 1790.

The signals passing through the line 1796 correspond to the signals in the line 1794. However, because of the operation of the servo block 1790, the signals in the line 1796 are delayed for one cycle of computation before they reach the line 1794. The signals in the line 1796 represent increments which may be designated as "$dI$." These signals are obtained from the output channel 138 as $dz$ increments in a manner similar to that described above. Similarly, the signals in the line 1794 represent increments which may be designated as "$dW$." When the signals representing $dW$ are introduced to the servo block 1790, they may be designated as $dI$.

The operation of the servo system illustrated schematically in FIGURE 46 may be seen from a typical example such as that shown below:

| Revolutions | dI = dW | I | dz | dw |
|---|---|---|---|---|
| n | | + | - | |
| n + 1 | | +1 | - | - |
| n + 2 | - | 0 | - | - |
| n + 3 | - | -1 | + | - |
| n + 4 | - | -2 | + | + |
| n + 5 | + | -1 | + | + |
| n + 6 | + | 0 | + | + |
| n + 7 | + | +1 | - | + |
| n + 8 | + | +2 | - | - |
| n + 9 | - | +1 | - | - |

As will be seen from the above example, the polarity of the indications representing $dz$ are determined by inverting the polarity of I. If $I=0$, the polarity of the $dz$ increment is obtained by inverting the polarity of I in the previous cycle of computation. Since I represents an error, it will be seen that the error fluctuates between +2 and −2 in successive cycles of computation. On the basis of the above example, $$(dz)_n = -I$$

where $I \neq 0$ and $n$=the $n$th cycle of computation.

Also $$(dz)_n = -I_{n-1}$$

where $I=0$ in the $n$th cycle of computation.

It will be seen that an error is presumed in an $H_1$ type servo even when $I_n=0$, since the error is then determined from the polarity of I in the previous cycle of computation. For this reason, it is desirable to trigger the flip-flop 974 to its true state of operation at position 1 to simulate an error even though no error resulting from the logic expressed in Equation 194 may actually occur. The "and" network 1032 is included in FIGURE 19 to pass signals for triggering the flip-flop 974 to its true state for an $H_1$ type servo. The "and" network 1032 passes a signal only at position 1 of a single-block operation or the second half of a double-block operation. This results from the connections to the "and" network 1032 from the "and" network 222 and the right output terminal of the flip-flop 390. The "and" network 1032 is further able to pass signals only upon the simultaneous occurrence of high voltages on the left output terminals of the flip-flops 542 and 606. At position 1, the simultaneous occurrence of these high voltages indicates an $H_1$ type servo. In this way, an indication of "1" in the channel 148 at position 1 of a servo operation provides a permanent code to represent an $H_1$ type servo.

The signals from the "and" network 1032 pass through the "or" network 1036 and the "and" network 1038 to the flip-flop 974. The signals trigger the flip-flop 974 into a true state as represented by a relatively high voltage on the left output terminal of the flip-flop. The signals trigger the flip-flop 974 in accordance with the logical equation:

$$c''_2 = Y_p G_1 P_1 \overline{G}_5 T \qquad (207)$$

where all of the terms have previously been defined.

Since the flip-flop 974 is triggered to its true state at position 1 for an $H_1$ type servo, an error pulse can be recorded in the channel 138 at position 18 in a normal manner. This pulse is recorded in accordance with the logic expressed in Equations 195 and 196. As expressed logically in these equations, an indication of "1" is recorded in the channel 138 for a negative error and an indication of "0" is recorded for a positive error. When the error is zero, a pulse is recorded with a polarity inverted relative to that of the error in the previous cycle of computation. This is recorded automatically because of the operation of the networks shown in FIGURE 23 and expressed logically in Equations 186, 187, 192 and 193. The automatic operation of the networks shown in FIGURE 23 to determine the polarity of the error in the previous cycle of computation for an eror of zero in the present cycle is equivalent to the operaton described above for a "zero-rate" addition for an addition of $y=0$ with a value of R. This has been described above in connection with the logic described in Equations 65 and 66.

It will be seen that the response of the $H_1$ type servo is relatively slow since the error of this servo fluctuates between values of +2 and −2. It would be more desirable, for example, if the servo could be made to fluctuate between errors of only +1 and −1. This is obtained in an $H_2$ type servo. This type of servo operates in a manner similar to the $H_1$ type of servo, except when an error of 0 occurs. For an error of zero, the servo obtains a $dz$ increment having a polarity opposite to that of the $dz$ increment in the previous cycle of computation.

The operation of an $H_2$ type servo may be seen from a specific example:

| Revolutions | dI = dw | I | dz | dw |
|---|---|---|---|---|
| n | | + | - | |
| n + 1 | | +1 | - | - |
| n + 2 | - | 0 | + | - |
| n + 3 | - | -1 | + | + |
| n + 4 | + | 0 | - | + |
| n + 5 | + | +1 | - | - |
| n + 6 | - | 0 | + | - |
| n + 7 | - | -1 | + | + |
| n + 8 | + | 0 | - | + |
| n + 9 | + | +1 | - | |

On the basis of the above example, the operation of an $H_2$ type servo may be expressed as $$(dz) = -I_n \text{ if } I_n \neq 0$$

$$(dz)_n = -(dz)_{n-1} \text{ if } I_n = 0$$

When $I_n \neq 0$, $(dz)_n$ may be obtained by the operation of certain stages shown in FIGURES 29 and 30. This has been expressed logically in Equations 195 and 196. Certain stages are also included in FIGURES 29 and 30 to obtain $(dz)_n$ when $I_n=0$. These stages include the "and" network 1496 in FIGURE 29.

The "and" network 1496 passes signals when no error is obtained, as represented by a relatively high voltage on the right output terminal of the flip-flop 974. This corresponds to $I_n=0$. The "and" network 1496 further passes signals only upon the occurrence of a coding pulse. This coding pulse is represented by a relatively high voltage on the right output terminal of the flip-flop 542. Upon the introduction of high voltages from the flip-flops 542 and 974, the "and" network 1496 passes the signals of high amplitude on the right output terminal of the flip-flop 284. This signal represents in inverted form the error signal recorded for the $H_2$ type servo in the previous cycle of computation.

The signals from the "and" network 1496 are introduced through the "or" network 1488 to the "and" network 1486. The "and" network 1486 passes the signals only at position 18 for a servo operation. This results from the fact that the "and" network 1486 is connected to the "and" network 216 and the left output terminal of the flip-flop 606. The signals from the "and" network 1486 pass through the "or" network 1478 to the "and" network 1480. The "and" network 1480 passes the signals only during periods of actual computation, as represented by signals of high amplitude from the cathode follower 1340. The signals then pass to the left input terminal of the flip-flop 337 and trigger the flip-flop to produce a relatively high voltage on the left output terminal of the flip-flop. This voltage causes an indication of "1" to be recorded by the coil 270 in the channel 138. An indication of "1" is recorded in the channel 138 by the passage of signals through the stages 1496, 1488, 1486, 1478 and 1480 in accordance with the logical equation:

$$ {}_0z=\alpha P_{18}G_1\overline{Z}_2\overline{U}''_2Y_pT \qquad (208)$$

where all of the terms have previously been defined.

The "and" network 1540 in FIGURE 30 becomes prepared for activation at the same time as the "and" network 1496 in FIGURE 29 but passes the signals of high amplitude on the left output terminal of the flip-flop 284. These signals pass through the stages 1532, 1530, 1522 and 1524 (FIGURE 30) respectively corresponding to the stages 1488, 1486, 1478 and 1480 in FIGURE 29. However, the "and" network 1524 passes signals during periods of idling as well as during periods of actual computation. This occurs because it is desirable to record indications of "0" in the channel 138 at all times that indications of "1" are not being recorded.

The signals from the "and" network 1524 pass to the right input terminal of the flip-flop 337. The signals trigger the flip-flop 337 for the production of a relatively high voltage on the right output terminal of the flip-flop and a relatively low voltage on the left output terminal of the flip-flop. The low voltage on the left output terminal of the flip-flop 337 causes an indication of "0" to be recorded by the coil 270 in the channel 138. The flip-flop 337 is triggered into its false state by the passage of signals through the stages 1540, 1532, 1530, 1522 and 1524 in accordance with the logical equation:

$$\overline{z}=P_{18}G_1Z_2\overline{U}''_2Y_pT \qquad (209)$$

where all of the terms have previously been defined.

In addition to the $H_1$ and $H_2$ types of servos, a third type of servo is used. This servo has been designated as the $H_3$ type and is shown in simplified block form in FIGURE 47. In the $H_3$ type of servo, the output from a servo block 1798 in each cycle of computation is fed directly into the input to the servo block in the next cycle. Inputs from other sources such as from other blocks may also be introduced as inputs to the servo block 1798 in each cycle of computation. Such inputs are shown in FIGURE 47 as being introduced on lines A and B to the servo block shown in the figure.

The operation of an $H_3$ type of servo may be seen from a specific example:

| Revolutions | A | B | dI | I | dz |
|---|---|---|---|---|---|
| n | + | + | + | 0 | - |
| n + 1 | - | - | - | -3 | + |
| n + 2 | + | + | + | 0 | + |
| n + 3 | - | - | + | -1 | + |
| n + 4 | + | + | + | +2 | - |
| n + 5 | + | - | - | +1 | - |
| n + 6 | - | + | - | -2 | + |
| n + 7 | + | - | + | -1 | + |
| n + 8 | - | + | + | 0 | + |
| n + 9 | + | + | + | +3 | - |
| n + 10 | - | - | - | 0 | - |
| n + 11 | + | + | - | +1 | - |
| n + 12 | + | - | - | 0 | - |
| n + 13 | + | - | - | -1 | - |
| n + 14 | + | - | + | 0 | + |

In the above example, I in each cycle of computation is obtained by adding A, B and *d*I for that cycle of computation and the value of I from the previous cycle of computation. As will be seen from the above example, the *dz* increment is obtained by inverting the polarity of the error signal I in the same cycle of computation. If the error signal for the cycle of computation is zero, the polarity of the *dz* increment is the same as that of the *dz* increment in the previous cycle of computation. This may be expressed as $$(dz)=-I_n \text{ if } I_n\neq 0 \qquad (210)$$

$$(dz)_n=(dz)_{n-1} \text{ if } I_n=0 \text{ and } I_{n-1}\neq 0 \qquad (211)$$

Although the following expression cannot be seen from the above example, it will be seen from subsequent examples. This expression is as follows:

$$(dz)_n=-(dz)_{n-1} \text{ if } I_n=0 \text{ and } I_{n-1}=0 \qquad (212)$$

The expression may be obtained for an $H_3$ type of servo by making either the A input or the B input zero.

The logic developed in the previous paragraph has been incorporated into the digital differential analyzer by the operation of certain stages shown in FIGURES 29 and 30. To obtain the logic expressed in Equation 210, certain stages shown in FIGURES 29 and 30 operate in accordance with the logic developed above in Equations 186, 187, 192 and 193 and Equations 195 and 196. The operation of these stages has been discussed fully above.

The "and" network 1492 in FIGURE 29 operates in combination with other stages to produce signals representing the logic expressed in Equation 211. As may be seen from the logic expressed in Equation 211, the "and" network 1492 produces a signal only when an error is not produced in the cycle undergoing computation. As previously described, the lack of an error is represented by a signal of high amplitude on the right output terminal of the flip-flop 974. In further conformity with the logic expressed in Equation 211, the "and" network 1492 passes a signal only when an error signal has occurred in the previous cycle of computation, as represented by a signal of high amplitude on the left output terminal of the flip-flop 688. The production of such signals of high amplitude in the flip-flop 688 will be described in detail subsequently. The "and" network 1492 is further able to become activated only for an $H_3$ type of servo and not for either an $H_1$ or $H_2$ type of servo. This is represented by a relatively high voltage on the right output terminal of the flip-flop 542.

When the "and" network 1492 becomes prepared for activation, it passes the signals of high amplitude on the left output terminal of the flip-flop 284. These signals represent the *dz* increment recorded in the channel 138 for the $H_3$ servo in the previous cycle of computation. The signals from the "and" network 1492 are introduced through the "or" network 1488 to the "and" network 1486, which passes the signals only at position 18 for a servo operation. The operation of the "and" network 1486 has been described in detail previously.

The signals from the "and" network 1486 then pass through the "or" network 1478 to the "and" network 1480, which passes the signals only during periods of actual computation. The signals trigger the flip-flop 337 for the production of a relatively high voltage on the left output terminal of the flip-flop. This voltage causes the coil 270 to record an indication of "1" in the channel 138. The indication of "1" is recorded in the channel 138 by the passage of signals through the stages 1492, 1488, 1486, 1478 and 1480 in accordance with the logical equation:

$$_0z=\alpha\bar{Y}Z_2\bar{C}_2''UP_{18}G_1T \qquad (213)$$

where all of the terms have previously been defined.

The "and" network 1536 in FIGURE 30 becomes prepared for activation at the same time as the "and" network 1492 in FIGURE 29. However, the "and" network 1536 passes the signals of high amplitude on the right output terminal of the flip-flop 284 representing a negative *dz* increment recorded in the previous cycle of computation. The signals from the "and" network 1536 pass through the stages 1532, 1530, 1522 and 1524 to the right input terminal of the flip-flop 337 in a manner similar to that described above. These signals trigger the flip-flop 337 to its false state such that an indication of "0" is recorded by the coil 270 in the channel 138. The flip-flop 337 becomes triggered to its false state by signals passing through the stages 1536, 1532, 1530, 1522 and 1524 in accordance with the logical equation:

$$_0\bar{z}-\bar{Z}_2\bar{Y}_p\bar{C}_2''UP_{18}G_1T \qquad (214)$$

where all of the terms have previously been defined.

Equation 212 indicates that a *dZ* increment in a cycle of computation is obtained by inverting the polarity of the increment in the previous cycle of computation when both cycles of computation have errors of "0." The "and" network 1494 in FIGURE 29 passes a signal under such circumstances. The "and" network 1494 becomes prepared for activation when errors of "0" are obtained in the present and immediately preceding cycles of computation. This is represented by relatively high voltages on the right output terminals of the flip-flops 688 and 974. When the "and" network 1494 becomes prepared for activation, it passes the signals of high amplitude on the right output terminal of the flip-flop 284. These signals represent *dZ* increments of negative polarity from previous cycles of computation.

The signals from the "and" network 1494 pass through the "or" network 1488 to the "and" network 1486, which prevents the signals from passing except at position 18 of a servo operation as described previously. The signals from the "and" network 1486 are then introduced through the "or" network 1478 to the "and" network 1480, which passes the signals only during periods of actual computation. The signals passing through the "and" network 1480 trigger the flip-flop 337 to its true state, such that an indication of "1" is recorded by the coil 270 in the channel 138. The flip-flop 337 receives the signals passing through the stages 1494, 1488, 1486, 1478 and 1480 in accordance with the logical equation:

$$_0z=\alpha\bar{Z}_2\overline{UC}_2''G_1P_{18}T \qquad (215)$$

where all of the terms have previously been defined.

Just as the "and" network 1494 in FIGURE 29 passes the signals of high amplitude on the right output terminal of the flip-flop 284, the "and" network 1538 in FIGURE 30 passes the signals of high amplitude on the left output terminal of the flip-flop. These signals pass through the "or" network 1532 and the "and" network 1530 at position 18 for a servo operation. The signals then pass through the "or" network 1522 and the "and" network 1524 to the right input terminal of the flip-flop 337. The signals trigger the flip-flop 337 to its false state of operation, such that an indication of "0" is recorded by the coil 270 in the channel 138. The flip-flop 337 becomes triggered to its false state by the passage of signals through the stages 1538, 1532, 1530, 1522 and 1524 in accordance with the logical equation:

$$_0\bar{z}=Z_2\overline{UC}_2''G_1P_{18}T \qquad (216)$$

where all of the terms have previously been defined.

It will be seen from Equations 213, 214, 215 and 216 that the information relating to an error or lack or error in a servo operation is recorded in the channel 156 during each cycle of computation. The recordation of this information in the channel 156 is provided by the operation of certain stages including the "and" network 1432 shown in FIGURE 28. The "and" network 1432 becomes prepared for activation only at position 18 of a servo operation because of its connections to the "and" network 216 and the left output terminal of the flip-flop 606. The "and" network 1432 is further able to pass a signal only after the information relating to $U_N$ and M has been fully presented for computation in the block. This is represented by a relatively high voltage on the right output terminal of the start flip-flop 736. When the "and" network 1432 becomes prepared for activation, it passes the signals of high amplitude on the left output terminal of the flip-flop 974. These signals represent differences resulting from the combination of $U_N$ and M.

The signals from the "and" network 1432 are introduced through the "or" network 1426 to the "and" network 1424. The "and" network 1424 passes signals only during periods of actual computation since the "and" network is connected to the cathode follower 1340. The signals from the "and" network 1424 pass through the "or" network 1420 to the "and" network 1418 for synchronization at optimum times in the clock cycles. The signals are then introduced to the left input terminal of the flip-flop 1414 to trigger the flip-flop into its true state for the production of a relatively high voltage on the left output terminal of the flip-flop. This voltage causes the coil 1416 to record an indication of "1" in the channel 156. Signals pass to the flip-flop 1414 through the stages 1432, 1426, 1424, 1420 and 1418 in accordance with the logical equation:

$$_0U=\alpha C_2''\bar{S}_2G_1P_{18}T \qquad (217)$$

where all of the terms have previously been defined.

Figure 28:
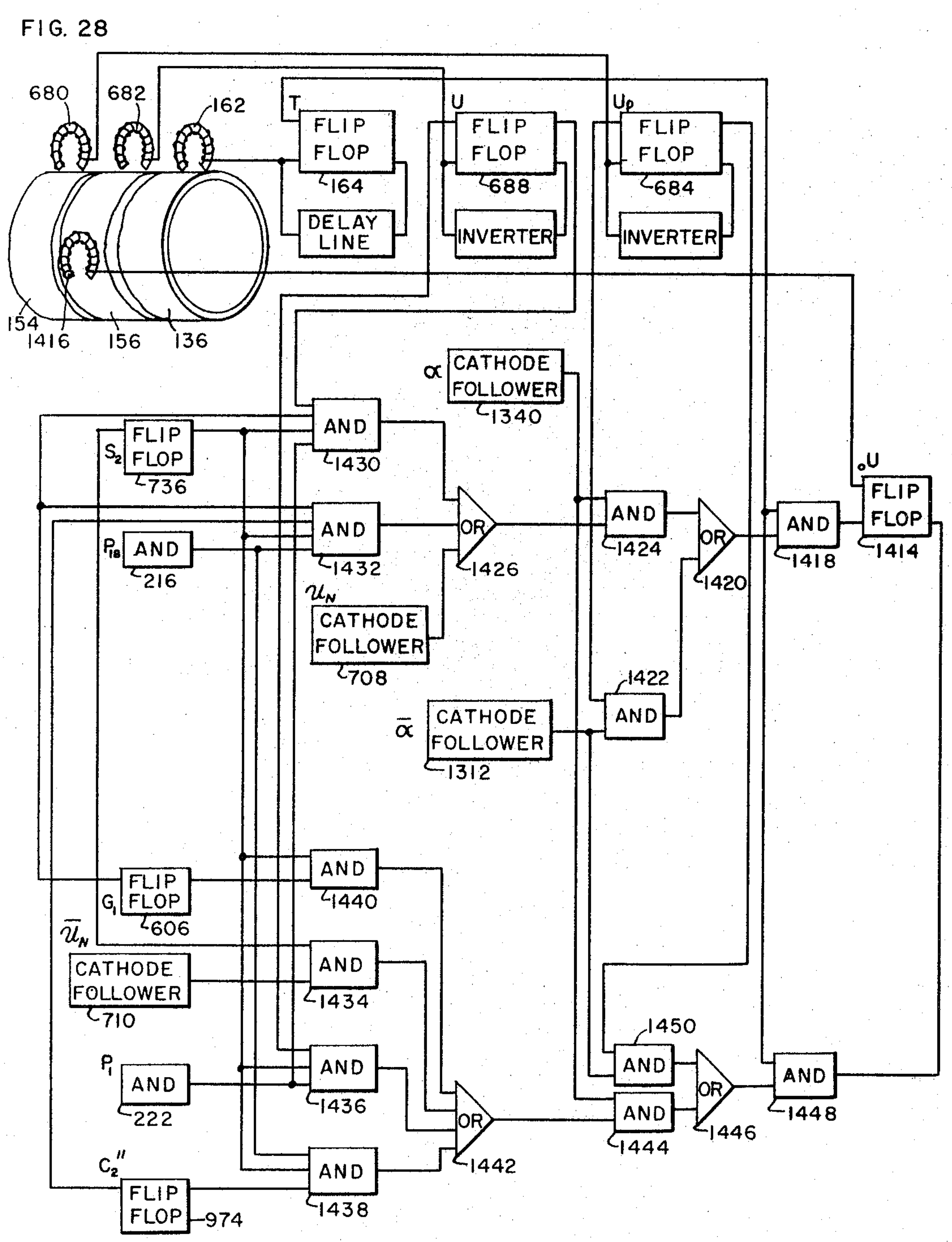

The "and" network 1438 in FIGURE 28 passes signals when an error of "0" is obtained for a servo operation in a cycle of computation. The "and" network 1438 passes such signals because of its connection to the right output terminal of the flip-flop 974. The signals are able to pass through the "and" network 1438 only at position 18 for blocks in which all of the numerical information has already been presented. This results from the fact that the "and" network 1438 is connected to the "and" network 216 and the right output terminal of the flip-flop 736.

The signals from the "and" network 1438 pass through the "or" network 1442 to the "and" network 1444, which passes the signals only during periods of actual computation. The signals then pass through the "or" network 1446 to the "and" network 1448 for synchronization at optimum times in the clock cycles. After such synchronization, the signals are introduced to the right input terminal of the flip-flop 1414 to trigger the flip-flop into a false state of operation. This causes an indication of "0" to be recorded by the coil 1416 in the channel 156. The flip-flop 1414 receives the signals passing through the stages 1438, 1442, 1444, 1446 and 1448 in accordance with the logical equation:

$$_0\bar{u}=\alpha\bar{C}_2''\bar{S}_2P_{18}T \qquad (218)$$

where all of the terms have previously been defined.

In the normal operation of the $H_1$, $H_2$ and $H_3$ types of servos, numerical information is presented in every position between and including positions 1 and 17 for a block. For this reason, the flip-flop 736 is triggered to its true state at position 18 of the block preceding each servo block. This is accomplished by the operation of certain stages including the "and" network 836 in FIGURE 15. The "and" network 836 becomes prepared for activation at position 18 of blocks in which relatively high voltages are produced on the left output terminals of the flip-flops 310 and 684. Since the flip-flops 310 and 684 are triggered in accordance with the signals in the channels 142 and 154, simultaneous indications of "1" in the channels 142 and 154 at position 18 for a block provide a code to indicate that a normal servo operation will take place in the next block. The $H_1$, $H_2$ and $H_3$ types of servos can be considered as normal servos in comparison to other servos which will be described in detail subsequently.

The signals from the "and" network 836 are introduced through the "or" network 842 to the "and" network 844 and are synchronized by the "and" network 844 at optimum times in the clock cycles. The signals from the "and" network 844 pass to the left input terminal of the flip-flop 736 and trigger the flip-flop so as to produce a relatively high voltage on the left output terminal of the flip-flop. Signals are introduced through the stages 836, 842 and 844 to the flip-flop 736 in accordance with the logical equation:

$$s_2=L_2U_pP_{18}T \qquad (219)$$

where all of the terms have previously been defined.

When the start flip-flop 736 is triggered to its true state at position 18 for a block preceding a servo operation, it remains in its true state until position 17 of the servo block. At position 17 of the servo block, a signal passes through the "and" network 854. A signal passes through the "and" network 854 at this time because of the connections to the "and" network from the "and" network 208 and the left output terminal of the flip-flop 606.

The signals from the "and" network 854 pass through the "or" network 848 to the "and" network 846 for synchronization at optimum times in the clock cycles. The signals are then introduced to the right input terminal of the flip-flop 736 to trigger the flip-flop to its false state. The flip-flop 736 becomes triggered by the passage of signals through the stages 854, 848 and 846 in accordance with the logical equation:

$$\bar{s}_2=G_1P_{17}T \qquad (220)$$

where all of the terms have previously been defined.

Since the flip-flop 736 is triggered to its false state at position 17, the information relating to the occurrence or lack of occurrence of error signals can be recorded in the channel 154 at position 18 in accordance with the logic expressed in Equations 217 and 218. The information can be recorded at position 18 for normal servo blocks even though the $\bar{S}_2$ term is included in Equations 217 and 218.

ZERO-RATE SERVOS

Under certain circumstances, the operation of the $H_1$, $H_2$ and $H_3$ types of servos may not be as accurate as might be desired. To improve the accuracy of these servos, increments of alternate polarity are added to the servos in successive cycles of computation. For example, a positive increment may be added in the first, third, fifth and other odd cycles of computation and a negative increment may be added in the second, fourth, sixth and other even cycles computation. Since the polarity of the increments is inverted in successive cycles of computation, the net incremental value resulting from this additional input is zero. In this way, the additional input does not introduce any undesirable incremental values to affect the desired output from the servo block. Rather, as will be explained hereinafter, the additional input tends to increase the accuracy of the servo operation.

Servos receiving increments of alternate polarity in successive cycles of computation have been designated as zero-rate "servos." The operation of these servos may be seen from a particular example for an $H_3$ type of servo. This example is as follows:

| Revolution | $Z_r$ | A | B | dZ | I | dZ |
|---|---|---|---|---|---|---|
| n | + | + | + | - | +2 | - |
| n+1 | - | - | - | - | -2 | + |
| n+2 | + | + | + | + | +2 | - |
| n+3 | - | - | - | - | -2 | + |
| n+4 | + | + | + | + | +2 | - |
| n+5 | - | + | - | - | 0 | - |
| n+6 | + | - | + | - | 0 | + |
| n+7 | - | + | - | + | 0 | - |
| n+8 | + | - | + | - | 0 | + |
| n+9 | - | + | + | + | +2 | - |
| n+10 | + | - | - | - | 0 | - |
| n+11 | - | + | + | - | 0 | + |
| n+12 | + | + | - | + | +2 | - |
| n+13 | - | - | + | - | 0 | - |
| n+14 | + | + | - | - | 0 | + |

When a "zero rate" is added to an $H_3$ servo, it may be distinguished from a normal $H_3$ servo by the designation "$_0H_3$."

As will be seen from the above example, the polarity of the $dZ$ increments immediately reflects any unbalance in the normal inputs to the servo block such as the A and B inputs. For example, in the $(n+5)$ revolution an extra positive increment is introduced on the A line in comparison to the increments introduced to the A line in the previous cycles of computation. This causes the output to be reflected immediately by an additional negative $dZ$ increment. This may be seen by comparing the polarity of the $dZ$ increments in the $(n+4)$ and $(n+5)$ revolutions. Similarly, in the $(n+9)$ revolution, an additional positive increment occurs on the B line. This causes two successive $dZ$ increments of negative polarity to be produced in the $(n+9)$ and $(n+10)$ revolutions. In the $(n+12)$ revolution, an additional positive increment again appears on the A line. This again causes two successive $dZ$ increments of negative polarity to be produced in the $(n+12)$ and $(n+13)$ cycles of computation. In this way, by introducing increments of alternate polarity on the $Z_r$ line, the $dZ$ output is made to immediately reflect any unbalances in the normal inputs such as on the A and B lines.

It will be seen from the above example that the error indicated at "I" may be "0" for a number of successive cycles. Because of this, the logic developed in Equations 210, 211 and 212 becomes fully operative for an $H_3$ type of servo. This is especially true of the logic expressed in Equation 212 since this logic relates to the production of $dZ$ increments when at least two successive cycles of computation have a "0" error. The stages for recording the polarity of the $dZ$ increments in the channel 138 have been described fully above.

As described above, the flip-flop 736 is triggered to its true state at position 18 for a normal type of servo. This triggering occurs in accordance with the logic expressed in Equation 219. For a "zero rate" servo, the flip-flop 736 cannot be triggered to its true state at position 18 of the block preceding the servo operation. This results from the fact that an indication of "0" is permanently provided in the channel 154 at position 18 of the preceding block to indicate that the servo operation will be on a "zero rate" basis.

Since the flip-flop 736 is not triggered to its true state at position 18 of the block preceding a "zero rate" servo, the flip-flop becomes triggered to its true state at position 1 of the servo block. This occurs in accordance with the operation of certain stages including the "and" network 838 in FIGURE 15. The "and" network 838 passes a signal at position 1 of a servo block since it is connected to the "and" network 222 and the left output terminal of the flip-flop 606. The signals from the "and" network 838 pass through the "or" network 842 and the "and" network 844 to trigger the flip-flop 736 to its true state. The flip-flop 736 receives the signals passing through the stages 838, 842 and 844 in accordance with the logical equation:

$$s_2 = G_1 P_1 T \qquad (221)$$

where all of the terms have previously been defined.

The flip-flop 736 remains in its true state until position 17 of the servo block. At this position, the flip-flop is triggered to its false state in accordance with the logic expressed in Equation 220.

It has been previously described that the flip-flop 974 is triggered to a true state when there are any differences between $U_N$ and M in the combination $\epsilon = U_N \pm M$. This has been developed logically in Equation 194. As will be seen, the logic developed in Equation 194 includes the term "$S_2$." For a normal servo operation, the logic expressed in Equation 194 would be sufficient to detect any error since the flip-flop 736 representing $S_2$ is triggered to its true state at position 18 of the preceding block in accordance with the logic expressed in Equation 219. However, the $S_2$ flip-flop is not triggered to its true state until position 1 of a "zero rate" servo as described above. Because of this, the flip-flop 974 would not be triggered to its true state in case the only difference between $U_N$ and M occurred at position "1." For this reason, the "and" network 1030 is included in FIGURE 19. The "and" network 1030 is able to pass a signal only when an error signal occurs at position 1 of a servo operation. This results from the fact that the "and" network 1030 is connected to the "and" network 222, the cathode follower 1026 and the left output terminal of the flip-flop 606.

The signals from the "and" network 1030 are introduced through the "or" network 1036 to the "and" network 1038 for synchronization at optimum times in the clock cycles. The signals then pass to the left input terminal of the flip-flop 974 and trigger the flip-flop so as to produce a relatively high voltage on the left output terminal of the flip-flop. The flip-flop 974 is triggered by the passage of signals through the stages 1030, 1036 and 1038 in accordance with the logical equation:

$$c_2'' = \epsilon G_1 P_1 T \qquad (222)$$

where all of the terms have previously been defined.

It will be seen from the logic expressed in Equations 207 and 222 that the flip-flop 974 becomes triggered to its true state at position 1 either for an $H_1$ type of servo or for an error at position 1 in the combination of $U_N$ and M for any type of servo, whether "zero-rate" or not. For all other conditions, the flip-flop 974 should remain in its false state of operation at position 1. This is obtained by negating the logic expressed in Equations 207 and 222. The "and" networks 1046 and 1048 in FIGURE 19 pass signals in accordance with this negated logic. The signals from the "and" networks 1046 and 1048 pass through the "or" network 1052 and the "and" network 1054 and trigger the flip-flop 974 to its false state of operation. The flip-flop 974 has signals applied to it through the stages 1046, 1048, 1052 and 1054 in accordance with the logical equation:

$$\bar{c}_2'' = (\overline{\epsilon Y}_p G_1 P_1 + \bar{\epsilon} G_5 G_1 P_1) T \qquad (223)$$

where all of the terms have previously been defined.

In a "zero rate" servo, it has been described that increments of alternate polarity are added to the servo in successive cycles of computation. These increments are obtained by alternately recording signals of opposite polarity in the channel 156 in successive cycles of computation. The recording is obtained by the passage of signals through the "and" networks 1430 and 1436 in FIGURE 28. The "and" network 1430 becomes prepared for activation at position 1 of a servo operation because of its connections to the "and" network 222 and the left output terminal of the flip-flop 606. The "and" network 1430 becomes further prepared for activation only at position 1 for a "zero rate" servo as represented by a relatively high voltage on the right output terminal of the flip-flop 736 at this position. This results from the fact that the flip-flop 736 has a relatively high voltage on its left output terminal at position 1 for servos other than the "zero-rate" type.

When the "and" network 1430 becomes prepared for activation, it passes the signals of high amplitude on the right output terminal of the flip-flop 688. These signals represent indications of "0" recorded in the channel 156 in the previous cycle of computation. The signals from the "and" network 1430 are introduced through the "or" network 1426 to the "and" network 1424. The "and" network 1424 passes the signals only during periods of actual computation since it receives the signals from the cathode follower 1340.

The signals from the "and" network 1424 pass through the "or" network 1420 and the "and" network 1418 and trigger the flip-flop 1414 to its true state. The resultant signal of high amplitude produced on the left output terminal of the flip-flop 1414 causes an indication of "1" to be recorded by the coil 1416 in the channel 156. The flip-flop 1414 receives the signals passing through the stages 1430, 1426, 1424, 1420 and 1418 in accordance with the logical equation:

$${}_0u = \alpha \overline{U} \overline{S}_2 G_1 P_1 T \qquad (224)$$

where all of the terms have previously been defined.

When an indication of "0" has been recorded in the channel 156 at position 1 of a previous cycle of computation, a signal passes through the "and" network 1436. This results from the introduction to the "and" network 1436 of the signals from the "and" network 222 and the left output terminal of the flip-flop 688. The signals are able to pass through the "and" network 1436 only for a "zero rate" operation as represented by a relatively high voltage on the right output terminal of the flip-flop 736 at position 1 for a block.

The "and" network 1444 receives the signals passing through the "and" network 1436 and the "or" network 1442 and in turn passes the signals only during periods of actual computation. The signals from the "and" network 1444 pass through the "or" network 1446 and the "and" network 1448 to the right input terminal of the flip-flop 1414 to trigger the flip-flop into a false state of operation. This causes an indication of "0" to be recorded by the coil 1416 in the channel 156. An indication of "0" is recorded in the channel 156 by the passage of signals through the stages 1436, 1442, 1444, 1446 and 1448 in accordance with the logical equation:

$${}_0u = \alpha U \bar{S}_2 P_1 T \qquad (225)$$

where all of the terms have previously been defined.

In FIGURE 43, the operation of the flip-flops 860, 862 and 864 is shown for various values representing $\Sigma d$U. The pattern of operation of the flip-flops 860, 862 and 864 for odd values of $\Sigma d$U is listed again in FIG- URE 48. Only the odd values are listed again since a servo is used as a "0" rate type only when an odd number of inputs are being introduced to the servo.

As has been described previously and expressed logically in Equations 171 to 176, inclusive, the pattern of operation of the flip-flops 860, 862 and 864 is transferred to the flip-flops 910, 924 and 974 at position 18 for a block. The information in the flip-flops 924 and 974 is then stepped into the flip-flop 910 in the first position of the next block and the indications in the flip-flop 974 are inverted during the stepping operation. This has been described in detail previously and has been expressed logically in Equations 177 to 180, inclusive. Because of this stepping operation, the information originally in the flip-flop 924 is stepped out of the flip-flop 910 at position 2, and the information in the flip-flop 974 is stepped out of the flip-flop 910 at position 3.

It will be seen that the flip-flop 860 has an indication of "1" for all odd values of $\Sigma dU$. When an indication of "1" is added to the least significant digit as represented by the operation of the flip-flop 860, the resultant addition would cause a binary value of "2" to be produced at this position. This is equivalent to an indication of "0" at the least significant position and a carry of "1" to the next position, as indicated in the middle columns of the table shown in FIGURE 48. For this reason, the flip-flop 860 would be in effect providing an indication of "0" at position 1. Since the flip-flop 860 is providing an indication of "0" at position 1, no errors are produced in the addition of U and $\Sigma dU$ in "zero-rate servos." No error is produced even though the start flip-flop 736 is triggered to its true state of operation at the end of position 1 such that an addition of U and $\Sigma dU$ cannot actually be made at this position.

The carry flip-flop 938 is triggered to its true state when an indication of "+1" is added in a "zero-rate servo" since this causes a carry to be obtained from position 1 to position 2 as described in the previous paragraph. The carry flip-flop 938 is triggered to its true state in accordance with the operation of certain stages including the "and" network 942 in FIGURE 17. The "and" network 942 becomes prepared for activation at position 1 of a servo block because of its connections to the "and" network 222 and the left output terminal of the flip-flop 606. The "and" network 942 passes a signal only when an odd number of inputs are introduced to the servo block as represented by a relatively high voltage on the left output terminal of the flip-flop 910. The "and" network 942 passes the signals only when an indication of +1 is being added on a "zero-rate" basis. This is represented by a signal of high amplitude on the left output terminal of the flip-flop 688. The production of this signal of high amplitude has been described in detail previously and expressed logically in Equation 224.

The signals of high amplitude from the "and" network 942 pass through the "or" network 946 to the "and" network 948 for synchronization at optimum times in the clock cycles. The signals are then introduced to the left input terminal of the flip-flop 938 to trigger the flip-flop into its true state in representation of a carry. The flip-flop 938 is triggered to its true state by the passage of signals through the stages 942, 946 and 948 in accordance with the logical equation:

$$c_3 = C_2 U G_1 P_1 T \qquad (226)$$

where all of the terms have previously been defined.

In alternate cycles of computation for a "zero-rate servo" an indication of "1" is subtracted from the indications introduced on the other input lines. When an indication of "1" is subtracted, this causes the indication of "1" in the flip-flop 860 to become an indication of "0," as indicated in the right columns of the table shown in FIGURE 48. As indicated in FIGURE 48, the flip-flop 860 changes to its false state without any carry being obtained from position 1 to position 2 of the servo block. Since the flip-flop 938 was triggered to its false state at position 18 of the previous block in accordance with the logic expressed in Equation 170*a*, no additional logic is necessary to maintain the flip-flop in its false state for the subtraction of an increment in a "zero-rate servo."

SHORT-LENGTH SERVOS

Sometimes information relating to U occurs in only a few of the available positions for a servo block. Only a few of the available positions are used since the accuracy of the quantity represented by the indications in these positions can be sufficiently obtained from the limited number of positions. Such servos are designated as "short-length servos." These servos are represented by an indication of "1" in the channel 154 at position 1 for a block. When this occurs, signals of high amplitude are simultaneously obtained from the "and" network 222 and the left output terminal of the flip-flop 684. These signals cause the "and" network 1276 in FIGURE 24 to become prepared for activation. The signals can pass through the "and" network 1276 only in two out of every four blocks because of the introduction to the "and" network of the voltage on the left output terminal of the flip-flop 244.

The signals from the "and" network 1276 pass through the "or" network 1280 to the "and" network 1278 for synchronization at optimum times in the clock cycles. The signals then pass to the left input terminal of the flip-flop 976. These signals trigger the flip-flop 976 so as to produce a relatively high voltage on the left output terminal of the flip-flop. Triggering signals are introduced to the flip-flop 976 through the stages 1276, 1280 and 1278 in accordance with the logical equation:

$$e_4 = U_p K_2 P_1 T \qquad (227)$$

where all of the terms have previously been defined.

Since an indication of "1" in the channel 154 at position 1 of a servo block represents a short-length servo, an indication of "0" in the channel at this position indicates that a short-length servo is not being presented. This indication of "0" in the channel 154 causes a relatively high voltage to be produced on the right output terminal of the flip-flop 684. This high voltage is introduced to the "and" network 1286. Because of its connection to the left output terminal of the flip-flop 244, the "and" network passes such signals only in two out of every four blocks.

The signals from the "and" network 1286 are introduced through the "or" network 1290 and the "and" network 1288 to the right input terminal of the flip-flop 976. These signals trigger the flip-flop 976 to its false state as represented by a relatively high voltage on the right output terminal of the flip-flop. The flip-flop 976 becomes triggered to its false state by the passage of signals through the stages 1286, 1290 and 1288 in accordance with the logical equation:

$$\overline{e}_4 = \overline{U}_p K_2 P_1 T \qquad (228)$$

where all of the terms have previously been defined.

It has been previously described and expressed logically in Equations 197 and 198 that the error signals represented by $\epsilon = U_N \pm M$ are introduced to the flip-flop 976 in positions 2 to 17, inclusive, for a block. For this reason, the operation of the flip-flop 976 at position 1 to represent the occurrence or lack of occurrence of a short length servo must be transferred to a different flip-flop at position 2. The information in the flip-flop 976 is transferred to the flip-flop 924 by the operation of certain stages, including the "and" network 972 shown in FIGURE 18. The "and" network 972 becomes prepared for operation in position 2 of a servo block because of its connections to the "and" network 225 and the left output terminal of the flip-flop 606. Upon becoming prepared for activation, the "and" network 972 passes the signals of high amplitude on the left output terminal of the flip-flop 976. In this way, the "and" network 972 passes signals which indicate in coded form the occurrence of a short-length servo.

The signals from the "and" network 972 are introduced through the "or" network 978 to the "and" network 980 and are synchronized by the "and" network 980 at optimum times in the clock cycles. The signals are then applied to the left input terminal of the flip-flop 924. The signals trigger the flip-flop 924 so as to produce a relatively high voltage on the left output terminal of the flip-flop. This high voltage continues for the remainder of the servo block to indicate that a short-length servo operation is being performed. A relatively high voltage is produced on the left output terminal of the flip-flop 924 by the passage of signals through the stages 972, 978 and 980 in accordance with the logical equation:

$$c_2'=E_4G_1P_2T \qquad (229)$$

where all of the terms have previously been defined.

The flip-flop 924 is able to receive the information from the flip-flop 976 at position 2 for a block because the information in the flip-flop 924 was previously stepped into the flip-flop 910 at position 1 for a servo operation and because the information from the flip-flop 974 is stepped into the flip-flop 910 from the flip-flop 924 at position 2 for the block.

The "and" network 990 becomes prepared for activation at the same time as the "and" network 972 but passes the signals of high amplitude on the right output terminal of the flip-flop 976. These signals pass through the "or" network 992 and the "and" network 994 and trigger the flip-flop 924 into its false state of operation, as represented by a relatively high voltage on the right output terminal of the flip-flop. The high voltage on the right output terminal of the flip-flop 924 continues during the remainder of the servo block to indicate that a short-length servo operation is not being performed. The flip-flop 924 has triggering signals applied to it through the stages 990, 992 and 994 in accordance with the logical equation:

$$\overline{c}_2'=\overline{E}_4G_1P_2T \qquad (230)$$

where all of the terms have previously been defined.

In a short-length servo, the start flip-flop 736 becomes triggered to its true state at the beginning of the servo operation just as in other types of servos. However, the start flip-flop 736 becomes triggered to its false state at a position before position 17, which is the position that the start flip-flop is generally triggered to its false state for a servo operation. The start flip-flop 736 becomes triggered to its false state by the occurrence of an indication of "1" in the channel 154 in one of the positions between positions 8 and 16, inclusive for a short-length servo operation. Such an occurrence causes a signal to pass to the flip-flop 736 through the "and" network 856 in FIGURE 15 from the left output terminal of the flip-flop 684.

The signals of high amplitude on the left output terminal of the flip-flop 682 passes through the "and" network 856 in positions 8 to 16, inclusive, because of the connection of the "and" network 856 to the left output terminal of the flip-flop 200. The "and" network 856 is able to pass an indication of "1" in the channel 154 only for a short-length servo. This results from the fact that the "and" network 856 is connected to the left output terminals of the flip-flops 606 and 924. The "and" network 856 is further able to pass a signal only in one block out of every four. This block is the second one of the two blocks in which the flip-flop 244 is operating in its true state. Only the second of the two blocks is chosen because of the connection of the "and" network 856 to the left output terminal of the flip-flop 234.

The signals from the "and" network 856 pass through the "or" network 848 to the "and" network 846 for synchronization at optimum times in the clock cycles. The signals then pass to the right input terminal of the flip-flop 736 and trigger the flip-flop to its false state of operation. The flip-flop 736 receives the signals passing through the stages 856, 848 and 846 in accordance with the logical equation:

$$\overline{s}_2=U_pS_2G_1C_2'K_2K_1J_4T \qquad (231)$$

where all of the terms have previously been defined.

Since the start flip-flop 736 is being triggered to its false state before position 17, a carry indication cannot be obtained at position 17. As previously described, the carry indication at position 17 for a servo generally indicates the polarity of any error resulting from the combination of $U_N$ and M in the servo operation. For this reason, certain stages are included in FIGURE 23 to have the carry flip-flop 604 indicate at position 17 the polarity of the error signal in a short-length servo operation. These stages include the "and" network 1182 in FIGURE 23.

The "and" network 1182 becomes prepared for activation only at position 17 of a short-length servo operation since it is connected to the "and" network 208, the left output terminal of the flip-flop 606 and the right output terminal of the flip-flop 736. When the "and" network 1182 becomes prepared for activation, it passes the signals of high amplitude on the right output terminal of the flip-flop 976. As may be seen from the table shown in FIGURE 44, a relatively high voltage on the right output terminal of the flip-flop 976 indicates a positive error.

The signals from the "and" network 1182 in FIGURE 23 are introduced through the "or" network 1172 to the "and" network 1174 for synchronization at optimum times in the clock cycles. The signals then pass to the left input terminal of the flip-flop 604 and trigger the flip-flop to its true state to represent a positive error. Signals pass to the flip-flop 604 through the stages 1182, 1172 and 1174 in accordance with the logical equation:

$$d=\overline{E}_4\overline{S}_2G_1P_{17}T \qquad (232)$$

where all of the terms have previously been defined.

Like the "and" network 1182, the "and" network 1192 in FIGURE 23 becomes prepared for activation only at position 17 of a short length servo. When the "and" network 1192 becomes prepared for activation, it passes the signals of high amplitude on the left output terminal of the flip-flop 976. As may be seen from the table shown in FIGURE 44 and as described fully above, a relatively high voltage on the left output terminal of the flip-flop 976 indicates a negative error.

The signals from the "and" network 1192 are introduced through the "or" network 1194 and the "and" network 1196 to the right input terminal of the flip-flop 604. These signals trigger the flip-flop 604 so as to produce a relatively high voltage on the right output terminal of the flip-flop. Such a high voltage represents a negative error in a manner similar to that described above. The flip-flop 604 becomes triggered to its false state by the passage of signals through the stages 1192, 1194 and 1196 in accordance with the logical equation:

$$\overline{d}=E_4\overline{S}_2G_1P_{17}T \qquad (233)$$

where all of the terms have previously been defined.

SUB-FILLING

In order to produce a proper operation of the digital differential analyzer described above for an accurate solution of a problem, certain information must be recorded in the various channels at the beginning of a computation. For example, information relating to the dependent quantity Y must be recorded in the channel 150 before computation is actually commenced. This information would relate to the initial values of Y at the beginning of the actual computation.

The information relating to various initial conditions is recorded permanently in certain channels such as the channels 148 and 154. These channels hold permanent coding information as well as information representing the initial conditions of Y and U for the various blocks. The information is inserted into the channels 148 and 154 by apparatus not constituting a part of this invention.

Before any computation is actually commenced, the indications in the channels 148 and 154 representing the initial conditions of Y and U are respectively transferred to the channels 150 and 156. The information in the channel 148 relating to the initial conditions of Y is transferred to the channel 150 by the operation of certain stages including the "and" network 1352 in FIGURE 26. The information is transferred before the commencement of computation because of the connection to the "and" network 1352 from the cathode follower 1312. The information is transferred for each block only in the positions after the start pulse. This results from the fact that the "and" network 1352 can open for the passage of signals only upon the introduction of a relatively high voltage from the left output terminal of the flip-flop 446. As previously described, the dependent quantity Y for each block is indicated in the positions after the start pulse.

When the "and" network 1352 becomes prepared for activation, it passes the signals of high amplitude on the left output terminal of the flip-flop 542. These signals represent indications of "1" in the channel 148. The signals passing through the "and" network 1352 are introduced through the "or" network 1346 to the "and" network 1348 for synchronization at optimum times in the clock cycles. The signals then pass to the left input terminal of the flip-flop 1332 and trigger the flip-flop such that a relatively high voltage is produced on the left output terminal of the flip-flop. This causes indications of "1" to be recorded by the coil 1333 in the channel 150. The flip-flop 1332 receives the signals passing through the stages 1352, 1346 and 1348 in accordance with the logical equation:

$$_0y=\bar{\alpha}Y_pS_1T \qquad (234)$$

where all of the terms have previously been defined.

Just as the "and" network 1352 passes the indications of "1" in the channel 148, the "and" network 1370 passes the indications of "0" in the channel. These indications pass through the "and" network 1370 only in the positions after the start pulse for each block and only during periods when actual computation is not occurring, because of the connections to the "and" network from the left output terminal of the flip-flop 446 and the cathode follower 1312.

The signals from the "and" network 1370 are introduced through the "or" network 1366 to the "and" network 1368 and are synchronized by the "and" network 1368 at optimum times in the clock cycles. The signals then pass to the right input terminal of the flip-flop 1332 and trigger the flip-flop for the production of a relatively high voltage on the right output terminal of the flip-flop. Since a low voltage is produced at the same time on the left output terminal of the flip-flop, an indication of "0" is recorded by the coil 1333 in the channel 150. Triggering signals are introduced to the flip-flop 1332 through the stages 1370, 1366 and 1368 in accordance with the logical equation:

$$_0y=\overline{\alpha Y_p}S_1T \qquad (235)$$

where all of the terms have previously been defined.

As previously described, a coding pulse is provided in the channel 150 at position 18 in the second block of a double-block operation. This is in accordance with the logic expressed in Equation 139. As will be described in detail subsequently, certain information relating to the dependent quantity Y for particular blocks is represented during periods of non-computation by a relatively high voltage on the left output terminal of the flip-flop 1358. At such times, a signal of high amplitude is introduced from the left output terminal of the flip-flop 1358 to the "and" network 1354 to prepare the "and" network for activation. The "and" network 1354 is further prepared for activation by the introduction of a signal from the cathode follower 1312 to indicate that computation is not actually proceeding.

Upon becoming prepared for activation, the "and" network 1354 passes the signals of high amplitude on the right output terminal of the flip-flop 446. Because of the particular times at which the "and" network 1354 becomes prepared for activation, the signals of high amplitude on the right output terminal of the flip-flop 446 can pass through the "and" network only at position 18 in the second half of a double-block operation. These signals pass through the "and" network 1354, the "or" network 1346 and the "and" network 1348 to the left input terminal of the flip-flop 1332. The resultant signal of high amplitude produced on the left output terminal of the flip-flop 1332 causes an indication of "1" to be recorded by the coil 1333 in the channel 150. The flip-flop 1332 has signals applied to it through the stages 1354, 1346 and 1348 in accordance with the logical equation:

$$_0y=\bar{\alpha}V_u\bar{S}_1T \qquad (236)$$

where $V_u$=a relatively high voltage on the left output terminal of the flip-flop 1358; and the other terms have previously been defined.

A relatively high voltage is produced on the right output terminal of the flip-flop 158 during periods of non-computation at position 18 in all blocks other than the second block of a double-length operation. This will be described in detail subsequently. The high voltage on the left output terminal of the flip-flop 1358 is introduced to the "and" network 1372 to prepare the "and" network for activation. The "and" network 1372 becomes further prepared for activation only during periods of non-computation, as represented by signals of high amplitude from the cathode follower 1312 upon becoming prepared for activation. The "and" network 1372 passes the signals of high amplitude on the right output terminal of the flip-flop 446. These signals can pass through the "and" network 1372 only at position 18 for blocks other than the second block in a double-length operation because of the particular times at which the "and" network becomes prepared for activation.

Information relating to the initial conditions as to the value of U for the different blocks are initially recorded in the channel 154 before computation is begun. These indications are transferred from the channel 154 to the channel 156 in accordance with the operation of certain stages including the "and" network 1422 in FIGURE 28. The "and" network 1422 becomes prepared for activation only when signals of high amplitude are introduced to it from the cathode follower 1312 to represent periods of non-computation. At such times, the "and" network 1422 passes the signals of high amplitude on the left output terminal of the flip-flop 684. These signals are produced upon the occurrence of indications of "1" in the channel 154.

The signals from the "and" network 1422 in FIGURE 28 pass through the "or" network 1420 to the "and" network 1418. The signals are synchronized by the "and" network 1418 at optimum times in the clock cycles and are introduced to the left input terminal of the flip-flop 1414. This causes the flip-flop 1414 to be triggered to its true state so that an indication of "1" is recorded by the coil 1416 in the channel 156. The flip-flop 1414 becomes triggered to its true state by the passage of signals through the stages 1422, 1420 and 1418 in accordance with the logical equation:

$$ {}_0u=\overline{\alpha}U_pT \qquad (238) $$

where all of the terms have previously been defined.

The "and" network 1450 in FIGURE 28 becomes prepared for activation at the same time as the "and" network 1422 because of its connection to the cathode follower 1312. When the "and" network 1450 becomes prepared for activation, it passes the signals of high amplitude on the right output terminal of the flip-flop 684. These signals represent indications of "0" in the channel 154. The signals of high amplitude on the right output terminal of the flip-flop 684 pass through the "and" network 1450, the "or" network 1446 and the "and" network 1448 to the right input terminal of the flip-flop 1414. The signals trigger the flip-flop 1414 so as to produce a relatively high voltage on the right output terminal of the flip-flop and a relatively low voltage on the left output terminal of the flip-flop. This causes an indication of "0" to be recorded by the coil 1416 in the channel 156. Such indications of "0" are recorded in the channel 156 by the passage of signals through the stages 1450, 1446 and 1448 in accordance with the logical equation:

$$ {}_0\overline{u}=\alpha\overline{U}_pT \qquad (239) $$

where all of the terms have previously been defined.

It has been described above that the R channel 152 and the Z channel 138 operate in conjunction to provide values representing the cumulative YΔX increments for each block. The R channel 152 has a limited capacity so that overflows occasionally occur from it to the Z channel 138. These overflows are accumulated generally in other blocks to represent ΔY increments or increments for the other blocks. The overflows are also made available to other blocks to represent ΔX increments for the blocks.

At the end of a computation, a value is still indicated in the R channel for each block. Since the value remaining in the R channel for each block does not produce an overflow, it represents a potential error in the computation. This error is relatively small, especially when a relatively large number of overflows occur from the R channel 152 to the Z channel 138. However, in order to minimize any error which may occur, a value is initially set into the R channel for each block before the beginning of a computation. For blocks performing a single-length product operation, this value is represented by an indication of "1" at position 18 and the indications of "0" in the previous positions for each block. Such a value is equal to one half of the capacity of the R channel for each block.

The recordation of an indication of "1" in the channel 152 at position 18 for each block performing a single-length product operation is obtained by the operation of certain circuits including the "and" network 1390 in FIGURE 27. This network becomes prepared for activation only during periods of non-computation, since it receives the signals from the cathode follower 1312. At such times, the "and" network 1390 passes signals only at position 18 for blocks performing product operations. This results from the connections to the "and" network 1390 from the "and" network 216 and the right output terminal of the flip-flop 606.

The signals from the "and" network 1390 pass through the "or" network 1384 to the "and" network 1386 for synchronization at optimum times in the clock cycles. The signals then pass to the left input terminal of the flip-flop 1388 to trigger the flip-flop to its true state. This causes an indication of "1" to be recorded by the coil 1410 in the channel 152. Triggering signals are introduced to the left input terminal of the flip-flop 1388 through the stages 1390, 1384 and 1386 in accordance with the logical equation:

$$ {}_0r=\overline{\alpha}\overline{G}_1P_{18}T \qquad (240) $$

where all of the terms have previously been defined.

Just as it is desirable to initially fill the R channel to half its capacity for blocks undergoing a single-length product operation, it is also desirable to fill to half of their capacity the blocks performing normal integration or a servo operation. This is accomplished in part by the operation of the "and" network 1380 in FIGURE 27. The "and" network 1380 becomes prepared for activation only during periods of non-computation because of its connection to the cathode follower 1312. At such times, the "and" network 1380 passes signals at position 17 for blocks performing normal integrations or servo operations. This is represented by the simultaneous introduction of signals to the "and" network 1380 from the "and" network 208 and the left output terminal of the flip-flop 606.

The signals from the "and" network 1380 pass through the "or" network 1384 and the "and" network 1386 and trigger the flip-flop 1388 to its true state. This causes an indication of "1" to be recorded by the coil 1410 in the channel 152. Signals pass to the flip-flop 1388 through the stages 1380, 1384 and 1386 in accordance with the logical equation:

$$ {}_0r=\overline{\alpha}G_1P_{17}T \qquad (241) $$

where all of the terms have previously been defined.

As will be seen subsequently from the logic in Equation 243, an indication of "1" is recorded at position 18 as well as position 17 for blocks performing servo operations. Recording an indication of "1" at position 18 has no desirable effect but it also has no harmful effect in the subsequent computations.

In double-length operations, an indication representing a value of "−1" is recorded in the channel 152. The reason for this is that in the first cycle of computation the flip-flop 456 receives a value of "+1" in accordance with the logic expressed in Equation 132. This value of "+1" is transferred by the flip-flop 456 to the channel 152 at position 17 in the first half of the double-block operation during the first cycle of actual computation so as to neutralize the value of "−1" initially recorded in the blocks performing double-length product operations.

The "and" network 1382 in FIGURE 27 operates in conjunction with other stages to record an initial value representing "−1" for a double-block operation. This is represented by indications of "1" at positions 17 and 18 for the first block and all of the positions for the second block. The "and" network 1382 becomes prepared for opening only during positions of non-computation, as represented by signals of high amplitude from the cathode follower 1312. The "and" network 1382 then passes a signal at position 17 in the first half of a double-block operation. This is represented by the simultaneous occurrence of signals of high amplitude from the "and" network 208 and the left output terminal of the flip-flop 390.

The signals from the "and" network 1382 are introduced through the "or" network 1384 and the "and" network 1386 to the left input terminal of the flip-flop 1388. These signals trigger the flip-flop 1388 to produce a relatively high voltage on the left output terminal of the flip-flop so that an indication of "1" is recorded by the coil 1410 in the channel 152. When the flip-flop 1388 becomes triggered to its true state at position 17 in the first half of a double-block operation, it remains in this state for the remaining positions of the double-block operation. This will be seen from the subsequent discussion and from the logic expressed in Equation 243. The triggering of the flip-flop 1388 to its true state by the passage of signals through the stages 1382, 1384 and 1386 is produced in accordance with the logical equation:

$$_0r=\bar{\alpha}G_5P_{17}T \quad (242)$$

where all of the terms have previously been defined.

It will be seen from the above discussion that the flip-flop 1388 should be triggered to its false state at position 1 for any block except the second half of a double-block operation. Position 1 for the second half of a double-block operation is represented by $G_5S_1$. The $G_5$ flip-flop 390 is in its true state at position "1" in the second half of a double-block operation since it becomes triggered to its false state only at the end of position 1. The $S_1$ flip-flop is in its true state at position 1 in the second half of a double-block operation since information relating to the dependent quantity Y is being presented for computation at this time. At position 1 for blocks other than the second half of a double-block operation, $G_5S_1$ is false. This may be represented by $\overline{(G_5S_1)}=\bar{G}_5+\bar{S}_1$.

The "and" network 1398 in FIGURE 27 passes signals during periods of non-computation at position 1 for blocks having a relatively high voltage on the right output terminal of the flip-flop 390. Similarly, the "and" network 1400 passes signals during periods of non-computation at position 1 for blocks having a relatively high voltage on the right output terminal of the flip-flop 446. The signals from the "and" networks 1398 and 1400 pass through the "or" network 1406 to the "and" network 1408, which synchronizes the signals at optimum times in the clock cycles.

The signals from the "and" network 1408 in turn pass to the right input terminal of the flip-flop 1388 and trigger the flip-flop to produce a relatively high voltage on the right output terminal of the flip-flop. The resultant low voltage on the left output terminal of the flip-flop causes indications of "0" to be recorded in the channel 152. The flip-flop 1388 receives the signals passing through the stages 1398, 1400, 1406 and 1408 in accordance with the logical equation:

$$_0\bar{r}=(\overline{\alpha G}_5P_1+\overline{\alpha S}_1P_1)T \quad (243)$$

where all of the terms have previously been defined.

As previously defined, the indications in the channel 138 represent overflows from the various blocks in the digital differential analyzer. Positive overflows are represented by indications of "1" and negative overflows by indications of "0." As will be seen, it would be at least as much of an error to initially set the channel 138 to positive overflows as to negative overflows. For this reason, the channel 138 is kept in its original condition before the commencement of computation, such that indications of "0" are retained in all of the positions in the channel.

In the process of integrating a constant, a special technique must be adopted. The chief reason for this arises from the fact that in the case of normal integration, the $dY$ input must be either $\pm 1$. However, when a constant is to be integrated to obtain $\int K dx$, the $dY$ input must be zero at all times during the operation since the value of K must not change.

By inhibiting the function of the "$Y+dY$ adder" described above and expressed logically in equations, $Y_n$ is made to equal Y throughout the operation. As in normal integration, the "$R+Y$ adder" obtains the value of $R+Y$ if $dX$ is $+1$ and $R-Y$ if $dX$ is $-1$.

Subtraction is performed by complementing Y and then adding this complement with R ($R$+comp $_2Y$). As discussed, the complement of a binary number is obtained by reversing the digits of the number and adding one to the least significant digit.

EXAMPLE

R=1.0110101

Y=0.1110111

Subtracting R−Y, we have

R 1.0110101
Y 0.1110111
0.0111110 (Answer)

By complementing, we must take $R+(\bar{Y}+1)$ (least significant digit)

R 1.0110101
$\bar{Y}$ 1.0001000
(1) 0.0111110 (Answer)

As stated, the "$Y+dY$ adder" must be controlled such that during the constant integration operation $y_n$ is made to equal Y. This control is provided by the operation of the flip-flop 446 in FIGURE 15. The "and" network 826 in FIGURE 15 is activated by the simultaneous occurrence of signals from the left output terminals of the flip-flops 306 and 310 and the signal passing through the "and" network 216. The activation of the "and" network 826 in turn causes the "or" network 828 to become energized. Upon a simultaneous occurrence of a signal from the left output terminal of flip-flop 164, the signal from the "or" network 828 activates the "and" network 830. When activated, the "and" network 830 passes a signal to the left input terminal of the flip-flop 446 to produce a relatively high voltage on the left output terminal of the flip-flop 446. This high voltage is produced by the passage of signals through the stages 826, 828 and 830 in accordance with the logical equation:

$$s_1=L_1L_2P_{18}T \quad (244)$$

where all of the terms have previously been defined.

This logic has been previously set forth. The "and" network 832 is activated by the simultaneous occurrence of signals from the right output terminal of the flip-flop 390, the left output terminal of the flip-flop 164 and the signal passing through the "and" network 208. When activated, the "and" network 832 passes a signal to the right input terminal of the flip-flop 446 so as to produce a relatively high voltage on the right output terminal of flip-flop 446. This high voltage is produced by the passage of signals through the stage 832 in accordance with the logical equation:

$$\bar{s}_1=\bar{G}_5P_{17}T \quad (245)$$

where all of the terms have previously been defined.

As explained previously and expressed logically supra, the flip-flop 538 ($B_3$) receives a signal at its right input terminal at position 17 of each computing block to produce a relatively high voltage on the right output terminal of the flip-flop 538. This signal is produced by the activation of the "and" network 560 in FIGURE 10.

The simultaneous occurrence of signals from the right output terminal of flip-flop 390 and from the "and" network 208 activates the "and" network 552 which in turn activates the "or" network 558. The simultaneous occurrence of the signal produced by the activation of the "or" network 558, a signal from the left output terminal of the flip-flop 446, and a signal from the left output terminal of the flip-flop 164 in turn causes the "and" network 560 to become activated. Thus, the relatively high voltage on the right output terminal of the flip-flop 538 is produced by the passage of signals in accordance with the logical equation:

$$\bar{b}_3=P_{17}\bar{G}_5S_1T \quad (246)$$

where all of the terms have previously been defined.

This logic has been expressed previously.

At $P_{18}$, if the next operation is to be a constant integrator, the memory program will be recorded such that flip-flops 306 and 310 ($L_1$ and $L_2$) will be high. Then by Equation 244, $S_1$ will be set high and will remain high until $P_{17}$ of the constant integrator block. By Equation 246, will be set false at $P_{17}$ of each computing block and cannot be set true while $S_1$ is true since the simultaneous occurrence of signals required to set $B_3$ high includes a high signal from the right output terminal of the flip-flop 446 ($S_1$). These simultaneous signals are required to activate the "and" gate 540 in FIGURE 10 and include a signal from the right output terminal of the flip-flop 446, a signal from the left output terminal of the flip-flop 542, a signal from the left output terminal of the flip-flop 164, and a signal from the inverter 541. The activation of the "and" gate 540 will pass a signal to the left input terminal of the flip-flop 538 so as to produce a relatively high voltage on the left output terminal of the flip-flop 538. Thus the passage of signals necessary to produce a relatively high voltage on the left output terminal of flip-flop 538 is in accordance with the logical equation:

$$b_3=Y_p\overline{S}_1P_{2/17}T \qquad (247)$$

where all of the terms have previously been defined.

As has been stated above, $B_3$ will remain low during positions 1 to 17, inclusive, of the constant integrator operation.

$$y_n=Y\overline{B}_3+\overline{Y}B_3$$
$$\overline{y}_n=\overline{Y}\overline{B}_3+YB_3$$

The equations which have been set forth before, show that during positions 1 to 17, inclusive, of the constant integrator operation $y_n$ equals Y since $B_3$ is false. That is, $$y_n=Y$$
$$\overline{y}_n=\overline{Y}$$

We have the equations $$y=(A_2B_2Y+A_2\overline{B}_2y_n+\overline{A}_2B_2\overline{Y}+\overline{A}_2\overline{B}_2\overline{y}_n)S_1$$

Since $y_n=Y$, $$y=(A_2B_2Y+A_2\overline{B}_2Y+\overline{A}_2B_2\overline{Y}+\overline{A}_2\overline{B}_2\overline{Y})S_1$$
$$y=(A_2[B_2+\overline{B}_2]Y+\overline{A}_2[B_2+\overline{B}_2]\overline{Y})S_1 \qquad (248)$$
$$y=(A_2Y+\overline{A}_2\overline{Y})S_1$$

and $$\overline{y}=(A_2B_2\overline{Y}+A_2\overline{B}_2\overline{y}_n+\overline{A}_2B_2Y+\overline{A}_2\overline{B}_2\overline{y}_n)S_1$$

Since $y_n=Y$, $$y=(A_2B_2\overline{Y}+A_2\overline{B}_2\overline{Y}+\overline{A}_2B_2Y+\overline{A}_2\overline{B}_2Y)S_1$$
$$y=(A_2[B_2+\overline{B}_2]\overline{Y}+\overline{A}_2[B_2+\overline{B}_2]Y)S_1 \qquad (249)$$
$$y=(A_2\overline{Y}+\overline{A}_2Y)S_1$$

It has been previously described that $A_2$ is high for a $+dx$ increment and low ($\overline{A}_2$) for a $-dx$ increment.

For $+dx$ ($A_2$), Equation 244 becomes $y=Y$ and Equation 245 becomes $\overline{y}=\overline{Y}$.

For $-dx$ ($\overline{A}_2$), Equations 244 and 245 respectively become $$y=\overline{Y}$$
$$\overline{y}=Y$$

If $dx$ is negative, in addition to reversing digits of Y, (as above), a value of 1 must be added to the sum of $R+\overline{Y}$ in the least significant digit. This is accomplished by setting the carry flip-flop 432 ($A_3$) high initially. During $P_1$ of a constant integrator operation, the carry flip-flop 432 is set high for a negative value of $dx$ ($\overline{A}_2$) and low for a positive value of $dx$ ($A_2$).

Upon the simultaneous occurrence of high signals from the right output terminal of the flip-flop 420, the right output terminal of the flip-flop 390, the left output terminal of flip-flop 446, and the "and" gate 222, the "and" gate 455 becomes activated and in turn activates the "or" gate 440 in FIGURE 8. The simultaneous occurrence of the signal from the "or" gate 440 and the signal from the left output terminal of flip-flop 164 activates the "and" gate 439, which triggers the flip-flop 432 to produce a high voltage on the left input terminal of flip-flop 432. The passage of signals through the stages 455, 440 and 439 is in accordance with the logical equation:

$$a_3=\overline{A}_2S_1\overline{G}_5P_1T \qquad (250)$$

where all of the terms have previously been defined.

The simultaneous occurrence of a signal from the left output terminal of the flip-flop 420, the right output terminal of the flip-flop 390, the left output terminal of flip-flop 446, and the signal produced by the "and" gate 222, activate the "and" gate 472 which in turn activates the "or" gate 466. The simultaneous occurrence of the signals produced by the activation of the "or" gate 466 and the signal from the left output terminal of flip-flop 164 activates the "and" gate 467 which produces a signal on the right input terminal of flip-flop 432. The passage of signals is in accordance with the logical equation:

$$\overline{a}_3=A_2S_1\overline{G}_5P_1T \qquad (251)$$

where all of the terms have previously been defined.

Thus, the carry flip-flop 432 has been initially set high for $dx-$ and low for $dx+$, and we have added $R+\overline{Y}+1$ for $dx-$ and $R+Y$ for $dx+$.

CONSTRUCTION OF DIGITAL COMPUTER

A digital computer is adapted to be used with the digital differential analyzer to perform certain operations for increasing the flexibility in the operation of the digital differential analyzer. For example, the digital computer is able to perform addition and subtraction of quantities and to perform multiplication of two whole quantities rather than a quantity and an increment of a second quantity as in the digital differential analyzer. Means are also included for instructing the digital computer on the particular material that the computer is to receive from the digital differential analyzer, upon the operation to be performed and upon the use of the information obtained from the digital computer. For example, it may be desired to insert the information obtained from the digital computer into particular blocks in the digital differential analyzer. It will be seen that the subsequent discussion will relate to a digital computer and to apparatus for coupling the digital computer to the digital differential analyzer.

Figure 51:
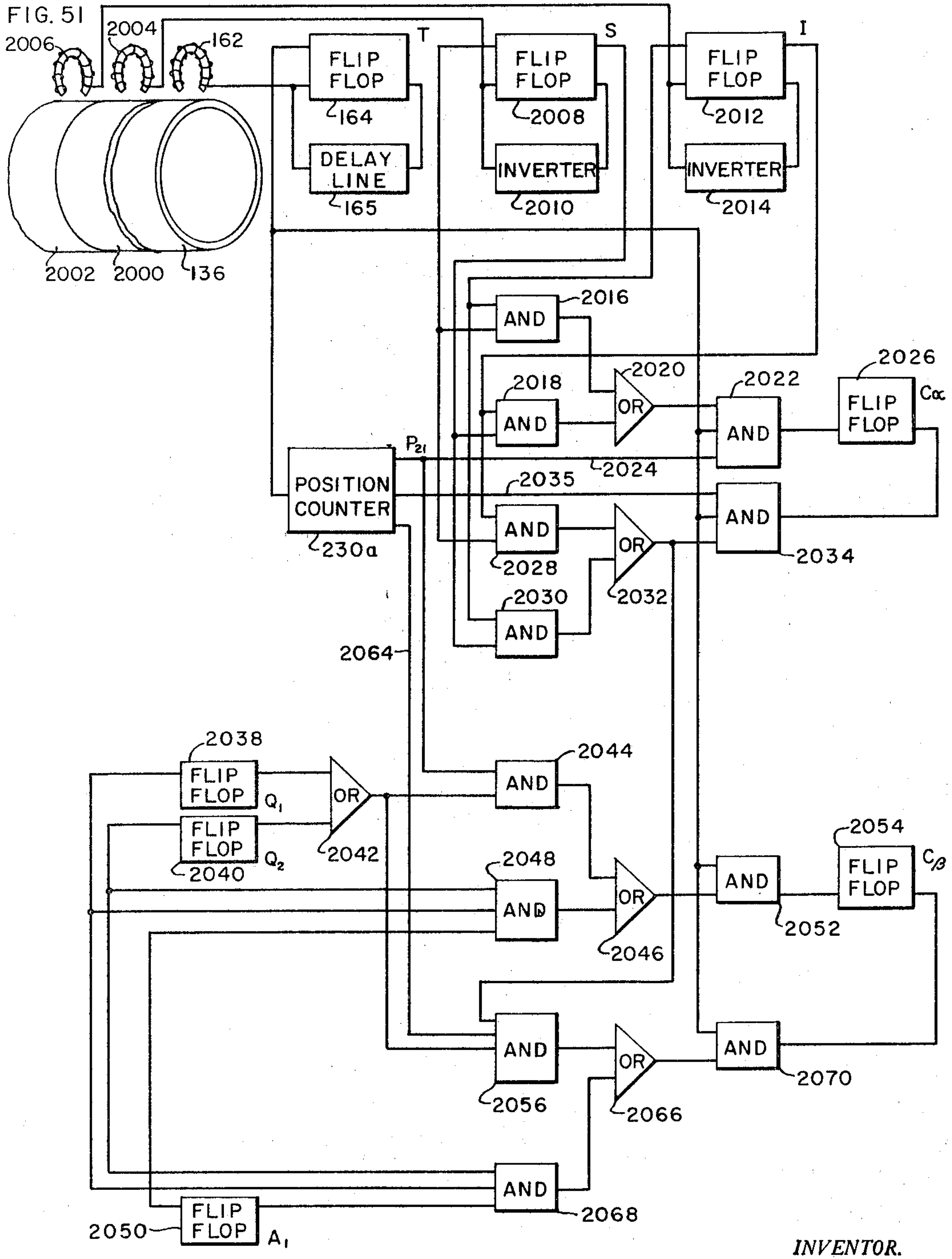

The block diagrams for the digital computer and the coupling apparatus are shown in FIGURES 51 to 61, inclusive. In FIGURE 51, the flip-flop 164 and delay line 165 are included for producing clock signals in accordance with the clock information in the channel 138. The flip-flop 164 and the delay line 165 are also included in the previous FIGURES, which show the digital differential analyzer. The signals on the left output terminal of the flip-flop 164 are shown in FIGURE 51 as being introduced to a position counter **230*a*. The counter 230*a* corresponds to the counter 230 shown in detail in FIGURE 4 and shown in block form in FIGURE 5 and other of the previous figures. However, the counter 230*a* counts on a cyclic basis the number of clock signals between "1" and "21" instead of between "1" and "18" as described previously for the counter 230. The reasons for providing a count between "1" and "21" in the counter 230*a*** will be explained in detail subsequently.

Certain channels are included on the drum 132 in addition to the channels described previously such as the channels 136, 138, 140, 142, 144, etc. For example, additional channels designated as 2000 and 2002 are included on the drum 132 to store in magnetic form information on the drum. Coils 2004 and 2006 are respectively coupled to the channels 2000 and 2002 to read the magnetic information in the channels 2000 and 2002. The coil 2004 is connected to the left input terminal of a flip-flop 2008 and to the input terminal of an inverter 2010 having its output terminal connected to the right input terminal of the flip-flop. In like manner, the signals induced in the coil 2006 are applied to the left input terminal of a flip-flop 2012 and to the input terminal of an inverter 2014, the output terminal of which is connected to the right input terminal of the flip-flop.

An "and" network 2016 receives the voltages on the left output terminals of the flip-flops 2008 and 2012. Similarly, an "and" network 2018 has voltages applied to it from the right output terminals of the flip-flops 2008 and 2012. The signals from the "and" networks 2016a and 2018 are introduced through an "or" network 2020 to an input terminal of an "and" network 2022. Other input terminals of the "and" network 2022 are connected to the left output terminal of the flip-flop 164 and through a line 2024 to the position counter 230a. The line 2024 is connected to the counter 230a to apply a high voltage to the "and" network 2022 upon each occurrence of a count of "21" in the counter. The signals from the "and" network 2022 pass to the left input terminal of a flip-flop 2026 to trigger the flip-flop to the true state.

Connections are made to an "and" network 2028 from the left output terminal of the flip-flop 2008 and the right output terminal of the flip-flop 2012. In like manner, input terminals of an "and" network 2030 receive the voltages from the right output terminal of the flip-flop 2008 and the left output terminal of the flip-flop 2012. The signals from the "and" networks 2028 and 2030 are applied through an "or" network 2032 to an input terminal of an "and" network 2034 having other input terminals connected to the left output terminal of the flip-flop 164 and through a line 2035 to the counter 230a. The signals from the "and" network 2034 are in turn applied to the right input terminal of the flip-flop 2026.

Although the line 2035 is shown as coming directly from the counter 230a, actually it extends from a plurality of "and" networks and "or" networks connected to the cathode. Those "and" networks and "or" networks are connected to pass a signal between positions 1 to 6, inclusive, for each block. It is believed that a person skilled in the art would be able to construct these "and" networks and "or" networks from the previous discussion.

Flip-flops 2038 and 2040 are also shown in FIGURE 51. The flip-flops 2038 and 2040 have their right output terminals connected to input terminals of an "or" network 2042, the output from which is applied to an input terminal of an "and" network 2044. Another input terminal of the "and" network 2044 is connected through work 2042, the output from which is applied to an input the line 2024 to the counter 230a. The output signals from the "and" network 2044 pass to an "or" network 2046.

A second input terminal of the "or" network 2046 receives signals from an "and" network 2048 having input terminals connected to the left output terminals of the flip-flops 2038 and 2040 and to the left output terminal of a flip-flop 2050. The signals applied to the "or" network 2046 from the "and" networks 2044 and 2048 pass to one input terminal of an "and" network 2052, another input terminal of which is connected to the left output terminal of the flip-flop 164. A connection is made from the output terminal of the "and" network 2052 to the left input terminal of a flip-flop 2054.

The signals from the "or" network 2042 pass to an input terminal of an "and" network 2056 as well as to an input terminal of the "and" network 2044. Another input terminal of the "and" network 2056 is connected to the output terminal of the "or" network 2032. Still another input terminal of the "and" network 2056 receives a high voltage through a line 2064 from the counter 230a at positions 9 to 15, inclusive, for each block. Although only the line 2064 is shown to pass signals in positions 9 to 15, inclusive, for each block, it should be appreciated that actually signals are produced in these positions by connecting a plurality of "and" networks and "or" networks to the counter 230a in a particular arrangement. It is believed that a person skilled in the art would be able to connect the "and" networks and "or" networks in the desired manner on the basis of the previous discussion so as to obtain a signal in positions 9 to 15, inclusive, for each block on the line 2064.

The signals from the "and" network 2056 pass to an input terminal of an "or" network 2066. Another input terminal of the "or" network 2066 is connected to the output terminal of an "and" network 2068 having input terminals connected to the left output terminals of the flip-flops 2038 and 2040 and to the right output terminal of the flip-flop 2050. The signals from the "or" network 2066 pass to an input terminal of an "and" network 2070 another input terminal of which is connected to the left output terminal of the flip-flop 164. The signals from the "and" network 2070 are in turn applied to the right input terminal of the flip-flop 2054.

Figure 52:
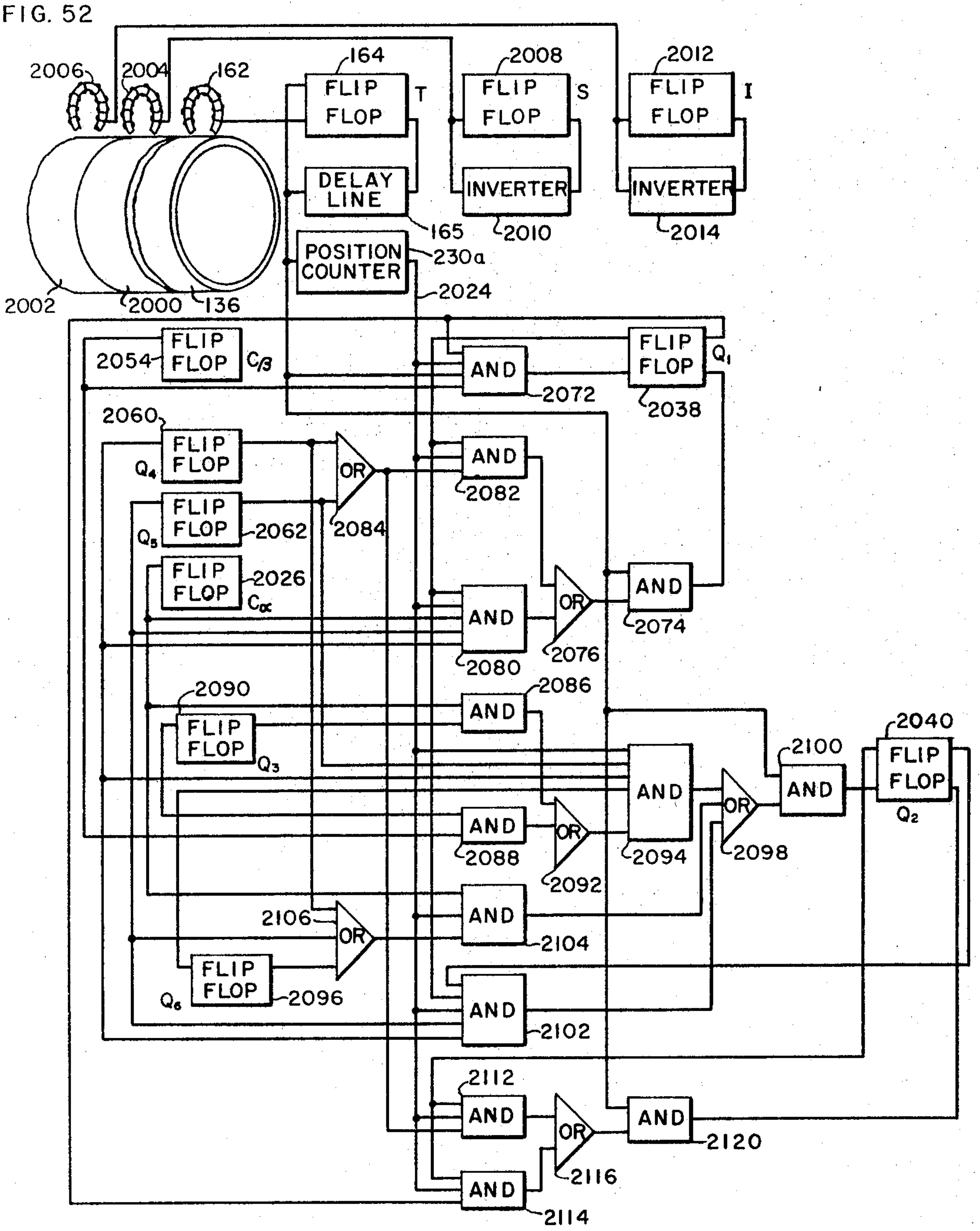

The stages for controlling the operation of the flip-flops 2038 and 2040 are shown in FIGURE 52. These stages include an "and" network 2072 having input terminals connected to the left input terminals of the flip-flops 164 and 2054, to the right output terminal of the flip-flop 2038 and through the line 2024 to the counter 230a. The signals from the "and" network 2072 are applied to the left input terminal of the flip-flop 2038.

The right input terminal of the flip-flop 2038 has signals applied to it from the output terminal of an "and" network 2072, input terminals of which are connected to an "or" network 2076 and to the left input terminal of the flip-flop 164. Signals are applied to the "or" network 2076 from "and" networks 2080 and 2082. Input connections are made to input terminals of the "and" network 2080 from the left output terminals of the flip-flops 2026, 2038, 2060 and 2062 and through the line 2024 from the counter 230a. The "and" network 2082 has input terminals connected to the output terminal of an "or" network 2084, to the left output terminal of the flip-flop 2038 and through the line 2024 from the counter 230a. Signals pass through the "or" network 2084 from the right output terminals of the flip-flops 2060 and 2062.

"And" networks 2086 and 2088 are included to control in part the introduction of triggering signals to the left input terminal of the flip-flop 2040. The "and" network 2086 has input terminals connected to the left output terminal of the flip-flop 2026 and to the right output terminal of a flip-flop 2090. Input terminals of the "and" network 2088 are connected to the left output terminals of the flip-flops 2054 and 2090. The signals from the "and" networks 2086 and 2088 pass through an "or" network 2092 to an input terminal of an "and" network 2094. The "and" network 2094 has other input terminals connected to the left output terminals of the flip-flop 2060 and of a flip-flop 2096, to the right input terminal of the flip-flop 2062 and to the line 2024 extending from the counter 230a.

The signals from the "and" network 2094 pass through an "or" network 2098 to an input terminal of an "and" network 2100 having another input terminal connected to the left output terminal of the flip-flop 164. The signals from the "and" network 2100 are in turn applied to the left output terminal of the flip-flop 2040. Signals from "and" networks 2102 and 2104 also pass through the "or" network 2098 to the "and" network 2100. Connections are made to input terminals of the "and" network 2102 from the left output terminals of the flip-flops 2038, 2060 and 2062, from the right input terminal of the flip-flop 2040 and from the line 2024 extending from the counter 230a. The "and" network 2104 has input terminals connected to an "or" network 2106, the line 2024 and the left output terminal of the flip-flop 2026. Signals pass through the "or" network 2106 from the left output terminal of the flip-flop 2062 and the right output terminals of the flip-flops 2060 and 2096.

The signals from the "or" network 2084 are applied to an "and" network 2112 as well as to the "and" network 2082. Other input terminals of the "and" network 2112 have signals applied to them from the left output terminal of the flip-flop 2040 and from the line 2024. The "and" network 2112 is associated with an "and" network 2114, input terminals of which are connected to the line 2024, the left output terminal of the flip-flop 2040 and the right output terminal of the flip-flop 2038. The signals from the "and" networks 2112 and 2114 pass through an "or" network 2116 to an input terminal of an "and" network 2120 having another input terminal connected to the left output terminal of the flip-flop 164. The signals from the "and" network 2120 are in turn introduced to the right input terminal of the flip-flop 2040 to trigger the flip-flop to the false state of operation.

Figure 53:
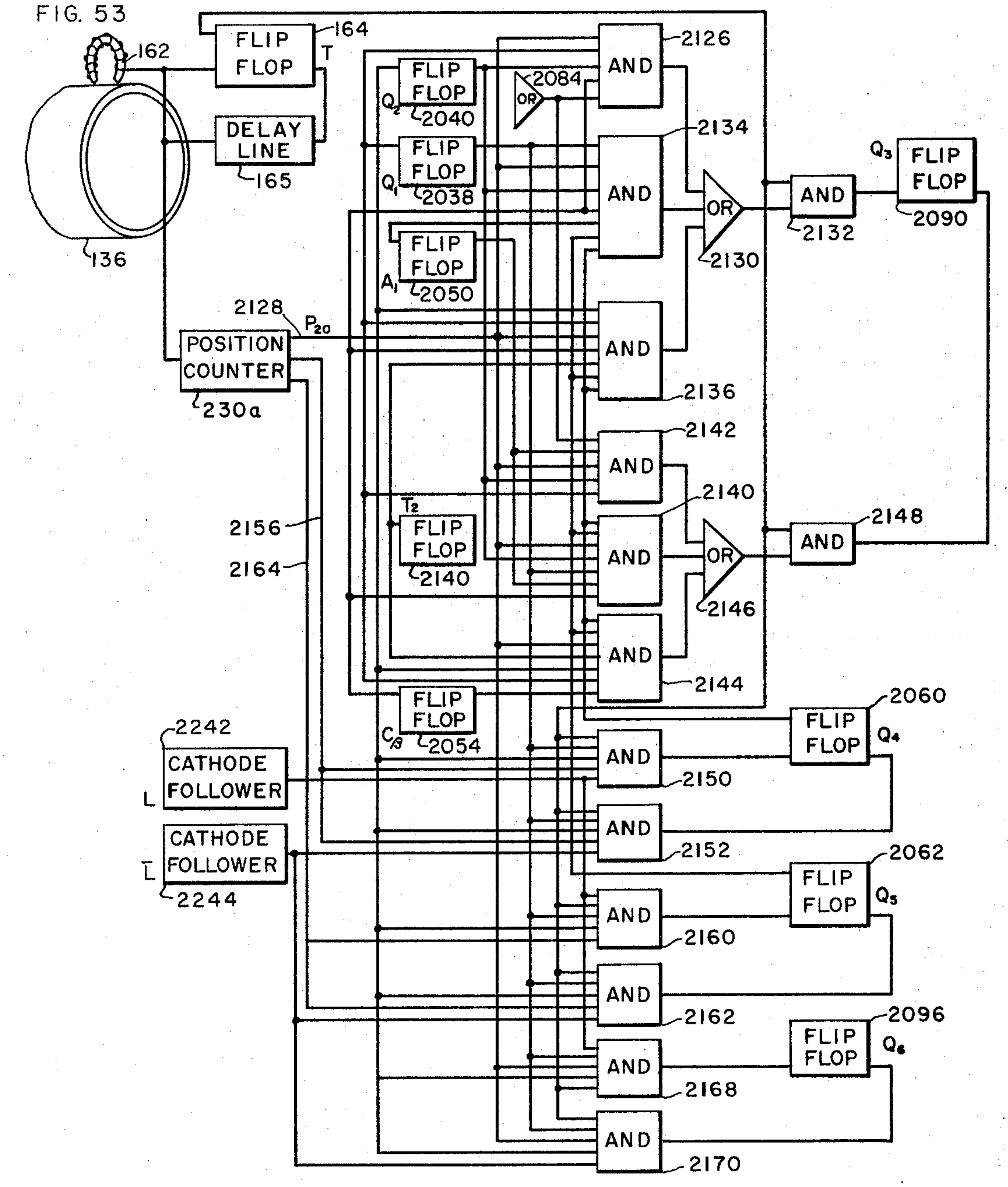

The operation of the flip-flops 2060, 2062, 2090 and 2096 is controlled by the stages shown in FIGURE 53. These stages include an "and" network 2126 having input terminals connected to the "or" network 2084 (also shown in FIGURE 52), to the left input terminals of the flip-flops 2038 and 2050 and to the right input terminal of the flip-flop 2040. Another input terminal of the "and" network 2126 is connected to the counter **230*a* through a line 2028 which is adapted to receive a high voltage at position 20 for each block. The output signals from the "and" network 2126 pass through an "or" network 2130 to an input terminal of an "and" network 2132, another input terminal of which is connected to the left output terminal of the flip-flop 164. The signals from the "and" network 2132 are in turn applied to the left input terminal of the flip-flop 2090**.

The "or" network 2130 receives signals from "and" networks 2134 and 2136 as well as from the "and" network 2126. Connections are made to input terminals of the "and" network 2134 from the left output terminals of the flip-flops 2050, 2054, 2060 and 2062, from the right output terminals of the flip-flops 2038 and 2040 and from the line 2128 extending from the counter **230*a*. The "and" network 2136 has input terminals connected to the line 2128 extending from the counter 230*a*, to the left output terminals of the flip-flops 2038, 2040, 2054, 2060 and 2062 and to the left output terminal of a flip-flop 2140**.

Signals pass through "and" networks 2139, 2142 and 2144 to the right input terminal of the flip-flop 2090. The "and" network 2139 receives at its input terminals signals from the line 2128, the left output terminals of the flip-flops 2054, 2060 and 2062 and the right output terminals of the flip-flops 2038, 2040 and 2054. The "and" network 2142 has signals applied to it from the line 2128, the "or" network 2110, the left output terminal of the flip-flop 2038 and the right output terminals of the flip-flops 2040 and 2050. Connections are made to input terminals of the "and" network 2144 from the line 2128, the left output terminals of the flip-flops 2038, 2040, 2060, 2062 and 2140 and the right output terminal of the flip-flop 2054. The signals from the "and" network 2139, 2142 and 2144 pass through an "or" network 2146 to an input terminal of an "and" network 2148 having another input terminal connected to the left output terminal of the flip-flop 164. The output signals from the "and" network 2148 are applied to the right input terminal of the flip-flop 2090.

Signals from "and" networks 2150 and 2152 respectively pass to the left and right input terminals of the flip-flop 2060. Input terminals of the "and" network 2150 are connected to a cathode follower 2242, to the left output terminals of the flip-flops 164 and 2040 and to the right output terminal of the flip-flop 2038. Another input terminal of the "and" network 2050 is connected through a line 2156 to the counter **230*a* to receive signals at position "18" for each block. In like manner, the "and" network 2150 has input terminals connected to a cathode follower 2244, to the line 2156 extending from the counter 230*a*, to the left output terminals of the flip-flops 164 and 2040 and to the right output terminal of the flip-flop 2038**.

"And" networks 2160 and 2162 respectively control the passage of triggering signals to the left and right input terminals of the flip-flop 2062. Connections are made to input terminals of the "and" network 2160 from the cathode follower 2242, the left output terminals of the flip-flops 164 and 2040 and the right output terminal of the flip-flop 2038. Another input terminal of the "and" network 2060 is connected through a line 2164 to the counter **230*a* to receive signals at position "19" for each block. The "and" network 2162 has signals applied to it from the cathode follower 2244, the line 2164 extending from the counter 230*a*, the left output terminals of the flip-flops 164 and 2040 and the right output terminal of the flip-flop 2038**.

Triggering signals are respectively applied from "and" networks 2168 and 2170 to the left and right input terminals of the flip-flop 2096. The "and" network 2168 passes a triggering signal upon the simultaneous introduction of high voltages from the cathode follower 2242, the left output terminals of the flip-flops 164 and 2040, the right output terminal of the flip-flop 2038 and the line 2128 extending from the counter **2030*a*. In like manner, a triggering signal passes through the "and" network 2170 when relatively high voltages are simultaneously introduced to the network from the line 2128, the cathode follower 2244, the left output terminals of the flip-flops 164 and 2040 and the right output terminal of the flip-flop 2038**.

FIGURE 54 shows the stages for controlling the introduction of triggering signals to the flip-flop 2140 and to a flip-flop 2176. These stages include "and" networks 2178, 2180 and 2182. The "and" network 2178 has input terminals connected to the left output terminals of the flip-flops 2012 and 2026 and to a line 2186 extending from the counter **230*a*. Signals are adapted to pass through the line 2186 to the "and" network 2178 at position "7" for each block. Input terminals of the "and" network 2180 are connected to the "or" network 2042, to the left output terminals of the flip-flops 2012 and 2054 and to a line 2188 extending from the counter 238. The counter 238 is adapted to introduce signals to the "and" network 2180 through the line 2188** at position "16" for each block.

Connections are made to input terminals of the "and" network 2182 from the left output terminals of the flip-flops 2038, 2040, 2060 and 2062, the left output terminal of a flip-flop 2190 and the right output terminals of the flip-flops 2026 and 2096. The "and" network 2182 also has signals applied to it from an "or" network 2192, which receives the voltage on the right output terminal of the flip-flop 2026 and the signals passing through the line 2035 from the counter **230*a*. The signals from the "and" network 2182 and from the "and" networks 2178 and 2180 pass through an "or" network 2194 to an input terminal of an "and" network 2196 having another input terminal connected to the left output terminal of the flip-flop 164. The signals from the "and" network 2196 are introduced to the left input terminal of the flip-flop 2176**.

Signals from "and" networks 2200, 2202 and 2204 are introduced through an "or" network 2206 to an "and" network 2208. The signals passing to the "and" network 2208 are synchronized by the clock signals on the left output terminal of the flip-flop 164 and are introduced to the right input terminal of the flip-flop 2176. The signals pass through the "and" network 2200 in accordance with the introduction of signals from the line 2186 and the left output terminals of the flip-flop 2026 and the right output terminal of the flip-flop 2012. Connections are made to input terminals of the "and" network 2202 from the line 2188, the "or" network 2042, the left output terminal of the flip-flop 2054 and the right output terminal of the flip-flop 2012. The "and" network 2204 receives input signals from the "or" network 2192, the left output terminals of the flip-flops 2038, 2040, 2060 and 2062 and the right output terminals of the flip-flops 2096 and 2190.

Signals pass to the left input terminal of the flip-flop 2140 from the output terminal of an "and" network 2212 having input terminals connected to an "or" network 2214 and to the left output terminal of the flip-flop 164. The "or" network 2214 receives signals from an "and" network 2216. Connections are made to input terminals of the "and" network 2216 from the left output terminals of the flip-flops 2012 and 2026 and through a line 2218 from the counter 230*a*. The line 2218 is adapted to receive a signal from the counter 230*a* at position 8 for each block.

The "or" network 2214 receives signals from "and" networks 2220, 2222 and 2224 as well as from the "and" network 2216. Input terminals of the "and" network 2220 are connected to the "or" network 2042, to the left output terminals of the flip-flops 2012 and 2054 and to a line 2226 extending from the counter 230*a*. Signals are introduced to the "and" network 2220 through the line 2226 from the counter 230*a* at position 17 for each block. The "and" network 2222 has input terminals connected to the left output terminals of the flip-flops 2038, 2060 and 2062, to the right output terminals of the flip-flops 2040 and 2096 and to the line 2024 extending from the counter 230*a*. Signals are applied to input terminals of the "and" network 2224 from the line 2024, the left output terminals of the flip-flops 2038, 2040, 2060 and 2062 and the right output terminals of the flip-flops 2026, 2096 and 2140.

"And" networks 2230, 2232 and 2234 are associated with one another to control the introduction of signals to the right input terminal of the flip-flop 2140. Signals pass through the "and" network 2230 upon the simultaneous introduction of high voltages from the left output terminal of the flip-flop 2026, the right output terminal of the flip-flop 2012 and the line 2218 extending from the counter 230*a*. The "and" network 2232 passes a signal when high voltages are simultaneously introduced to the "and" network from the "or" network 2042, the left output terminal of the flip-flop 2054, the right output terminal of the flip-flop 2014 and the line 2226 extending from the counter 230*a*.

The "and" network 2234 has voltages introduced to it from the line 2024, the left output terminals of the flip-flops 2038, 2040, 2060, 2062 and 2140 and the right output terminals of the flip-flops 2026 and 2096. The signals from the "and" networks 2230, 2232 and 2234 pass through an "or" network 2236 to an input terminal of an "and" network 2238 having another input terminal connected to the left output terminal of the flip-flop 164. The signals from the "and" network 2238 are in turn applied to the right input terminal of the flip-flop 2140.

Figure 55:
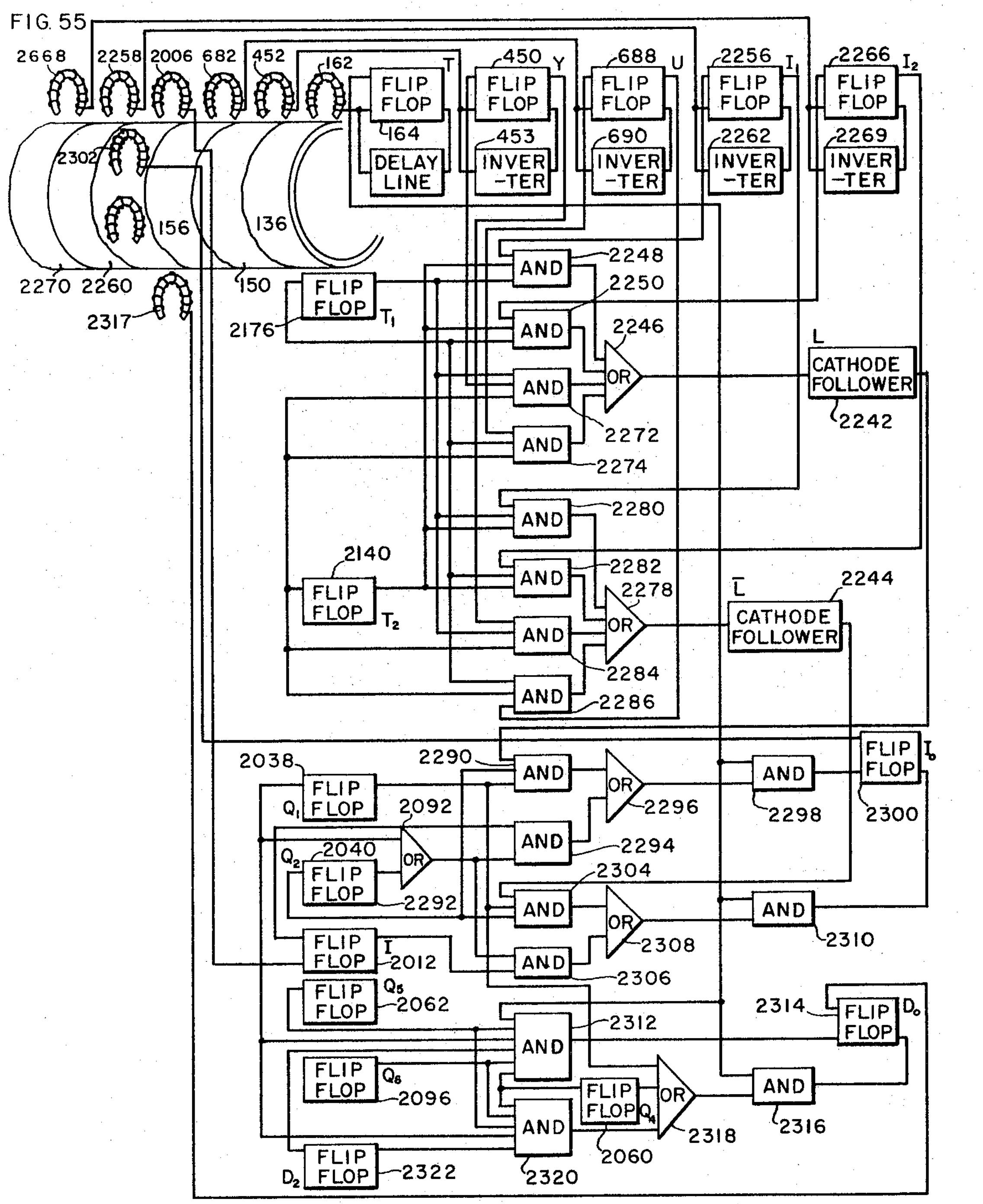

The stages for controlling the introduction of signals to the cathode followers 2242 and 2244 are shown in FIGURE 55. The cathode follower 2242 receives signals passing through an "or" network 2246 from an "and" network 2248. Input terminals of the "and" network 2248 are connected to the right output terminals of the flip-flops 2140 and 2176 and to the left output terminal of a flip-flop 2256. The left input terminal of the flip-flop 2256 is connected to a coil 2258 disposed in contiguous relationship to a track 2260 on the drum 132. The signals from the coil 2258 are also applied to the input terminal of an inverter 2262 having its output terminal connected to the right input terminal of the flip-flop 2256. Signals are induced in the coil 2268 in a fixed pattern during each revolution of the drum 132 since information is permanently recorded in the track 2260 during the solution of a problem.

Signals also pass through the "or" network 2246 from an "and" network 2250. Connections are made to input terminals of the "and" network 2250 from the left output terminal of the flip-flop 2176, the right output terminal of the flip-flop 2140 and the left output terminal of a flip-flop 2266. The left input terminal of the flip-flop 2266 has signals applied to it from a coil 2268 disposed in contiguous relationship to a track 2270 on the drum 132. The signals induced in the coil 2268 are also applied to an input terminal of an inverter 2269 having its output terminal connected to the right input terminal of the flip-flop 2266. Signals are induced in the coil 2268 in a fixed pattern during each revolution of the drum 132 since information is permanently recorded in the track 2270 during a solution of a problem.

The "or" network 2246 receives signals from an "and" network 2272 as well as from the "and" networks 2248 and 2250. The "and" network 2272 passes a signal upon the simultaneous occurrence of high voltages on the left output terminal of the flip-flop 2140, the right output terminal of the flip-flop 2176 and the left output terminal of the flip-flop 450. As described previously, the flip-flop 450 produces signals in accordance with the signals which are induced in the coil 452 disposed in contiguous relationship to the track 150 of the drum 130. The flip-flop 450 and the coil 452 are shown in FIGURE 26 and other figures schematically illustrating the construction of the digital differential analyzer.

In addition to receiving the signals from the "and" networks 2248, 2250 and 2272, the "or" network 2246 has signals applied to it from an "and" network 2274. Voltages are applied to the "and" network 2274 from the left output terminals of the flip-flops 2140 and 2176 and from the left output terminal of the flip-flop 688. As previously described, the flip-flop 688 is triggered in a pattern corresponding to the pattern of signals induced in the coil 682 which is disposed in contiguous relationship to the track 156 of the drum 132. The flip-flop 450 and the coil 452 are shown in FIGURE 28 and other figures schematically illustrating the construction of the digital differential analyzer.

The cathode follower 2244 provides signals representing the converse in binary form of the information provided by the cathode follower 2242. The cathode follower 2244 has signals applied to it through an "or" network 2278 from "and" networks 2280, 2282, 2284 and 2286. Input terminals of the "and" network 2280 are connected to the right output terminals of the flip-flops 2140, 2176 and 2256. The "and" network 2282 has input terminals connected to the left output terminal of the flip-flop 2176 and the right output terminals of the flip-flops 2140 and 2266. Connections are made to input terminals of the "and" network 2284 from the left output terminal of the flip-flop 2140 and the right output terminals of the flip-flops 450 and 2176. The "and" network 2286 receives voltages from the left output terminals of the flip-flops 2140 and 2176 and the right output terminal of the flip-flop 688.

The signals from the cathode follower 2242 are introduced to an input terminal of an "and" network 2290 having other input terminals connected to the left output terminal of the flip-flop 2040 and the right output terminal of the flip-flop 2038. The "and" network 2290 is associated with an "or" network 2292 and an "and" network 2294. The "or" network 2292 has its input terminals connected to the left output terminal of the flip-flop 2038 and the right output terminal of the flip-flop 2040. The signals from the "or" network 2292 pass to an input terminal of the "and" network 2294, another input terminal of which is connected to the left output terminal of the flip-flop 2012 (also shown in FIGURE 51).

An "or" network 2296 receives the signals from the "and" networks 2290 and 2294 and introduces these signals to an input terminal of an "and" network 2298 having another input terminal connected to the left output terminal of the flip-flop 164. The output signals from the "and" network 2298 are introduced to the left input terminal of a flip-flop 2300 to trigger tre flip-flop to the true state. The resultant signals of high amplitude on the left output terminal of the flip-flop 2300 are introduced to a coil 2302 to record indications of "0" in the track 2002. The coil 2302 is disposed in contiguous relationship to the track 2002 and is separated from the coil 2006 by approximately 21 pulse positions for reasons which will be described in detail subsequently.

"And" networks 2304 and 2306 control the introduction of triggering signals to the right input terminal of the flip-flop 2300. Connections are made to input terminals of the "and" network 2304 from the cathode follower 2244, the left output terminal of the flip-flop 2040 and the right output terminal of the flip-flop 2038. The "and" network 2306 has input terminals connected to the "or" network 2292 and the right output terminal of the flip-flop 2012. The signals from the "and" networks 2304 and 2306 pass through an "or" network 2308 to an input terminal of an "and" network 2310 having another input terminal connected to the left output terminal of the flip-flop 164. The signals from the "and" network 2310 are introduced to the right input terminal of the flip-flop 2300.

An "and" network 2312 is also shown in FIGURE 55. The "and" network 2312 has signals applied to it from the left output terminals of the flip-flops 164, 2038, 2060 and 2062, the left output terminal of a flip-flop 2322 and the right output terminal of the flip-flop 2096. The signals from the "and" network 2312 are introduced to the left input terminal of a flip-flop 2314 to trigger the flip-flop into the true state of operation. The signals of high amplitude produced on the left output terminal of the flip-flop 2314 in the true state of the flip-flop are introduced to a coil 2317. The coil 2317 is disposed in contiguous relationship to the track 2002 to record indications of "1" in the track 2002 for true states of operation of the flip-flop 2314.

The right input terminal of the flip-flop 2314 receives the triggering signals passing through an "and" network 2316, the operation of which is controlled by the signals from an "or" network 2318 and from the left output terminal of the flip-flop 164. Signals are applied to the "or" network 2318 from the right output terminals of the flip-flops 2038 and 2060 and from an "and" network 2320. Connections are made to input terminals of the "and" network 2320 from the left output terminals of the flip-flops 2038, 2060 and 2062 and from the right output terminals of the flip-flops 2096.

Figure 56:
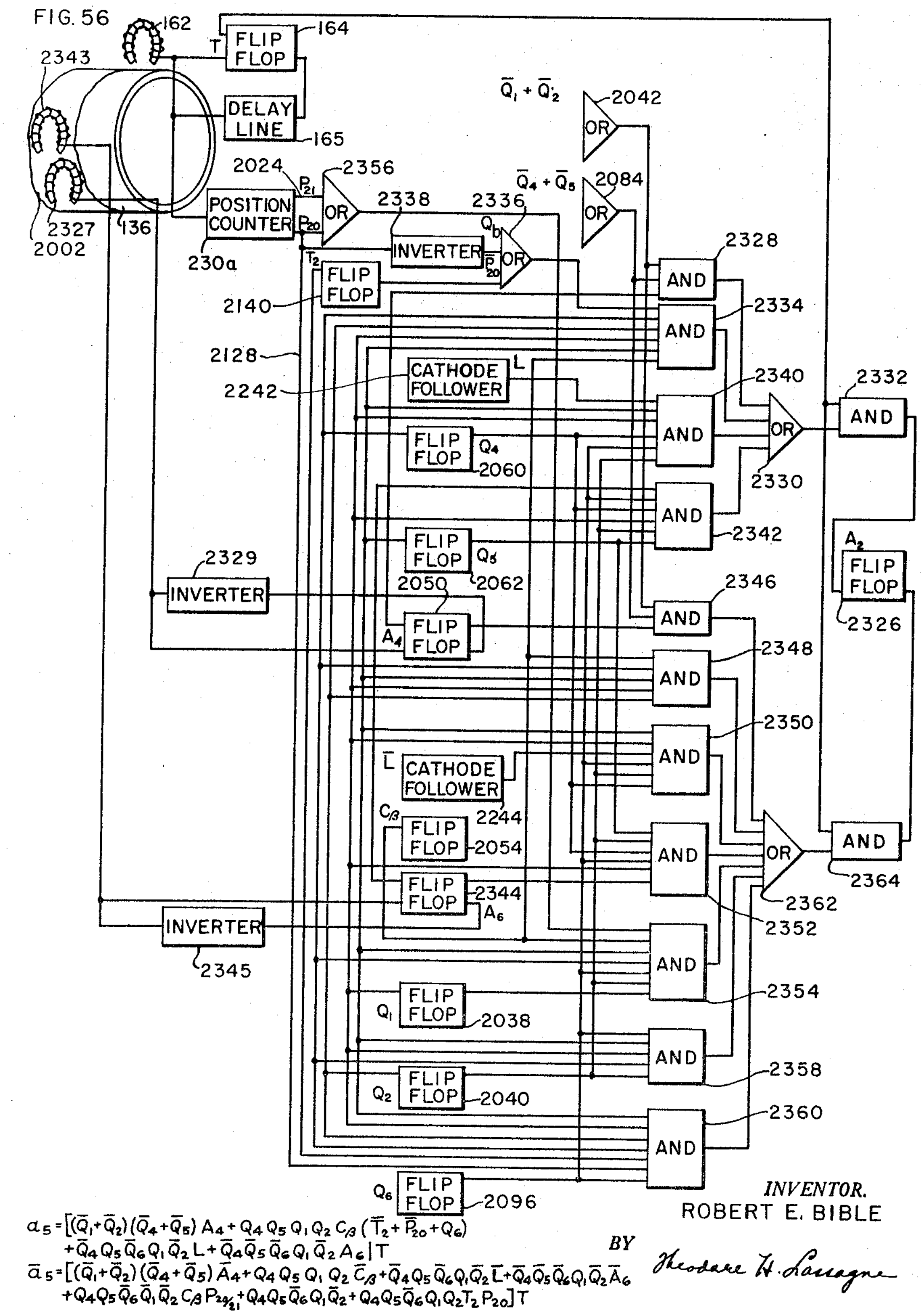

A plurality of stages are shown in FIGURE 56 for controlling the operation of a flip-flop 2326. These stages include an "and" network 2328 adapted to receive signals from the "or" networks 2042 and 2084 and from the left output terminal of the flip-flop 2050. The flip-flop 2050 is adapted to be triggered into a pattern of operation corresponding to the pattern of signals induced in a coil 2327 which is disposed in contiguous relationship to the track 2002. The flip-flop 2050 is adapted to be triggered in this pattern because of the connection of the coil 2327 to the left input terminal of the flip-flop and to the input terminal of an inverter 2329 having its output terminal connected to the right input terminal of the flip-flop.

The signals from the "and" network 2328 are introduced through an "or" network 2330 to an input terminal of an "and" network 2332 having a second input terminal connected to the left output terminal of the flip-flop 164 and having an output terminal connected to the left input terminal of teh flip-flop 2326. Signals from an "and" network 2334 also pass through the "or" network 2330 to the "and" network 2322. The "and" network 2334 has input terminals connected to an "or" network 2336 and to the left output terminals of the flip-flops 2038, 2040, 2054, 2060 and 2062. The "or" network 2336 receives at its input terminals signals from the right output terminal of the flip-flop 2140 and from an inverter 2338. The inverter 2338 is adapted to receive the signals passing through the line 2128 from the counter **230*a***.

The "or" network 2330 receives signals from "and" networks 2340 and 2342 as well as from the "and" networks 2328 and 2334. Input terminals of the "and" network 2340 are connected to the cathode follower 2242, the left output terminals of the flip-flops 2038 and 2062 and the right output terminals of the flip-flops 2040, 2060 and 2096. The "and" network 2342 is able to pass a signal only upon the simultaneous occurrence of relatively high voltages from the left output terminals of the flip-flop 2038 and of a flip-flop 2344 and the right output terminals of the flip-flops 2040, 2060, 2062 and 2096. The left input terminal of the flip-flop 2344 is connected to a coil 2343 disposed in contiguous relationship to the track 2002. The signals induced in the coil 2343 are also introduced to the input terminal of an inverter 2345 having its output terminal connected to the right input terminal of the flip-flop 2344. The coil 2343 is adapted to be separated from the coil 2327 by a distance of approximately 21 pulse positions.

A plurality of "and" networks are included in FIGURE 56 to control the passage of triggering signals to the right input terminal of the flip-flop 2326. Three of these networks are indicated at 2346, 2348 and 2350. The "and" networks 2346 has input terminals connected to the "or" networks 2042 and 2084 and to the right output terminal of the flip-flop 2050. The passage of signals through the "and" network 2348 is controlled by the voltages on the left output terminals of the flip-flops 2038, 2040, 2054, 2060 and 2062. Signals pass through the "and" network 2350 uupon the simultaneous occurrence of high voltages in the cathode follower 2244, on the left output terminals of the flip-flops 2038 and 2062 and on the right output terminals of the flip-flops 2040, 2060 and 2096.

"And" networks 2352 and 2354 are also included in FIGURE 56 to control the passage of triggering signals to the right input terminal of the flip-flop 2326. Connections are made to input terminals of the "and" network 2352 from the left output terminal of the flip-flop 2038 and the right output terminals of the flip-flops 2040, 2060, 2062, 2096 and 2344. The "and" network 2354 receives signals from the left output terminals of the flip-flops 2054, 2060 and 2062 and the right output terminals of the flip-flops 2038, 2040 and 2096. The "and" network 2034 also has signals applied to it from an "or" network 2356, input terminals of which are connected to the lines 2024 and 2128 extending from the counter **230*a***.

"And" networks 2358 and 2360 are associated with the "and" networks 2346, 2348, 2350, 2352 and 2354. The "and" network 2358 passes a signal when high voltages are simultaneously received by the network from the left output terminals of the flip-flops 2038, 2060 and 2062 and the right output terminals of the flip-flops 2040 and 2096. The "and" network 2360 passes a signal upon the simultaneous introduction of high voltages from the left output terminals of the flip-flops 2038, 2040, 2060, 2062 and 2140, the right output terminal of the flip-flop 2096 and the line 2128 extending from the counter **230*a*. The signals from the "and" networks 2346, 2348, 2350, 2352, 2354, 2358 and 2360 pass through an "or" network 2362 to an input terminal of an "and" network 2364 having another input terminal connected to the left output terminal of the flip-flop 164. The signals from the "and" network 2364 are in turn applied to the right input terminal of the flip-flop 2326**.

Figure 57:
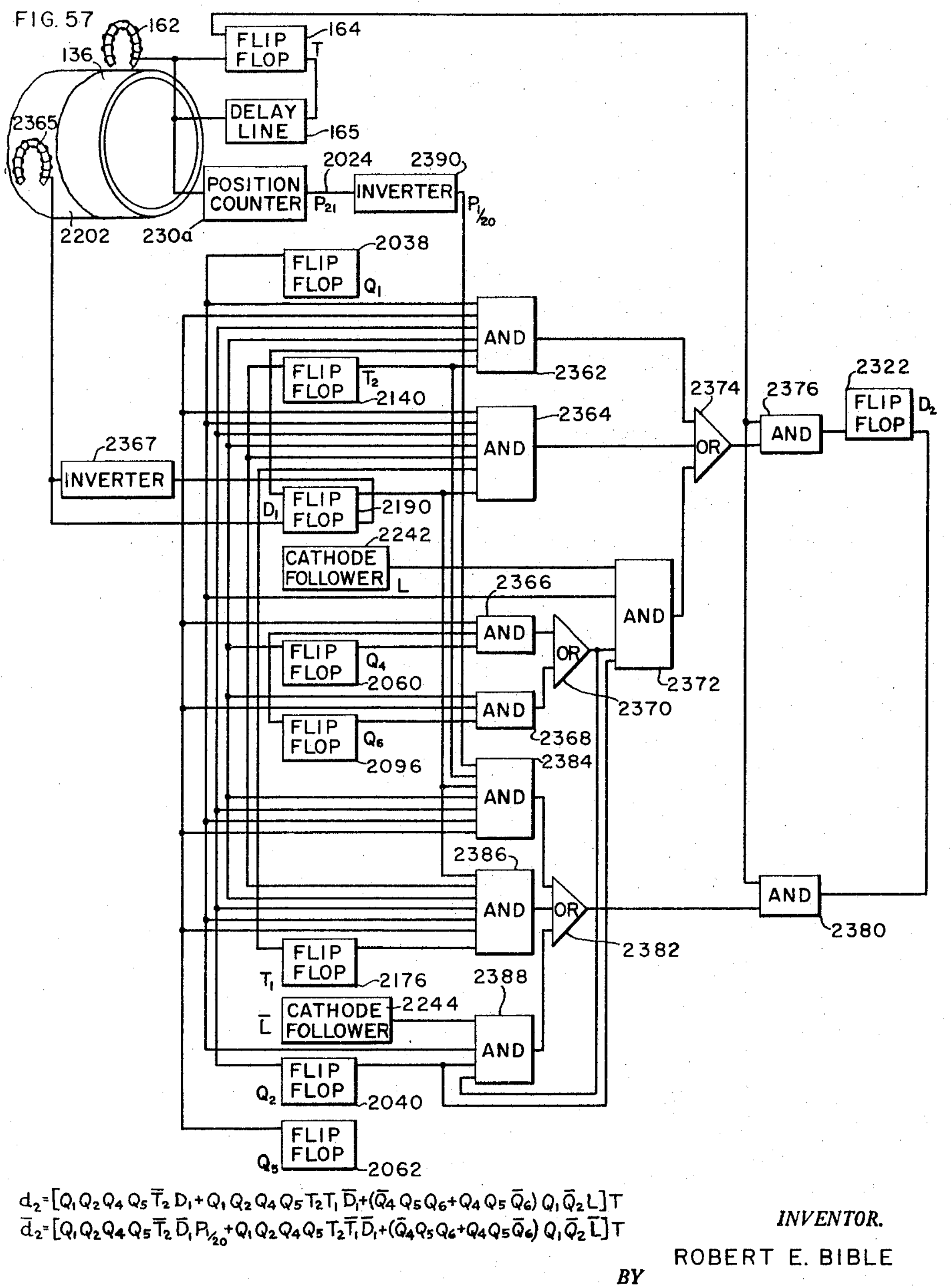

FIGURE 57 shows the stages for controlling the operation of the flip-flop 2322. These stages include "and" networks 2362 and 2364. Input terminals of the "and" network 2362 are connected to the left output terminals of the flip-flops 2038, 2040, 2060, 2062 and 2190 and the right output terminal of the flip-flop 2140. The left input terminal of the flip-flop 2190 receives the signals induced in a coil 2365. The signals induced in the coil 2365 are also introduced to the input terminal of an inverter 2367 having its output terminal connected to the right input terminal of the flip-flop 2190. The coil 2190 is disposed in contiguous relationship to the track 2002 and is separated from the coil 2317 by approximately 21 pulse positions.

The "and" network 2364 receives at its input terminals the voltages on the left output terminals of the flip-flops 2038, 2040, 2060, 2062, 2140 and 2176 and on the right output terminal of the flip-flop 2190. The signals from the "and" networks 2362 and 2364 pass through an "or" network 2374 to an input terminal of an "and" network 2376 having another input terminal connected to the left output terminal of the flip-flop 164. The signals from the "and" network 2376 are in turn applied to the left input terminal of the flip-flop 2322.

The "and" networks 2362 and 2364 are associated with "and" networks 2366 and 2368. Input terminals of the "and" network 2366 are connected to the left output terminals of the flip-flops 2062 and 2096 and to the right output terminal of the flip-flop 2060. Connections are made to input terminals of the "and" network 2368 from the left output terminals of the flip-flops 2060 and 2062 and the right output terminal of the flip-flop 2096. The signals from the "and" networks 2366 and 2368 are introduced through an "or" network 2370 to an input terminal of an "and" network 2372. The "and" network 2372 also receives signals from the cathode follower 2242, the left output terminal of the flip-flop 2038 and the right output terminal of the flip-flop 2040. The signals passing through the "and" network 2372 are introduced to the "or" network 2374.

The right input terminal of the flip-flop 2322 has signals applied to it from an "and" network 2380, input terminals of which are connected to an "or" network 2382 and to the left output terminal of the flip-flop 164. The "or" network 2382 passes the signals from "and" networks 2384, 2386 and 2388. Signals pass through the "and" network 2384 upon the simultaneous introduction of high voltages from an inverter 2390, the left output terminals of the flip-flops 2038, 2040, 2060 and 2062 and the right output terminals of the flip-flops 2140 and 2190. The inverter 2390 operates upon the signals introduced to the line 2024 from the counter **230*a***.

In like manner, signals pass through the "and" network 2386 when high voltages are simultaneously introduced to the "and" network from the left output terminals of the output terminals of the flip-flops 2038, 2040, 2060, 2062 and 2140 and the right output terminals of the flip-flops 2176 and 2190. The operation of the "and" network 2388 is controlled by voltages from the cathode follower 2244, the "or" network 2370, the left output terminal of the flip-flop 2038 and the right output terminal of the flip-flop 2040.

Figure 58:
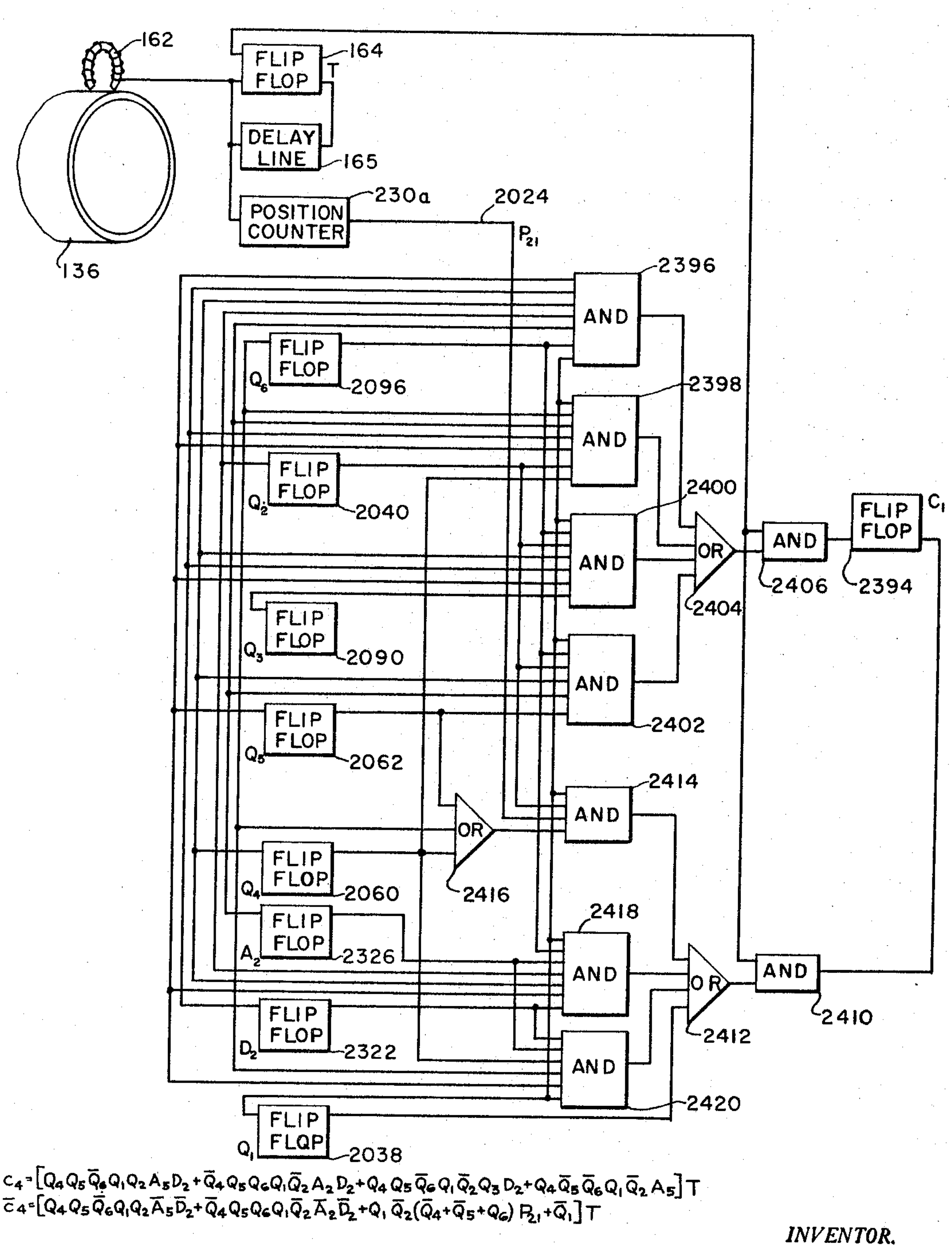

Stages are shown in FIGURE 58 for controlling the introduction of triggering signals to the input terminals of a flip-flop 2394. Two of these stages are "and" networks 2396 and 2398. The "and" network 2396 has voltages applied to it from the left output terminals of the flip-flops 2038, 2040, 2060, 2062, 2322 and 2326 and from the right output terminal of the flip-flop 2096. The "and" network 398 receives signals from the left output terminals of the flip-flops 2038, 2062, 2096, 2322 and 2326 and from the right output terminals of the flip-flops 2040 and 2060.

"And" networks 2400 and 2402 are associated with the "and" networks 2396 and 2398. The "and" network 2400 has input terminals connected to the left output terminals of the flip-flops 2038, 2060, 2062, 2090 and 2322 and to the right output terminals of the flip-flops 2040 and 2096. Connections are made to input terminals of the "and" network 2402 from the left output terminals of the flip-flops 2038, 2060 and 2326 and from the right output terminals of the flip-flops 2040, 2062 and 2096. The signals from the "and" networks 2396, 2398, 2400 and 2402 pass through an "or" network 2404 to an input terminal of an "and" network 2406 having another input terminal connected to the left output terminal of the flip-flop 164. The signals from the "and" network 2406 are applied to the left input terminal of the flip-flop 2394.

Triggering signals are introduced to the right input terminal of the flip-flop 2394 from an "and" network 2410, input terminals of which are connected to an "or" network 2412 and to the left output terminal of the flip-flop 164. The "or" network 2412 has signals applied to it from the right output terminal of the flip-flop 2038 and from an "and" network 2414. The operation of the "and" network 2414 is controlled by signals from an "or" network 2416, the left output terminal of the flip-flop 2038, the right ouput terminal of the flip-flop 2040 and the line 2024 extending from the counter **230*a*. The "or" network 2416 passes signals of high amplitude to the "and" network 2414 from the left output terminal of the flip-flop 2096 and the right output terminals of the flip-flops 2060 and 2062**.

Signals from "and" networks 2418 and 2420 also pass through the "or" network 2412 to the "and" network 2410. Connections are made to input terminals of the "and" network 2418 from the left output terminals of the flip-flops 2038, 2040, 2360 and 2062 and the right output terminals of the flip-flops 2096, 2322 and 2326. The "and" network 2418 has signals introduced to it from the left output terminals of the flip-flops 2038, 2062 and 2096 and the right output terminals of the flip-flops 2040, 2060, 2322 and 2326.

Figure 59:
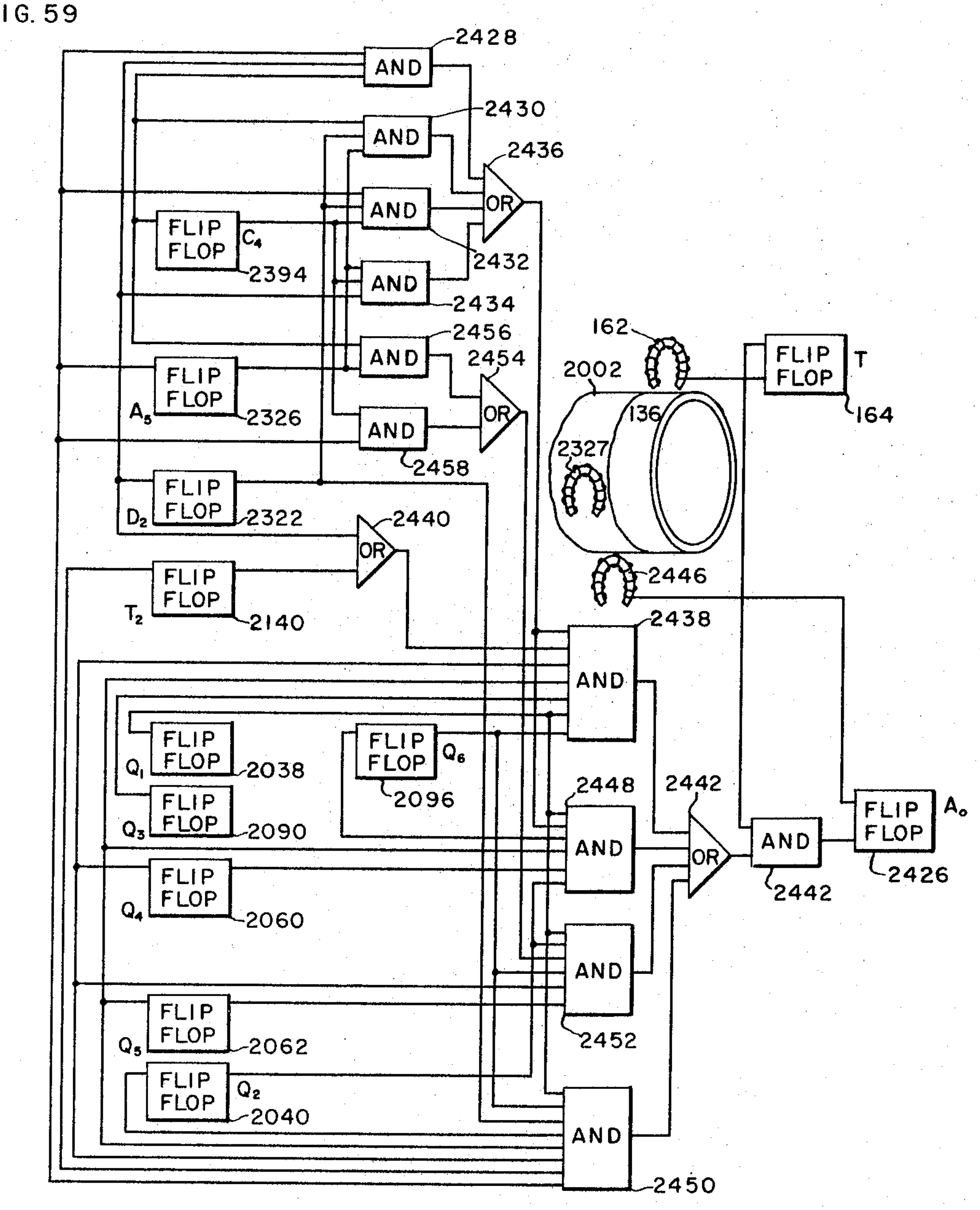

A plurality of stages are shown in FIGURE 59 for triggering a flip-flop 2426 to the true state of operation. The stages include "and" networks 2428, 2430, 2432 and 2434. Signals are introduced to the "and" network 2428 from the left output terminals of the flip-flops 2322, 2326 and 2394. The "and" network 2430 receives at its input terminals the voltages on the left output terminal of the flip-flop 2394 and on the right output terminals of the flip-flops 2322 and 2326. The flip-flop 2432 passes a signal upon the simultaneous introduction of high voltages from the left output terminal of the flip-flop 2326 and the right output terminals of the flip-flops 2322 and 2394. Connections are made to input terminals of the "and" network 2434 from the left output terminal of the flip-flop 2322 and the right output terminals of the flip-flops 2326 and 2394.

The signals from the "and" networks 2428, 2430, 2432 and 2434 pass through an "or" network 2436 to an input terminal of an "and" network 2438. Other input terminals of the "and" network 2438 are connected to the left output terminals of the flip-flops 2038, 2060, 2062 and 2090 and to the right output terminal of the flip-flop 2096. Still another input terminal of the "and" network 2438 receives signals from an "or" network 2440, input terminals of which are connected to the left output terminal of the flip-flop 2322 and the right output terminal of the flip-flop 2140.

The signals from the "and" network 2438 pass through an "or" network 2442 to an input terminal of an "and" network 2444 having another input terminal connected to the left output terminal of the flip-flop 164. The signals from the "and" network 2444 are in turn applied to the left input terminal of the flip-flop 2426 to trigger the flip-flop to the true state of operation. The resultant voltage of high amplitude on the left output terminal of the flip-flop 2426 is introduced to a coil 2446 to record indications of "1" in the track 2002. The coil 2446 is disposed in contiguous relationship to the track 2002 and is separated from the coil 2327 (FIGURE 56) by approximately 21 positions and from the coil 2343 by approximately 21 positions.

Signals from "and" networks 2448 and 2450 also pass through the "or" network 2442 to the "and" network 2444. The "and" network 2448 has input terminals connected to the "or" network 2346, the left output terminals of the flip-flops 2038, 2062 and 2096 and the right output terminals of the flip-flops 2040 and 2060. The "and" network 2450 receives at its input terminal the voltages on the left output terminals of the flip-flops 2038, 2040, 2060, 2062, 2140 and 2326 and on the right output terminals of the flip-flops 2096 and 2322.

In addition to receiving the signals from the "and" networks 2438, 2448 and 2450, the "or" network 2442 has signals applied to it from an "and" network 2452. The "and" network 2452 passes a signal when relatively high voltages are simultaneously introduced to the "and" network from an "or" network 2454, the left output terminals of the flip-flops 2038 and 2060 and the right output terminals of the flip-flops 2040, 2062 and 2096. The "or" network 2454 has signals applied to it from "and" networks 2456 and 2458. Connections are made to input terminals of the "and" network 2456 from the left output terminal of the flip-flop 2394 and the right output terminal of the flip-flop 2326. In like manner, input terminals of the "and" network 2458 are connected to the left output terminal of the flip-flop 2326 and the right output terminal of the flip-flop 2394.

Figure 60:
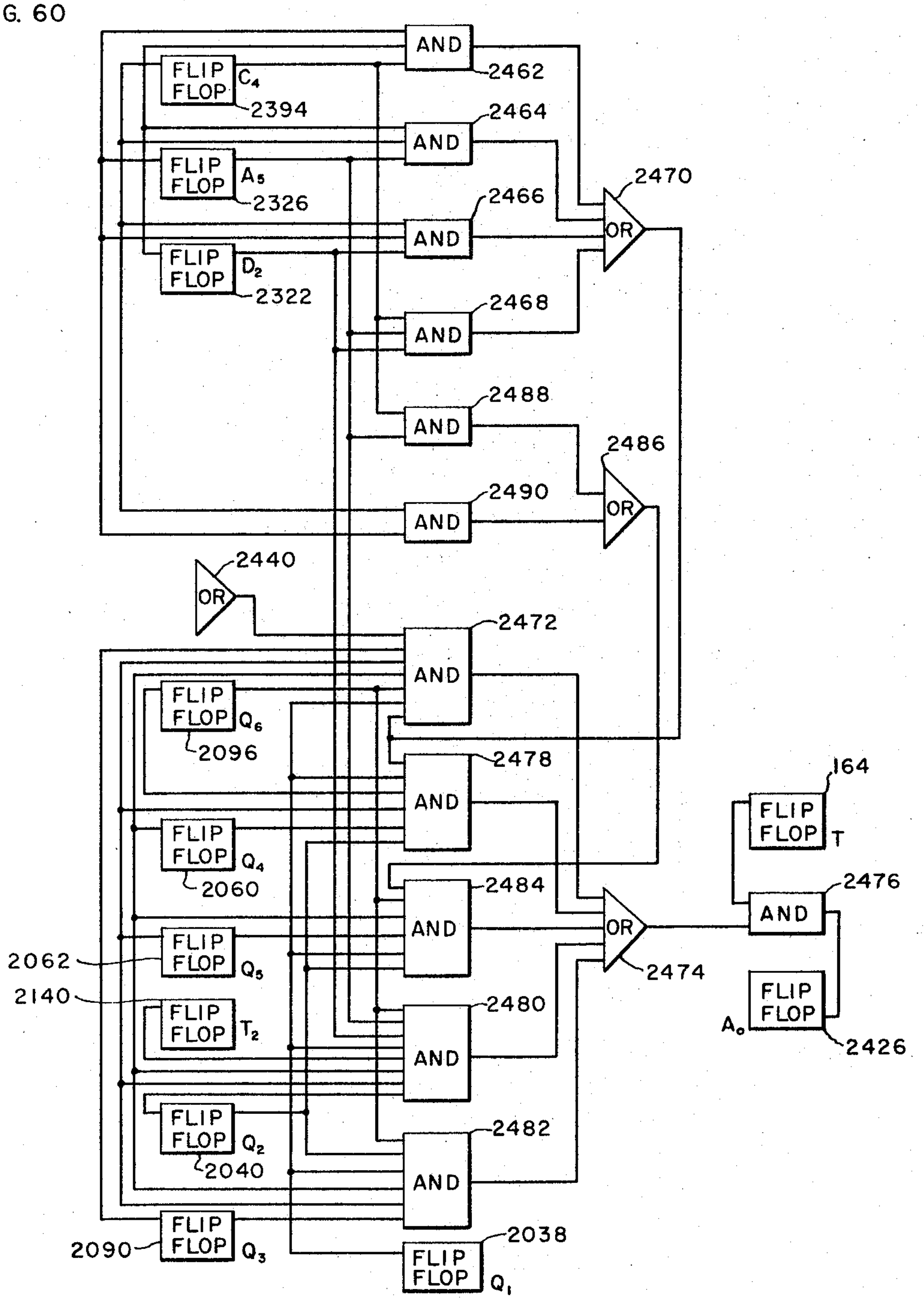

In FIGURE 60, the stages are shown for controlling the introduction of triggering signals to the right input terminal of the flip-flop 2426. These stages include "and" networks 2462, 2464, 2466 and 2468. Signals are applied to input terminals of the "and" network 2462 from the left output terminals of the flip-flops 2322 and 2326 and the right output terminal of the flip-flop 2394. The "and" network 2464 receives at its input terminals signals from the left output terminals of the flip-flops 2322 and 2394 and the right output terminal of the flip-flop 2326. The "and" network 2466 passes a signal upon the simultaneous introduction of high voltages from the left output terminals of the flip-flops 2326 and 2394 and the right output terminal of the flip-flop 2322. Input terminals of the "and" network 2468 are connected to the right output terminals of the flip-flops 2322, 2326 and 2394.

The signals from the "and" networks 2462, 2464, 2466 and 2468 pass through an "or" network 2470 to an input terminal of an "and" network 2472. Other input terminals of the "and" network 2472 have signals applied to them from the "or" network 2440 (also shown in FIGURE 59), the left output terminals of the flip-flops 2038, 2060, 2062 and 2090 and the right output terminal of the flip-flop 2096. The signals from the "and" network 2472 pass through an "or" network 2474 to an input terminal of an "and" network 2476, another input terminal of which is connected to the left output terminal of the flip-flop 164. The signals from the "and" network 2476 are in turn applied to the right input terminal of the flip-flop 2426 to trigger the flip-flop to the false state of operation.

The "or" network 2474 also receives signals from "and" networks 2478, 2480 and 2482. Input terminals of the "and" network 2478 are connected to the "or" network 2470, the left output terminals of the flip-flops 2038, 2062 and 2096 and the right output terminals of the flip-flops 2040 and 2060. The "and" network 2480 has voltages applied to it from the left output terminals of the flip-flops 2038, 2040, 2060, 2062 and 2140 and from the right output terminals of the flip-flops 2096, 2322 and 2326. The "and" network 2482 is adapted to pass a signal when high voltages are simultaneously introduced to it from the left output terminals of the flip-flops 2038, 2060 and 2062 and the right output terminals of the flip-flops 2040, 2090 and 2096.

The "or" network 2474 has signals applied to it from an "and" network 2484 as well as from the "and" networks 2478, 2480 and 2482. Input terminals of the "and" network 2484 are connected to the left output terminals of the flip-flops 2038 and 2060 and the right output terminals of the flip-flops 2040, 2062 and 2096. An input terminal of the "and" network 2484 also has signals applied to it through an "or" network 2486 from "and" networks 2488 and 2490. The operation of the "and" network 2488 is controlled by the voltages on the right output terminals of the flip-flops 2326 and 2394. The "and" network 2490 is controlled in its operation by the voltages on the left output terminals of the flip-flops 2326 and 2394.

FIGURE 61 shows the stages for controlling the reintroductions of signal information into the tracks 150 and 156 in accordance with computations performed by the stages shown in FIGURES 51 to 60, inclusive. The stages shown in FIGURE 61 include an "and" network 2494. Connections are made to input terminals of the "and" network 2494 from the left output terminals of the flip-flops 2038, 2050, 2096 and 2140 and from the right output terminals of the flip-flops 2040, 2060, 2062 and 2176. The signals from the "and" network 2494 are applied through an "or" network 2496 to an input terminal of an "and" network 2498 having another input terminal connected to the left output terminal of the flip-flop 164. The signals from the "and" network 2498 are in turn introduced to the left input terminal of the flip-flop 1332 to trigger the flip-flop to the true state of operation such that an indication of "1" is recorded in the track 150 by the coil 1333. The flip-flop 1332 and the coil 1333 are shown in FIGURE 26, which schematically illustrates a portion of the digital differential analyzer.

The "and" network 2498 also receives the signals passing through an "or" network 2496 from an "and" network 2500. One input terminal of the "and" network 2500 is connected to the output terminal of an "or" network 2502, which receives signals from the left output terminals of the flip-flops 2040, 2060 and 2062 and the right output terminals of the flip-flops 2038 and 2096. Another input terminal of the "and" network 2500 is connected to the "and" network 1330, which is also shown in FIGURE 26. The "and" network 1330 is adapted to pass signals during the operation of the digital differential analyzer shown in FIGURES 1 to 30, inclusive, when an indication of "1" is to be recorded in the track 150 for a particular position.

The "and" network 2504 performs functions similar to the "and" network 2494. The "and" network 2504 is adapted to pass signals upon the simultaneous introduction of high voltages from the left output terminals of the flip-flops 2038, 2096 and 2140 and the right output terminals of the flip-flops 2040, 2050, 2060, 2062 and 2176. The signals from the "and" network 2504 are applied through an "or" network 2506 to an input terminal of an "and" network 2508, another input terminal of which is connected to the left output terminal of the flip-flop 164.

The "and" network 2508 also receives the signals passing through the "or" network 2506 from an "and" network 2510 having input terminals connected to the "or" network 2502 and to the "and" network 1378 (also shown in FIGURE 26). The signals from the "and" network 2508 are introduced to the right input terminal of the flip-flop 1332 to trigger the flip-flop to the false state of operation.

The operation of the flip-flop 1414 is controlled by stages similar to the stages which control the operation of the flip-flop 1332. These stages include "and" networks 2514 and 2516. Input terminals of the "and" network 2514 are connected to the "or" network 2502 and to the "and" network 1418 (also shown in FIGURE 28). The "and" network 2516 has input terminals connected to the left output terminals of the flip-flops 2038, 2050, 2096, 2140 and 2176 and the right output terminals of the flip-flops 2040, 2060 and 2062. The signals from the "and" networks 2514 and 2516 pass through an "or" network 2518 of an input terminal of an "and" network 2520 having another input terminal connected to the left output terminal of the flip-flop 164. The signals passing through the "and" network 2520 are adapted to trigger the flip-flop 1414 to the true state of operation.

"And" networks 2522 and 2524 control the introduction of triggering signals to the right input terminal of the flip-flop 1414. The "and" network 2522 has signals applied to it from the "or" network 2502 and from the "and" network 1448 (also shown in FIGURE 28). The "and" network 2524 passes a signal upon the simultaneous introduction of relatively high voltages from the left output terminals of the flip-flops 2038, 2096, 2140 and 2176 and the right output terminals of the flip-flops 2040, 2050, 2060 and 2062. The signals from the "and" networks 2522 and 2524 are introduced through an "or" network 2526 to an input terminal of an "and" network 2528, another input terminal of which is connected to the left output terminal of the flip-flop 164. The signals from the "and" network 2528 trigger the flip-flop 1414 to the false state of operation.

As has been described previously, four additional tracks are included on the drum 132 to perform functions individual to the digital computer shown in FIGURES 51 to 61, inclusive. For example, indications are permanently recorded in the track 2000 to indicate the block being presented for computation. The indications are permanently recorded in the track 2000 in a particular manner for reasons which will be described in detail subsequently. Indications are first recorded in the track 2000 at position 21 of the preceding block and at positions 1 to 6, inclusive, of the particular block to indicate the particular block undergoing computation. Seven positions are required in order to distinguish the 125 blocks in the digital differential analyzer from one another. By way of illustration, indications of "1" may be recorded in the track 2000 at position 21 of the preceding block and at positions 2, 3 and 5 of the particular block to indicate that the particular block being presented for computation is block "23." These indications are repeated in the track 23 at positions 9 to 15, inclusive, of the particular block for reasons which will become apparent subsequently.

In addition to the indications permanently recorded in the track 2000, certain indications are permanently recorded in the tracks 2260 and 2270. The indications recorded in the tracks 2260 and 2270 are of a similar nature in that similar functions are represented at corresponding positions in each track. The indications recorded in the tracks 2260 and 2270 are individual to the problem being solved whereas the indications recorded in the track 2000 remain the same regardless of the problem being solved. Because of the similarities in the indications in the tracks 2260 and 2270, only the indications recorded in the track 2260 will be discussed.

The indications recorded in the track 2260 can be divided into blocks or sectors having 21 positions. In some of the blocks, constants such as the value of $\pi=3.1416$ can be recorded in digital form for use by the digital differential analyzer. In the first seven positions of other blocks, signal indications are recorded in the track 2260 to represent in coded form the number of a first particular block. These indications actually occur in the track 2260 at position 21 of the preceding block and in positions 1 to 6, inclusive, of the particular block so as to coincide in time with the signal indications appearing in the track 2000 to represent the block being presented for computation. In positions 9 to 15, inclusive, for each block, signal indications are recorded in the track 2260 to represent in coded form the number of a second particular block. The second particular block will generally be different from the first particular block for reasons which will become apparent subsequently.

Certain other indications are permanently recorded in the track 2260 for each block. These indications are permanently recorded in the track 2260 in accordance with the problem being solved by the computing apparatus. For example, indications are recorded in the track 2260 at positions 7 and 8 for each block to indicate the particular track from which information is to be obtained. Since only positions 7 and 8 are used in the track 2260 to indicate the particular track from which information is to be obtained, only four different tracks can provide information for use by the digital computer shown in FIGURES 51 to 61, inclusive. These tracks include the tracks 150 and 156 forming a part of the digital differential analyzer and the tracks 2260 and 2270 forming a part of the digital computer. Indications are also recorded in the track 2260 at positions 16 and 17 for each block to designate one of the tracks 150, 156, 2260 and 2270. The indications recorded in the track 2260 at positions 16 and 17 one not necessarily the same as the indications recorded in the track at position 7 and 8.

In positions 18, 19 and 20 for each block, indications are permanently recorded in the track 2260 to represent the type of operation to be performed by the digital computer. For example, the operation of addition may be represented by an indication of "0" in the track 2260 at position 18 for a particular block and indications of "1"in the track 2260 at positions 19 and 20 for the block. As another example, the operation of multiplication may be represented by indications of "1" in the track 2260 at positions 18 and 19 for a block and an indication of "0" in the track 2260 at position 20 for the block.

Since positions 18, 19 and 20 are used in the track 2260 for each block to represent in coded form the type of operation that is to be performed, as many as eight different types of operation can be performed by the digital computer. These operations include addition, multiplication, the shifting of digital information and the complementation of digital information for such purposes as subtraction. The operations also include the withdrawal of information from the tracks 150, 156, 2060 and 2070 and the transfer of information into the tracks 150 and 156 after the operations such as addition and substraction have been performed on the information withdrawn from the tracks.

As will be seen, twenty-one positions are necessary in each block in the tracks 2260 and 2270 in order to obtain a proper operation of the digital computer associated with the digital differential analyzer. However, the digital differential analyzer has been described as having only eighteen positions in each block. It is believed that a person skilled in the are would be able to modify the digital differential analyzer from the above discussion so as to provide twenty-one positions for each block. It is further believed that a person skilled in the art would be able to modify the logic and circuits included in the digital differential analyzer so as to adjust the positions at which the different operations will be performed by the digital differential analyzer.

For example, all of the operations previously specified to occur at position 18 in the digital differential analyzer would now occur at position 21. All of the operations specified to occur at position 17 in the digital differential analyzer would occur at position 20. However, the operations specified to occur in the digital differential analyzer at position 1 or at position 2 for blocks having 18 positions would still occur at position 1 or position 2 for blocks having 21 positions. By increasing the number of positions in each block in the digital differential analyzer from 18 to 21, the accuracies in computation could be increased since three extra positions would be available in each block to store numerical information relating to each of the quantities in the block.

INSTRUCTIONS

As previously described, the code permanently provided in the track 2260 at positions 7 and 8 for the various blocks controls which of particular tracks on the drum 132 is to be selected for the transfer of information. By way of example, the information appearing in the track 2260 for a particular block such as block "27" may be selected in accordance with the code appearing in a previous block. The information appearing in the track 2260 at block 27 then becomes transferred to the track 2002 for circulation in the track 2002. As a result of such circulation, the information recorded in the track 2002 from block 27 is presented in each block subsequent to block 27. The information is recirculated in the track 2002 during the presentation of each successive block by providing read and record heads in contiguous relationship to the track and by separating the read and record heads by approximtaely 21 positions.

Since the information transferred from the track 2260 to the track 2002 recirculates in the track 2002 during the presentation of each block for computation, it is made fully available for use during the presentation of the block. In positions 10 to 16, inclusive, of the information recirculating in the track 2002, indications are provided in coded form as to the next block to be selected for operation. Positions 10 to 16, inclusive, of the recirculating information correspond to positions 9 to 15, inclusive, of each block as described above.

For example, indications of 01111010 may be provided in positions 10 to 16, inclusive, of the information recirculating in the track 2260. These signal indications represent block 58. When block 58 is presented for computation, indications of 01111010 are presented in the track 2000 in a manner similar to that described above. This coincidence between the indications in the tracks 2000 and 2260 causes the next operation to be initiated.

The next operation is controlled by the signals recirculating in the track 2260 at positions 16 and 17 for the particular block such as block 58 and at positions 18, 19 and 20 for the particular block. The information at positions 18, 19 and 20 control in coded form the operation to be performed such as an operation of addition, multiplication or complementation. The indications at positions 16 and 17 relate to the particular track to be selected from among the tracks 150, 156, 2260 and 2270. It should be appreciated, however, that in some instances an operation may not involve information obtained from a track. For example, this may be true of the operation of complementation.

By way of illustration, the indications circulating in the track 2002 in the last 12 positions may indicate that the value of the dependent quantity Y in the track 150 for block 58 is to be withdrawn from the track so that an operation of addition can be performed. As described above, block 58 is selected in accordance with the information recirculating in the track 2002 at positions 9 to 15, inclusive, for each block. The track 150 is selected in accordance with the indications recirculating in the track 2002 at positions 16 and 17 for each block. The operation of addition is specified by the coded information recirculating in the track 2002 at positions 18, 19 and 20 for each block. This causes the value of the dependent quantity Y to be withdrawn from the track 150 when block 59 is presented for computation. The information relating to Y in block 59 is withdrawn since it is the block which immediately follows block 58.

The information recirculating in the track 2002 also provides certain other information in the first nine positions. The first seven positions relate to the particular block from which the next instruction is to be obtained. For example, indications of 1010111 may be provided in the first seven positions of the instructional information recirculating in the track 2002 for each block, where the least significant digit is at the right. These indications represent block 87. Signals may be provided in the 8th and 9th positions of the information recirculating in the track 2002 for each block to indicate that the next instruction is to be withdrawn from the track 2270.

Because of the instructions provided in the first seven positions of the information recirculating in the track 2002, coincidence is obtained between these indications and the indications in the track 2000 when block 87 is presented for computation. This results from the fact that in the first seven positions for each block the track 2000 indicates the block being presented for computation. Upon the occurrence of such coincidence, the information appearing in the track 2270 at block 88 is withdrawn from the block and recorded in the track 2002 in place of the information previously recirculating in the track. The information recorded in the track 2002 at block 88 now recirculates in the track upon the presentation of successive blocks for computation. This new information now controls the next operation and the particular track and block from which the information involved in the next operation is to be obtained.

In this way, the information recirculating in the channel 2002 provides two completely different segments of information. One segment appears in the last twelve positions of the recirculating information and relates to the particular type of operation to be performed and the information upon which the particular type of operation is to be performed. The second segment appears in the first nine positions of the recirculating information. This segment indicates the position at which the next instruction is to be obtained after the particular type of operation has been performed. By providing the two different segments of information in the indications recirculating in the track 2002 a plurality of different operations can be successively performed by the digital computer in synchronization with the presentation of the different blocks during each revolution of the drum 132.

Since the instructional information transferred to the track 2002 recirculates in the track, the track can be considered to perform in part the functions of an instruction register. Furthermore, because of the fact that the instruction register is only twenty-one positions long, most of the positions in the track 2002 remain unused. This permits other positions in the track 2002 to be used for other purposes such as for information registers. These information registers are required in such arithmetical operations as addition and multiplication.

In such arithmetical operations as addition and multiplication, two information registers are generally required. For example, in the operation of addition, one number designated as the "addend" is arithmetically combined with another number designated as the "augend" to obtain a resultant number designated as the "sum." One of the information registers is adapted to receive initially digital information relating to the addend and to recirculate this information during the presentation of successive blocks for computation until the augend is presented for computation.

As successive digits of the addend and augend are presented for computation, the sum in these positions becomes stored in the first information register to replace the addend $19n+7$ and $26n+7$ pulse positions, where $n$ represents the number of digital positions in each block. At the same time, the information relating to the addend is removed from the first information register which has an accumulator. In this way, only the information relating to the sum is stored in the register after the operation of addition has been completed. This information is transferred to a particular one of the tracks upon the occurrence of a particular block in accordance with the instructions circulating in the track 2002.

In accordance with the above discussion, the information recirculating in the track 2002 controls which of the blocks is to provide the next instruction for recirculation in the track. This information is provided in the first seven positions of the signal indications recirculating in the track 2002. The first of these seven positions actually occurs at position 21 of each block. When the information recirculating in the track 2002 corresponds at position 21 to the information relating to the block number at position 21 in the track 2000, the flip-flop 2026 becomes triggered to its true state.

For example, when indications of "1" simultaneously appear in the tracks 2000 and 2002, a signal passes through the "and" network 2016 and the "or" network 2020 to the "and" network 2022 in FIGURE 51. In like manner, signals pass through the "and" network 2018 and the "or" network 2020 to the "and" network 2022 when indications of "0" are simultaneously produced in the tracks 2000 and 2002. The signals from the "or" network 2020 are able to pass through the "and" network 2022 only at position 21 for each block because of the introduction of a signal to the "and" network through the line 2024 from the position counter 230a. The signals from the "and" network 2022 are introduced to the left input terminal of the flip-flop 2026 to trigger the flip-flop to the true state of operation.

The flip-flop 2026 becomes triggered to the true state by the passage of signals through the stages 2016, 2018, 2020 and 2022 in accordance with the logical equation:

$$c_a = P_{21}(SI + \bar{S}\bar{I})T \qquad (252)$$

where $c_a$=the introduction of a triggering signal to the left input terminal of the flip-flop 2026;

$P_{21}$=a signal on the line 2024 extending from the counter 230a to indicate position 21 for each block;

$S$=a relatively high voltage on the left output terminal of the flip-flop 2008 to represent an indication of "1" in the track 2000;

$\bar{S}$=a relatively high voltage on the right output terminal of the flip-flop 2008 to represent an indication of "0" in the track 2000;

$I$=a relatively high voltage on the left output terminal of the flip-flop 2012 to represent an indication of "1" in the track 2002; and $\bar{I}$=a relatively high voltage on the right output terminal of the flip-flop 2012 to represent an indication of "0" in the track 2002.

The flip-flop 2026 is able to remain in its true state only when the information recirculating in the track 2000 to indicate the block number corresponds in each of the first seven positions with the instruction recirculating in the first seven positions of the track 2002. If the block information in the track 2000 should be different in any one of the first seven positions from the information in the corresponding positions of the track 2002, the flip-flop 2026 becomes triggered to its false state of operation. This results in part from the operation of the "and" networks 2028 and 2030 in FIGURE 51. The "and" network 2028 passes a signal when an indication of "1" is read from the track 2000 at the same time that an indication of "0" is read from the track 2002. Similarly, a signal passes through the "and" network 2030 when an indication of "0" is obtained from the track 2000 at the same time that an indication of "1" is obtained from the track 2002.

The signals from the "and" networks 2028 and 2030 are introduced through the "or" network 2032 to the "and" network 2034. The "and" network 2034 is able to pass signals only at positions 1 to 6, inclusive, for each block because of its connection through the line 2035 to the counter 230a. The signals passing through the "and" network 2034 are introduced to the right input terminal of the flip-flop 2026 to trigger the flip-flop to the false state of operation. In this way, the flip-flop 2026 becomes triggered to the false state of operation for every block except a particular block dependent upon the information in the first seven positions of the instruction recirculating in the track 2002. The particular block may be designated as the block of coincidence.

The flip-flop 2026 becomes triggered to the false state of operation in accordance with the following logical equation:

$$\bar{c}_a = (\bar{S}I + \bar{I}S)P_{1/6}T \qquad (253)$$

$\bar{c}_a$=the introduction of a triggering signal to the right input terminal of the flip-flop 2026 to trigger the flip-flop to the false state of operation;

$P_{1/6}$=a signal on the line 2035 to indicate positions 1 to 6, inclusive, for each block; and the other terms have previously been defined.

It will be seen from the above discussion and from the logic expressed in Equations 252 and 253 that the flip-flop 2026 remains in its true state at position 7 for a block only when that block corresponds to the block specified by the instruction in the track 2002. When the block 2026 remains in its true state at position 7 for a block, the process of transferring information in the next block to the instruction register provided in the track 2002 is initiated. As a first step, it is necessary to determine the particular track from which the new instruction is to be obtained. This information occurs at positions 7 and 8 of the instruction presently recirculating in the track 2002. The information is transferred to the flip-flops 2140 and 2176 in FIGURE 54 when the block representing coincidence is presented for computation, as indicated by a relatively high voltage on the left output terminal of the flip-flop 2026.

At position 7 for each block, the "and" network 2178 in FIGURE 54 becomes prepared to pass a signal. This results from the introduction of a high signal to the "and" network 2178 through the line 2186 from the counter 230a at position 7 for each block. The "and" network 2178 is able to pass a signal at position 7 for a block only when a relatively high voltage has been produced on the left output terminal of the flip-flop 2026 to indicate the particular block specified in the instruction recirculating in the track 2002. When the "and" network 2178 becomes opened it passes a signal if an indication of "1" appears at position 7 in the instruction recirculating in the track 2002. This indication of "1" is represented by a relatively high voltage on the left output terminal of the flip-flop 2012. The signal passing through the "and" network 2178 is introduced through the "or" network 2194 to the "and" network 2196 for synchronization at optimum times in the clock signals. The signal is then introduced to the left input terminal of the flip-flop 2176 to trigger the flip-flop 2176 to the true state of operation.

The following logical equation controls the introduction of triggering signals through the stages 2178, 2194 and 2196 to the left input terminal of the flip-flop 2176:

$$t_1 = C_a I P_7 T \qquad (254)$$

where $t_1$=the introduction of a triggering signal to the left input terminal of the flip-flop 2176;

$C_a$=a relatively high voltage of the left output terminal of the flip-flop 2026;

$P_7$=a signal on the line 2186 to indicate position 7 for each block; and the other terms have previously been defined.

The "and" network 2200 becomes prepared to pass a signal at the same time as the "and" network 2178. This occurs at position 7 for the block specified in the first seven positions of the instruction recirculating in the track 2002. However, the "and" network 2200 passes a signal only when an indication of "0" appears at position 7 of the instruction recirculating in the track 2002. The signals passing through the "and" network 2200 are introduced through the "or" network 2206 to the "and" network 2208 so as to be synchronized at optimum times in the clock cycles. The signals then pass to the right input terminal of the flip-flop 2176 to trigger the flip-flop to the false state of operation.

The flip-flop 2176 becomes triggered to the false state of operation by the passage of signals through the stages 2200, 2206 and 2208 in accordance with the logical equation:

$$\bar{t}_1 = C_a \bar{I} P_7 T \qquad (255)$$

where $\bar{t}_1$=the introduction of a triggering signal to the right input termianl of the flip-flop 2176; and the other terms have previously been defined.

Just as the flip-flop 2176 becomes triggered to its true or false state in accordance with the indication at position 7 for the particular block representing coincidence, the flip-flop 2140 becomes triggered in accordance with the information at position 8 for the same block.

When an indication of "1" appears in the instruction information in the track 2002 at position 8 for the particular block representing coincidence, a signal passes through the "and" network 2216, the "or" network 2214 and the "and" network 2212 to the left input terminal of the flip-flop 2140. This signal triggers the flip-flop 2140 to the true state of operation as represented by a relatively high voltage on the left output terminal of the flip-flop. A relatively high voltage is produced on the left output terminal of the flip-flop 2140 by the passage of signals through the stages 2216, 2214 and 2212 in accordance with the logical equation:

$$t_2=C_aIP_8T \quad (256)$$

where $t_2$=the introduction of a triggering signal to the left input terminal of the flip-flop 2140;

$P_8$=a signal on the line 2218 at position 8 for each block;

and the other terms have previously been defined.

The indications of "0" at position 8 for the particular block representing coincidence pass through the "and" network 2230 and the "or" network 2236 to the "and" network 2238, which synchronizes the signals with the clock signals from the flip-flop 164. The synchronized signals are then introduced to the right input terminal of the flip-flop 2140 to trigger the flip-flop to the false state of operation. Triggering signals pass through the stages 2230, 2236 and 2238 to the right input terminal of the flip-flop 2140 in accordance with the logical equation:

$$\bar{t}_2=C_a\bar{I}P_8T \quad (257)$$

where $\bar{t}_2$=the introduction of a triggering signal to the right input terminal of the flip-flop 2140; and the other terms have previously been defined.

The flip-flops 2176 and 2140 become triggered into various patterns of operation to indicate the particular channel from which the next instruction is to be obtained. For example, the flip-flops 2176 and 2140 become triggered to false states of operation to indicate that the next instruction is to be obtained from the track 2260. Similarly, the flip-flop 2176 becomes triggered to the true state of operation and the flip-flop 2140 becomes triggered to the false state of operation to indicate that the next instruction is to be obtained from the track 2270.

The cathode followers 2242 and 2244 in FIGURE 55 read the information from the particular track specified by the flip-flops 2176 and 2140. For example, the indications of "1" in the track 2260 pass through the "and" network 2248 and the "or" network 2246 to the cathode follower 2242 when the flip-flops 2176 and 2140 are both in their false states of operation. Signals pass through the stages 2248 and 2246 to the cathode follower 2242 in accordance with the logic expressed in the following equation:

$$L=I_1\bar{T}_1\bar{T}_2 \quad (258)$$

where $L$=the introduction of a signal to the cathode follower 2242 to represent an indication of "1";

$I_1$=a relatively high voltage on the left output terminal of the flip-flop 2256 to represent an indication of "1" in the track 2260;

$\bar{T}_1$=a relatively high voltage on the right output terminal of the flip-flop 2176; and $\bar{T}_2$=a relatively high voltage on the right output terminal of the flip-flop 2140.

In like manner, the indications of "0" in the track 2260 pass through the "and" network 2280 and the "or" network 2278 to the cathode follower 2244 upon the simultaneous operation of the flip-flops 2176 and 2140 in the false states. The cathode follower 2244 receives the signals passing through the stages 2280 and 2278 in accordance with the logical equation:

$$\bar{L}=\bar{I}_1\bar{T}_1\bar{T}_2 \quad (259)$$

where $\bar{L}$=the introduction of a signal to the cathode follower 2244 to indicate an indication of "0";

$\bar{I}_1$=a relatively high voltage on the right output terminal of the flip-flop 2256 to represent an indication of "0" in the track 2260; and the other terms have previously been defined.

The indications of "1" in the track 2270 pass through the "and" network 2250 and the "or" network 2246 to the cathode follower 2242 for a particular pattern of operation of the flip-flops 2176 and 2140. This particular pattern of operation is represented by a relatively high voltage on the left output terminal of the flip-flop 2176 and a relatively high voltage on the right output terminal of the flip-flop 2140. Signals are introduced through the "and" network 2250 and the "or" network 2246 to the cathode follower 2242 in accordance with the following logical equation:

$$L=I_2T_1\bar{T}_2 \quad (260)$$

where $I_2$=a relatively high voltage on the left output terminal of the flip-flop 2266 to represent indications of "1" in the track 2270; and the other terms have previously been defined.

Just as the "and" network 2250 passes the indications of "1" in the track 2270, the "and" network 2280 passes the indications of "0" in the track. The signals from the "and" network 2282 pass through the "or" network 2278 to the cathode follower 2244 in accordance with the logical equation:

$$\bar{L}=\bar{I}_2T_1\bar{T}_2 \quad (261)$$

where $\bar{I}_2$=a relatively high voltage on the right output terminal of the flip-flop 2266 to represent an indication of "0" in the track 2270; and the other terms have previously been defined.

As will become apparent subsequently, it may be desired to pass to the cathode followers 2242 and 2244 particular information in the tracks 150 and 156 forming a part of the digital differential analyzer. The indications of "1" in the track 150 pass to the cathode follower 2242 for a particular code represented by the simultaneous occurrence of voltages of relatively high amplitude on the right output terminal of the flip-flop 2176 and the left output terminal of the flip-flop 2140. Upon the occurrence of such a code in the flip-flops 2176 and 2140, the indications of "1" in the track 150 pass through the "and" network 2272 and the "or" network 2246 to the cathode follower 2242. The logical equation controlling the passage of these signals may be expressed as:

$$L=Y\bar{T}_1T_2 \quad (262)$$

where $Y$=a relatively high voltage on the left output terminal of the flip-flop 450 to represent an indication of "1" in the track 150; and the other terms have previously been defined.

The indications of "0" in the track 150 pass through the "and" network 2284 and the "or" network 2278 to the cathode follower 2244 upon the operation of the flip-flops 2176 and 2140 in the code represented as $\bar{T}_1T_2$. Signals are introduced through the stages 2284 and 2278 to the cathode follower 2244 in accordance with the logical equation:

$$\bar{L}=\bar{Y}\bar{T}_1T_2 \quad (263)$$

where $\bar{Y}$=a relatively high voltage on the right output terminal of the flip-flop 450 to represent an indication of "0" in the track 150; and the other terms have previously been defined.

The indications in the track 156 are able to pass to the cathode followers 2242 and 2244 only for a particular code represented by relatively high voltages on the left output terminals of the flip-flops 2176 and 2140. Upon the occurrence of such a code, the indications of "1" in the track 156 pass through the "and" network 2274 and the "or" network 2246 to the cathode follower 2242. The cathode follower 2242 receives such signals in accordance with the logic expressed in the following equation:

$$L=UT_1T_2 \quad (264)$$

where $U$=a relatively high voltage on the left output terminal of the flip-flop 688 to represent an indication of "1" in the track 156; and the other terms have previously been defined.

When the flip-flops 2176 and 2140 are both in their true states of operation, the indications of "0" in the track 156 pass through the "and" network 2286 and the "or" network 2278 to the cathode follower 2244. The logical equation controlling the passage of these signals to the cathode follower 2244 may be expressed as:

$$\overline{L}=\overline{U}T_1T_2 \quad (265)$$

where $\overline{U}$=a relatively high voltage on the right output terminal of the flip-flop 688 to represent an indication of "0" in the track 156; and the other terms have previously been defined.

It has been previously described that the flip-flop 2026 representing $C_a$ is triggered to its true state of operation upon the occurrence of a particular block specified in code by the instruction circulating in the track 2002. Upon the occurrence of this particular block, the flip-flops 2176 and 2140 become triggered into a pattern of operation to indicate the particular track from which the information at the selected block is to be taken.

The information is taken from the track specified by the flip-flops 2176 and 2140 to replace the instructional information circulating in the track 2002. This new information is recorded in the track 2002 only upon the occurrence of a particular pattern of operation in the flip-flops 2038 and 2040. The flip-flops 2038 and 2040 become triggered to the particular pattern by the passage of signals through certain stages shown in FIGURE 52.

As will become more apparent subsequently, the flip-flop 2038 becomes triggered to its false state of operation when either new information is to be inserted into the instruction register provided in the track 2002 or when old information is to be recirculated in the instruction register. The flip-flop 2038 becomes triggered to its false state of operation by the passage of signals through the "and" network 2082 in FIGURE 52. Signals are able to pass through the "and" network 2082 only when the flip-flop 2038 is initially in its true state of operation. The signals are able to pass through the "and" network 2082 only at position 21 for each block, as represented by signals in the line 2024 extending from the counter 230*a*.

As a further condition, the "and" network 2082 is able to pass a signal only upon the occurrence of a relatively high voltage either on the right output terminal of the flip-flop 2060 or the right output terminal of the flip-flop 2062. It will become more apparent subsequently that at least one of the flip-flops 2060 and 2062 is in its false state of operation at all times except when the operations of multiplication and shift are being performed. The signals from the "and" network 2082 are synchronized at optimum times in the clock cycles by the "and" network 2074 and are introduced to the right input terminal of the flip-flop 2038 to trigger the flip-flop into the false state of operation.

Triggering signals pass through the "or" network 2084, the "and" network 2082, the "or" network 2076 and the "and" network 2074 to the right input terminal of the flip-flop 2038 in accordance with the following logical equation:

$$\overline{q}_1=Q_1(\overline{Q}_4+\overline{Q}_5)P_{21}T \quad (266)$$

where $\overline{q}_1$=the introduction of a triggering signal to the right input terminal of the flip-flop 2038;

$Q_1$=a relatively high voltage on the left output terminal of the flip-flop 2038;

$\overline{Q}_4$=a relatively high voltage on the right output terminal of the flip-flop 2060;

$\overline{Q}_5$=a relatively high voltage on the right output terminal of the flip-flop 2062; and the other terms have previously been defined.

Signals are able to pass through the "and" network 2104 in FIGURE 52 only at position 21 for the particular block designated as $C_a$ and specified by the instructions circulating in the first seven positions in the track 2002. A signal is able to pass through the "and" network 2104 at position 21 for the particular block when a relatively high voltage is produced either on the right output terminal of the flip-flop 2060, the left output terminal of the flip-flop 2062 or the right output terminal of the flip-flop 2096 or when relatively high voltages are simultaneously produced on any two or more of these terminals. As will be described in detail subsequently, at least one of these high voltages appears at all times except when an operation designated as conditional transfer of control is taking place. A signal is not able to pass through the "and" network 2104 for a true state of the C flip-flop 2026 during the operation of conditional transfer of control since the $C_a$ flip-flop is used for a different purpose during such an operation.

The signal from the "and" network 2104 is introduced through the "or" network 2098 to the "and" network 2100 for synchronization at optimum times in the block cycles. The signals then pass to the left input terminal of the flip-flop 2040 to trigger the flip-flop to the true state of operation. The logic controlling the passage of triggering signals through the stages 2106, 2104, 2098 and 2100 to the left input terminal of the flip-flop 2040 can be expressed as follows:

$$\overline{q}_2=(\overline{Q}_4+Q_5+\overline{Q}_6)CP_{21}T \quad (267)$$

where $q_2$=the introduction of a triggering signal to the left input terminal of the flip-flop 2040;

$\overline{Q}_4$=a relatively high voltage on the right output terminal of the flip-flop 2060;

$Q_5$=a relatively high voltage on the left output terminal of the flip-flop 2062;

$\overline{Q}_6$=a relatively high voltage on the right output terminal of the flip-flop 2096; and the other terms have previously been defined.

When relatively high voltages are simultaneously produced on the right output terminal of the flip-flop 2038 and on the left output terminal of the flip-flop 2040, a code is obtained to indicate that a new instruction is to be recorded into the track 2002. The new instruction is obtained from a particular one of the tracks as specified in coded form by the flip-flops 2176 and 2140. This information passes to the track 2002 through the cathode followers 2242 and 2244 in a manner similar to that described above and expressed logically in Equations 258 to 265, inclusive.

The signals representing the indications of "1" in the new instruction pass from the cathode follower through the "and" network 2290 (FIGURE 55), which becomes prepared for opening upon the simultaneous occurrence of the $\overline{Q}_1Q_2$ coding in the flip-flops 2038 and 2040. The signals in the cathode follower 2242 pass through the "and" network 2290 and the "or" network 2296 to the "and" network 2298. The signals are synchronized by the "and" network 2298 at optimum times in the clock cycles and are introduced to the left input terminal of the flip-flop 2300 to trigger the flip-flop to the true state of operation. The resultant voltages of high amplitude on the left output terminal of the flip-flop 2300 are introduced to the coil 2302 such that indications of "1" are recorded by the coil in the track 2002.

The flip-flop 2300 becomes triggered to the true state of operation by the passage of signals through the stages 2290, 2296 and 2298 in accordance with the logical equation:

$$i_0=\overline{Q}_1Q_2LT \quad (268)$$

where $i_0$=the introduction of triggering signals to the left input terminal of the flip-flop 2300;

$\overline{Q}_1$=a relatively high voltage on the right output terminal of the flip-flop 2038;

$Q_2$=a relatively high voltage on the left output terminal of the flip-flop 2040; and the other terms have previously been defined.

The "and" network 2304 in FIGURE 55 becomes prepared for opening at the same time as the "and" network 2290. The "and" network 2304 passes the indications of "0" from the cathode follower 2244. These indications pass through the "and" network 2304 and the "or" network 2308 to the "and" network 2310 for synchronization at optimum times in the clock cycles. The signals are then introduced to the right input terminal of the flip-flop 2300 to trigger the flip-flop to the false state of operation. Since the flip-flop 2300 becomes triggered to the false state of operation, indications of "0" are recorded in the track 2002 by the coil 2302. Indications of "0" are recorded in the track 2002 upon the passage of signals through the stages 2304, 2308 and 2310 in accordance with the logical equation:

$$\overline{i}_0=\overline{Q}_1Q_2\overline{L}T \qquad (269)$$

where $\overline{i}_0$=the introduction of a triggering signal to the right input terminal of the flip-flop 2300; and the other terms have previously been defined.

After a new instruction has been recorded in the track 2002 upon the occurrence of a coding of $\overline{Q}_1Q_2$ in the track, the coding of $\overline{Q}_1Q_2$ is no longer required. Because of this, a signal passes through the "and" network 2112 in FIGURE 52 at position 21 of a block of having a coding of $\overline{Q}_1Q_2$. This signal then passes through the "or" network 2116 and the "and" network 2120 to the right input terminal of the flip-flop 2040 and triggers the flip-flop to the false state of operation. A triggering signal passes through the stages 2114, 2116 and 2120 to the right input terminal of the flip-flop 2040 in accordance with the logical equation:

$$\overline{q}_2=\overline{Q}_1Q_2P_{21}T \qquad (269a)$$

where $\overline{q}_2$=the introduction of a triggering signal to the right input terminal of the flip-flop 2040; and the other terms have previously been defined.

After the new instruction has been recorded in the track 2002, it circulates in the track upon the presentation of successive blocks for computation. The instruction circulates in the track 2002 in accordance with operation of certain stages shown in FIGURE 55. The instruction circulates in the track 2002 when a relatively high voltage is produced on the left output terminal of the flip-flop 2038 or on the right output terminal of the flip-flop 2040 or on both of these terminals. As will become more apparent subsequently, a relatively high voltage is produced on the left output terminal of the flip-flop 2038 when an operation such as addition, multiplication or complementation is being performed. A relatively high voltage is produced on the right output terminal of the flip-flop 2040 after the operation has just been initiated in a first block or after a new instruction has been inserted into the track 2002 as specified in Equation 269*a*. Since the voltages on the left output terminal of the flip-flop 2038 and on the right output terminal of the flip-flop 2040 are introduced to the "or" network 2292, a signal passes through the "or" network at all times during which the instruction in the track 2002 is to be circulated.

When the "and" network 2294 becomes prepared for opening by a high voltage from the "or" network 2292, the signals of high amplitude on the left output terminal of the flip-flop 2012 pass through the "and" network. Such signals are produced when indications of "1" are induced in the coil 2006 disposed in contiguous relationship to the track 2002. The signals of high amplitude on the left output terminal of the flip-flop 2012 pass through the "and" network 2294 and the "or" network 2296 to the "and" network 2298 for synchronization at optimum times in the clock cycles. The signals are then introduced to the left input terminal of the flip-flop 2300 to trigger the flip-flop to the true state such that indications of "1" are recorded by the coil 2302 in the track 2002. Indications of "1" circulated in the track 2002 by the passage of signals through the stages 2292, 2294, 2296 and 2298 in accordance with the following logical equation:

$$i_0=(Q_1+\overline{Q}_2)IT \qquad (270)$$

where all of the terms have previously been defined.

Just as the indications of "1" in the track 2002 are circulated so as to be recorded back on the track, the indications of "0" in the track are also circulated for recording back on the track. The indications of "0" pass through the "and" network 2306, the "or" network 2308 and the "and" network 2310 and trigger the flip-flop 2300 to the false state of operation. When the flip-flop 2300 becomes triggered to the false state of operation, indications of "0" are recorded in the track 2002. Indications of "0" are recorded in the track 2002 by the passage of signals through the stages 2306, 2308 and 2310 in accordance with the logical equation:

$$\overline{i}_0=(Q_1+Q_2)\overline{I}T \qquad (271)$$

where all of the terms have previously been defined.

As a new instruction is being recorded in the track 2002, the indications in the last three positions of this instruction are made available to the flip-flops 2060, 2062 and 2092. As previously described these indications represent in coded form the particular type of operation to be performed by the digital computer shown in FIGURES 51 to 61, inclusive. Since the coding occurs in three positions, eight different combinations of "1" and "0" can be obtained to represent eight different types of operation.

The flip-flops 2060, 2062 and 2096 can receive the codes representing the different types of operation only at the time that a new instruction is being recorded in the track 2002. This results from the fact that each of the "and" networks 2150, 2152, 2160, 2162, 2168 and 2170 in FIGURE 53 has voltages introduced to it from the left output terminal of the flip-flop 2040 and the right output terminal of the flip-flop 2038. As previously described in connection with Equations 268 and 269, this corresponds to a coding of $\overline{Q}_1Q_2$ and controls the insertion of new information into the track 2002.

Upon the occurrence of a coding of $\overline{Q}_1Q_2$, the indications of "1" in the cathode follower 2242 at position 18 for the new instruction being recorded in the track 2002 pass through the "and" network 2150 to the left input terminal of the flip-flop 2060. This signal triggers the flip-flop 2060 to the true state of operation. The logic controlling the triggering of the flip-flop 2060 to the true state of operation may be expressed as:

$$q_4=\overline{Q}_1Q_2P_{18}LT \qquad (272)$$

where $q_4$=the introduction of a triggering signal to the left input terminal of the flip-flop 2060;

$P_{18}$=*a* signal on the line 2156 extending from the counter 230*a*; and the other terms have previously been defined.

An indication of "0" at position 18 for the instruction being recorded into the track 2002 passes from the cathode follower 2244 through the "and" network 2152 to the right input terminal of the flip-flop 2060. This signal triggers the flip-flop 2060 to the false state of operation. The triggering signals passing through the "and" network 2152 occur in accordance with the logical equation:

$$\overline{q}_4=\overline{Q}_1Q_2P_{18}\overline{L}T \qquad (273)$$

where $\overline{q}_4$=the introduction of a triggering signal to the right input terminal of the flip-flop 2060; and the other terms have previously been defined.

At position 19 of the instruction being recorded into the track 2002, an indication of "1" passes from the cathode follower 2242 through the "and" network 2160 to the left input terminal of the flip-flop 2062. The resultant triggering of the flip-flop 2062 into the true state of operation can be logically expressed as:

$$q_5=\overline{Q}_1Q_2P_{19}LT \qquad (274)$$

where $q_5$=the introduction of a triggering signal to the left input terminal of the flip-flop 2062;

$P_{19}$=a signal of high amplitude on the line 2164 extending from the counter 230a; and the other terms have previously been defined.

An indication of "0" at position 19 for the instruction being recorded into the track 2002 is introduced from the cathode follower 2244 through the "and" network 2162 to the right input terminal of the flip-flop 2062. This signal triggers the flip-flop 2062 to the false state of operation. The right input terminal of the flip-flop 2062 receives the signals passing through "and" network 2162 in accordance with the logical equation:

$$q_5=\overline{Q}_1Q_2P_{19}\overline{L}T \qquad (275)$$

where $q_5$=the introduction of a triggering signal to the right input terminal of the flip-flop 2062; and the other terms have previously been defined.

During the recording of a new instruction in the track 2002, an indication of "1" in the instruction at position 20 passes from the cathode follower 2242 through the "and" network 2168 to the left input terminal of the flip-flop 2096. This signal triggers the flip-flop 2096 for the production of a relatively high voltage on the left output terminal of the flip-flop. A relatively high voltage is produced on the left output terminal of the flip-flop 2096 by the passage of a signal through the "and" network 2168 in accordance with the logical equation:

$$q_6=\overline{Q}_1Q_2P_{20}LT \qquad (276)$$

where $q_6$=the introduction of a triggering signal to the left input terminal of the flip-flop 2096;

$P_{20}$=the production of a signal of high amplitude on the line 2128 extending from the counter 230a; and the other terms have previously been defined.

The "and" network 2170 passes an indication of "0" in the cathode follower 2244 at position 20 for an instruction being recorded in the track 2002. This signal is introduced to the right input terminal of the flip-flop 2096 to trigger the flip-flop to the false state of operation. The flip-flop 2096 becomes triggered to the false state of operation by the passage of signals through the "and" network 2170 in accordance with the logical equation:

$$\overline{q}_6=\overline{Q}_1Q_2P_{20}\overline{L}T \qquad (277)$$

where $\overline{q}_6$=the introduction of a triggering signal to the right input terminal of the flip-flop 2096; and the other terms have previously been defined.

As a new instruction has been recorded in the track 2002 it circulates in the track during successive blocks in a manner similar to that described above and as expressed logically in Equations 270 and 271. In this way, the instruction is made available during each block to control the subsequent operation. In positions 10 to 16, inclusive, of the instruction circulating in the track 2002, information is provided in coded form as to the block from which the information is to be obtained for performing the next operation. For example, block 97 may be represented in positions 10 to 16, inclusive, of the instruction circulating in the track 2002 by indications of 1100001, where the least significant digit is at the right.

At position 21 for each block, a signal passes through the "and" network 2044 in FIGURE 51. The signal is able to pass through the "and" network 2044 at position 21 for each block at all times except when the operations of multiplication or shift are being performed in blocks subsequent to a first block. This will become more apparent subsequently and is represented by relatively high voltages on the right output terminals of either or both of the flip-flops 2038 and 2040. At position 21 of the blocks described above, the signals pass through the "and" network 2044 and the "or" network 2046 to the "and" network 2052 for synchronization at optimum times in the clock cycles. The signals are then introduced to the left input terminal of the flip-flop 2054 to trigger the flip-flop to the true state of operation. Signals pass through the stages 2044, 2046 and 2052 to the left input terminal of the flip-flop 2054 in accordance with the following logical equation:

$$c_\beta=P_{21}(\overline{Q}_1+\overline{Q}_2)T \qquad (278)$$

where $c_\beta$=the introduction of a triggering signal to the left input terminal of the flip-flop 2054; and the other terms have previously been defined.

By triggering the flip-flop 2054 to the true state at position 21 for each block in accordance with the logic expressed in Equation 278, the flip-flop becomes prepared to test the coincidence between the block being presented for computation and the block specified in positions 10 to 16, inclusive, of the instruction circulating in the track 2002. As described previously, the indications appearing in the 10th to 16th positions of the instruction actually occur at positions 9 to 15, inclusive, of each block since the first position of the instruction is recorded at position 21 for the preceding block. Coincidence is not obtained if any indications appearing in the track 2000 at positions 9 to 15, inclusive, for a block differ from the indications in the track 2002 at the corresponding positions. Upon the occurrence of such a difference, a signal passes through the "or" network 2032. As previously described, a signal passes through the "or" network 2032 for simultaneous indications of "1" in the track 2000 and "0" in the track 2002 or simultaneous indications of "0" in the track 2002 and "1" in the track 2000.

A signal passing through the "or" network 2032 in one of the positions 9 to 15, inclusive for each block also passes through the "and" network 2056 when a relatively high voltage is introduced to the "and" network at the same time from the "or" network 2042. As previously described, a high voltage from "or" network 2042 occurs in each block except during operations of multiplication or shift when the operation is taking place in blocks after a first block.

The signals from the "and" network 2056 pass through the "or" network 2066 to the "and" network 2070 so as to become synchronized at optimum times in the clock cycles. The signals are then introduced to the right input terminal of the flip-flop 2054 to trigger the flip-flop to the false state of operation. The logic controlling the triggering of the flip-flop 2054 to the false state of operation by the passage of signals through the stages 2056, 2066 and 2070 may be expressed as:

$$\overline{c}_\beta=(\overline{S}I+S\overline{I})P_{9/15}(\overline{Q}_1+\overline{Q}_2)T \qquad (279)$$

where $\overline{c}_\beta$=the introduction of a triggering signal to the right input terminal of the flip-flop 2054;

$P_{9/15}$=a signal on the line 2064 to indicate positions 9 to 15, inclusive, for each block; and the other terms have previously been defined.

It will be seen from the logic expressed in Equations 278 and 279 that the flip-flop 2054 operates in its false state in every block except when a coincidence occurs between the block controlling computation and the block specified in the instruction circulating in the track 2002. Upon the occurrence of such a coincidence, the flip-flop 2054 remains in its true state even after the presentation of position 15 of the block. The flip-flop 2054 then remains in its true state for a maximum of only one block in accordance with the logic expressed in Equations 278 and 279.

Further operations are commenced upon a coincidence between the block being presented for computation and the block specified in the 10th to the 16th positions of the instruction circulating in the track 2002. One of these operations involves the determination as to the particular track which is to provide information for the next operation. This determination is controlled by the pattern of indications in the 17th and 18th positions of the instruction circulating in the track 2002. These indications actually occur at positions 16 and 17 for each block since the first position of the instruction occurs at position 21 for the preceding block. The indications occurring at positions 16 and 17 are recorded in the flip-flops 2176 and 2140 for the $c_\beta$ block in which coincidence occurs.

When a relatively high voltage is produced on the left output terminal of the $c_\beta$ flip-flop 2054, a signal passes through the "and" network 2180 in FIGURE 54 at position 17 for an indication of "1" in the track 2002 at this position The signal is able to pass through the "and" network 2180 provided that an operation of multiplication is not being performed in blocks subsequent to a first block This results from the introduction of signals to the "and" network 2180 through the "or" network 2042 from the right output terminals of the flip-flops 2038 and 2040. The "and" network 2180 becomes closed in blocks subsequent to a first block in an operation of multiplication since the flip-flop 2054 is used for purposes other than those of coincidence in these blocks.

The signals passing through the "and" network 2180 are introduced through the "or" network 2194 to the "and" network 2196 for synchronization at optimum times in the clock cycles. The signals are then introduced to the left input terminal of the flip-flop 2176 to trigger the flip-flop to the true state of operation. Signals pass through the stages 2180, 2194 and 2196 to the left input terminal of the flip-flop 2176 in accordance with the logical equation:

$$t_1 = C_\beta I P_{16}(\overline{Q}_1 + \overline{Q}_2)T \qquad (280)$$

where $P_{16}$=a signal of high amplitude on the line 2188 extending from the counter 230*a*; and the other terms have previously been defined.

Just as the network 2180 passes an indication of "1" at position 16 for the block representing coincidence, the "and" network 2202 passes an indication of "0" at this position. The signals from the "and" network 2202 are introduced through the "or" network 2206 to the "and" network 2208 so as to be synchronized with the clock signals. The signal then passes to the right input terminal of the flip-flop 2176 to trigger the flip-flop to the false state of operation. The right input terminal of the flip-flop 2176 receives the signals passing through the stages 2202, 2206 and 2208 in accordance with the logical equation:

$$\overline{t}_1 = C_\beta \overline{I} P_{16}(\overline{Q}_1 + \overline{Q}_2)T \qquad (281)$$

where all of the terms have previously been defined.

At position 17 for a block representing coincidence, signals pass through the "and" network 2220 in FIGURE 54, the "or" network 2214 and the "and" network 2212 to the left input terminal of the flip-flop 2140. These signals trigger the flip-flop 2140 for the production of a relatively high voltage on the left output terminal of the flip-flop. A relatively high voltage is produced on the left output terminal of the flip-flop 2140 by the passage of signals through the stages 2220, 2214 and 2212 in accordance with the logic expressed in the following equation:

$$t_2 = C_\beta I P_{17}(Q_1 + Q_2)T \qquad (282)$$

where $P_{17}$=a signal of high amplitude on the line 2226 extending from the counter 230*a*; and the other terms have previously been defined.

In like manner, an indication of "0" passes from the instruction in the track 2002 through the "and" network 2232 at position 17 for a block representing coincidence. The signals from the "and" network 2232 are then introduced through the "or" network 2236 and the "and" network 2238 to the right input terminal of the flip-flop 2140 so as to trigger the flip-flop to the false state of operation. The operation of the "and" networks 2232, 2236 and 2238 in controlling the introduction of triggering signals to the right input terminal of the flip-flop 2140 can be expressed as:

$$\overline{t}_2 = C_\beta \overline{I} P_{17}(\overline{Q}_1 + \overline{Q}_2)T \qquad (283)$$

where all of the terms have previously been defined.

A new operation is initiated when coincidence occurs between the block being presented for computation and the block specified in positions 10 to 16, inclusive, of the instruction circulating in the track 2002. A new operation is initiated by the passage of a signal through the "and" network 2072 in FIGURE 52. A signal is able to pass through the "and" network 2072 only at position 21 for the block representing coincidence. This results from the introduction to the "and" network 2072 of signals from the line 2024 and the left output terminal of the flip-flop 2054. The signal is able to pass through the "and" network 2072 only upon the occurrence of a relatively high voltage on the right output terminal of the flip-flop 2038. This voltage is produced during the time that a new instruction is being recorded in the track 2002 and during the time that the instruction is circulating in the track until a new operation is commenced.

The signals passing through the "and" network 2072 trigger the flip-flop 2038 to the true state of operation. The flip-flop 2038 becomes triggered to the true state of operation in accordance with the logical equation:

$$q_1 = C_\beta P_{21} Q_1 T \qquad (284)$$

where all of the terms have previously been defined.

As previously described, the flip-flop 2040 is triggered to its false state of operation after each instruction has been recorded in the track 2002. This is in accordance with the logic expressed in Equation 269*a*. Since the flip-flop 2038 is triggered to its true state in accordance with the logic expressed in Equation 284 at the time that a new operation is to be commenced, the code $Q_1\overline{Q}_2$ for the flip-flops 2038 and 2040 represents the actual initiation of a new operation. Various types of operation may occur as controlled by the pattern of operation of the flip-flops 2060, 2062 and 2096. The flip-flops 2060, 2062 and 2064 are triggered into different patterns in accordance with the logic expressed in Equations 272 to 277, inclusive, so as to control the selection of the various operations. These various operations will now be considered on an individual basis.

TRANSFER OF INFORMATION FROM A TRACK

A transfer of information from one of the tracks 150, 156, 2260 and 2270 to the information register formed in the track 2002 may be involved in one type of operation performed by the digital computer. The transfer is obtained to the particular information register designated as the accumulator. The transfer of information into the accumulator is obtained by the introduction of signals to the left input terminal of the flip-flop 2326 in FIGURE 56. The transfer of information from the memory to the accumulator is obtained only during a particular code in the flip-flops 2060, 2062 and 2096. This code is represented by a relatively high voltage on the left output terminal of the flip-flop 2062 and relatively high voltages on the right output terminals of the flip-flops 2060 and 2096.

Upon the occurrence of a code representing the transfer of information from the memory to the accumulator, indications of "1" in the cathode follower 2242 pass through the "and" network 2340. The indications of "1" in the cathode follower 2242 are able to pass through the "and" network 2340 only in the first word of a new operation, as represented by a relatively high voltage on the left output terminal of the flip-flop 2038 and a relatively high voltage on the right output terminal of the flip-flop 2040.

The signals from the "and" network 2340 pass through the "or" network 2330 to the "and" network 2332 for synchronization at optimum times in the clock cycles. The signals then pass to the left input terminal of the flip-flop 2326 for the production of a relatively high voltage on the left output terminal of the flip-flop. A relatively high voltage is produced on the left output terminal of the flip-flop. A relatively high voltage is produced on the left output terminal of the flip-flop 2326 in accordance with the passage of signals through the stages 2340, 2330 and 2332 in accordance with the logical equation:

$$a_5=\overline{Q}_4Q_5\overline{Q}_6Q_1\overline{Q}_2LT \qquad (285)$$

where $a_5$=the introduction of a triggering signal to the left input terminal of the flip-flop 2326;

$\overline{Q}_4$=a relatively high voltage on the right output terminal of the flip-flop 2060;

$Q_5$=a relatively high voltage on the left output terminal of the flip-flop 2062;

$\overline{Q}_6$=a relatively high voltage on the right output terminal of the flip-flop 2096; and the other terms have previously been defined.

Just as the indications of "1" in the cathode follower 2242 pass through the "and" network 2340 in FIGURE 56, the indications of "0" in the cathode follower 2244 pass through the "and" network 2350. These indications then pass through the "or" network 2362 to the "and" network 2364 so as to be synchronized at optimum times in the clock cycles. After being synchronized, the signals are introduced to the right input terminal of the flip-flop 2326 to trigger the flip-flop to the false state of operation. Signals pass through the stages 2350, 2362 and 2364 to the right input terminal of the flip-flop 2326 in accordance with the logical equation:

$$\overline{a}_5=\overline{Q}_4Q_5\overline{Q}_6Q_1\overline{Q}_2LT \qquad (286)$$

where $\overline{a}_5$=the introduction of a triggering signal to the right input terminal of the flip-flop 2326; and the other terms have previously been defined.

It will be seen from the logic expressed in Equations 285 and 286 that the information in one of the tracks 150, 156, 2260 and 2270 becomes transferred to the portion of the track 2202 serving as the accumulator. The information then becomes recirculated in the track until an operation such as addition, multiplication or complementation can be performed. The indications circulate in the accumulator provided certain conditions are true. One of these conditions is that the operations of multiplication or shift must not be performed at the time that the information in the accumulator is being recirculated. This is represented by the passage of a signal through the "or" network 2084 (FIGURE 52) as previously described. A signal passes through the "or" network 2084 when relatively high voltages are produced on the right output terminals of either or both of the flip-flops 2060 and 2062. However, even in operations of multiplication and shaft the information can recirculate in the first block of operation but cannot circulate in subsequent blocks. This is represented by a signal from the "or" network 2042. As previously described, a signal passes through the "or" network 2042 when relatively high voltages are produced on the right output terminals of either or both of the flip-flops 2038 and 2040.

Upon the simultaneous introduction of relatively high voltages from the "or" networks 2042 and 2084, the "and" network 2328 in FIGURE 56 becomes prepared for the passage of signals. The "and" network then passes the signals of high amplitude on the left output terminal of the flip-flop 2050. Signals of high amplitude are produced on the left output terminal of the flip-flop 2050 when indications of "1" are induced in the coil 2327. Since the coil 2327 is magnetically coupled to the track 2002, signals are induced in the coil in accordance with the pattern of signals originally recorded in the accumulator in accordance with the logic expressed in Equations 285 and 286.

The signals from the "and" network 2328 in FIGURE 56 are introduced through the "or" network 2330 to the "and" network 2332 and are passed through the "and" network 2332 at optimum times in the clock cycles. These signals trigger the flip-flop 2326 to the true state of operation. The triggering of the flip-flop 2326 to the true state by the passage of signals through the stages 2328, 2330 and 2332 occurs in accordance with the logical equation:

$$a_5=(\overline{Q}_1+\overline{Q}_2)(\overline{Q}_4+\overline{Q}_5)A_4T \qquad (287)$$

where $A_4$=a relatively high voltage on the left output terminal of the flip-flop 2050; and the other terms have previously been defined.

The "and" network 2346 in FIGURE 56 becomes prepared for opening at the same time as the "and" network 2328. Upon becoming prepared for opening, the "and" network 2346 passes the signals of high amplitude on the right output terminal of the flip-flop 2050. These signals represent indications of "0" moving in the track 2002 past the head 2327. The signals from the "and" network 2346 pass through the "or" network 2362 and the "and" network 2364 to the right input terminal of the flip-flop 2326 to trigger the flip-flop to the false state of operation. Signals are introduced through the stages 2350, 2362 and 2364 to the right input terminal of the flip-flop 2326 in accordance with the logical equation:

$$a_5=(\overline{Q}_1+\overline{Q}_2)(\overline{Q}_4+\overline{Q}_5)\overline{A}_4T \qquad (288)$$

where $\overline{A}_4$=a relatively high voltage on the right output terminal of the flip-flop 2050; and the other terms have previously been defined.

The information transferred into the accumulator circulates in the accumulator in accordance with the logic expressed in Equations 287 and 288. The information circulates in the accumulator until a new operation is commenced. This operation may be one of addition. The operation of addition is represented by the simultaneous production of relatively high voltages on the right output terminal of the flip-flop 2060 and on the left output terminals of the flip-flops 2062 and 2096. When such a coding occurs in the flip-flops 2060, 2062 and 2096, the information passing to the cathode followers 2242 and 2244 is introduced through certain stages shown in FIGURE 57 to the flip-flop 2322.

The "and" network 2366 is one of the stages for controlling the passage of signals from the cathode followers 2242 and 2244 to the flip-flop 2322. Because of its particular connections to the flip-flops 2060, 2062 and 2096, a high voltage is obtained from the "and" network only for the operation of addition. The high voltage from the "and" network 2366 is introduced through the "or" network 2370 to the "and" network 2372. The "and" network 2372 is able to open only in the first word of an operation because of its connection to the left output terminal of the flip-flop 2038 and the right output terminal of the flip-flop 2040.

When the "and" network 2372 becomes prepared for opening, it passes the indications of "1" in the cathode follower 2242. These indications pass through the "or" network 2374 to the "and" network 2376 for synchronization at optimum times in the clock cycles. The signals are then introduced to the left input terminal of the flip-flop 2322 to trigger the flip-flop to the true state of operation. The flip-flop 2322 receives at its input terminal the signals passing through the stages 2366, 2370, 2372, 2374 and 2376 in accordance with the logical equation:

$$d_2=\overline{Q}_4Q_5Q_6Q_1\overline{Q}_2LT \quad (289)$$

where $d_2$=the introduction of a triggering signal to the left input terminal of the flip-flop 2322; and the other terms have previously been defined.

The "and" network 2388 in FIGURE 57 becomes prepared for opening at the same time as the "and" network 2372. When the "and" network 2388 becomes prepared for opening, it passes the indications of "0" in the cathode follower 2344. The indications passing through the "and" network 2388 are introduced through the "or" network 2382 to the "and" network 2380 and are introduced by the "and" network 2380 to the right input terminal of the flip-flop 2322 at optimum times in the clock cycles. The signals trigger the flip-flop 2322 to produce a relatively high voltage on the right output terminal of the flip-flop. The logic controlling the passage of signals through the stages 2388, 2382 and 2380 to the right input terminal of the flip-flop 2322 may be expressed in the following equation:

$$\overline{d}_2=\overline{Q}_4Q_5Q_6Q_1\overline{Q}_2\overline{L}T \quad (290)$$

where $\overline{d}_2$=the introduction of a triggering signal to the right input terminal of the flip-flop 2322; and the other terms have previously been defined.

The signal indications produced in the flip-flop 2322 in accordance with the logic expressed in Equations 289 and 290 are combined with the signal indications which are recirculating in the accumulator provided in the track 2002. The indications in the flip-flop 2322 and in the accumulator are combined for each successive position on an arithmetical basis such that a carry or lack of carry is obtained in each position for transfer to the next. This carry or lack of carry is used in the next position to obtain the proper value in that position of the sum resulting from the addend in the flip-flop 2322 and the augend in the accumulator.

SUM OF TWO NUMBERS

The arithmetical combination of the signal indications in each position is obtained in part by the operation of the stages shown in FIGURES 59 and 60. These stages include the "and" networks 2428, 2430, 2432 and 2434 in FIGURE 59. Each of the "and" networks 2428, 2430, 2432 and 2434 passes a signal to represent an indication of "1" as the sum of the addend and augend for a particular position and the carry from the position preceding the particular position. For example, the "and" network 2428 passes a signal representing an indication of "1" for the sum at a particular position when indications of "1" occur for the addend and augend at that position and for the carry from the previous position. The addition of three binary values of "1" provides a digital value of "3." This is equivalent in binary form to a value of "1" and a carry of "1" to the next position. In like manner, the network 2430 in FIGURE 59 passes a signal to represent an indication of "1" for sum at a particular position as a result of the combination of values of "0" for the addend and augend and "1" for the carry from the previous position. A signal passes through the "and" network 2432 to represent an indication of "1" at a particular position when a value of "1" for the augend is being combined with values of "0" for the addend and the carry from the previous position. A signal is obtained from the "and" network 2434 to represent an indication of "1" for the sum at a particular position when a value of "1" for the addend is combined with values of "0" for the augend and the carry from the previous position.

It will be seen from the above discussion that signals pass through the "or" network 2436 to represent indications of "1" resulting from different combinations in the values of the addend and augend for a particular position and the value of the carry from the previous position. The signals passing through the "or" network 2436 are introduced to the "and" network 2448. The "and" network 2448 is able to pass these signals only during the first block of an operation and only when addition is being performed. This results from the coding of $Q_1\overline{Q}_2$ in the flip-flops 2038 and 2040 and the coding of $Q_4Q_5Q_6$ in the flip-flops 2060, 2062, and 2096.

When the "and" network 2448 becomes prepared for opening, it receives the signals from the "or" network 2436 and passes these signals through the "or" network 2442 to the "and" network 2444. These signals then pass to the left input terminal of the flip-flop 2426 at optimum times in the clock cycles so as to trigger the flip-flop 2426 to the true state of operation. The resultant voltage of high amplitude on the left output terminal of the flip-flop 2426 is introduced to the coil 2446 such that the coil records indications of "1" in the track 2002. These indications represent the value of the sum in the accumulator provided in a portion of the track 2002.

Indications of "1" are recorded in the track 2002 by the passage of signals through the stages 2428, 2430, 2432, 2434, 2436, 2438, 2442 and 2444 in accordance with the logical equation:

$$a_0\overline{Q}_4Q_5Q_6Q_1\overline{Q}_2(D_2A_5C_4+\overline{A}_5\overline{D}_2C_4+\overline{D}_2A_5\overline{C}_4+D_2\overline{A}_5\overline{C}_4)T \quad (291)$$

where $a_0$=the introduction of a triggering signal to the left input terminal of the flip-flop 2426;

$D_2$=a relatively high voltage on the left output terminal of the flip-flop 2322;

$\overline{D}_2$=a relatively high voltage on the right output terminal of the flip-flop 2322;

$A_5$=a relatively high voltage on the left output terminal of the flip-flop 2326;

$\overline{A}_5$=a relatively high voltage on the right output terminal of the flip-flop 2326;

$C_4$=a relatively high voltage on the left output terminal of the flip-flop 2394;

$\overline{C}_4$=a relatively high voltage on the right output terminal of the flip-flop 2394;

and the other terms have previously been defined.

Just as the indications of "1" representing the sum for the different positions pass to the left input terminal of the flip-flop 2426, the indications of "0" representing the sum for different positions are introduced to the right input terminal of the flip-flop 2426 in accordance with the operation of certain stages shown in FIGURE 60. These stages include the "and" networks 2462, 2464, 2466 and 2468. For example, the "and" network 2468 passes a signal representing a sum of "0" for a particular position when indications of "0" for the addend and augend at the particular position are combined with a carry of "0" from the previous position.

The "and" networks 2462, 2464 and 2466 pass signals representing sums of "0" at a particular position when two indications of "1" are combined at the positions. When two indications of "1" are combined, a binary sum of "2" is obtained. This is equivalent in binary form to an indication of "0" at the particular position and a carry of "1" to the next position. For example, the "and" network 2462 passes a signal when an indication of "1" in the addend and an indication of "1" in the augend are combined for a particular position. Similarly, the "and" network 2464 passes a signal upon the combination of an indication of "I" in the augend and an indication of "1"

in the carry for a particular position. The "and" network 2466 passes a signal to represent a sum of "0" when an indication of "1" in the auged and an indication of "1" in the carry are combined for a particular position.

The signals from the "and" networks 2462, 2464, 2466 and 2468 pass through the "or" network 2470 to the "and" network 2478. The "and" network 2478 operates to pass the signals from the "or" network 2470 in the first block of an operation for obtaining the sum of two numbers. The signals then pass through the "or" network 2474 and the "and" network 2476 to the right input terminal of the flip-flop 2426 to trigger the flip-flop to the false state of operation.

The flip-flop 2426 becomes triggered to the false state of operation by the passage of signals through the stages 2462, 2464, 2466, 2468, 2470, 2478, 2474 and 2476 in acccordance with the logical equation:

$$\overline{a}_0=\overline{Q}_4Q_5Q_6Q_1\overline{Q}_2(\overline{D}_2\overline{A}_5\overline{C}_4+D_2A_5\overline{C}_4+D_2\overline{A}_5C_4+\overline{D}_2A_5C_4)T \qquad (292)$$

where $\overline{a}_0$=the introduction of a triggering signal to the right input terminal of the flip-flop 2426; and the other terms have previously been defined.

A carry from one position to the next is initially obtained when an indication of "1" for the addend at a particular position is combined with an indication of "1" for the augend. When these indications simultaneously occur in the operation of addition for the first block of the operation, a signal passes through the "and" network 2398 in FIGURE 58. The signal from the "and" network 2398 passes through the "or" network 2404 to the "and" network 2406. This signal is passed by the "and" network 2406 at an optimum time in the clock cycle and is introduced to the left input terminal of the flip-flop 2394. The signal triggers the flip-flop 2394 to the true state of operation.

The flip-flop 2394 becomes triggered to the true state of operation by the passage of signals through the stages 2398, 2404 and 2406 in accordance with the logical equation:

$$c_4=\overline{Q}_4Q_5Q_6Q_1\overline{Q}_2A_5D_2 \qquad (293)$$

where $c_4$=the introduction of a triggering signal to the left input terminal of the flip-flop 2394 to indicate a carry; and the other terms have previously been defined.

When a carry is obtained for a position during the operation of addition, carries are also obtained in subsequent positions as long as either the addend $D_2$ or the augend $A_5$ has a value of "1" or both the addend and the augend have values of "1." This results from the fact that the addition of a carry of "1" at a position and a binary value of "1" for either the addend or the augend at the position causes a carry to be obtained to the next position. In this way, after a carry of "1" has been initially produced for a particular position, a carry of "0" is obtained for a succeeding position only when the addend $D_2$ and the augend $A_5$ for the succeeding position are both "0."

When the addend and augend are both "0" in an operation of addition, a signal passes through the "and" network 2420 (FIGURE 58) and the "or" network 2410 to the "and" network 2410 for synchronization at optimum times in the clock cycles. The signals are then introduced to the right input terminal of the flip-flop 2394 to trigger the flip-flop to the false state of operation. The flip-flop 2394 receives at its right input terminal the signals passing through the stages 2420, 2412 and 2410 in accordance with the logical equation:

$$c_4=\overline{Q}_4Q_5Q_6Q_1\overline{Q}_2\overline{A}_5\overline{D}_2T \qquad (294)$$

where $c_4$=the introduction of a triggering signal to the right input terminal of the flip-flop 2396; and the other terms have been previously defined.

COMPLEMENTATION

Complementation is another type of operation capable of being performed by the digital computer shown in FIGURES 51 to 61, inclusive. In the operation of complementation, a number having a particular magnitude and a first polarity is converted into a number having the same magnitude and an opposite polarity. When a first number is complemented, the addition of the complemented first number to a second number is equivalent to the subtraction of the first number in its original form from the second number. In this way, the arithmetical operation of substraction can be performed.

The conversion of polarities without any change in magnitude is often obtained by inverting the indication in every position for a number and adding an indication of "1" to the least significant digit. For example, indications of 00110 can be complemented by inverting the indications to signals representing 11001, where the least significant digit is at the right. An indication of "1" can then be added to the least significant digit of the inverted number to obtain indications of 11010, where the least significant digit is at the right. This is the way in which complementation is often performed.

Another way of complementing a number is to provide a carry for every position after the first indication of "1" in the original number. The carry is then added to the original number on an individual basis for each position so that no overflow is obtained from one position to the next. For example, the original number may be 00110, where the least significant digit is at the right. For such a number, the carry flip-flop is triggered true in the second position so that indications of "1" are produced by the carry in the third position and in every position subsequent to the third position. In this way, the indications provided by the carry flip-flop are 11100, where the least significant digit is at the right. The original number and the carry are added in each position as follows without any overflow between each position and the subsequent position:

$$\begin{array}{r} 11100 \\ 00110 \\ \hline 11010 \end{array}$$

As will be seen, the result obtained by the operation of complementation described in this paragraph is similar to that obtained by the operation of complementation described in the previous paragraph.

The operation of complementation occurs for a code corresponding to the true state of operation of the flip-flop 2060 and the false states of operation of the flip-flops 2062 and 2096. This code can be represented as $Q_4\overline{Q}_5\overline{Q}_6$. When a code of $Q_4\overline{Q}_5\overline{Q}_6$ is obtained for a first block of an operation as represented by a code of $Q_1\overline{Q}_2$, the "and" network 2452 in FIGURE 59 becomes prepared to pass signals from the "and" networks 2456 and 2458. A signal passes through the "and" network 2456 and the "or" network 2454 to the "and" network 2452 when an indication of "0" for the original number at a particular position is added to a carry indication of "1" for that position. Similarly, a signal passes through the "and" network 2458 and the "or" network 2454 to the "and" network 2452 when an indication of "1" for the original number at a particular position is added to a carry indication of "0" at the particular position.

The signals from the "and" network 2452 pass through the "or" network 2442 and the "and" network 2444 to trigger the flip-flop 2426 to the true state of operation. When the flip-flop 2426 becomes triggered to the true state of operation, an indication of "1" is recorded by the coil 2446 in the track 2002 to represent a value of "1" for the particular position in the complemented number. Indications of "1" are recorded in the track 2002 by the passage of signals through the stages 2456, 2458, 2454, 2452, 2442 and 2444 in accordance with the logical equation:

$$a_0=Q_4\overline{Q}_5\overline{Q}_6Q_1\overline{Q}_2(\overline{A}_5C_4+A_5\overline{C}_4)T \quad (295)$$

where all of the terms have previously been defined.

The "and" network 2484 in FIGURE 60 becomes prepared to pass signals at the same time as the "and" network 2452 in FIGURE 59. The "and" network 2484 passes signals to represent indications of "0" at different positions in a complemented number. These indications of "0" are obtained by the passage of signals through the "and" networks 2488 and 2490. A signal passes through the "and" network 2488 at a particular position to represent the complemented number when indications of "0" are provided for the original number and the carry. A signal is obtained from the "and" network 2490 to represent an indication of "0" at a particular position when indications of "1" are simultaneously produced at the particular position for the original number and the carry.

The signals from the "and" network 2484 pass through the "or" network 2474 to the "and" network 2476 for synchronization at optimum times in the clock cycles. Signals are then introduced to the right input terminal of the flip-flop 2426 to trigger the flip-flop to the false state of operation. This causes an indication of "0" to be recorded by the coil 2446 (FIGURE 59) in the track 2002. The logical equation controlling the passage of signals through the stages 2488, 2490, 2486, 2484, 2474 and 2476 to the right input terminal of the flip-flop 2426 can be logically expressed as $$\overline{a}_0=Q_4\overline{Q}_5\overline{Q}_6Q_1\overline{Q}_2(A_5C_4+\overline{A}_5\overline{C}_4)T \quad (296)$$

where all of the terms have previously been defined.

As previously described, a carry indication of "1" is initially provided in the operation of complementation when the first indication of "1" is presented in the number to be complemented. A carry indication of "1" is then obtained in each position during the remainder of the block being presented for computation. Carry indications of "1" are obtained in the operation of complementation by the passage of signals through the "and" network 2402 in FIGURE 58. The "and" network 2402 becomes prepared for opening in the first block of an operation involving complementation. The first block of the operation is represented by a coding of $Q_1\overline{Q}_2$ and the operation of complementation is represented by the coding of $Q_4\overline{Q}_5\overline{Q}_6$.

When the "and" network 2402 becomes prepared for opening, it passes the first indication of "1" in the number to be complemented. This indication of "1" in the number to be complemented is represented by a relatively high voltage on the left output terminal of the flip-flop 2326. The signal from the "and" network 2402 passes through the "or" network 2404 and the "and" network 2406 to the left input terminal of the flip-flop 2394 to trigger the flip-flop to the true state of operation. Signals pass through the stages 2402, 2404 and 2406 to the left input terminal of the flip-flop 2394 in accordance with the logical equation:

$$c_4=Q_4\overline{Q}_5\overline{Q}_6Q_1\overline{Q}_2A_2T \quad (297)$$

where all of the terms have previously been defined.

At the end of the first block in any type of operation except multiplication, the carry flip-flop 2394 becomes triggered to its false state of operation. The carry flip-flop 2394 becomes triggered to its false state of operation at such times so as to prevent any carry from being obtained in the first positions of the next operation except when a carry in such first positions is desired. The carry flip-flop 2394 becomes triggered to its false state of operation at position 21 of the first block in an operation by the passage of signals through certain stages shown in FIGURE 58. These stages include the "or" network 2416 and the "and" network 2414 in FIGURE 58.

A signal passes through the "or" network 2416 for a coding of $(\overline{Q}_4+\overline{Q}_5+Q_6)$. Such a coding is equivalent to the converse of a coding of $Q_4Q_5\overline{Q}_6$. Since a coding of $Q_4Q_5\overline{Q}_6$ represents an operation of multiplication, a signal passes through the "or" network 2416 to the "and" network 2414 at any time except for an operation of multiplication. Since the "and" network 2414 also receives voltages representing a coding of $Q_1\overline{Q}_2$, a signal is able to pass through the "and" network only for the first word of an operation.

When the "and" network 2414 becomes prepared for opening in the first block of any operation except multiplication, a signal passes through the "and" network at position 21 for the block. This signal is introduced through the "or" network 2412 and the "and" network 2410 to the right input terminal of the flip-flop 2394. The signal triggers the flip-flop 2394 to the false state of operation. The flip-flop 2394 becomes triggered to the false state of operation by the passage of signals through the stages 2416, 2414, 2412 and 2410 in accordance with the logical equation:

$$\overline{c}_4=Q_1\overline{Q}_2(\overline{Q}_4+\overline{Q}_5+Q_6)P_{21}T \quad (298)$$

where all of the terms have previously been defined.

Another type of operation may be designated as conditional transfer. In the operation of conditional transfer, the polarity of a quantity is determined. When the quantity has a positive polarity, a first operation is performed. When the quantity has a second polarity, a second operation is performed. Because of the dependence of the next operation upon the polarity of the quantity being read, a first step in the operation of conditional transfer involves the determination of polarity. This determination is made by the operation of certain stages shown in FIGURE 53.

The "and" network 2126 is one of the stages shown in FIGURE 53 for determining the polarity of a quantity. The "and" network 2026 can become prepared for opening only during the first block of a new operation as represented by a code of $Q_1\overline{Q}_2$. The "and" network 2126 can further become prepared for operation only upon the introduction of a signal from the "or" network 2084 to indicate that the operations of multiplication and shift of digital positions are not taking place. A signal is able to pass through the "and" network 2126 only at position 20 for a block because of the connection of the "and" network through the line 2128 to the counter 230a. This is the position at which the sign of a quantity appears in the block holding the quantity. It will become more apparent subsequently when the operation of multiplication is discussed.

When the "and" network 2126 becomes prepared for opening, it passes the signals of high amplitude on the left output terminal of the flip-flop 2050. Since the operation of the flip-flop 2050 is controlled by the coil 2327 in the track 2002 (best seen in FIGURE 56), the signals of high amplitude on the left output terminal of the flip-flop 2050 represent indications of "1" in the track 2002. The signals of high amplitude on the left output terminal of the flip-flop 2050 pass through the "and" network 2126 and the "or" network 2130 in FIGURE 53 to the "and" network 2132 so as to be synchronized at optimum times in the clock cycles. The signals are then introduced to the left input terminal of the flip-flop 2090 to trigger the flip-flop to the true state of operation. Triggering signals are introduced to the left input terminal of the flip-flop 2090 through the stages 2126, 2130 and 2132 in accordance with the logical equation:

$$q_3=(\overline{Q}_4+\overline{Q}_5)Q_1\overline{Q}_2P_{20}A_4T \quad (299)$$

where $q_3$=the introduction of a triggering signal to the left input terminal of the flip-flop 2090; and the other terms have previously been defined.

The "and" network 2142 in FIGURE 53 becomes prepared for opening at the same time as the "and" network 2126. When the "and" network 2142 becomes prepared for opening, the signals of high amplitude on the right output terminal of the flip-flop 2050 pass through the "and" network 2142 and the "or" network 2146 to the "and" network 2148. These signals represent indications of "0" in the track 2002. The indications passing to the "and" network 2148 are introduced at optimum times in the clock cycles to the right input terminal of the flip-flop 2090 so as to trigger the flip-flop to the false state of operation. The flip-flop 2090 becomes triggered to the false state of operation by the passage of signals through the stages 2142, 2146 and 2148 in accordance with the logical equation:

$$\overline{q}_3=(\overline{Q}_4+\overline{Q}_5)Q_1\overline{Q}_2P_{20}AT \qquad (300)$$

where $\overline{q}_3$=the introduction of a triggering signal to the right input terminal of the flip-flop 2090; and the other terms have previously been defined.

It will be seen from Equations 299 and 300 that the flip-flop 2090 becomes triggered in accordance with the polarity of the quantity circulating in the accumulator. The flip-flop 2090 becomes triggered to the true state of operation for a negative quantity and becomes triggered to the false state of operation for a positive quantity. The triggering of the flip-flop 2090 to the true or false states controls the operating of certain stages shown in FIGURE 52. These stages include the "and" networks 2086 and 2088.

When the flip-flop 2090 is in the true state of operation to indicate a negative quantity, a signal passes through the "and" network 2086 in FIGURE 52 upon the presentation for computation of the block representing α (alpha) coincidence. As previously described, α (alpha) coincidence occurs when a block being presented for computation corresponds to the block specified in the first seven positions of the instruction circulating in the track 2002. However, a signal passes through the "and" network 2086 for a block representing β (beta) coincidence when a relatively high voltage is produced on the right output terminal of the flip-flop 2090. β (beta) coincidence occurs when the block being presented for computation corresponds to the block specified in positions 10 to 16, inclusive, of the instruction circulating in the track 2002.

The signals passing through the "and" network 2086 or the "and" network 2088 is introduced through the "or" network 2092 to the "and" network 2094. The "and" network 2094 is able to pass these signals only for an operation of conditional transfer of information. Such an operation is represented by a code of $Q_4\overline{Q}_5Q_6$ in the flip-flops 2060, 2062 and 2096. The signals from the "or" network 2092 are further able to pass through the "and" network 2094 only at position 21 for a block, as represented by a signal passing through the line 2024 from the counter 230a. The signals passing through the "and" network 2094 are introduced through the "or" network 2098 to the "and" network 2100 for synchronization at optimum times in the clock cycles.

The signals synchronized by the "and" network 2100 pass to the left input terminal of the flip-flop 2040 to trigger the flip-flop to the true state of operation. The flip-flop 2040 receives at its left input terminal the signals passing through the stages 2086, 2088, 2092, 2094, 2098 and 2100 in accordance with the logical equation:

$$q_2=P_{21}Q_4\overline{Q}_5Q_6(C_\alpha\overline{Q}_3)T \qquad (301)$$

where $Q_3$=a relatively high voltage on the left output terminal of the flip-flop 2090;

$\overline{Q}_3$=a relatively high voltage on the right output terminal of the flip-flop 2090; and the other terms have previously been defined.

It will be seen from the logic expressed in Equation 301 that the flip-flop 2040 becomes triggered to the true state of operation at position 21 for a particular block depending upon the polarity of a previous quantity. The flip-flop 2038 has previously become triggered to the false state of operation in accordance with the logic expressed in Equation 266. Since the flip-flops 2038 and 2040 operate in a code corresponding to $\overline{Q}_1Q_2$, a new instruction is recorded in the track 2002. The new instruction is recorded in the track 2002 in accordance with the logic expressed in Equations 268 and 269. In this way, a new instruction becomes recorded in the track 2002 for a block representing α (alpha) coincidence upon the occurrence of a positive quantity and for a block representing β (beta) coincidence upon the occurrence of a negative quantity.

It has been described that the coil 2446 is separated from the coil 2327 by approximately 21 positions and is separated from the coil 2343 by approximately 42 positions. This corresponds to a separation between the coils 2446 and 2327 approximately one block and between the coils 2446 and 2343 of approximately two blocks. Signal information normally circulates in the track 2002 from the coil 2446 to the coil 2343. The signal is then read by the coil 2446 and is introduced back to the coil 2446 for another cycle of circulation in the track 2002. In this way the information re-circulates through a distance corresponding substantially to two blocks. However, the information generally has a length of only one block. In this way, the information is generally made available only in alternate blocks for reading by the coil 2343.

It may sometimes be desired to make available in every block the information re-circulating in the accumulator. This may sometimes be desired so that the information can be used in a block during which the information would otherwise not be available.

For example, the information may normally be made available in the track 2002 in blocks 2, 4, 6 and all other even blocks for reading by the coil 2446. However, it may be desired to make the information available at a block such as block 9 during which the information would otherwise not be available. The information is made available in a block such as block 9 by recording in a block prior to block 9 the information in the second half of the accumulator as the information is made available in the first half of the accumulator. For example, the information may be transferred from the first half of the accumulator to the second half of the accumulator during the presentation of block 4 for computation.

The transfer of information from the first half of the accumulator into the second half of the accumulator occurs only for a particular code in the flip-flops 2060, 2062 and 2096. This code may be represented as $\overline{Q}_4\overline{Q}_5\overline{Q}_6$. Upon the occurrence of a code designated as $\overline{Q}_4\overline{Q}_5\overline{Q}_6$, the "and" network 2342 in FIGURE 56 becomes prepared for opening. The "and" network 2342 is able to become opened only in the first block of an operation as represented by a code of $Q_1\overline{Q}_2$. When the "and" network 2342 becomes prepared for opening, it passes the signals of high amplitude on the left output terminal of the flip-flop 2344. The signals passing through the "and" network 2342 are introduced through the "or" network 2330 and the "and" network 2332 to the left input terminal of the flip-flop 2326. These signals trigger the flip-flop 2326 to the true state of operation. Triggering signals pass to the left input terminal of the flip-flop 2326 through the stages 2342, 2330 and 2332 in accordance with the logical equation:

$$a_5=\overline{Q}_4\overline{Q}_5\overline{Q}_6Q_1\overline{Q}_2A_6T \qquad (302)$$

where $A_6$=a relatively high voltage on the left output terminal of the flip-flop 2344; and the other terms have previously been defined.

Just as the signals of high amplitude on the left output terminal of the flip-flop 2344 pass through the "and" network 2342 in FIGURE 56, the signals of high amplitude on the right output terminal of the flip-flop pass through the "and" network 2352. These signals are introduced through the "or" network 2362 and the "and" network 2364 to the right input terminal of the flip-flop 2326 to trigger the flip-flop to the false state of operation. The logic controlling the passage of triggering signals through the stages 2352, 2362 and 2364 may be expressed as:

$$\overline{a}_5=\overline{Q}_4\overline{Q}_5\overline{Q}_6Q_1\overline{Q}_2\overline{A}_6T \qquad (303)$$

where $A_6$=a relatively high voltage on the right output terminal of the flip-flop 2344; and the other terms have previously bene defined.

SHIFTING OF INFORMATION

The shifting of information in the accumulator is another type of operation which may be performed. This operation occurs only for a coding of $Q_4Q_5Q_6$ in the flip-flops 2060, 2062 and 2096. Because of the connections to the various stages in the digital computer shown in FIGURES 51 to 61, inclusive, the shifting of information does not occur in the first block of an operation for a code of $Q_4Q_5Q_6$. After the first block of the shifting operation, a shift of one position occurs in alternate blocks. The shift occurs only in alternate blocks since the information in the accumulator has a length of only one block and the accumulator has a length of two blocks.

The shift occurs in the direction of increasing significance because of a delay of one position in the introduction of the signals to the accumulator. For example, an indication of "1" may initially appear in block 23 at position 1. During a shifting operation, the indication of "1" would appear in block 25 at position 2 and in block 27 at position 3. The shift would continue in alternate blocks until the block representing $\alpha$ coincidence is presented for computation.

Certain of the stages shown in FIGURE 52 control in part the shifting operation by controlling the operation of the flip-flops 2038 and 2040. As previously described, the flip-flops 2038 and 2040 have a code of $Q_1\overline{Q}_2$ in the first block of an operation. Normally the operations performed by the digital computer require only one block. For this reason, the flip-flop 2038 becomes triggered to its false state at the end of the first block of an operation by the passage of signals through the stages 2084, 2082, 2076 and 2074. The flip-flop 2038 becomes triggered to its false state by the passage of a signal through these stages in accordance with the logic expressed in Equation 266.

As has been previously described, signals are able to pass through the stages 2084, 2082, 2076 and 2074 for all operations except multiplication and shifting. The reason is that the operation of multiplication and shifting require more than one block. In the subsequent blocks of operations such as multiplication and shifting the flip-flops 2038 and 2040 change from a code of $Q_1\overline{Q}_2$ to $Q_1Q_2$. Since the flip-flop 2038 continues in its true state from the first block of an operation to subsequent blocks of the operation, no signal can be introduced to the right input terminal of the flip-flop 2038 during the operation of shift because of the use of a plurality of blocks in the shifting operation.

It has been described in the previous paragraph that the flip-flop 2040 becomes triggered to its true state of operation in the subsequent blocks of an operation. The flip-flop 2040 becomes triggered to its true state at these times because of the passage of signals through the "and" network 2102 in FIGURE 52. The "and" network 2102 becomes prepared for operation during the first word of an operation as represented by a code of $Q_1\overline{Q}_2$. The "and" network becomes further prepared for opening only in the operations of multiplication and shift as represented by a code of $Q_4Q_5$.

When the "and" network becomes prepared for opening, it passes the signal produced in the line 2024 at position 21 for a block. This signal is introduced from the "and" network 2102 through the "or" network 2098 and the "and" network 2100 to the left input terminal of the flip-flop 2040 so as to trigger the flip-flop to the true state of operation. The flip-flop 2040 becomes triggered to the true state of operation by the passage of signals through the stages 2102, 2098 and 2100 in accordance with the logical equation:

$$q_2=Q_4Q_5Q_1\overline{Q}_2P_{21}T \qquad (304)$$

where all of the terms have previously been defined.

When the flip-flops 2038 and 2040 become converted to a code of $Q_1Q_2$, the "and" network 2048 in FIGURE 51 becomes prepared for opening. The signals of high amplitude on the left output terminal of the flip-flop 2050 then pass through the "and" network 2048 and the "or" network 2046 to the "and" network 2052 for synchronization at optimum times in the clock cycles. The synchronized signals are introduced to the left input terminal of the flip-flop 2054 to trigger the flip-flop to the true state of operation. Signals pass through the stages 2048, 2046 and 2052 to the left input terminal of the flip-flop 2054 in accordance with the logical equation:

$$c_\beta=A_1Q_1Q_2T \qquad (305)$$

where all of the terms have previously been defined.

The "and" network 2068 in FIGURE 51 becomes prepared for opening at the same time as the "and" network 2048. When the "and" network 2068 becomes prepared for opening, the signals of high amplitude on the right output terminal of the flip-flop 2050 pass through the "and" network 2068, the "or" network 2066 and the "and" network 2070 to the right input terminal of the flip-flop 2054. These signals trigger the flip-flop 2054 to the false state of operation. Signals for triggering the flip-flop 2054 to the false state of operation pass through the stages 2068, 2066 and 2070 in accordance with the logical equation:

$$\overline{c}_\beta=\overline{A}_1Q_1Q_2T \qquad (306)$$

where all of the terms have previously been defined.

In subsequent words of an operation such as multiplication or shift, the flip-flop 2054 becomes triggered in a pattern corresponding to the indications recirculating in the accumulator to the read head 2646. In this way, the flip-flop 2054 provides a delay of one position in the information recirculating in the accumulator. After being delayed by one position, the signals are introduced to the flip-flop 2326 through certain stages shown in FIGURE 56. These stages include the "and" network 2334 in FIGURE 56.

Because of the coding of $Q_1Q_2$, the "and" network 2334 can become opened only in the blocks of an operation subsequent to the first block. Signals are able to pass through the "and" network 2334 only during the operations of multiplication and shift because of the introduction of high voltages from the left output terminals of the flip-flops 2060 and 2063 to represent a coding of $Q_4Q_5$. The "and" network 2334 becomes prepared for opening only upon the introduction of a signal from the "or" network 2336. A signal is able to pass through the "or" network 2336 at all times during the operation of shift since a voltage of high amplitude is introduced to the "or" network from the left output terminal of the flip-flop 2096.

Upon becoming prepared for opening, the "and" network 2334 passes the signals of high amplitude on the left output terminal of the flip-flop 2054. These signals pass through the "and" network 2334, the "or" network 2330 and the "and" network 2332 to the left input terminal of the flip-flop 2326 and trigger the flip-flop to the true state of operation. Triggering signals pass through the stages 2336, 2334, 2330 and 2332 to the left input terminal of the flip-flop 2326 in accordance with the logical equation:

$$a_5 = Q_4 Q_5 Q_1 Q_2 C_\beta (\overline{T}_2 + \overline{P}_{20} + Q_6) T \qquad (307)$$

where all of the terms involved in the operation of shift have previously been defined.

The "and" network 2354 becomes prepared for opening during the operation of multiplication and shift in blocks subsequent to the first block of the operation. When the "and" network 2354 becomes prepared for opening, it passes the signals of high amplitude on the right output terminal of the flip-flop 2054. The signals passing through the "and" network 2354 are introduced through the "or" network 2362 to the "and" network 2364 for synchronization at optimum times in the clock cycles. The signals then pass to the right input terminal of the flip-flop 2326 to trigger the flip-flop to the false state of operation. The logic controlling the passage of triggering signals through the stages 2354, 2362 and 2364 can be expressed as:

$$\overline{a}_5 = Q_4 Q_5 Q_1 Q_2 \overline{C} T \qquad (308)$$

where all of the terms have previously been defined.

MULTIPLICATION

Multiplication is another type of operation which can be performed by the digital computer. In the operation of multiplication new techniques are used to minimize the number of stages required. These new techniques will be described in detail subsequently. The operation of multiplication can perhaps best be seen from several examples which are shown in FIGURE 62. These examples involve the combinations of a multiplicand having positive or negative polarities and a multiplier having positive or negative polarities. Multipliers and multiplicands having a negative polarity are represented in a complemented form with respect to quantities having a positive polarity. These complemented values are obtained by inverting the signal indications representing the positive quantity and adding an indication of "." to the least significant digit of the complemental value. For example, in a first example in FIGURE 62, positive multiplicand and a positive multiplier are combined. In a second example in FIGURE 62, the multiplicand and multiplier are both negative. The multiplicand is negative and the multiplier is positive in a third example in FIGURE 62 and the multiplicand is positive and the multiplier is negative in a fourth example in that figure.

In the first example shown in FIGURE 62, a multiplicand having a positive polarity is combined with a multiplier having a positive polarity. Since the multiplier has a positive polarity an indication of "0" is provided at the extreme left position in FIGURE 62 to represent the polarity of the multiplier. This corresponds to the position of greatest significance. Because of an indication of "0" in the sign position for the multiplier, values of "0" in each position for the multiplicand are combined with the value in the accumulator. Since the accumulator initially has a value of "0," the result after the first cycle of operation is still "0." This is indicated in the first position in the column at the extreme right of FIGURE 62.

As the result in the first cycle of computation is being obtained, the indications representing the result are shifted one position toward the left. This constitutes a shift in the direction of increased significance and causes a blank position to be available in the position of least significance. By the operation of stages which will be described in detail subsequently, an indication of "0" is automatically inserted into the blank space constituting the position of least significance. This may be seen in FIGURE 62 by a comparison of the first indications in the column at the extreme right designated "Result" and the second indications in the column designated "Accumulator."

For a positive quantity, the result obtained from the first cycle of operation is "0" in each position. This quantity may be designated as the first interim result. When the indication of the multiplier in the next position is "1," the multiplicand is added to the first interim result. This is indicated at step two in the first example shown in FIGURE 62. Since the first interim result has one more digit than the multiplicand, the indication in the position of greatest significance for the multiplicand is stepped one position to the left. In the first example shown in FIGURE 52, the indication in the position of greatest significance for the multiplicand is "0." For this reason, an indication of "0" is also inserted in the next position to the left. This may be seen by a comparison of the first and second indications in the column designated "Multiplicand."

The result obtained from the combination of the first interim result and the multiplicand may be designated as the second interim result. During the operation of obtaining the second interim result, the indications are shifted one position to the left. This causes the position of least significance to be available for the insertion of a binary indication. By the operation of stages which will be described subsequently, an indication of "0" is automatically inserted in the position of least significance for the second interim result.

The second interim product is recirculated without change if the next digit for the multiplier is "0." However, upon the occurrence of an indication of "1" for the next digit of the multiplier, the multiplicand is combined with the second interim result to obtain a new result. This is shown in step three of the first example in FIGURE 62. The value of the multiplicand in the third step is that obtained during the operation of step two with the position of greatest significance generated one position to the left. This may be seen by a comparison of the second and third indications in the column designated "Multiplicand" in the first example of FIGURE 62. The result obtained by the combination of the multiplicand and the second interim result represents the final result in the first example shown in FIGURE 62. This result has a digital value of three and a positive polarity. The result obtained is correct since it involves the product of a positive multiplicand having a digital value of one and a positive multiplier having a digital value of three.

In the second example shown in FIGURE 62, a negative multiplicand having a value of three is combined with a negative multiplier having a value of one. As previously described, negative quantities are represented by an indication of "1" in the position of greatest significance corresponding to the position at the extreme left in FIGURE 62. Since the multiplier has an indication of "1" in the position of greatest significance, the multiplicand is complemented in the first cycle of operation and the complemented number is inserted into the accumulator to obtain the first interim result. Since the value of the multiplicand is "101," the complemented value of the multiplicand becomes "011." The complementation can be obtained in a manner similar to that described above and expressed logically in Equations 295, 296 and 297. The complemented number then becomes the first interim result because of the value of "0" initially in the accumulator.

Since this quantity is shifted one position to the left, an indication of "0" is inserted in the blank space at the right, corresponding to the position of least significance. Even though the multiplier is negative, no further complementation is made after the first cycle of operation. Thus, the value of the multiplicand is combined directly with the first interim product when an indication of "1" occurs in the second digit for the multiplier. Since the multiplicand has one digit less than the number of digits in the first interim product, the indication for the multiplicand in the position of greatest significance is generated one position to the left. This causes an indication of "1" to be generated in the position at the extreme left of the multiplicand in step two of the second example shown in FIGURE 62. This may be seen by a comparison of the first and second indications for the second example in the column designated as "Multiplicand."

The result obtained from the combination of the first interim result and the multiplicand is designated as the second interim result. As the second interim result is being obtained, it is shifted one position to the left so as to leave vacant the position of least significance. An indication of "0" is automatically inserted into the position of least significance in a manner similar to that described above. An indication of "1" is also inserted into the position of greatest significance for the multiplicand will appear in a number of digits corresponding to the number of digits in the second interim product. The values of the second interim result and the multiplicand are then combined to obtain the final result. As will be seen, the final product in the second example corresponds to the final product in the first example. This is correct since the combination of two negative numbers should give a positive number and the magnitudes of the two numbers being multiplied in the second example correspond to the magnitudes of the two numbers multiplied in the first example.

In the third example, a negative value of "3" for the multiplicand is combined with a positive value of "1" for the multiplier. Since the multiplier is positive, an indication of "0" appears in the position of greatest significance for the multiplier. Because of this indication of "0" in the position of greatest significance for the multiplier the value of "0" initially in the accumulator continues as the value representing the first interim result. The first interim result continues unchanged as the second interim result if the value of the multiplier in the second digit is "0." However, the multiplicand is combined with the first interim result when the binary value of the multiplier in the second digit is "1."

In the third example shown in FIGURE 62, the indications representing the first interim result continue as the second interim result since the binary value of the multiplier in the second digit is "0." In this way, a value of "0" is obtained as the second interim result and is stored in the accumulator. This value is then combined with the indications representing the multiplicand to obtain the final result. In obtaining the final result, the binary value of the multiplicand in the position of greatest significance is generated in the positions to the left, as shown in step three of the third example in FIGURE 62. Because of an indication of "1" for the multiplicand in the position of greatest signifiance, indications of "1" are generated in the two positions to the left of this position of greatest significance to obtain the final result. Since the final product has a negative value of three, the results obtained by the multiplication of −3 and +1 are correct.

The fourth example shown in FIGURE 62 represents the combination of a positive value of +3 for the multiplicand and a negative value of −1 for the multiplier. Since the multiplier has a negative value an indication of "1" appears in the digit of greatest significance for the multiplier. This causes the indication representing the multiplicand to be complemented and the complemented value to be combined with the indications of "0" initially in the accumulator. The resultant value of "101" is designated as the first interim result. During the combination to obtain the first interim result, the indications representing the first interim result are shifted one position to the left so as to leave blank the position of least signifiance. An indication of "0" is automatically inserted into this position so as to produce indications of 1010, where the least significant digit is at the right. These indications appear in the accumulator at the beginning of step 2.

Since the multiplier also has a binary value of "1" in the second digital position, the value of the multiplicand is combined with the first interim product. The original value of the multiplicand is used instead of the complemented value since the complemented value is required only in the first step of the operation. In obtaining the value of the multiplicand used in the step, the indication in the position of greatest significance is generated one position to the left. In the fourth example shown in FIGURE 62 an indication of "0" is generated one position to the left since the multiplicand has a positive polarity.

The results obtained from the combination of the first interim result and the multiplicand may be designated as the second interim result. Because of the binary value of "1" in the third digital position of the multiplier the second interim result is combined with the value of the multiplicand. In this value of the multiplicand, the indication of "0" in the position of greatest significance is generated still one more position to the left. The indications obtained from the combination of the second interim result and the multiplicand may be designated as the final result. In the fourth example shown in FIGURE 62, the final result has a magnitude of "−3" and a negative polarity. This is the proper result for the multiplication of values of "+3" and "−1."

FIGURE 63 shows the operation of the multiplier in simplified block form. FIGURE 64 indicates how the information representing the multiplicand, the multiplier and the product circulate so as to be presented at the proper times for computation. Only three positions are shown for each block in FIGURE 64 to provide a simplified presentation of the circulating information. Since only three positions are shown for each block, the multiplier and multiplicand are provided with values which can be indicated in three positions. However, it should be appreciated that the operation of blocks with twenty-one positions would be similar to the blocks shown in FIGURE 64 with three positions. It is believed that a person skilled in the art would be able to extrapolate the operation of the blocks shown in FIGURE 64 to blocks with 21 positions or any other number of positions.

As shown in FIGURE 64, in a block designated as "$n$" the indications representing the multiplier are first transferred to a register resignated as the accumulator and indicated in block form at 2600 in FIGURE 63. The information representing the multiplier is inserted into the accumulator on a sequential basis through the flip-flop 2326 (also shown in FIGURE 56). The combination representing the multiplier is designated as $b_1b_2b_3$, where the least significant digit is at the right.

In the next block designated as "$n+1$," the information inserted into the first half of the accumulator travels through the second half of the accumulator so as to be presented to the read flip-flop 2050. When the subsequent block designated as "$n+2$" is presented for computation, the information is read by the flip-flop 2050 and is transferred from this flip-flop to the record flip-flop 2326 so as to be inserted again into the accumulator 2600. In this way, the indications designated as $b_1b_2b_3$ to represent the multiplier are recirculated through the accumulator without any shift in the positions occupied by these indications. The indications representing the multiplier travels from the first half of the accumulator 2600 to the second half of the accumulator 2600 in the odd blocks after the "$n$" block and becomes reintroduced to the first half of the accumulator in the even blocks after the "$n$" block.

As will be seen in FIGURE 64, the indication $b_1$ in the position of greatest significance for the multiplier becomes transferred to the $Q_3$ flip-flop 2090 in the last position of the even blocks after the "$n$" block. This indication of $b_1$ represents the polarity of the multiplier.

The indication of $b_1$ then remains in the $Q_3$ flip-flop 2090 during the presentation of every odd block after the "*n*" block until the past position of the odd block is presented for computation. At the last position in the odd blocks, the $Q_3$ flip-flop 2090 becomes triggered to its false state of operation to await the $b_1$ indication at the last position of the next even block.

Upon the presentation of a block designated as the "$n+2m$" block in FIGURE 64, coincidence designated previously as $\beta$ coincidence occurs. This coincidence occurs when a particular block specified in coded form in the instruction circulating in the track 2002 is presented for computation. This coincidence controls the initiation of a new operation. At the block representing $\beta$ coincidence, the $b_1b_2b_3$ indications representing the multiplier are reintroduced to the accumulator for circulation through the accumulator. This causes the $b_1b_2b_3$ indications to circulate through the accumulator during the $\beta+1$ block so as to be read by the coil 2050 during the $\beta+2$ block.

In the first block after the $\beta$ coincidence, the operation of multiplication is actually commenced. As a first step in the operation, the information representing the multiplicand is transferred through the $d_2$ flip-flop 2322 (also shown in FIGURE 57) to a register designated as the D register in FIGURE 63 and indicated in block form at 2602. The information representing the multiplicand may be designated as $d_1d_2d_3$, where the least significant digit is at the right.

Then the $\beta$ coincidence occurs, the $b_1$ digit representing the sign of the multiplier is transferred to the $Q_3$ flip-flop 2090. The sign digit remains in the $Q_3$ flip-flop during the first block after the $\beta$ coincidence (the $\beta+1$ block) and is used to control the first step of the multiplication similar to the first steps shown in the examples of FIGURE 62. Since each digit of the multiplier is no longer needed after it has been used to control the combinations for obtaining the interim results, the digits do not have to be recirculated after they have been used. For this reason, the $b_1$ digit is not re-circulated in the $\beta+1$ block.

In the $\beta+1$ block, a combination of the multiplicand with the indications in the accumulator is obtained in accordance with the binary value of the $b_1$ digit. If the $b_1$ digit is "0," the value of "0" in the accumulator is combined with a value of "0" representing the multiplicand to obtain a value of "0" for each position for the first interim result. If the binary value of the $b_1$ digit is "1," the $d_1d_2d_3$ indications representing the multiplicand are complemented and are combined with the indications of "0" in the accumulator to obtain the first interim result. Indications of "0" are read by the head 2050 from the accumulator during the presentation of the $\beta+1$ block for computation since the $b_2b_3$ indications representing the multiplier are circulating from the first half of the accumulator to the second half of the accumulator during this block.

In the $\beta$ and $\beta+1$ blocks, the indications representing the multiplier are circulating without any shift in position In the subsequent blocks, the indications representing the multiplier are circulated with a shift of one position in alternate blocks. This shift is accomplished by using the flip-flop 2050 to read the information in the accumulator 2600 and then transferring the information read by the flip-flop 2050 to the flip-flop 2054. The information transferred to the flip-flop 2054 then passes to the flip-flop 2326 for introduction once again to the accumulator 2600. A shift of one position occurs only in alternate blocks since the accumulator 2600 has a length of two blocks.

In the $\beta+1$ block and in alternate blocks after the $\beta+1$ block, the information relating to the multiplicand becomes presented to the flip-flop 2322 (also shown in FIGURE 57) so as to be inserted once again into the register 2602. Every time that the information relating to the multiplicand is inserted into the register 2602, the sign digit of the multiplicand becomes generated an extra position in the direction of increasing significance. This actually occurs in the first positions of the even numbered blocks after the block of $\beta$ coincidence. For example, the sign digit $d_1$ is propagated one digit to the left in the $\beta+4$ block to obtain the digit $d_1'$. The indication of $d_1'$ is repeated at position 1 of the $\beta+6$ block and at position 2 the sign digit is generated in the next position of increasing significance. This is represented by an indication of $d_1''$ at position 2 of the $\beta+6$ block.

It will be seen that the indications representing the multiplicand become generated an extra position to the left every time that the indications are presented after the $\beta+2$ block. As previously described, the indications representing the product have an increased length of one digit every time that an interim result is combined with the multiplicand in a cycle of computation. This may be seen from the fact that the $a_3$ indication occurs at the same time that the $d_3$ indication in the $\beta+2$ block. However, the $a_4$ indication occurs at the same time as the $d_3$ indication in the $\beta+4$ block. In the $\beta+6$ block, the $a_5$ indication occurs at the same time as the $d_3$ indication. A shift is made in the indications representing the interim result with respect to the indications representing the multiplicand since digits of decreasing significance in the multiplier control the combination of the multiplicand and the interim result in the successive cycles of computation.

It should be appreciated that the $a_1a_2a_3$ indications in one cycle of computation do not necessarily correspond to the $a_1a_2a_3$ indications in the other cycles of computation. For example, the $a_1a_2a_3$ indications recorded in the $\beta+3$ and $\beta+4$ blocks may be different from the $a_1a_2a_3$ indications recorded in the $\beta+1$ block of the binary value of the $b_2$ indication is "1." In this sense, the indications such as $a_1a_2a_3$ are intended to represent the digital positions of the various indications stored in the accumulator and are not intended to represent actual values. However, the $d_1d_2d_3$ indications circulating in the D register 2602 and the $b_1b_2b_3$ indications circulating in the accumulator remain the same during successive cycles of computation.

Successive digits of the multiplier become transferred to the flip-flop 2090 in the past position of alternate blocks after the block of $\beta$ coincidence. For example, the $b_1$ indication corresponding to the digit of greatest significance in the multiplier becomes stored in the flip-flop 2090 in the last position of the block representing $\beta$ coincidence. This indication remains in the flip-flop 2090 during the presentation of the $\beta+1$ block so as to control the transfer of the complemented value of the multiplicand to the accumulator. In the last position of the $\beta+2$ block, the $b_2$ indication in the digit of second greatest significance for the multiplier becomes transferred to the flip-flop 2090. This indication remains in the flip-flop 2090 during the presentation of the $\beta+3$ block so as to control the combination of the multiplicand and the first interim result in obtaining the second interim result. The $b_3$ indication becomes transferred to the flip-flop 2090 in the last position of the $\beta+4$ block and remains in the flip-flop during the presentation of the $\beta+5$ block so as to control the combination of the multiplicand and the second interim result.

The combination of the multiplicand and the value in the accumulator 2600 continues in successive blocks until one of two alternatives occur. In one alternative, all of the digits of the multiplier become used and become converted into indications of "0" as they become used. After all of the indications in the multiplier have been used, no further multiplication can occur. During the presentation of subsequent blocks for computation, the information representing the product becomes shifted in the accumulator in alternate blocks without any changes in the indications.

By properly coding the various blocks the operation of multiplication can continue until at least all of the digits in the multiplier have been used and converted into indications of "0." As soon as all of the digits in the multiplier have been used, the block representing a coincidence is presented to discontinue the operation of multiplication. The operation of multiplication is stopped upon the occurrence of $\alpha$ coincidence since information representing the next instruction becomes inserted into the track 2002. In this way, the blocks are coded so that the operation of multiplication will continue only for a number of blocks dependent upon the number of digital positions representing the multiplier.

When the block representing $\alpha$ coincidence is presented for computation, the shifting of the information in the accumulator continues through one more cycle of operation so as to bring the information into the proper position for use. The shifting continues through the flip-flop 2054 until the last position in the block representing $\alpha$ coincidence is presented for computation. In the last position of the block representing $\alpha$ coincidence the $a_1$ signal in the position of greatest significance for the product becomes transferred from the flip-flop 2054 back into the accumulator 2600. At the same time, the flip-flop 2054 becomes triggered to the false state of operation and remains in this false state of operation during the subsequent blocks. In this way, no further delay of the information in the accumulator can be obtained.

During the block representing $\alpha$ coincidence, the information relating to the product becomes shifted into the proper position for use. The information must become shifted into the proper position since the information is stored in more positions than are capable of being used. For example, in blocks having three positions such as in the example shown in FIGURE 64, the information stored in the accumulator may occupy five positions. Since the blocks have only three positions, the indications in the three positions of greatest significance must be used and the indications in the remaining two positions must be discarded. The indications in the three positions of greatest significance become shifted into the proper position for use at the last position of the $\alpha+1$ block. These indications are then read sequentially out of the accumulator during the $\alpha+2$ block.

The operation of the stages shown in FIGURES 51 to 61, inclusive, to obtain the product of two numbers will now be discussed. As a first step, the indications representing the multiplier are first transferred from one of the tracks of the drum to the accumulator provided in the track 2002 in accordance with the logic set forth in Equations 285 and 286. This has been described fully above. After the indications representing the multiplier become transferred to the accumulator, they circulate in the accumulator in accordance with the logic expressed in Equations 287 and 288. In this way, the information representing the multiplier is available when the information representing the multiplicand becomes inserted into the register 2602 in FIGURE 64 at a subsequent block.

The information representing the multiplicand is inserted into the register 2602 upon the occurrence of a block representing $\beta$ coincidence. As previously described, $\beta$ coincidence occurs when the block being presented for computation corresponds to the block specified in positions 10 to 16, inclusive of the instruction circulating in the track 2002. During the presentation of the block representing $\beta$ coincidence, the flip-flops 2038 and 2040 have a coding of $\overline{Q}_1\overline{Q}_2$ in order to provide for a circulation of the instruction in the track 2002. The flip-flops 2060, 2062 and 2096 have a coding of $Q_4Q_5\overline{Q}_6$ at this time since the operation specified in positions 18, 19 and 20 of the instruction is that of multiplication.

Upon the occurrence of the block representing $\beta$ coincidence for an operation of multiplication, the "and" network 2354 in FIGURE 56 becomes prepared for opening. The "and" network 2354 actually opens only in positions 20 and 21 of the block representing $\beta$ coincidence since it receives signals through the "or" network 2356 from the lines 2024 and 2128. The signals passing through the "and" network 2354 are introduced through the "or" network 2362 and the "and" network 2364 to the right input terminal of the flip-flop 2326 to trigger the flip-flop for the production of a relatively high voltage on the right output terminal of the flip-flop. A relatively high voltage is produced on the right output terminal of the flip-flop 2326 by the passage of signals through the stages 2354, 2362 and 2364 in accordance with the logical equation:

$$\overline{a}_5=Q_4Q_5\overline{Q}_6\overline{Q}_1\overline{Q}_2C_\beta P_{20/21}T \quad (309)$$

where $P_{20/21}$=a signal from the "or" network 2356 to represent positions 20 and 21 for each block; and the other terms have previously been defined.

It will be seen from the discussion in the previous paragraph that triggering signals are introduced to the flip-flop 2326 at positions 20 and 21 of the block representing $\beta$ coincidence. This causes the flip-flop 2326 to operate in its false state in the last position of the $\beta$ block and in the first position of the $\beta+1$ block. This is in accordance with the example shown in FIGURE 64 since FIGURE 64 indicates that the $A_5$ flip-flop 2326 becomes triggered to the false state of operation at position 3 (the last position) of the $\beta$ block and at position 1 of the $\beta+1$ block. The flip-flop 2326 becomes triggered to the false state of operation at the last position of the $\beta$ block so as to remove the indication of greatest significance in the multiplier. This corresponds to the $b_1$ indication in the example shown in FIGURE 64. The indication in the position of greatest significance is removed from the multiplier since that indication is stored in the flip-flop 2090 to control the first cycle of operation by which the first interim result is obtained.

It will be seen from the example shown in FIGURE 64 that the flip-flop 2326 remains in its false state of operation during all of the positions of the $\beta+1$ block and in the first position of the $\beta+2$ block. The "and" network 2358 is included in FIGURE 56 to insure that the flip-flop 2326 remains in its false state of operation during all of the positions of the $\beta+1$ block. This results from the coding of $Q_1\overline{Q}_2$ and $Q_4Q_5\overline{Q}_6$ for controlling the passage of signals through the "and" network 2358. This coding indicates that the "and" network 2358 passes a signal during the first block of an operation involving multiplication and in all of the positions of this block. The signals passing through the "and" network 2358 are introduced through the "or" network 2362 and the "and" network 2364 to the right input terminal of the flip-flop 2326 to maintain the flip-flop in the false state of operation. Signals pass through the stages 2358, 2362 and 2364 in accordance with the logical equation:

$$\overline{a}_5=Q_4Q_5\overline{Q}_6Q_1\overline{Q}_2T \quad (310)$$

where all of the terms have previously been defined.

During the presentation of the $\beta+1$ block, the information passing through the cathode followers 2242 and 2244 to represent the multiplicand are introduced to the flip-flop 2322 in FIGURE 57 so as to trigger the flip-flop into a corresponding pattern of operation. The signals from the cathode follower 2242 are introduced to the "and" network 2372 in FIGURE 57. The "and" network 2372 can become prepared for opening only in the first block of an operation because of its connections to the flip-flops 2038 and 2040 in a pattern corresponding to $Q_1\overline{Q}_2$. The "and" network 2372 is able to become open in the first block of an operation involving multiplication because of the introduction of signals to the "and" network through the "or" network 2370 from the "and" network 2368, which is coded in a pattern corresponding to $Q_4Q_5\overline{Q}_6$.

The signals from the "and" network 2372 pass through the "or" network 2374 to the "and" network 2376 for synchronization at optimum times in the clock cycles. The signals then pass to the left input terminal of the flip-flop 2322 to trigger the flip-flop to the true state of operation. The logic for controlling the passage of signals through the stages 2368, 2370, 2372, 2374 and 2376 to the left input terminal of the flip-flop 2322 may be expressed as:

$$d_2 = Q_4Q_5\overline{Q}_6Q_1\overline{Q}_2LT \qquad (311)$$

where $d_2$=the introduction of a triggering signal to the left input terminal of the flip-flop 2322; and the other terms have previously been defined.

The "and" network 2388 becomes prepared for opening at the same time as the "and" network 2372. When the "and" network 2388 becomes prepared for opening, it passes the signals representing indications to "0" from the cathode follower 2244. These signals pass through the "or" network 2382 and the "and" network 2380 to the right input terminal of the flip-flop 2322 and trigger the flip-flop to the false state of operation. The flip-flop 2322 becomes triggered to the false state of operation by the passage of signals through the stages 2368, 2370, 2388, 2382 and 2380 in accordance with the logical equation:

$$\overline{d}_2 = Q_4Q_5\overline{Q}_6Q_1\overline{Q}_2\overline{L}T \qquad (312)$$

where $\overline{d}_2$=the introduction of a triggering signal to the right input terminal of the flip-flop 2322; and the other terms have previously been defined.

It will be seen from the logic expressed in Equations 311 and 312 that the flip-flop 2322 becomes triggered to a pattern corresponding to the pattern of indications in the cathode followers 2242 and 2244. The signals produced in the flip-flop 2322 then become transferred to the flip-flop 2314 in FIGURE 55 so as to become recorded by the coil 2317 in the track 2002. The indications recorded in the track 2002 have a pattern corresponding to the pattern of the signals originally introduced to the cathode followers 2242 and 2244.

The signals of high amplitude on the left output terminal of the flip-flop 2322 pass through the "and" network 2312 in FIGURE 55 to the left input terminal of the flip-flop 2314. The signals are able to pass through the "and" network 2312 only during the operation of multiplication because of the introduction to the "and" network of signals having a coding of $Q_4Q_5\overline{Q}_6$. The signals are able to pass through the "and" network 2312 to the left input terminal of the flip-flop 2314 during first and subsequent blocks of an operation involving multiplication since the "and" network is connected to the left output terminal of the flip-flop 2038 and is not connected to the flip-flop 2040.

The signals from the "and" network 2312 trigger the flip-flop 2314 to the true state of operation so that indications of "1" are recorded by the coil 2302 in the track 2002. Indications of "1" are recorded in the track 2002 by the passage of signals through the "and" network 2312 in accordance with the logical equation:

$$d_0 = Q_4Q_5\overline{Q}_6Q_1D_2T \qquad (313)$$

where $d_0$=the introduction of a triggering signal to the left input terminal of the flip-flop 2314; and the other terms have previously been defined.

The "and" network 2320 in FIGURE 55 becomes prepared for opening at the same time as the "and" network 2312. When the "and" network 2320 becomes prepared for opening the signals of high amplitude on the right output terminal of the flip-flop 2322 pass through the "and" network 2320 and the "or" network 2318 to the "and" network 2316. The signals are introduced at optimum times in the clock cycles from the "and" network 2316 to the right input terminal of the flip-flop 2314 so as to trigger the flip-flop to the false state of operation.

Since a relatively low voltage is produced on the left output terminal of the flip-flop 2314 in the false state of operation of the flip-flop, indications of "0" are recorded by the coil 2302 in the track 2002. Indications of "0" are recorded in the track 2002 by the passage of signals through the stages 2320, 2318 and 2316 in accordance with the logical equation:

$$\overline{d}_0 = Q_4Q_5\overline{Q}_6Q_1\overline{D}_2T \qquad (314)$$

where $\overline{d}_0$=the introduction of a triggering signal to the right input terminal of the flip-flop 2314; and the other terms have previously been defined.

It has been previously described that the polarity of the multiplier is indicated in the position of greatest significance and that this indication is introduced to the flip-flop 2090 at the end of the block representing $\beta$ coincidence. This may be seen from the example shown in FIGURE 64. Certain stages shown in FIGURE 53 control the introduction to the flip-flop 2090 of the signals representing the polarity of the multiplier. These stages include the "and" network 2134 in FIGURE 53.

The "and" network 2134 in FIGURE 53 becomes prepared for opening in the operation of multiplication and shift because of the introduction of signals to the "and" network from the flip-flops 2060 and 2062 in accordance with a coding of $Q_4Q_5$. The "and" network 2134 can further become prepared for opening only during the block representing $\beta$ coincidence. This results from the introduction of a relatively high voltage to the "and" network from the left output terminal of the flip-flop 2054 during a coding of $\overline{Q}_1\overline{Q}_2$. As previously described, the coding of $\overline{Q}_1\overline{Q}_2$ controls the circulation of information in the instruction register provided in the track 2002.

The "and" network 2134 can become opened only at position 20 for the block representing $\beta$ coincidence in an operation of multiplication or shift. This results from an introduction to the "and" network 2134 of a signal from the line 2128 extending from the block **230*a*. When the "and" network 2134 becomes prepared for opening, it passes the signals of high amplitude on the left output terminal of the flip-flop 2050. As previously described, signals are produced on the left output terminal of the flip-flop 2050 in accordance with the pattern of the indications circulating in the accumulator provided in the track 2002**.

The signals of high amplitude on the left output amplitude of the flip-flop 2050 pass through the "and" network 2134, the "or" network 2130 and the "and" network 2132 to the left input terminal of the flip-flop 2090 and trigger the flip-flop to the true state of operation. The flip-flop 2090 becomes triggered to the true state of operation by the passage of signals through the stages 2134, 2130 and 2132 in accordance with the logical equation:

$$q_3 = Q_4Q_5\overline{Q}_1\overline{Q}_2CA_4P_{20}T \qquad (315)$$

where all of the terms have previously been defined.

The "and" network 2139 also becomes prepared for opening at position 20 of a block representing $\beta$ coincidence during the operations of multiplication and shift. When the "and" network 2139 becomes prepared for opening, it passes the signals of high amplitude on the right output terminal of the flip-flop 2050. These signals indicate at position 20 a positive polarity for the multiplier. The signals passing through the "and" network 2139 are introduced through the "or" network 2146 and the "and" network 2148 to the right input terminal of the flip-flop 2090 so as to trigger the flip-flop to the false state of operation. Signals pass through the stages 2139, 2146 and 2148 in accordance with the logical equation:

$$\overline{q}_3 = Q_4Q_5\overline{Q}_1\overline{Q}_2C\overline{A}_4P_{20}T \qquad (316)$$

where all of the terms have previously been defined.

In accordance with the logic expressed in Equations 315 and 316, the flip-flop 2090 becomes triggered in the block representing $\beta$ coincidence to indicate the polarity of the multiplier. The flip-flop 2090 becomes triggered to the true state of operation to indicate a multiplier having a negative polarity and becomes triggered to the false state of operation to indicate a multiplier having a positive polarity. As previously described and as indicated in the examples shown in FIGURE 62, the accumulator continues to indicate a value of "0" when the multiplier has a negative polarity. This causes signals to pass through the "and" network 2482 in FIGURE 60 during the first block of an operation involving multiplication. The signals from the "and" network 2482 pass through the "or" network 2474 and the "and" network 2476 to the right input terminal of the flip-flop 2426 so as to trigger the flip-flop to the false state of operation. Since the flip-flop 2426 becomes triggered to the false state of operation, a relatively low voltage is produced on the left output terminal of the flip-flop. This voltage is introduced to the coil 2446 (FIGURE 59) such that indications of "0" are recorded by the coil in the track 2002. Indications of "0" are recorded in the track 2002 by the passage of signals through the stages 2482, 2474 and 2476 in accordance with the logical equations:

$$\overline{a}_0=Q_4Q_5\overline{Q}_6Q_1\overline{Q}_2\overline{Q}_3T \quad (317)$$

where all of the terms have previously been defined.

It has been previously described that the multiplicand is complemented when the polarity of the multiplier is negative. The complementation occurs in a manner similar to that described above and expressed logically in Equations 295, 296 and 297. The complementation occurs by triggering the carry flip-flop 2394 in FIGURE 58 to the true state of operation when the first indication of "1" occurs in the multiplicand. The carry flip-flop 2394 then remains true for the remainder of the block. The complemented number is obtained by combining the binary value of the multiplicand and the carry in each position without permitting any overflows to be obtained from each position to the next position.

In the first block of an operation of multiplication, the carry flip-flop 2394 becomes triggered to its true state by the passage of a signal through the "and" network 2400 in FIGURE 58. The "and" network 2400 is able to pass a signal only in the first block of an operation of multiplication because of the coding of $Q_1\overline{Q}_2$ provided by the flip-flops 2038 and 2040 and the coding of $Q_4Q_5\overline{Q}_6$ provided by the flip-flops 2060, 2062 and 2096. A signal is able to pass through the "and" network 2400 only for a multiplicand of negative polarity because of the introduction to the "and" network of the voltage on the left output terminal of the flip-flop 2090.

When the "and" network 2400 becomes prepared for opening, it passes the signals of high amplitude on the left output terminal of the flip-flop 2322. These signals represent indications of "1" for the multiplicand in the different positions. These signals pass into the "and" network 2400, the "or" network 2404 and the "and" network 2406 to the left input terminal of the flip-flop 2394 so as to trigger the flip-flop to the true state of operation. The flip-flop 2394 receives at its left input terminal the signals passing through the stages 2400, 2404 and 2406 in accordance with the logical equation:

$$c_4=Q_4Q_5\overline{Q}_6Q_1\overline{Q}_2Q_3D_2T \quad (318)$$

where all of the terms have previously been defined.

It should be appreciated that the flip-flop 2394 becomes triggered to its true state only by the first indication of "1" from the flip-flop 2322 since the flip-flop 2394 then remains in its true state for the remainder of the block.

The complementation of the multiplicand in the first cycle of operation is actually controlled by the operation of certain stages shown in FIGURES 59 and 60. The stages shown in FIGURE 59 include the "and" network 2438. The "and" network 2438 is able to become opened only for an operation of multiplication since it receives a coding corresponding to $Q_4Q_5\overline{Q}_6$ from the flip-flops 2060, 2062 and 2096. The "and" network 2438 is able to become opened in the first and subsequent blocks of this operation since it is connected to the left output terminal of the flip-flop 2038 and is not connected to the flip-flop 2040. The "and" network 2038 is further able to become opened only when an operation is being performed on a signal of high amplitude from the left output terminal of the flip-flop 2090. In the first cycle of operation, such a signal indicates that the multiplier has a negative polarity.

When the "and" network 2438 becomes prepared for opening, it passes the signals introduced to it through the "or" network 2436 from the "and" networks 2428, 2430, 2432 and 2434. In the first cycle of operation, no signals can pass through the "and" networks 2428 and 2432 since binary indications of "0" appear in the accumulator for each position to indicate a decimal value of "0." Because of the indications of "0" in each position in the accumulator, the terms $D_2\overline{A}_2\overline{C}_1$ and $D_2\overline{A}_2C_1$ representing the passage of signals through the stages 2430 and 2434 can actually be simplified to $D_2\overline{C}_1+\overline{D}_2C_1$. As will be seen, this corresponds to the passage of signals through the "and" networks 2456 and 2458 during the operation of complementation described above. The passage of signals through the "and" networks 2456 and 2458 is logically expressed in Equation 295.

The signals from the "and" network 2438 are introduced through the "or" network 2442 to the "and" network 2444 for synchronization at optimum times in the clock cycles. The signals then pass to the left input terminal of the flip-flop 2426 to trigger the flip-flop to the true state of operation such that indications of "1" are recorded by the coil 2446 in the track 2002. The logic controlling the passage of signals through the stages 2448, 2442 and 2444 to the left input terminal of the flip-flop 2426 can be expressed as:

$$a_0=Q_4Q_5\overline{Q}_6Q_1Q_3(\overline{T}_2+D_2)(D_2\overline{A}_5\overline{C}_4+\overline{D}_2\overline{A}_5C_4+\overline{D}_2A_5\overline{C}_4+D_2A_5C_4)T \quad (319)$$

where all of the terms have previously been defined. The purpose of the term $(\overline{T}_2+D_2)$ in the above equation will be described in detail subsequently.

Just as signals are unable to pass through the "and" networks 2428 and 2432 in FIGURE 59 in the first cycle of an operation of multiplication, signals are unable to pass through the "and" networks 2462 and 2466 in FIGURE 60 at this time. The signals cannot pass through the "and" networks 2462 and 2466 since the flip-flop 2326 indicates the pattern of signals in the accumulator and the accumulator initially has indications of "0" in each position.

Furthermore, because of the indications of "0" initially in each position in the accumulator, the signals passing through the "and" networks 2464 and 2468 can be expressed as: $D_2C_4+\overline{D}_2\overline{C}_4$. This represents a simplification of certain terms expressed logically in Equation 292. The signals passing through the "and" networks 2464 and 2468 are introduced through the "or" network 2470 to the "and" network 2472. The "and" network 2472 is able to pass these signals in all blocks of an operation of multiplication provided that an indication of "1" is stored in the flip-flop 2090.

The signals from the "and" network 2472 pass through the "or" network 2474 and the "and" network 2476 to the right input terminal of the flip-flop 2426. These signals trigger the flip-flop 2426 to the false state of operation such that indications of "0" are recorded by the coil 2446 in the track 2002. Signals pass to the right input terminal of the flip-flop 2426 through the stages 2472, 2474, 2476, 2462, 2464, 2466, 2468 and 2470 in accordance with the logical equation:

$$\overline{a}_0=Q_4Q_5\overline{Q}_6Q_1Q_3(\overline{T}_2+D_2)(D_2A_5\overline{C}_4+\overline{D}_2A_5C_4+\overline{D}_2\overline{A}_5\overline{C}_4)T \quad (320)$$

where all of the terms have previously been defined. The purpose of the term $(\overline{T}_2+D_2)$ in the above equation will be described in detail subsequently.

A signal passes through the "and" network 2222 in FIGURE 54 at position 21 for the first block of an operation involving multiplication. The signal passes through the "or" network 2214 and the "and" network 2212 to the left input terminal of the flip-flop 2140 and triggers the flip-flop to the true state of operation. The flip-flop 2140 becomes triggered to the true state of operation by the passage of signals through the stages 2222, 2214 and 2212 in accordance with the logical equation:

$$t_2=Q_1\overline{Q}_2Q_4Q_5\overline{Q}_6P_{21}T \quad (321)$$

where all of the terms have previously been defined.

It has been previously described that the flip-flop 2038 in FIGURE 52 remains in its true state of operation during the blocks of an operation subsequent to the first blocks. This results from the inability of triggering signals to pass to the right input terminal of the flip-flop 2039 in accordance with the logic expressed in Equation 266. However, the flip-flop 2040 in FIGURE 52 becomes triggered to its true state of operation in subsequent blocks of operations involving multiplication and shift. This results from the passage of a triggering signal to the left input terminal of the flip-flop 2040 in accordance with the logic expressed in Equation 304. As a result, the flip-flops 2038 and 2040 operate in a pattern corresponding to $Q_1Q_2$ after the first blocks of operations involving multiplication or shift.

Upon the triggering of the flip-flop 2140 to the true state in the first block of an operation of multiplication, the "and" network 2234 in FIGURE 54 becomes prepared for opening. The "and" network 2234 becomes prepared for opening at this time because of the introduction of a relatively high voltage from the left output terminal of the flip-flop 2140. The "and" network 2234 becomes opened only in the subsequent blocks of an operation involving multiplication because of the coding of $Q_1Q_2$ provided by the flip-flops 2038 and 2040 and the coding of $Q_4Q_5\overline{Q}_6$ provided by the flip-flops 2060, 2062 and 2096. The "and" network 2234 is able to become opened only upon the introduction of a relatively high voltage from the right output terminal of the flip-flop 2026 to indicate that α coincidence has not occurred.

When the "and" network 2234 becomes prepared for opening during a block, a signal passes through the "and" network at position 21 for the block. The signal is then introduced through the "or" network 2236 and the "and" network 2238 to the right input terminal of the flip-flop 2140 so as to trigger the flip-flop to the false state of operation. The flip-flop 2140 becomes triggered by the passage of signals through the stages 2234, 2236 and 2238 in accordance with the logical equation:

$$\overline{t}_2=Q_1Q_2Q_4Q_5\overline{Q}_6\overline{C}_aT_2P_{21}T \quad (322)$$

where all of the terms have previously been defined.

The "and" network 2224 also becomes prepared for opening in the subsequent blocks of an operation involving multiplication until the block representing α coincidence is presented for computation. However, the "and" network 2224 can become prepared for opening only when the flip-flop 2140 is in its false state of operation. When the "and" network 2224 becomes prepared for opening during the presentation of a block for computation, it passes a signal at position 21 of the block.

The signal passing through the "and" network 2224 is introduced through the "or" network 2214 and the "and" network 2212 to the left input terminal of the flip-flop 2140 for the production of a relatively high voltage on the left output terminal of the flip-flop. A relatively high voltage is produced on the left output terminal of the flip-flop 2140 by the passage of signals through the stages 2224, 2214 and 2212 in accordance with the logical equation:

$$t_2=Q_1Q_2Q_4Q_5\overline{Q}_6\overline{C}_a\overline{T}_2P_{21}T \quad (323)$$

where all of the terms have previously been defined.

In accordance with the logic expressed in Equations 321, 322 and 323, the flip-flop 2140 becomes triggered to its true state of operation in the first block of an operation involving multiplication. The flip-flop 2140 then becomes triggered to its false state in the second block of the operation involving multiplication and to its true state in the third block of the operation. The flip-flop returns to its false state of operation in the third block of the operation and to its true state in the fourth block of the operation. In this way, the flip-flop 2140 becomes alternately triggered to the false state in the odd blocks subsequent to the first block and to the true state in the even blocks subsequent to the first block. By controlling the operation of the flip-flop 2140 in this manner, a distinction can be provided between the even blocks subsequent to the first block in the operation of multiplication and the odd blocks subsequent to the first block in the operation of multiplication. The purpose of providing such a distinction has been described previously in connection with FIGURES 62, 63 and 64 and will be described again as the operation of the certain stages is discussed.

It has previously been described that the indications in the accumulator are delayed for an operation of multiplication by one position in the blocks after the first block. The indications in the accumulator are delayed by introducing the signals from the flip-flop 2050 to the flip-flop 2054 and then from the flip-flop 2054 to the flip-flop 2326. The signals pass from the flip-flop 2050 to the flip-flop 2054 in accordance with the logic expressed in Equations 305 and 306. The signals then pass from the flip-flop 2054 to the flip-flop 2326 in accordance with the logic expressed in Equations 307 and 308.

As expressed in Equation 307, the indications of "1" are able to pass from the flip-flop 2054 to the flip-flop 2326 only when signals pass through the "or" network 2336 in FIGURE 56 to represent a proposition of $\overline{T}_2+\overline{P}_{20}+Q_6$. The term $Q_6$ insures that signals pass from the flip-flop 2054 to the flip-flop 2326 in every position during the operation of shift. The term $\overline{T}_2$ insures that the indications of "1" pass from the flip-flop 2054 to the flip-flop 2326 during the odd blocks after the first block of multiplication. As will be seen in the example shown in FIGURE 64, the signals should be introduced from the flip-flop 2054 to the flip-flop 2326 in every position during the odd blocks.

In the even blocks, the indications of "1" should pass from the flip-flop 2054 to the flip-flop 2326 in every position except position 20. At this position, the indications are transferred from the flip-flop 2054 to the flip-flop 2090 to control whether the multiplicand is combined with the interim result in the accumulator in the next cycle of operation. Indications of "1" pass from the flip-flop 2054 to the flip-flop 2326 in every position in the even blocks except position 20 in accordance with the logic represented by the term $\overline{P}_{20}$.

The failure of an indication of "1" to pass from the flip-flop 2054 to the flip-flop 2326 may be seen from the example shown in FIGURE 64. As has been described, position 2 in FIGURE 64 corresponds to position 20 in blocks having 21 positions. For example, in FIGURE 64 the indication of $b_3$ passes from the $C_\beta$ flip-flop 2050 to the $Q_3$ flip-flop 2090 at position 2 of the $\beta+2$ block but does not pass to the $A_5$ flip-flop 2326 at this position.

The "and" network 2360 in FIGURE 56 becomes activated at position 20 of the even blocks in subsequent words of multiplication so as to insure that any indication of "1" at this position become replaced by an indication of "0." A conversion is made from indications of "1" to indications of "0" at this position since a digit in the multiplier is transferred to the flip-flop 2090 at this position to control the next cycle of operation and is no longer required after it has been used. For example, the $b_1$ indication transferred to the flip-flop 2090 in the $\beta+1$ block in FIGURE 64 is prevented from circulating in the accumulator in the blocks subsequent to the $\beta+1$ block.

The signals passing through the "and" network 2360 are introduced through the "or" network 2362 and the "and" network 2364 to the right input terminal of the flip-flop 2326. This signal triggers the flip-flop 2326 to the false state of operation. Signals pass through the stages 2360, 2362 and 2364 to the right input terminal of the flip-flop 2326 in accordance with the logic expressed in the following equation:

$$\overline{a}_5=Q_4Q_5\overline{Q}_6Q_1Q_2T_2P_{20}T \qquad (324)$$

where all of the terms have previously been defined.

Indications for the successive digits in the multiplier are transferred to the flip-flop 2090 at position 20 of the even blocks in accordance with the operation of certain stages shown in FIGURE 53. These stages include the "and" network 2136 in FIGURE 53. The "and" network 2136 is able to become opened only during the operations of multiplication and shift as represented by a code of $Q_4Q_5$. The "and" network 2136 is further able to become opened only at position 20 of the even blocks because of the introduction of signals to the "and" network from the line 2128 and the left output terminal of the flip-flop 2140.

When the "and" network 2136 becomes prepared for opening, it passes the signals of high amplitude on the left output terminal of the flip-flop 2054. These signals pass through the "or" network 2130 and the "and" network 2132 and trigger the flip-flop 2090 to the true state of operation. The flip-flop 2090 becomes triggered to the true state of operation in accordance with the logical equation:

$$q_3=Q_4Q_5Q_1Q_2T_2P_{20}C_\beta T \qquad (325)$$

where all of the terms have previously been defined.

The "and" network 2144 in FIGURE 53 becomes prepared for opening at the same time as the "and" network 2136. Upon becoming prepared for opening, the "and" network 2144 passes the signals of high amplitude on the right output terminal of the flip-flop 2054. These signals pass through the "or" network 2146 and the "and" network 2148 to the right input terminal of the flip-flop 2090 and trigger the flip-flop to the false state of operation. The logic controlling the passage of signals through the stages 2144, 2146 and 2148 to the right input terminal of the flip-flop 2090 may be expressed as:

$$\overline{q}_3=Q_4Q_5Q_1Q_2T_2P_{20}\overline{C}_\beta T \qquad (326)$$

where all of the terms have previously been defined.

It will be seen from the logic expressed in Equations 325 and 326 that the indications representing successive digits in the multiplier are transferred to the flip-flop 2090 at position 20 of the even blocks in the operation of multiplication. These indications remain in the flip-flop during the next odd block of the operation to control the combination of the multiplicand and the interim result in the accumulator. The combination of the multiplicand and the interim result during the next odd block occurs only when the flip-flop 2090 has been triggered to the true state of operation by an indication of "1" in a particular one of the digits representing the multiplier. The combinations of the multiplicand and the interim result in the accumulator during the odd blocks occurs in accordance with the logic expressed in Equations 319 and 320. The combination occurs at this time because of the inclusion of the term $\overline{T}_2$ in Equations 319 and 320. As previously described in term $\overline{T}_2$ indicates the occurrence of the odd blocks of operation after the first block of an operation involving multiplication.

Actually, the combination of the multiplicand and an interim result carries over from the odd block into the first positions of the even block and in the last blocks of an operation involving multiplication may even carry over into all of the positions of the even blocks. This occurs because the sign digit of the multiplicand is generated one position to the left every time that the multiplicand is presented for computation. The sign digit of the multiplicand is generated one position to the left upon each presentation of the multiplicand for computation in accordance with the operation of certain stages shown in FIGURE 54. These stages include the "and" network 2182 in FIGURE 54. The "and" network 2182 is able to become opened only for an operation of multiplication as represented by a code of $Q_4Q_5\overline{Q}_6$ and only during the subsequent words of that operation as represented by a code of $Q_1Q_2$.

The "and" network 2182 becomes prepared for opening in every subsequent block involving multiplication until the block representing $\alpha$ (alpha) coincidence occurs. This results from the operation of the "or" network 2192. The "or" network 2192 receives a signal of high amplitude from the left output terminal of the flip-flop 2026 in every block of the operation involving multiplication until the block representing $\alpha$ coincidence occurs. The "or" network 2192 also receives a signal through the line 2035 during positions 1 to 6 of each block to insure the passage of a signal through the "or" network in case the flip-flop 2026 may become triggered to its true state during one of the first six positions for a block before the block representing $\alpha$ coincidence. The flip-flop 2026 may be at its true state in one or more of the first six positions in the block before the block representing $\alpha$ coincidence because of the operation of the "and" networks 2178 and 2180 and the logic expressed in Equations 252 and 253.

When the "and" network 2182 becomes prepared for opening, it passes the signals of high amplitude on the left output terminal of the flip-flop 2190. These signals represent indications of "1" for the value of the multiplicand circulating in the track 2002. The signals of high amplitude on the left output terminal of the flip-flop 2190 pass through the "and" network 2182, the "or" network 2194 and the "and" network 2196 to the left input terminal of the flip-flop 2176. The signals trigger the flip-flop 2176 to the true state of operation in accordance with the logic expressed in the following equation:

$$t_1=(P_{1/6}+\overline{U}\alpha)Q_1Q_2Q_4Q_5\overline{Q}_6D_1T \qquad (327)$$

where $P_{1/6}$=a signal on the line 2035 to indicate positions 1 to 6, inclusive, for each block;

$D_1$=a relatively high voltage on the left output terminal of the flip-flop 2190; and the other terms have previously been defined.

The "and" network 2204 in FIGURE 54 becomes prepared for opening at the same time as the "and" network 2182. When the "and" network 2204 becomes prepared for opening, the signals of high amplitude on the right output terminal of the flip-flop 2190 pass through the "and" network. These signals represent the indications of "0" in the different digits for the multiplicand. The signals pass from the "and" network 2204 through the "or" network 2206 and the "and" network 2208 to the right input terminal of the flip-flop 2176. These signals trigger the flip-flop 2176 for the production of a relatively high voltage on the right output terminal of the flip-flop. A relatively high voltage is produced on the right output terminal of the flip-flop 2176 by the passage of signals through the stages 2204, 2206 and 2208 in accordance with the logical equation:

$$\overline{t}_1=(P_{1/6}+\overline{U}\alpha)Q_1Q_2Q_4Q_5\overline{Q}_6\overline{D}_1T \qquad (328)$$

where $\overline{D}_1$=a relatively high voltage on the right output terminal of the flip-flop 2190; and the other terms have previously been defined.

It has previously been described that the indications representing the multiplicand pass through the flip-flop 2322 to the flip-flop 2314 so as to be recorded in the D register 2602 provided in the track 2002. The indications representing the multiplicand pass through the flip-flops 2322 and 2314 during the first block of the operation involving multiplication. The indications representing the multiplicand are inserted into the D register 2602 in accordance with the logic expressed in Equations 311 and 312.

After the indications representing the multiplicand have been inserted into the D register 2602 in the first block of an operation involving multiplication, they recirculate through the register in the subsequent blocks of operation in accordance with the operation of certain stages shown in FIGURE 57. These stages include the "and" network 2362 in FIGURE 57.

The "and" network 2362 in FIGURE 57 becomes prepared for opening only during the operations of multiplication and shift, as represented by a code of $Q_4Q_5$ and only during the subsequent blocks of these operations as represented by a code of $Q_1Q_2$. The "and" network 2362 can become prepared for opening only in the odd blocks after the first block in the operation of multiplication because of the introduction of a relatively high voltage to the "and" network from the right output terminal of the flip-flop 2140. Since the D register 2602 has a length of approximately two blocks, the information in the D register actually becomes available for recirculation through the flip-flop 2322 only in the odd blocks.

Upon becoming prepared for opening, the "and" network 2362 passes the signals of high amplitude on the left output terminal of the flip-flop 2190. These signals represent indications of "1" in the different positions for the multiplicand. The signals pass through the "and" network 2362, the "or" network 2374 and the "and" network 2376 to the left input terminal of the flip-flop 2322 and trigger the flip-flop 2322 to the true state of operation. The flip-flop 2322 becomes triggered to the true state of operation by the passage of signals through the stages 2362, 2374 and 2376 in accordance with the logic expressed in the following equation:

$$d_2=Q_1Q_2Q_4Q_5\overline{T}_2D_1T \quad (329)$$

where all of the terms have previously been defined.

The "and" network 2384 in FIGURE 57 becomes prepared for opening at the same time as the "and" network 2362. When the "and" network 2384 becomes prepared for opening, it passes the signals of high amplitude on the right output terminal of the flip-flop 2190. These signals represent indications of "0" in the different positions for the multiplicand. The signals passing through the "and" network 2384 are introduced through the "or" network 2382 and the "and" network 2380 to the right input terminal of the flip-flop 2322 so as to trigger the flip-flop to the false state of operation. The flip-flop 2322 receives at its right input terminal the signals passing through the stages 2384, 2382 and 2380 in accordance with the following logical equation:

$$\overline{d}_2=Q_1Q_2Q_4Q_5\overline{T}_2\overline{D}_1P_{1/20}T \quad (330)$$

where $P_{1/20}$=signals from the inverter 2390 to indicate positions to 20, inclusive, for each block; and the other terms have previously been defined.

It will be noticed that the term $P_{1/20}$ is included in the logic expressed in Equation 330. The term $P_{1/20}$ is included in Equation 330 so that the flip-flop 2322 will not become triggered to its false state at position 21 in case the flip-flop is in its true state at position 20. The reason for carrying the true state of operation of the flip-flop 2322 from position 20 to position 21 in the odd blocks is to provide a generation of the sign digit in the positions toward the left in the subsequent cycles of computation when the sign digit is negative. For example, this corresponds in FIGURE 64 to the carry of the $d_1$ indication at position 3 of the $\beta+3$ block to position 1 of the $\beta+4$ block. As shown in FIGURE 64, an indication $d_1'$ is generated at position 1 of the $\beta+4$ block to correspond to the $d_1$ indication.

As the computation proceeds, the sign digit of the multiplicand becomes generated into successive positions of the even block. For example, in FIGURE 64 the sign digit $d_1$ of the multiplicand becomes generated into position of the $\beta+4$ block and is represented as $d_1'$ in that figure. In like manner, the sign digit becomes generated into position 2 of the $\beta+6$ block and is represented as $d_1''$ in that figure. Certain stages shown in FIGURE 57 operate to produce a regeneration of the sign digit of the multiplicand into the successive positions of the even blocks after the first cycle of operation. These stages include the "and" network 2364 in FIGURE 57.

The "and" network 2364 in FIGURE 57 can become prepared for opening only for the operations of multiplication and shift as represented by a code of $Q_4Q_5$ and only in the subsequent words of these operations as represented by a code of $Q_1Q_2$. The "and" network 2364 is able to pass a signal only in the even blocks after the first block of operation because of the introduction of a signal to the "and" network from the left output terminal of the flip-flop 2140. When the "and" network 2364 becomes prepared for opening, it passes a signal upon the first indication of "0" for the multiplicand in the even block provided that the indication in the previous position is "1." The indication of "0" in the position being presented for computation is represented by a relatively high voltage on the right output terminal of the flip-flop 2190 and the indication of "1" in the previous position is represented by a relatively high voltage on the left output terminal of the flip-flop 2176. The flip-flop 2176 provides an indication of the multiplicand in the position previous to that being presented for computation in accordance with the logic expressed in Equation 327.

The signal passing through the "and" network 2364 is introduced through the "or" network 2374 and the "and" network 2376 to the left input terminal of the flip-flop 2322 so as to trigger the flip-flop to the true state of operation. Signals pass through the stages 2364, 2374 and 2376 to the left input terminal of the flip-flop 2322 in accordance with the following logical equation:

$$d_2=Q_1Q_2Q_4Q_5T_2T_1\overline{D}_1T \quad (331)$$

where all of the terms have previously been defined.

The signals of high amplitude on the left output terminal of the flip-flop 2322 are then transferred to the flip-flop 2314 so as to be recorded as indications of "1" in the track 2002 in accordance with the logic expressed in Equation 313.

The "and" network 2386 in FIGURE 57 becomes prepared for opening at the same time as the "and" network 2364. However, the "and" network 2386 operates to generate into the next position an indication of "0" representing the polarity of the multiplicand in the previous position. The signals passing through the "and" network 2386 are introduced through the "or" network 2382 and the "and" network 2380 to the right input terminal of the flip-flop 2322 so as to trigger the flip-flop to the false state of operation. The flip-flop 2322 becomes triggered to the false state of operation by the passage of signals through the stages 2386, 2382 and 2380 in accordance with the following logical equation:

$$\overline{d}_2=Q_1Q_2Q_4Q_5T_2\overline{T}_1\overline{D}_1T \quad (332)$$

where all of the terms have previously been defined.

The indication of "0" generated into successive positions during the even blocks of computation correspond to the indications of $d_1'$ and $d_1''$ in FIGURE 64. These indications become transferred from the flip-flop 2322 to the flip-flop 2314 so as to be recorded as indications of "0" in accordance with the logic expressed in Equation 314.

As has been previously described, the indications representing ing the sign of the multiplicand become generated into the positions of increasing significance in the even blocks as the cycles of computation proceed. For example, indications of "1" representing the sign of the multiplicand become generated into successive positions of the even blocks when the multiplicand has a negative value as represented by an indication of "1" in the position of greatest significance. These indications of "1" are combined with the indications representing the interim results at corresponding positions. This may be seen from the $\beta+4$ block, the $\beta+6$ block or the $\beta+8$ block in the example shown in FIGURE 64.

The combination of the indications of "1" for the multiplicand in the even blocks and the indications representing the interim result at the corresponding positions occurs in accordance with the logic expressed in Equations 319 and 320. This results from the inclusion of the term $D_2$ in the logic $(\overline{T}_2+D_2)$. The term $D_2$ indicates that the combination of the signals from the $D_2$ flip-flop 2322 and the $A_5$ flip-flop 2326 for each position in the even blocks and the $C_4$ carry from the previous position occurs as long as the indications of "1" for the multiplicand are presented in these positions. In this way, the logic expressed in Equations 319 and 320 provide for a combination of the multiplicand and the interim results into the positions of least significance in the even blocks of multiplication after the first block.

It may sometimes happen that an overflow may be obtained from the combination of the multiplicand and an interim result in the last position for these quantities. By way of illustration, an overflow may be obtained in the $\beta+4$ block when $d_1'$ and $a_1$ are combined at position 1 of the block. Similary, an overflow may be obtained when $d_1''$ and $a_1$ are combined at position 2 of the $\beta+6$ block in the example shown in FIGURE 64. Although an overflow may be obtained at these positions, this overflow should not be recorded in the accumulator. Certain stages are included in FIGURE 59 to prevent any overflow from being recorded in the accumulator at these positions. These stages include the "and" network 2450 in FIGURE 59.

The "and" network 2450 is able to become opened only during an operation of multiplication as represented by a coding of $Q_4Q_5\overline{Q}_6$ and only during the blocks subsequent to the first block of this operation as represented by a coding of $Q_1Q_2$. The "and" network 2450 is further able to become opened only in the even blocks after the first block of computation because of the introduction of a relatively high voltage to the "and" network from the left output terminal of the flip-flop 2140.

A signal is able to pass through the "and" network 2450 in the even blocks of multiplication only in the first position in which an indication of "0" appears in the multiplicand. When the multiplicand is negative, the first indication of "0" in the even blocks represents the first position after the last generation of the indications of "1" into the first positions of the even block. This is the position corresponding to that at which $d_1'$ and $a_1$ would be combined in the $\beta+4$ block of the example shown in FIGURE 64 and at which $d_1''$ and $a_1$ would be combined in the $\beta+6$ block of the example shown in FIGURE 64.

When the "and" network 2450 becomes prepared for opening, it passes the signals of high amplitude on the left output terminal of the flip-flop 2326. After passing through the "and" network 2450, the signals are introduced through the "or" network 2442 and the "and" network 2444 to the left input terminal of the flip-flop 2426 to trigger the flip-flop to the true state of operation. Signals pass through the stages 2450, 2442 and 2444 to the right input terminal of the flip-flop 2426 in accordance with the following logical equation:

$$a_0=Q_4Q_5\overline{Q}_6Q_1Q_2T_2\overline{D}_2A_2T \qquad (333)$$

where all of the terms have previously been defined.

The "and" network 2480 in FIGURE 60 becomes prepared for opening at the same time as the "and" network 2450 in FIGURE 59. However, the "and" network 2480 passes the signals of high amplitude on the right output terminal of the flip-flop 2326. These signals pass through the "or" network 2474 and the "and" network 2476 to the right input terminal of the flip-flop 2426 and trigger the flip-flop to the false state of operation. The flip-flop 2426 becomes triggered to the false state of operation by the passage of signals through the stages 2480, 2474 and 2476 in accordance with the logic expressed in the following equation:

$$\overline{a}_0=Q_4Q_5\overline{Q}_6Q_1Q_2T_2\overline{D}_2\overline{A}_2T \qquad (334)$$

where all of the terms have previously been defined.

In this way, the indication in the interim result becomes recorded without taking account of any carry resulting from the addition of the interim result and the multiplicand in the previous position. This indication becomes recorded in the position after the last generation of an indication of "1" for the multiplicand. An indication of "1" in the interim result becomes recorded in accordance with the logic expressed in Equation 333. Similarly, an indication of "0" in the interim result becomes recorded in accordance with the logic expressed in Equation 334.

In the first cycle of an operation involving multiplication no combination of the multiplicand and the value in the accumulator is obtained if the polarity of the multiplier is positive. A complemented value of the multiplicand is inserted into the accumulator if the polarity of the multiplier is negative. In the subsequent cycles of computation, the multiplicand and the interim results are combined in a normal manner such that complementation is not used. This has been described in detail previously in connection with the examples shown in FIGURE 62.

Since the values of the multiplicand and the interim results are combined on a normal additive basis after the first cycle of computation, the operation of the carry flip-flop 2394 is controlled in a manner similar to that expressed logically in Equations 293 and 294. For example, a carry is initially obtained when the indications of the interim result and the multiplicand are both "1" at a particular position. The carry continues in the successive positions until the indications of the interim result and the multiplicand are both "0" at the same position.

The "and" network 2396 in FIGURE 58 controls the passage of signals for producing a carry for an operation of multiplication in the blocks after the first block. This results from the introduction to the "and" network of signals representing a coding of $Q_1Q_2$ from the flip-flops 2038 and 2040 and representing a coding of $Q_4Q_5\overline{Q}_6$ from the flip-flops 2060, 2062 and 2096. When the "and" network 2396 becomes prepared for opening, it passes signals upon the simultaneous occurrence of voltages of high amplitude on the left output terminals of the flip-flops 2322 and 2326. This corresponds to the simultaneous occurrence of indications of "1" for the multiplicand and an interim result in the operation of multiplication.

The signals from the "and" network 2396 pass through the "or" network 2404 and the "and" network 2406 to the left input terminal of the flip-flop 2394 and trigger the flip-flop 2394 to the true state of operation. The logic controlling the passage of signals through the stages 2396, 2404 and 2406 to the left input terminal of the flip-flop 2394 may be expressed as:

$$c_4 = Q_4Q_5\overline{Q}_6Q_1Q_2A_5D_2T \quad (335)$$

where all of the terms have previously been defined.

The "and" network 2418 in FIGURE 58 becomes prepared for opening at the same time as the "and" network 2396. When the "and" network 2418 becomes prepared for opening, it passes signals only upon the simultaneous occurrence of indications of "0" for the multiplicand and for the interim result in the operation of multiplication. Such a simultaneous occurrence of indications of "0" is represented by relatively high voltages on the right output terminals of the flip-flops 2322 and 2326.

When voltages of high amplitudes are simultaneously introduced to the "and" network 2418 from the flip-flop 2322 and 2326, a signal passes through the "and" network 2418, the "or" network 2412 and the "and" network 2410 to the right input terminal of the flip-flop 2394. This signal triggers the flip-flop 2394 to the false state of operation so as to produce a carry of "0" from one position to the next. A carry of "0" is produced by the passage of signals through the stages 2418, 2412 and 2410 in accordance with the following logical equation:

$$\overline{c}_4 = Q_4Q_5\overline{Q}_6Q_1Q_2\overline{A}_2\overline{D}_2T \quad (336)$$

where all of the terms have previously been defined.

The operation of multiplication continues until the occurrence of the block representing α (alpha) coincidence. When the block representing α coincidence is presented for computation, a relatively high voltage is produced on the left output terminal of the flip-flop 2026 in accordance with the logic expressed in Equations 252 and 253. This high voltage causes a signal to pass through the "and" network 2080 in FIGURE 52 at position 21 for the block representing a coincidence. A signal passes through the "and" network 2080 at position 21 of the block representing α coincidence since the "and" network has previously been prepared for opening. The "and" network 2080 has previously been prepared for opening by a code of $Q_4Q_5$ from the flip-flops 2060 and 2062, to represent the operations of multiplication and shift and by a coding of $Q_1$ from the flip-flop 2038 to represent the first and subsequent blocks of these operations.

The signal passing throug hthe "and" network 2080 is introduced through the "or" network 2076 and the "and" network 2074 to the right input terminal of the flip-flop 2038 so as to trigger the flip-flop to the false state of operation. A false state of operation is produced in the flip-flop 2038 by the passage of signals through the signals 2080, 2076 and 2074 in accordance with the following logical equation:

$$\overline{q}_1 = Q_1Q_4Q_5C\alpha P_{21}T \quad (337)$$

where all of the terms have previously been defined.

Since an operation such as that of multiplication can occur only for a coding of $Q_1\overline{Q}_2$ in the first block or $Q_1Q_2$ in the subsequent blocks, the operation becomes discontinued upon the triggering of the flip-flop 2038 to the false state. When the operation becomes interrupted, the flip-flop 2394 in FIGURE 58 becomes triggered to its false state by the passage of a signal from the right output terminal of the flip-flop 2038 through the "or" network 2412 and the "and" network 2410 to the right input terminal of the flip-flop. By triggering the flip-flop 2394 to the false state of operation, carries cannot be obtained in the first positions of the next operation unless such carries are actually desired. The flip-flop 2394 becomes triggered to its false state of operation by the passage of signals from the right output terminal of the flip-flop 2038 through the stages 2412 and 2410 in accordance with the following logical equation:

$$\overline{c}_4 = \overline{Q}_1T \quad (338)$$

where all of the terms have previously been defined.

When the flip-flop 2038 becomes triggered to its false state of operation upon the presentation of the block representing α coincidence, a coding of $\overline{Q}_1Q_2$ is obtained. This coding of $\overline{Q}_1Q_2$ controls the insertion of a new instruction into the track 2002 in accordance with the logic expressed in Equations 268 and 269. As previously described, a new instruction is inserted into the track 2002 when the block representing α coincidence is presented for computation. After the instruction has been inserted into the track 2002, the flip-flop 2040 becomes triggered to its false state in accordance with the logic expressed in Equation 269*a*. This causes a coding of $\overline{Q}_1\overline{Q}_2$ to be obtained such that the instruction circulates in the track 2002 in the subsequent blocks in accordance with the logic expressed in Equations 270 and 271.

TRANSFER OF INFORMATION BACK INTO A TRACK

Various types of operations have been discussed in the previous paragraphs. These operations include multiplication, shift, addition, complementation and conditional transfer of information. It is often desired to transfer the information obtained from such operations back into the memory formed by the various tracks in the drum 132. Specifically, it may be desired to obtain this transfer of information from the accumulator to the tracks 150 and 156 so that the information can be used by the digital differential analyzer shown in FIGURES 1 to 30, inclusive, in solving differential equations.

The transfer of information from the accumulator to the tracks 150 and 156 can occur only for a particular pattern of operation of the flip-flops 2060, 2062 and 2096. This pattern of operation of the flip-flops 2060, 2062 and 2096 is represented by a coding of $\overline{Q}_4\overline{Q}_5Q_6$. Upon the occurrence of such a coding, the transfer of information from the accumulator to the memory occurs in the first block of an operation as represented by a coding of $Q_1\overline{Q}_2$ in the flip-flops 2038 and 2040. The transfer is made from the accumulator to the track 150 when the flip-flops 2140 and 2176 are operating in a pattern corresponding to $T_2\overline{T}_1$. The flip-flops 2140 and 2176 become triggered to a pattern of $T_2\overline{T}_1$ in accordance with the logic expressed in Equations 280, 281, 282 and 283.

The "and" network 2494 in FIGURE 61 becomes prepared for opening in the first block of an operation involving transfer of information from the accumulator to the memory when a coding of $T_2\overline{T}_1$ is produced in the flip-flops 2140 and 2176. When the "and" network 2494 becomes prepared for opening, signals pass through the "and" network 2494 and the "or" network 2496 to the "and" network 2498 so as to become synchronized at optimum times in the clock cycles. The signals are then introduced to the left input terminal of the flip-flop 1332 to trigger the flip-flop to the true state of operation. The resultant signals of high amplitude on the left output terminal of the flip-flop 1332 are introduced to the coil 1333 such that indications of "1" are recorded by the coil in the track 150. Indications of "1" are recorded in the track 150 by the passage of signals through the stages 2494, 2496 and 2498 in accordance with the logic expressed in the following equation:

$$y_0 = \overline{Q}_4\overline{Q}_5Q_6Q_1\overline{Q}_2T_2\overline{T}_1A_1T \quad (339)$$

where all of the terms have previously been defined.

The "and" network 2504 becomes prepared for opening at the same time as the "and" network 2494. However, the "and" network 2504 passes the indications of "0" in the accumulator as represented by signals of high amplitude on the right output terminal of the flip-flop 2050. These signals pass through the "or" network 2506 and the "and" network 2508 for synchronization at optimum times in the clock cycles. The signals are then introduced to the right output terminal of the flip-flop 1332 to trigger the flip-flop to the false state of operation. The resultant signals of low amplitude on the left output terminal of the flip-flop 1332 cause indications of "0" to be recorded by the coil 1333 in the track 150. Indications of "0" are recorded in the track 150 by the passage of signals through the stages 2504, 2506 and 2508 in accordance with the following logical equation:

$$\overline{y}_0=\overline{Q}_4\overline{Q}_5Q_6Q_1\overline{Q}_2T_2\overline{T}_1A_1T \quad (340)$$

where all of the terms have previously been defined.

The computations produced in the digital differential analyzer shown in FIGURES 1 to 30, inclusive, to represent the dependent quantity Y in the various blocks should be recorded in the track 150 at all times except when information is transferred to the track 150 from the digital computer shown in FIGURES 51 to 61, inclusive. The indications provided by the digital differential analyzer to represent the dependent quantity Y for the various blocks are recorded in the track 150 at such times in accordance with the operation of the stages 1348, 2500 and 2502 and the stages 1368, 2502 and 2510 in FIGURE 61.

A signal passes through the "or" network 2502 at all times except when information is being transferred from the accumulator to the drum 132 where the accumulator constitutes a number of successive digital positions in the track 1002. This results from the fact that the logic controlling the operation of the "or" network 2502 is the converse of the logic $\overline{Q}_4\overline{Q}_5Q_6\overline{Q}_1Q_2$ forming a part of Equations 338 and 339. The signal passing through the "or" network 2502 prepares the "and" networks 2500 and 2510 for opening. When the "and" network 2500 becomes prepared for opening, it passes the signals from the "and" network 1348. As previously described, signals pass through the "and" network 1348 when indications of "1" obtained from the digital differential analyzer are to be recorded in the track 150.

The signals from the "and" network 1348 pass through the "and" network 2500, the "or" network 2496 and the "and" network 2498 to the left input terminal of the flip-flop 1332. These signals trigger the flip-flop 1332 to the true state of operation such that indications of "1" are recorded by the coil 1333 in the track 150. The flip-flop 1332 receives at its input terminals signals passing through the stages 2502, 1348, 2500, 2496 and 2498 in accordance with the following logical equation:

$$y_0=(Q_4+Q_5+Q_6+\overline{Q}_1+Q_2)\text{(incremental logic for } y\text{)} \quad (341)$$

where the incremental logic for $y$ is expressed in FIGURE 26; and the other terms have previously been defined.

The "and" network 2510 becomes prepared for opening at the same time as the "and" network 2500. When the "and" network 2510 becomes prepared for opening, it passes the signals from the "and" network 1368. These signals represent indications of "0" which are provided by the digital differential analyzer for recording in the track 150. The signals from the "and" network 1368 pass through the "and" network 2510, the "or" network 2506 and the "and" network 2508 to the right input terminal of the flip-flop 1332 and trigger the flip-flop to the false state of operation. This causes indications of "0" to be recorded by the coil 1333 in the track 150. Signals pass through the stages 2502, 1368, 2510, 2506 and 2508 to the right input terminal of the flip-flop 1332 in accordance with the following logical equation:

$$\overline{y}_0=(Q_4+Q_5+\overline{Q}_6+\overline{Q}_1+Q_2)\text{(incremental logic for } \overline{y}\text{)} \quad (342)$$

where the incremental logic for $\overline{y}$ is expressed in FIGURE 26; and the other terms have previously been defined.

Signals pass through the "and" network 2516 in FIGURE 61 when a coding of $T_2T_1$ is produced in the flip-flops 2140 and 2176 to represent the track 156. The signals are able to pass through the "and" network 2516 only in the first block of an operation involving transfer to memory as represented by a coding of $Q_1\overline{Q}_2\overline{Q}_4\overline{Q}_5Q_6$. The signals passing through the "and" network 2516 are those obtained from the left output terminal of the flip-flop 2050 to represent indications of "1" in the accumulator.

The signals from the "and" network 2516 pass through the "or" network 2518 to the "and" network 2520 so as to become synchronized at optimum times in the clock cycles. The signals are then introduced to the left input terminal of the flip-flop 1414 to trigger the flip-flop to the true state of operation such that indications of "1" are recorded by the coil 1416 in the track 156. Indications of "1" are recorded in the track 156 by the passage of signals through the stages 2516, 2518 and 2520 in accordance with the following logical equation:

$$u_0=\overline{Q}_4\overline{Q}_5Q_6Q_1\overline{Q}_2T_2T_1A_1T \quad (343)$$

where all of the terms have previously been defined.

The "and" network 2524 becomes prepared for opening at the same time as the "and" network 2516. When the "and" network 2524 becomes prepared for opening, it passes the indications of "0" in the accumulator as represented by signals of high amplitude on the right output terminal of the flip-flop 2050. These signals pass through the "or" network 2526 to the "and" network 2528. The signals are then introduced by the "and" network 2528 to the right input terminal of the flip-flop 1414 at optimum times in the clock cycles so as to trigger the flip-flop to the false state of operation. This causes indications of "0" to be recorded by the coil 1416 in the track 156. The logic controlling the passage of signals through the stages 2524, 2526 and 2528 to the right input terminal of the flip-flop 1414 may be expressed as:

$$\overline{u}_0=\overline{Q}_4\overline{Q}_5Q_6Q_1\overline{Q}_2T_2T_1\overline{A}_1T \quad (344)$$

where all of the terms have previously been defined.

Signals from the "and" network 1418 pass through the "and" network 2514 at all times except when information is transferred from the accumulator to the memory provided by the tracks in the drum 132. The signals from the "and" network 1418 represent the indications of "1" for the different positions in the cumulative value of the independent quantity $x$ for the various blocks. These signals pass through the "or" network 2518 and the "and" network 2520 to the left input terminal of the flip-flop 1414 to trigger the flip-flop to the true state of operation. When the flip-flop 1414 becomes triggered to the true state of operation, indications of "1" are recorded by the coil 1416 in the track 156. Indications of "1" are recorded in the track 156 by the passage of signals through the stages 2502, 1418, 2514, 2518 and 2520 in accordance with the logical equation:

$$u_0=(Q_4+Q_5+\overline{Q}_6+\overline{Q}_1+Q_2)\text{ (incremental logic for } u_0\text{)} \quad (345)$$

where the incremental logic for $u_0$ is set forth in FIGURE 28; and the other terms have previously been defined.

The "and" network 2522 in FIGURE 61 becomes prepared for opening at the same time as the "and" network 2514 so as to pass the signals from the "and" network 1448. As previously described, these signals represent the indications of "0" produced by the digital differential analyzer in the various positions to represent the cumulative value of the independent quantity $x$ for the different blocks. The signals from the "and" network 1448 pass through the "and" network 2522, the "or" network 2526 and the "and" network 2528 to the right input terminal of the flip-flop 1414. The signals trigger the flip-flop 1414 to the false state of operation such that indications of "0" are recorded by the coil 1416 in the track 156. Signals pass to the right input terminal of the flip-flop 1414 through the stages 2502, 1448, 2522, 2526 and 2528 in accordance with the logical equation:

$$\overline{u}_0=(Q_4+Q_5+\overline{Q}_6+\overline{Q}_1+Q_2) \text{ (incremental logic for } \overline{u}_0) \quad (346)$$

where the incremental logic for $\overline{u}_0$ is set forth in FIGURE 28; and the other terms have previously been defined.

It should be appreciated that the particular arithmetical operations performed by the digital computer are only by way of example. For example, other arithmetical operations such as division could be performed by including additional equipment in the digital computer. If such additional operations should be included, it might be necessary to increase the number of flip-flops such as the $Q_4$ flip-flop 2060, the $Q_5$ flip-flop 2062 and the $Q_6$ flip-flop 2096. It might also be necessary to increase the number of positions in each block since additional positions would be required to distinguish in coded form all of the different operations which could be performed. However, it is believed that a person skilled in the art would be able to make such changes from the discussions and logical equations set forth above. As used in the specification, the term "block" is intended to indicate a unit in the digital differential analyzer for providing signals digitally representing a dependent quantity and representing digital variations in an independent quantity and representing the cumulative value of the differential combination of the dependent quantity and the digital variations in the independent quantity. It is believed that the term "integrator" can also be used to define such a unit. In order to make the termination in the claims consistent with terminology used in prior patents, the term "integrator" has been used in the claims to indicate such a unit.

I claim:

1. In a digital differential analyzer defined by a plurality of integrator storage sections and defined by a plurality of digital positions in each integrator storage section in the plurality and having an interrelationship between the integrator storage sections in the plurality in accordance with a problem to be solved, means for sequentially presenting the integrator storage sections in the plurality and the successive digital positions in each integrator storage section in the plurality for computation to obtain successive cycles of computation, means for providing signal indications representing a dependent quantity for a particular integrator storage section in the plurality, means for providing signal indications external to the particular integrator storage section in the plurality and representing a quantity for comparison with the dependent quantity for the particular integrator storage section, means responsive to the signal indications representing the dependent quantity and the comparison quantity for the particular integrator storage section for comparing these signal indications upon the presentation of the particular integrator storage section for computation to produce signals representing errors in the dependent quantity for the particular integrator storage section, means responsive to the error signals for each cycle of computation for introducing these error signals back to the signal indications representing the dependent quantity for the particular integrator storage section in the next cycle of computation in a direction for reducing any errors between the dependent quantity and the external quantity for the particular integrator storage section, means responsive in each cycle of computation to the error signals two cycles of computation previously for the particular integrator storage section for providing signals representing the inverse of such error signals upon a lack of an error in the preceding cycle of computation, means for providing signal indications representing digital variations in an independent quantity for the particular integrator storage section upon the presentation of the particular integrator storage section for computation and in accordance with the interrelationship betwen the particular integrator storage section and other integrator storage sections in the plurality, means for providing signal indications representing an output quantity for the particular integrator storage section upon the presentation of the particular integrator storage section for computation, means responsive to the signal indications representing the dependent quantity and the variations in the independent quantity for the particular integrator storage section for differentially combining these signal indications upon the presentation of the particular integrator storage section for cumputation to produce signal indications representing a differential combination for the particular integrator storage section, and means responsive to the signal indications representing the output quantity and the differential combination for the particular integrator storage section for combining these signal indications upon the presentation of the particular integrator storage section upon the presentation of the particular integrator storage section for computation to obtain signal indications representing a new value of the output quantity for the particular integrator storage section.

2. In a digital differential analyzer defined by a plurality of integrator storage sections and defined by a plurality of digital positions in each integrator storage section in the plurality and having an interrelationship between the integrator storage sections in the plurality in accordance with a problem to be solved, means for sequentially presenting the integrator storage sections in the plurality and the successive digital positions for each integrator storage section in the plurality for computation on a cyclic basis, means for providing signal indications digitally representing a dependent quantity for a particular integrator storage section in the plurality upon the presentation of the particular integrator storage section for computation, means for providing signal indications from a source external to the particular integrator storage section and representing a quantity for comparison with the signal indications representing the dependent quantity for the particular integrator storage section, means responsive to the signal indications representing the dependent quantity and the external quantity for the particular integrator storage section for comparing these signal indications upon the presentation of the particular integrator storage section for computation to produce signals representing any error or lack of error in the comparison and representing the polarity of any error for the particular integrator storage section, means responsive to the signal indications representing the error or lack of error in the comparisons of each cycle of computation for the particular integrator storage section for retaining such signal indications in the next cycle of computation, means responsive to the error signals for introducing to the particular integrator storage section in each cycle of computation error signals having a polarity opposite to that produced in the preceding cycle of computation upon the actual occurrence of an error in the preceding cycle of computation, means for introducing to the particular integrator storage section in each cycle of computation error signals having a polarity corresponding to the polarity of the error signals introduced to the particular integrator storage section in the preceding cycle of computation upon the lack of occurrence of an error signal in the preceding cycle of computation and upon the occurrence of an error signal in the cycle immediately prior to such preceding cycle, means for introducing to the particular integrator storage section in each cycle of computation error signals having a polarity opposite to that introduced to the particular integrator storage section in the preceding cycle of computation upon the lack of occurrence of an error signal in the preceding two cycles of computation, means responsive to the signal indications representing the dependent quantity for the particular integrator storage section and the error signals introduced to the particular integrator storage section for combining these signal indications upon the presentation of the particular integrator storage section for computation to obtain signals representing a new value in the dependent quantity for the particular integrator storage section, means for providing signal indications representing digital increments in an independent quantity for the particular integrator storage section upon the presentation of the particular integrator storage section for computation and in accordance with the interrelationship between the particular integrator storage section and other integrator storage sections in the plurality, means for providing signal indications representing an output quantity for the particular integrator storage section upon the presentation of the particular integrator storage section for computation, means responsive to the signal indications representing the dependent quantity and the increments in the independent quantity for the particular integrator storage section for differentially combining these signal indications upon the presentation of the particular integrator storage section for computation to obtain signal indications representing a differential combination for the particular integrator storage section, and means responsive to the signal indications representing the output quantity and the differential combination for the particular integrator storage section for combining these signal indications upon the presentation of the particular integrator storage section for computation to obtain signal indications representing a new value of the output quantity for the particular integrator storage section.

3. In a digital differential analyzer as set forth in claim 2, means for providing in the particular integrator storage section in successive cycles of computation signal indications alternately representing increments of a first polarity and of an opposite polarity, and means responsive in each cycle of computation to the signal indications representing the dependent quantity, the error increments and the alternating increments for the particular integrator storage section for combining these signal indications upon the presentation of the particular integrator storage section for computation to obtain signal indications representing a new value of the dependent quantity for the particular integrator storage section.

4. In a digital differential analyzer defined by a plurality of integrator storage sections and defined by a plurality of digital positions in each integrator storage section in the plurality and having an interrelationship between the different integrator storage sections in the plurality in accordance with a problem to be solved, means for sequentially presenting the different integrator storage sections in the plurality and the successive digital positions in each integrator storage section in the plurality for computation in a cyclic pattern, means for providing a plurality of channels for the storage of signal information for the different integrator storage sections in the plurality, means including electrical circuitry for providing in a first channel in the plurality signal indications digitally representing a dependent quantity for a particular integrator storage section in the plurality upon the presentation of the particular integrator storage section for computation, means including electrical circuitry for introducing to the particular integrator storage section from a source external to the particular integrator storage section signal indications digitally representing a quantity for comparison with the dependent quantity for the particular integrator storage section, means including electrical circuitry responsive to the signal indications representing the dependent quantity for the particular integrator storage section and the signal indications representing the external quantity for the particular integrator storage section for comparing the signal indications to produce signal indications representing any differences between the dependent quantity and the external quantity for the particular integrator storage section, means including electrical circuitry responsive to the signal indications representing the difference increments produced for the particular integrator storage section in each cycle of computation for storing in a second channel in the plurality the signal indications representing the difference increments produced for the particular integrator storage section in that cycle of computation and having a polarity opposite to such difference increments, means including electrical circuitry responsive to the signal indications representing the occurrence or lack of occurrence of any difference increments in each cycle of computation for storing such signal indications in each cycle of computation, means including electrical circuitry responsive to the signal indications representing the occurence or lack of occurrence of any difference signals in each cycle of computation for storing such signal indications in the next cycle of computation, means including electrical circuitry for storing in the second channel for the particular integrator storage section in each cycle of computation signal indications stored for the particular integrator storage section in the preceding cycle of computation upon the occurrence in the storage means of signal indications representing the lack of any difference in that cycle of computation and representing a difference in the preceding cycle of computation, means including electrical circuitry for storing in the second channel for the particular integrator storage section in each cycle of computation signal indications having a polarity opposite to that stored for the particular integrator storage section in the preceding cycle of computation upon the occurrence in the storage means of signal indications representing the lack of any difference in the preceding two cycles of computation, means including electrical circuitry responsive to the signal indications in the second channel for the particular integrator storage section and the signal indications in the first channel for the particular integrator storage section in each cycle of computation for combining such signal indications to obtain for the particular integrator storage section signal indications representing a new value of the dependent quantity approaching the value of the external quantity, means including electrical circuitry for providing signal indications representing digital increments in an independent quantity for the particular integrator storage section upon the presentation of the particular integrator storage section for computation and in accordance with the interrelationship between the particular integrator storage section and other integrator storage sections in the plurality, means including electrical circuitry for providing in a third channel in the plurality signal indications representing an output quantity for the particular integrator storage section upon the presentation of the particular integrator storage section for computation, and means including electrical circuitry responsive to the signal indications representing the dependent quantity and the output quantity for the particular integrator storage section for combining such signal indications upon the presentation of the particular integrator storage section for computation and in accordance with the signal indications representing the digital increments in the independent quantity for the particular integrator storage section to obtain signal indications representing a new value of the output quantity for the particular integrator storage section.

5. In a digital differential analyzer as set forth in claim 4, means for providing a fourth channel in the plurality signal indications representing increments in the dependent quantity for the particular integrator storage section, means including electrical circuitry responsive in each cycle of computation to the polarity of the increments stored in the fourth channel for the particular integrator storage section for inverting such increments, and means responsive to the signal indications representing the dependent quantity and the increments stored in the second and fourth channels for combining such signal indications upon the presentation of the particular integrator storage section for computation to obtain signal indications representing a new value of the dependent quantity for the particular integrator storage section.

6. In a digital differential analyzer defined by a plurality of integrator storage sections and defined by a plurality of digital positions in each integrator storage section in the plurality and having an interrelationship between the integrator storage sections in the plurality in accordance with a problem to be solved, means for sequentially presenting the integrator storage sections in the plurality and the successive positions in the integrator storage sections in the plurality for computation on a cyclic basis, means for providing signal indications digitally representing a dependent quantity for a particular one of the integrator storage sections in the plurality, means for providing a plurality of signal indications from an external source to digitally represent a quantity for comparison with the dependent quantity for the particular integrator storage section, means responsive to the signal indications from the external source and the signal indications representing the dependent quantity for each successive position in the particular integrator storage section for comparing these signal indications upon the presentation of the particular integrator storage section for computation to produce signal indications representing an error or lack of an error for each successive position and representing the polarity of any error in the last position of the particular integrator storage section, means responsive to the signal indications representing any error increment for the particular integrator storage section for recording the signal indications representing any error increment for the particular integrator storage section and a polarity opposite to the polarity of such error increment for the particular integrator storage section upon the occurrence of an error in each cycle of computation for use in the subsequent cycle of computation, means responsive to the signal indications stored by the last mentioned means for storing in each cycle of computation signal indications representing an increment having an opposite polarity to the increment stored in the preceding cycle of computation for the particular integrator storage section upon the lack of occurrence of an error in that cycle of computation, means for introducing to the dependent quantity for the particular integrator storage section in each cycle of computation the signal indications stored in the preceding cycle of computation for combination with the signal indications stored in that cycle of computation, means responsive to the signal indications representing the dependent quantity and the increments introduced to the dependent quantity for the particular integrator storage section for combining these signal indications upon the presentation of the particular integrator storage section for computation to obtain signal indications representing a new value in the dependent quantity for the particular integrator storage section, means for providing signal indications representing digital increments in the independent quantity for the particular integrator storage section upon the presentation of the particular integrator storage section for computation and in accordance with the interrelationship between the particular integrator storage section and other integrator storage sections in the plurality, means for providing signal indications representing an output quantity for the particular integrator storage section upon the presentation of the particular integrator storage section for computation, and means responsive to the signal indications representing the dependent and output quantities for the particular integrator storage section for combining these signal indications upon the presentation of the particular integrator storage section for computation and in accordance with the signal indications representing the digital increments in the independent quantity for the particular integrator storage section to obtain signal indications representing a new value of the output quantity for the particular integrator storage section.

7. In a digital differential analyzer as set forth in claim 6, means for providing signal indications representing increments of a first polarity in alternate cycles of computation and representing increments of an opposite polarity in the other cycles of computation, and means responsive to the signal indications representing the error increments, the alternate increments of the first and opposite polarities, and the dependent quantity for the particular integrator storage section for combining these signal indications in each cycle of computation to obtain signal indications representing a new value of the dependent quantity for the particular integrator storage section for that cycle of computation.

References Cited by the Examiner

UNITED STATES PATENTS

| | | | |
|---|---|---|---|
| 2,609,143 | 9/1952 | Stibitz | 235—61 |
| 2,611,813 | 9/1952 | Sharpless et al. | 235—61 |
| 2,614,169 | 10/1952 | Cohen et al. | 235—61 |
| 2,685,054 | 7/1954 | Brenner et al. | 235—61 |

(Other references on following page)

UNITED STATES PATENTS

| | | | |
|---|---|---|---|
| 2,685,407 | 8/1954 | Robinson | 235—61 |
| 2,701,095 | 2/1955 | Stibitz | 235—61 |
| 2,749,037 | 6/1956 | Stibitz | 235—61 |
| 2,758,787 | 8/1956 | Felker | 235—61 |
| 2,770,797 | 11/1956 | Hamilton et al. | 235—61 |
| 2,772,050 | 11/1956 | Robinson et al. | 235—61 |
| 2,776,794 | 1/1957 | Williams et al. | 235—61 |
| 2,789,759 | 4/1957 | Tootill et al. | 235—61 |
| 2,846,142 | 8/1958 | Strachey et al. | 235—61 |
| 2,850,232 | 9/1958 | Hagen et al. | 235—61 |
| 2,856,595 | 10/1958 | Selmer | 235—61 |
| 2,924,381 | 2/1960 | Eckdahl et al. | 235—152 |

FOREIGN PATENTS

| | | |
|---|---|---|
| 1,084,147 | 6/1954 | France. |
| 162,263 | 3/1955 | Australia. |
| 166,199 | 12/1955 | Australia. |
| 167,102 | 2/1956 | Australia. |

OTHER REFERENCES

Description of a Relay Calculator, Harvard Univ. Computation Laboratory, Harvard Univ. Press, Cambridge, Mass. (1959); pages 1 to 3, 7 to 10, 15, 16, 21, 22, 25, 26, 29, 30, 33, 34, and 37 to 40.

Greenwald et al.: SEAC, Proceedings of the I.R.E., October 1953, pages 1300 to 1313.

MALCOLM A. MORRISON, *Primary Examiner.*

C. D. ANGEL, N. H. EVANS, A. BERLIN, L. SMILOW, *Examiners.*

M. P. HARTMAN, A. GAUSS, M. SPIVAK, L. N. DAVIS, G. SADOWSKY, *Assistant Examiners.*